(12) United States Patent
Bequet et al.

(10) Patent No.: US 10,740,395 B2
(45) Date of Patent: *Aug. 11, 2020

(54) STAGED TRAINING OF NEURAL NETWORKS FOR IMPROVED TIME SERIES PREDICTION PERFORMANCE

(71) Applicant: SAS Institute Inc., Cary, NC (US)

(72) Inventors: Henry Gabriel Victor Bequet, Cary, NC (US); Jacques Rioux, Cary, NC (US); John Alejandro Izquierdo, Cary, NC (US); Huina Chen, Chapel Hill, NC (US); Juan Du, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,023

(22) Filed: Dec. 26, 2019

(65) Prior Publication Data

US 2020/0133977 A1    Apr. 30, 2020

Related U.S. Application Data

(60) Continuation of application No. 16/556,573, filed on Aug. 30, 2019, which is a continuation-in-part of
(Continued)

(51) Int. Cl.
*G06F 9/46* (2006.01)
*G06F 16/901* (2019.01)
(Continued)

(52) U.S. Cl.
CPC .... *G06F 16/9014* (2019.01); *G06F 16/90344* (2019.01); *H04L 67/10* (2013.01)

(58) Field of Classification Search
None
See application file for complete search history.

(56) References Cited

U.S. PATENT DOCUMENTS

| 6,938,215 | B2 | 8/2005 | Kobayashi et al. |
| D593,580 | S | 6/2009 | Truelove et al. |

(Continued)

FOREIGN PATENT DOCUMENTS

| AU | 2011201795 A1 | 11/2011 |
| EP | 2492860 A1 | 8/2012 |

(Continued)

OTHER PUBLICATIONS

Connor et al.; "Recurrent Neural Networks and Robust Time Series Prediction"; IEEE 1994; (Connor_1994.pdf; pp. 1-15) (Year: 1994).*

(Continued)

*Primary Examiner* — Hiren P Patel

(57) ABSTRACT

An apparatus includes a processor to: train a first neural network of a chain to generate first configuration data including first trained parameters, wherein the chain performs an analytical function generating a set of output values from a set of input values, each neural network has inputs to receive the set of input values and outputs to output a portion of the set of output values, and the neural networks are ordered from the first at the head to a last neural network at the tail, and are interconnected so that each neural network additionally receives the outputs of a preceding neural network; train, using the first configuration data, a next neural network in the chain ordering to generate next configuration data including next trained parameters; and use at least the first and next configuration data and data indicating the interconnections to instantiate the chain to perform the analytical function.

30 Claims, 114 Drawing Sheets

Related U.S. Application Data application No. 16/539,222, filed on Aug. 13, 2019, which is a continuation of application No. 16/538,734, filed on Aug. 12, 2019, which is a continuation-in-part of application No. 16/223,518, filed on Dec. 18, 2018, now Pat. No. 10,380,185, which is a continuation-in-part of application No. 16/205,424, filed on Nov. 30, 2018, now Pat. No. 10,346,476, which is a continuation-in-part of application No. 15/897,723, filed on Feb. 15, 2018, now Pat. No. 10,331,495, said application No. 16/538,734 is a division of application No. 16/236,401, filed on Dec. 29, 2018, now Pat. No. 10,409,863, which is a continuation-in-part of application No. 16/039,745, filed on Jul. 19, 2018, now Pat. No. 10,360,069, which is a continuation-in-part of application No. 15/897,723, filed on Feb. 15, 2018, now Pat. No. 10,331,495, which is a continuation-in-part of application No. 15/896,613, filed on Feb. 14, 2018, now Pat. No. 10,002,029, which is a continuation-in-part of application No. 15/851,869, filed on Dec. 22, 2017, now Pat. No. 10,078,710, which is a continuation of application No. 15/613,516, filed on Jun. 5, 2017, now Pat. No. 9,852,013, which is a continuation of application No. 15/425,886, filed on Feb. 6, 2017, now Pat. No. 9,684,544, which is a continuation of application No. 15/425,749, filed on Feb. 6, 2017, now Pat. No. 9,684,543.

(60) Provisional application No. 62/725,186, filed on Aug. 30, 2018, provisional application No. 62/717,873, filed on Aug. 12, 2018, provisional application No. 62/654,643, filed on Apr. 9, 2018, provisional application No. 62/631,462, filed on Feb. 15, 2018, provisional application No. 62/801,173, filed on Feb. 5, 2019, provisional application No. 62/689,040, filed on Jun. 22, 2018, provisional application No. 62/534,678, filed on Jul. 19, 2017, provisional application No. 62/560,506, filed on Sep. 19, 2017, provisional application No. 62/460,000, filed on Feb. 16, 2017, provisional application No. 62/297,454, filed on Feb. 19, 2016, provisional application No. 62/292,078, filed on Feb. 5, 2016.

(51) Int. Cl.
*H04L 29/08* (2006.01)
*G06F 16/903* (2019.01)

(56) References Cited

U.S. PATENT DOCUMENTS

| | | | |
|---|---|---|---|
| D606,551 S | 12/2009 | Willis | |
| D611,493 S | 3/2010 | Willis | |
| 8,041,735 B1 | 10/2011 | Lacapra et al. | |
| D656,515 S | 3/2012 | Bechtold et al. | |
| D684,182 S | 6/2013 | Phelan | |
| 8,627,426 B2 | 1/2014 | Lucovsky et al. | |
| D705,258 S | 5/2014 | Gerssen et al. | |
| D705,259 S | 5/2014 | Gerssen et al. | |
| 9,015,093 B1* | 4/2015 | Commons | B60W 30/00 706/26 |
| D731,546 S | 6/2015 | Zhou et al. | |
| 9,085,958 B2* | 7/2015 | Laing | E21B 49/003 |
| D743,439 S | 11/2015 | Torres et al. | |
| 9,213,718 B1 | 12/2015 | Hrebicek et al. | |
| 9,264,304 B2 | 2/2016 | Smith et al. | |
| D757,737 S | 5/2016 | Chaudhri et al. | |
| D760,781 S | 7/2016 | Nakamura | |
| D761,317 S | 7/2016 | Tursi et al. | |
| 9,430,290 B1* | 8/2016 | Gupta | G06F 9/5016 |
| 9,824,692 B1* | 11/2017 | Khoury | G06N 3/04 |
| 9,882,829 B2 | 1/2018 | Maes et al. | |
| D813,904 S | 3/2018 | Okutsu | |
| 9,935,825 B2 | 4/2018 | Aswathanarayana et al. | |
| 10,013,656 B1* | 7/2018 | Ciarlini | G06F 9/453 |
| D834,063 S | 11/2018 | Stray et al. | |
| D844,634 S | 4/2019 | Roberts et al. | |
| 10,255,409 B2 | 4/2019 | Kisiel et al. | |
| 10,346,476 B2 | 7/2019 | Bequet | |
| 10,417,556 B1* | 9/2019 | Fairbank | G06Q 40/025 |
| 10,452,976 B2* | 10/2019 | Yoo | G06N 3/084 |
| 10,459,979 B2 | 10/2019 | Piechowicz et al. | |
| 2002/0154155 A1 | 10/2002 | McKirchy | |
| 2007/0005528 A1* | 1/2007 | Mukherjee | G05B 23/024 706/15 |
| 2007/0067373 A1* | 3/2007 | Higgins | G06F 11/3013 |
| 2007/0169018 A1 | 7/2007 | Coward | |
| 2009/0241117 A1* | 9/2009 | Dasgupta | G06F 9/5038 718/101 |
| 2009/0293059 A1 | 11/2009 | Nathan et al. | |
| 2010/0011369 A1* | 1/2010 | Uchida | G06F 9/5038 718/104 |
| 2010/0138229 A1 | 6/2010 | Mang et al. | |
| 2010/0280865 A1 | 11/2010 | Goja | |
| 2011/0161391 A1 | 6/2011 | Araujo et al. | |
| 2011/0276656 A1 | 11/2011 | Knapp et al. | |
| 2011/0289490 A1 | 11/2011 | McAtamney | |
| 2012/0117570 A1 | 5/2012 | Ozaki et al. | |
| 2012/0204160 A1 | 8/2012 | Ben-Artzi et al. | |
| 2014/0156849 A1 | 6/2014 | Kim et al. | |
| 2014/0304398 A1 | 10/2014 | Carlen et al. | |
| 2015/0220866 A1 | 8/2015 | Mihara | |
| 2015/0278680 A1* | 10/2015 | Annapureddy | G06N 3/0454 706/25 |
| 2015/0354336 A1* | 12/2015 | Maurice | G06Q 50/02 706/12 |
| 2016/0062753 A1 | 3/2016 | Champagne | |
| 2016/0202959 A1 | 7/2016 | Doubleday et al. | |
| 2016/0210687 A1 | 7/2016 | Grace | |
| 2016/0379112 A1* | 12/2016 | He | G06N 3/049 706/25 |
| 2017/0068887 A1* | 3/2017 | Kwon | G06N 3/0454 |
| 2017/0090989 A1* | 3/2017 | van Velzen | G06F 9/5038 |
| 2017/0154260 A1* | 6/2017 | Hamada | G06N 3/086 |
| 2017/0272209 A1 | 9/2017 | Yanovsky et al. | |
| 2017/0315789 A1 | 11/2017 | Lam et al. | |
| 2017/0337054 A1 | 11/2017 | Parees et al. | |
| 2017/0351781 A1* | 12/2017 | Alexander | G06F 16/3347 |
| 2018/0053328 A1 | 2/2018 | Simonovic et al. | |
| 2018/0165579 A1* | 6/2018 | Friel | G06N 3/0445 |
| 2018/0307969 A1* | 10/2018 | Shibahara | G06N 3/0454 |
| 2018/0314944 A1* | 11/2018 | Li | G06N 3/0472 |
| 2018/0322396 A1 | 11/2018 | Ahuja-Cogny et al. | |
| 2019/0294469 A1 | 9/2019 | Voss et al. | |
| 2020/0026910 A1* | 1/2020 | Wang | G06K 9/6256 |

FOREIGN PATENT DOCUMENTS

| | | | |
|---|---|---|---|
| EP | 3040860 A1 | 7/2016 | |
| WO | WO-2008132066 A1 * | 11/2008 | G06N 3/08 |

OTHER PUBLICATIONS

Iyer et al.; "A Method to Determine the Required Number of Neural-Network Training Repetitions"; IEEE 1999; (Iyer_1999.pdf; pp. 1-6) (Year: 1999).*

Author Unknown, "Container Environment Variables" Kubernetes—Retreived Feb. 10, 2020 URL: https://kubernetes.io/ docs/concepts/containers/container-environment-variables/.

Author Unknown, "Images" Kubernetes—Retrieved Feb. 10, 2020 URL: https://kubernetes.io/docs/concepts/containers/images/.

Author Unknown, "What Is Container Orchestration" BoxBoat—Retreived Feb. 10, 2020 URL: https://boxboat.com/2019/01/25/what-is-container-orchestration/.

(56) References Cited

OTHER PUBLICATIONS

Eldridge, Isaac., "What is Container Orchestration" Kubernetes—Retrieved Feb. 10, 2020 URL: https://blog.newrelic.com/engineering/container-orchestration-explained/.

Author Unknown, "Service" Kubernetes—Retrieved Feb. 10, 2020 URL: https://kubernetes.io/docs/concepts/services-networking/service/.

Author Unknown, "Runtime Class" Kubernetes—Retrieved Feb. 10, 2020 URL: https://kubernetes.io/docs/concepts/containers/runtime-class/.

Author Unknown, "Pod Overview" Kubernetes—Retrieved Feb. 10, 2020 URL: https://kubernetes.io/docs/concepts/workloads/pods/pod-overview/.

Author Unknown, "Nodes" Kubernetes—Retrieved Feb. 10, 2020 URL: https://kubernetes.io/docs/concepts/architecture/nodes/.

Author Unknown, "Master-Node Communication" Kubernetes—Retrieved Feb. 10, 2020 URL: https://kubernetes.io/docs/concepts/architecture/master-node-communication/.

Revell, Matthew., "Introduction to container orchestration: Kubernetes, Docker Swarm and Mesos with Marathon" Exoscale—Retrieved Feb. 10, 2020 URL: https://www.exoscale.com/syslog/container-orchestration/.

Author Unknown, "Controllers" Kubernetes—Retrieved Feb. 10, 2020 URL: https://kubernetes.io/docs/concepts/architecture/controller/.

Author Unknown, "Container Lifecycle Hooks" Kubernetes—Retrieved Feb. 10, 2020 URL: https://kubernetes.io/docs/concepts/containers/container-lifecycle-hooks/.

Author Unknown, "Concepts" Kubernetes—Retrieved Feb. 10, 2020 URL: https://kubernetes.io/docs/concepts/.

Author Unknown, "Concepts Underlying the Cloud Controller Manager" Kubernetes—Retrieved Feb. 10, 2020 URL: https:/kubernetes.io/docs/concepts/architecture/cloud-controller/.

Author Unknown, "Google Kubernetes Engine (GKE) Reviews Product Details" G2—Retrieved Feb. 10, 2020. URL: https://www.g2.com/products/google-kubernetes-engine-gke/reviews.

* cited by examiner

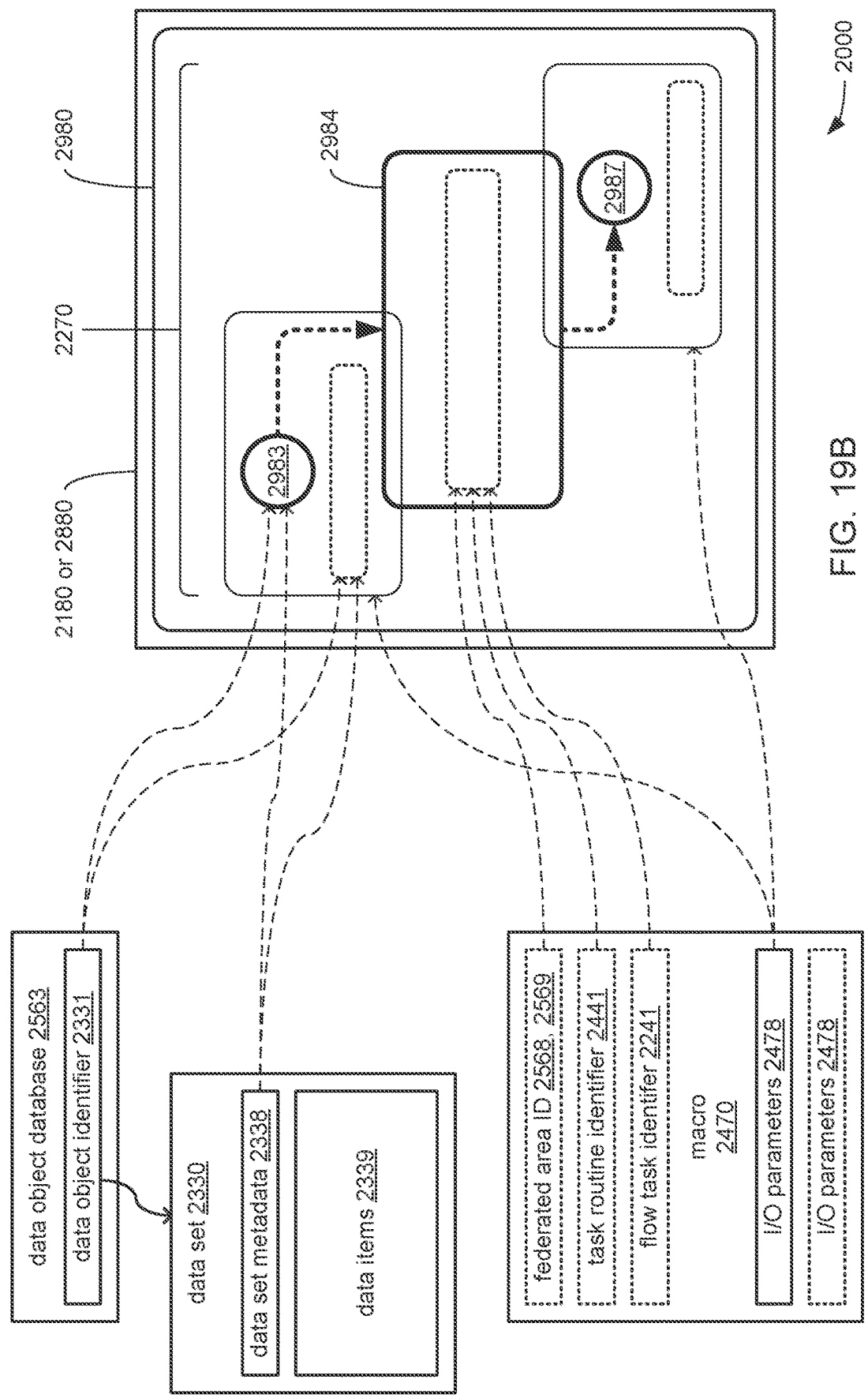

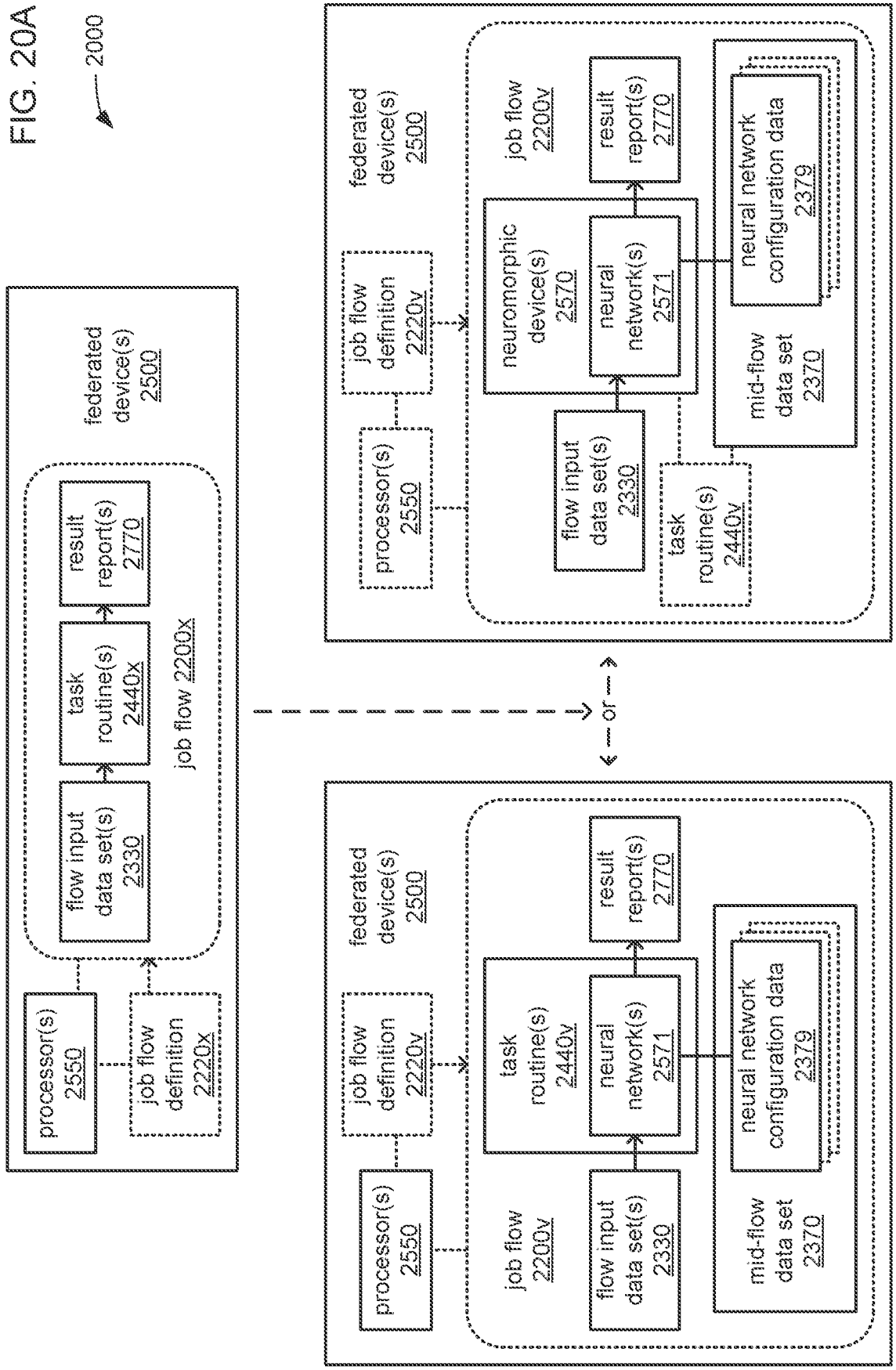

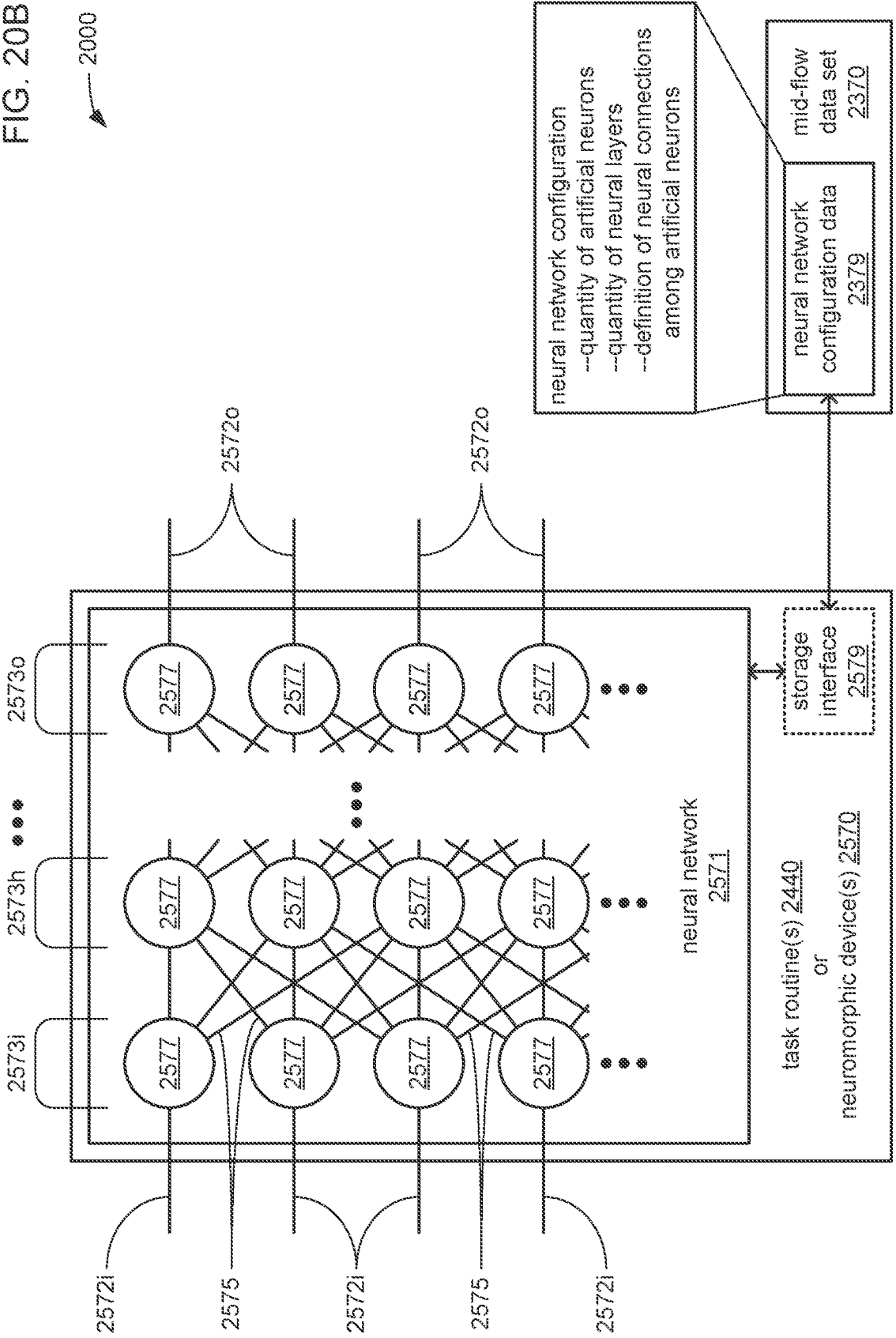

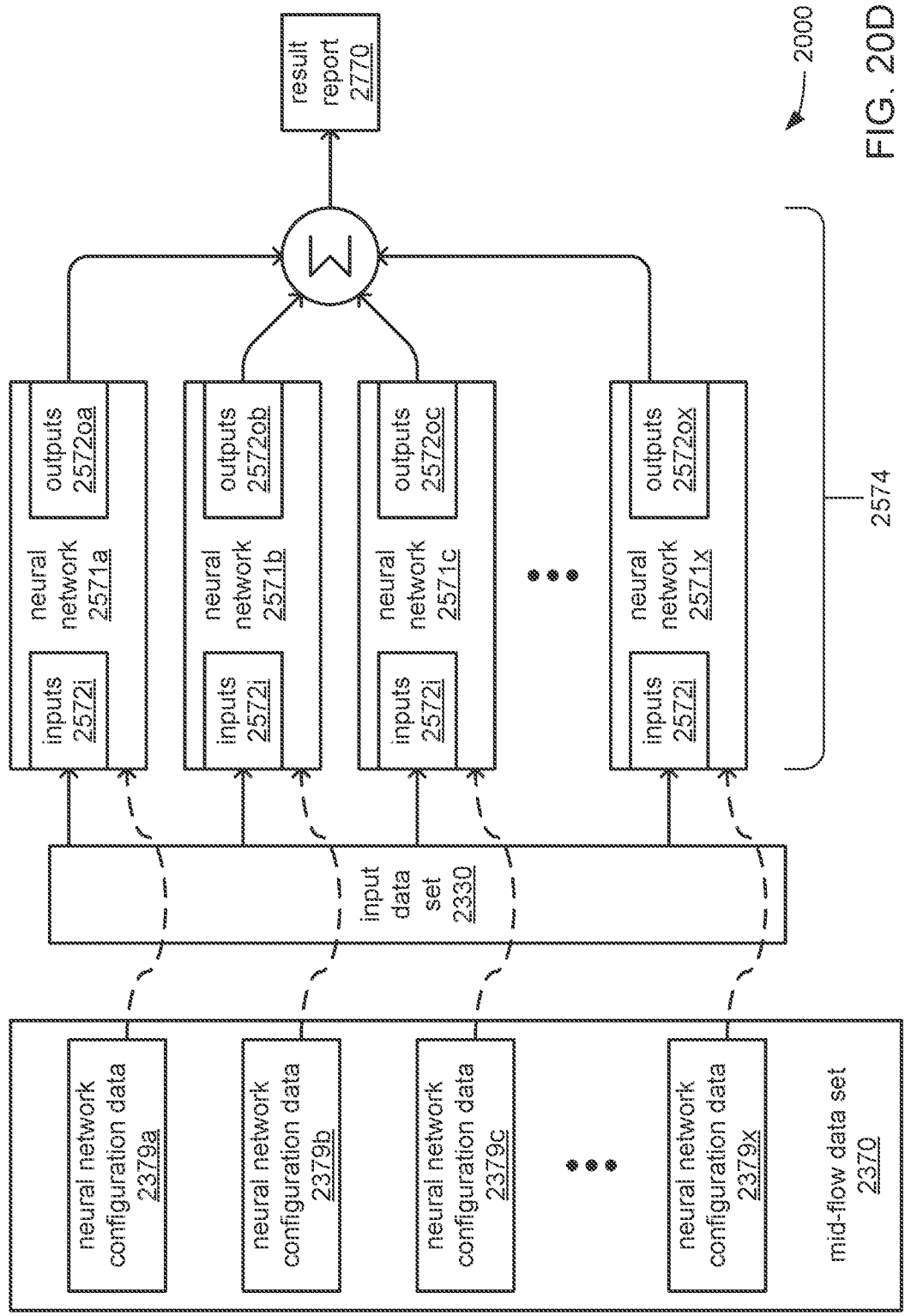

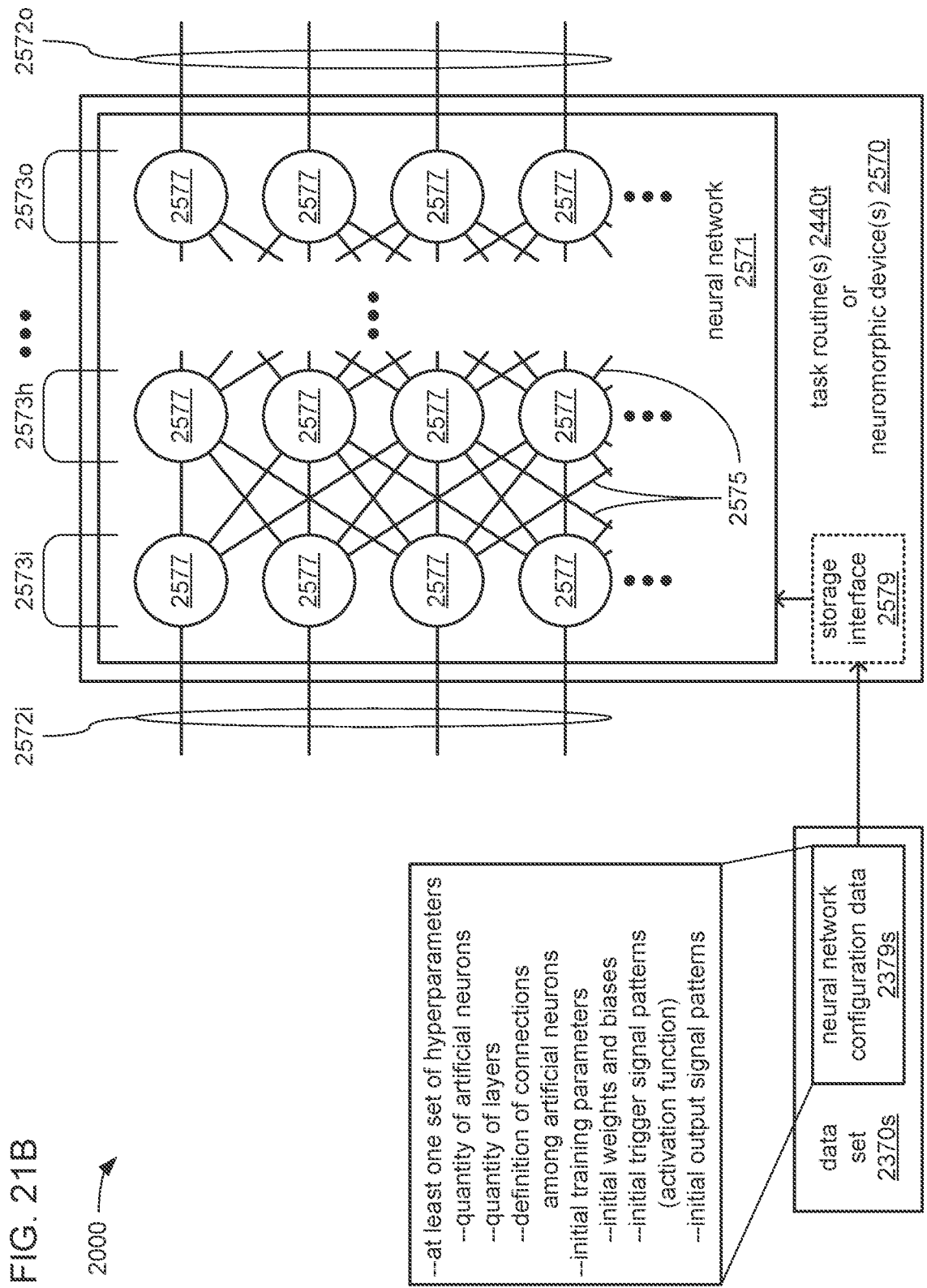

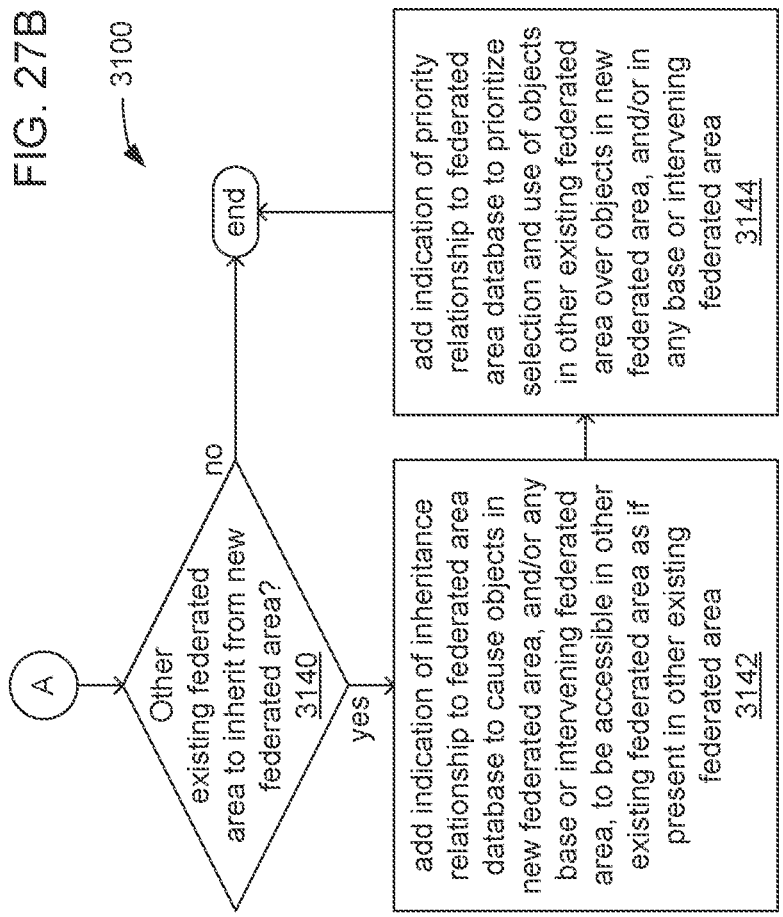

FIG. 28A

3200 start → receive request from other device to store object(s) (e.g., job flow definition(s), DAG(s), data set(s), task routine(s), macro(s), result report(s) and/or instance log(s)) in specified federated area via portal 3210

→ Authorized for specified federated area? 3212
- no → transmit denial of request to source device 3214 → end
- yes → Object(s) include data set(s)? 3220
  - yes → generate and assign a data object identifier for each data set 3222 → store each data set in specified federated area in a manner enabling retrieval using its assigned data set identifier 3224 →
  - no →

→ Object(s) include result report(s)? 3230
- yes → generate and assign a report identifier for each result report 3232 → store each result report in specified federated area in a manner enabling retrieval using its assigned result report identifier 3234 →
- no → goto A

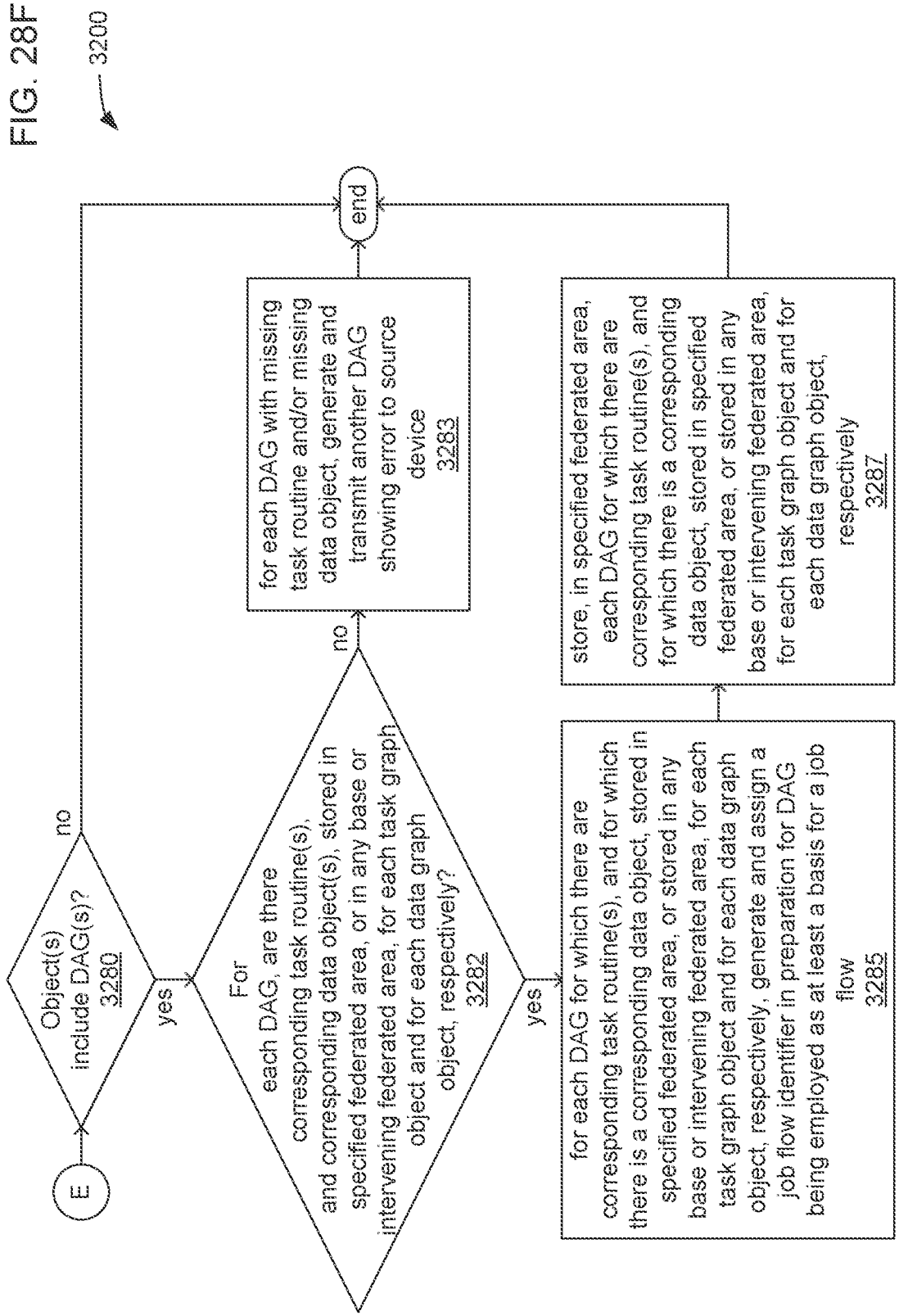

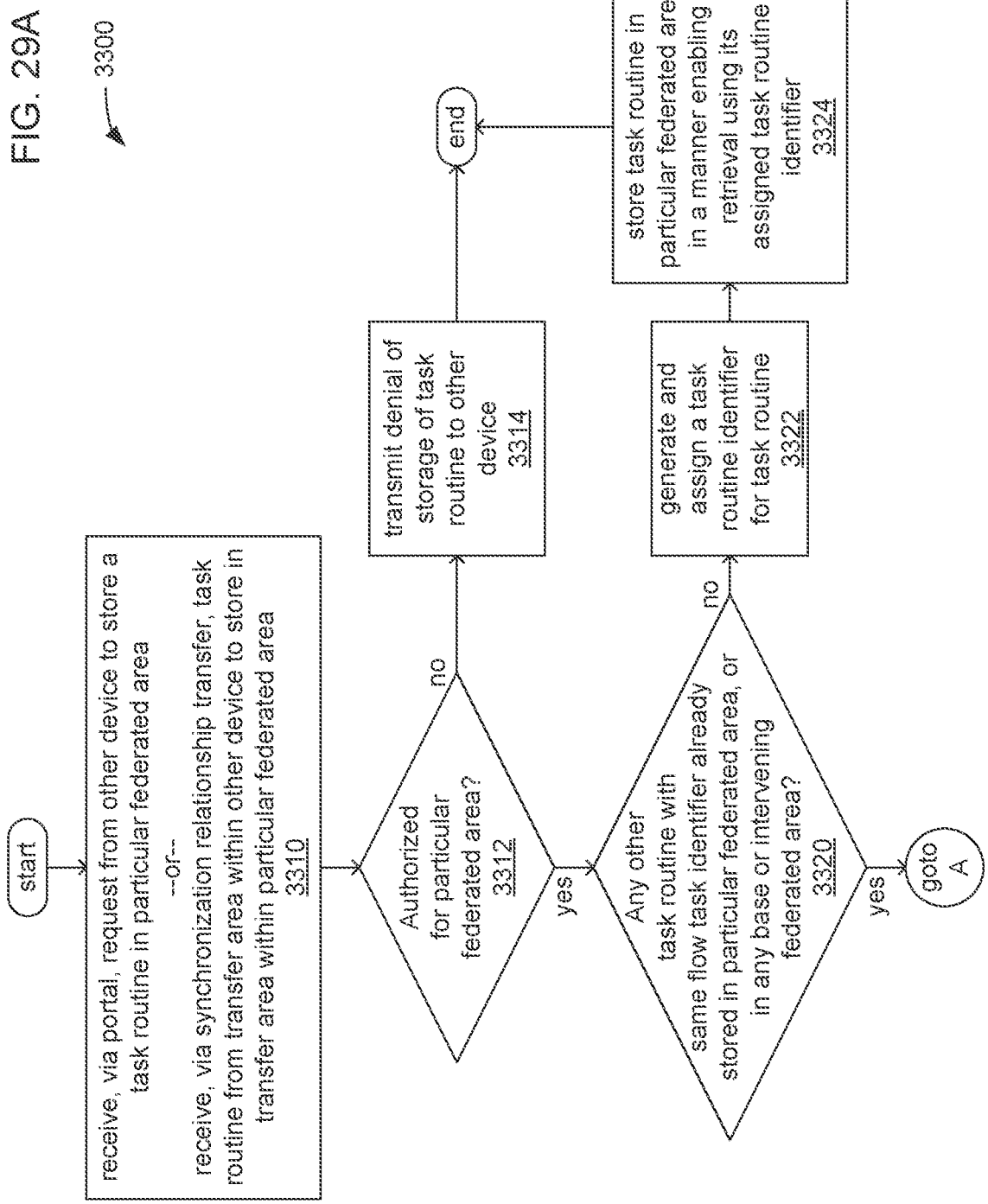

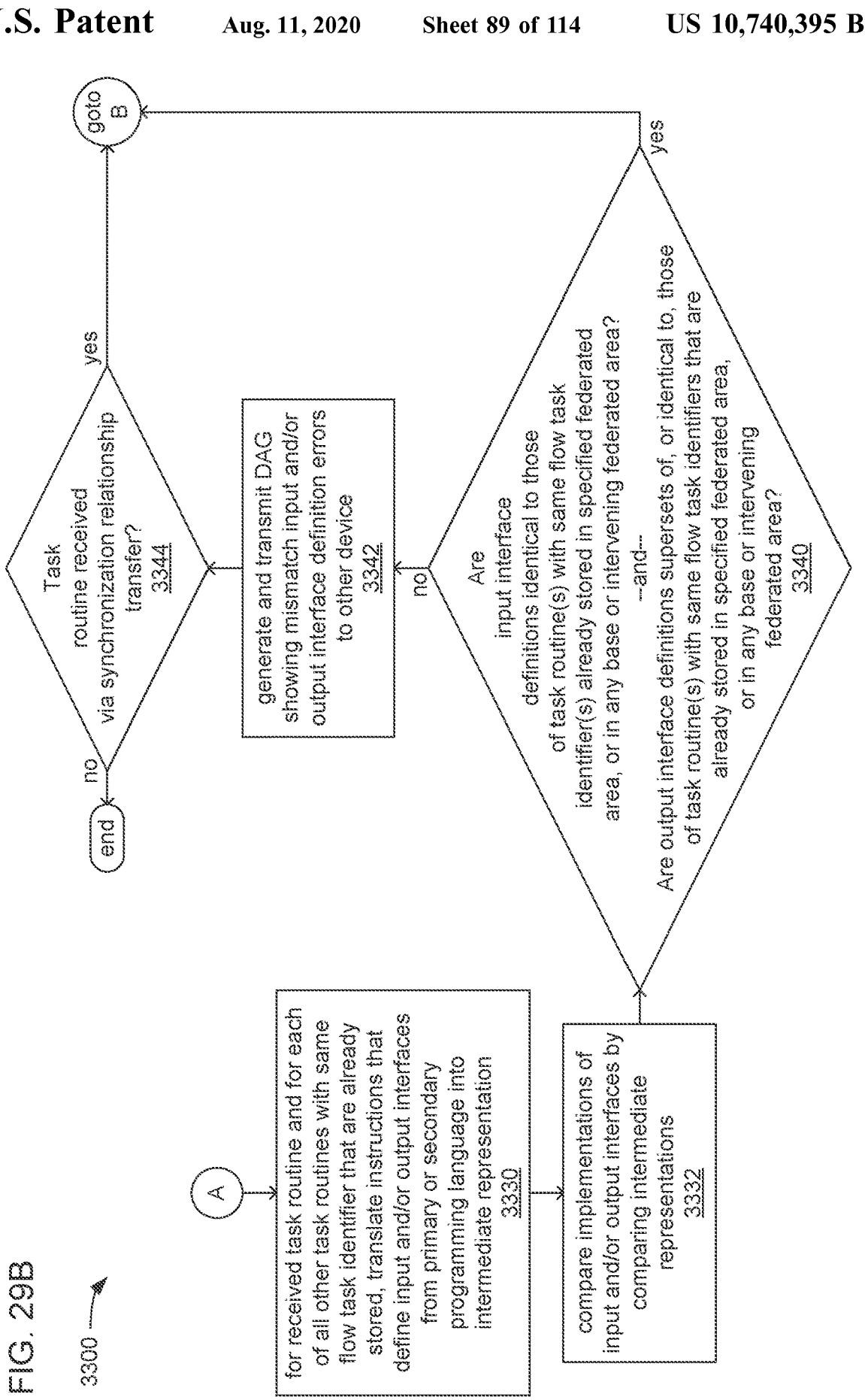

FIG. 29C

 → generate and assign a task routine identifier for task routine 3350 → store task routine in federated area in a manner enabling retrieval using its assigned task routine identifier 3352 → for all task routines with same flow task identifier, store indication of multiple task routines with same flow task identifier (but different task routine identifiers) and indication of which is most recent in specified federated area, and/or any base or intervening federated area 3354 → 

3300

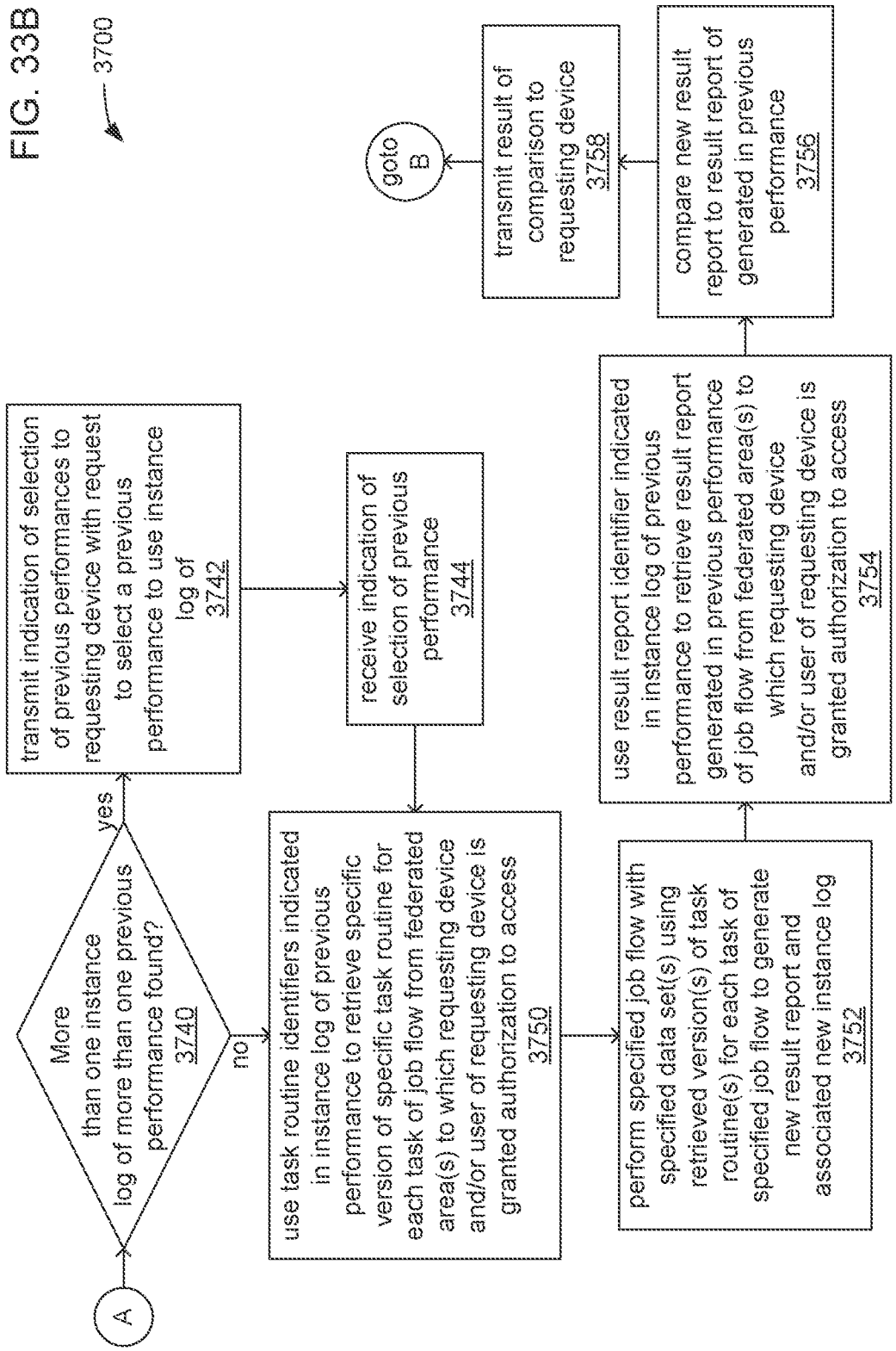

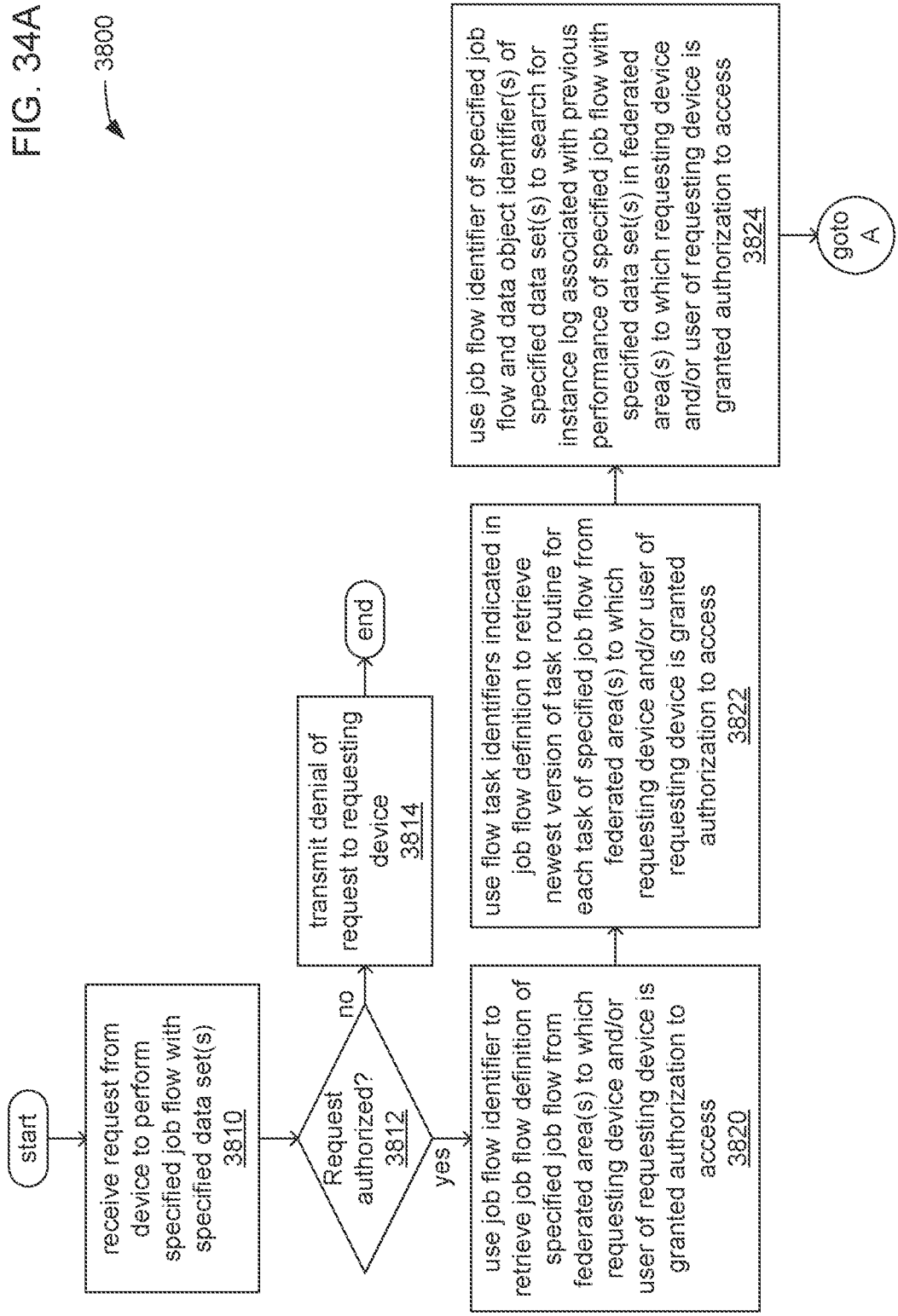

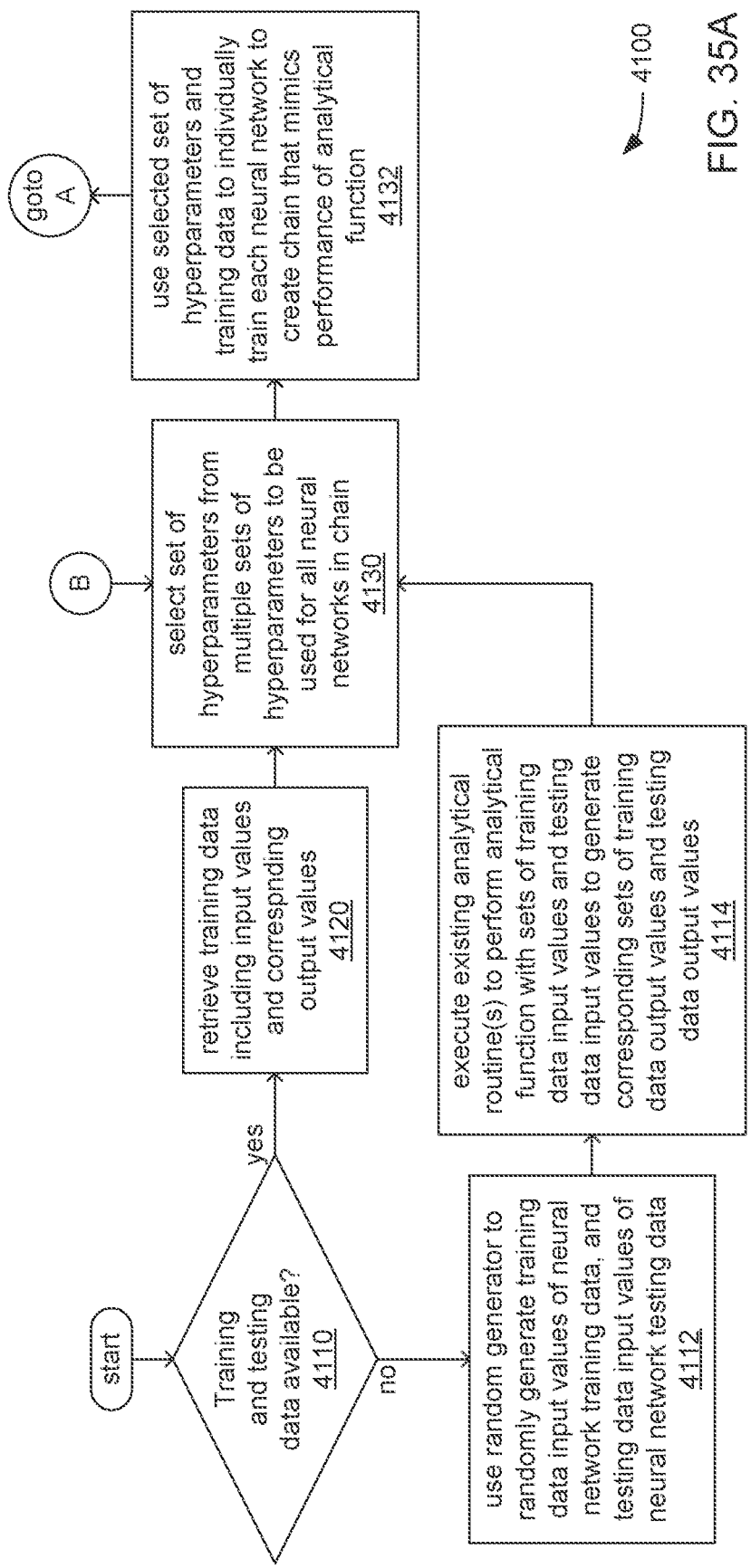

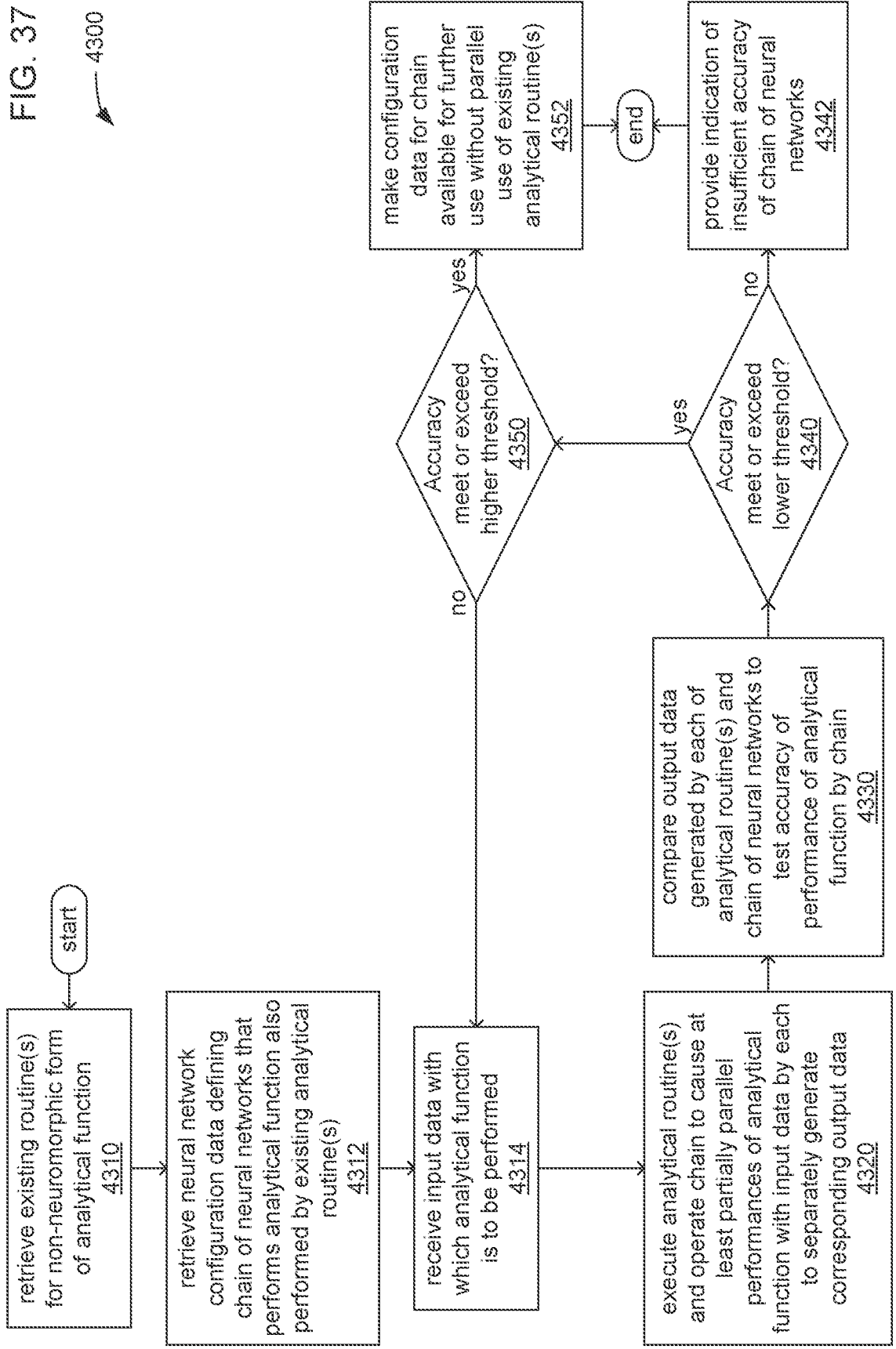

STAGED TRAINING OF NEURAL NETWORKS FOR IMPROVED TIME SERIES PREDICTION PERFORMANCE

CROSS-REFERENCE TO RELATED APPLICATIONS

This application is a continuation of, and claims the benefit of priority under 35 U.S.C. § 120 to, U.S. patent application Ser. No. 16/556,573 filed Aug. 30, 2019; which is a continuation-in-part of, and claims the benefit of priority under 35 U.S.C. § 120 to, U.S. patent application Ser. No. 16/539,222 filed Aug. 13, 2019; which is a continuation of, and claims the benefit of priority under 35 U.S.C. § 120 to, U.S. patent application Ser. No. 16/538,734 filed Aug. 12, 2019; which is a continuation-in-part of, and claims the benefit of priority under 35 U.S.C. § 120 to, U.S. patent application Ser. No. 16/223,518 filed Dec. 18, 2018 (since issues as U.S. Pat. No. 10,380,185); which is a continuation-in-part of, and claims the benefit of priority under 35 U.S.C. § 120 to, U.S. patent application Ser. No. 16/205,424 filed Nov. 30, 2018 (since issued as U.S. Pat. No. 10,346,476); which is a continuation-in-part of, and claims the benefit of priority under 35 U.S.C. § 120 to, U.S. patent application Ser. No. 15/897,723 filed Feb. 15, 2018 (since issued as U.S. Pat. No. 10,331,495); all of which are incorporated herein by reference in their respective entireties for all purposes.

U.S. patent application Ser. No. 16/538,734 is also a continuation-in-part of, and claims the benefit of priority under 35 U.S.C. § 120 to, U.S. patent application Ser. No. 16/236,401 filed Dec. 29, 2018; which is a continuation-in-part of, and claims the benefit of priority under 35 U.S.C. § 120 to, U.S. patent application Ser. No. 16/039,745 filed Jul. 19, 2018 (since issued as U.S. Pat. No. 10,360,069); which is a continuation-in-part of, and claims the benefit of priority under 35 U.S.C. § 120 to, the aforementioned U.S. patent application Ser. No. 15/897,723 filed Feb. 15, 2018; all of which are incorporated herein by reference in their respective entireties for all purposes.

U.S. patent application Ser. No. 15/897,723 is a continuation-in-part of, and claims the benefit of priority under 35 U.S.C. § 120 to, U.S. patent application Ser. No. 15/896,613 filed Feb. 14, 2018 (since issued as U.S. Pat. No. 10,002,029); which is a continuation-in-part of, and claims the benefit of priority under 35 U.S.C. § 120 to, U.S. patent application Ser. No. 15/851,869 filed Dec. 22, 2017 (since issued as U.S. Pat. No. 10,078,710); which is a continuation of, and claims the benefit of priority under 35 U.S.C. § 120 to, U.S. patent application Ser. No. 15/613,516 filed Jun. 5, 2017 (since issued as U.S. Pat. No. 9,852,013); which is a continuation of, and claims the benefit of priority under 35 U.S.C. § 120 to, U.S. patent application Ser. No. 15/425,886 filed Feb. 6, 2017 (since issued as U.S. Pat. No. 9,684,544); which is a continuation of, and claims the benefit of priority under 35 U.S.C. § 120 to, U.S. patent application Ser. No. 15/425,749 also filed on Feb. 6, 2017 (since issued as U.S. Pat. No. 9,684,543); all of which are incorporated herein by reference in their respective entireties for all purposes.

U.S. patent application Ser. No. 16/539,222 also claims the benefit of priority under 35 U.S.C. § 119(e) to U.S. Provisional Application Ser. No. 62/725,186 filed Aug. 30, 2018, which is incorporated herein by reference in its entirety for all purposes. U.S. patent application Ser. No. 16/538,734 also claims the benefit of priority under 35 U.S.C. § 119(e) to U.S. Provisional Application Ser. No. 62/717,873 filed Aug. 12, 2018, and to U.S. Provisional Application Ser. No. 62/801,173 filed Feb. 5, 2019, both of which are incorporated herein by reference in their respective entireties for all purposes.

U.S. patent application Ser. No. 16/223,518 also claims the benefit of priority under 35 U.S.C. § 119(e) to U.S. Provisional Application Ser. No. 62/654,643 filed Apr. 9, 2018, which is incorporated herein by reference in its entirety for all purposes. U.S. patent application Ser. No. 16/205,424 also claims the benefit of priority under 35 U.S.C. § 119(e) to U.S. Provisional Application Ser. No. 62/631,462 filed Feb. 15, 2018, which is incorporated herein by reference in its entirety for all purposes.

U.S. patent application Ser. No. 16/236,401 also claims the benefit of priority under 35 U.S.C. § 119(e) to U.S. Provisional Application Ser. No. 62/689,040 filed Jun. 22, 2018, which is incorporated herein by reference in its entirety for all purposes. U.S. patent application Ser. No. 16/039,745 also claims the benefit of priority under 35 U.S.C. § 119(e) to U.S. Provisional Application Ser. No. 62/534,678 filed Jul. 19, 2017, and to U.S. Provisional Application Ser. No. 62/560,506 filed Sep. 19, 2017, both of which are incorporated herein by reference in their respective entireties for all purposes.

U.S. patent application Ser. No. 15/896,613 also claims the benefit of priority under 35 U.S.C. § 119(e) to U.S. Provisional Application Ser. No. 62/460,000 filed Feb. 16, 2017, which is incorporated herein by reference in its entirety for all purposes. U.S. patent application Ser. No. 15/425,749 also claims the benefit of priority under 35 U.S.C. § 119(e) to U.S. Provisional Application Ser. No. 62/292,078 filed Feb. 5, 2016, and to U.S. Provisional Application Ser. No. 62/297,454 filed Feb. 19, 2016, both of which are incorporated herein by reference in their respective entireties for all purposes.

BACKGROUND

Distributed development and execution of task routines using pooled task routines with pooled data has advanced to an extent that the addition of mechanisms for organization of development and to provide oversight for reproducibility and accountability have become increasingly desired. In various scientific, technical and other areas, the quantities of data employed in performing analysis tasks have become ever larger, thereby making desirable the pooling of data objects to enable collaboration, share costs and/or improve access. Also, such large quantities of data, by virtue of the amount and detail of the information they contain, have become of such value that it has become desirable to find as many uses as possible for such data in peer reviewing and in as wide a variety of analysis tasks as possible. Thus, the pooling of components of analysis routines to enable reuse, oversight and error checking has also become desirable.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes a processor and a storage to store instructions that, when executed by the processor, cause the processor to perform operations including train, using initial neural network configuration data comprising neural network hyperparameters, a first neural network of a chain of neural networks to generate first neural network configuration data comprising the hyperparameters and first trained parameters learned by the first neural network, wherein: the chain is to perform an analytical function to generate a set of output data values from a set of input data values; the chain comprises a set of neural networks that includes at least the first neural network and a last neural network; the set of neural networks is ordered to form the chain starting with the first neural network at a head of the chain and ending with the last neural network at a tail of the chain; each neural network in the chain comprises external inputs to receive the set of input data values; each neural network in the chain comprises outputs at which the neural network outputs a portion of the set of output data values from the set input data values during operation of the chain to perform the analytical function; and the set of neural networks is interconnected within the chain such that each neural network in the chain, except the first neural network at the head of the chain, receives the outputs of a preceding neural network in the ordering of neural networks within the chain as additional inputs. The processor is also caused to perform operations including: train, using the first neural network configuration data, a next neural network in the ordering of neural networks within the chain to generate a next neural network configuration data comprising the hyperparameters and next trained parameters learned by the next neural network; use at least the first neural network configuration data, the next neural network configuration data, and additional data comprising an indication of interconnections among the neural networks within the chain to instantiate the chain of neural networks; and operate the chain of neural networks to perform the analytical function.

The analytical function may include the generation of a time series prediction that covers a selected full range of time; the full range of time may be divided into multiple subranges of time; the outputs of each neural network of the chain may provide the output data values of a portion of the time series prediction that covers one of the multiple subranges of time; and the subranges may be temporally ordered to follow the order of neural networks within the chain wherein the outputs of the first neural network at the head of the chain cover the temporally earliest subrange of time, and the outputs of the last neural network at the tail of the chain cover the temporally latest subrange of time.

The processor may be caused to perform operations including train each neural network in the chain using neural network training data comprising sets of input values and corresponding sets of output values generated through performances of the analytical function using non-neuromorphic processing. The processor may also be caused to perform operations including train each neural network in the chain via backpropagation wherein: sets of input values of the neural network training data are provided to the external inputs; portions of corresponding sets of output values of the neural network training data are provided to the outputs; the portions of the corresponding sets of output values of the neural network training data that are provided to the outputs are selected to correspond to the portion of a set of output values to be output by the neural network during operation of the chain to perform the analytical function; for each neural network in the chain other than the first neural network at the head of the chain, the preceding neural network is operated to perform a portion of the analytical function, and the outputs of the preceding neural network are provided to additional inputs; and a null input value is provided to each one of the additional inputs that does not receive an output of another neural network of the set of neural networks.

The processor may be caused to perform operations including: analyze the neural network training data to identify a portion of the output data values across the sets of output values of the neural network training data that shows a relatively high degree of correlation; and derive a manner of dividing the outputs of the chain into multiple portions that are each output by one of the of the neural networks in chain based, at least in part, on the identified portion that shows the relatively high degree of correlation.

The hyperparameters may specify at least a quantity of artificial neurons within each neural network of the set of neural networks and a quantity of layers of artificial neurons within each neural network of the set of neural networks; the quantity of layers may include an input layer of artificial neurons connected to the external inputs and the additional inputs; the quantity of layers may include an output layer of artificial neurons connected to the outputs; and each neural network of the set of neural networks may include the same quantities of external inputs, additional inputs and outputs.

The chain may include a type of chain selected from a group consisting of: 1) a single-link chain, wherein each neural network in the chain, except the first neural network at the head of the chain, receives the outputs of the immediately preceding neural network in the ordering of neural networks within the chain, and the quantity of additional inputs is selected to enable each neural network, except the first neural network at the head of the chain, to receive all of the outputs of the immediately preceding neural network at its additional inputs; and 2) a multi-link chain, wherein each neural network in the chain, except the first neural network at the head of the chain, receives the outputs of all of the preceding neural networks in the ordering of neural networks within the chain, and the quantity of additional inputs is selected to enable the last neural network to receive all of the outputs of all of the other neural networks in the chain.

The trained parameters of the first neural network configuration data may include weights and biases that represent what was learned by the first neural network during training; and the processor may be caused to train the set of neural networks sequentially in an order that follows the ordering of neural networks in the chain from the first neural network at the head of the chain to the last neural network at the tail of the chain.

The apparatus may include a plurality of neuromorphic devices communicatively coupled to the processor, wherein the processor may be caused to perform operations including derive the portion of the set of output values that are output by each neural network from the set of input data values during operation of the chain to perform the analytical function based on at least one of: a quantity of artificial neurons within each neuromorphic device of the plurality of neuromorphic devices; a maximum quantity of layers that each neuromorphic device of the plurality of neuromorphic devices is able to support; a maximum quantity of inputs that each neuromorphic device of the plurality of neuromorphic devices is able to support; or a maximum quantity of outputs that each neuromorphic device of the plurality of neuromorphic devices is able to support. The processor may also be caused to perform operations including: provide the first neural network configuration data to at least a first neuromorphic device of the plurality of neuromorphic devices to instantiate the first neural network; provide the next neural network configuration data to at least a second neuromorphic device of the plurality of neuromorphic devices to instantiate the second neural network; and provide a last neural network configuration data to at least a third neuromorphic device of the plurality of neuromorphic devices to instantiate the last neural network.

The processor may be caused to perform operations including perform a training job flow at least partially within a training federated area to perform the training of each neural network in the chain of neural networks wherein: the training federated area is one of multiple federated areas within a hierarchy of federated areas; and the multiple federated areas are maintained within at least one storage device to store job flow definitions for the training job flow and a testing job flow, task routines executable to perform tasks of each job flow, and data objects for use as inputs to job flows and generated as outputs of performances of job flow. The processor may also be caused to perform operations including monitor the training of each neural network in the chain to determine whether a condition is met to transfer a set of instances of neural network configuration data generated by the training to the testing federated area, wherein the set of instances of neural network configuration data comprises the first neural network configuration data and the next neural network configuration data. The processor may, in response to the condition being met, further be caused to perform operations including: store the set of instances of neural network configuration data as a single data object within the training federated area; and transfer a copy of the single data object to the testing federated area to enable the testing job flow to be at least partially performed within the testing federated area to test the chain to determine whether the chain performs the analytical function with a degree of accuracy that meets at least a predetermined threshold of accuracy.

The processor may be caused to perform operations including monitor for a transfer of an object to the training federated area from the testing federated area indicative of failure of the chain to perform the analytical function with a degree of accuracy that meets at least the predetermined threshold of accuracy. The processor may, in response to the transfer of the object indicative of the failure from the testing federated area to the training federated area, also be caused to perform operations including: derive a new chain of neural networks to perform the analytical function by changing at least one of a quantity of neural networks within the set of neural networks, the division of the set of output values into portions to be output by each neural network of the set of neural networks from the set of input values during operation of the new chain to perform the analytical function, or the interconnections among the neural networks within the new chain; train each of the neural networks in the new chain to generate a new set of instances of neural network configuration data; and monitor the training of each neural network in the new chain to determine whether the condition is met to transfer the new set of instances of neural network configuration data to the testing federated area. The processor may, in response to the transfer of the object indicative of the failure from the testing federated area to the training federated area, and in response to the condition being met, further be caused to perform operations including: store the new set of instances of neural network configuration data as a new single data object within the training federated area; and transfer a copy of the new single data object to the testing federated area to enable the testing job flow to be at least partially performed within the testing federated area to test the new chain to determine whether the new chain performs the analytical function with a degree of accuracy that meets at least the predetermined threshold of accuracy.

A computer-program product tangibly embodied in a non-transitory machine-readable storage medium includes instructions operable to cause a processor to perform operations including train, using initial neural network configuration data comprising neural network hyperparameters, a first neural network of a chain of neural networks to generate first neural network configuration data comprising the hyperparameters and first trained parameters learned by the first neural network, wherein: the chain is to perform an analytical function to generate a set of output data values from a set of input data values; the chain comprises a set of neural networks that includes at least the first neural network and a last neural network; the set of neural networks is ordered to form the chain starting with the first neural network at a head of the chain and ending with the last neural network at a tail of the chain; each neural network in the chain comprises external inputs to receive the set of input data values; each neural network in the chain comprises outputs at which the neural network outputs a portion of the set of output data values from the set input data values during operation of the chain to perform the analytical function; and the set of neural networks is interconnected within the chain such that each neural network in the chain, except the first neural network at the head of the chain, receives the outputs of a preceding neural network in the ordering of neural networks within the chain as additional inputs. The processor is also caused to perform operations including: train, using the first neural network configuration data, a next neural network in the ordering of neural networks within the chain to generate a next neural network configuration data comprising the hyperparameters and next trained parameters learned by the next neural network; use at least the first neural network configuration data, the next neural network configuration data, and additional data comprising an indication of interconnections among the neural networks within the chain to instantiate the chain of neural networks; and operate the chain of neural networks to perform the analytical function.

The analytical function may include the generation of a time series prediction that covers a selected full range of time; the full range of time may be divided into multiple subranges of time; the outputs of each neural network of the chain may provide the output data values of a portion of the time series prediction that covers one of the multiple subranges of time; and the subranges may be temporally ordered to follow the order of neural networks within the chain wherein the outputs of the first neural network at the head of the chain cover the temporally earliest subrange of time, and the outputs of the last neural network at the tail of the chain cover the temporally latest subrange of time.

The processor may be caused to perform operations including train each neural network in the chain using neural network training data comprising sets of input values and corresponding sets of output values generated through performances of the analytical function using non-neuromorphic processing. The processor may also be caused to perform operations including train each neural network in the chain via backpropagation wherein: sets of input values of the neural network training data are provided to the external inputs; portions of corresponding sets of output values of the neural network training data are provided to the outputs; the portions of the corresponding sets of output values of the neural network training data that are provided to the outputs are selected to correspond to the portion of a set of output values to be output by the neural network during operation of the chain to perform the analytical function; for each neural network in the chain other than the first neural network at the head of the chain, the preceding neural network is operated to perform a portion of the analytical function, and the outputs of the preceding neural network are provided to additional inputs; and a null input value is provided to each one of the additional inputs that does not receive an output of another neural network of the set of neural networks.

The processor may be caused to perform operations including: analyze the neural network training data to identify a portion of the output data values across the sets of output values of the neural network training data that shows a relatively high degree of correlation; and derive a manner of dividing the outputs of the chain into multiple portions that are each output by one of the of the neural networks in chain based, at least in part, on the identified portion that shows the relatively high degree of correlation.

The hyperparameters may specify at least a quantity of artificial neurons within each neural network of the set of neural networks and a quantity of layers of artificial neurons within each neural network of the set of neural networks; the quantity of layers may include an input layer of artificial neurons connected to the external inputs and the additional inputs; the quantity of layers may include an output layer of artificial neurons connected to the outputs; and each neural network of the set of neural networks may include the same quantities of external inputs, additional inputs and outputs.

The chain may include a type of chain selected from a group consisting of: 1) a single-link chain, wherein each neural network in the chain, except the first neural network at the head of the chain, receives the outputs of the immediately preceding neural network in the ordering of neural networks within the chain, and the quantity of additional inputs is selected to enable each neural network, except the first neural network at the head of the chain, to receive all of the outputs of the immediately preceding neural network at its additional inputs; and 2) a multi-link chain, wherein each neural network in the chain, except the first neural network at the head of the chain, receives the outputs of all of the preceding neural networks in the ordering of neural networks within the chain, and the quantity of additional inputs is selected to enable the last neural network to receive all of the outputs of all of the other neural networks in the chain.

The trained parameters of the first neural network configuration data may include weights and biases that represent what was learned by the first neural network during training; and the processor may be caused to train the set of neural networks sequentially in an order that follows the ordering of neural networks in the chain from the first neural network at the head of the chain to the last neural network at the tail of the chain.

The processor may be caused to perform operations including derive the portion of the set of output values that are output by each neural network from the set of input data values during operation of the chain to perform the analytical function based on at least one of: a quantity of artificial neurons within each neuromorphic device of a plurality of neuromorphic devices that may be communicatively coupled to the processor; a maximum quantity of layers that each neuromorphic device of the plurality of neuromorphic devices is able to support; a maximum quantity of inputs that each neuromorphic device of the plurality of neuromorphic devices is able to support; or a maximum quantity of outputs that each neuromorphic device of the plurality of neuromorphic devices is able to support. The processor may also be caused to perform operations including: provide the first neural network configuration data to at least a first neuromorphic device of the plurality of neuromorphic devices to instantiate the first neural network; provide the next neural network configuration data to at least a second neuromorphic device of the plurality of neuromorphic devices to instantiate the second neural network; and provide a last neural network configuration data to at least a third neuromorphic device of the plurality of neuromorphic devices to instantiate the last neural network.

The processor may be caused to perform operations including perform a training job flow at least partially within a training federated area to perform the training of each neural network in the chain of neural networks wherein: the training federated area is one of multiple federated areas within a hierarchy of federated areas; and the multiple federated areas are maintained within at least one storage device to store job flow definitions for the training job flow and a testing job flow, task routines executable to perform tasks of each job flow, and data objects for use as inputs to job flows and generated as outputs of performances of job flow. The processor may also be caused to perform operations including monitor the training of each neural network in the chain to determine whether a condition is met to transfer a set of instances of neural network configuration data generated by the training to the testing federated area, wherein the set of instances of neural network configuration data comprises the first neural network configuration data and the next neural network configuration data. The processor may, in response to the condition being met, further be caused to perform operations including: store the set of instances of neural network configuration data as a single data object within the training federated area; and transfer a copy of the single data object to the testing federated area to enable the testing job flow to be at least partially performed within the testing federated area to test the chain to determine whether the chain performs the analytical function with a degree of accuracy that meets at least a predetermined threshold of accuracy.

The processor may be caused to perform operations including monitor for a transfer of an object to the training federated area from the testing federated area indicative of failure of the chain to perform the analytical function with a degree of accuracy that meets at least the predetermined threshold of accuracy. The processor may, in response to the transfer of the object indicative of the failure from the testing federated area to the training federated area, also be caused to perform operations including: derive a new chain of neural networks to perform the analytical function by changing at least one of a quantity of neural networks within the set of neural networks, the division of the set of output values into portions to be output by each neural network of the set of neural networks from the set of input values during operation of the new chain to perform the analytical function, or the interconnections among the neural networks within the new chain; train each of the neural networks in the new chain to generate a new set of instances of neural network configuration data; and monitor the training of each neural network in the new chain to determine whether the condition is met to transfer the new set of instances of neural network configuration data to the testing federated area. The processor may, in response to the transfer of the object indicative of the failure from the testing federated area to the training federated area, and in response to the condition being met, further be caused to perform operations including: store the new set of instances of neural network configuration data as a new single data object within the training federated area; and transfer a copy of the new single data object to the testing federated area to enable the testing job flow to be at least partially performed within the testing federated area to test the new chain to determine whether the new chain performs the analytical function with a degree of accuracy that meets at least the predetermined threshold of accuracy.

A computer-implemented method includes training, by a processor, and using initial neural network configuration data comprising neural network hyperparameters, a first neural network of a chain of neural networks to generate first neural network configuration data comprising the hyperparameters and first trained parameters learned by the first neural network, wherein: the chain is to perform an analytical function to generate a set of output data values from a set of input data values; the chain comprises a set of neural networks that includes at least the first neural network and a last neural network; the set of neural networks is ordered to form the chain starting with the first neural network at a head of the chain and ending with the last neural network at a tail of the chain; each neural network in the chain comprises external inputs to receive the set of input data values; each neural network in the chain comprises outputs at which the neural network outputs a portion of the set of output data values from the set input data values during operation of the chain to perform the analytical function; and the set of neural networks is interconnected within the chain such that each neural network in the chain, except the first neural network at the head of the chain, receives the outputs of a preceding neural network in the ordering of neural networks within the chain as additional inputs. The method also includes: training, by the processor, and using the first neural network configuration data, a next neural network in the ordering of neural networks within the chain to generate a next neural network configuration data comprising the hyperparameters and next trained parameters learned by the next neural network; using at least the first neural network configuration data, the next neural network configuration data, and additional data comprising an indication of interconnections among the neural networks within the chain to instantiate the chain of neural networks; and operating the chain of neural networks to perform the analytical function.

The analytical function may include the generation of a time series prediction that covers a selected full range of time; the full range of time may be divided into multiple subranges of time; the outputs of each neural network of the chain may provide the output data values of a portion of the time series prediction that covers one of the multiple subranges of time; and the subranges may be temporally ordered to follow the order of neural networks within the chain wherein the outputs of the first neural network at the head of the chain cover the temporally earliest subrange of time, and the outputs of the last neural network at the tail of the chain cover the temporally latest subrange of time.

The method may include training, by the processor, each neural network in the chain using neural network training data comprising sets of input values and corresponding sets of output values generated through performances of the analytical function using non-neuromorphic processing. The method may also include training, by the processor, each neural network in the chain via backpropagation wherein: sets of input values of the neural network training data are provided to the external inputs; portions of corresponding sets of output values of the neural network training data are provided to the outputs; the portions of the corresponding sets of output values of the neural network training data that are provided to the outputs are selected to correspond to the portion of a set of output values to be output by the neural network during operation of the chain to perform the analytical function; for each neural network in the chain other than the first neural network at the head of the chain, the preceding neural network is operated to perform a portion of the analytical function, and the outputs of the preceding neural network are provided to additional inputs; and a null input value is provided to each one of the additional inputs that does not receive an output of another neural network of the set of neural networks.

The method may include: analyzing, by the processor, the neural network training data to identify a portion of the output data values across the sets of output values of the neural network training data that shows a relatively high degree of correlation; and deriving, by the processor, a manner of dividing the outputs of the chain into multiple portions that are each output by one of the of the neural networks in chain based, at least in part, on the identified portion that shows the relatively high degree of correlation.

The hyperparameters may specify at least a quantity of artificial neurons within each neural network of the set of neural networks and a quantity of layers of artificial neurons within each neural network of the set of neural networks; the quantity of layers may include an input layer of artificial neurons connected to the external inputs and the additional inputs; the quantity of layers may include an output layer of artificial neurons connected to the outputs; and each neural network of the set of neural networks may include the same quantities of external inputs, additional inputs and outputs.

The chain may include a type of chain selected from a group consisting of: 1) a single-link chain, wherein each neural network in the chain, except the first neural network at the head of the chain, receives the outputs of the immediately preceding neural network in the ordering of neural networks within the chain, and the quantity of additional inputs is selected to enable each neural network, except the first neural network at the head of the chain, to receive all of the outputs of the immediately preceding neural network at its additional inputs; and 2) a multi-link chain, wherein each neural network in the chain, except the first neural network at the head of the chain, receives the outputs of all of the preceding neural networks in the ordering of neural networks within the chain, and the quantity of additional inputs is selected to enable the last neural network to receive all of the outputs of all of the other neural networks in the chain.

The trained parameters of the first neural network configuration data may include weights and biases that represent what was learned by the first neural network during training, and the method may include training, by the processor, the set of neural networks sequentially in an order that follows the ordering of neural networks in the chain from the first neural network at the head of the chain to the last neural network at the tail of the chain.

The method may include deriving, by the processor, the portion of the set of output values that are output by each neural network from the set of input data values during operation of the chain to perform the analytical function based on at least one of: a quantity of artificial neurons within each neuromorphic device of a plurality of neuromorphic devices communicatively coupled to the processor; a maximum quantity of layers that each neuromorphic device of the plurality of neuromorphic devices is able to support; a maximum quantity of inputs that each neuromorphic device of the plurality of neuromorphic devices is able to support; or a maximum quantity of outputs that each neuromorphic device of the plurality of neuromorphic devices is able to support. The method may also include:

providing, by the processor, the first neural network configuration data to at least a first neuromorphic device of the plurality of neuromorphic devices to instantiate the first neural network; providing, by the processor, the next neural network configuration data to at least a second neuromorphic device of the plurality of neuromorphic devices to instantiate the second neural network; and providing, by the processor, a last neural network configuration data to at least a third neuromorphic device of the plurality of neuromorphic devices to instantiate the last neural network.

The method may include performing, by the processor, a training job flow at least partially within a training federated area to perform the training of each neural network in the chain of neural networks, wherein: the training federated area is one of multiple federated areas within a hierarchy of federated areas; and the multiple federated areas are maintained within at least one storage device to store job flow definitions for the training job flow and a testing job flow, task routines executable to perform tasks of each job flow, and data objects for use as inputs to job flows and generated as outputs of performances of job flows. The method may also include monitoring, by the processor, the training of each neural network in the chain to determine whether a condition is met to transfer a set of instances of neural network configuration data generated by the training to the testing federated area, wherein the set of instances of neural network configuration data comprises the first neural network configuration data and the next neural network configuration data. The method may further include, in response to the condition being met, performing operations including: storing the set of instances of neural network configuration data as a single data object within the training federated area; and transferring, by the processor, a copy of the single data object to the testing federated area to enable the testing job flow to be at least partially performed within the testing federated area to test the chain to determine whether the chain performs the analytical function with a degree of accuracy that meets at least a predetermined threshold of accuracy.

The method may include monitoring, by the processor, for a transfer of an object to the training federated area from the testing federated area indicative of failure of the chain to perform the analytical function with a degree of accuracy that meets at least the predetermined threshold of accuracy. The method may also include, in response to the transfer of the object indicative of the failure from the testing federated area to the training federated area, performing operations comprising: deriving, by the processor, a new chain of neural networks to perform the analytical function by changing at least one of a quantity of neural networks within the set of neural networks, the division of the set of output values into portions to be output by each neural network of the set of neural networks from the set of input values during operation of the new chain to perform the analytical function, or the interconnections among the neural networks within the new chain; training, by the processor, each of the neural networks in the new chain to generate a new set of instances of neural network configuration data; and monitoring, by the processor, the training of each neural network in the new chain to determine whether the condition is met to transfer the new set of instances of neural network configuration data to the testing federated area. The method may further include, in response to the transfer of the object indicative of the failure from the testing federated area to the training federated area, and in response to the condition being met, performing operations including: storing the new set of instances of neural network configuration data as a new single data object within the training federated area; and transferring, by the processor, a copy of the new single data object to the testing federated area to enable the testing job flow to be at least partially performed within the testing federated area to test the new chain to determine whether the new chain performs the analytical function with a degree of accuracy that meets at least the predetermined threshold of accuracy.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 19A, 19B, 19C, 19D and 19E, together, illustrate aspects of the generation and use of a DAG.

FIGS. 20A, 20B, 20C, 20D, 20E and 20F, together, illustrate an example transition from non-neuromorphic processing to neuromorphic processing to perform an analytical function.

FIGS. 21A, 21B and 21C, together, illustrate an example of training a neural network to perform an analytical function as part of a transition to neuromorphic processing.

FIGS. 27A and 27B, together, illustrate an example embodiment of a logic flow of a federated device adding a requested federated area related to one or more other federated areas.

FIGS. 28A, 28B, 28C, 28D, 28E and 28F, together, illustrate an example embodiment of a logic flow of a federated device storing objects in a federated area.

FIGS. 29A, 29B and 29C, together, illustrate another example embodiment of a logic flow of a federated device storing objects in a federated area FIGS. 30A, 30B and 30C, together, illustrate still another example embodiment of a logic flow of a federated device storing objects in a federated area.

FIGS. 33A and 33B, together, illustrate another example embodiment of a logic flow of a federated device repeating an earlier performance of a job flow.

FIGS. 34A, 34B, 34C and 34D, together, illustrate an example embodiment of a logic flow of a federated device performing a job flow.

FIGS. 35A and 35B, together, illustrate an example embodiment of a logic flow of training neural networks of a chain of neural networks.

FIG. 37 illustrates an example embodiment of a logic flow of testing a chain of neural networks.

DETAILED DESCRIPTION

Figure 1:
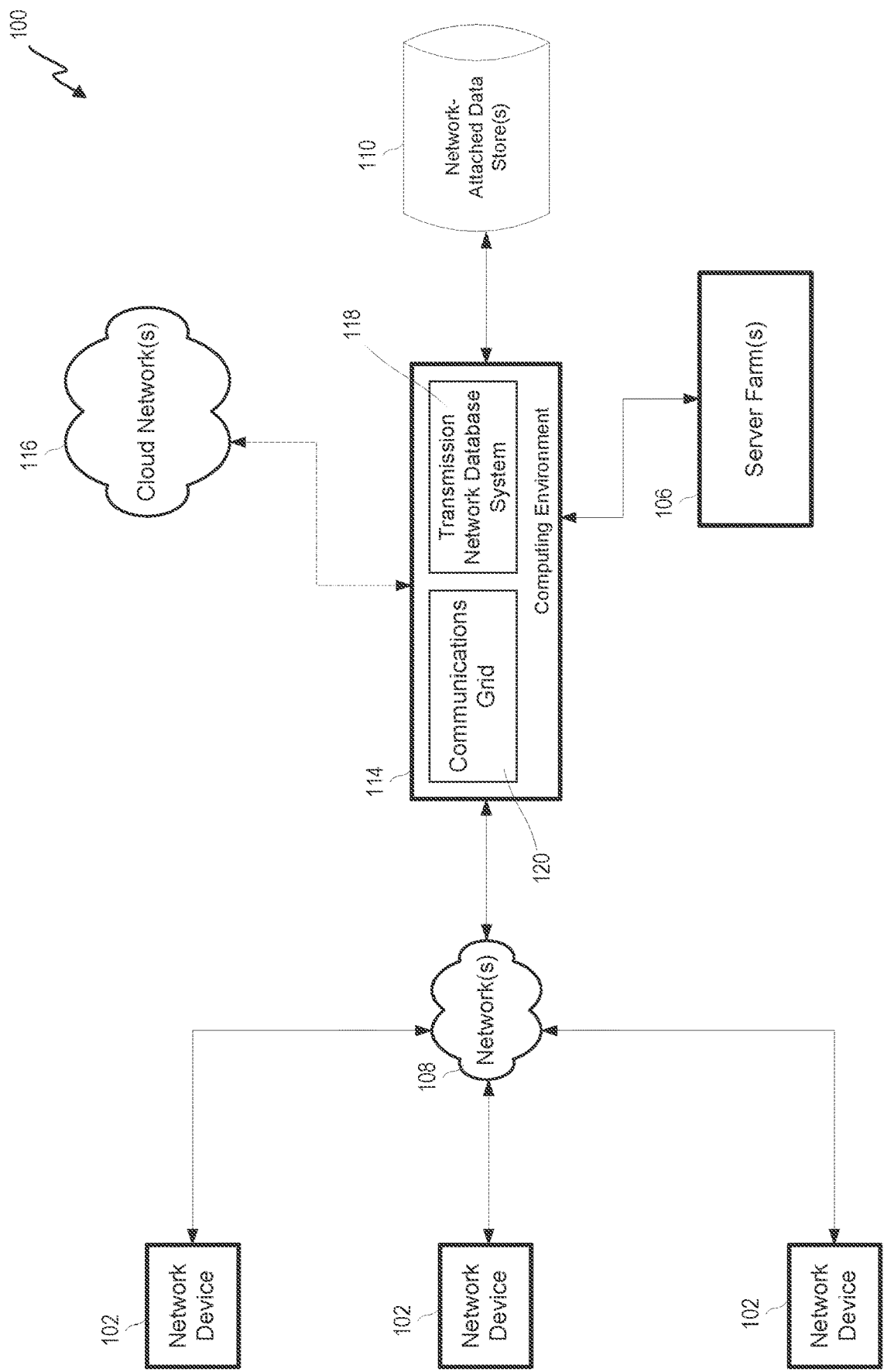
FIG. 1 illustrates a block diagram that provides an illustration of the hardware components of a computing system, according to some embodiments of the present technology.

Various embodiments described herein are generally directed to techniques for training, testing and using an ensemble of neural networks organized into a neural network chain to generate time series predictions. Various embodiments described herein are also generally directed to performing such development of such a neural network chain in a collaboration among multiple developers having access to different portions of a set of federated areas with the assistance of an automated transfer relationship among two or more of such federated areas. To reduce the size of the decision space that must be covered in making time series predictions using neuromorphic processing, an ensemble of smaller neural networks interconnected to form a chain may be used in place of a single larger neural network. All of the neural networks in the chain may receive the full set of external inputs upon which the time series prediction is to be based. The overall range of time that is selected to be covered by the time series prediction may be broken up into multiple subranges of time, and the outputs of each of the neural networks may provide a portion of the time series prediction that covers a different one of those subranges. The ordering of the neural networks into a chain may be such that outputs of the neural network at the head of the chain cover the temporally earliest subrange of time within the overall range of time, and the outputs of each succeeding neural network then cover the next subrange of time in temporal order, with the outputs of the neural network at the tail of the chain covering the temporally latest subrange. Additionally, as part of being organized into a neural network chain, each neural network (except the neural network at the head of the chain) may receive the outputs of all of the preceding neural networks in the chain as inputs in addition to the full set of external inputs. As a result, each neural network (except the neural network at the head of the chain) may receive portion(s) of the time series prediction that cover the temporally earlier subranges of time as inputs to use in making a prediction covering the next latest subrange of time.

To reduce the amount of time required to train the neural networks, the neural networks may be trained sequentially, rather than in parallel, starting with the neural network at the head of the chain. After completion of the training of the neural network at the head of the chain, neural network configuration data that includes the trained parameters generated by the training of that neural network may be used as the starting point for the training of the second neural network in the chain. In training the second neural network, the outputs of the neural network at the head of the chain become part of the training inputs to the second next neural network. After completion of the training of the second neural network, neural network configuration data that includes the trained parameters generated by the training of the second neural network may be used as the starting point for the training of the third neural network in the chain. In training the third neural network, the outputs of the neural network at the head of the chain and of the second neural network in the chain become part of the training inputs to the third next neural network. Such sequential training continues through the neural networks in the chain until the neural network at the tail of the chain is trained. In this way, a form of transferred learning is used in which what has been learned by each neural network in the chain is used in the training of the next neural network in the chain to reduce the amount of time required to train that next neural network.

Additionally, following such sequential training of neural networks of the chain, the neural network configuration data for each of the neural networks may be automatically transferred from a training federated area in which job flow(s) associated with the training may be performed and to which developer(s) involved in such training have access to a testing federated area in which job flow(s) associated with testing the resulting neural network chain may be performed and to which developer(s) involved in such testing have access. The progress of such testing may be monitored to determine whether conditions have been met to deem the neural network chain to be successful in generating time series predictions with a prerequisite degree of accuracy and/or whether conditions have been met to deem the neural network chain to be a failure at generating time series predictions. In response to being deemed successful, the neural network configuration data for each of the neural networks may be automatically transferred to a usage federated area in which job flow(s) associated with actual usage of the resulting neural network chain may be performed to begin using it. Alternatively, in response to being deemed a failure, an indication of such failure (e.g., a data object descriptive of aspects of the failure) may be automatically transferred back to the training federated area for use as an input into training the neural networks of another neural network chain.

The storage of objects (e.g., data objects, task routines, macros of task routines, job flow definitions, instance logs of past performances of job flows, and/or DAGs of task routines and/or job flows) may be effected using a grid of storage devices that are coupled to and/or incorporated into one or more federated devices. The grid of storage devices may provide distributed storage for data objects that include large data sets, complex sets of task routines for the performance of various analyses divided into tasks specified in job flows, and/or instance logs that document an extensive history of past performances of such analyses. Such distributed storage may be used to provide one or both of fault tolerance and/or faster access through the use of parallelism. In various embodiments, the objects stored within a federated area or a set of federated areas may be organized in any of a variety of ways that may employ any of a variety of indexing systems to enable access. By way of example, one or more databases may be defined by the one or more federated devices to improve efficiency in accessing data objects, task routines and/or instance logs of performances of analyses.

The one or more federated devices may define at least some of the storage space provided by the storage device grid as providing federated area(s) in which the objects are stored and to which access is controlled by the one or more federated devices (or one or more other devices separately providing access control). By way of example, access to a federated area may be limited to one or more particular authorized persons and/or one or more particular authorized entities (e.g., scholastic entities, governmental entities, business entities, etc.). Alternatively or additionally, access to a federated area may be limited to one or more particular authorized devices that may be operated under the control of one or more particular persons and/or entities.

In various embodiments, the manner in which a federated area is used may be limited to the storage and retrieval of objects with controlled access, while in other embodiments, the manner in which a federated area is used may additionally include the performances of analyses as job flows using the objects stored therein. In support of enabling at least the storage of objects within one or more federated areas, the one or more federated devices may provide a portal accessible to other devices via a network for use in storing and retrieving objects associated with the performances of analyses by other devices. More specifically, one or more source devices may access the portal through the network to provide the one or more federated devices with the data objects, task routines, job flow definitions, DAGs and/or instance logs associated with completed performances of analyses by the one or more source devices for storage within one or more federated areas for the purpose of memorializing the details of those performances. Subsequently, one or more reviewing devices may access the portal through the network to retrieve such objects from one or more federated area through the one or more federated devices for the purpose of independently confirming aspects of such the performances.

As an alternative to or in addition to the provision of such a portal, the one or more federated devices may be caused to repeatedly synchronize the contents of a selected federated area with an external storage space maintained by another device in a bidirectional manner, such as another source code repository system (e.g., GitHub™). More specifically, as object(s) within the external storage space of the other device are changed in any of a number of ways (e.g., added, edited, deleted, etc.), corresponding changes may be automatically made to corresponding objects maintained within the federated area to synchronize the contents therebetween. Similarly, as object(s) within the federated area are changed in any of a number of ways, corresponding changes may be automatically made to corresponding objects maintained within the external storage space of the other device, again, to synchronize the contents therebetween.

Among the objects that may be stored in a federated area may be numerous data objects that may include data sets. Each data set may be made up of any of a variety of types of data concerning any of a wide variety of subjects. By way of example, a data set may include scientific observation data concerning geological and/or meteorological events, or from sensors in laboratory experiments in areas such as particle physics. By way of another example, a data set may include indications of activities performed by a random sample of individuals of a population of people in a selected country or municipality, or of a population of a threatened species under study in the wild. By way of still another example, a data set may include data descriptive of characteristics of one or more neural networks, such as hyperparameters that specify the quantity and/or organization of nodes within the neural network, and/or such as parameters weights and biases of each of the nodes that may have been derived through a training process in which the neural network is trained to perform a function. In some embodiments, a single data set or a set of data sets may include data descriptive of multiple neural networks that are used together in an ensemble to perform a function.

Regardless of the types of data each such data set may contain, some data sets stored in a federated area may include data sets employed as inputs to the performance of one or more job flows (e.g., flow input data sets), and/or other data sets stored in a federated area may include data sets that are generated as outputs of past performance(s) of one or more job flows (e.g., result reports). It should be noted that some data sets that serve as inputs to the performance of one job flow may be generated as an output of a past performance of another job flow (e.g., a result report becoming an flow input data set). Still other data sets may be both generated as an output and used as input during a single performance of a job flow, such as a data set generated by the performance of one task of a job flow for use by one or more other tasks of that same job flow (e.g., mid-flow data sets).

Also among the objects that may be stored in a federated area may be a combination of task routines and a job flow definition that, together, provide a combination of definitions and executable instructions that enable the performance of an analysis as a job flow that is made up of a set of tasks to be performed. More precisely, executable instructions for the performance of an analysis may be required to be stored as a set of task routines where each task routine is made up of executable instructions to perform a task, and a job flow definition that specifies aspects of how the set of task routines are executed together to perform the analysis. In some embodiments, the definition of each task routine may include definitions of the inputs and outputs thereof. In a job flow definition, each task to be performed may be assigned a flow task identifier, and each task routine that is to perform a particular task may be assigned the flow task identifier of that particular task to make each task routine retrievable by the flow task identifier of the task it performs. Thus, each performance of an analysis may entail a parsing of the job flow definition for that analysis to retrieve the flow task identifiers of the tasks to be performed, and may then entail the retrieval of a task routine required to perform each of those tasks.

As will be explained greater detail, such breaking up of an analysis into a job flow made up of tasks performed by the execution of task routines that are stored in federated area(s) may be relied upon to enable code reuse in which individual task routines may be shared among the job flows of multiple analyses. Such reuse of a task routine originally developed for one analysis by another analysis may be very simply effected by specifying the flow task identifier of the corresponding task in the job flow definition for the other analysis. Additionally, reuse may extend to the job flow definitions, themselves, as the availability of job flow definitions in a federated area may obviate the need to develop of a new analysis routine where there is a job flow definition already available that defines the tasks to be performed in an analysis that may be deemed suitable. Thus, among the objects that may be stored in a federated area may be numerous selectable and reusable task routines and job flow definitions.

In some embodiments, a job flow definition may be stored within federated area(s) as a file or other type of data structure in which the job flow definition is represented as a DAG. Alternatively or additionally, a file or other type of data structure may be used that organizes aspects of the job flow definition in a manner that enables a DAG to be directly derived therefrom. Such a file or data structure may directly indicate an order of performance of tasks, or may specify dependencies between inputs and outputs of each task to enable an order of performance to be derived. By way of example, an array may be used in which there is an entry for each task routine that includes specifications of its inputs, its outputs and/or dependencies on data objects that may be provided as one or more outputs of one or more other task routines. Thus, a DAG may be usable to visually portray the relative order in which specified tasks are to be performed, while still being interpretable by federated devices and/or other devices that may be employed to perform the portrayed job flow. Such a form of a job flow definition may be deemed desirable to enable an efficient presentation of the job flow on a display of a reviewing device as a DAG. Thus, review of aspects of a performance of an analysis may be made easier by such a graphical representation of the analysis as a job flow.

The tasks that may be performed by any of the numerous tasks routines may include any of a variety of data analysis tasks, including and not limited to searches for one or more particular data items, and/or statistical analyses such as aggregation, identifying and quantifying trends, subsampling, calculating values that characterize at least a subset of the data items within a data object, deriving models, testing hypothesis with such derived models, making predictions, generating simulated samples, etc. The tasks that may be performed may also include any of a variety of data transformation tasks, including and not limited to, sorting operations, row and/or column-based mathematical operations, filtering of rows and/or columns based on the values of data items within a specified row or column, and/or reordering of at least a specified subset of data items within a data object into a specified ascending, descending or other order. Alternatively or additionally, the tasks that may be performed by any of the numerous task routines may include any of a variety of data normalization tasks, including and not limited to, normalizing time values, date values, monetary values, character spacing, use of delimiter characters and/or codes, and/or other aspects of formatting employed in representing data items within one or more data objects. The tasks performed may also include, and are not limited to, normalizing use of big or little Endian encoding of binary values, use or lack of use of sign bits, the quantity of bits to be employed in representations of integers and/or floating point values (e.g., bytes, words, doublewords or quadwords), etc. Also alternatively or additionally, the tasks that may be performed may include tasks to train one or more neural networks for use, tasks to test one or more trained neural networks, tasks to coordinate a transition to the use of one or more trained neural networks to perform an analysis from the use of a non-neuromorphic approach to performing the analysis, and/or tasks to store, retrieve and/or deploy a data set that specifies parameters and/or hyper parameters of one or more neural networks. By way of example, such tasks may include tasks to train, test, and/or coordinate a transition to using, an ensemble of neural networks such as a chain of neural networks.

By way of example, tasks that may be performed may include the training, testing, and/or use of a chain of neural networks to generate time series predictions. Each neural network of such a neural network chain may be trained, and then used, to provide a portion of the time series prediction that covers a different subrange of time that make up the full range of time covered by the time series prediction. The neural networks may be interconnected such that each neural network in the neural network chain may receive, as a subset of its inputs, the outputs of each of the preceding neural networks by which each of those preceding neural networks provide their portion of the time series prediction. The neural networks may be trained, one at a time, starting with the first neural network in the chain. To reduce overall training time, a form of transferred learning may be employed in which each neural network, as a starting point for its training, is provided with the weights and biases representing what was learned by the preceding neural network.

The set of tasks that may be specified by the job flow definitions may be any of a wide variety of combinations of analysis, normalization and/or transformation tasks. The result reports generated through performances of the tasks as directed by each of the job flow definitions may include any of a wide variety of quantities and/or sizes of data. In some embodiments, one or more of the result reports generated may contain one or more data sets that may be provided as inputs to the performances of still other analyses, and/or may be provided to a reviewing device to be presented on a display thereof in any of a wide variety of types of visualization. In other embodiments, each of one or more of the result reports generated may primarily include an indication of a prediction and/or conclusion reached through the performance of an analysis that generated the result report as an output.

Additionally among the objects that may be stored in a federated area may be numerous instance logs that may each provide a record of various details of a single past performance of a job flow. More specifically, each instance log may provide indications of when a performance of a job flow occurred, along with identifiers of various objects stored within federated area(s) that were used and/or generated in that performance. Among those identifiers may be an identifier of the job flow definition that defines the job flow of an analysis that was performed, identifiers for all of the task routines executed in that performance, identifiers for any data objects employed as an input (e.g., input data sets), and identifiers for any data objects generated as an output (e.g., a result report that may include one or more output data sets).

The one or more federated devices may assign such identifiers to data objects, task routines and/or job flow definitions as each is stored and/or generated within a federated area to enable such use of identifiers in the instance logs. In some embodiments, the identifier for each such object may be generated by taking a hash of at least a portion of that object to generate a hash value to be used as the identifier with at least a very high likelihood that the identifier generated for each such object is unique. Such use of a hash algorithm may have the advantage of enabling the generation of identifiers for objects that are highly likely to be unique with no other input than the objects, themselves, and this may aid in ensuring that such an identifier generated for an object by one federated device will be identical to the identifier that would be generated for the same object by another device.

Where task routines are concerned, it should be noted that the unique identifier generated and assigned to each task routine is in addition to the flow task identifier that identifies what task is performed by each task routine, and which are employed by the job flow definitions to specify the tasks to be performed in a job flow. As will be explained in greater detail, for each task identified in a job flow definition by a flow task identifier, there may be multiple task routines to choose from to perform that task, and each of those task routines may be assigned a different identifier by the one or more federated devices to enable each of those task routines to be uniquely identified in an instance log. Where instance logs are concerned, the identifier assigned to each instance log may, instead of being a hash taken of that instance log, be a concatenation or other form of combination of the identifiers of the objects employed in the past performance that is documented by that instance log. In this way, and as will be explained in greater detail, the identifier assigned to each instance log may, itself, become useful as a tool to locating a specific instance log that documents a specific past performance.

The assignment of a unique identifier to each object (or at least an identifier that is highly likely to be unique to each object) enables each object to be subsequently retrieved from storage to satisfy a request received by a federated device to access one or more specific objects in which the request specifies the one or more specific objects by their identifiers. Alternatively, requests may be received to provide access to multiple objects in which the multiple objects are specified more indirectly. By way of example, a request may be received to provide access to a complete set of the objects that would be needed by the requesting device to perform a job flow with specified data set(s) serving as inputs, where it is the job flow definition and the data set(s) that are directly identified in the request. Responding to such a request may entail the retrieval of the specified job flow definition and the specified data set(s) by the one or more federated devices, followed by the retrieval of the flow task identifiers for the tasks to be performed from the job flow definition, followed by the use of the flow task identifiers to retrieve the most current version of task routine to perform each task, and then followed by the transmission of the specified job flow definition, the specified data set(s) and the retrieved task routines to the requesting device. By way of another example, a request may be received to provide access to the objects that are identified by an instance log as having been employed in a past performance of a job flow, where it is the instance log that is directly identified by its identifier in the request. Responding to such a request may entail the retrieval of the specified instance log by one or more federated devices, followed by the retrieval of the identifiers of other objects from that instance log, and then followed by the retrieval and transmission of each of those other objects to the device from which the request was received. As will be explained in greater detail, still other forms of indirect reference to objects stored within federated area(s) may be used in various requests.

In various embodiments, the one or more federated devices may receive a request to provide one or more related objects together in a packaged form that incorporates one or more features that enable the establishment of one or more new federated areas that contain the related objects within the requesting device or within another device to which the packaged form may be relayed. In some embodiments, the packaged form may be that of a "zip" file in which the one or more related objects are compressed together into a single file that may also include executable code that enables the file to decompress itself, and in so doing, may also instantiate the one or more new federated areas. Such a packaged form may additionally include various executable routines and/or data structures (e.g., indications of hash values, such as checksum values, etc.) that enable the integrity of the one or more related objects to be confirmed, and/or that enable job flows based on the one or more related objects to be performed. In generating the packaged form, the one or more federated devices may employ various criteria specified in the request for which objects are to be provided in the packaged form to confirm that the objects so provided are a complete enough set of objects as to enable any job flow that may be defined by those objects to be properly performed.

In various embodiments, the use of federated area(s) may go beyond just the storage and/or retrieval of objects, and may include the use of those stored objects by the one or more federated devices to perform job flows. In such other embodiments, the one or more federated devices may receive requests (e.g., via the portal) from other devices to perform various analyses that have been defined as job flows, and to provide an indication of the results to those other devices. More specifically, in response to such a request, the one or more federated devices may execute a combination of task routines to perform tasks of a job flow described in a job flow definition within a federated area to thereby perform an analysis with one or more data objects, all of which are stored in one or more federated areas. In so doing, the one or more federated devices may generate an instance log for storage within one of the one or more federated area that documents the performances of the analysis, including identifiers of data objects used and/or generated, identifiers of task routines executed, and the identifier of the job flow definition that specifies the task routines to be executed to perform the analysis as a job flow.

In some of such other embodiments, the one or more federated devices may be nodes of a grid of federated devices across which the tasks of a requested performance of an analysis may be distributed. The provision of a grid of the federated devices may make available considerable shared processing and/or storage resources to allow such a grid to itself perform complex analyses of large quantities of data, while still allowing a detailed review of aspects of the performance of that analysis in situations where questions may arise concerning data quality, correctness of assumptions made and/or coding errors. During the performance of a job flow, the one or more federated devices may analyze the job flow definition for the job flow to identify opportunities to perform multiple tasks in parallel based on dependencies among the tasks in which data generated as an output by one task is needed as an input to another.

In some embodiments, the one or more federated devices may support the execution of a set of task routines written in differing programming languages as part of performing a job flow. As will be explained in greater detail, this may arise where it is deemed desirable to support collaborations among developers who are familiar with differing programming languages, but who are each contributing different objects, including task routines, the development of a job flow. To enable this, the one or more federated devices may employ a multitude of runtime interpreters and/or compilers for a pre-selected set of multiple programming languages to execute such a set of task routines during the performance of a job flow.

As will also be explained in greater detail, during the performance of a job flow, there may instances of a task routine generating a data set as an output that is to then be used as an input to one or more other task routines (e.g., a mid-flow data set). That data may be persisted by being stored in a federated area as a new data object that is assigned a unique identifier just as a data object received from a source device would be. As previously discussed, this may be done as part of enabling accountability concerning how an analysis is performed by preserving data sets that are generated as an output by one task routine for use as an input to another. However, where two or more task routines that exchange a data set thereamong are written in different programming languages, the data set so exchanged may be subjected to a conversion process to in some way change its form (e.g., serialization or de-serialization) to accommodate differences in data types and/or formats that are supported by the different programming languages (e.g., to resolve differences in the manner in which arrays are organized and/or accessed). Where such a conversion is performed, it may be that just one of the forms of the data set may be persisted to a federated area while the other form may be temporarily stored in a shared memory space that may be instantiated just for the duration of the performance of the job flow and that may be un-instantiated at the end of that performance.

Some requests to perform a job flow may include a request to perform a specified job flow of an analysis with one or more specified data objects. Other requests may be to repeat a past performance of a job flow that begat a specified result report, or that entailed the use of a specific combination of a job flow and one or more data sets as inputs. Through the generation of identifiers for each of the various objects associated with each performance of a job flow, through the use of those identifiers to refer to such objects in instance logs, and through the use of those identifiers by the one or more federated devices in accessing such objects, requests for performances of analyses are able to more efficiently identify particular performances, their associated objects and/or related objects.

In embodiments in which a request is received to perform a specified job flow of an analysis with one or more specified data objects as inputs, the one or more federated devices may use the identifiers of those objects that are provided in the request to analyze the instance logs stored in one or more federated areas to determine whether there was a past performance of the same job flow with the same one or more data objects as inputs. If there was such a past performance, then the result report generated as the output of that past performance may already be stored in a federated area. As long as none of the task routines executed in the earlier performance have been updated since the earlier performance, then a repeat performance of the same job flow with the same one or more data objects serving as inputs may not be necessary. Thus, if any instance logs are found for such an earlier performance, the one or more federated devices may analyze the instance log associated with the most recent earlier performance (if there has been more than one past performance) to obtain the identifiers uniquely assigned to each of the task routines that were executed in that earlier performance. The one or more federated devices may then analyze each of the uniquely identified task routines to determine whether each of them continues to be the most current version stored in the federated area for use in performing its corresponding task. If so, then a repeated performance of the job flow with the one or more data objects identified in the request is not necessary, and the one or more federated devices may retrieve the result report generated by the past performance from a federated area and transmit that result report to the device from which the request was received.

However, if no instance logs are found for any past performance of the specified job flow with the specified one or more data objects that entailed the execution of the most current version of each of the task routines, then the one or more federated devices may perform the specified job flow with the specified data objects using the most current version of task routine for each task specified with a flow task identifier in the job flow definition. Indeed, and as will be explained in greater detail, it may be that the most current version of each task routine may be selected and used in performing a task by default, unless a particular earlier version is actually specified to be used. The one or more federated devices may then assign a unique identifier to and store the new result report generated during such a performance in a federated area, as well as transmit the new result report to the device from which the request was received. The one or more federated devices may also generate and store in a federated area a corresponding new instance log that specifies details of the performance, including the identifier of the job flow definition, the identifiers of all of the most current versions of task routines that were executed, the identifiers of the one or more data objects used as inputs and/or generated as outputs, and the identifier of the new result report that was generated.

In embodiments in which a request is received to repeat a past performance of a job flow of an analysis that begat a result report identified in the request by its uniquely assigned identifier, the one or more federated devices may analyze the instance logs stored in one or more federated areas to retrieve the instance log associated with the past performance that resulted in the generation of the identified result report. The one or more federated devices may then analyze the retrieved instance log to obtain the identifiers for the job flow definition that defines the job flow, the identifiers for each of the task routines executed in the past performance, and the identifiers of any data objects used as inputs in the past performance. Upon retrieving the identified job flow definition, each of the identified task routines, and any identified data objects, the one or more federated devices may then execute the retrieved task routines, using the retrieved data objects, and in the manner defined by the retrieved job flow definition to repeat the past performance of the job flow with those objects to generate a new result report. Since the request was to repeat an earlier performance of the job flow with the very same objects, the new result report should be identical to the earlier result report generated in the past performance such that the new result report should be a regeneration of the earlier result report. The one or more federated devices may then assign an identifier to and store the new result report in a federated area, as well as transmit the new result report to the device from which the request was received. The one or more federated devices may also generate and store, in a federated area, a corresponding new instance log that specifies details of the new performance of the job flow, including the identifier of the job flow definition, the identifiers of all of the task routines that were executed, the identifiers of the one or more data objects used as inputs and/or generated as outputs, and the identifier of the new result report.

In some embodiments, a request for a performance of a job flow (whether it is a request to repeat a past performance, or not) may specify that the input/output behavior of the task routines used during the performance be verified. More specifically, it may be requested that the input/output behavior of the task routines that are executed during the performance of a job flow be monitored, and that the observed input/output behavior of each of those task routines with regard to accessing data objects and/or engaging in any other exchange of inputs and/or outputs be compared to the input and/or output interfaces that may be implemented by their executable instructions, that may be specified in any comments therein, and/or that may be specified in the job flow definition of the job flow that is performed. Each task routine that exhibits input/output behavior that remains compliant with such specifications during its execution may be in some way marked and/or recorded as having verified input/output behavior. Each task routine that exhibits input/output behavior that goes beyond such specifications may be in some way marked and/or recorded as having aberrant input/output behavior.

To perform such monitoring of the input/output behavior of task routines, each task routine that is executed during the performance of a particular job flow may be so executed within a container environment instantiated within available storage space by a processor of one of the federated devices. More specifically, such a container environment may be defined to limit accesses that may be made to other storage spaces outside the container environment and/or to input and/or output devices of the federated device. In effect, such a container environment may be given a set of access rules by which input/output behaviors that comply with input/output behaviors that are expected of particular task routine are allowed to proceed, while other input/output behaviors that go beyond the expected input/output behaviors may be blocked while the storage locations that were meant to be accessed by those aberrant input/output behaviors are recorded to enable accountability for such misbehavior by a task routine, and/or to serve as information that may be required by a programmer to correct a portion of the executable instructions within such a task routine to correct its input/output behavior.

By way of example, and still more specifically, such comments within a task routine and/or such specifications within a job flow definition may specify various aspects of its inputs and/or outputs, such data type, indexing scheme, etc. of data object(s), but may refrain from specifying any particular data object as part of an approach to allowing particular data object(s) to be specified by a job flow definition, or in any of a variety of other ways, during the performance of the job flow in which the task routine may be executed and/or that is defined by the job flow definition. Instead, a placeholder designator (e.g., a variable) may be specified that is to be given a value indicative of a specific data object during the performance of a job flow. Alternatively, where one or more particular data objects are specified, such specification of one or more particular data objects may be done as a default to address a situation in which one or more particular data objects are not specified by a job flow definition and/or in another way during performance of a job flow in which the task routine may be executed. Regardless of whether particular data objects are specified, following the retrieval and interpretation of such input/output specifications, a container environment may be instantiated that is configured to enable the task routine to be executed therein and that allows the task routine to engage in input/output behavior that conforms to those input/output specifications, but which does not allow the task routine to engage in aberrant input/output behavior that goes beyond what it is expected based on those input/output specifications. Depending on the input/output behavior that is observed as the task routine is so executed, the task routine may be marked as being verified as engaging in correct input/output behavior or may be marked as being observed engaging in aberrant input/output behavior.

In some embodiments, the marking of the results of such monitoring of input/output behavior of each task routine may be incorporated into task routine database(s) that may be used to organize the storage of task routines within one or more federated areas as part of enabling more efficient selection and retrieval of task routines for provision to a requesting device and/or for execution. In some of such embodiments, such marking of task routines may also play a role in which task routines are selected to be provided to a requesting device and/or to be executed as part of performing a job flow. As an alternative to such marking of such input/output behavior of a task routine being maintained by a task routine database, a separate and distinct data structure may be maintained within the federated area in which the task routine is stored as a repository of indications of such input/output behavior by the task routine and/or by multiple task routines (e.g., a data file of such indications). Alternatively or additionally, and regardless of the exact manner in which such indications of such input/output behavior of a task routine may be stored, in some embodiments, such stored indications of either correct or aberrant input/output behavior of a task routine may be reflected in instance logs from performances of job flows in which the task routine was executed and/or in a visual representation of the task routine in a DAG.

In various embodiments, a job flow definition may be augmented with graphical user interface (GUI) instructions that are to be executed during a performance of the job flow that it defines to provide a GUI that provides a user an opportunity to specify one or more aspects of the performance of the job flow at runtime. By way of example, such a GUI may provide a user with an opportunity to select one or more data objects to be used as inputs to that performance, to select which one of multiple versions of a task routine is to be used to perform a task, and/or select a federated area into which to store a result report to be output by that performance. In so doing, the GUI may include instructions to display lists of objects, characteristics of objects, DAGs of objects, etc. in response to specific inputs received from a user.

In some of such embodiments, the source device that provides such an augmented job flow definition to the one or more federated devices for storage may enable a user to author such GUI instructions through use of a sketch input user interface. More specifically, such a source device may support the entry of GUI instructions as graphical symbols sketched by a user of the source device through a touch-screen user interface device that supports sketch input and a stylus. Such a source device may maintain a library of graphical symbols that are each correlated to a particular type of object, to a particular characteristic of an object and/or to the displaying of particular information in connection to a particular type of object. Alternatively or additionally, such a library may include graphical symbols that are correlated to particular types of user input that is to be awaited and/or to particular types of actions to be taken in response to the receipt of particular types of user input. One or more of such graphical symbols may include human readable text that may be employed to specify distinct pages of a GUI and/or to specify particular objects. Such a source device may interpret the graphical symbols, any text incorporated therein, and/or the manner in which those graphical symbols are arranged relative to each other in the sketch input to derive and generate the GUI instructions with which a job flow definition is to be augmented.

In support enabling the objects stored within one or more federated areas to be used in performances of job flows, and/or in support of enabling accountability in analyzing aspects of a past performance of a job flow, a set of rules may be enforced by the one or more federated devices that limit what actions may be taken in connection with each object. Such enforced limitations in access to each object may be in addition to the aforementioned restrictions on accesses to federated area(s) that may be imposed on entities, persons and/or particular devices. Such rules may restrict what objects are permitted to be stored and/or when, and/or may restrict what objects are able to be altered and/or removed as part of preventing instances of there being "orphan" objects that are not accompanied in storage by other objects that may be needed to support a performance or a repetition of a performance of a job flow. Alternatively or additionally, such rules may restrict what objects are permitted to be stored and/or when as part of prevent instances of incompatibility between objects that are to be used together in a performance of a job flow.

By way of example, whether a job flow definition will be permitted to be stored within a federated area may be made contingent on whether, for each task that is specified in the job flow definition, there is at least one task routine that is already stored in the federated area and/or is about to be stored in the federated area along with the job flow definition. Such a rule that imposes such a condition on the storage of a job flow definition may be deemed desirable to prevent a situation in which there is a job flow definition stored in a federated area that defines a job flow that cannot be performed as a result of there being a task specified therein that cannot be performed due to the lack of storage in a federated area of any task routine that can be executed to perform that task. Similarly, and by way of another example, whether an instance log will be permitted to be stored within a federated area may be made contingent on whether each object identified in the instance log as being associated with a past performance of the job flow documented by the instance log is already stored in the federated area and/or is about to be stored in the federated area along with the instance log. Such a rule that imposes such a condition on the storage of an instance log may be deemed desirable to prevent a situation in which there is an instance log stored in a federated area that documents a past performance of a job flow that cannot be repeated due to the lack of storage in a federated area of an object specified in the instance log as being associated with that past performance.

By way of another example, whether a job flow definition will be permitted to be stored within a federated area may alternatively or additionally be made contingent on whether, the input and/or output interfaces specified for each task in the job flow definition are a sufficient match to the input and/or output definitions implemented by the already stored task routines that perform each of those tasks. Such a rule that imposes such a condition on the storage of a job flow definition may be deemed desirable to prevent incompatibilities between the specifications of interfaces in a job flow definition and the implementations of interfaces in the corresponding task routines. Similarly, and by way of still another example, whether a new version of a task routine that performs a particular task when executed will be permitted to be stored within a federated area may be made contingent on whether, the input and/or output definitions implemented within the new task routine are a sufficient match to the input and/or output definitions implemented by the one or more already stored task routines that also perform the same task. Such a rule that imposes such a condition on the storage of a new task routine may be deemed desirable to prevent incompatibilities between versions of task routines that perform the same task.

By way of still another example, whether a data object (e.g., flow input data set, a mid-flow data set, or result report) or a task routine is permitted to be deleted from a federated area may be made contingent on whether its removal would prevent a job flow that is defined in a job flow definition from being performed and/or whether its removal would prevent a past performance of a job flow that is documented by a instance log from being repeated. Such a rule that imposes such a condition may be deemed desirable to prevent a situation in which there is a job flow definition stored in a federated area that defines a job flow that cannot be performed due to the lack of storage in a federated area of any task routine that can be executed to perform one of the tasks specified in the job flow definition. Also, such a rule that imposes such a condition may be deemed desirable to prevent a situation in which there is an instance log stored in a federated area that documents a past performance of a job flow that cannot be repeated due to the lack of storage in a federated area of a data object or task routine specified in the instance log as being associated with that past performance. Similarly, and by way of yet another example, whether a job flow definition is permitted to be deleted from a federated area may be made contingent on whether its removal would prevent a past performance of the corresponding job flow that is documented by a instance log from being repeated. Such a rule that imposes such a condition may be deemed desirable to prevent a situation in which there is an instance log stored in a federated area that documents a past performance of a job flow that cannot be repeated due to the lack of storage in a federated area of the job flow definition for that job flow.

With such restrictions against the removal of objects from a federated area, an alternative that may be allowed by the set of rules may be the storing of newer versions of objects. By way of example, where an earlier version of a task routine or a job flow definition is determined to have flaws and/or to be in need of replacement for some other reason, the set of rules may allow a newer (and presumably improved) version of such a task routine or job flow definition to be stored so that it can be used instead of the earlier version. As previously discussed, while each version of each task routine may be assigned a unique identifier generated from the taking of a hash of thereof such that each version of each task routine is individually identifiable and selectable, each task routine is also assigned a flow task identifier that specifies the task that it performs when executed. As previously discussed, task routines may subsequently be searched for and selected based on their flow task identifiers, and use of the most current version of task routine to perform each task specified in a job flow by a flow task identifier may be the default rule. As a result, the storage of a new version of a task routine that performs a task identified by a particular flow task identifier may be relied upon to cause the use of any earlier versions of task routine that also perform that same task identified by that same flow task identifier to cease, except in situations where the use of a particular earlier version of task routine to perform a particular task is actually specified.

Through such pooling of older and newer versions of objects, through the provision of unique identifiers for each object, and through the enforcement of such a regime of rules restricting accesses that may be made to one or more federated areas, objects such as data sets, task routines and job flow definitions are made readily available for reuse under conditions in which their ongoing integrity against inadvertent and/or deliberate alteration is assured. The provision of a flow task identifier for each task may enable updated versions of task routines to be independently created and stored within one or more federated areas in a manner that associates those updated versions with earlier versions without concern of accidental overwriting of earlier versions.

As a result of such pooling of data sets and task routines, new analyses may be more speedily created through reuse thereof by generating new job flows that identify already stored data sets and/or task routines. Additionally, where a task routine is subsequently updated, advantage may be automatically taken of that updated version in subsequent performances of each job flow that previously used the earlier version of that task routine. And yet, the earlier version of that task routine remains available to enable a comparative analysis of the results generated by the different versions if discrepancies therebetween are subsequently discovered. Also, as a result of such pooling of data sets, task routines and job flows, along with instance logs and result reports, repeated performances of a particular job flow with a particular data set can be avoided. Through use of identifiers uniquely associated with each object and recorded within each instance log, situations in which a requested performance of a particular job flow with a particular data set that has been previously performed can be more efficiently identified, and the result report generated by that previous performance can be more efficiently retrieved and made available in lieu of consuming time and processing resources to repeat that previous performance. And yet, if a question should arise as to the validity of the results of that previous performance, the data set(s), task routines and job flow definition on which that previous performance was based remain readily accessible for additional analysis to resolve that question.

Also, where there is no previous performance of a particular job flow with a particular data set such that there is no previously generated result report and/or instance log therefor, the processing resources of the grid of federated devices may be utilized to perform the particular job flow with the particular data set. The ready availability of the particular data set to the grid of federated devices enables such a performance without the consumption of time and network bandwidth resources that would be required to transmit the particular data set and other objects to the requesting device to enable a performance by the requesting device. Instead, the transmissions to the requesting device may be limited to the result report generated by the performance. Also, advantage may be taken of the grid of federated devices to cause the performance of one or more of the tasks of the job flow as multiple instances thereof in a distributed manner (e.g., at least partially in parallel) among multiple federated devices and/or among multiple threads of execution support by processor(s) within each such federated device.

As a result of the requirement that the data set(s), task routines and the job flow associated with each instance log be preserved, accountability for the validity of results of past performances of job flows with particular data sets is maintained. The sources of incorrect results, whether from invalid data, or from errors made in the creation of a task routine or a job flow, may be traced and identified. By way of example, an earlier performance of a particular job flow with a particular data set using earlier versions of task routines can be compared to a later performance of the same job flow with the same data set, but using newer versions of the same task routines, as part of an analysis to identify a possible error in a task routine. As a result, mistakes can be corrected and/or instances of malfeasance can be identified and addressed.

The one or more federated devices may maintain one or more sets of federated areas that may be related to each other through a set of relationships that serve to define a hierarchy of federated areas in which the different federated areas may be differentiated by the degree of restriction of access thereto that may be enforced by the one or more federated devices. In some embodiments, a linear hierarchy may be defined in which there is a base federated area with the least restricted degree of access, a private federated area with the most restricted degree of access, and/or one or more intervening federated areas with intermediate degrees of access restriction interposed between the base and private federated areas. Such a hierarchy of federated areas may be created to address any of a variety of situations in support of any of a variety of activities, including those in which different objects stored thereamong require different degrees of access restriction. By way of example, while a new data set or a new task routine is being developed, it may be deemed desirable to maintain it within the private federated area or intervening federated area to which access is granted to a relatively small number of users (e.g., persons and/or other entities that may each be associated with one or more source devices and/or reviewing devices) that are directly involved in the development effort. It may be deemed undesirable to have such a new data set or task routine made accessible to others beyond the users involved in such development before such development is completed, such that various forms of testing and/or quality assurance have been performed. Upon completion of such a new data set or task routine, it may then be deemed desirable to transfer it, or a copy thereof, to the base federated area or other intervening federated area to which access is granted to a larger number of users. Such a larger number of users may be the intended users of such a new data set or task routine.

It may be that multiple ones of such linear hierarchical sets of federated areas may be combined to form a tree of federated areas with a single base federated area with the least restricted degree of access at the root of the tree, and multiple private federated areas as the leaves of the tree that each have more restricted degrees of access. Such a tree may additionally include one or more intervening federated areas with various intermediate degrees of access restriction to define at least some of the branching of hierarchies of federated areas within the tree. Such a tree of federated areas may be created to address any of a variety of situations in support of any of a variety of larger and/or more complex activities, including those in which different users that each require access to different objects at different times are engaged in some form of collaboration. By way of example, multiple users may be involved in the development of a new task routine, and each such user may have a different role to play in such a development effort. While the new task routine is still being architected and/or generated, it may be deemed desirable to maintain it within a first private federated area or intervening federated area to which access is granted to a relatively small number of users that are directly involved in that effort. Upon completion of such an architecting and/or generation process, the new task routine, or a copy thereof, may be transferred to a second private federated area or intervening federated area to which access is granted to a different relatively small number of users that may be involved in performing tests and/or other quality analysis procedures on the new task routine to evaluate its fitness for release for use. Upon completion of such testing and/or quality analysis, the new task routine, or a copy thereof, may be transferred to a third private federated area or intervening federated area to which access is granted to yet another relatively small number of users that may be involved in pre-release experimental use of the new task routine to further verify its functionality in actual use case scenarios. Upon completion of such experimental use, the new task routine, or a copy thereof, may be transferred to a base federated area or other intervening federated area to which access is granted to a larger number of users that may be the intended users of the new task routine.

In embodiments in which multiple federated areas form a tree of federated areas, each user may be automatically granted their own private federated area as part of being granted access to at least a portion of the tree. Such an automated provision of a private federated area may improve the ease of use, for each such user, of at least the base federated area by providing a private storage area in which a private set of job flow definitions, task routines, data sets and/or other objects may be maintained to assist that user in the development and/or analysis of other objects that may be stored in at least the base federated area. By way of example, a developer of task routines may maintain a private set of job flow definitions, task routines and/or data sets in their private federated area for use as tools in developing, characterizing and/or testing the task routines that they develop. The one or more federated devices may be caused, by such a developer, to use such job flow definitions, task routines and/or data sets to perform compilations, characterizing and/or testing of such new task routines within the private federated area as part of the development process therefor. Some of such private job flow definitions, task routines and/or data sets may include and/or may be important pieces of intellectual property that such a developer desires to keep to themselves for their own exclusive use (e.g., treated as trade secrets and/or other forms of confidential information).

A base federated area within a linear hierarchy or hierarchical tree of federated areas may be the one federated area therein with the least restrictive degree of access such that a grant of access to the base federated area constitutes the lowest available level of access that can be granted to any user. Stated differently, the base federated area may serve as the most "open" or most "public" space within a linear hierarchy or hierarchical tree of federated spaces. Thus, the base federated area may serve as the storage space at which may be stored job flow definitions, versions of task routines, data sets, result reports and/or instance logs that are meant to be available to all users that have been granted any degree of access to the set of federated areas of which the base federated area is a part. The one or more federated devices may be caused, by a user that has been granted access to at least the base federated area, to perform a job flow within the base federated area using a job flow definition, task routines and/or data sets stored within the base federated area.

In a linear hierarchical set of federated areas that includes a base federated area and just a single private federated area, one or more intervening federated areas may be interposed therebetween to support the provision of different levels of access to other users that don't have access to the private federated area, but are meant to be given access to more than what is stored in the base federated area. Such a provision of differing levels of access would entail providing different users with access to either just the base federated area, or to one or more intervening federated areas. Of course, this presumes that each user having any degree of access to the set of federated areas is not automatically provided with their own private federated area, as the resulting set of federated areas would then define a tree that includes multiple private federated areas, and not a linear hierarchy that includes just a single private federated area.

In a hierarchical tree of federated areas that includes a base federated area at the root and multiple private federated areas at the leaves of the tree, one or more intervening federated areas may be interposed between one or more of the private federated areas and the base federated areas in a manner that defines at least part of one or more branches of the tree. Through such branching, different private federated areas and/or different sets of private federated areas may be linked to the base federated area through different intervening federated areas and/or different sets of intervening federated areas. In this way, users associated with some private federated areas within one branch may be provided with access to one or more intervening federated areas within that branch that allow sharing of objects thereamong, while also excluding other users associated with other private federated areas that may be within one or more other branches. Stated differently, branching may be used to create separate sets of private federated areas where each such set of private federated areas is associated with a group of users that have agreed to more closely share objects thereamong, while all users within all of such groups are able to share objects through the base federated area, if they so choose.

In embodiments in which there are multiple federated areas that form either a single linear hierarchy or a hierarchical tree, each of the federated areas may be assigned one or more identifiers. It may be that each federated area is assigned a human-readable identifier, such as names that are descriptive of ownership (e.g., "Franks"), names that are descriptive of degree of access (e.g., "public" vs. "private"), names of file system directories and/or sub-directories at which each of the federated areas may be located, and/or names of network identifiers by which each federated area may be accessible on a network. However, it may be that each federated area is also assigned a randomly generated identifier with a large enough bit width that it is highly likely that each such identifier is unique across all federated areas anywhere in the world (e.g., a "global" identifier or "GUID"). Such a unique identifier for each federated area may provide a mechanism to resolve identification conflicts where perhaps two or more federated areas may have been given identical human-readable identifiers.

In one example of assignment and use of identifiers, a set of federated areas that form either a single linear hierarchy or hierarchical tree may be assigned identifiers that make the linear hierarchy or hierarchical tree navigable through the use of typical web browsing software. More specifically, one or more federated devices may generate the portal to enable access, by a remote device, to the set of federated areas from across a network using web access protocols, file transfer protocols and/or other protocols in which each of multiple federated areas is provided with a human-readable identifier in the form of a uniform resource locator (URL). In so doing, the URLs assigned thereto may be structured to reflect the hierarchy that has been defined among the federated areas therein. Thus, for a tree of federated areas, the base federated area at the root of the tree may be assigned the shortest and simplest URL, and such a URL given to the base federated area may be indicative of a name given to that entire tree of federated areas. In contrast, the URL of each federated area at a leaf of the tree may include a combination (e.g., a concatenation) of at least a portion of the URL given to the base federated area, and at least a portion of the URL given to any intervening federated area in the path between the federated area at the leaf and the base federated area.

In embodiments of either a linear hierarchy of federated areas or a hierarchical tree of federated areas, one or more relationships that affect the manner in which objects may be accessed and/or used may be put in place between each private federated area and the base federated area, as well as through any intervening federated areas therebetween. Among such relationships may be an inheritance relationship in which, from the perspective of a private federate area, objects stored within the base federated area, or within any intervening federated area therebetween, may be treated as if they are also stored directly within the private federated area for purposes of being available for use in performing a job flow within the private federated area. As will be explained in greater detail, the provision of such an inheritance relationship may aid in enabling and/or encouraging the reuse of objects by multiple users by eliminating the need to distribute multiple copies of an object among multiple private federated areas in which that object may be needed for performances of job flows within each of those private federated areas. Instead, a single copy of such an object may be stored within the base federated area and will be treated as being just as readily available for use in performances of job flows within each of such private federated areas.

Also among such relationships may be a priority relationship in which, from the perspective of a private federated area, the use of a version of an object stored within the private federated area may be given priority over the use of another version of the same object stored within the base federated area, or within any intervening federated area therebetween. More specifically, where a job flow is to be performed within a private federated area, and there is one version of a task routine to perform a task of the job flow stored within the private federated area and another version of the task routine to perform the same task stored within the base federated area, use of the version of the task routine stored within the private federated area may be given priority over use of the other version stored within the base federated area. Further, such priority may be given to using the version stored within the private federated area regardless of whether the other version stored in the base federated area is a newer version. Stated differently, as part of performing the job flow within the private federated area, the one or more federated devices may first search within the private federated area for any needed task routines to perform each of the tasks specified in the job flow, and upon finding a task routine to perform a task within the private federated area, no search may be performed of any other federated area to find a task routine to perform that same task. It may be deemed desirable to implement such a priority relationship as a mechanism to allow a user associated with the private federated area to choose to override the automatic use of a version of a task routine within the base federated area (or an intervening federated area therebetween) due to an inheritance relationship by storing the version of the task routine that they prefer to use within the private federated area.

Also among such relationships may be a dependency relationship in which, from the perspective of a private federated area, some objects stored within the private federated area may have dependencies on objects stored within the base federated area, or within an intervening federated area therebetween. More specifically, as earlier discussed, the one or more federated devices may impose a rule that the task routines upon which a job flow depends may not be deleted such that the one or more federated devices may deny a request received from a remote device to delete a task routine that performs a task identified by a flow task identifier that is referred to by at least one job flow definition stored. Thus, where the private federated area stores a job flow definition that includes a flow task identifier specifying a particular task to be done, and the base federated area stores a task routine that performs that particular task, the job flow of the job flow definition may have a dependency on that task routine continuing to be available for use in performing the task through an inheritance relationship between the private federated area and the base federated area. In such a situation, the one or more federated devices may deny a request that may be received from a remote device to delete that task routine from the base federated area, at least as long as the job flow definition continues to be stored within the private federated area. However, if that job flow definition is deleted from the private federated area, and if there is no other job flow definition that refers to the same task flow identifier, then the one or more federated devices may permit the deletion of that task routine from the base federated area.

In embodiments in which there is a hierarchical tree of federated areas that includes at least two branches, a relationship may be put in place between two private and/or intervening federated areas that are each within a different one of two branches by which one or more objects may be automatically transferred therebetween by the one or more federated devices in response to one or more conditions being met. As previously discussed, the formation of branches within a tree may be indicative of the separation of groups of users where there may be sharing of objects among users within each such group, such as through the use of one or more intervening federated areas within a branch of the tree, but not sharing of objects between such groups. However, there may be occasions in which there is a need to enable a relatively limited degree of sharing of objects between federated areas within different branches. Such an occasion may be an instance of multiple groups of users choosing to collaborate on the development of one or more particular objects such that those particular one or more objects are to be shared among the multiple groups where, otherwise, objects would not normally be shared therebetween. On such an occasion, the one or more federated devices may be requested to instantiate a transfer area through which those particular one or more objects may be automatically transferred therebetween upon one or more specified conditions being met. In some embodiments, the transfer area may be formed as an overlap between two federated areas of two different branches of a hierarchical tree. In other embodiments, the transfer area may be formed within the base federated area to which users associated with federated areas within different branches may all have access.

In some embodiments, the determination of whether the condition(s) for a transfer have been met and/or the performance of the transfer of one or more particular objects may be performed using one or more transfer routines to perform transfer-related tasks called for within a transfer flow definition. In such embodiments, a transfer routine may be stored within each of the two federated areas between which the transfer is to occur. Within the federated area that the particular one or more objects are to be transferred from, the one or more federated devices may be caused by the transfer routine stored therein to repeatedly check whether the specified condition(s) have been met, and if so, to then transfer copies of the particular one or more objects into the transfer area. Within the federated area that the particular one or more objects are to be transferred to, the one or more federated devices may be caused by the transfer routine stored therein to repeatedly check whether copies of the particular one or more objects have been transferred into the transfer area, and if so, to then retrieve the copies of the particular one or more objects from the transfer area.

A condition that triggers such automated transfers may be any of a variety of conditions that may eventually be met through one or more performances of a job flow within the federated area from which one or more objects are to be so transferred. More specifically, the condition may be the successful generation of particular results data that may include a data set that meets one or more requirements that are specified as the condition. Alternatively, the condition may be the successful generation and/or testing of a new task routine such that there is confirmation in a result report or in the generation of one or more particular data sets that the new task routine has been successfully verified as meeting one or more requirements that are specified as the condition. As will be explained in greater detail, the one or more performances of a job flow that may produce an output that causes the condition to be met may occur within one or more processes that may be separate from the process in which a transfer routine is executed to repeatedly check whether the condition has been met. Also, each of such processes may be performed on a different thread of execution of a processor of a federated device, or each of such processes may be performed on a different thread of execution of a different processor from among multiple processors of either a single federated device or multiple federated devices.

By way of example, multiple users may be involved in the development of a new neural network or a new ensemble of neural networks (e.g., a chain of neural networks), and each such user may have a different role to play in such a development effort. While the new neural network or neural network ensemble is being developed through a training process, it may be deemed desirable to maintain the data set(s) of weights and biases that is being generated through numerous iterations of training within a first intervening federated area to which access is granted to a relatively small number of users that are directly involved in that training effort. Upon completion of such training, a copy of the resulting one or more data sets of weights and biases may be transferred to a second intervening federated area to which access is granted to a different relatively small number of users that may be involved in testing the neural network or neural network ensemble defined by the data set(s) to evaluate fitness for release for at least experimental use. The transfer of the copy of one or more data set(s) from the first intervening federated area to the second intervening federated area may be triggered by the training having reached a stage at which a predetermined condition is met that defines the completion of training, such as a quantity of iterations of training having been performed. Upon completion of such testing of the neural network or neural network ensemble, a copy of the one or more data sets of weights and biases may be transferred from the second intervening federated area to a third intervening federated area to which access is granted to yet another relatively small number of users that may be involved in pre-release experimental use of the neural network or neural network ensemble to further verify functionality in actual use case scenarios. Like the transfer to the second intervening federated area, the transfer of a copy of the one or more data sets from the second intervening federated area to the third intervening federated area may be triggered by the testing having reached a stage at which a predetermined condition was met that defines the completion of testing, such as a threshold of a characteristic of performance of the neural network or neural network ensemble having been determined to have been met during testing. Upon completion of such experimental use, a copy of the one or more data sets of weights and biases may be transferred from the third federated area to a base federated area to which access is granted to a larger number of users that may be the intended users of the new neural network.

Such a neural network or neural network ensemble may be generated as part of an effort to transition from performing a particular analytical function using non-neuromorphic processing (i.e., processing in which no neural network is used) to performing the same analytical function using neuromorphic processing (i.e., processing in which one or more neural networks are used). Such a transition may represent a tradeoff in accuracy for speed, as the performance of the analytical function using neuromorphic processing may not achieve the perfect accuracy (or at least the degree of accuracy) that is possible via the performance of the analytical function using non-neuromorphic processing, but the performance of the analytical function using neuromorphic processing may be faster by one or more orders of magnitude, depending on whether the neural network or neural network ensemble is implemented with software-based simulations of artificial neurons executed by one or more CPUs or GPUs, or hardware-based implementations of artificial neurons provided by one or more neuromorphic devices.

Where the testing of such a neural network or neural network ensemble progresses successfully such that it begins to be put to actual use, there may be a gradual transition from the testing to the usage that may be automatically implemented in a staged manner Initially, non-neuromorphic and neuromorphic implementations of the analytical function may be performed at least partially in parallel with the same input data values being provided to both, and with the corresponding output data values of each being compared to test the degree of accuracy of the neural network or neural network ensemble in performing the analytical function. In such initial, at least partially parallel, performances, priority may be given to providing processing resources to the non-neuromorphic implementation, since the non-neuromorphic implementation is still the one that is in use. As the neural network or neural network ensemble demonstrates a degree of accuracy that at least meets a predetermined threshold, the testing may change such that the neuromorphic implementation is used, and priority is given to providing processing resources to it, while the non-neuromorphic implementation is used at least partially in parallel solely to provide output data values for further comparisons to corresponding ones provided by the neuromorphic implementation. Presuming that the neural network or neural network ensemble continues to demonstrate a degree of accuracy that meets or exceeds the predetermined threshold, further use of the non-neuromorphic implementation of the analytical function may cease, entirely.

In various embodiments, a somewhat similar temporary relationship may be instantiated between a selected federated area and a storage space that is entirely external to the one or more federated devices and/or to the one or more federated areas, such as an external storage space maintained by a source device or a reviewing device. The federated area selected for such a relationship may, again, be a private federated area or other federated area (e.g., an intermediate federated area) used to store one or more objects that may be under development. The purpose of such a relationship may be to cause the automatic synchronization of changes made to objects stored within each of the selected federated area and the external storage space, as previously discussed. In some of such embodiments, automatic synchronization may be effected simply by transferring a copy of an object modified within one of the two locations to the other of the two locations such that both locations are caused to have identical objects.

As with the aforedescribed automatic transfers between federated areas, any of a variety of conditions may be specified as the trigger for causing such automated transfers, such as the aforementioned examples of the successful completion of testing of an object (e.g., a task routine) and/or of a neural network (or an ensemble of neural networks) as a trigger. As an alternate example, where the external storage space and the selected area are both used as shared storage locations at which multiple developers may maintain objects and/or portions of objects under development, the trigger may be an instance in which an object is in someway marked or otherwise indicated as having been completed to a degree that a developer desires to make it available to the other developers. Such marking may be associated with a process in which an object and/or changes thereto are "committed" to a pool of other objects stored within either of the two locations that have also been deemed and marked as similarly complete. Thus, upon an object having been so marked in one of the two locations, the one or more federated devices may cause a copy thereof to be transferred to other of the two locations and similarly marked such that the fact of that object (or changes made thereto) having been "committed" is made evident at both locations.

It should be noted that, unlike the one or more federated areas maintained by the one or more federated devices with the aforementioned set of rules that enforce conditions on when objects may be stored within federated area(s) and/or removed therefrom, there may be no such set of rules that are employed to provide similar restrictions for such an external storage space. Thus, synchronization between a selected federated area and such an external storage space may necessitate providing the ability to at least temporarily suspend the enforcement of such rules for the selected federated area, at least where new objects and/or changes to objects are effected by the occurrence of transfers from the external storage space and to the selected federated area. It may be that the formation of such a relationship between a federated area and an external storage space is limited to a private federated area so as to avoid having a federated area in which there is such a suspension of rules that also becomes a federated area from which other federated areas may inherit objects. Alternatively or additionally, it may be that a portion of a federated area is designated as a transfer area that becomes the portion of that federated area in which the contents therein are kept synchronized with the external storage space.

In such example embodiments as are described above in which the selected federated area and the external storage space are both employed as shared storage spaces to enable the collaborative development of objects among multiple developers, such transfers to synchronize the conditions of objects therebetween may be performed bi-directionally such that changes to objects made within either location are reflected in the corresponding objects within the other location. As will be explained in greater detail, in embodiments in which such a collaboration is intended to result in the generation of a full set of objects needed to perform a job flow within the one or more federated areas, it may be that are limits on the bi-directionality of the exchanges such that, for example, job flow definitions may be exchanged bi-directionally, but not task routines. This may be the case where the developers who access the external storage space, but not the one or more federated areas, may be generating task routines and/or job flow definitions in a different programming language from the developers who access the one or more federated areas. Thus, in such a collaboration, task routines that may be accepted from the external storage space through such a synchronization relationship, but no task routines developed within the one or more federated areas may be transmitted back to the external storage space. In contrast, the job flow definition that defines the job flow under development may be transferred in either direction between to enable both groups of developers to be guided by the definition of the job flow therein and/or to enable either of these two groups of developers to modify it as the job flow evolves throughout its development.

There may be other embodiments in which an external storage space is used to disseminate new objects among multiple persons and/or entities that do not have access to the one or more federated areas, and the transfers to synchronize the conditions of objects therebetween may be entirely unidirectional from the designated federated area and to the external storage space. More specifically, it may be that fully developed and tested objects deemed ready for widespread dissemination for use by others are caused to be stored within the designated federated area (or within a portion thereof that is designated as a transfer area), and the fact that such an object has been stored therein may be used as the trigger to cause the automatic transfer of a copy of that object to the external storage space, while in contrast, there may be no automated transfers of objects back to the federated area from the external storage space.

Regardless of the exact manner in which objects are received by the one or more federated devices for storage in a federated area, it may be that at least some of those received objects may be written in a variety of different programming languages. More specifically, while some objects may be received that are written in a primary programming language that is normally expected to be interpreted by the one or more federated devices during a performance of a job flow (e.g., the SAS language), other objects may be received that may be written in one of a pre-selected set of secondary programming languages the one or more federated devices may also be capable of interpreting during a performance of a job flow (e.g., C, R, Python™).

As will be explained in greater detail, it may be deemed desirable to provide support for objects written in such secondary language(s) to enable programmers who are unfamiliar with the primary language to nonetheless avail themselves of the various benefits of federated areas. Additionally, supporting such secondary languages may enable programmers who are unfamiliar with the primary language and/or the features of federated areas, the highly structured nature of federated areas and/or the writing of programs for a many-task computing environment to still be able to collaborate with other programmers who are familiar therewith.

As part of supporting the use of one or more secondary programming languages, some limited degree of translation of programming languages may be performed on portions of objects received by the one or more federated devices. More specifically, the one or more federated devices may automatically translate portion(s) of a job flow definition that defines input and/or output interfaces for each task specified as part of its job flow, and/or may translate portion(s) of a task routine that implement input and/or output interfaces. Such translations may be from both the primary programming language and any of the pre-selected secondary programming languages, and into a single type of intermediate representation, such as an intermediate data structure or an intermediate programming language (e.g., JSON). This may enable comparisons to be made among specifications and/or implementations of input and/or output interfaces to be performed, regardless of which of the programming languages were used to write the specifications and/or implementations of those input and/or output interfaces. In this way, multiple programming languages are able to be accommodated while still using such comparisons to enforce the earlier described rules that may be used to limit what job flow definitions and/or task routines may be permitted to be stored within the one or more federated areas.

In some embodiments, the performance of translations from the primary programming language and/or secondary programming language(s) may be limited to such translations of specifications and/or implementations of input and/or output interfaces into such an intermediate representation for such comparisons. It may be deemed undesirable and/or unnecessary to translate other portions of task routines and/or job flow definitions to perform such comparisons and/or for any other purpose.

However, in other embodiments, it may deemed desirable to perform translations to the extent needed to derive a task routine written in the primary programming language from a task routine written a secondary programming language. This may be deemed desirable to enable developers who are generating objects required for a job flow in the primary programming language to have access to a version of the job flow definition that is also written in the primary programming to serve as a guide for their work and/or to enable them to make modifications thereto. In embodiments in which it is just the portion(s) of a job flow that define input and/or output interfaces that are written in a particular programming language, the translation thereof into the intermediate representation (e.g., an intermediate programming language) may be used as the basis for translations between primary and secondary programming languages. More specifically, where a job flow definition is received in which portion(s) that define input and/or output interfaces are written in a secondary programming language, the intermediate representation into which those portion(s) are translated to enable the aforedescribed comparisons may also be used as the basis to generate corresponding portion(s) that define the input and/or output interfaces in the primary language as part of a translated form of the job flow definition. In such embodiments, it may be translated form of the job flow definition that is then stored, instead of the originally received job flow definition.

Additionally, in such embodiments in which a translated form of a job flow definition with input and/or output interface definitions in the primary language may be generated from an originally received job flow definition that includes input and/or output interface definitions in a secondary language, it may be that such translations are performed bi-directionally as part of further supporting a collaboration among a combination of developers in which both the primary and secondary languages are used. More specifically, where a job flow definition in which input and/or output interface definitions are written in the primary language, an intermediate representation into which those portion(s) are translated to enable the aforedescribed comparisons may also be used as the basis to generate corresponding input and/or output interface definitions in a secondary programming language. Such a reverse translation may be performed regardless of whether the job flow definition with input and/or output definitions was originally written in the primary programming language, or was translated into the primary programming language from an originally received job flow definition written in a secondary programming language. This may be deemed desirable to enable developers who are generating objects required for a job flow in a secondary programming language to have access to a version of the job flow definition that is also written in the secondary programming to serve as a guide for their work and/or to enable them to make modifications thereto.

By providing such translations of a job flow definition back and forth between the primary programming language and a secondary programming language, either the developers who write in the primary programming language or the developers who write in the secondary programming language are able to read and/or edit the job flow definition in their chosen programming language. In this way, the developers using the secondary programming language are put on a more equal footing as collaborators with the developers using the primary programming language as developers of either group are able to participate in shaping the definition of the job flow to which both groups are contributing objects.

As previously discussed, in some embodiments, a job flow definition may additionally include executable GUI instructions to implement a GUI interface that is to be provided during a performance of the job flow that is defined therein. In such embodiments, it may be deemed desirable to provide more extensive translation capabilities to enable the translation of GUI instructions between programming languages as part of providing a translated form of a job flow definition with input and/or output definitions, and also GUI instructions, written in the primary programming language from a received job flow definition with input and/or output definitions, and also GUI instructions, written in a secondary programming language, and vice versa.

In various embodiments, a set of objects needed to perform an analysis may effectively be provided to the one or more federated devices in the form of a complex data structure such as a spreadsheet data structure. Such a data structure may contain the equivalent of one or more data sets organized as two-dimensional arrays (e.g., tables) therein, may contain one or more calculations of the analysis organized as multiple equations that may each be stored in a separate row, and/or may specify one or more graphs that are to be presented based on a performance of the analysis. The one or more federated devices may interpret such a data structure to derive therefrom the set of objects needed to perform the analysis defined within the data structure as a job flow in which the analysis is divided into tasks that are each performed as a result of executing a corresponding task routine.

More precisely, the multiple equations within the data structure may be analyzed, along with the organization of the data into one or more two-dimensional arrays within the data structure, to derive definitions of input and output interfaces for each of the equations and to identify each distinct data object. The multiple equations may also be analyzed, in view of the derived input and/or output interface definitions, to identify the dependencies thereamong. Various checks may be made for instances of mismatched interfaces, missing data that is required as input and/or unused data to determine whether the contents of the data structure set forth analysis a complete analysis that is able to be performed. Presuming that the analysis is determined to be performable, a job flow definition may be derived based on the input and/or output interfaces and the identified dependencies in which each of the equations may be treated as a task of the job flow that is defined by the job flow definition. Each equation may be parsed to generate a corresponding task routine to perform the task of that equation, as specified in the job flow definition. Each identified data object may be generated from a two-dimensional array or a portion of a two-dimensional array within the data structure. This set of generated data objects may then be stored within the federated area into which it was requested that the data structure be stored. In some embodiments, the data structure, itself, may also be stored within the federated area as a measure to provide accountability for the quality of the conversion of the data structure into the set of objects.

In various embodiments, one or more of comments descriptive of input and/or output interfaces within one or more task routines, portions of instructions within one or more task routines that implement input and/or output interfaces, and specifications of input and/or output interfaces provided in one or more job flow definitions may be used to generate a directed acyclic graph (DAG) of one or more task routines and/or of a job flow. More precisely, such information may be used to build any of a variety of data structure(s) that correlate inputs and/or outputs to tasks and/or the task routines that are to perform those tasks, and from which a DAG for one or more task routines and/or a job flow may be generated and/or visually presented. In some embodiments, such a data structure may include script generated in a markup language and/or a block of programming code for each task or task routine (e.g., a macro employing syntax from any of a variety of programming languages). Regardless of the form of the data structure(s) that are generated, such a data structure may also specify the task routine identifier assigned to each task routine and/or the flow task identifier identifying the task performed by each task routine.

Which one or more task routines are to be included in such a DAG may be specified in any of a variety of ways. By way of example, a request may be received for a DAG that includes one or more tasks or task routines that are explicitly identified by their respective flow task identifiers and/or task routine identifiers. By way of another example, a request may be received for a DAG that includes all of the task routines currently stored within a federated area that may be specified by a URL. By way of still another example, a request may be received for a DAG that includes task routines for all of the tasks identified within a specified job flow definition. And, by way of yet another example, a request may be received for a DAG that includes all of the task routines specified by their identifiers in an instance log of a previous performance of a job flow. Regardless of the exact manner in which one or more tasks and/or task routines may be specified in a request for inclusion within a DAG, each task routine that is directly identified or that is specified indirectly through the flow task identifier of the task it performs may be searched for within one or more federated areas as earlier described.

In situations in which a DAG is requested that is to include multiple tasks and/or task routines, the DAG may be generated to indicate any dependencies thereamong. In some embodiments, a visualization of the DAG may be generated to provide a visual indication of such a dependency, such as a line, arrow, color coding, graphical symbols and/or other form of visual connector indicative of the dependency may be generated within the visualization to visually link an output of the one task routine to an input of the other. In embodiments in which the parsing of task routines and/or of job flows includes comparisons between pieces of information that may result in the detection of discrepancies in such details as dependencies among tasks and/or among task routines, such discrepancies may be visually indicated in a DAG in any of a variety of ways. By way of example, a DAG may be generated to indicate such discrepancies with color coding, graphical symbols and/or other form of visual indicator positioned at or adjacent to the graphical depiction of the affected input or output in the DAG. Such a visual indicator may thereby serve as a visual prompt to personnel viewing the DAG to access the affected task routine(s) and/or affected job flow definition to examine and/or correct the discrepancy. Alternatively or additionally, at least a pair of alternate DAGs may be generated, and personnel may be provided with a user interface (UI) that enables "toggling" therebetween and/or a side-by-side comparison, where one DAG is based on the details of inputs and/or outputs provided by comments while another DAG is based on the manner in which those details are actually implemented in executable code.

In some embodiments, with a DAG generated and visually presented for viewing by personnel involved in the development of new task routines and/or new job flow definitions, such personnel may be provided with a UI that enables editing of the DAG. More specifically, a UI may be provided that enables depicted dependencies between inputs and outputs of task routines to be removed or otherwise changed, and/or that enables new dependencies to be added. Through the provision of such a UI, personnel involved in the development of new task routines and/or new job flow definitions may be able to define a new job flow by modifying a DAG generated from one or more task routines. Indeed, the one or more task routines may be selected for inclusion in a DAG for the purpose of having them available in the DAG for inclusion in the new job flow. Regardless of whether or not a DAG generated from one or more task routines is edited as has just been described, a UI may be provided to enable personnel to choose to save the DAG as a new job flow definition. Regardless of whether the DAG is saved for use as a job flow definition, or simply to retain the DAG for future reference, the DAG may be stored as a script generated in a process description language such as business process model and notation (BPMN) promulgated by the Object Management Group of Needham, Mass., USA.

As an alternative to receiving a request to generate a DAG based on at least one or more task routines, a request may be received by one or more federated devices from another device to provide the other device with objects needed to enable the other device to so generate a DAG. In some embodiments, such a request may be treated in a manner similar to earlier described requests to retrieve objects needed to enable another device to perform a job flow with most recent versions of task routines or to repeat a past performance of a job flow, as documented by an instance log. However, in some embodiments, the data structure(s) generated from parsing task routines and/or a job flow definition may be transmitted to the other device in lieu of transmitting the task routines, themselves. This may be deemed desirable as a mechanism to reduce the quantity of information transmitted to the other device for its use in generating a DAG.

Regardless of whether a requested DAG is to include a depiction of a single task routine or of multiple task routines, it may be that, prior to the receipt of the request for the DAG, one or more of the task routines to be depicted therein may have been test executed to observe their input/output behavior within a container environment as previously described. As also previously discussed, an indication of the input/output behavior observed under such container environment conditions for each task routine so tested may be stored in any of a variety of ways to enable its subsequent retrieval. It may be that an indication of the input/output behavior that was observed may be positioned next to the depiction of a corresponding task routine within the requested DAG.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
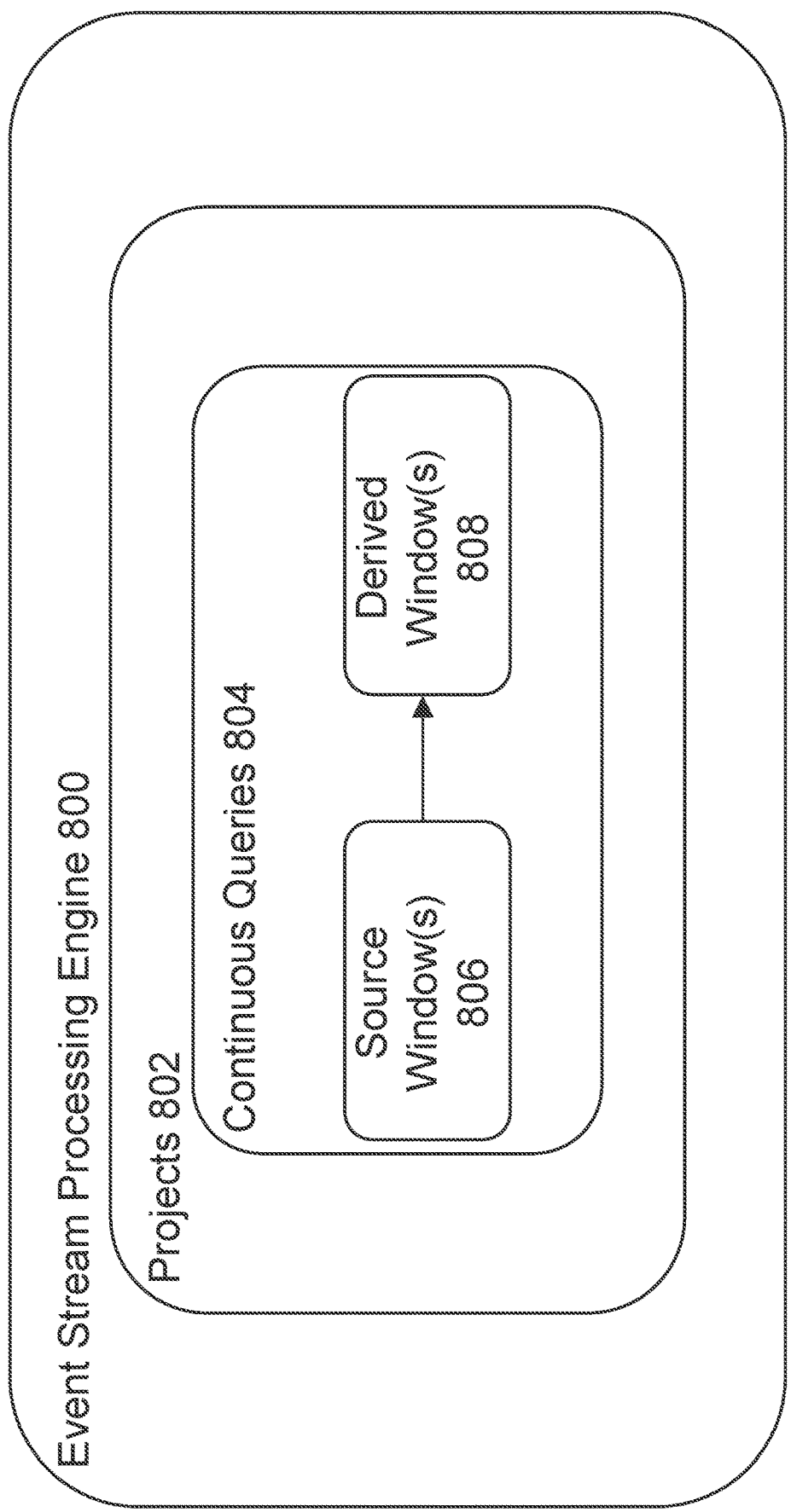
FIG. 8 illustrates a block diagram including components of an Event Stream Processing Engine (ESPE), according to embodiments of the present technology.
Figure 9:
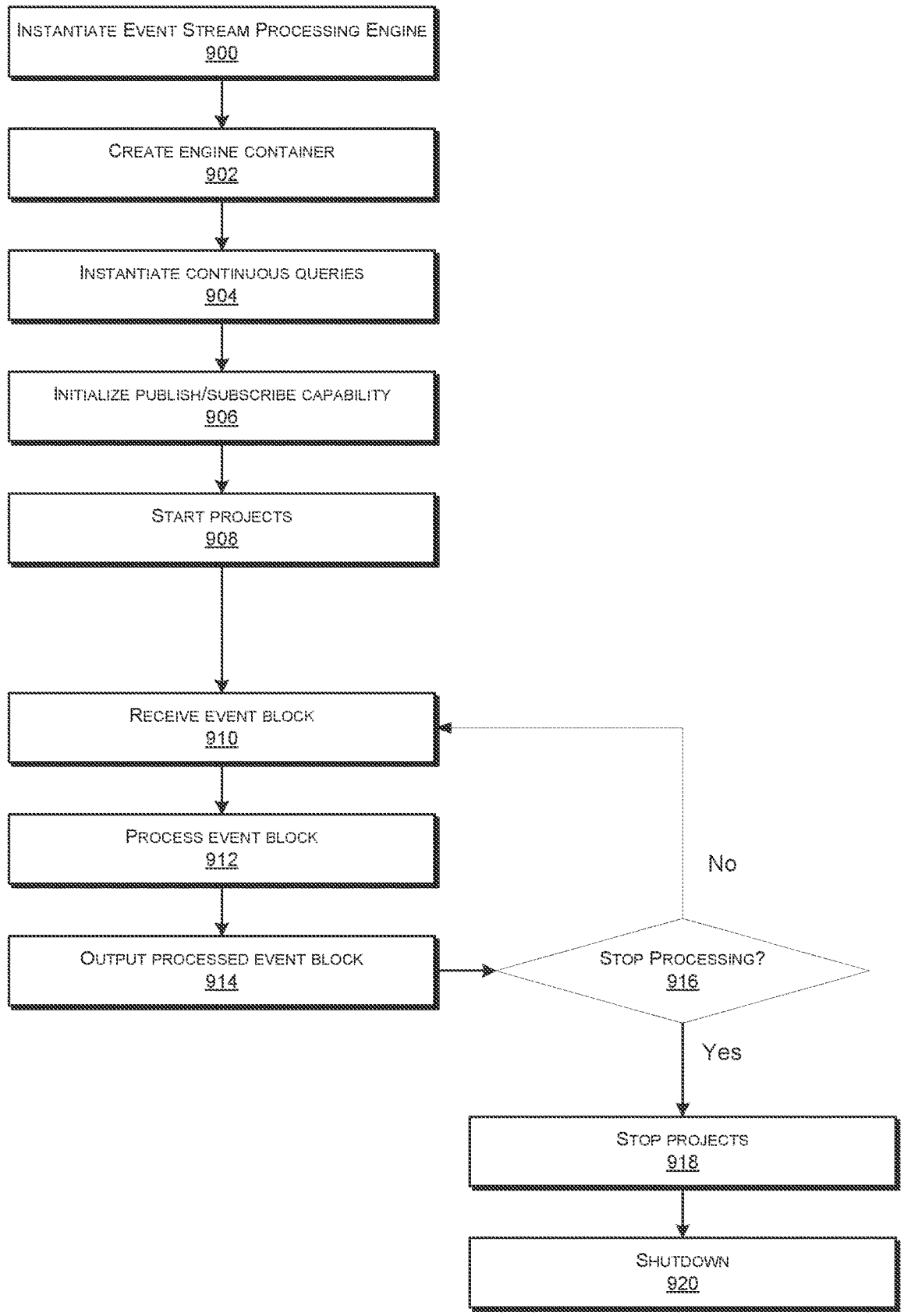
FIG. 9 illustrates a flow chart showing an example process including operations performed by an event stream processing engine, according to some embodiments of the present technology.
Figure 10:
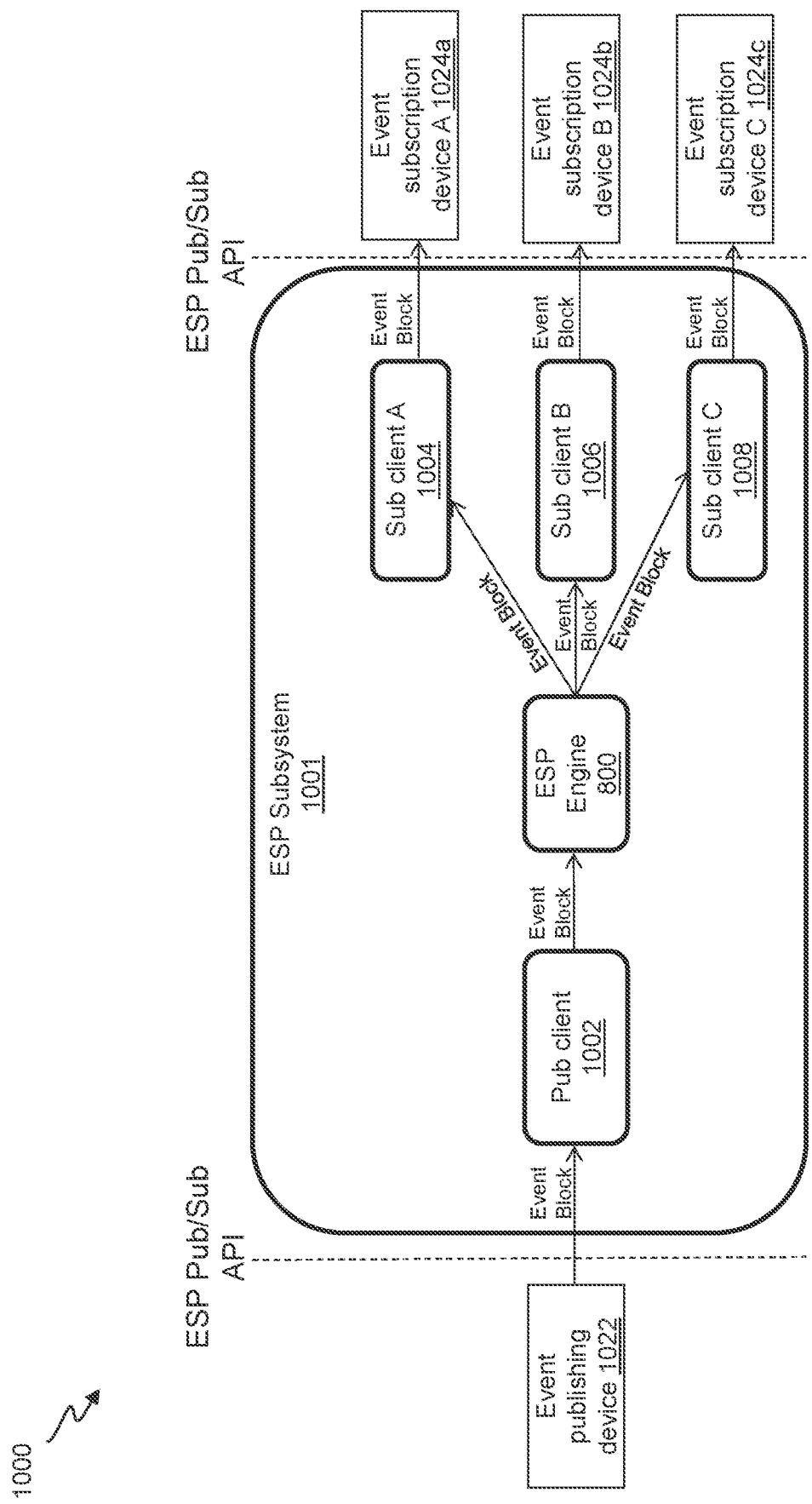
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
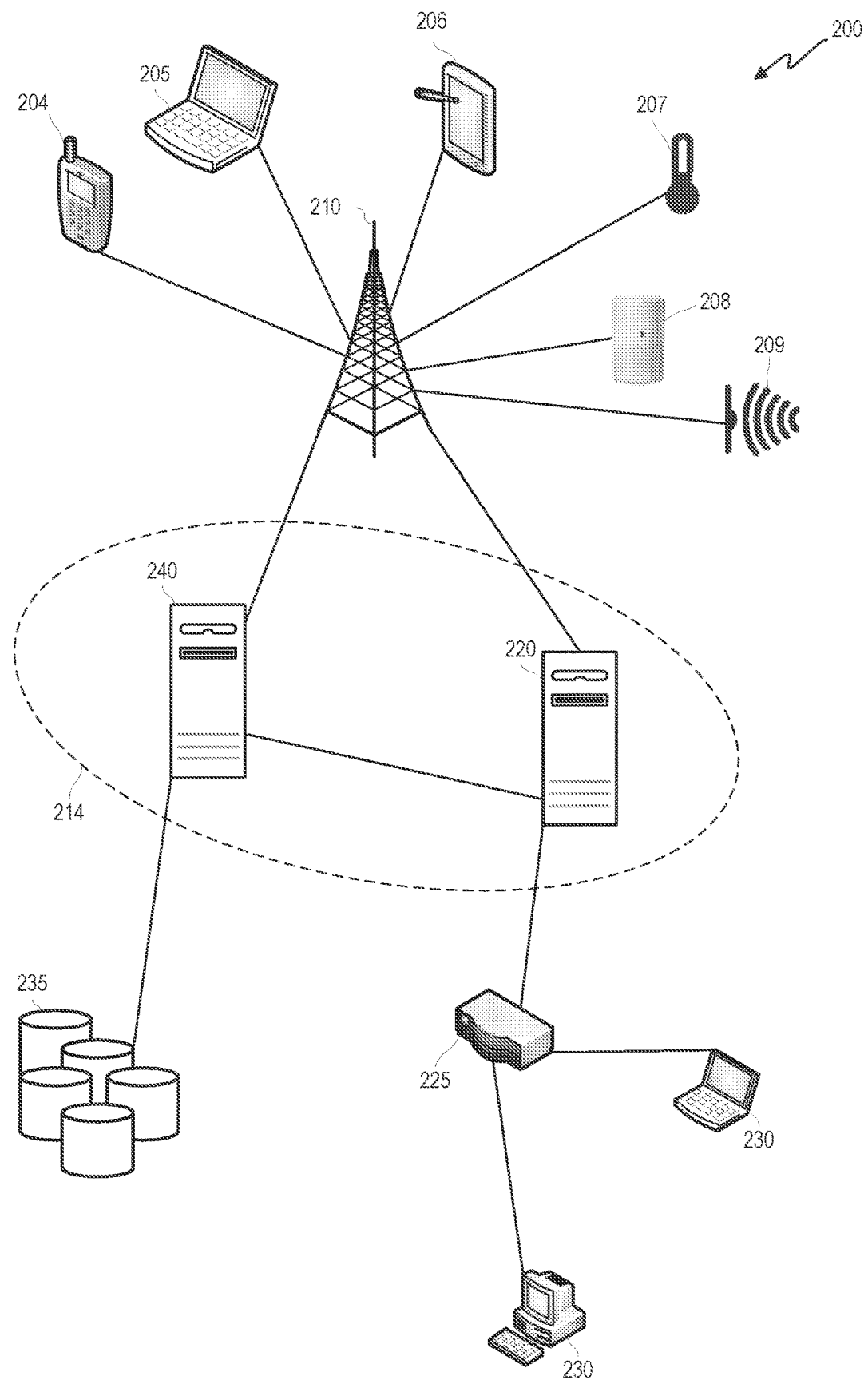
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
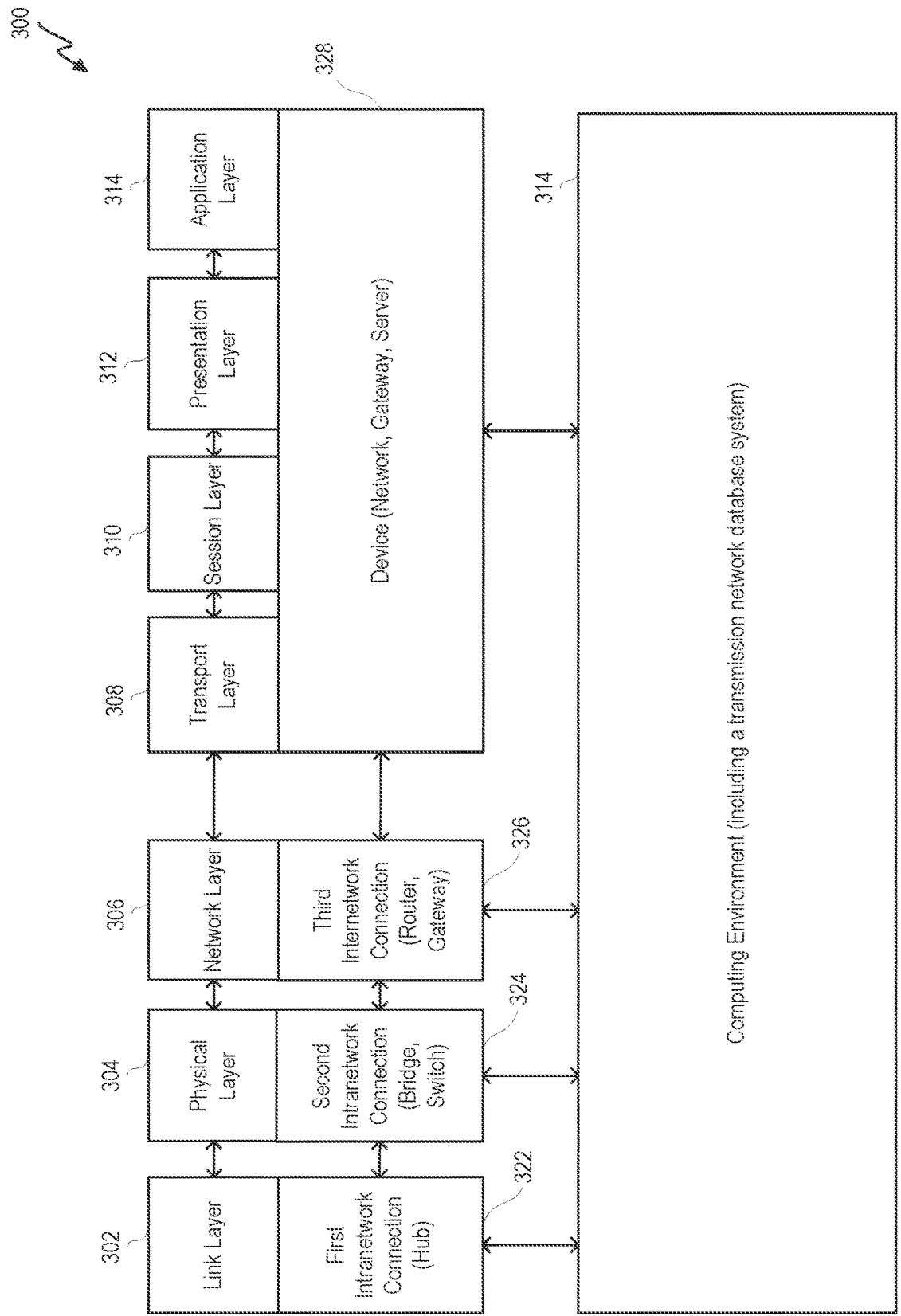
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
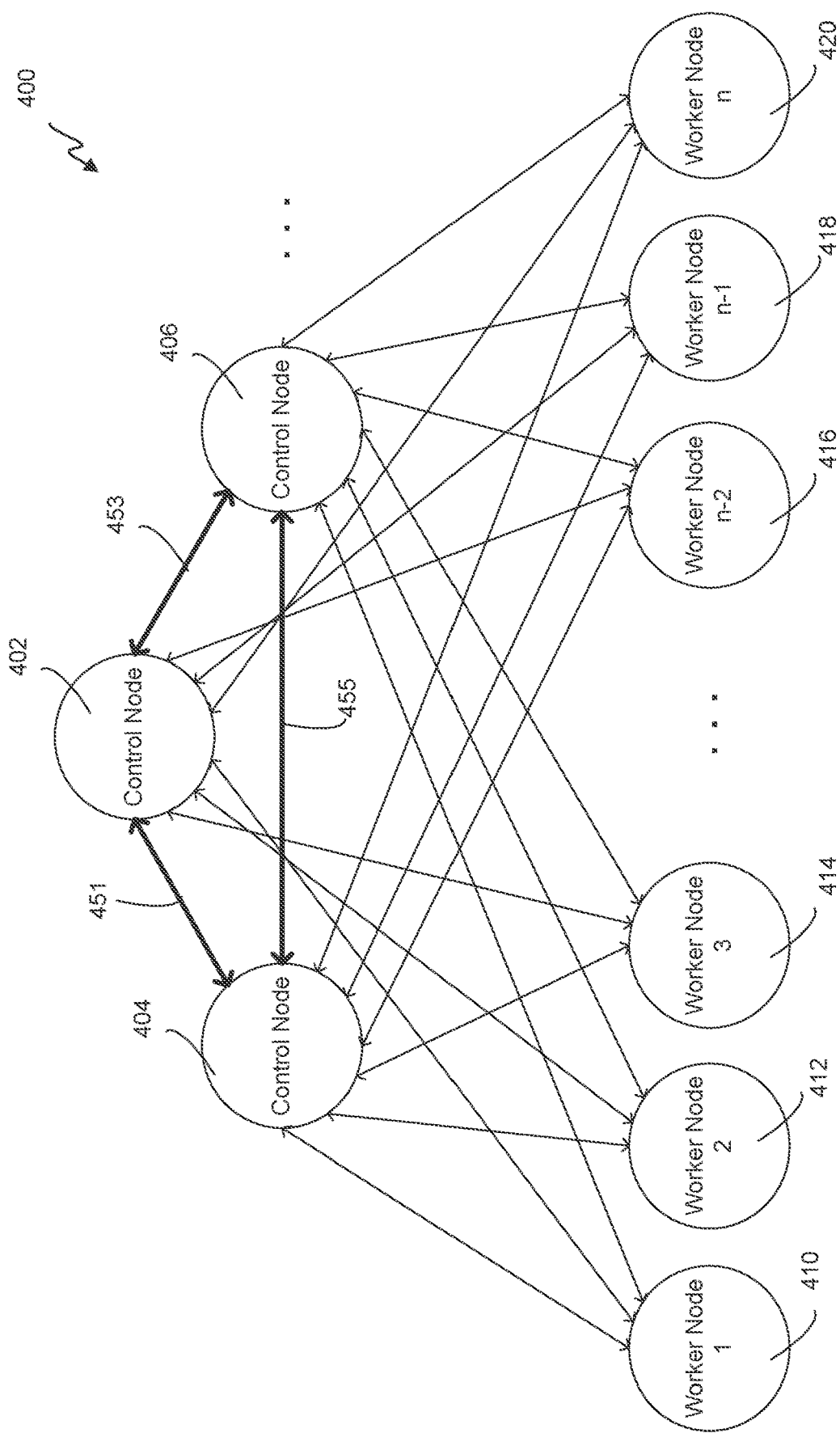
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
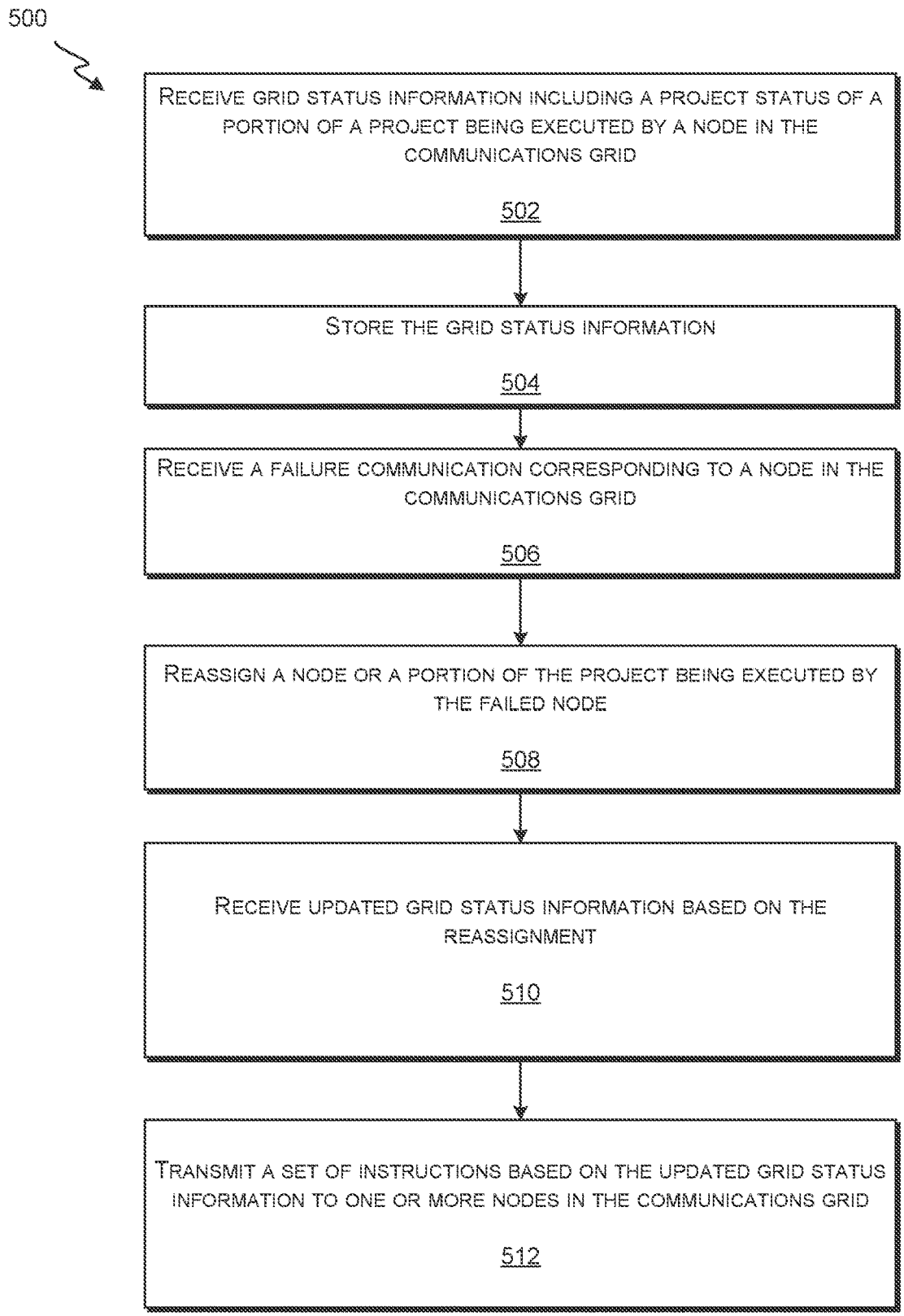
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
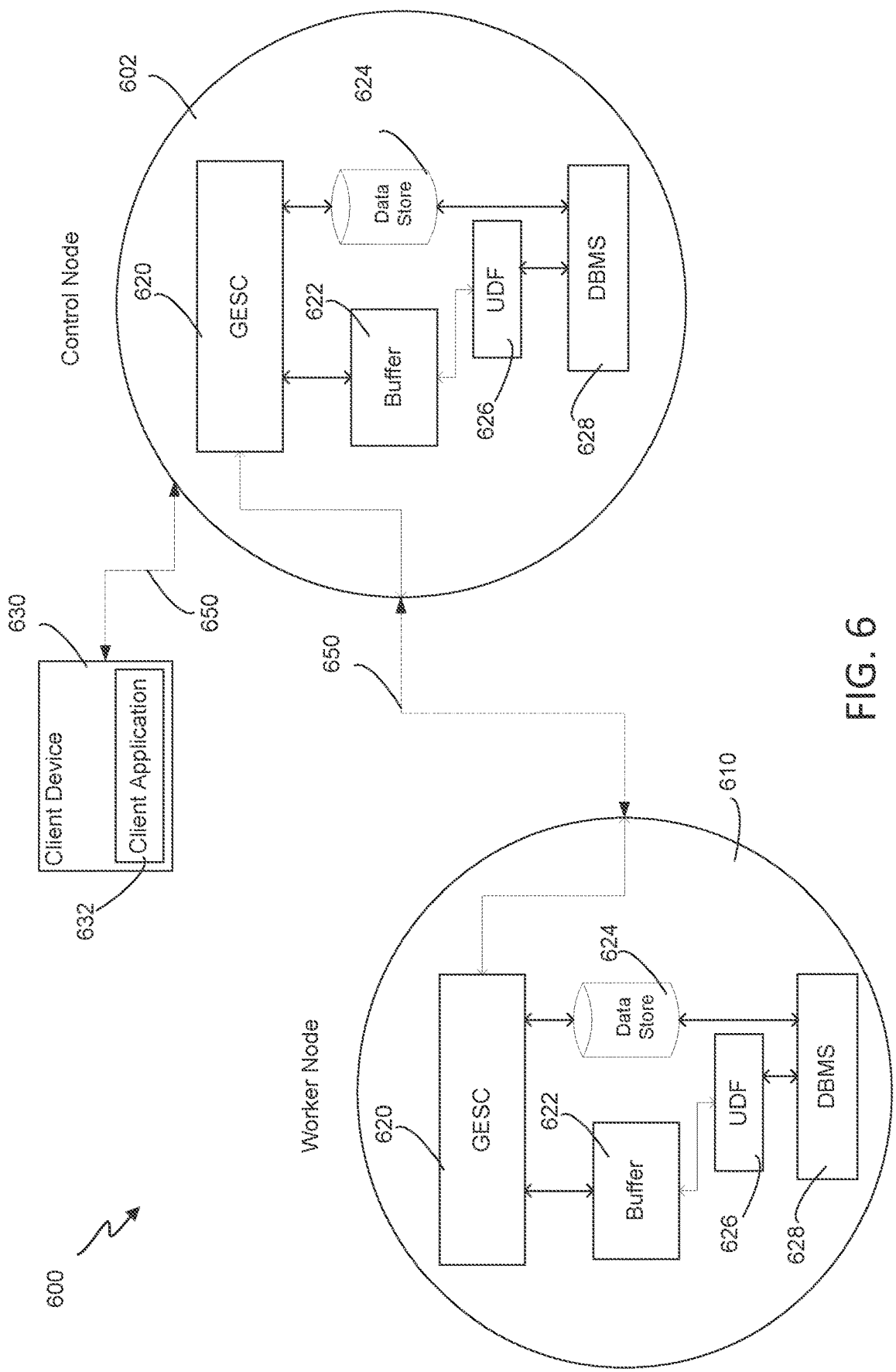
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
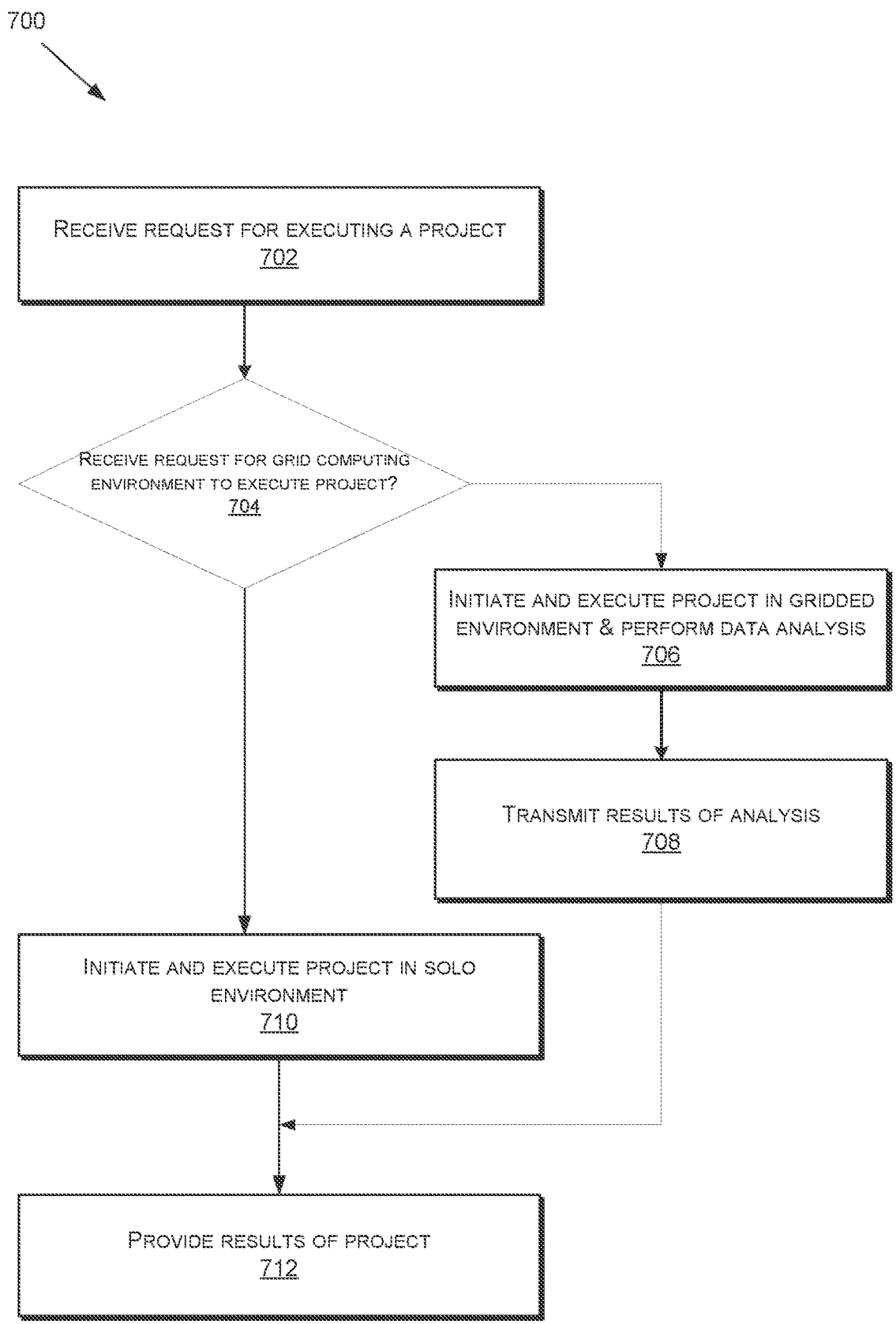
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
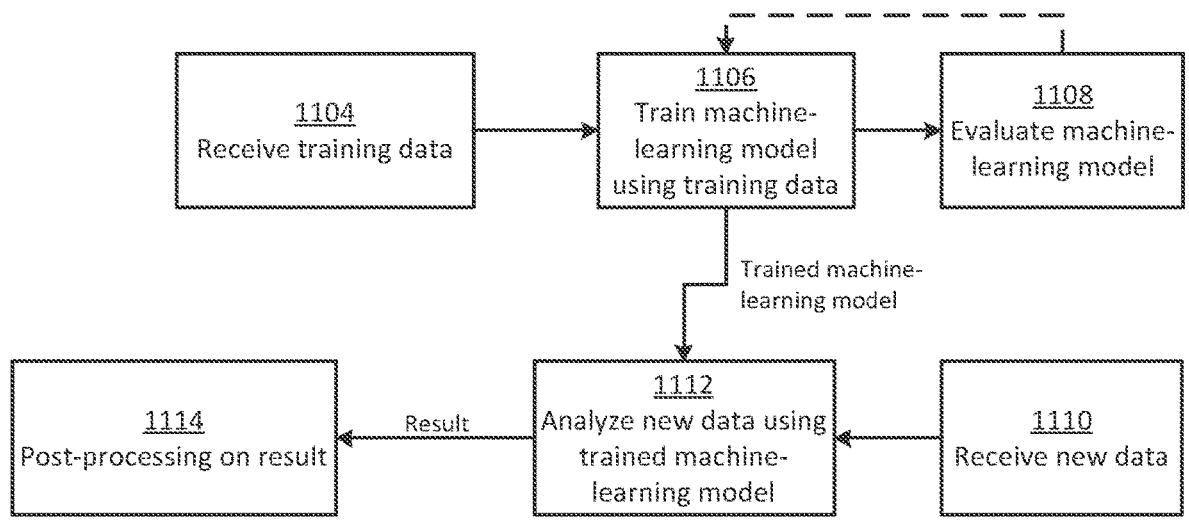
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
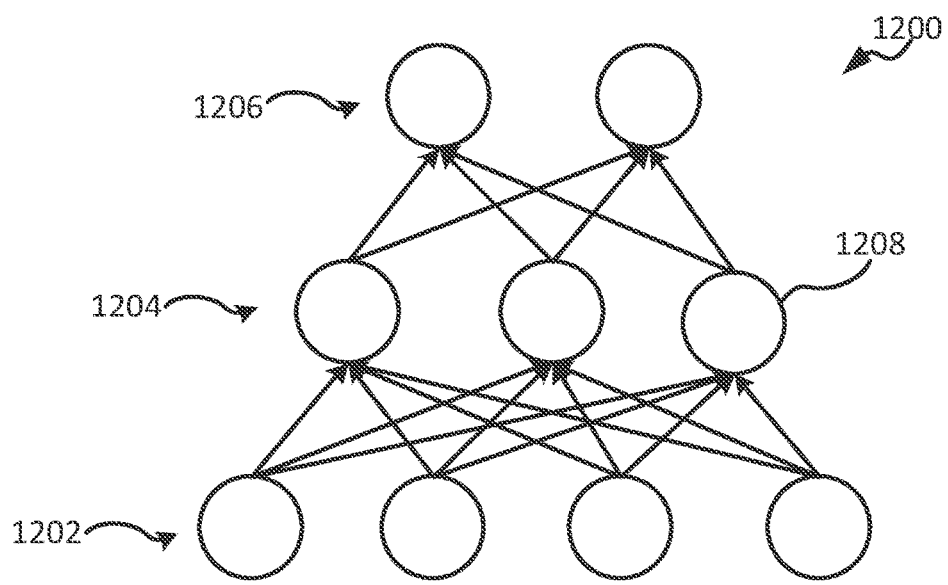
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
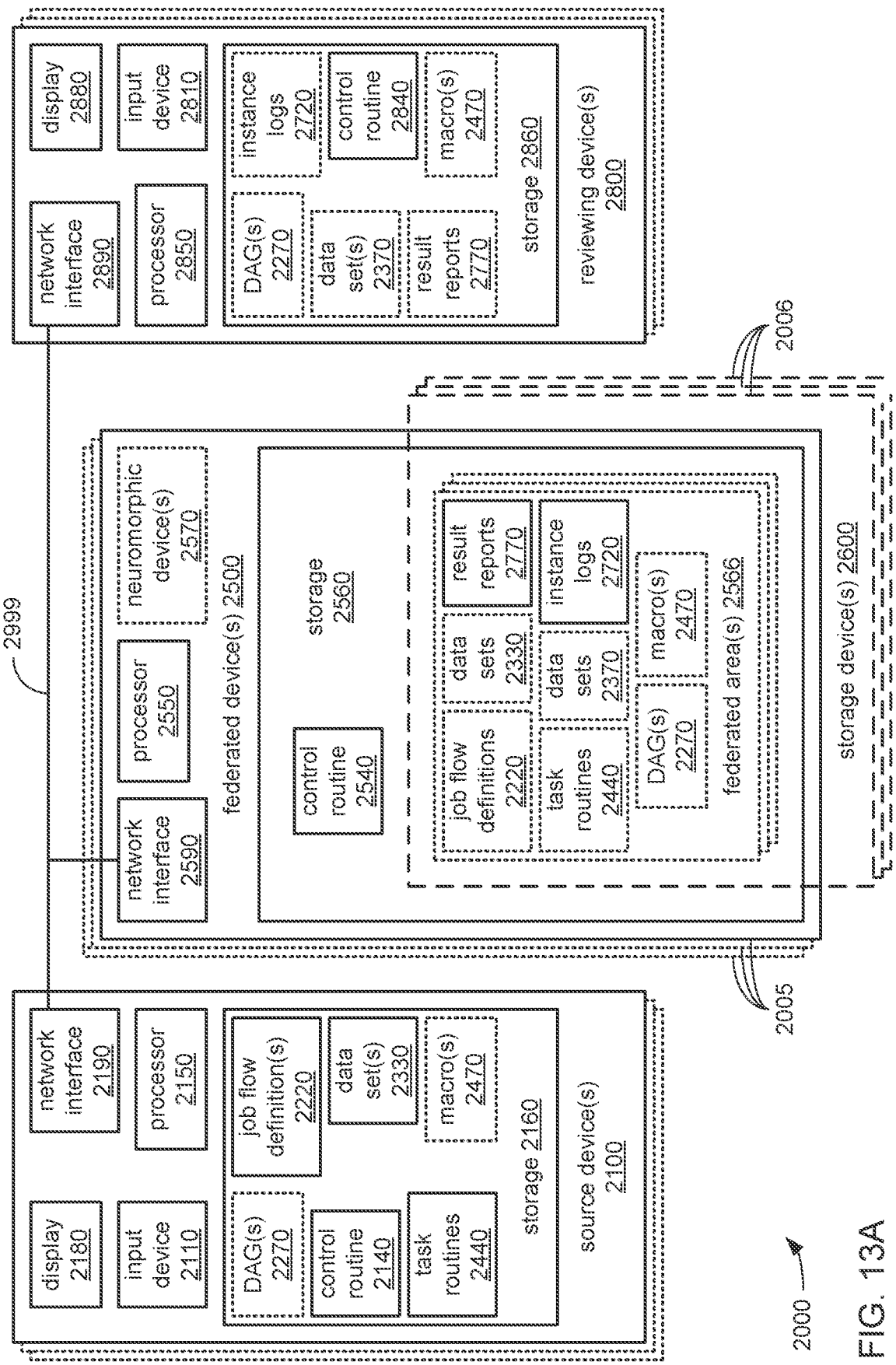
FIGS. 13A, 13B, 13C and 13D, together, illustrate an example embodiment of a distributed processing system.
Figure 13B:
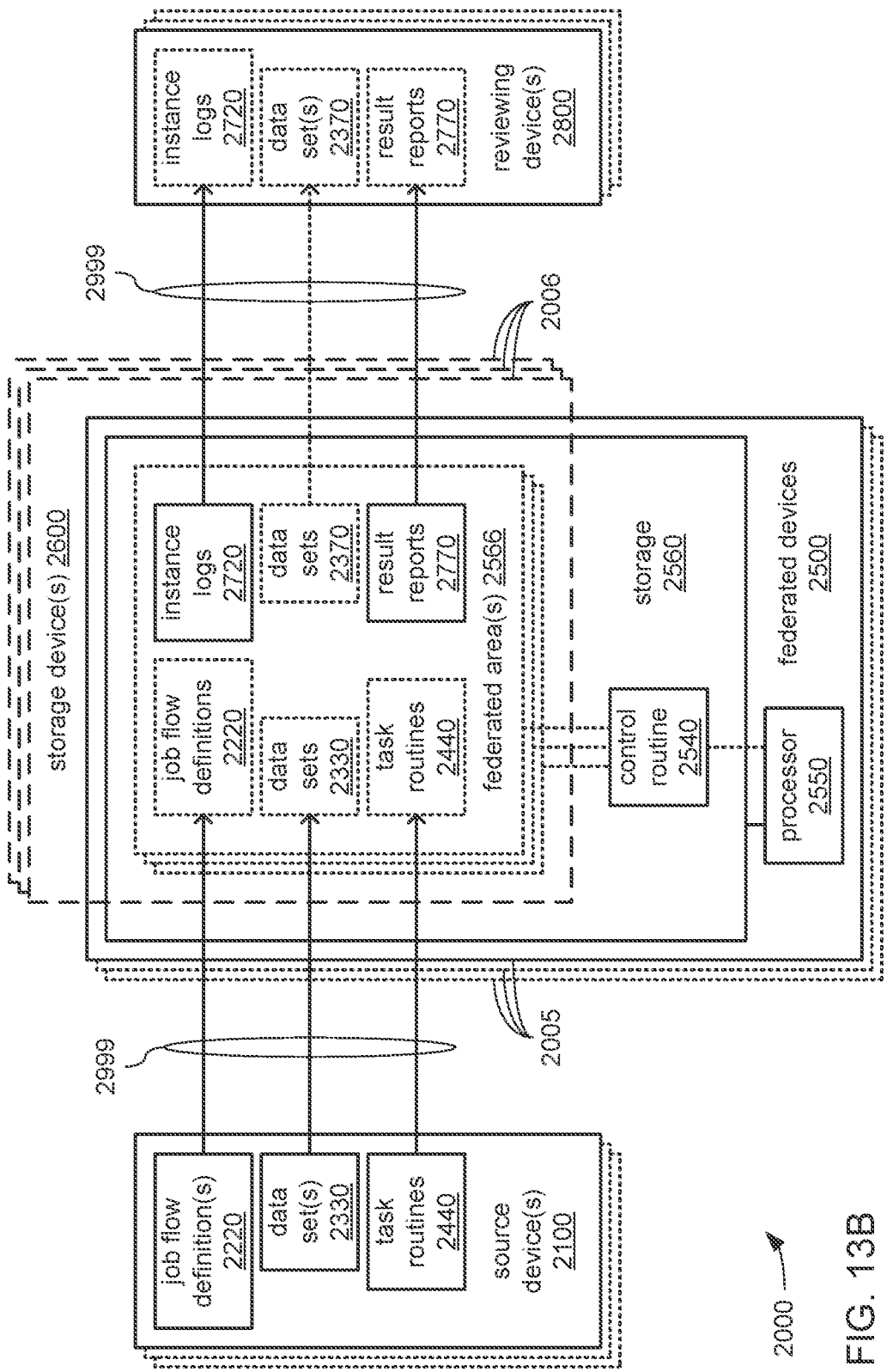
Figure 13C:
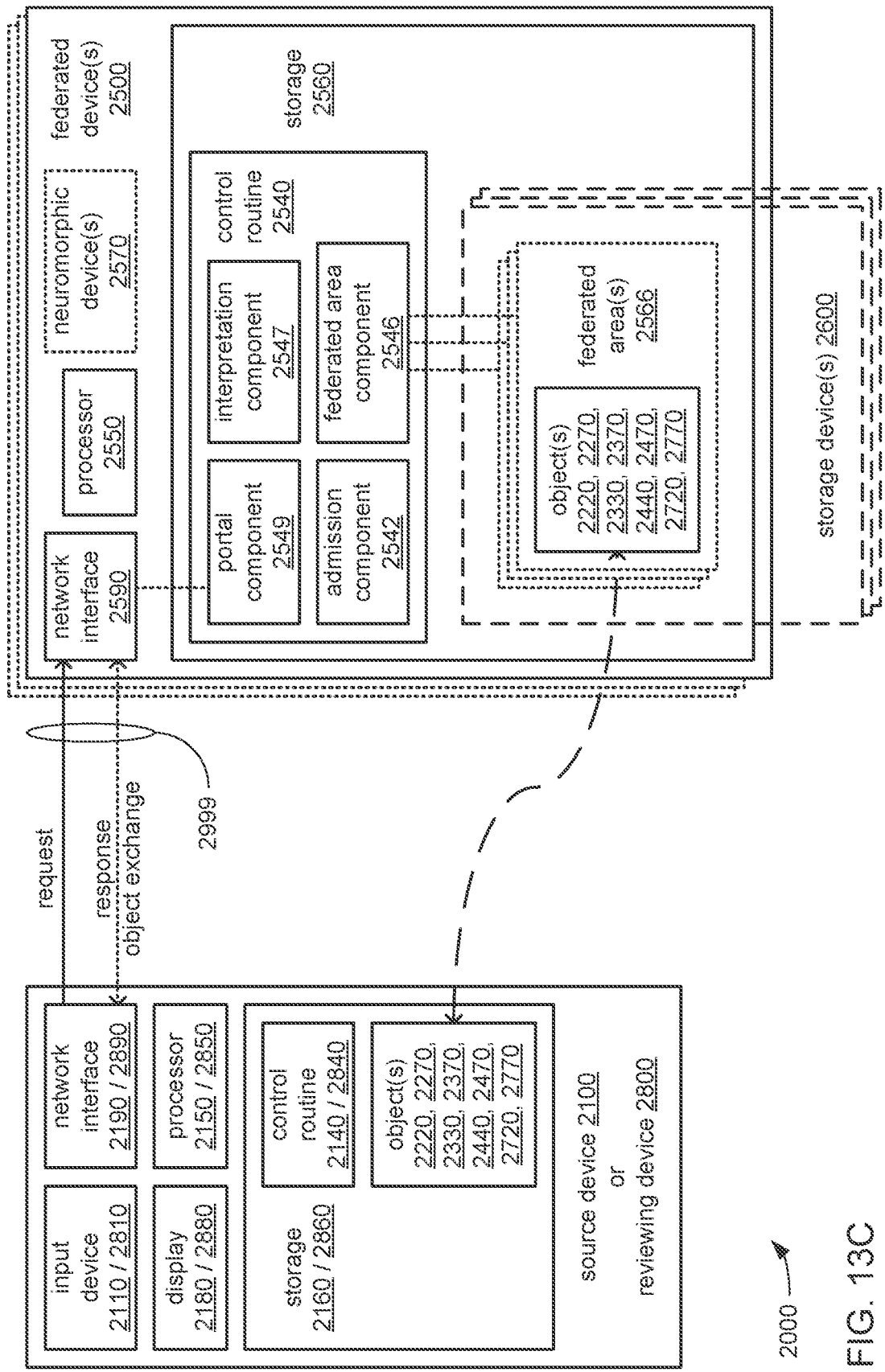
Figure 13D:
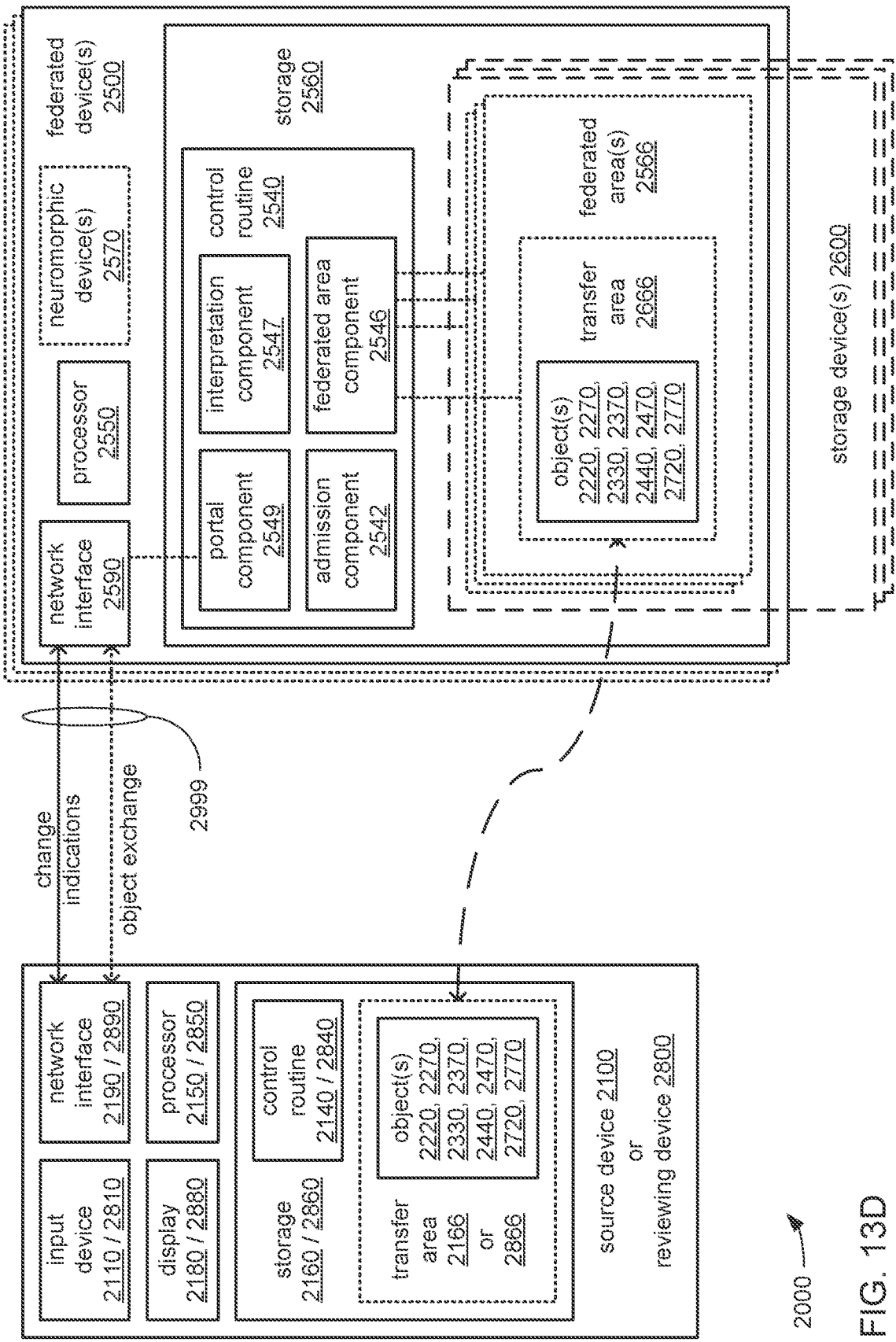

FIG. 13A is a block diagram of an example embodiment of a distributed processing system 2000 incorporating one or more source devices 2100, one or more reviewing devices 2800, one or more federated devices 2500 that may form a federated device grid 2005, and/or one or more storage devices 2600 that may form a storage device grid 2006. FIG. 13B illustrates exchanges, through a network 2999, of communications among the devices 2100, 2500, 2600 and/or 2800 associated with the controlled storage of, access to and/or performance of job flows of analyses associated with various objects within one or more federated areas 2566. FIG. 13C illustrates embodiments in which such exchanges are performed in response to requests from the devices 2100 and/or 2800. FIG. 13D illustrates embodiments in which such exchanges are performed as part of a pre-arranged synchronization of storage spaces among the devices 2100, 2500, 2600 and/or 2800.

Referring to both FIGS. 13A and 13B, such communications may include the exchange of objects for the performance of job flows that may be stored within the one or more federated areas 2566, such as job flow definitions 2220, directed acyclic graphs (DAGs) 2270, data sets 2330 and/or 2370, task routines 2440, macros 2470 and/or result reports 2770. However, one or more of the devices 2100, 2500, 2600 and/or 2800 may also exchange, via the network 2999, other data entirely unrelated to any object stored within any federated area 2566. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the one or more source devices 2100 may incorporate one or more of an input device 2110, a display 2180, a processor 2150, a storage 2160 and a network interface 2190 to couple each of the one or more source devices 2100 to the network 2999. The storage 2160 may store a control routine 2140, one or more job flow definitions 2220, one or more DAGs 2270, one or more data sets 2330, one or more task routines 2440 and/or one or more macros 2470. The control routine 2140 may incorporate a sequence of instructions operative on the processor 2150 of each of the one or more source devices 2100 to implement logic to perform various functions. In embodiments in which multiple ones of the source devices 2100 are operated together as a grid of the source devices 2100, the sequence of instructions of the control routine 2140 may be operative on the processor 2150 of each of those source devices 2100 to perform various functions at least partially in parallel with the processors 2150 of others of the source devices 2100.

In some embodiments, one or more of the source devices 2100 may be operated by persons and/or entities (e.g., scholastic entities, governmental entities, business entities, etc.) to generate and/or maintain analysis routines, that when executed by one or more processors, causes an analysis of data to be performed. In such embodiments, execution of the control routine 2140 may cause the processor 2150 to operate the input device 2110 and/or the display 2180 to provide a user interface (UI) by which an operator of the source device 2100 may use the source device 2100 to develop such analysis routines and/or to test their function-ality by causing the processor 2150 to execute such routines. As will be explained in greater detail, a rule imposed in connection with such use of a federated area 2566 may be that routines to be stored and/or executed therein are required to be divided up into a combination of a set of objects, including a set of task routines 2440 and a job flow definition 2220. Each of the task routines 2440 performs a distinct task, and the job flow definition 2220 defines the analysis to be performed as a job flow as a combination of tasks to be performed in a particular order through the execution of the set of task routines 2440 in that particular order to thereby perform the job flow. Thus, the source device 2100 may be used in generating such objects which may then be stored within one or more federated areas 2566.

The tasks that each of the task routines 2440 may cause a processor to perform may include any of a variety of data analysis tasks, data transformation tasks and/or data normalization tasks. The data analysis tasks may include, and are not limited to, searches and/or statistical analyses that entail derivation of approximations, numerical characterizations, models, evaluations of hypotheses, and/or predictions (e.g., a prediction by Bayesian analysis of actions of a crowd trying to escape a burning building, or of the behavior of bridge components in response to a wind forces). The data transformation tasks may include, and are not limited to, sorting, row and/or column-based mathematical operations, row and/or column-based filtering using one or more data items of a row or column, and/or reordering data items within a data object. The data normalization tasks may include, and are not limited to, normalizing times of day, dates, monetary values (e.g., normalizing to a single unit of currency), character spacing, use of delimiter characters (e.g., normalizing use of periods and commas in numeric values), use of formatting codes, use of big or little Endian encoding, use or lack of use of sign bits, quantities of bits used to represent integers and/or floating point values (e.g., bytes, words, doublewords or quadwords), etc.

In some embodiments, the UI provided by one or more of the source devices 2100 may take the form of a touch-sensitive device paired with a stylus that serves to enable sketch input by an operator of a source device 2100. As will be familiar to those skilled in the art, this may entail the combining of the display 2180 and the input device 2110 into a single UI device that is able to provide visual feedback to the operator of the successful sketch entry of visual tokens and of text. Through such sketch input, the operator may specify aspects of a GUI that is to be provided during a performance of a job flow to provide an easier and more intuitive user interface by which a user may provide input needed for the performance of that job flow. Following recognition and interpretation of the visual tokens and/or text within the sketch input, a set of executable GUI instructions to implement the GUI may be stored as part of a job flow definition 2220 for such a job flow.

In some embodiments, one or more of the source devices 2100 may, alternatively or additionally, serve to assemble one or more flow input data sets 2330. In such embodiments, execution of the control routine 2140 by the processor 2150 may cause the processor 2150 to operate the network interface 2190, the input device 2110 and/or one or more other components (not shown) to receive data items and to assemble those received data items into one or more of the data sets 2330. By way of example, one or more of the source devices 2100 may incorporate and/or be in communication with one or more sensors to receive data items associated with the monitoring of natural phenomena (e.g., geological or meteorological events) and/or with the performance of a scientific or other variety of experiment (e.g., a thermal camera or sensors disposed about a particle accelerator). By way of another example, the processor 2150 of one or more of the source devices 2100 may be caused by its execution of the control routine 2140 to operate the network interface 2190 to await transmissions via the network 2999 from one or more other devices providing at least at portion of at least one data set 2330.

Regardless of the exact manner in which flow input data sets 2330 are generated, each flow input data set 2330 may include any of a wide variety of types of data associated with any of a wide variety of subjects. By way of example, each flow input data set 2330 may include scientific observation data concerning geological and/or meteorological events, or from sensors employed in laboratory experiments in areas such as particle physics. By way of another example, the each flow input data set 2330 may include indications of activities performed by a random sample of individuals of a population of people in a selected country or municipality, or of a population of a threatened species under study in the wild.

In various embodiments, each of the one or more reviewing devices 2800 may incorporate one or more of an input device 2810, a display 2880, a processor 2850, a storage 2860 and a network interface 2890 to couple each of the one or more reviewing devices 2800 to the network 2999. The storage 2860 may store a control routine 2840, one or more DAGs 2270, one or more data sets 2370, one or more macros 2470, one or more instance logs 2720, and/or one or more result reports 2770. The control routine 2840 may incorporate a sequence of instructions operative on the processor 2850 of each of the one or more reviewing devices 2800 to implement logic to perform various functions. In embodiments in which multiple ones of the reviewing devices 2800 are operated together as a grid of the reviewing devices 2800, the sequence of instructions of the control routine 2840 may be operative on the processor 2850 of each of those reviewing devices 2800 to perform various functions at least partially in parallel with the processors 2850 of others of the reviewing devices 2800.

In some embodiments, one or more of the reviewing devices 2800 may be operated by persons and/or entities (e.g., scholastic entities, governmental entities, business entities, etc.) to utilize and/or perform reviews of analysis routines that have been stored in one or more federated areas 2566 as a set of objects, such as a set of task routines 2440 and a job flow definition 2220. In such embodiments, execution of the control routine 2840 may cause the processor 2850 to operate the input device 2810 and/or the display 2880 to provide a user interface by which an operator of the reviewing device 2800 may use the reviewing device 2800 to view result reports 2770 and/or instance logs 2720 generated by new and/or past performances of job flows. Alternatively, an operator of the reviewing device 2800 may use the reviewing device 2800 to audit aspects of new and/or past performances of job flows, including selections of flow input data sets 2330 used, selections of task routines 2440 used, and/or mid-flow data sets 2370 that were generated and exchanged between task routines 2440, as well as viewing result reports 2770 and/or instance logs 2720. By way of example, the operator of one of the reviewing devices 2800 may be associated with a scholastic, governmental or business entity that seeks to review a performance of a job flow of an analysis that was created by another entity. Such a review may be a peer review between two or more entities involved in scientific or other research, and may be focused on confirming assumptions on which algorithms were based and/or the correctness of the performance of those algorithms. Alternatively, such a review may be part of an inspection by a government agency into the quality of the analyses performed by and relied upon by a business in making decisions and/or assessing its own financial soundness, and may seek to confirm whether correct legally required calculations were used.

In various embodiments, each of the one or more federated devices 2500 may incorporate one or more of a processor 2550, a storage 2560, one or more neuromorphic devices 2570, and a network interface 2590 to couple each of the one or more federated devices 2500 to the network 2999. The storage 2560 may store a control routine 2540. In some embodiments, part of the storage 2560 may be allocated for at least a portion of one or more federated areas 2566. In other embodiments, each of the one or more federated devices 2500 may incorporate and/or be coupled to one or more storage devices 2600 within which storage space may be allocated for at least a portion of one or more federated areas 2566. Regardless of where storage space is allocated for one or more federated areas 2566, each of the one or more federated areas 2566 may hold one or more objects such as one or more job flow definitions 2220, one or more DAGs 2270, one or more flow input data sets 2330, one or more task routines 2440, one or more macros 2470, one or more instance logs 2720, and/or one or more result reports 2770. In embodiments in which a job flow is performed by the one or more federated devices 2500 within a federated area 2566, such a federated area 2566 may at least temporarily hold one or more mid-flow data sets 2370 during times when one or more of the mid-flow data sets 2370 are generated by and exchanged between task routines 2440 during the performance of the job flow. In embodiments in which a DAG 2270 is generated by the one or more federated devices 2500 within a federated area 2566, such a federated area 2566 may at least temporarily hold one or more macros 2470 during times when one or more of the macros 2470 are generated as part of generating the DAG 2270.

In some embodiments that include the one or more storage devices 2600 in addition to the one or more federated devices 2500, the maintenance of the one or more federated areas 2566 within such separate and distinct storage devices 2600 may be part of an approach of specialization between the federated devices 2500 and the storage devices 2600. More specifically, there may be numerous ones of the federated devices 2500 forming the grid 2005 in which each of the federated devices 2500 may incorporate processing and/or other resources selected to better enable the execution of task routines 2440 as part of performing job flows defined by the job flow definitions 2220, the generation of DAGs 2270, and/or other processing functions associated with developing, performing and/or analyzing aspects of job flows. Correspondingly, there may be numerous ones of the storage devices 2600 forming the grid 2006 in which the storage devices 2600 may be organized and interconnected in a manner providing a distributed storage system that may provide increased speed of access to objects within each of the one or more federated areas 2566 through parallelism, and/or may provide fault tolerance of storage. Such distributed storage may also be deemed desirable to better accommodate the storage of particularly large ones of the data sets 2330 and/or 2370, as well as any particularly large data sets that may be incorporated into one or more of the result reports 2770.

The control routine 2540 may incorporate a sequence of instructions operative on the processor 2550 of each of the one or more federated devices 2500 to implement logic to perform various functions. In embodiments in which multiple ones of the federated devices 2500 are operated together as the grid 2005 of the federated devices 2500, the sequence of instructions of the control routine 2540 may be operative on the processor 2550 of each of the federated devices 2500 to perform various functions at least partially in parallel with the processors 2550 of others of the federated devices 2500. As will be described in greater detail, among such functions may be the at least partially parallel performance of job flows defined by one or more of the job flow definitions 2220, which may include the at least partially parallel execution of one or more of the task routines 2440 to perform tasks specified by the one or more job flow definitions 2220. As will also be described in greater detail, also among such functions may be the operation of the one or more neuromorphic devices 2570 to instantiate, develop and/or utilize one or more neural networks, or one or more neural network ensembles, to enable neuromorphic processing to be employed in the performance of one or more tasks and/or job flows. Where such functions are performed, one or more data sets 2330 and/or 2370 that include hyperparameters and/or trained parameters of one or more neural networks may be generated, analyzed, modified and/or transferred as a result of the performances of those functions.

Turning to FIG. 13C, as depicted, the control routine 2540 may include a federated area component 2546 to cause the processor(s) 2550 of the one or more federated devices 2500 to maintain one or more federated areas 2566 within the storage 2560 of each of the one or more federated devices 2500 and/or within the one or more storage devices 2600. Many of the operations that the processor(s) 2550 of the one or more federated devices 2500 may be caused to perform by execution of the control routine 2540, including the instantiation, maintenance and/or un-instantiation of the one or more federated areas 2566, may be in response to requests received via the network 2999 from the one or more source devices 2100 and/or from the one or more reviewing devices 2800. Also, many of such received requests may entail the exchange of one or more objects.

As also depicted, the control routine 2540 may also include a portal component 2549 to cause the processor(s) 2550 of the one or more federated devices 2500 to limit access to the one or more federated areas 2566 to particular authorized persons and/or particular authorized devices that may be associated with one or more particular corporate, governmental, scholastic and/or other types of entities. Correspondingly, the processor(s) 2150 of the one or more source devices 2100 may be caused by execution of the control routine 2140 to provide a UI that enables an operator thereof to send such requests to the one or more federated devices 2500, and/or the processor(s) 2850 of the one or more reviewing devices 2800 may be caused by execution of the control routine 2840 to provide a UI that enables an operator thereof to do so. The processor(s) 2550 of the one or more control devices 2500 may be caused by the portal component 2549 to cooperate, via the network 2999, with the requesting device 2100 or 2800 to cause the UI provided thereby to present the operator thereof with a request for a password or other security credential to verify that the operator and/or the requesting device 2100 or 2800 is authorized to make the particular request that has been made.

Alternatively or additionally, some interactions between a requesting device 2100 or 2800, including requests that may be transmitted via the network 2999 to the one or more federated devices 2566, may be automated. In embodiments in which such automated requests are made, the requesting device 2100 or 2800 may automatically provide security credentials to the one or more federated devices 2500 to verify that the requesting device 2100 or 2800 is authorized to make the particular request that has been made.

As further depicted, the control routine 2540 may also include an interpretation component 2547 to cause the processor(s) 2550 of the one or more federated devices 2500 to, in response to any of a variety of error conditions that may arise in performing a requested operation and/or in response to instances in which a request is to be denied, generate a graphical indication of the error and/or the cause for denial. Such a graphical indication may take the form of a DAG 2270 that provides a visual indication of an error or other condition within an object and/or between two or more objects, and may entail interpreting portions of executable instructions, definitions of job flows, specifications of input and/or output interfaces, comments written by programmers, etc., within such objects as job flow definitions 2220, task routines 2440 and/or instance logs 2720. Upon being generated, the processor(s) 2550 may be caused by the portal component 2549 to relay such graphical indications (e.g., DAGs 2270) to the requesting device to be visually presented to an operator thereof and/or stored therein for a future visual presentation to an operator thereof.

Among such requests may be a request to store one or more objects within a federated area 2566, to access one or more objects stored within a federated area 2566 and/or to delete one or more objects stored within a federated area 2566. As depicted, the control routine 2540 may include an admission component 2542 to cause the processor(s) 2550 of the one or more federated devices 2500 to apply a set of rules that place constraints on the storage of objects within federated areas and/or the removal of objects therefrom to ensure that job flows are able to be fully performed and/or that past performances of job flows are able to be repeated as part of being scrutinized. In so applying such rules, the processor(s) 2550, in response to the request, may fully or partially carry out the requested operations, which may result in the exchange of one or more objects via the network 2999 between the requesting device 2100 or 2800 and the one or more federated devices 2500, depending on the application of such a set of rules. Alternatively, in response, the processor(s) 2550 may transmit an indication of a refusal, via the network 2999 and to the requesting device, to carry out the requested operations, depending on the application of such a set of rules. Such an indication may include a DAG 2270 that visually presents an indication of the reason for the refusal.

Among such requests may be a request for the one or more federated devices 2500 to convert a spreadsheet data structure into a set of objects required for the performance of an analysis as a job flow, and to store those generated objects within a federated area 2566. Such a spreadsheet data structure may contain one or more two-dimensional arrays of data and multiple formulae for the performance of the analysis. In response, the processor(s) 2550 of the one or more federated devices 2500 may analyze the included data and the formulae to derive a set of task routines and a job flow definition that is able to perform the analysis specified in the data structure in a manner that may be better optimized for a performance of the analysis as a job flow using distributed processing resources of the one or more federated devices 2500. Additionally, the processor(s) 2550 may generate a DAG 2270 as a visual guide of the resulting job flow.

Among such requests may be a request for the processor(s) 2550 of the one or more federated devices 2500 to perform a job flow. As will be explained in greater detail, where the request is to repeat a particular past performance of a job flow, the processor(s) 2550 of the one or more federated devices may, in response, may use the information included in the request that identifies the job flow to retrieve the various objects associated with the past performance (e.g., the job flow definition 2220, the flow input data set(s) 2330, the task routines 2440) from one or more federated areas 2566, and may then use the retrieved objects to repeat the past performance. In some embodiments, the processor(s) 2550 may also retrieve the results report(s) 2770 generated by the past performance for comparison with the corresponding result report(s) 2770 generated by the repeat performance, and may transmit an indication of the results thereof to the requesting device 2100 or 2800. Such an indication of the results may include a DAG 2270 that may provide a visual indication of any inconsistency identified by the comparison.

Alternatively, where the request is to perform a job flow anew (i.e., is not a request to repeat a past performance of a job flow), the processor(s) 2550, in response, may retrieve the various objects needed for the performance, including the most up to date versions of the task routines 2440 needed to perform each of the tasks specified in the job flow definition 2220 for the job flow. The processor(s) 2550 may additionally check whether the job flow has already been performed with the same set of most up to date task routines 2440, and if so, may then transmit the result report(s) 2770 of that past performance to the requesting device 2100 or 2800 in lieu of performing what would be a repetition of that past performance.

Among such requests may be a request for the one or more federated devices 2500 to generate a DAG 2270 of one or more objects, such as a DAG 2270 of one or more task routines 2440, the task(s) performed by one or more task routines 2440, a job flow specified in a job flow definition 2220, or a past performance of a job flow documented by an instance log 2720. A DAG 2270 may provide visual representations of one or more tasks and/or task routines 2440, including visual representations of inputs and/or outputs of each. In response, the processor(s) 2550 of the one or more federated devices 2500 may generate the requested DAG 2270 and transmit it the requesting device 2100 or 2800. As an alternative to a request to generate a DAG 2270 using the processing resources of the one or more federated devices 2500, a request may be received for the one or more federated devices 2500 to provide the requesting device 2100 or 2800 a set of objects needed to enable the requesting device 2100 or 2800 to generate a DAG 2270. In response, the processor(s) 2550 of the one or more federated devices 2500 may generate a set of macros 2470, one for each task or task routine 2440 that is to be included in the DAG 2270 for purposes of being transmitted to the requesting device 2100 or 2800 to enable generation of the DAG 2270 by the requesting device 2100 or 2800.

Among such requests may be a request to generate a package containing copies of one or more of the federated areas 2566 maintained by the one or more federated devices 2500 to enable the copies of the one or more federated areas 2566 to be instantiated within one or more other devices. The request may specify that each copy of a federated area 2566 that is within the package is to include copies of all of the objects present within the counterpart federated area 2566 from which the copy is generated. Alternatively, the request may specify that each of copy of a federated area that is within the package is to include copies of objects present within the counterpart federated area 2566 from which the copy is generated that are needed to perform a specified job flow and/or that are needed to repeat a specified past performance of a job flow. In some embodiments, the processor(s) 2550 of the one or more federated devices 2500 may, in response, apply a set of rules to the generation of the package to ensure that the copies of federated area(s) included therein and/or the copies of sets of objects included within each copy of a federated area 2566 is complete enough to avoid one or more job flows being rendered incapable of being performed as a result of copies of one or more needed objects not having been included in the package. Following generation of the package, the processor(s) 2550 may transmit the package to the requesting device 2100 or 2800.

Turning to FIG. 13D, as an alternative to the use of separate requests to bring about individual transfers of one or more objects to and from the one or more federated devices 2500, a single request may be made and granted by the processor(s) 2550 of the one or more federated devices 2500 to instantiate a synchronization relationship between a transfer area 2666 instantiated within a specified federated area 2566 maintained by the one or more federated devices 2500, and another transfer area 2166 or 2866 instantiated within the storage 2160 or 2860 of a source device 2100 or a reviewing device 2800, respectively. The transfer area 2666 may occupy the entirety of the federated area 2566 within which it is instantiated, or a designated portion thereof. Correspondingly, the transfer area 2166 or 2866 may occupy a designated portion of the storage 2160 or 2860, respectively. With such a synchronization relationship in place, the contents of the transfer area 2666 may be recurringly synchronized with the contents of the transfer area 2166 or 2866. More specifically, changes made to objects within the transfer area 2666 (e.g., the addition, removal and/or alteration of objects) may trigger the transfer of one or more objects therefrom to the transfer area 2166 or 2866 to cause the contents of these two transfer areas to remain synchronized with each other. Correspondingly, changes made to objects within the transfer area 2166 or 2866 may trigger a similar transfer of one or more objects therefrom to the transfer area 2666 to also cause the contents of these two transfer areas to remain synchronized with each other.

In some embodiments, processor(s) 2550 of the one or more federated devices 2500 may cooperate with the other device 2100 or 2800 in the triggering of such transfers by recurringly exchanging indications of the current state of the objects stored in their respective ones of the transfer areas 2666, and 2166 or 2866. By way of example, a polling approach may be used in which the one or more federated devices 2500 may be provided with the security credentials required to "log in" to the other device 2100 or 2800 to gain access to the transfers space 2166 or 2866 in a manner similar to that of a user of the other device 2100 or 2800, and may then compare what objects are present within the transfer space 2166 or 2866, respectively, to what objects were present during the last time such a check was performed to identify added objects, altered objects and/or removed objects therein. Correspondingly, as an alternative, the other device 2100 or 2800 may be provided with similar credentials to enable the processor(s) 2150 or 2850 thereof to "log in" to the one or more federated devices 2500 to make similar comparisons concerning the objects that are present within the transfer space 2666. Where a change in one of these transfer areas has been determined to have occurred, the one of these devices that has "logged in" to the other may then make a request of the other to provide the copies of one or more objects that are needed to bring its own one of these transfer areas back into synchronization with the other such that both of these transfer areas again contain the same objects in the same condition.

In other embodiments, as an alternative to or in addition to such a polling approach, an approach of "volunteering" indications may be used in which the processor(s) 2550 of the one or more federated devices 2500 may, either at a recurring interval of time or in response to the occurrence of changes to one or more objects within the transfer area 2666, transmit an indication of the current state of objects currently present within the transfer area 2666 to the other device 2100 or 2800. Where there has been such a change within the transfer area 2666, such a transmitted indication thereof may be accompanied with the transmission of one or more copies of the objects that are present within the transfer area 2566 to the other device 2100 or 2800 to enable the processor(s) 2150 or 2850 of the other device 2100 or 2800 to bring the transfer area 2166 or 2866, respectively, back into synchronization with the transfer area 2666 such that both of these transfer areas again contain the same objects in the same condition. Correspondingly, the processor(s) 2150 or 2850 may be use such a "volunteering" approach in similarly transmitting an indication of the current state of the objects currently present within the transfer area 2166 or 2866 to the one or more federated devices 2500, either at a recurring interval of time or in response to the occurrence of changes to one or more objects within the transfer area 2166 or 2866, respectively. Similarly, where there has been such a change within the transfer area 2166 or 2866, such a transmitted indication thereof may be accompanied with the transmission of one or more copies of the objects that are present within the transfer area 2166 or 2866 to the one or more federated devices 2500 to enable the processor(s) 2550 of the one or more federated devices 2500 to bring the transfer area 2666 back into synchronization with the transfer area 2166 or 2866, respectively, such that both of these transfer areas again contain the same objects in the same condition.

In some embodiments, the processor(s) 2550 of the one or more federated devices 2500 may be caused by the admission component 2542 to apply the same set of rules restricting the storage of objects within the one or more federated areas and/or the removal of objects therefrom as were described above in handling responses to received requests. However, in other embodiments and as will be explained in greater detail, accommodating such a synchronization relationship may entail changes to, or relaxation of, the enforcement of that set of rules. In such other embodiments, instead of applying the set of rules in a manner that disallows the transfer of objects in response to an error condition or other violation of the rules, a DAG 2270 may be generated that provides a visual indication of the rule violation and/or the error condition. Upon being generated, the processor(s) 2550 may be caused by the portal component 2549 to automatically transfer such a DAG 2270 between the two transfer areas as part of the synchronization relationship and to make such a DAG 2270 available in both transfer areas.

In some embodiments, such a synchronization relationship may be instantiated where the device 2100 or 2800 is at least partially used as a repository for objects, such as a source code repository for an analysis routine that is under development. As will also be explained in greater detail, it may be that developers who are familiar with the use of federated areas 2566 and/or who have been granted access to the one or more federated areas 2566 maintained by the one or more federated devices 2500 may be working in collaboration with other developers who are not so familiar with the use of federated areas 2566 and/or who have not been granted such access. Through such a synchronization relationship, objects developed by such other developers may be contributed to the objects stored within the one or more federated areas 2566 by placing them within the transfer area 2166 or 2866. Correspondingly, such other developers may be given access to objects stored within the one or more federated areas 2566 by placing those objects (or copies thereof) within the transfer area 2566.

As will further be explained in greater detail, such other developers may also not be familiar with a primary programming language that may normally be expected to be used in generating task routines 2440 and/or job flow definitions 2220, and may generate such objects in one or more secondary programming languages. Thus, as part of performing such automated transfers and applying the set of rules, the processor(s) 2550 of the one or more federated devices 2500 may also perform automated translations of at least portions of objects that define or implement input and/or output interfaces from the primary and secondary programming languages, and into an intermediate representation, such as an intermediate programming language or a data structure, to enable the earlier described comparisons among definitions and/or implementations of input and/or output interfaces to be made.

Figure 14A:
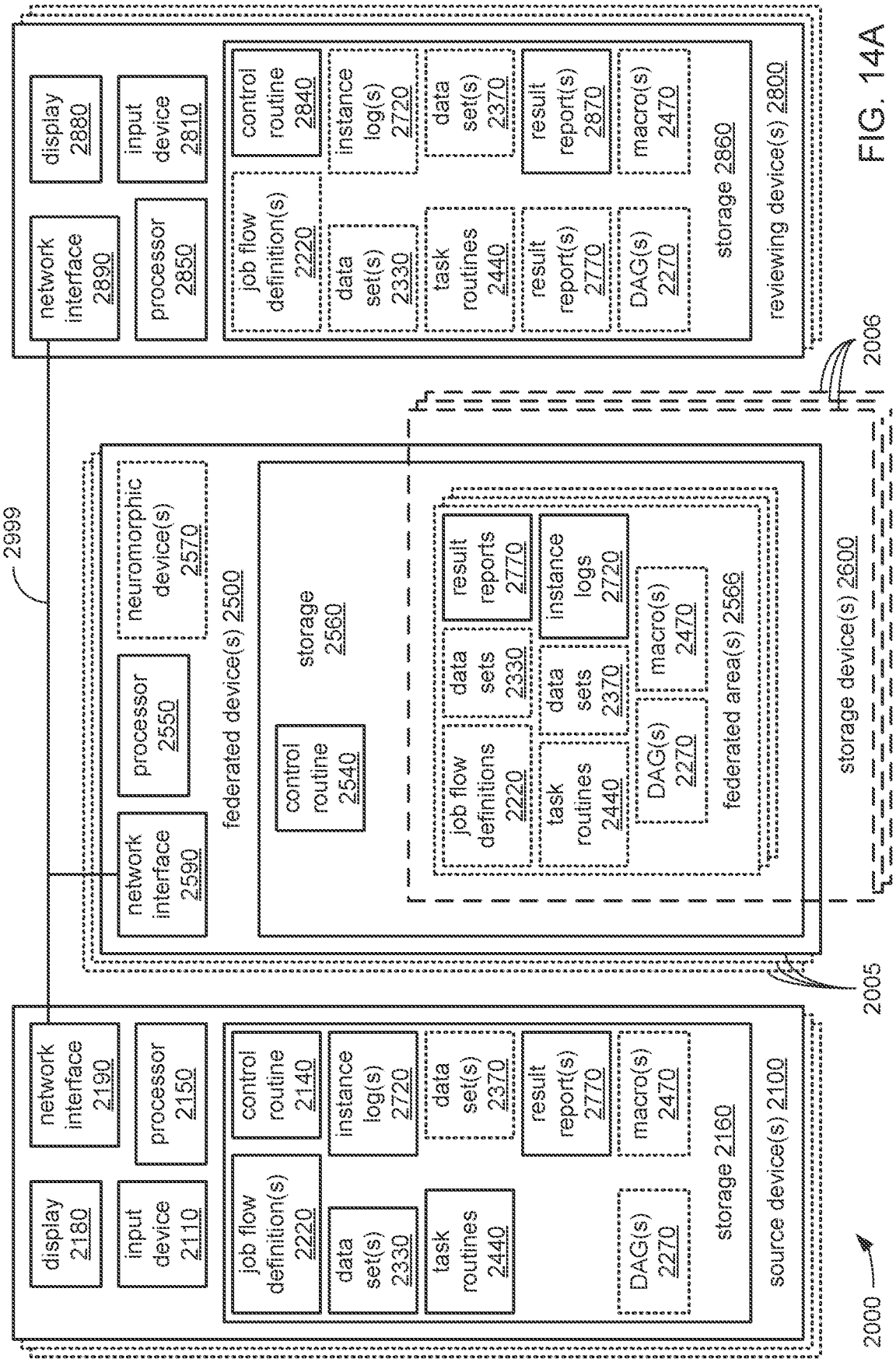
FIGS. 14A and 14B, together, illustrate an example alternate embodiment of a distributed processing system.
Figure 14B:
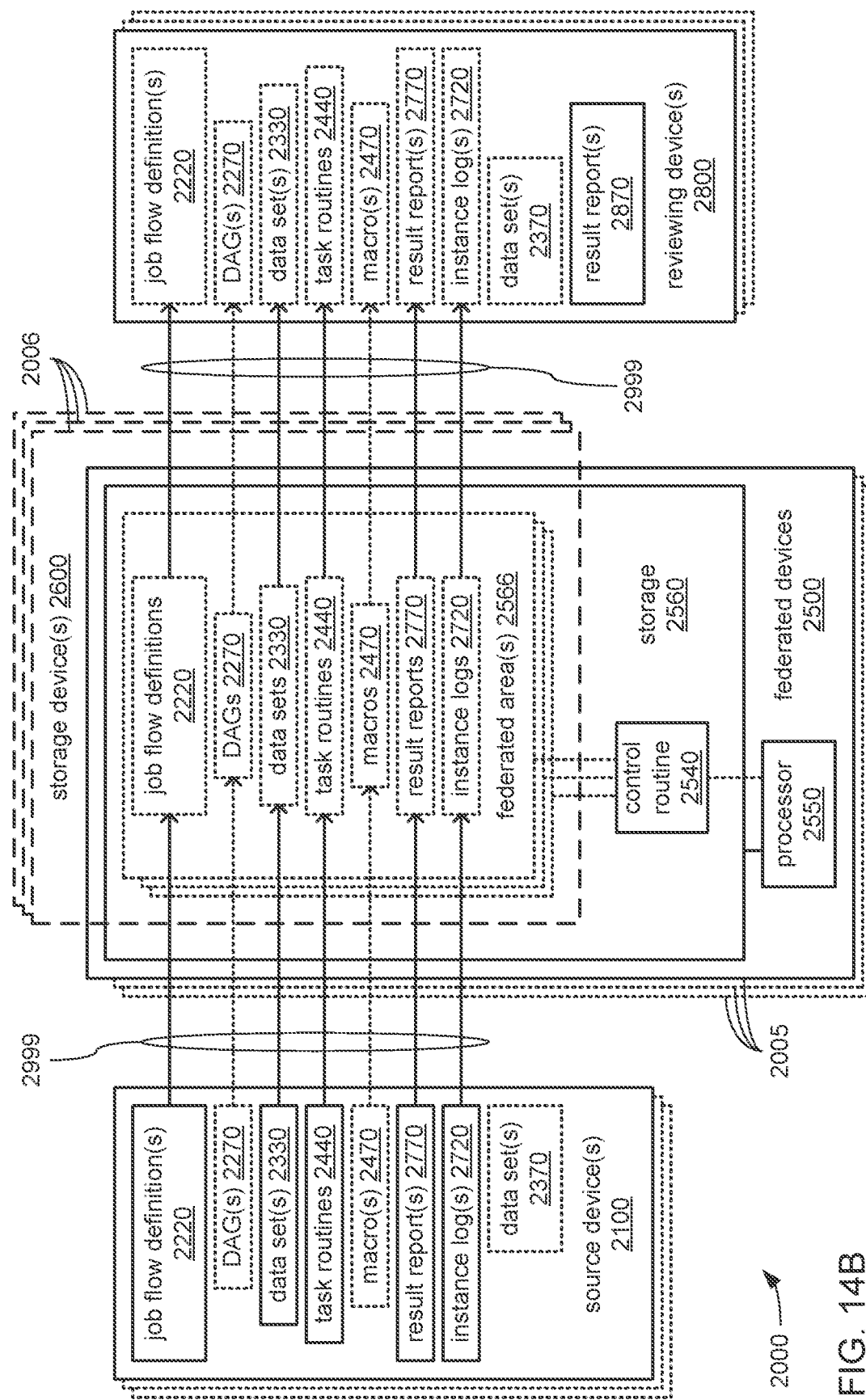

FIG. 14A illustrates a block diagram of another example embodiment of a distributed processing system 2000 also incorporating one or more source devices 2100, one or more reviewing devices 2800, one or more federated devices 2500 that may form the federated device grid 2005, and/or one or more storage devices 2600 that may form the storage device grid 2006. FIG. 14B illustrates exchanges, through a network 2999, of communications among the devices 2100, 2500, 2600 and/or 2800 associated with the controlled storage of and/or access to various objects within one or more federated areas 2566. The example distributed processing system 2000 of FIGS. 14A-B is substantially similar to the example processing system 2000 of FIGS. 13A-B, but featuring an alternate embodiment of the one or more federated devices 2500 providing an embodiment of the one or more federated areas 2566 within which job flows are not performed. Thus, while task routines 2440 may be executed by the one or more federated devices 2500 within each of the one or more federated areas 2566 in addition to storing objects within each of the one or more federated areas 2566 of FIGS. 13A-B, in FIGS. 14A-B, each of the one or more federated areas 2566 serves as a location in which objects may be stored, but within which no task routines 2440 are executed.

Instead, in the example distributed processing system 2000 of FIGS. 14A-B, the performance of job flows, including the execution of task routines 2440 of job flows, may be performed by the one or more source devices 2100 and/or by the one or more reviewing devices 2800. Thus, as best depicted in FIG. 14B, the one or more source devices 2100 may be operated to interact with the one or more federated devices 2500 to more simply store a variety of objects associated with the performance of a job flow within the one or more source devices 2100. More specifically, one of the source devices 2100 may be operated to store, in a federated area 2566, a result report 2770 and/or an instance log 2720 associated with a performance of a job flow defined by a job flow definition 2220, in addition to also being operated to store the job flow definition 2220, along with the associated task routines 2440 and any associated data sets 2330 in a federated area 2566. Additionally, such a one of the source devices 2100 may also store any DAGs 2270 and/or macros 2470 that may be associated with those task routines 2440. As a result, each of the one or more federated areas 2566 is employed to store a record of performances of job flows that occur externally thereof.

Correspondingly, as part of a review of a performance of a job flow, the one or more reviewing devices 2800 may be operated to retrieve the job flow definition 2220 of the job flow, along with the associated task routines 2440 and any associated data sets 2330 from a federated area 2566, in addition to retrieving the corresponding result report 2770 generated by the performance and/or the instance log 2720 detailing aspects of the performance With such a more complete set of the objects associated with the performance retrieved from one or more federated areas 2566, the one or more reviewing devices 2800 may then be operated to independently repeat the performance earlier carried out by the one or more source devices 2100. Following such an independent performance, a new result report 2870 generated by the independent performance may then be compared to the retrieved result report 2770 as part of reviewing the outputs of the earlier performance. Where macros 2470 and/or DAGs 2270 associated with the associated task routines 2440 are available, the one or more reviewing devices 2800 may also be operated to retrieve them for use in analyzing any discrepancies revealed by such an independent performance.

Referring back to all of FIGS. 13A-B and 14A-B, the role of generating objects and the role of reviewing the use of those objects in a past performance have been presented and discussed as involving separate and distinct devices, specifically, the source devices 2100 and the reviewing devices 2800, respectively. However, it should be noted that other embodiments are possible in which the same one or more devices may be employed in both roles such that at least a subset of the one or more source devices 2100 and the one or more reviewing devices 2800 may be one and the same.

Figure 15A:
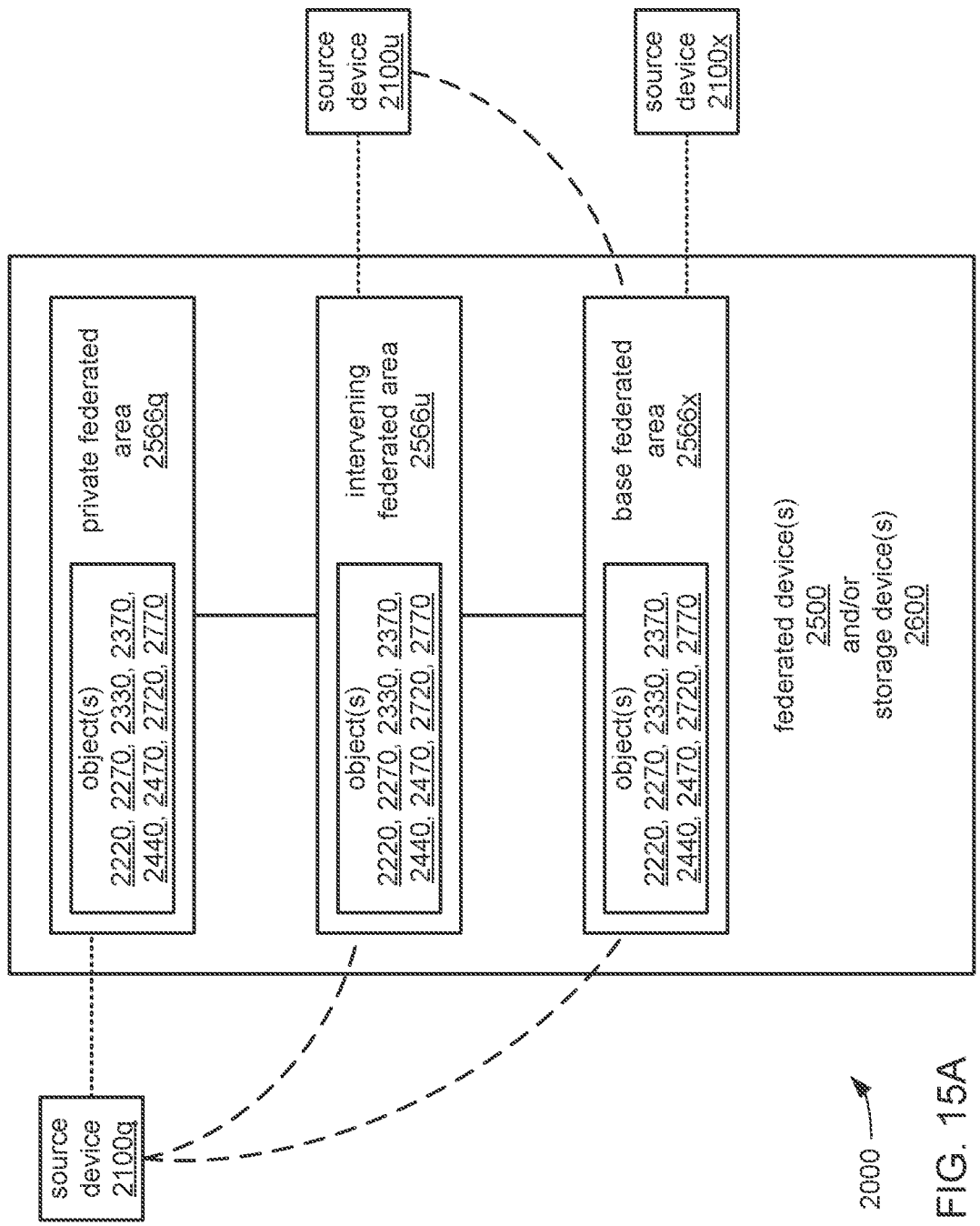
FIGS. 15A, 15B, 15C, 15D and 15E, together, illustrate aspects of example hierarchical sets of federated areas and their formation.
Figure 15B:
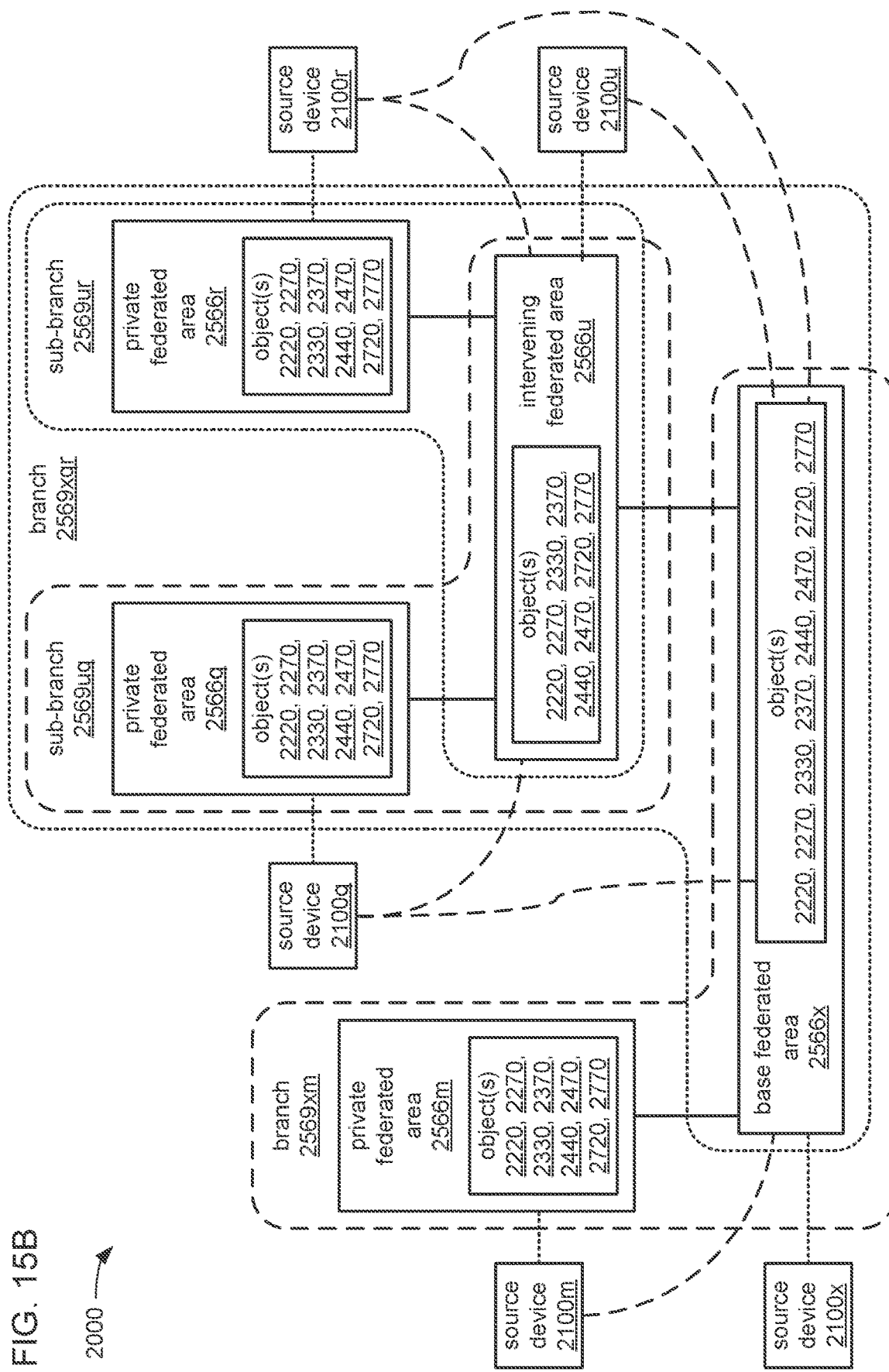
Figure 15C:
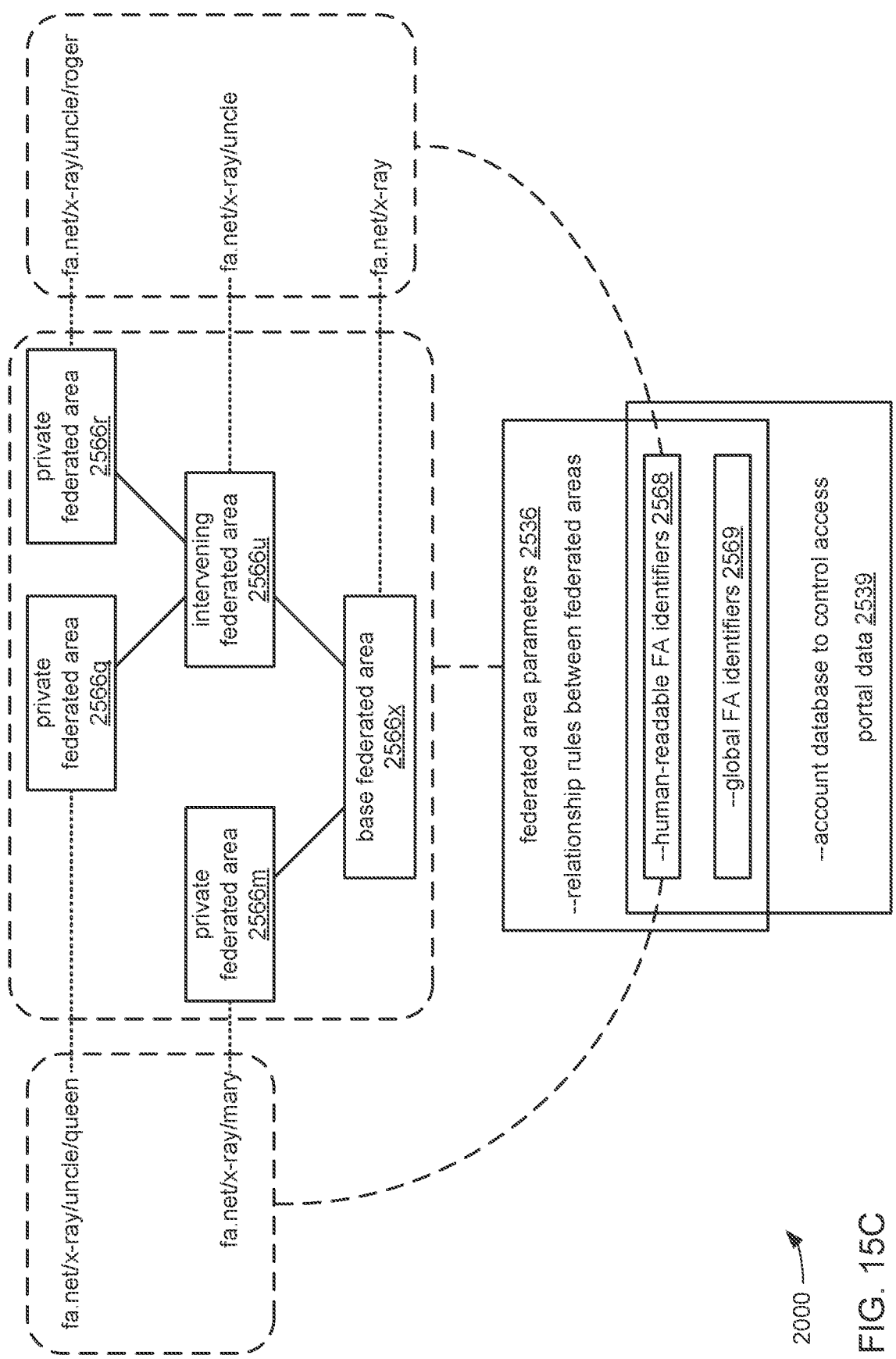
Figure 15D:
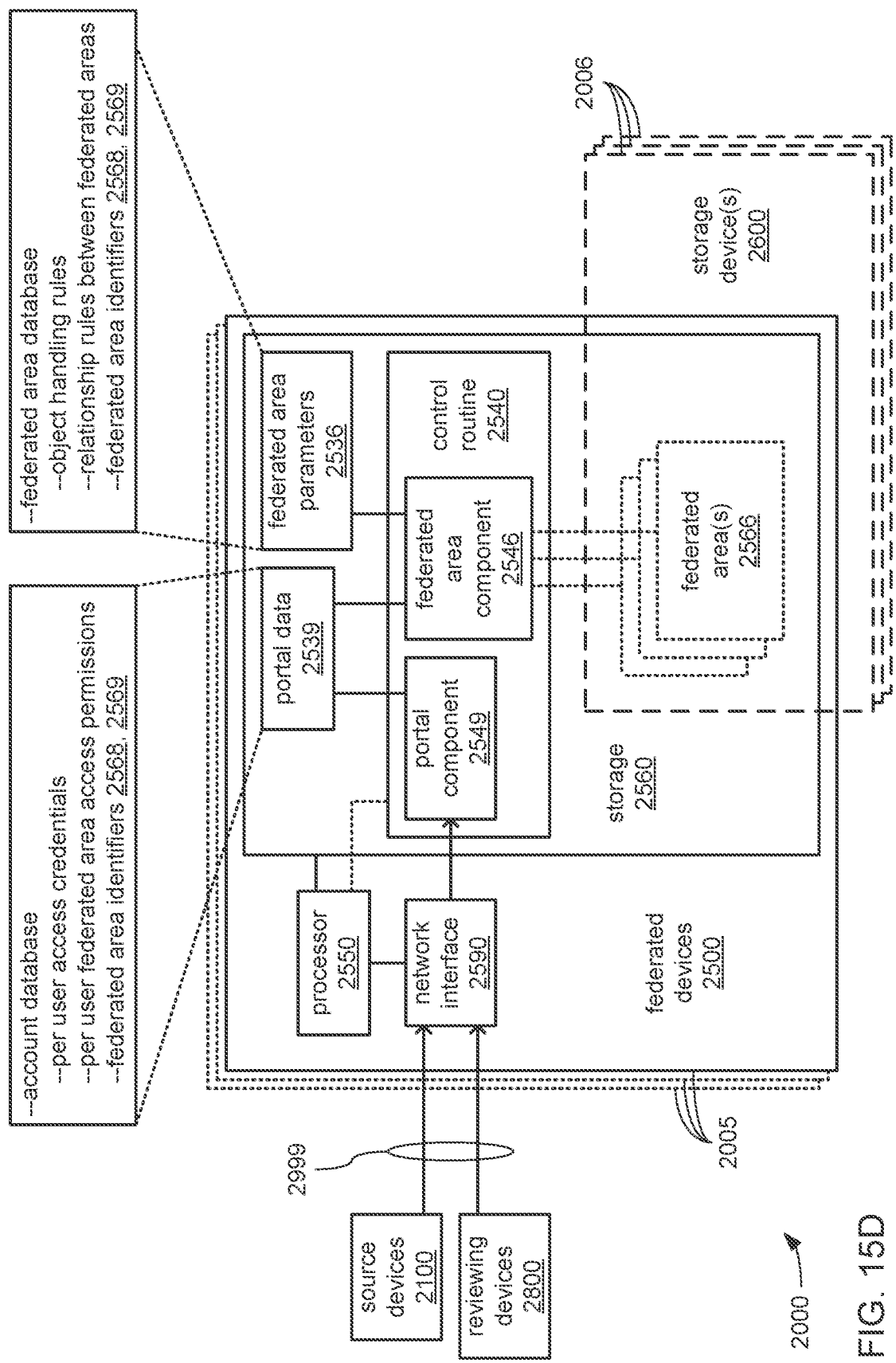
Figure 15E:
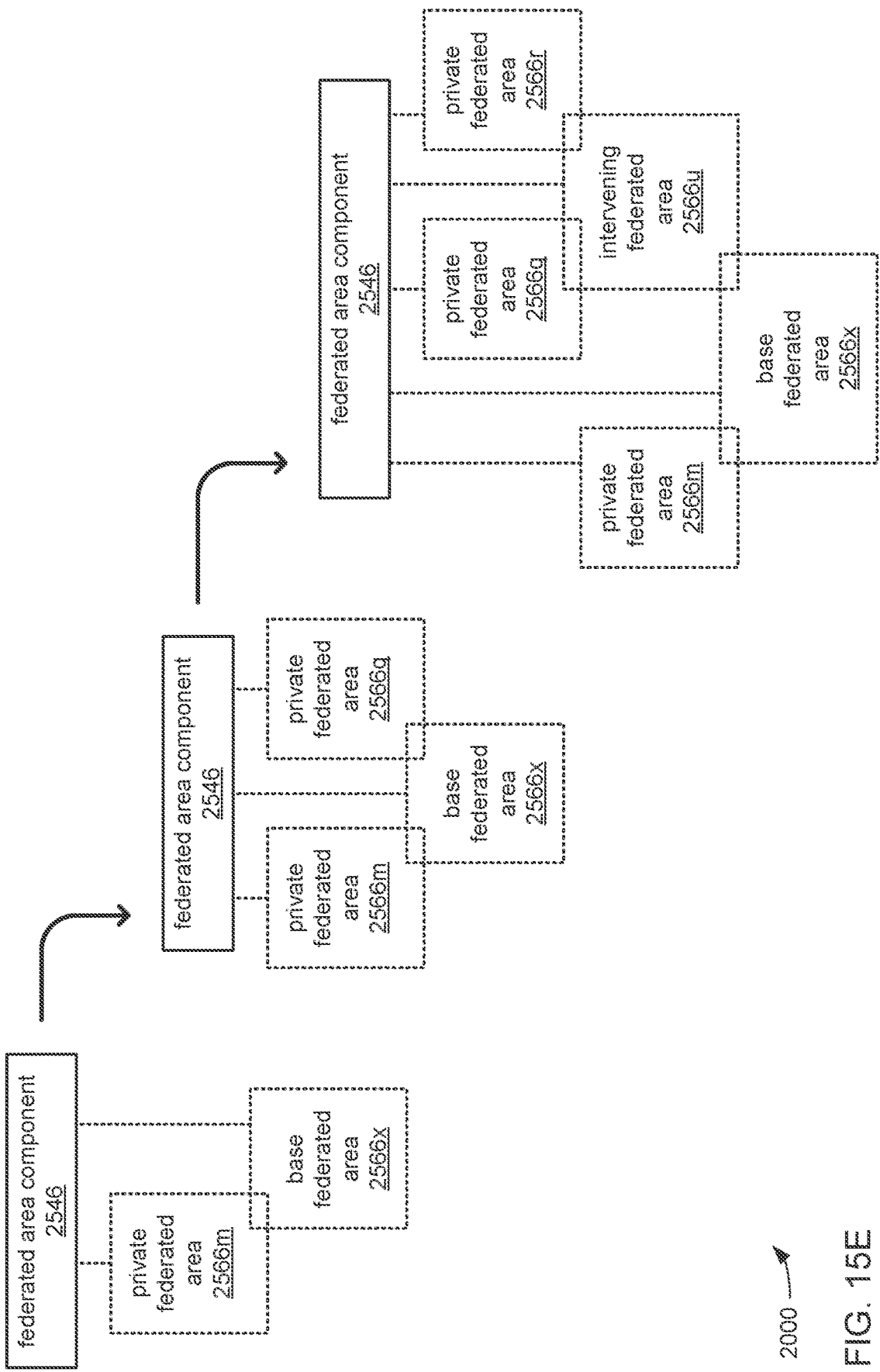

FIGS. 15A, 15B, 15C, 15D and 15E, together, illustrate aspects of the provision of, and interactions among, multiple related federated areas 2566 by the one or more federated devices 2500. FIG. 15A depicts aspects of a linear hierarchy of federated areas 2566, FIG. 15B depicts aspects of a hierarchical tree of federated areas 2566, and FIG. 15C depicts aspects of navigating among federated areas 2566 within the hierarchical tree of FIG. 15B. FIGS. 15A-C, together, also illustrate aspects of one or more relationships that may be put in place among federated areas 2566 that may control access to objects stored therein. FIG. 15D illustrates aspects of selectively allowing users of one or more federated areas 2566 to exercise control over various aspects thereof. FIG. 15E illustrates aspects of supporting the addition of new federated areas 2566 and/or new users of federated areas 2566, using an example of building a set of related federated areas 2566 based on the example hierarchical tree of federated areas introduced in FIGS. 15B-C.

Turning to FIG. 15A, a set of federated areas 2566$q$, 2566$u$ and 2566$x$ may be maintained within the storage(s) 2560 of the one or more federated devices 2500 and/or within the one or more storage devices 2600. As depicted, a linear hierarchy of degrees of restriction of access may be put in place among the federated areas 2566$q$, 2566$u$ and 2566$x$. More specifically, the federated area 2566$q$ may be a private federated area subject to the greatest degree of restriction in access among the depicted federated areas 2566$q$, 2566$u$ and 2566$x$. In contrast, the base federated area 2566$x$ may a more "public" federated area to the extent that it may be subject to the least restricted degree of access among the depicted federated areas 2566$q$, 2566$u$ and 2566$x$. Further, the intervening federated area 2566$u$ may be subject to an intermediate degree of restriction in access ranging from almost as restrictive as the greater degree of restriction applied to the private federated area 2566$q$ to almost as unrestrictive as the lesser degree of restriction applied to the base federated area 2566$x$. Stated differently, the number of users granted access may be the largest for the base federated area 2566$x$, may progressively decrease to an intermediate number for the intervening federated area 2566$u$, and may progressively decrease further to a smallest number for the private federated area 2566$q$.

There may be any of a variety of scenarios that serve as the basis for selecting the degrees of restriction of access to each of the federated areas 2566$q$, 2566$u$ and 2566$x$. By way of example, all three of these federated areas may be under the control of a user of the source device 2100$q$ where such a user may desire to provide the base federated area 2566$x$ as a storage location to which a relatively large number of other users may be granted access to make use of objects stored therein by the user of the source device 2100$q$ and/or at which other users may store objects as a mechanism to provide objects to the user of the source device 2100$q$. Such a user of the source device 2100$q$ may also desire to provide the intervening federated area 2566$u$ as a storage location to which a smaller number of selected other users may be granted access, where the user of the source device 2100$q$ desires to exercise tighter control over the distribution of objects stored therein.

As a result of this hierarchical range of restrictions in access, a user of the depicted source device 2100$x$ may be granted access to the base federated area 2566$x$, but not to either of the other federated areas 2566$u$ or 2566$q$. A user of the depicted source device 2100$u$ may be granted access to the intervening federated area 2566$u$, and as depicted, such a user of the source device 2100$u$ may also be granted access to the base federated area 2566$x$, for which restrictions in access are less than that of the intervening federated area 2566$u$. However, such a user of the source device 2100$u$ may not be granted access to the private federated area 2566$q$. In contrast, a user of the source device 2100$q$ may be granted access to the private federated area 2566$q$. As depicted, may also be granted access to the intervening federated area 2566$u$ and the base federated area 2566$x$, both of which are subject to lesser restrictions in access than the private federated area 2566$q$.

As a result of the hierarchy of access restrictions just described, users granted access to the intervening federated area 2566$u$ are granted access to objects 2220, 2270, 2330, 2370, 2440, 2470, 2720 and/or 2770 that may be stored within either of the intervening federated area 2566$u$ or the base federated area 2566$x$. To enable such users to request the performance of job flows using objects stored in either of these federated areas 2566$x$ and 2566$u$, an inheritance relationship may be put in place between the intervening federated area 2566$u$ and the base federated area 2566$x$ in which objects stored within the base federated area 2566$x$ may be as readily available to be utilized in the performance of a job flow at the request of a user of the intervening federated area 2566$u$ as objects that are stored within the intervening federated area 2566$u$.

Similarly, also as a result of the hierarchy of access restrictions just described, the one or more users granted access to the private federated area 2566$q$ are granted access to objects 2220, 2270, 2330, 2370, 2440, 2470, 2720 and/or 2770 that may be stored within any of the private federated area 2566*q*, the intervening federated area 2566*u* or the base federated area 2566*x*. Correspondingly, to enable such users to request the performance of job flows using objects stored in any of these federated areas 2566*x* and 2566*u*, an inheritance relationship may be put in place among the private federated area 2566*q*, the intervening federated area 2566*u* and the base federated area 2566*x* in which objects stored within the base federated area 2566*x* or the intervening federated area 2566*u* may be as readily available to be utilized in the performance of a job flow at the request of a user of the private federated area 2566*q* as objects that are stored within the private federated area 2566*q*.

Such inheritance relationships among the federated areas 2566*q*, 2566*u* and 2566*x* may be deemed desirable to encourage efficiency in the storage of objects throughout by eliminating the need to store multiple copies of the same objects throughout multiple federated areas 2566 to make them accessible throughout a hierarchy thereof. More precisely, a task routine 2440 stored within the base federated area 2566*x* need not be copied into the private federated area 2566*q* to become available for use during the performance of a job flow requested by a user of the private federated area 2566*q* and defined by a job flow definition 2220 that may be stored within the private federated area 2566*q*.

In some embodiments, such inheritance relationships may be accompanied by corresponding priority relationships to provide at least a default resolution to instances in which multiple versions of an object are stored in different ones of the federated areas 2566*q*, 2566*u* and 2566*x* such that one version thereof must be selected from among multiple federated areas for use in the performance of a job flow. By way of example, and as will be explained in greater detail, there may be multiple versions of a task routine 2440 that may be stored within a single federated area 2566 or across multiple federated areas 2566. This situation may arise as a result of improvements being made to such a task routine 2440, and/or for any of a variety of other reasons. Where a priority relationship is in place between at least the base federated area 2566*x* and the intervening federated area 2566*u*, in addition to an inheritance relationship therebetween, and where there is a different version of a task routine 2440 within each of the federated areas 2566*u* and 2566*x* that may be used in the performance of a job flow requested by a user of the intervening federated area 2566*u* (e.g., through the source device 2100*u*), priority may be automatically given by the processor(s) 2550 of the one or more federated devices 2500 to using a version stored within the intervening federated area 2566*u* over using any version that may be stored within the base federated area 2566*x*. Stated differently, the processor(s) 2550 of the one or more federated devices 2500 may be caused to search within the intervening federated area 2566*u*, first, for a version of such a task routine 2440, and may use a version found therein if a version is found therein. The processor(s) 2550 of the one or more federated devices 2500 may then entirely forego searching within the base federated area 2566*x* for a version of such a task routine 2440, unless no version of the task routine 2440 is found within the intervening federated area 2566*u*.

Similarly, where a priority relationship is in place between among all three of the federated areas 2566*x*, 2566*u* and 2566*q*, in addition to an inheritance relationship thereamong, and where there is a different version of a task routine 2440 within each of the federated areas 2566*q*, 2566*u* and 2566*x* that may be used in the performance of task of a job flow requested by a user of the private federated area 2566*q* (e.g., through the source device 2100*q*), priority may be automatically given to using the version stored within the private federated area 2566*q* over using any version that may be stored within either the intervening federated area 2566*u* or the base federated area 2566*x*. However, if no version of such a task routine 2440 is found within the private federated area 2566*q*, then the processor(s) 2550 of the one or more federated devices 2500 may be caused to search next within the intervening federated area 2566*u* for a version of such a task routine 2440, and may use a version found therein if a version is found therein. However, if no version of such a task routine 2440 is found within either the private federated area 2566*q* or the intervening federated area 2566*u*, then the processor(s) 2550 of the one or more federated devices 2500 may be caused to search within the base federated area 2566*x* for a version of such a task routine 2440, and may use a version found therein if a version is found therein.

In some embodiments, inheritance relationships may be accompanied by corresponding dependency relationships that may be put in place to ensure that all objects required to perform a job flow continue to be available. As will be explained in greater detail, for such purposes as enabling accountability and/or investigating errors in analyses, it may be deemed desirable to impose restrictions against actions that may be taken to delete (or otherwise make inaccessible) objects stored within a federated area 2566 that are needed to perform a job flow that is defined by a job flow definition 2220 within that same federated area 2566. Correspondingly, where an inheritance relationship is put in place among multiple federated areas 2566, it may be deemed desirable to put a corresponding dependency relationship in place in which similar restrictions are imposed against deleting (or otherwise making inaccessible) an object in one federated area 2566 that may be needed for the performance of a job flow defined by a job flow definition 2220 stored within another federated area 2566 that is related by way of an inheritance relationship put in place between the two federated areas 2566. More specifically, where a job flow definition 2220 is stored within the intervening federated area 2566*u* that defines a job flow that requires a task routine 2440 stored within the base federated area 2566*x* (which is made accessible from within the intervening federated area 2566*u* as a result of an inheritance relationship with the base federated area 2566*x*), the processor(s) 2550 of the one or more federated devices 2500 may not permit the task routine 2440 stored within the base federated area 2566*x* to be deleted. However, in some embodiments, such a restriction against deleting the task routine 2440 stored within the base federated area 2566*x* may cease to be imposed if the job flow definition 2220 that defines the job flow that requires that task routine 2440 is deleted, and there are no other job flow definitions 2220 stored elsewhere that also have such a dependency on that task routine 2440.

Similarly, where a job flow definition 2220 is stored within the private federated area 2566*q* that defines a job flow that requires a task routine 2440 stored within either the intervening federated area 2566*u* or the base federated area 2566*x* (with which there may be an inheritance relationship), the processor(s) of the one or more federated devices 2500 may not permit that task routine 2440 to be deleted. However, such a restriction against deleting that task routine 2440 may cease to be imposed if the job flow definition 2220 that defines the job flow that requires that task routine 2440 is deleted, and there are no other job flow definitions 2220 stored elsewhere that also have such a dependency on that task routine 2440.

In concert with the imposition of inheritance and/or priority relationships among a set of federated areas 2566, the exact subset of federated areas 2566 to which a user is granted access may be used as a basis to automatically select a "perspective" from which job flows may be performed by the one or more federated devices 2500 at the request of that user. Stated differently, where a user requests the performance of a job flow, the retrieval of objects required for that performance may be based, at least by default, on what objects are available at the federated area 2566 among the one or more federated areas 2566 to which the user is granted access that has highest degree of access restriction. The determination of what objects are so available may take into account any inheritance and/or priority relationships that may be in place that include such a federated area 2566. Thus, where a user granted access to the private federated area 2566q requests the performance of a job flow, the processor(s) 2550 of the federated devices 2500 may be caused to select the private federated area 2566q as the perspective on which determinations concerning which objects are available for use in that performance will be based, since the federated area 2566q is the federated area 2566 with the most restricted access that the user has been granted access to within the depicted linear hierarchy of federated areas 2566. With the private federated area 2566q so selected as the perspective, any inheritance and/or priority relationships that may be in place between the private federated area 2566q and either of the intervening federated area 2566u or the base federated area 2566x may be taken into account in determining whether any objects stored within either are to be deemed available for use in that performance (which may be a necessity if there are any objects that are needed for that performance that are not stored within the private federated area 2566q).

Alternatively or additionally, in some embodiments, such an automatic selection of perspective may be used to select the storage space in which a performance takes place. Stated differently, as part of maintaining the security that is intended to be provided through the imposition of a hierarchy of degrees of access restriction across multiple federated areas 2566, a performance of a job flow requested by a user may, at least by default, be performed within the federated area that has the highest degree of access restriction among the one or more federated areas to which that user has been granted access. Thus, where a user granted access to the private federated area 2566q requests a performance of a job flow by the one or more federated devices 2500, such a requested performance of that job flow may automatically be so performed by the processor(s) 2550 of the one or more federated devices 2500 within the storage space of the private federated area 2566q. In this way, aspects of such a performance are kept out of reach from other users that have not been granted access to the private federated area 2566q, including any objects that may be generated as a result of such a performance (e.g., mid-flow data sets 2370, result reports 2770, etc.). Such a default selection of a federated area 2566 having more restricted access in which to perform a job flow may be based on a presumption that each user will prefer to have the job flow performances that they request being performed within the most secure federated area 2566 to which they have been granted access.

It should be noted that, although a linear hierarchy of just three federated areas is depicted in FIG. 15A for sake of simplicity of depiction and discussion, other embodiments of a linear hierarchy are possible in which there may be multiple intervening federated areas 2566 of progressively changing degree of restriction in access between the base federated area 2566x and the private federated area 2566q. Therefore, the depicted quantity of federated areas should not be taken as limiting.

It should also be noted that, although just a single source device 2100 is depicted as having been granted access to each of the depicted federated areas 2566, this has also been done for sake of simplicity of depiction and discussion, and other embodiments are possible in which access to one or more of the depicted federated areas 2566 may be granted to users of more than one device. More specifically, the manner in which restrictions in access to a federated area 2566 may be implemented may be in any of a variety of ways, including and not limited to, restricting access to one or more particular users (e.g., through use of passwords or other security credentials that are associated with particular persons and/or with particular organizations of people), or restricting access to one or more particular devices (e.g., through certificates or security credentials that are stored within one or more particular devices that may be designated for use in gaining access).

Turning to FIG. 15B, a larger set of federated areas 2566m, 2566q, 2566r, 2566u and 2566x may be maintained within the storage(s) 2560 of the one or more federated devices 2500 and/or within the one or more storage devices 2600. As depicted, a tree-like hierarchy of degrees of restriction of access, similar to the hierarchy depicted in FIG. 15A, may be put in place among the federated areas 2566 within each of multiple branches and/or sub-branches of the depicted hierarchical tree. More specifically, each of the federated areas 2566m, 2566q and 2566r may be a private federated area subject to the highest degrees of restriction in access among the depicted federated areas 2566m, 2566q, 2566r, 2566u and 2566x. Again, in contrast, the base federated area 2566x may be a more public federated area to the extent that it may be subject to the least restricted degree of access among the depicted federated areas 2566m, 2566q, 2566r, 2566u and 2566x. Further, the intervening federated area 2566u interposed between the base federated area 2566x and each of the private federated areas 2566q and 2566r may be subject to an intermediate degree of restriction in access ranging from almost as restrictive as the degree of restriction applied to either of the private federated areas 2566q or 2566r to almost as unrestrictive as the degree of restriction applied to the base federated area 2566x. Thus, as in the case of the linear hierarchy depicted in FIG. 15A, the number of users granted access may be the largest for the base federated area 2566x, may progressively decrease to an intermediate number for the intervening federated area 2566u, and may progressively decrease further to smaller numbers for each of the private federated areas 2566m, 2566q and 2566r. Indeed, the hierarchical tree of federated areas 2566 of FIG. 15B shares many of the characteristics concerning restrictions of access of the linear hierarchy of federated areas 2566 of FIG. 15A, such that the linear hierarchy of FIG. 15A may be aptly described as a hierarchical tree without branches.

As a result of the depicted hierarchical range of restrictions in access, a user of the depicted source device 2100x may be granted access to the base federated area 2566x, but not to any of the other federated areas 2566m, 2566q, 2566r or 2566u. A user of the depicted source device 2100u may be granted access to the intervening federated area 2566u, and may also be granted access to the base federated area 2566x, for which restrictions in access are less than that of the intervening federated area 2566u. However, such a user of the source device 2100u may not be granted access to any of the private federated areas 2566m, 2566q or 2566r. In contrast, a user of the source device 2100q may be granted access to the private federated area 2566q, and may also granted access to the intervening federated area 2566u and the base federated area 2566x, both of which are subject to lesser restrictions in access than the private federated area 2566q. A user of the source device 2100r may similarly be granted access to the private federated area 2566r, and may similarly also be granted access to the intervening federated area 2566u and the base federated area 2566x. Additionally, a user of the source device 2100m may be granted access to the private federated area 2566m, and may also be granted access to the base federated area 2566x. However, none of the users of the source devices 2100m, 2100q and 2100r may be granted access to the others of the private federated areas 2566m, 2566q and 2566r.

As in the case of the linear hierarchy of FIG. 15A, within the depicted branch 2569xm, one or more of inheritance, priority and/or dependency relationships may be put in place to enable objects stored within the base federated area 2566x to be accessible from the private federated area 2566m to the same degree as objects stored within the private federated area 2566m. Similarly, within the depicted branch 2569xqr, and within each of the depicted sub-branches 2569uq and 2569ur, one or more of inheritance, priority and/or dependency relationships may be put in place to enable objects stored within either of the intervening federated area 2566u and the base federated area 2566x to be accessible from the private federated areas 2566q and 2566r to the same degree as objects stored within the private federated areas 2566q and 2566r, respectively.

Turning to FIG. 15C, the same hierarchical tree of federated areas 2566m, 2566q, 2566r, 2566u and 2566x of FIG. 15B is again depicted to illustrate an example of the use of human-readable forms of identification to enable a person to distinguish among multiple federated areas 2566, and to navigate about the hierarchical tree toward a desired one of the depicted federated areas 2566m, 2566q, 2566r, 2566u or 2566x. More specifically, each of the federated areas 2566m, 2566q, 2566r, 2566u and 2566x may be assigned a human-readable textual name such as the depicted textual names "mary", "queen", "roger", "uncle" and "x-ray", respectively. In some embodiments, each of these human-readable names may be stored and maintained as a human-readable federated area identifier 2568, where the human-readable text of each such human-readable FA identifier 2568 may have any of a variety of meanings to the persons who assign and use them, including and not limited to, indications of who each of these federated areas 2566 belongs to, what the purpose of each of these federated areas 2566 is deemed to be, how each of these federated areas 2566 relates to the others functionally and/or in terms of location within the depicted tree, etc.

In this depicted example, these depicted human-readable FA identifiers 2568 have been created to also serve as part of a system of navigation in which a web browser of a remote device (e.g., one of the devices 2100 or 2800) may be used with standard web access techniques through the network 2999 to navigate about the depicted tree. More specifically, each of these human-readable FA identifiers 2568 may form at least part of a corresponding URL that may be structured to provide an indication of where its corresponding one of these federated areas 2566 is located within the hierarchical tree. By way of example, the URL of the base federated area 2566x, which is located at the root of the tree, may include the name "x-ray" of the base federated area 2566x, but not include any of the names assigned to any other of these federated areas. In contrast, each of the URLs of each of the private federated areas located at the leaves of the hierarchical tree may be formed, at least partially, as a concatenation of the names of the federated areas that are along the path from each such private federated area at a leaf location of the tree to the base federated area 2566x at the root of the tree. By way of example, the private federated area 2566r may be assigned a URL that includes the names of the private federated area 2566r, the intervening federated area 2566u and the base federated area 2566x, thereby providing an indication of the entire path from the leaf position of the private federated area 2566r within the tree to the root position of the base federated area 2566x.

In some embodiments, either in lieu of the assignment of human-readable FA identifiers 2568, or in addition to the assignment of human-readable FA identifiers 2568, each federated area 2566 may alternatively or additionally be assigned a global federated area identifier 2569 (GUID) that is intended to be unique across all federated areas 2566 that may be instantiated around the world. In some of such embodiments, such uniqueness may be made at least highly likely by generating each such global FA identifier 2569 as a random number or other form of randomly generated set of bits with a relatively large bit width such that the possibility of two federated areas 2566 ever being assigned the same global FA identifier 2569 is deemed sufficiently small that each global FA identifiers 2569 is deemed, for all practical purposes, to be unique across the entire world. Such practically unique global FA identifiers 2569 may be so generated and assigned to each federated area 2566 in addition to the human-readable FA identifiers 2568 to provide a mechanism by which each federated area 2566 will always remain uniquely distinguishable from all others, regardless of any situation that may arise where two or more federated areas 2566 are somehow given identical human-readable FA identifiers 2568.

It should be noted that, unlike the human-readable FA identifiers 2568 that may be manually entered and assigned by an operator of another device (e.g., one of the devices 2100 or 2800) that may be in communication with the one or more federated devices 2500 via the network 2999, the global FA identifiers 2569 may be automatically generated by the one or more federated devices 2500 as part of the instantiation of any new federated area 2566. Such automatic generation of the global FA identifiers 2569 as part of instantiating any new federated area 2566 may be deemed desirable to ensure that such practically unique identification functionality is provided for each federated area 2566 from the very moment that it exists. This may also be deemed desirable to provide some degree of continuity in the unique identification of each federated area 2566 throughout the time it exists, since in some embodiments, the human-readable FA identifiers 2568 may be permitted to be changed throughout the time it exists.

Turning to FIG. 15D, the control routine 2540 executed by processor(s) 2550 of the one or more federated devices 2500 may include a federated area component 2546 to control the instantiation of, maintenance of, relationships among, and/or un-instantiation of federated areas 2566 within the storage 2560 of one or more federated devices 2500 and/or within one or more of the storage devices 2600. The control routine 2540 may also include a portal component 2549 to restrict access to the one or more federated areas 2566 to only authorized users (e.g., authorized persons, entities and/or devices), and may restrict the types of accesses made to only the federated area(s) 2566 for which each user and/or each device is authorized. However, in alternate embodiments, control of access to the one or more federated areas 2566 may be provided by one or more other devices that may be interposed between the one or more federated devices 2500 and the network 2999, or that may be interposed between the one or more federated devices 2500 and the one or more storage devices 2600 (if present), or that may still otherwise cooperate with the one or more federated devices 2500 to do so.

In executing the portal component 2549, the processor(s) 2550 of the one or more federated devices 2500 may be caused to operate one or more of the network interfaces 2590 to provide a portal accessible by other devices via the network 2999 (e.g., the source devices 2100 and/or the reviewing devices 2800), and through which access may be granted to the one or more federated areas 2566. In some embodiments in which the one or more federated devices 2500 additionally serve to control access to the one or more federated areas 2566, the portal may be implemented employing the hypertext transfer protocol over secure sockets layer (HTTPS) to provide a website securely accessible from other devices via the network 2999. Such a website may include a webpage generated by the processor 2550 that requires the provision of a password and/or other security credentials to gain access to the one or more federated areas 2566. Such a website may be configured for interaction with other devices via an implementation of representational state transfer (REST or RESTful) application programming interface (API). However, other embodiments are possible in which the processor 2550 may provide a portal accessible via the network 2999 that is implemented in any of a variety of other ways using any of a variety of handshake mechanisms and/or protocols to selectively provide secure access to the one or more federated areas 2566.

Regardless of the exact manner in which a portal may be implemented and/or what protocol(s) may be used, in determining whether to grant or deny access to the one or more federated areas 2566 to another device from which a request for access has been received, the processor(s) 2550 of the one or more federated devices 2500 may be caused to refer to indications stored within portal data 2539 of users authorized to be granted access. Such indications may include indications of security credentials expected to be provided by such persons, entities and/or machines. In some embodiments, such indications within the portal data 2539 may be organized into a database of accounts that are each associated with an entity with which particular persons and/or devices may be associated. The processor(s) 2550 may be caused to employ the portal data 2539 to evaluate security credentials received in association with a request for access to the at least one of the one or more federated areas 2566, and may operate a network interface 2590 of one of the one or more federated devices 2500 to transmit an indication of grant or denial of access to the at least one requested federated area 2566 depending on whether the processor(s) 2550 determine that access is to be granted.

Beyond selective granting of access to the one or more federated areas 2566 (in embodiments in which the one or more federated devices 2500 control access thereto), the processor(s) 2550 may be further caused by execution of the portal component 2549 to restrict the types of access granted, depending on the identity of the user to which access has been granted. By way of example, the portal data 2539 may indicate that different users are each to be allowed to have different degrees of control over different aspects of one or more federated areas 2566. A user may be granted a relatively high degree of control such that they are able to create and/or remove one or more federated areas 2566, are able to specify which federated areas 2566 may be included in a set of federated areas, and/or are able to specify aspects of relationships among one or more federated areas 2566 within a set of federated areas. Alternatively or additionally, a user may be granted a somewhat more limited degree of control such that they are able to alter the access restrictions applied to one or more federated areas 2566 such that they may be able to control which users have access each of such one or more federated areas 2566.

The processor(s) 2550 may be caused by execution of the portal component 2549 to store indications of such changes concerning which users have access to which federated areas 2566 and/or the restrictions applied to such access as part of the portal data 2539, where such indications may take the form of sets of correlations of authorized users to federated areas 2566 and/or correlations of federated areas 2566 to authorized users. In such indications of such correlations, either or both of the human-readable FA identifiers 2568 or the global FA identifiers 2569 may be used. Where requests to add, remove and/or alter one or more federated areas 2566 are determined, through execution of the portal component 2549 to be authorized, the processor(s) 2550 may be caused by execution of the federated area component 2546 to carry out such requests.

FIG. 15E depicts an example of a series of actions that the processor(s) 2550 are caused to take in response to the receipt of a series of requests to add federated areas 2566 that eventually results in the creation of the tree of federated areas 2566 depicted in FIGS. 15B-C. As depicted, the processor(s) 2550 of the one or more federated devices 2500 may initially be caused to instantiate and maintain both the private federated area 2566m and the base federated area 2566x as part of a set of related federated areas that form a linear hierarchy of degrees of access restriction therebetween. In some embodiments, the depicted pair of federated areas 2566m and 2566x may have been caused to be generated by a user of the source device 2100m having sufficient access permissions (as determined via the portal component 2549) as to be able to create the private federated area 2566m for private storage of one or more objects that are meant to be accessible by a relatively small number of users, and to create the related public federated area 2566x for storage of objects meant to be made more widely available through the granting of access to the base federated area 2566x to a larger number of users. Such access permissions may also include the granted ability to specify what relationships may be put in place between the federated areas 2566m and 2566x, including and not limited to, any inheritance, priority and/or dependency relationships therebetween. Such characteristics about each of the federated areas 2566m and 2566x may be caused to be stored by the federated area component 2546 as part of the federated area parameters 2536. As depicted, the federated area parameters 2536 may include a database of information concerning each federated area 2566 that is caused to be instantiated and/or maintained by the federated area component 2546. As with the database of accounts just earlier described as being implemented in some embodiments within the portal data 2539, such a database of information concerning federated areas 2566 within the federated area parameters 2536 may also make use of either or both of the human-readable FA identifiers 2568 or the global FA identifiers 2569 to identify each federated area 2566.

As an alternative to both of the federated areas 2566m and 2566x having been created and caused to be related to each other through express requests by a user, in other embodiments, the processor(s) 2550 of the one or more federated devices 2500 may be caused by the federated area component 2546, and based on rules retrieved from federated area parameters 2536, to automatically create and configure the private federated area 2566m in response to a request to add a user associated with the source device 2100m to the users permitted to access the base federated area 2566x. More specifically, a user of the depicted source device 2100x that may have access permissions to control various aspects of the base federated area 2566x may operate the source device 2100x to transmit a request to the one or more federated devices 2500, via the portal provided thereby on the network 2999, to grant a user associated with the source device 2100m access to use the base federated area 2566x. In response, and in addition to so granting the user of the source device 2100m access to the base federated area 2566x, the processor(s) 2550 of the one or more federated devices 2500 may automatically generate the private federated area 2566m for private use by the user of the source device 2100m. Such automatic operations may be triggered by an indication stored in the federated area database within the federated area parameters 2536 that each user that is newly granted access to the base federated area 2566x is to be so provided with their own private federated area 2566. This may be deemed desirable as an approach to making the base federated area 2566x easier to use for each such user by providing individual private federate areas 2566 within which objects may be privately stored and/or developed in preparation for subsequent release into the base federated area 2566x. Such users may be able to store private sets of various tools that each may use in such development efforts.

Following the creation of both the federated areas 2566x and 2566m, the processor(s) 2550 of the one or more federated devices 2500 may be caused to instantiate and maintain the private federated area 2566q to be part of the set of federated areas 2566m and 2566x. In so doing, the private federated area 2566q is added to the set in a manner that converts what was a linear hierarchy into a hierarchical tree with a pair of branches. As with the instantiation of the private federated area 2566m, the instantiation of the private federated area 2566q may also be performed by the processor(s) 2550 of the one or more federated devices 2500 as an automated response to the addition of a user of the depicted source device 2100q as authorized to access the base federated area 2566x. Alternatively, a user with access permissions to control aspects of the base federated area 2566x may operate the source device 2100x to transmit a request to the portal generated by the one or more federated devices 2500 to create the private federated area 2566q, with inheritance, priority and/or dependency relationships with the base federated area 2566x, and with access that may be limited (at least initially) to the user of the source device 2100q.

Following the addition of the federated area 2566q, the processor(s) 2550 of the one or more federated devices 2500 may be caused to first, instantiate the intervening federated area 2566u inserted between the private federated area 2566q and the base federated area 2566x, and then instantiate the private federated area 2566r that branches from the newly created intervening federated area 2566u. In so doing, the second branch that was created with the addition of the private federated area 2566q is expanded into a larger branch that includes both of the private federated areas 2566q and 2566r in separate sub-branches.

In various embodiments, the insertion of the intervening federated area 2566u may be initiated in a request transmitted to the portal from either the user of the source device 2100q or the user of the source device 2100x, depending on which user has sufficient access permissions to be permitted to make such a change in the relationship between the private federated area 2566q and the base federated area 2566x, including the instantiation and insertion of the intervening federated area 2566u therebetween. In some embodiments, it may be necessary for such a request made by one of such users to be approved by the other before the processor(s) 2550 of the one or more federated devices 2500 may proceed to act upon it.

Such a series of additions to a hierarchical tree may be prompted by any of a variety of circumstances, including and not limited to, a desire to create an isolated group of private federated areas that are all within a single isolated branch that includes an intervening federated area by which users associated with each of the private federated areas within such a group may be able to share objects without those objects being more widely shared outside the group as by being stored within the base federated area 2566x. Such a group of users may include a group of collaborating developers of task routines 2440, data sets 2330 and/or job flow definitions 2220.

As each of the federated areas 2566m, 2566q, 2566r, 2566u and 2566x are created, each may be given a human-readable FA identifier 2568 that may be supplied in the requests that are received to create each of them and/or that may be supplied and/or generated in any of a variety of other ways, including through any of a variety of user interfaces. Also, as previously discussed, regardless of the manner or circumstances in which each of the depicted federated areas 2566m, 2566q, 2566r, 2566u or 2566x is instantiated, in at least some embodiments, the processor(s) 2550 may be caused to generate a global FA identifier 2569 for each of these federated areas automatically as part of each of their instantiations. Again, this may be deemed desirable in order to have each of these federated areas be immediately distinguishable by such a practically unique identifier from the moment that each begins its existence. In this way, such global FA identifiers 2569 may be immediately available to be used to identify each of these federated areas within both the federated area parameters 2536 and the portal data 2539.

Figure 16A:
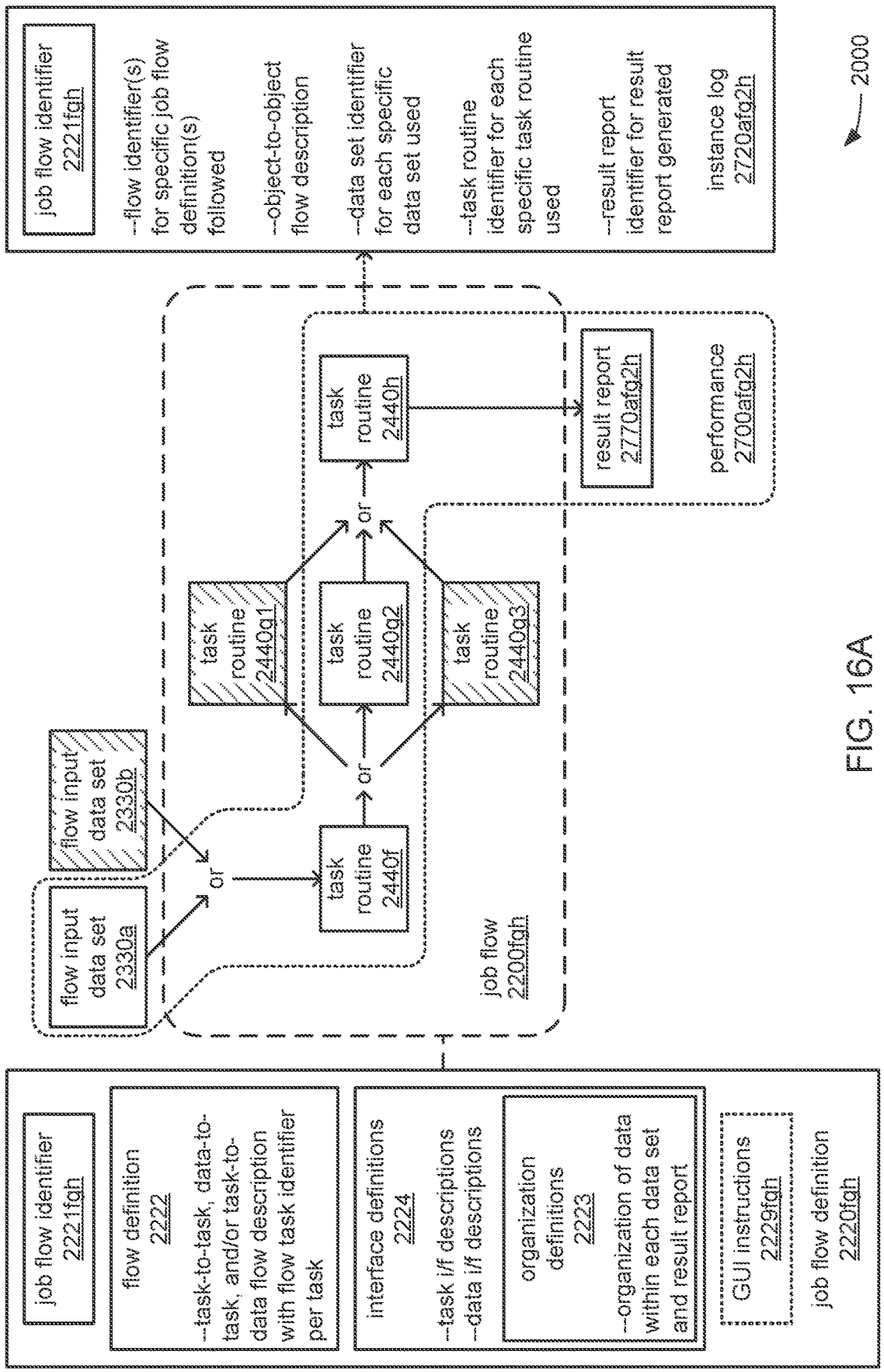
FIGS. 16A, 16B, 16C, 16D, 16E, 16F, 16G, 16H and 16I, together, illustrate an example of defining and performing a job flow, and of documenting the performance.
Figure 16B:
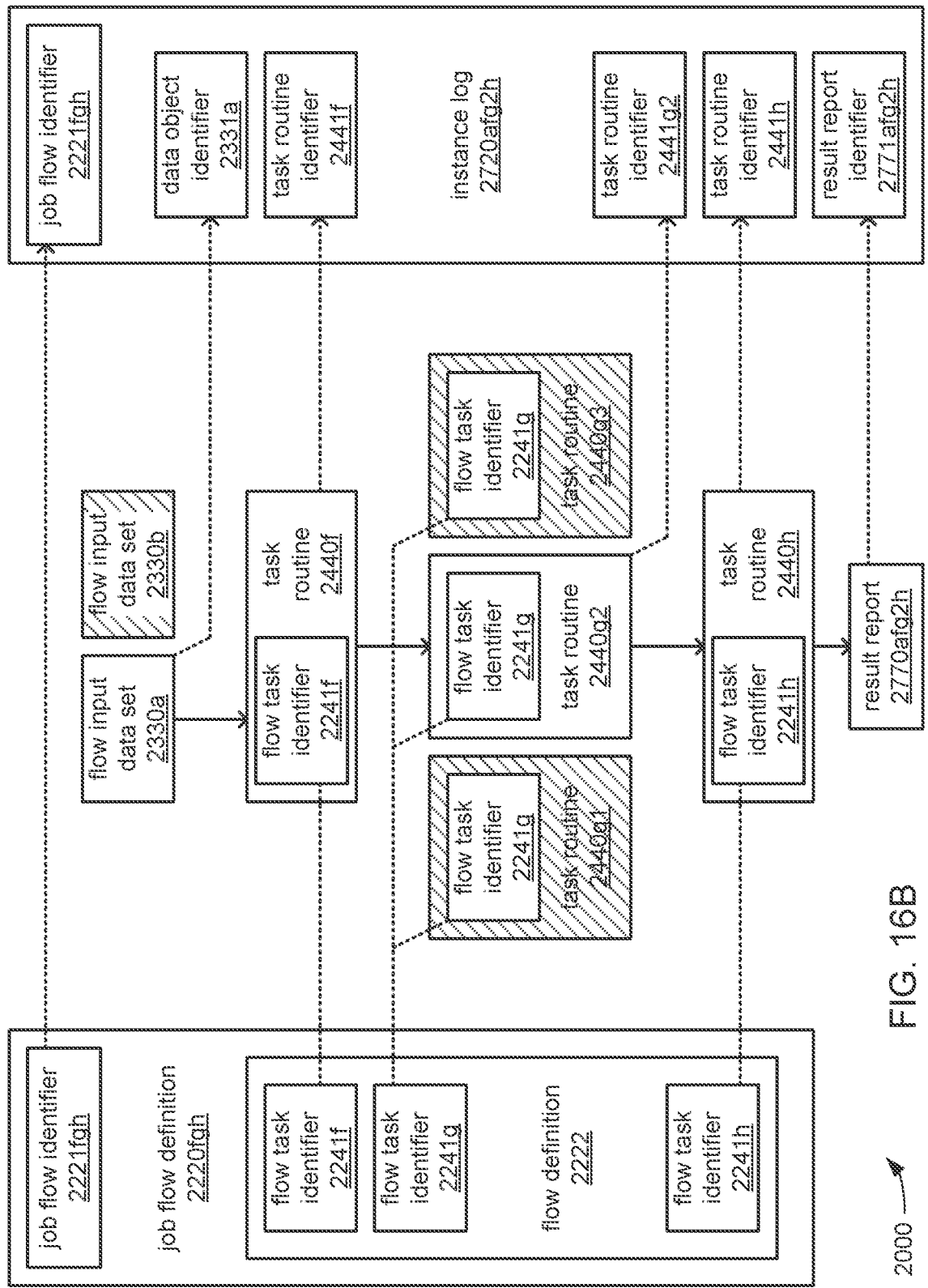
Figure 16C:
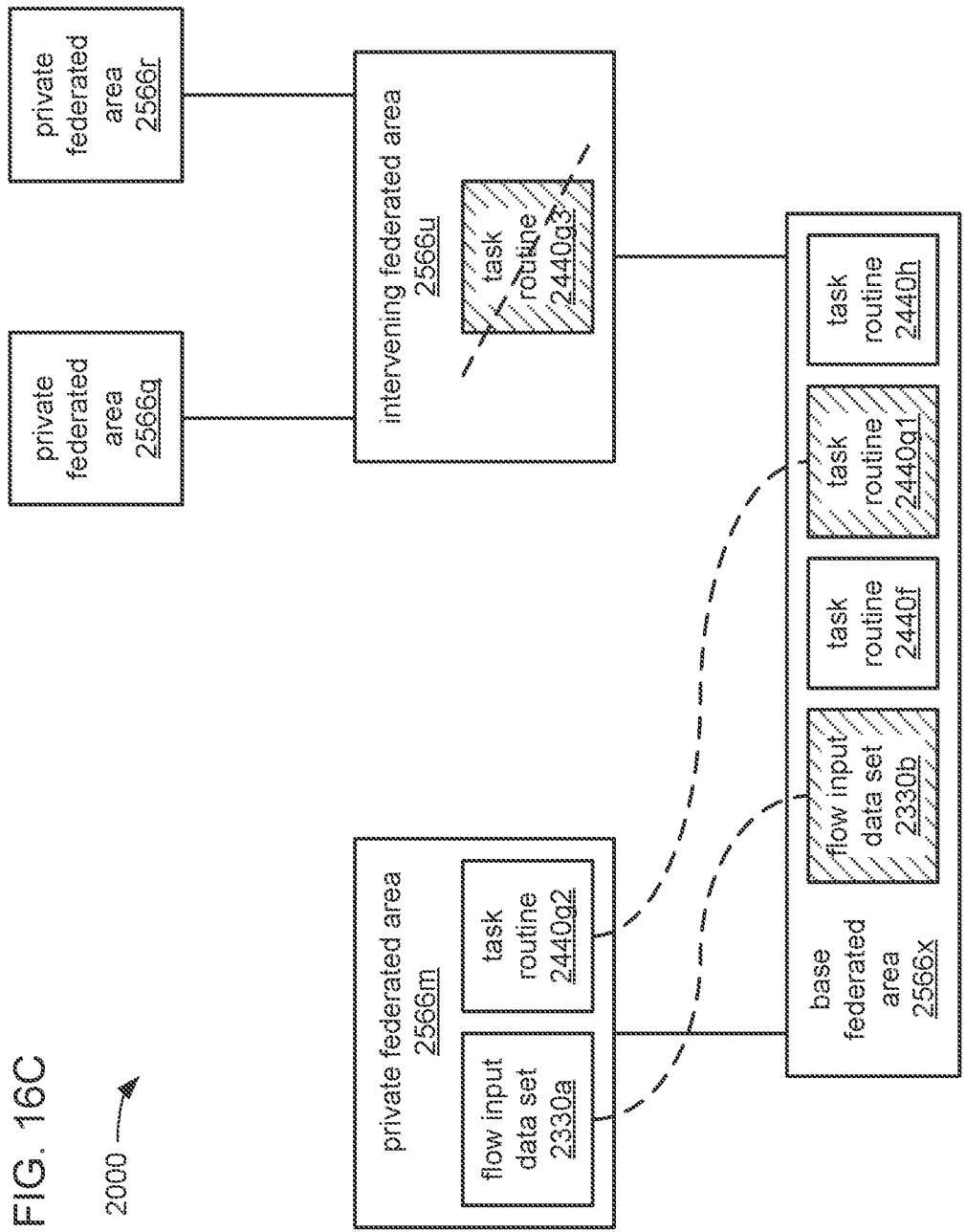
Figure 16D:
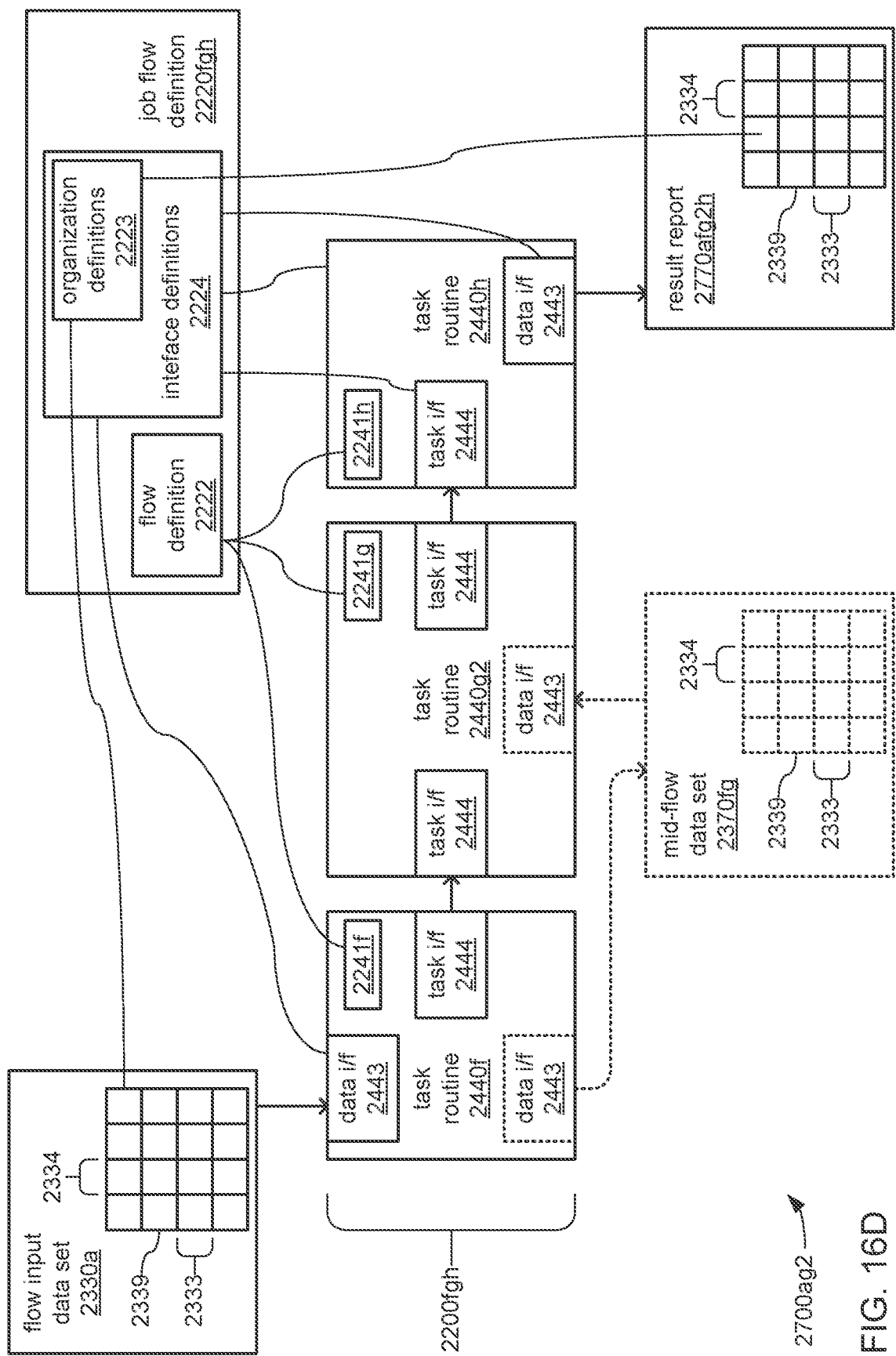
Figure 16E:
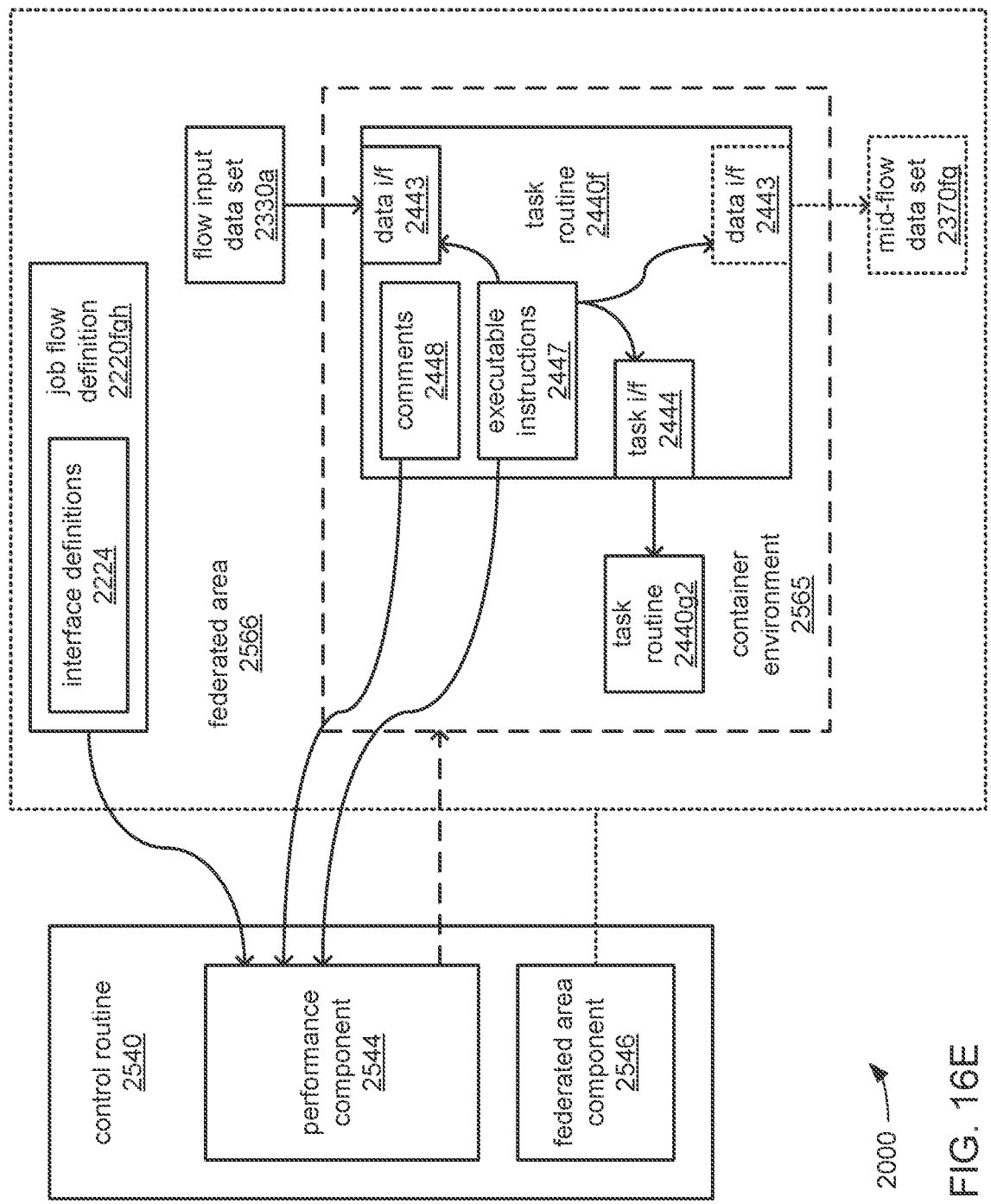
Figure 16F:
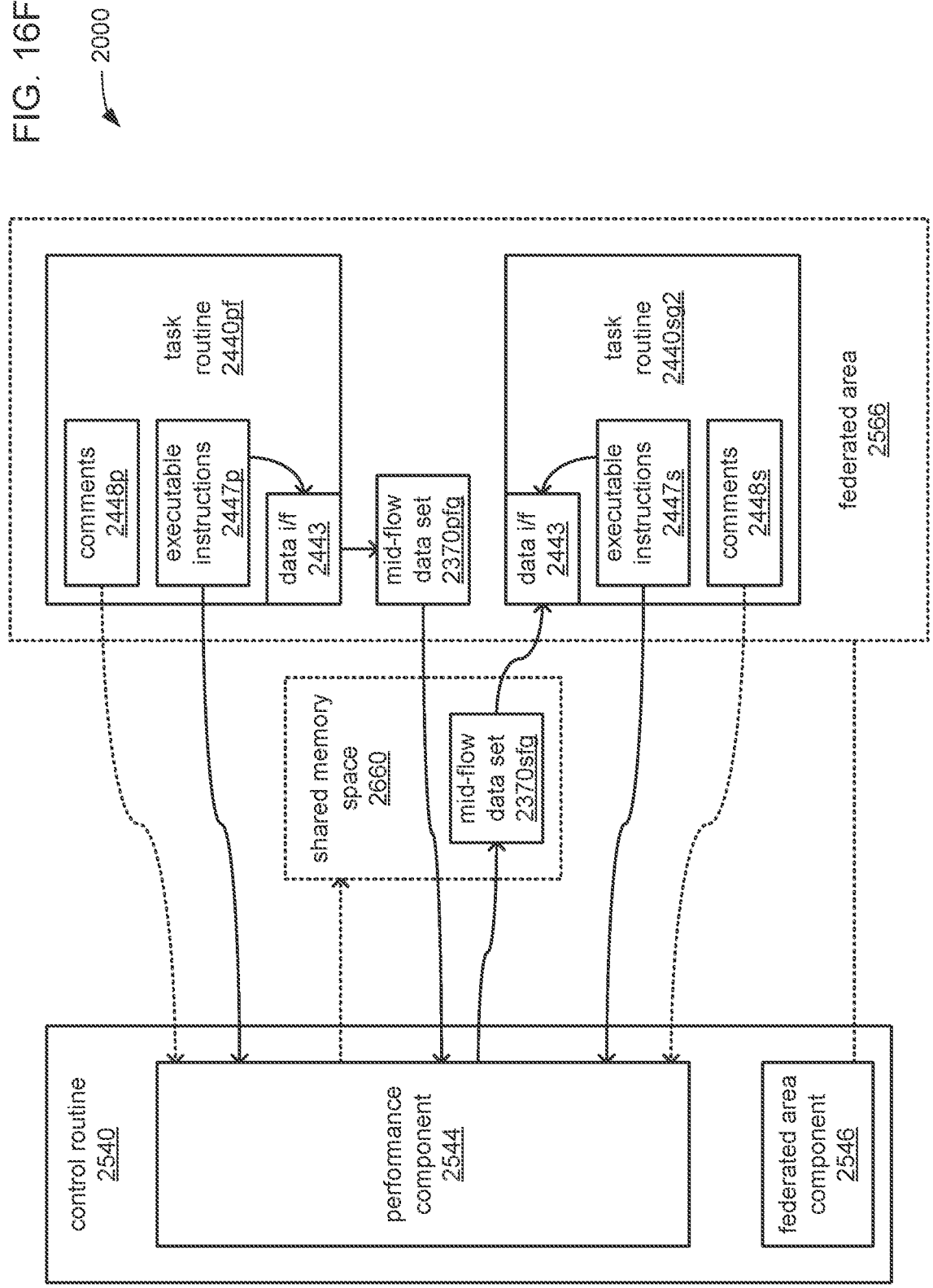
Figure 16G:
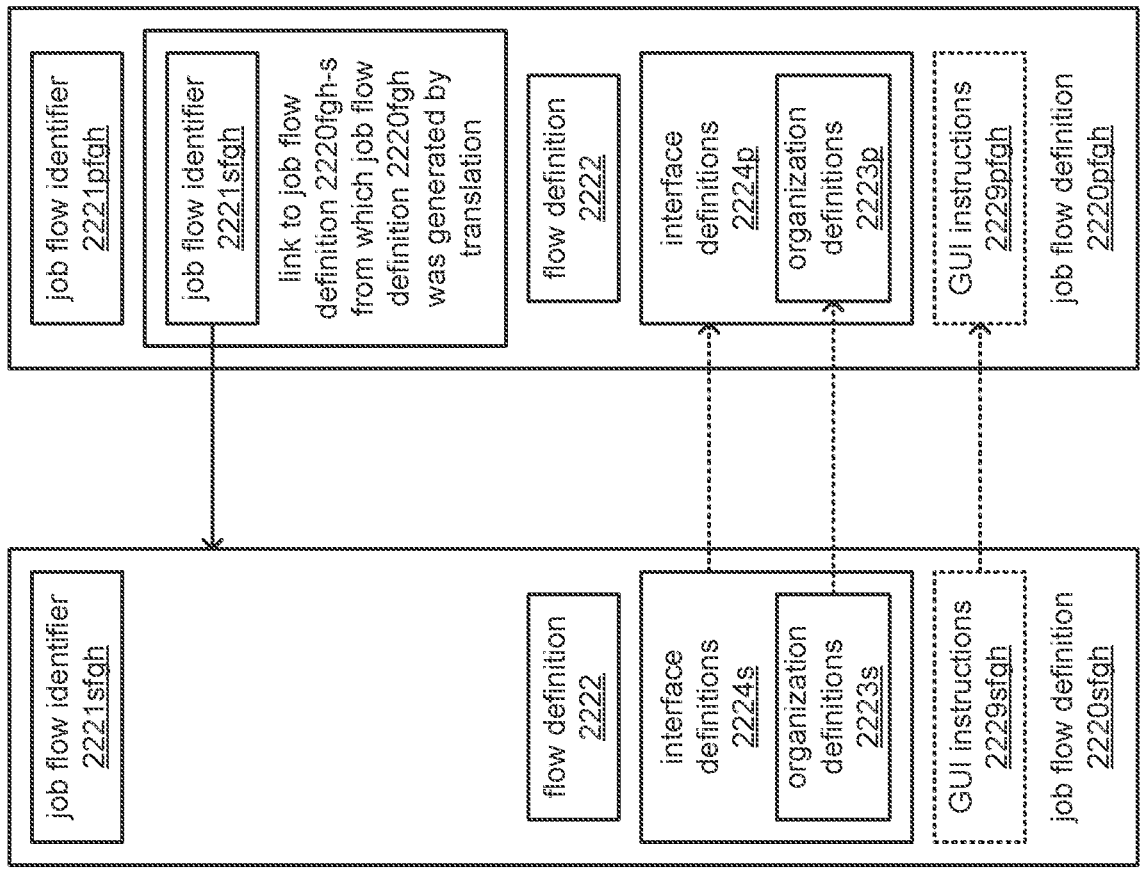
Figure 16H:
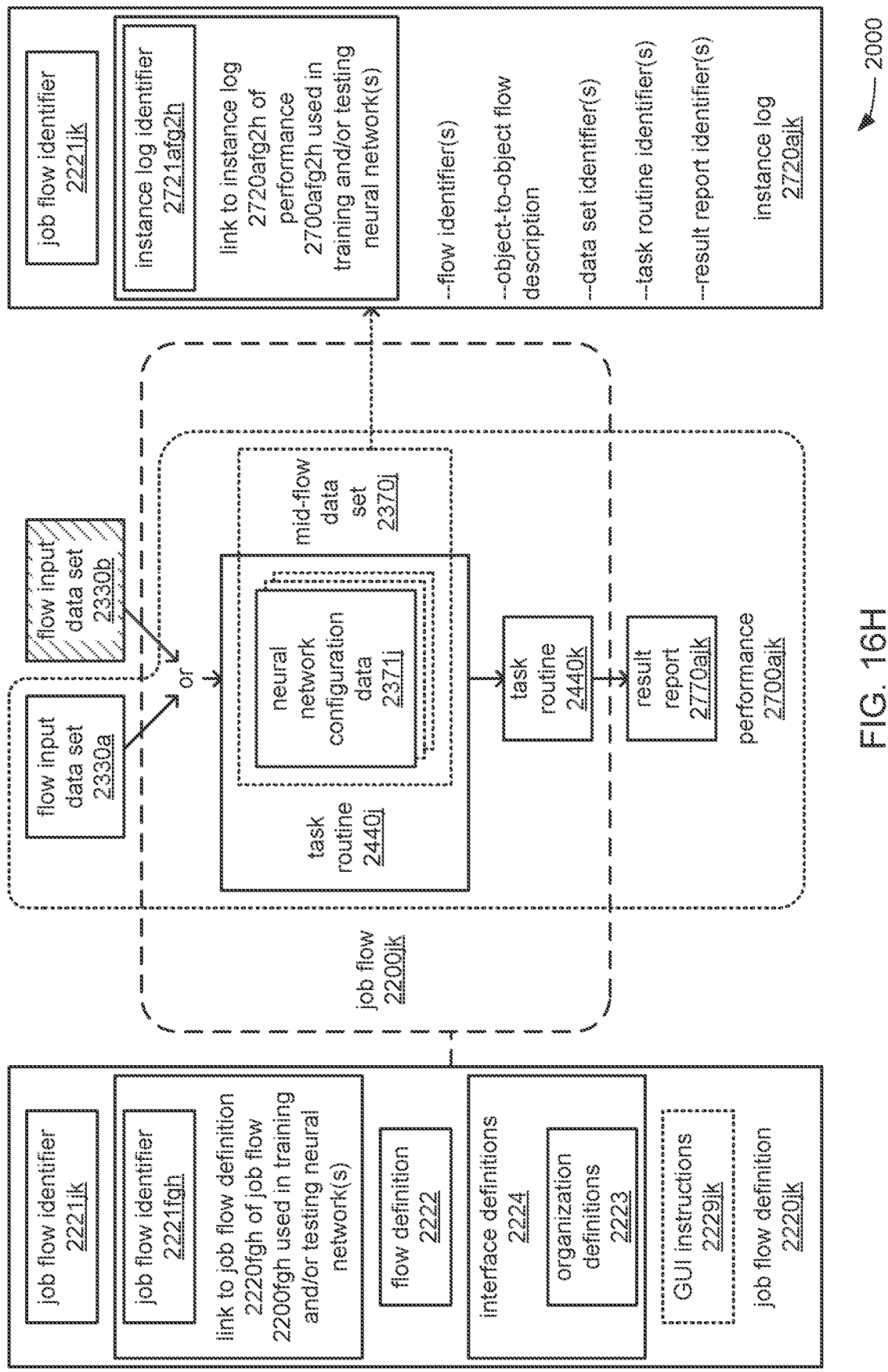
Figure 16I:
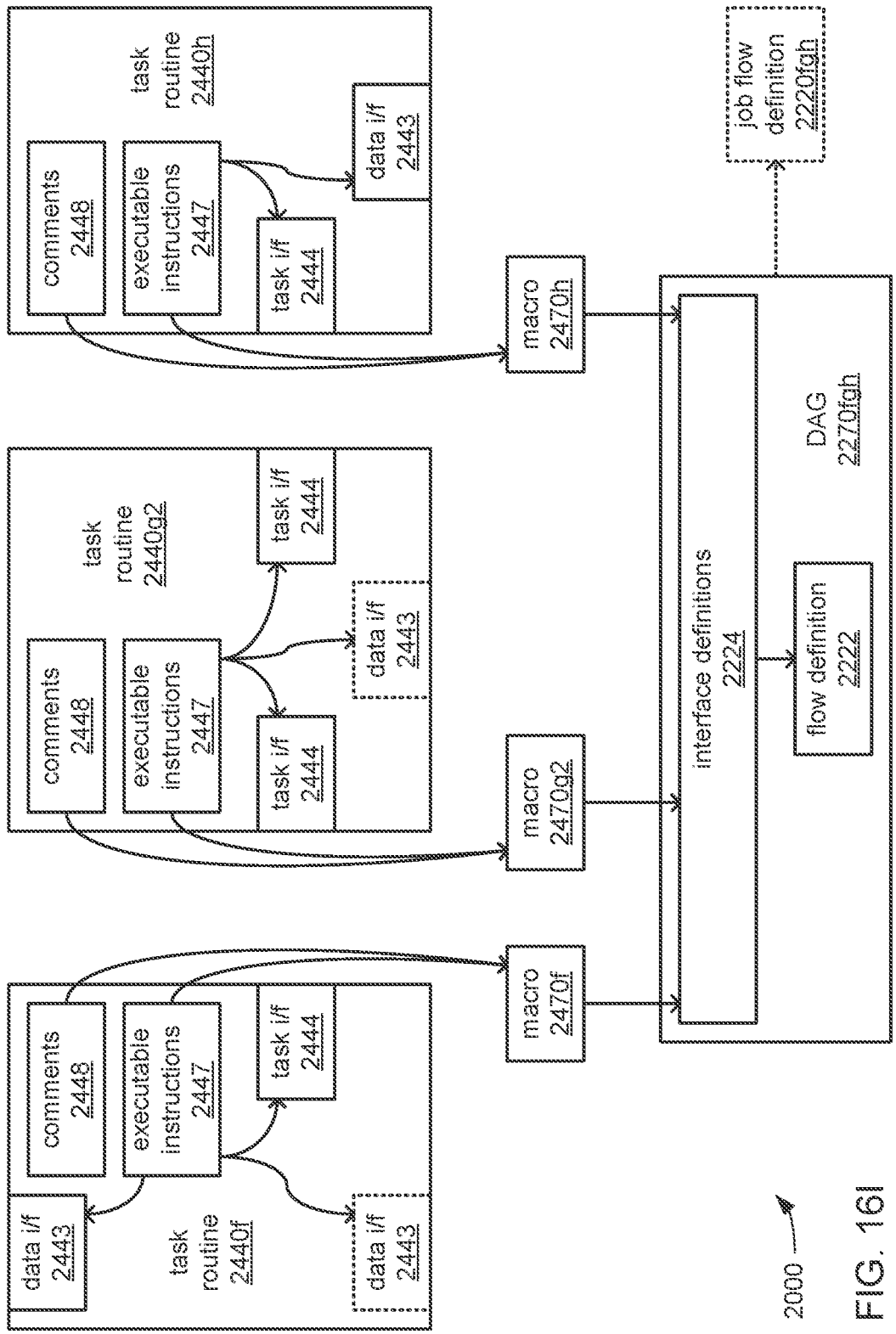

FIGS. 16A, 16B, 16C, 16D, 16E, 16F, 16G, 16H and 16I, together, illustrate the manner in which a set of objects may be used to define and perform an example job flow 2200fgh, as well as to document the resulting example performance 2700afg2h of the example job flow 2200fgh. FIG. 16E additionally illustrates how information incorporated into one of the task routines 2440f and/or into the job flow definition 2220fgh may be used to verify the functionality of that task routine. FIG. 16F additionally illustrates how a mid-flow data set may be converted between two forms amidst being exchanged between two task routines to accommodate the use of different programming languages therebetween. FIG. 16G additionally illustrates the manner in which the job flow definition 2200fgh may be marked as associated with another job flow definition 2200fgh-s from which the job flow definition 2200fgh may have been derived by translation. FIG. 16H additionally illustrates the manner in which a job flow 2200fgh that employs non-neuromorphic processing to perform a function may be marked as associated with another job flow 2200jk that employs neuromorphic processing to perform the same function and that was derived from the job flow 2200fgh. FIG. 16I additionally illustrates the manner in which the job flow definition 2220fgh may be generated as and/or from a DAG 2270fgh. For sake of ease of discussion and understanding, the same example job flow 2200fgh and example performance 2700afg2h of the example job flow 2200fgh are depicted throughout all of FIGS. 16A-I. Also, it should be noted that the example job flow 2200fgh and example performance 2700*afg2h* thereof are deliberately relatively simple examples presented herein for purposes of illustration, and should not be taken as limiting what is described and claimed herein to such relatively simple embodiments.

As depicted, the example job flow 2200*fgh* specifies three tasks that are to be performed in a relatively simple three-step linear order through a single execution of a single task routine 2440 for each task, with none of those three tasks entailing the use of neuromorphic processing. Also, the example job flow 2200*fgh* requires a single data set as an input data object to the first task in the linear order, may generate and exchange a single data set between two of the tasks, and generates a single result report as an output data object of the last task in the linear order. As also depicted, in the example performance 2700*afg2h* of the example job flow 2200*fgh*, task routines 2440*f*, 2440*g2* and 2440*h* are the three task routines selected to be executed to perform the three tasks. Also, a flow input data set 2330*a* is selected to serve as the input data object, a mid-flow data set 2370*fg* may be generated and exchanged between two of the performed tasks as a mechanism to exchange data therebetween, and a result report 2770*afg2h* is the output data object to be generated as an output of the performance 2700*afg2h*. Again, it should be noted that other embodiments of a job flow are possible in which there may be many more tasks to be performed, many more data objects that serve as inputs and/or many more data objects generated as outputs. It should also be noted that other embodiments of a job flow are possible in which there is a much more complex order of the performance of tasks that may include parallel and/or conditional branches that may converge and/or diverge.

Turning to FIGS. 16A and 16B, the job flow definition 2220*fgh* for the example job flow 2200*fgh* may include a flow definition 2222 that specifies the three tasks to be performed, the order in which they are to be performed, and which of the three tasks is to accept a data object as an input and/or generate a data object as an output. In specifying the three tasks to be performed, the flow definition 2222 may use flow task identifiers 2241, such as the depicted flow task identifiers 2241*f*, 2241*g* and 2241*h* that uniquely identify each of the three tasks. As depicted, there may be just a single task routine 2440*f* available among one or more federated areas 2566 to which access is granted that is able to perform the task specified with the flow task identifier 2241*f*, and therefore, the single task routine 2440*f* may be the one task routine that is assigned the flow task identifier 2241*f* to provide an indication that it is able to perform that task. Also, there may be three task routines 2440*g1*, 2440*g2* and 2440*g3* available among the one or more accessible federated areas 2566 that are each able to perform the task specified with the flow task identifier 2241*g*, and therefore, each may be assigned the same flow task identifier 2241*g*. Further, there may be just a single task routine 2440*h* available within the one or more accessible federated areas 2566 that is able to perform the task specified with the flow task identifier 2241*h*, resulting in the assignment of the flow task identifier 2241*h* to the single task routine 2440*h*.

As has been discussed, the job flow definition 2220*fgh* specifies the tasks to be performed in a job flow, but does not specify any particular task routine 2440 to be selected for execution to perform any particular one of those tasks during any particular performance of the job flow. Where there are multiple task routines 2440 that are capable of performing a particular task, a single one of those multiple task routines 2440 is selected for execution to do so, and the selection that is made may, in part, depend on the nature of the request received to perform a job flow. More specifically, the selection of a particular task routine 2440 for execution to perform each particular task may be based on which task routine 2440 is the newest version to perform each task, and/or may be based on which task routine 2440 was used in a previous performance of each task in a specified previous performance of a job flow. As will be explained in detail, the selection criteria that is used to select a task routine 2440 for each task may depend on whether an entirely new performance of a job flow is requested or a repetition of an earlier performance of a job flow is requested. As depicted, in the example performance 2700*afg2h* of the example job flow 2200*fgh*, the task routine 2440*g2* is selected from among the task routines 2440*g1*, 2440*g2* and 2440*g3* for execution to perform the task identified with the flow task identifier 2241*g*.

Alternatively or additionally, and as previously explained in connection with FIGS. 15A-B, in situations in which objects needed for the performance of a job flow are distributed among multiple federated areas that are related by inheritance and/or priority relationships, the selection of a particular task routine 2440 to perform a task from among multiple task routines 2440 that are each capable of performing that same task may, in part, be dependent upon which federated area 2566 each of such multiple task routines 2440 are stored within. By way of example, FIG. 16C depicts an example situation in which objects needed to perform the job flow 2200*fgh* are distributed among the federated areas 2566*m*, 2566*u* and 2566*x* in the example hierarchical tree of federated areas first introduced in FIGS. 15B-C. More specifically, in this example, the data set 2330*a* and the task routine 2440*g2* are stored within the private federated area 2566*m*; the task routine 2440*g3* is stored within the intervening federated area 2566*u*; and the data set 2330*b* and the task routines 2440*f*, 2440*g1* and 2440*h* are stored within the base federated area 2566*x*.

As previously discussed in reference to the linear hierarchy depicted in FIG. 15A, a "perspective" from which a job flow is to be executed may based on which federated areas 2566 are made accessible to the device and/or device user that makes the request for the performance to occur. As depicted, where the request to perform the job flow 2200*fgh* is received from a user granted access to the private federated area 2566*m*, as well as to the base federated area 2566*x*, but not granted access to any of the federated areas 2566*q*, 2566*r* or 2566*u*, the search for objects to use in the requested performance may be limited to those stored within the private federated area 2566*m* and the base federated area 2566*x*. Stated differently, the perspective that may be automatically selected for use in determining which federated areas 2566 are searched for objects may be that of the private federated area 2566*m*, since the private federated area 2566*m* is the one federated area to which the user in this example has been granted access to that is subject to the most restricted degree of access. Based on this perspective, the private federated area 2566*m* will be searched, along with the base federated area 2566*x*, and along with any intervening federated areas 2566 therebetween, if there were any federated areas 2566 therebetween.

As a result, the task routine 2440*g3* stored within the intervening federated area 2566*u* is entirely unavailable for use in the requested performance as a result of the user having no grant of access to the intervening federated area 2566*u*, and this then becomes the reason why the task routine 2440*g3* is not selected. In contrast, as a result of an inheritance relationship between the private federated area 2566*m* and the base federated area 2566*x*, the data set 2330*b* and each of the task routines 2440*f*, 2440*g1* and 2440*h* stored in the based federated area 2566*x* may each be as readily available for being used in the requested performance of the job flow 2200*fgh* as the data set 2330*a* and the task routine 2440*g*2 stored in the private federated area 2566*m*. Therefore, the task routines 2440*f* and 2440*h* may be selected as a result of being the only task routines available within either federated area 2566*m* or 2566*x* that perform their respective tasks. However, although both of the flow input data sets 2330*a* and 2330*b* may be equally available through that same inheritance relationship, a priority relationship also in place between the federated areas 2566*m* and 2566*x* may result in the data set 2330*a* being selected as the data set used as input, since the flow input data set 2330*a* is stored within the private federated area 2566*m*, which is searched first for the objects needed for the requested performance, while the flow input data set 2330*b* is stored within the base federated area 2566*x*, which is searched after the search of the private federated area 2566*m*. The same combination of inheritance and priority relationships in place between the federated areas 2566*m* and 2566*x* may also result in the task routine 2440*g*2 stored within the private federated area 2566*m* being selected, instead of the task routine 2440*g*1 stored within the base federated area 2566*x*.

Turning to FIGS. 16A and 16D, the job flow definition 2220*fgh* may include interface definitions 2224 that specify aspects of task interfaces 2444 employed in communications among task the routines 2440 that are selected for execution to perform the tasks of the example job flow 2200*fgh* (e.g., the task routines 2440*f*, 2440*g*2 and 2440*h*). Such aspects may include quantity, type, bit widths, protocols, etc., of parameters passed from one task routine 2440 to another as part of communications among task routines 2440 during their execution. As also depicted, the interface definitions 2224 may alternatively or additionally specify aspects of data interfaces 2443 between task routines 2440 and any data objects that may be employed as an input to a performance (e.g., the flow input data set 2330*a*) and/or that may be generated as an output of a performance (e.g., the result report 2770*afg*2*h*) of the example job flow 2200*fgh*, such as the data example performance 2700*afg*2*h*. The interface definitions 2224 may also specify aspects of data interfaces 2443 employed by one task routine 2440 to generate a data object to convey a relatively large quantity of data to another task routine 2440 (e.g., the mid-flow data set 2370*fg* depicted with dotted lines, and depicted as generated by task routine 2440*f* for use as an input to task routine 2440*g*2), and may specify aspects of the data interface 2443 employed by the other task routine 2440 to retrieve data from that same data object. Since many of the specified aspects of the data interfaces 2443 may necessarily be closely associated with the manner in which data items are organized and made accessible within data objects, the interface definitions 2224 may include organization definitions 2223 that specify such organizational and access aspects of the data objects. Thus, as depicted in FIG. 16D, where each of the data sets 2330*a* and 2370*fg* (if any are present), and the result report 2770*afg*2*h* include a two-dimensional array, the organization definitions 2223 may specify various aspects of the data items 2339 (e.g., data type, bit width, etc.), the rows 2333 and/or the columns 2334 for each these data objects.

As previously discussed, the job flow definition 2220*fgh* specifies tasks to be performed and not the particular task routines 2440 to be selected for execution to perform those tasks, which provides the flexibility to select the particular task routines 2440 for each task dynamically at the time a performance takes place. Similarly, the job flow definition 2220*fgh* also does not specify particular data objects to be used, which provides the flexibility to select the particular data objects with which the job flow 2200*fgh* is to be used dynamically at the time a performance takes place. However, the interface definitions 2224 do specify aspects of the interfaces among the task routines 2440, and between the task routines 2440 and data objects. The specification of aspects of the interfaces 2443 and/or 2444 may be deemed desirable to ensure continuing interoperability among task routines 2440, as well as between task routines 2440 and data objects, in each new performance of a job flow 2200, even as new versions of one or more of the task routines 2440 and/or new data objects are created for use in later performances.

In some embodiments, new versions of task routines 2440 that may be created at a later time may be required to implement the interfaces 2443 and/or 2444 in a manner that exactly matches the specifications of those interfaces 2443 and/or 2444 within a job flow definition 2220. However, in other embodiments, a limited degree of variation in the implementation of the interfaces 2443 and/or 2444 by newer versions of task routines 2440 may be permitted as long as "backward compatibility" is maintained in retrieving input data objects or generating output data objects through data interfaces 2443, and/or in communications with other task routines through task interfaces 2444. As will be explained in greater detail, the one or more federated devices 2500 may employ the job flow definitions 2220 stored within one or more federated areas 2566 to confirm that new versions of task routines 2440 correctly implement task interfaces 2444 and/or data interfaces 2443. By way of example, in some embodiments, it may be deemed permissible for an interface 2443 or 2444 that receives information to be altered in a new version of a task routine 2440 to accept additional information from a newer data object or a newer version of another task routine 2440 if that additional information is provided, but to not require the provision of that additional information, since older data objects don't provide that additional information. Alternatively or additionally, by way of example, it may be deemed permissible for an interface 2443 or 2444 that outputs information to be altered in a new version of a task routine 2440 to output additional information as an additional data object generated as an output, or to output additional information to a newer version of another task routine 2440 in a manner that permits that additional information to be ignored by an older version of that other task routine 2440.

Returning to FIGS. 16A and 16B, an example instance log 2720*afg*2*h* that is generated as result a of the example performance 2700*afg*2*h* of the example job flow 2200*fgh* is depicted. Although the job flow definition 2220*fgh* does not specify particular data objects or task routines 2440 to be used in performances of the example job flow 2200*fgh*, the example instance log 2720*afg*2*h* does include such details, as well as others, concerning the example performance 2700*afg*2*h*. Thus, the example instance log 2720*afg*2*h* includes the job flow identifier 2221*fgh* for the example job flow definition 2220*fgh*; the task routine identifiers 2441*f*, 2441*g*2 and 2441*h* for the particular task routines 2440*f*, 2440*g*2 and 2440*h*, respectively, that were executed in the example performance 2700*afg*2*h*; the data object identifier 2331*a* for the data set 2330*a* used as an input data object; and the result report identifier 2771*afg*2*h* for the result report 2770*afg*2*h* generated during the example performance 2700*afg*2*h*. As has been discussed, the example instance log 2720*afg*2*h* is intended to serve as a record of sufficient detail concerning the example performance 2700*afg*2*h* as to enable all of the objects associated with the example performance 2700afg2h to be later identified, retrieved and used to repeat the example performance 2700afg2h. In contrast, the job flow definition 2220fgh is intended to remain relatively open-ended for use with a variety of data objects and/or with a set of task routines 2440 that may change over time as improvements are made to the task routines 2440.

Turning to FIG. 16E, in some embodiments, the input/output behavior of each of the task routines 2440 that may be selected and executed in performing the job flow 2200fgh may be verified by being monitored during the performance of the job flow 2200fgh, with the observed input/output behavior being compared to the expected input/output behavior. More specifically and as depicted, the control routine 2540 may include a performance component 2544 operable on the processor 2550 to execute executable instructions 2447 of task routines 2440 to perform the tasks specified in a job flow definition 2220, and in so doing, the performance component 2544 may additionally instantiate a container environment 2565 in which the input/output behavior of task routines 2440 may be monitored, controlled and/or compared to expected behavior. Still more specifically, and as depicted in FIG. 16F as an example, the interface definitions 2224 within the job flow definition 2220fgh, the comments 2448 of the task routine 2440f and/or the executable instructions 2447 that implement each of the depicted interfaces 2443 and 2444 of the task routine 2440f may be employed by the performance component 2544 as a reference for those interfaces of the task routine 2440f. The performance component 2544 may use such a reference to instantiate, within a federated area 2566, a container environment 2565 within which the task routine 2440f is executed during a performance of the job flow 2200fgh. In some embodiments, the instantiation of the container environment 2565 may be done to create an execution environment for the task routine for the sole purpose of monitoring what input/output accesses are made by the task routine 2440f to enable a comparison to be made between observed input/output behavior of the task routine 2440f and the input/output behavior that is expected of the task routine 2440f based on the reference description of aspects of the interfaces 2443 and/or 2444 provided by the comments 2448, the executable instructions 2447 and/or the interface definitions 2224. In other embodiments, the instantiation of the container environment 2565 may be done to also create an execution environment for the task routine 2440f in which the expected input/output behavior is actually enforced upon the task routine 2440f such that any aberrant input/output behavior by the task routine 2440f is not allowed to be fully performed (e.g., attempted input/output accesses to data structures and/or input/output devices that go beyond the expected input/output behavior are prevented from actually taking place). Where the observed input/output behavior conforms to the expected input/output behavior, the input/output functionality of the task routine 2440f may be deemed to have been verified.

Regardless of whether the container environment 2565 enforces expected input/output behavior in addition to monitoring the input/output behavior that actually occurs, the results of the comparison between the observed input/output behavior and the expected input/output behavior (e.g., whether the input/output functionality of the task routine 2440f is verified, or not) may be recorded in any of a variety of ways. By way of example, in embodiments in which each task routine 2440 is stored within one or more federated areas 2566 through use of a database to enable more efficient retrieval of task routines 2440, the results of this comparison for the task routine 2440f may be marked in an entry maintained by such a database for the task routine 2440f. Alternatively or additionally, where a DAG 2270 is generated that includes a visual representation of the task routine 2440f, that representation may be accompanied by a visual indicator of the results of this comparison.

Turning to FIG. 16F, as previously discussed, in some embodiments, the combination of task routines 2440 that are executed during the performance of a job flow 2200 may include task routines with executable instructions 2447 and/or comments 2448 written in differing programming languages with the differing syntax, vocabulary, formatting and/or semantic features thereof. More specifically, and as depicted, the task routine 2440f may have been written in a primary programming language that is normally interpreted by the processor(s) 2550 of the one or more federated devices 2500 at runtime, such that the task routine 2440f is designated as task routine 2440pf. Therefore, within the task routine 2440pf, the executable instructions 2447p may be written in the primary programming language, and the comments 2448p may be written with the syntax used to distinguish comments from executable instructions in the primary programming language. As also depicted, the task routine 2440g2 may have been written in a secondary programming language, such that the task routine 2440g2 is designated as task routine 2440sg2. The secondary programming language may not be one that is normally interpreted by the processor(s) 2550, but may still be among a set of pre-selected secondary programming languages that the processor(s) 2550 may still be capable of interpreting during runtime, either in addition to or in lieu of the primary programming language. Therefore, within the task routine 2440sg2, the executable instructions 2447s may be written in the secondary programming language, and the comments 2448s may be written with the syntax used to distinguish comments from executable instructions in the secondary programming language.

As will be familiar to those skilled in the art, among the differences between different programming languages may be support for different data types and/or differences in array types, including differences in data types of items of data within arrays and/or differences in accessing items of data therein. Thus, although the executable instructions 244'7p of the task routine 2440pf may have been written to implement the depicted data output interface 2443 to generate the mid-flow data set 2370fg as an output, and although the executable instructions 2447s of the task routine 2440sg2 may have been written to implement the depicted data input interface 2443 to receive the mid-flow data set 2370fg as an input, there may be differences in the form of the mid-flow data set 2370fg as it is output from the form of the mid-flow data set 2370fg that is needed to be accepted as input. More specifically, the mid-flow data set 2370 may be output in a form designated as the mid-flow data set 2370pfg that has one or more particular details of its structure being dictated by the use of the primary programming language in the executable instructions 244'7p that differ somewhat from the form designated as the mid-flow data set 2370sfg that is needed to accommodate the use of the secondary programming language in the executable instructions 2447s.

To resolve such differences, the performance component 2544 may perform a conversion of data structure and/or data type (e.g., serialization or de-serialization) of the mid-flow data set 2370fg from its 2370pfg form to its 2370sfg form during runtime. More precisely, the performance component 2544 may temporarily instantiate a shared memory space 2660 within which one of these two forms of the mid-flow data set 2370 may be temporarily stored during the performance of the job flow 2200*fgh*. As has been discussed, it may be deemed desirable to store mid-flow data sets 2370 that are generated during the performance of a job flow as part of enabling a subsequent analysis of the performance of individual tasks of that job flow by having the mid-flow data sets thereof 2370 preserved in federated area(s) 2566 along with other objects associated with that job flow. With the particular programming language in which the executable instructions 244'7*p* of the task routine 2440*pf* having been designated as the primary programming language, it may be deemed preferable to store the mid-flow data set 2370*fg* in the form 2370*pfg* in which it was output by the task routine 2440*pf*, and to not consume valuable storage space in a federated area 2566 by also storing the other form 2370*sfg*. Thus, while the mid-flow data set 2370*fg* may be persisted in a federated area 2566 in the form 2370*pfg*, the other form 2370*sfg* may be discarded as part of un-instantiating the shared memory space 2660 when the performance of the job flow 2200*fgh* is completed.

Turning to FIG. 16G, as previously discussed, it may be that portion(s) of one or more objects of a job flow 2200 were originally written in a secondary programming language that differs from the primary programming language that is relied upon by the processor(s) 2550 of the one or more federated devices 2500 to perform job flows 2200. In such situations, and as will be discussed in more detail, such portions of such objects may be translated from such a secondary programming language to the primary programming language, and this may result in the generation of a translated form of each of such objects in which the portion(s) written in the secondary programming language are replaced with corresponding portions in the primary programming language. As will the neuromorphic job flow definition 2220*jk*, above, it may be deemed desirable to be able to trace where a translated form of an object came from by including an identifier of the original form of the object from which the translated form was generated.

More specifically, it may be that portions of the job flow definition 2220*fgh* introduced in FIG. 16A was originally written in a secondary programming language as the job flow definition 2220*fgh-s*. As depicted, such portions may include the depicted interface definitions 2224-*s* (which may include the organization definitions 2223-*s*) and/or the GUI instructions 2229*fgh-s*. As depicted, such portions may be translated from the secondary programming language to the primary programming language that will be utilized during the performance 2700*afg2h*. In so doing, the job flow definition 2220*fgh* may be generated. As a measure to enable accountability for the accuracy of the translation(s) that are so performed, the job flow definition 2220*fgh* may be generated to additionally include the job flow identifier 2221*fgh-s* that identifies the job flow definition 2220*fgh-s*. Additionally, it may be that the job flow definition 2220*fgh-s* is maintained in a federated area 2566 along with the job flow definition 2220*fgh*.

Turning for FIG. 16H, a new job flow that employs neuromorphic processing (i.e., uses a neural network to implement a function) may be derived from an existing job flow that does not employ neuromorphic processing (i.e., does not use a neural network, and instead, uses the execution of a series of instructions to perform the function). This may be done as an approach to creating a new job flow that is able to be performed much more quickly (e.g., by multiple orders of magnitude) than an existing job flow by using a neural network in the new job flow to perform one or more tasks much more quickly than may be possible through the non-neuromorphic processing employed in the existing job flow. However, as those skilled in the art will readily recognize, such a neural network may need to be trained, and neuromorphic processing usually requires the acceptance of some degree of inaccuracy that is usually not present in non-neuromorphic instruction-based processing in which each step in the performance of a function is explicitly set forth with executable instructions.

Such training of a neural network of such a new job flow may entail the use of a training data set that may be assembled from data inputs and data outputs of one or more performances of an existing job flow. Such a training data set may then be used, through backpropagation and/or other neuromorphic training techniques, to train the neural network. Further, following such training, the degree of accuracy of the neural network in one or more performances of the new job flow may be tested by comparing data outputs of the existing and new job flows that are derived from identical data inputs provided to each. Presuming that the new job flow incorporating use of the neural network is deemed to be accurate enough to be put to use, there may still, at some later time, be an occasion where the functionality and/or accuracy of the new job flow and/or the neural network may be deemed to be in need of an evaluation. On such an occasion, as an aid to ensuring accountability for the development of the new job flow and/or the neural network, it may be deemed desirable to provide an indication of what earlier job flow(s) and/or data object(s) were employed in training and/or in testing the new job flow and/or the neural network.

FIG. 16H provides a view of aspects of a example job flow 2200*jk* that employs neuromorphic processing (i.e., employs one or more neural networks), an example job flow definition 2220*jk* that defines the job flow 2200*jk*, an example performance 2700*ajk* of the job flow 2200*jk*, and a corresponding example instance log 2720*ajk* that documents the performance 2700*ajk*. This view is similar to the view provided by FIG. 16A of aspects of the earlier discussed example job flow 2200*fgh* that does not employ neuromorphic processing (i.e., employs no neural networks), the job flow definition 2220*fgh* that defines the job flow 2200*fgh*, the example performance 2700*afg2h* of the job flow 2200*fgh*, and the example instance log 2720*afg2h* that documents the performance 2700*afg2h*. As depicted in FIG. 16H, the job flow definition 2220*jk* may be defined to include a first task able to be performed by a task routine 2440*j* that entails the use of neural configuration data 2371*j*, and a second task able to be performed by a task routine 2440*k*. The task performable by the task routine 2440*j* may be that of using the neural network configuration data 2371*j* to instantiate a one or more neural networks (not specifically shown), and the task performable by the task routine 2440*k* may be that of using those one or more neural networks to cause the job flow 2200*jk* to perform the same function as the job flow 2200*fgh*.

The neural network configuration data 2371*j* may define hyperparameters and/or trained parameters that define at least one neural network employed in the job flow 2200*jk* after the at least one neural network has been trained. By way of example, the neural network configuration data 2371*j* may define hyperparameters and/or trained parameters for each neural network in an ensemble of neural networks (e.g., a chain of neural networks). Regardless of how many neural networks are associated with the neural network configuration data 2371*j*, the neural network configuration data 2371*j* may be deemed and/or handled as an integral part of the depicted example task routine 2440*j* for purposes of storage among one or more federated areas 2566. In such embodiments, the executable instructions 2447 of the task routine 2440$j$ may include some form of link (e.g., a pointer, identifier, etc.) that refers to the neural network configuration data 2371$j$ as part of a mechanism to cause the retrieval and/or use of the neural network configuration data 2371$j$ alongside the task routine 2440$j$. Alternatively, in such embodiments, the task routine 2440$j$ may wholly integrate the neural network configuration data 2371$j$ as a form of directly embedded data structure.

However, in other embodiments, the neural network configuration data 2371$j$ may be incorporated into and/or be otherwise treated as a mid-flow data set 2370$j$ that may be stored among multiple data sets 2330 and/or 2370 within one or more federated areas 2566, including being subject to at least a subset of the same rules controlling access thereto as are applied to any other data set 2330 and/or 2370. In such other embodiments, the same techniques normally employed in selecting and/or specifying a data set 2330 or 2370 as an input to a task routine 2440 in a performance of a job flow 2200 may be used to specify the neural network configuration data 2371$j$ as the mid-flow data set 2370$j$ serving as an input to the task routine 2440$j$. In this way, the at least one neural network defined by the configuration data 2371$j$ may be given at least some degree of protection against deletion, may be made available for use in multiple different job flow flows (including other job flows that may perform further training of that at least one neural network that yield improved versions that may also be so stored), and/or may be documented within one or more instance logs as having been employed in one or more corresponding performances of job flows 2200.

It should be noted that, although the neural network configuration data 2371$j$ is depicted and discussed herein as being designated and treated as the depicted mid-flow data set 2370$j$, this is in recognition of the possibility that, within a job flow 2200, one task routine 2440 may generate, in a training process, the neural network configuration data 2371$j$ as a mid-flow data set 2370$j$ for use by another task routine 2440 within the same job flow 2200. By way of example, a job flow 2200 may initially use the neural network configuration data 2371$j$ as is, but may then cease that initial use and initiate a training mode in which the neural network configuration data 2371$j$ is modified as a result of further training in response to a condition such as a failure to meet a threshold of accuracy during that initial use. However, other embodiments are possible in which the neural network configuration data 2371$j$ is generated within one job flow 2200 for use by one or more other job flows 2200, and/or is generated in an entirely different process that is not implemented as a job flow 2200 made up of multiple tasks that are performed by the execution of multiple task routines 2440. Thus, other embodiments are possible in which the neural network configuration data 2371$j$ may be more appropriately regarded as having been generated as a result report 2770 in the performance of a job flow 2200 and/or may be more appropriately regarded as a flow input data set 2330 to a job flow 2200.

It should also be noted that, although a single instance of neural network configuration data 2371 has been discussed as being treated as a data object (e.g., a data set 2330 or 2370, or a result report 2770), other embodiments are possible in which a single data object includes multiple instances of neural network configuration data 2371. This may be deemed desirable as a mechanism to keep together the hyperparameters and/or the trained parameters of a set of multiple neural networks that are to be used together to perform a function, such as an ensemble of neural networks. More precisely, while it may be that each neural network of a set of multiple neural networks is trained separately and/or sequentially, it may be deemed necessary to ensure success in using those multiple neural networks together by keeping the neural network configuration data 2371 for each of those neural networks together. In this way, a situation in which the neural network configuration data 2371 for a subset of those neural networks is errantly deleted may be avoided, as well as avoiding a situation in which older and newer versions of the neural network configuration data 2371 for different ones of those multiple neural networks are errantly used together.

As also depicted in FIG. 16H, the job flow definition 2220$jk$ of the example job flow 2200$jk$ may include the job flow identifier 2221$fgh$ as a form of link to the job flow definition 2220$fgh$ that defines the example job flow 2200$fgh$. Such a link to the job flow definition 2220$fgh$ may be provided in the job flow definition 2220$jk$ in a situation where one or more performances (i.e., the example performance 2700$afg2h$) of the job flow 2200$fgh$ were used in training and/or in testing the at least one neural network of the job flow 2200$jk$. Alternatively or additionally, the instance log 2720$ajk$ that documents aspects of the example performance 2700$afk$ of the example job flow 2200$jk$ may include the instance log identifier 2721$afg2h$ as a link to the instance log 2720$afg2h$ that documents the example performance 2700$afg2h$. Such a link to the instance log 2720$afg2h$ may be provided in the instance log 2720$ajk$ in a situation where the performance 2700$afg2h$ was used in training and/or in testing the at least one neural network of the job flow 2200$jk$. Through the provision of such links, the fact that the job flow 2200$fgh$ and/or the specific performance 2700$afg2h$ was used in training and/or in testing the at least one neural network of the job flow 2200$jk$ may be readily revealed, if at a later date, the job flow definition 2220$jk$ and/or the instance log 2720$ajk$ are retrieved and analyzed as part of a later evaluation of the job flow 2200$jk$. In this way, some degree of accountability for how the at least one neural network of the job flow 2200$jk$ was trained and/or tested may be ensured should such training and/or testing need to be scrutinized.

Returning to both FIGS. 16A and 16H, as depicted, either or both of the example job flow definitions 2220$fgh$ or 2220$jk$ may additionally include GUI instructions 2229$fgh$ or 2229$jk$, respectively. As previously discussed, such GUI instructions 2229 incorporated into a job flow definition 2220 may provide instructions for execution by a processor to provide a job flow GUI during a performance of the corresponding job flow 2200. As earlier discussed, a job flow definition 2220 may include flow task identifiers 2241 that identify the tasks to be performed, but not particular task routines 2440 to perform those tasks, as a mechanism to enable the most current versions of task routines 2440 to be used to perform the tasks. As also earlier discussed, a job flow definition 2220 may also define data interfaces 2223 in a way that specifies characteristics of the inputs and/or outputs for each task to be performed, but may not specify any particular data object 2330 as an approach to allowing data objects 2330 that are to be used as inputs to a performance to be specified at the time a performance is to begin. Through execution of GUI instructions 2229, a job flow GUI may be provided that guides a user through an opportunity to specify one or more of the data objects 2330 that are to be used as inputs. Alternatively or additionally, a job flow GUI may be provided to afford a user an opportunity to specify the use of one or more particular task routines 2440 as part of an effort to analyze the accuracy and/or other aspects of a performance of a job flow 2200. By way of example, the GUI instructions 2229*jk*, when executed, may provide a user an opportunity to specify the mid-flow data set 2370*j* or another data object 2330, 2370 or 2770 as the one that should be used to provide the neural network configuration data 2371*j* to be used to instantiate the at least one neural network to be used in a performance of the job flow 2200*jk*.

Turning to FIG. 16I, in some embodiments, the interface definitions 2224 within the job flow definition 2220*fgh* may be derived as part of the generation of a DAG 2270*fgh* based on comments 2448 about the interfaces 2443/2444 and/or based on portions of the executable instructions 2447 that implement the interfaces 2443/2444 within the task routines 2440*f*, 2440*g*2 and 2440*h*. More specifically, it may be that the job flow definition 2220*fgh* is at least partially generated from a parsing of comments 2448 and/or of portions of the executable instructions 2447 descriptive of the input and/or output interfaces 2443 and/or 2444 of one or more task routines 2440 that perform the functions of the job flow 2200*fgh* that the job flow definition 2220*fgh* is to define. In some embodiments, and as depicted, information concerning input to and/or output interfaces 2443 and/or 2444 from each of the task routines 2440*f*, 2440*g*2 and 2440*h* may be stored, at least temporarily, as macros 2470*f*, 2470*g*2 and 2470*h*, respectively, although it should be noted that other forms of intermediate data structure may be used in providing intermediate storage of information concerning inputs and/or outputs. With all of such data structures having been generated, the information within each that concerns input and/or output interfaces 2443 and/or 2444 may then be used to generate the DAG 2270*fgh* to include the interface definitions 2224. And it may be that, from the interface definitions 2224, at least a portion of the flow definition 2222 is able to be derived.

Figure 17A:
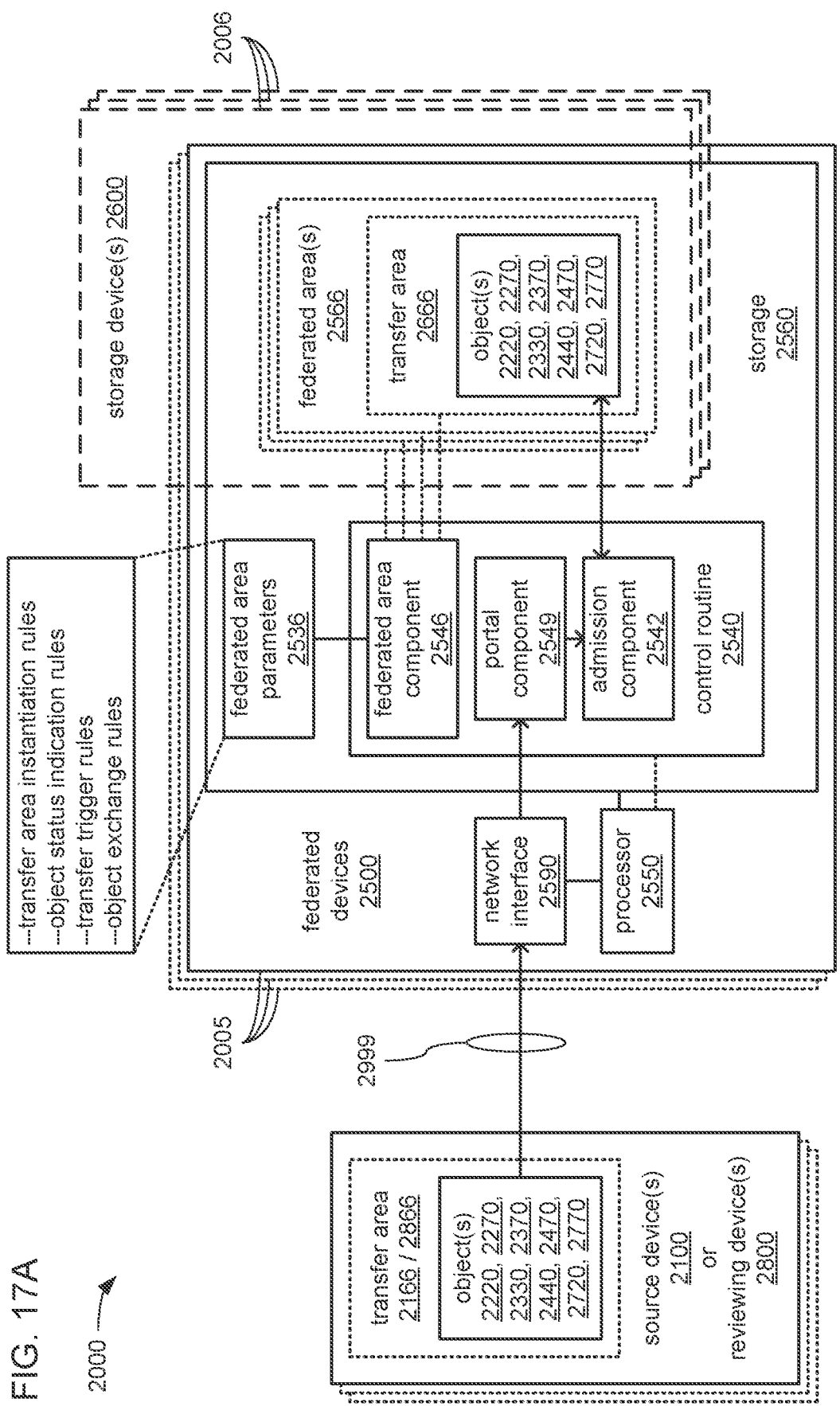
FIGS. 17A, 17B, 17C, 17D and 17E, together, illustrate an example of selectively storing, translating and assigning identifiers to objects in federated area(s).
Figure 17B:
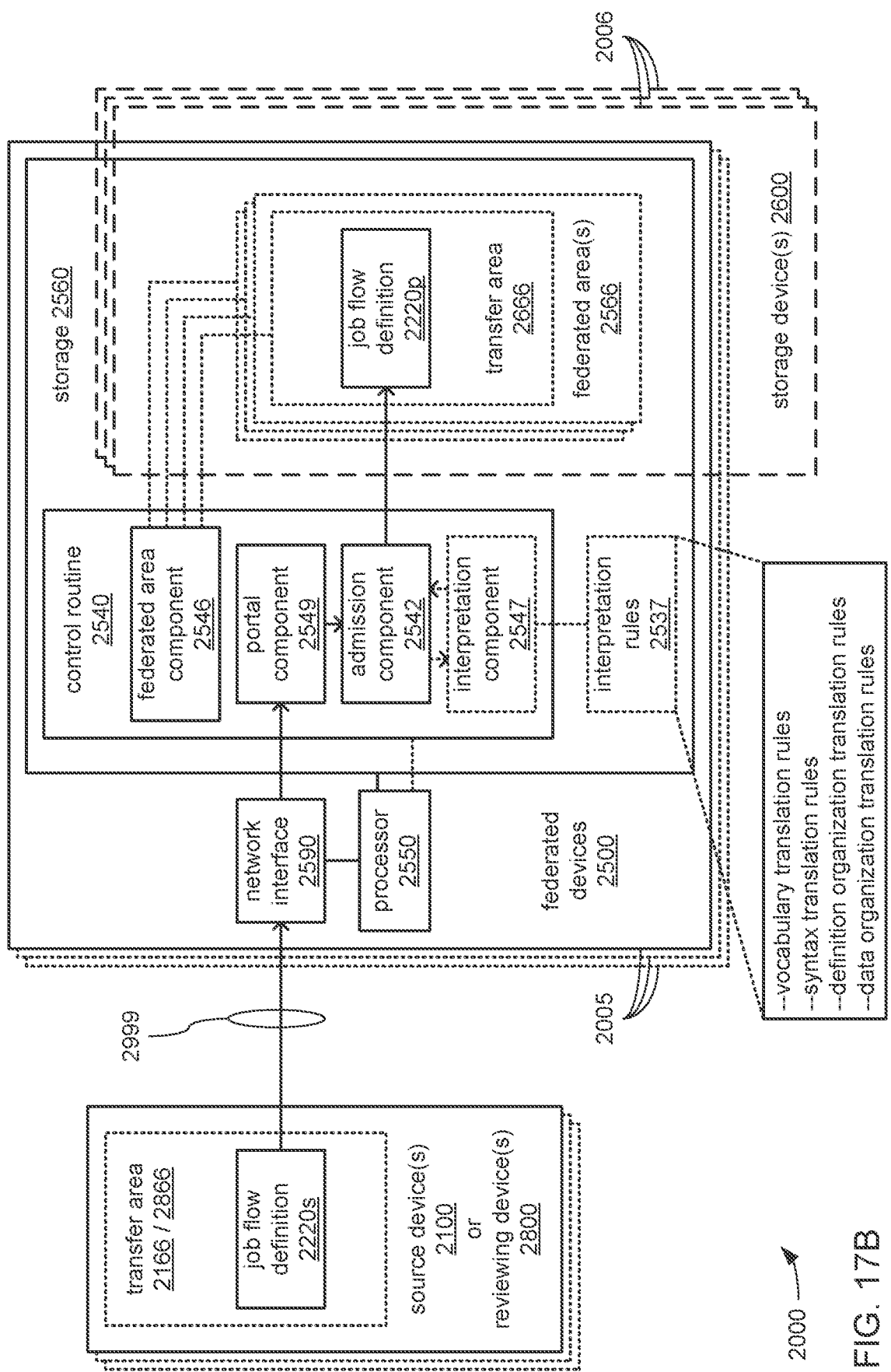
Figure 17C:
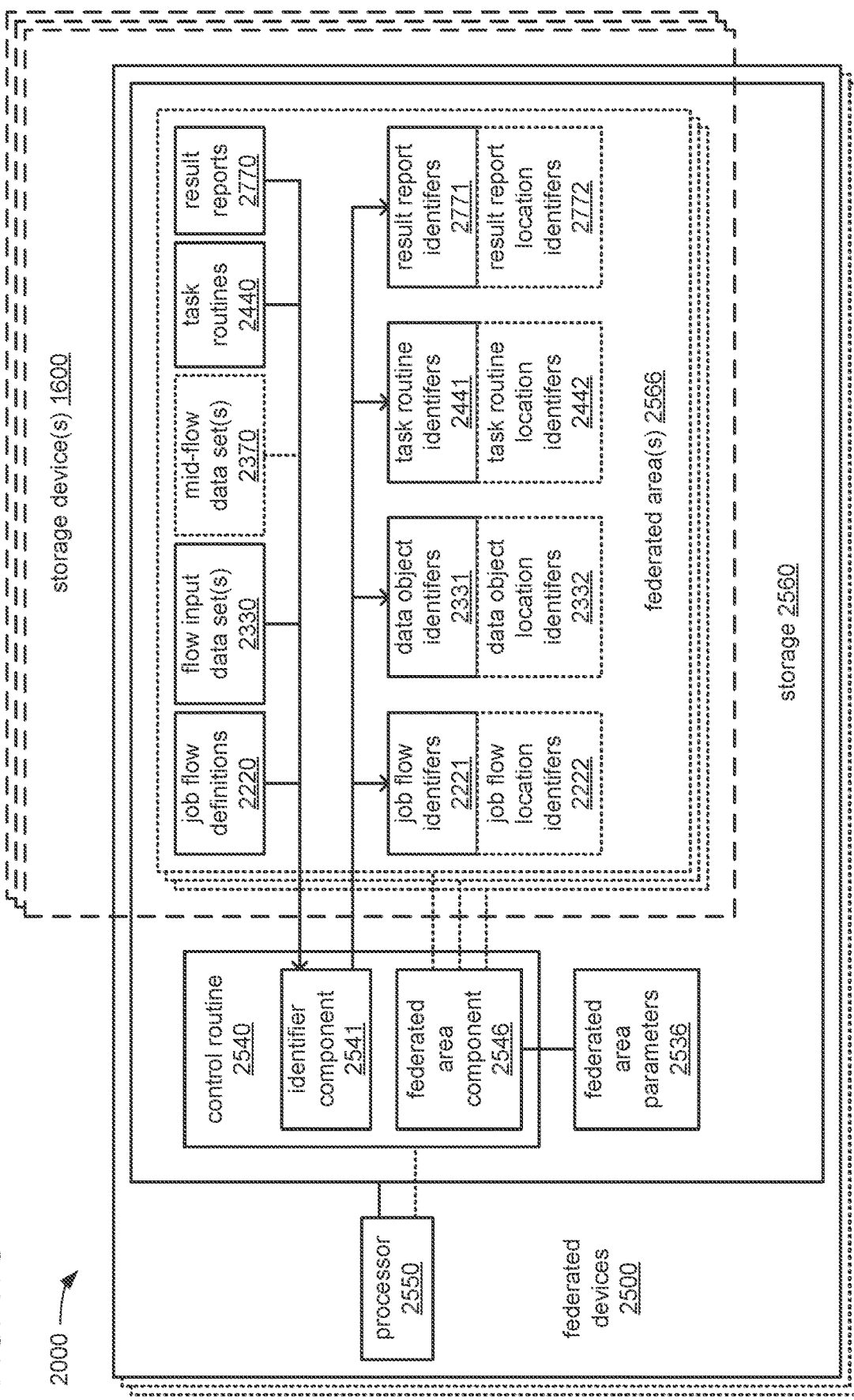
Figure 17D:
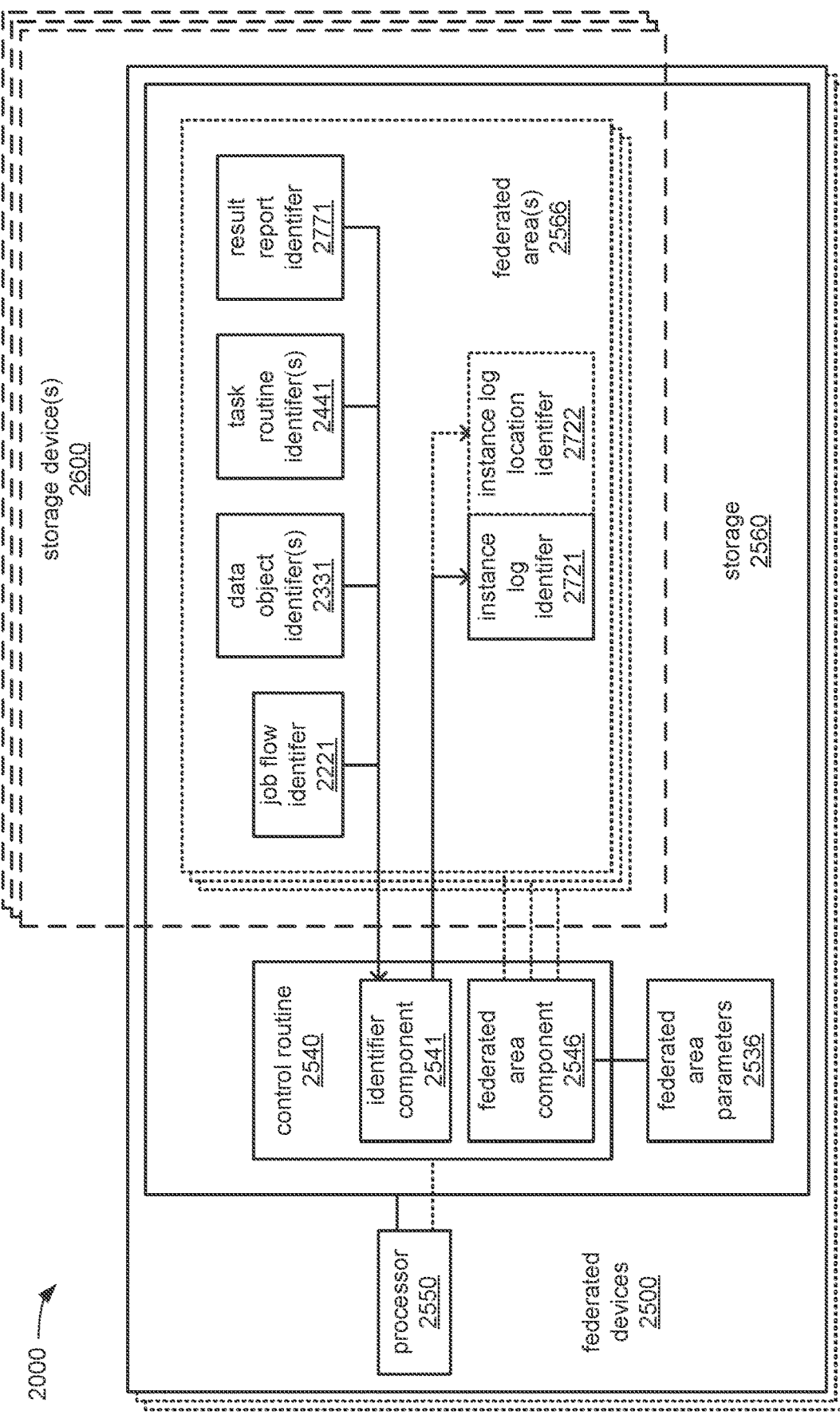
Figure 17E:
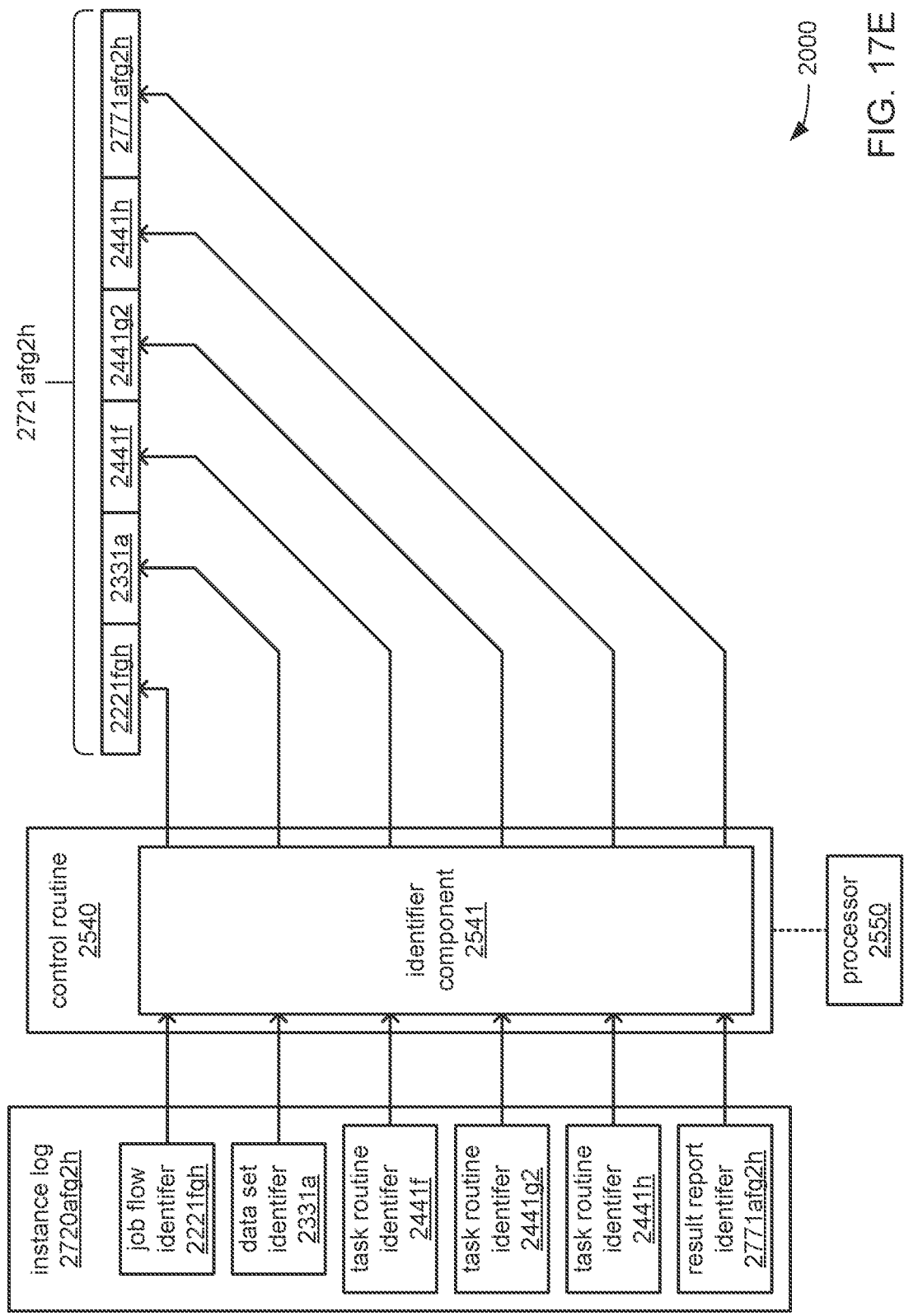

FIGS. 17A, 17B, 17C, 17D and 17E, together, illustrate the manner in which the one or more federated devices 2500 may selectively store and organize objects within one or more federated areas 2566. FIGS. 17A-B, together, illustrate aspects of the selective translation and storage of objects received from one or more of the source devices 2100, or from one or more reviewing devices 2800, within the one or more federated areas 2566. FIGS. 17C-E, together, illustrate aspects of assigning identifiers to objects stored within the one or more federated areas 2566.

Turning to FIG. 17A, as previously discussed, the one or more federated devices 2500 may receive objects (e.g., job flow definitions 2220, DAGs 2270, flow input data sets 2330, mid-flow data sets 2370, task routines 2440, macros 2470, instance logs 2720 and/or result reports 2770) from other devices 2100 and/or 2800 as part of an exchange of objects in response to a request to perform any of a variety of operations. Again, in executing the portal component 2549, the processor(s) 2550 of the one or more federated devices 2500 may be caused to operate one or more of the network interfaces 2590 to provide a portal accessible by other devices via the network 2999, and through which access may be granted by the processor(s) 2550 to the one or more federated areas 2566. Also again, any of a variety of network and/or other protocols may be used.

Alternatively, and as also previously discussed, the one or more federated devices 2500 may receive objects as a result of an ongoing synchronization relationship instantiated between a transfer area 2666 within a federated area 2566 and another transfer area 2166 or 2866 within a storage 2160 or 2860, respectively. The processor(s) 2550 of the one or more federated devices 2500 may be caused by the federated area component 2546 to refer to the federated area parameters 2536 for parameters in instantiating the transfer area 2666 within a federated area 2566, such as minimum and/or maximum size of the transfer area 2666 and/or minimum or maximum percentage of the space within a federated area 2566 that is to be occupied by the transfer area 2666. Other parameters that may be retrieved from the federated area parameters 2536 may be specifications of one or more types of cooperation that may be used with the other device 2100 or 2800 with which a synchronization relationship is instantiated, such as whether the earlier described polling or volunteering approaches are to be used, and/or at what minimum and/or maximum interval of time is to be allowed to elapse between each instance of exchange of status of objects within transfer areas. Other parameters that may be so retrieved may include specifications of a minimum or maximum quantity of objects to be exchanged when a transfer between transfer areas occurs.

Still another parameter concerning exchanges of objects between a transfer area 2666 within a federated area 2566 and a transfer area 2166 or 2866 within a storage 2160 or 2860, respectively, that may be retrieved from the federated area parameters 2536 may be a specification for what minimum conditions must be met for such an automated transfer of objects to be triggered. In some embodiments, the trigger may be one or more of a minimum degree of change in an object (e.g., a minimum percent change in size of a data object or a minimum extent of change in executable instructions of a task routine 2440), and/or a minimum number of objects that must be involved in a change in status. Alternatively or additionally, in other embodiments, the trigger for such an automated transfer may be a maximum amount of time to allow to elapse until the next exchange of object(s) since the detection of a change in status of any object.

Alternatively or additionally, and by way of example in still other embodiments, the trigger may be associated with occurrences of objects being "checked in" and/or "committed" in a formalized source code management system. More specifically, and as will be familiar to those skilled in the art, where multiple developers are collaborating to develop programming code for an analysis or other type of executable program, a source code management system may be put into place to improve coordination thereamong. Such a source code management system may enforce some degree of control over which developer and/or how many developers may be work with each one of different portions of executable instructions at the same time as a proactive measure to avoid having different developers making conflicting changes to the same portion of executable instructions. A developer may be required to "check out" a portion of executable instructions from the source control management system to be allowed to make changes thereto, and this may serve to cause other developers to be prevented from also checking out that same portion until the developer to which that portion is check out subsequently "checks in" that same portion. Alternatively or additionally, such a source code management system may track the changes made to different portions of executable instructions by different developers as a way to provide the ability to roll back changes made by any one developer to a portion of executable instructions that is found to "break" the ability to compile and/or interpret the executable instructions of the analysis or other routine. There may be a compiling of the executable instructions of the analysis or other routine on a recurring interval of time which may be used as a mechanism to identify changed portions of executable instructions that at least do not break the compiling of the full set of executable instructions such that they are deemed acceptable to remain as part of the full set of executable instructions such that those changes are deemed to be "committed" changes to the full set of executable instructions.

It may be that a portion of the storage 2160 of a source device 2100 or a portion the storage 2860 of a reviewing device 2800 is employed as the storage at which a source code management system maintains a copy of all of the executable instructions of an analysis routine or other routine under development by multiple developers who do not use the one or more federated area(s) 2566 maintained by the one or more federated devices 2500. Such developers may not have been granted access to a federated area 2566 and/or they may not be familiar with the use of federated areas 2566. Meanwhile, there may also be other developers also involved in developing the same analysis or other routine who do have access to and/or are familiar with the one or more federated areas 2566 maintained by the one or more federated devices 2500. Such other developers may at least partly rely on the enforcement of rules for the storage of objects in federated areas 2566 as a mechanism to similarly instill a degree of order in their collaboration among themselves in developing portions of the analysis or other routine. Thus, in this example embodiment, there may be two different sets of developers collaborating on the development of the same analysis or other routine who are using two separate systems of source code management to aid in coordinating their efforts.

As part of enabling collaboration between these two different groups of developers, as well as their differing systems of source code management, the portion of the storage 2160 or 2860 of the device 2100 or 2800 within which the source code management system maintains a copy of all of the executable instructions may be additionally designated as a transfer area 2166 or 2866, respectively. Correspondingly, at least a portion of a federated area 2566 that has been designated as the location in which portions of the executable instructions of the analysis or other routine may also be stored may similarly be designated as a transfer area 2666, and a synchronization relationship may be instantiated between the transfer area 2666 and the other transfer area 2166 or 2866. With these transfer areas and their synchronization relationship having been instantiated, it may be that the processor(s) 2550 of the one or more federated devices 2500 are caused to cooperate with the processor(s) 2150 of the device 2100 in which the transfer area 2166 is instantiated or the processor(s) of the device 2800 in which the transfer area 2866 is instantiated to use instances in which changes to portions of executable instructions have been "committed" or at least "checked in" as a trigger to cause the transfer of the affected object(s) (e.g., job flow definitions 2220 and/or task routines 2440 that contain the changed executable instructions) between the transfer area 2666 and the other transfer area 2166 or 2866, respectively. In this way, collaboration among these two different groups of developers may be enabled through collaboration between the systems that each relies upon to coordinate their development efforts in this example embodiment.

As also previously discussed, the processor(s) 2550 of the one or more federated devices 2500 may selectively allow or disallow each received request (including a requests to instantiate a synchronization relationship) based on determinations of whether each of those requests is authorized. Again, and more precisely, the processor(s) 2550 of the one or more federated devices 2500 may be caused by the portal component 2549 to restrict what persons, devices and/or entities are to be given access to one or more federated areas 2566. It should be noted that, in alternate embodiments, such control over whether access is granted may be exerted by another device (not shown) that may be interposed between the one or more federated devices 2500 and the network 2999 to serve as a gateway that controls access to the one or more federated devices 2500, and thereby, controls access to the one or more federated areas.

Beyond selective granting of access to the one or more federated areas 2566 (in embodiments in which the one or more federated devices 2500 control access thereto), the processor(s) 2550 may be further caused by execution of the portal component 2549 to restrict the types of access granted, depending on the identity of the user to which access has been granted. Again, the portal data 2539 may indicate that different persons and/or different devices associated with a particular scholastic, governmental or business entity are each to be allowed different degrees and/or different types of access. One such person or device may be granted access to retrieve objects from within a federated area 2566, but may not be granted access to alter or delete objects, while another particular person operating a particular device may be granted a greater degree of access that allows such actions. In embodiments in which there is a per-object control of access, the one or more federated devices 2500 (or the one or more other devices that separately control access) may cooperate with the one or more storage devices 2600 (if present) to effect such per-object access control.

Regardless of the exact manner in which objects may be received by the one or more federated devices from other devices, and as also previously discussed, the processor(s) 2550 of the one or more federated devices 2500 may be caused by the admission component 2542 to impose various restrictions on what objects may be stored within a federated area 2566, presuming that the processor(s) 2550 have been caused by the portal component 2549 to grant access in response to the received request to store objects. Some of such restrictions may be based on dependencies between objects and may advantageously automate the prevention of situations in which one object stored in a federated area 2566 is rendered nonfunctional as a result of another object having not been stored within the same federated area 2566 or within a federated area 2566 that is related through an inheritance relationship such that it is unavailable.

By way of example, and as previously explained, such objects as job flow definitions 2220 include references to tasks to be performed. In some embodiments, it may be deemed desirable to prevent a situation in which there is a job flow definition 2220 stored within a federated area 2566 that describes a job flow that cannot be performed as a result of there being no task routines 2440 stored within the same federated area 2566 and/or within a related federated area 2566 that are able to perform one or more of the tasks specified in the job flow definition 2220. Thus, where a request is received to store a job flow definition 2220, the processor(s) 2550 may be caused by the admission component 2542 to first determine whether there is at least one task routine 2440 stored within the same federated area 2566 and/or within a related federated area 2566 to perform each task specified in the job flow definition. If there isn't, then the processor(s) 2550 may be caused by the admission component 2542 to disallow storage of that job flow definition 2220 within that federated area 2566, at least until such missing task routine(s) 2440 have been stored therein and/or within a related federated area 2566 from which they would be accessible through an inheritance relationship. In so doing, and as an approach to improving ease of use, the processor(s) 2550 may be caused to transmit an indication of the reason for the refusal to inform an operator of the source device 2100 of what can be done to remedy the situation.

Also by way of example, and as previously explained, such objects as instance logs 2720 include references to such other objects as a job flow definition, task routines executed to perform tasks, and data objects employed as inputs and/or generated as outputs. In some embodiments, it may also be deemed desirable to avoid a situation in which there is an instance log 2720 stored within a federated area 2566 that describes a performance of a job flow that cannot be repeated as a result of the job flow definition 2220, one of the task routines 2440, or one of the data objects referred to in the instance log 2720 not being stored within the same federated area 2566 and/or within a related federated area 2566 from which they would also be accessible. Such a situation may entirely prevent a review of a performance of a job flow. Thus, where a request is received to store an instance log 2720, the processor(s) 2550 of the one or more federated devices 2500 may be caused by the admission component 2542 to first determine whether all of the objects referred to in the instance log 2720 are stored within the same federated area 2566 and/or a related federated area 2566 in which they would also be accessible, thereby enabling a repeat performance using all of the objects referred to in the instance log 2720. If there isn't then the processor(s) 2550 may be caused by the admission component 2542 to disallow storage of that instance log 2720 within that federated area 2566, at least until such missing object(s) have been stored therein and/or within a related federated area 2566. Again, as an approach to improving ease of use, the processor(s) 2550 may be caused to transmit an indication of the reason for the refusal to inform an operator of the source device 2100 of what can be done to remedy the situation, including identifying the missing objects.

Additionally by way of example, and as previously explained, such objects as job flow definitions 2220 may specify various aspects of interfaces among task routines, and/or between task routines and data objects. In some embodiments, it may be deemed desirable to prevent a situation in which the specification in a job flow definition 2220 of an interface for any task routine that may be selected to perform a specific task does not match the manner in which that interface is implemented in a task routine 2440 that may be selected for execution to perform that task. Thus, where a request is received to store a combination of objects that includes both a job flow definition 2220 and one or more associated task routines 2440, the processor(s) 2550 may be caused to compare the specifications of interfaces within the job flow definition 2220 to the implementations of those interfaces within the associated task routines 2440 to determine whether they sufficiently match. Alternatively or additionally, the processor(s) 2550 may be caused to perform such comparisons between the job flow definition 2220 that is requested to be stored and one or more task routines 2440 already stored within one or more federated areas 2566, and/or to perform such comparisons between each of the task routines 2440 that are requested to be stored and one or more job flow definitions 2220 already stored within one or more federated areas 2566. If the processor(s) 2550 determine that there is an insufficient match, then the processor(s) 2550 may be caused to disallow storage of the job flow definition 2220 and/or of the one or more associated task routines 2440. In so doing, and as an approach to improving ease of use, the processor(s) 2550 may be caused to transmit an indication of the reason for the refusal to inform an operator of the source device 2100 of what can be done to remedy the situation, including providing details of the insufficiency of the match.

As previously discussed, macros 2470 and DAGs 2270 may be generated from information concerning the inputs and/or outputs of one or more task routines 2440 such that, like a job flow definition 2200 and/or an instance log 2720, each macro 2470 and each DAG 2270 is associated with one or more task routines 2440. As a result of such associations, it may be deemed desirable to ensure that further analysis of the information within each macro 2470 and/or DAG 2270 is enabled by requiring that the one or more task routines 2440 from which each is derived be available within a federated area 2566 to be accessed. More specifically, in executing the admission component 2542, the processor(s) 2550 of the one or more federated devices 2500 may be caused to impose restrictions on the storage of macros 2470 and/or DAGs 2270 that may be similar to those just discussed for the storage of job flow definitions 2200 and/or instance logs 2720. Thus, in response to a request to store one or more macros 2470 and/or one or more DAGs 2270, the processor(s) 2550 may first be caused to determine whether the task routine(s) 2440 on which the information concerning inputs and/or outputs within each macro 2470 and/or within each DAG 2270 may be based is stored within a federated area 2566 or is provided for storage along with each 2470 and/or each DAG 2270 for storage. Storage of a macro 2470 or of a DAG 2270 may be refused if such associated task routine(s) 2440 are not already so stored and are also not provided along with the macro 2470 or DAG 2270 that is requested to be stored.

Regardless of the exact manner in which a transfer of objects between devices and through the network 2999 is caused to occur, it should be noted that, depending on whether grids or other groups of devices are on either end of the transfer, some degree of parallelism may be employed in carrying out the transfer. More specifically, at least where an object is being transferred to or transferred from multiple ones of the federated devices 2500 (e.g., a grid 2005 of the federated devices 2500) as a result of a federated area 2566 being maintained in a distributed manner by multiple federated devices 2500, the transfer of the single object may be broken up into separate and at least partially parallel transfers of different portions of the object to or from the multiple federated devices 2500. This may be deemed desirable for the transfer of larger objects, such as data objects (e.g., an flow input data set 2330 or a result report 2770) that may be quite large in size. Further, in embodiments in which grids of devices are involved in both ends of a transfer of an object, it may be that the transfer is performed as multiple transfers of portions of the object in which each such portion is transferred between a different pair of devices More precisely and by way of example, where a source device 2100 that transmitted a request to store an object in a federated area 2566 is operated as part of a grid of the source devices 2100, the granting of access to store an object in the federated area 2566 may result in each of multiple source devices 2100 transmitting a different portion of the object to a different one of multiple federated devices 2500 in at least partially parallel transfers.

Turning to FIG. 17B, regardless of the exact manner in which the one or more federated devices 2500 are caused to receive objects, and as previously discussed, it may be that some received objects include portions that are written in one or more secondary programming languages, instead of in the primary programming language normally utilized by the processor(s) 2550 during a performance of a job flow. More specifically, among the received objects may be task routines 2440 in which at least executable instructions for the performance of a task may be written in a secondary programming language, and/or job flow definitions 2220 in which at least portion(s) thereof that define input and/or output interfaces may be written in a secondary programming language. As has been previously discussed, task routines 2440 that include such portions written in a secondary programming language may be stored unchanged within federated area(s), and their executable instructions may later be interpreted and/or compiled by an appropriate runtime interpreter or compiler at the time of their execution.

However, and as also previously discussed, where a job flow definition 2220s is received that includes at least input and/or output interface definitions written in a secondary programming language, it may be deemed desirable to generate a translated form 2220p thereof in which those definitions are written in the primary programming language, and to store that translated form 2220p within a federated area in lieu of the originally received form 2220s. Again, this may be done to provide developers who are familiar with the primary programming language with a form of the job flow definition 2220s that is written in the primary programming language to improved the ease with which they are able to read and/or edit the job flow that is defined therein.

As previously discussed, in some embodiments, as part of performing various comparisons of definitions for and/or implementations of input and/or output interfaces, the processor(s) 2550 of the one or more federated devices 2500 may be caused by the admission component 2542 to translate each portion of each job flow definition 2220 that defines input and/or output interfaces, and each portion of executable instructions of each task routine that implements input and/or output interfaces, into an intermediate representation, such as an intermediate programming language or a data structure. Thus, upon receipt of the depicted job flow definition 2220s, the portion(s) thereof that define input and/or output interfaces using a secondary programming language may already be translated into an intermediate representation for purposes of making such comparisons. In such embodiments, the processor(s) may be further caused by the interpretation component 2547 to further translate that intermediate representation into the primary programming language as part of generating the corresponding input and/or output interface definitions for the job flow definition 2220p that is generated as the translated form of the originally received job flow definition 2220s.

In so doing, the processor(s) 2550 of the one or more federated devices 2500 may be caused by the interpretation component 2547 to retrieve various rules and/or other parameters for the performance of such translations from the interpretation rules 2537. Among such rules and/or parameters may be a data structure providing a cross-reference of items of vocabulary between the primary programming language and each of one or more secondary programming languages, and/or a data structure providing a cross-reference of items of syntax therebetween (e.g., punctuation, use of spacing, ordering of commands and/or data, etc.). Alternatively or additionally, among such rules and/or parameters may be a specification of the manner in which the organization of data within data objects that is to be used in either defining input and/or output interfaces in job flow definitions or implementing input and/or output interfaces in task routines.

Turning to FIG. 17C, as depicted, the control routine 2540 may include an identifier component 2541 to cause the processor(s) 2550 of the one or more federated devices 2500 to assign identifiers to objects stored within the one or more federated areas 2566. As previously discussed, each instance log 2720 may refer to objects associated with a performance of a job flow (e.g., a job flow definition 2220, task routines 2440, and/or data objects used as inputs and/or generated as outputs, such as the data sets 2330 and/or 2370, and/or a result report 2770) by identifiers assigned to each. Also, as will shortly be explained, the assigned identifiers may be employed as part of an indexing system in one or more data structures and/or databases to more efficiently retrieve such objects. In some embodiments, the processor(s) 2550 of the one or more federated devices 2500 may be caused by the identifier component 2541 to assign identifiers to objects as they area received via the network 2999 from other devices, such as the one or more source devices 2100 and/or the one or more reviewing devices 2800. In other embodiments, the processor(s) 2550 may be caused by the identifier component 2541 to assign identifiers to objects generated as a result of a performance of a job flow (e.g., a mid-flow data set 2370 or a result report 2770 generated as an output data object of a task routine).

In some embodiments, each identifier may be generated by taking a hash of at least a portion of its associated object to generate a hash value that becomes the identifier. More specifically, a job flow identifier 2221 may be generated by taking a hash of at least a portion of the corresponding job flow definition 2220; a data object identifier 2331 may be generated by taking a hash of at least a portion of the corresponding data set 2330 or 2370; a task routine identifier 2441 may be generated by taking a hash of at least a portion of the corresponding task routine 2440; and/or a result report identifier 2771 may be generated by taking a hash of at least a portion of the corresponding result report 2770. Any of a variety of hash algorithms familiar to those skilled in the art may be employed. Such an approach to generating identifiers may be deemed desirable as it may provide a relatively simple mechanism to generate identifiers that are highly likely to be unique to each object, presuming that a large enough portion of each object is used as the basis for each hash taken and/or each of the identifiers is of a large enough bit width. In some embodiments, the size of the portions of each of these different objects of which a hash is taken may be identical. Alternatively or additionally, the bit widths of the resulting hash values that become the identifiers 2221, 2331, 2441 and 2771 may be identical.

Such an approach to generating identifiers may advantageously be easily implemented by devices other than the one or more federated devices 2500 to reliably generate identifiers for objects that are identical to the identifiers generated by the processor(s) 2550 of any of the one or more federated devices 2500. Thus, if a job flow is performed by another device, the instance log 2720 generated by the other device would use identifiers to refer to the objects associated with that performance that would be identical to the identifiers that would have been generated by the processor(s) 2550 of the one or more federated devices 2500 to refer to those same objects. As a result, such an instance log 2720 could be received by the one or more federated devices 2500 and stored within a federated area 2566 without the need to derive new identifiers to replace those already included within that instance log 2720 to refer to objects associated with a performance of a job flow.

Referring to FIG. 17A in addition to FIG. 17C, in some embodiments, the identifier component 2541 may cooperate with the admission component 2542 in causing the processor(s) 2550 of the one or more federated devices 2500 to analyze received objects to determine compliance with various restrictions as part of determining whether to allow those objects to be stored within the one or more federated areas 2566. More specifically, and by way of example, the identifier component 2541 may generate identifiers for each received object. The provision of identifiers for each received object may enable the admission component 2542 to cause the processor(s) 2550 to check whether the objects specified in a received instance log 2720 are available among the other objects received along with the received instance log 2720, as well as whether the objects specified in the received instance log 2720 are available as already stored within one or more of the federated areas 2566. If an object referred to in the received instance log 2720 is neither among the other received objects or among the objects already stored within one or more of the federated area 2566, then the processor(s) 2550 may be caused by the admission component 2542 to disallow storage of the received instance log 2720 within the one or more federated areas 2566. As previously discussed, disallowing the storage of an instance log 2720 for such reasons may be deemed desirable to prevent storage of an instance log 2720 that describes a performance of a job flow that cannot be repeated due to one or more of the objects associated with that performance being missing.

Turning to FIG. 17D, in some embodiments, the generation of identifiers for instance logs 2720 may differ from the generation of identifiers for other objects. More specifically, while the identifiers 2221, 2331, 2441 and 2771 may each be derived by taking a hash of at least a portion of its corresponding object, an instance log identifier 2721 for an instance log 2720 may be derived from at least a portion of each of the identifiers for the objects that are associated with the performance that corresponds to that instance log 2720. Thus, as depicted, the processor(s) 2550 of the one or more federated devices 2500 may be caused by the identifier component 2541 to generate an instance log identifier 2721 for a performance of a job flow by concatenating at least a portion of each of a job flow identifier 2221, one or more data object identifiers 2331, one or more task routine identifiers 2441, and a result report identifier 2771 for a job flow definition 2220, one or more data sets 2330 and/or 2370, one or more task routines 2440, and a result report 2770, respectively, that are all associated with that performance of that job flow. In embodiments in which the bit widths of each of the identifiers 2221, 2331, 2441 and 2771 are identical, log identifiers 2721 may be formed from identically sized portions of each of such identifiers 2221, 2331, 2441 and 2771, regardless of the quantity of each of the identifiers 2221, 2331, 2441 and 2771 used. Such use of identically sized portions of such identifiers 2221, 2331, 2441 and 2771 may be deemed desirable to aid in limiting the overall bit widths of the resulting log identifiers 2721.

FIG. 17E illustrates such a concatenation of identifiers in greater detail using identifiers of objects associated with the example job flow 2200$fgh$ and the example performance 2700$afg2h$ earlier discussed in connection with FIGS. 16A-D. As depicted, after having generated a job flow identifier 2221$fgh$, a data set identifier 2331$a$, a task routine identifier 2441$f$, a task routine identifier 2441$g2$, a task routine identifier 2441$h$ and a result report identifier 2771$afg2h$ for the example job flow definition 2220$fgh$, the data set 2330$a$, the task routine 2440$f$, the task routine 2440$g2$, the task routine 2440$h$ and the result report 2770$afg2h$, respectively, the processor(s) 2550 may be caused by the identifier component 2541 to concatenate at least an identically sized portion of each of these identifiers together to form the single instance log identifier 2721$afg2h$ for the example instance log 2720$afg2h$ of FIGS. 16A-D.

Figure 18A:
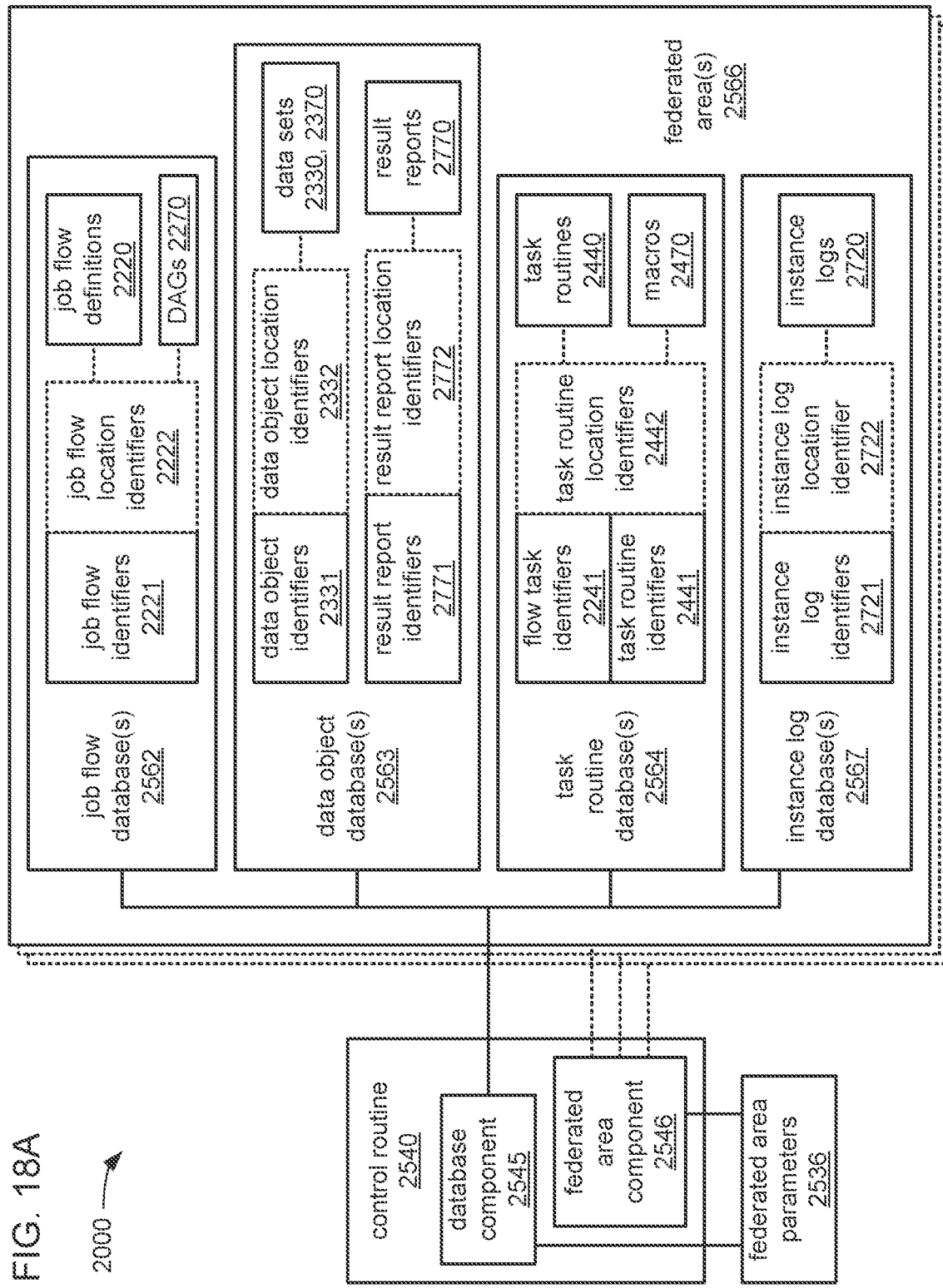
FIGS. 18A, 18B, 18C, 18D, 18E and 18F, together, illustrate an example of organizing, indexing and retrieving objects from federated area(s).
Figure 18B:
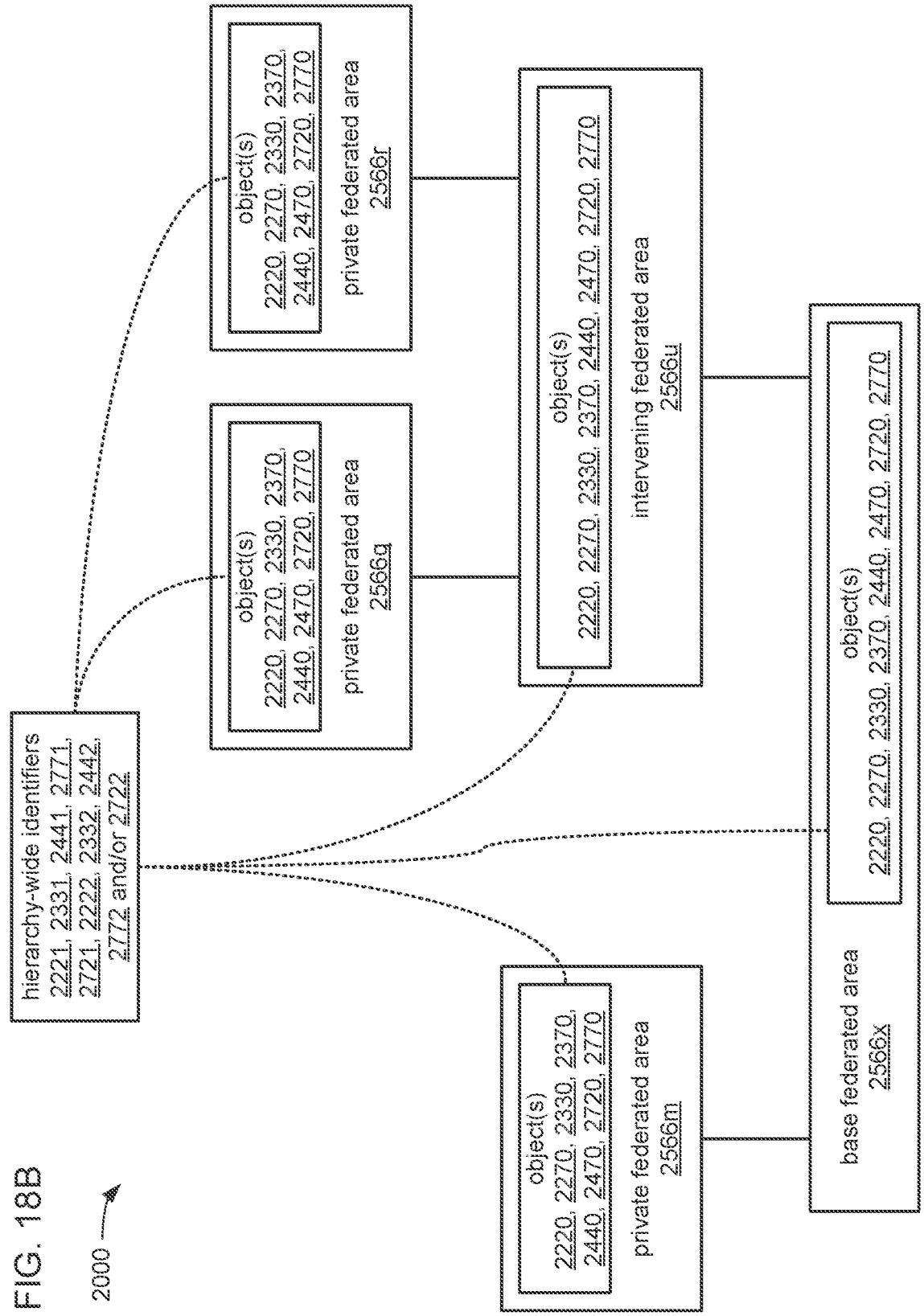
Figure 18C:
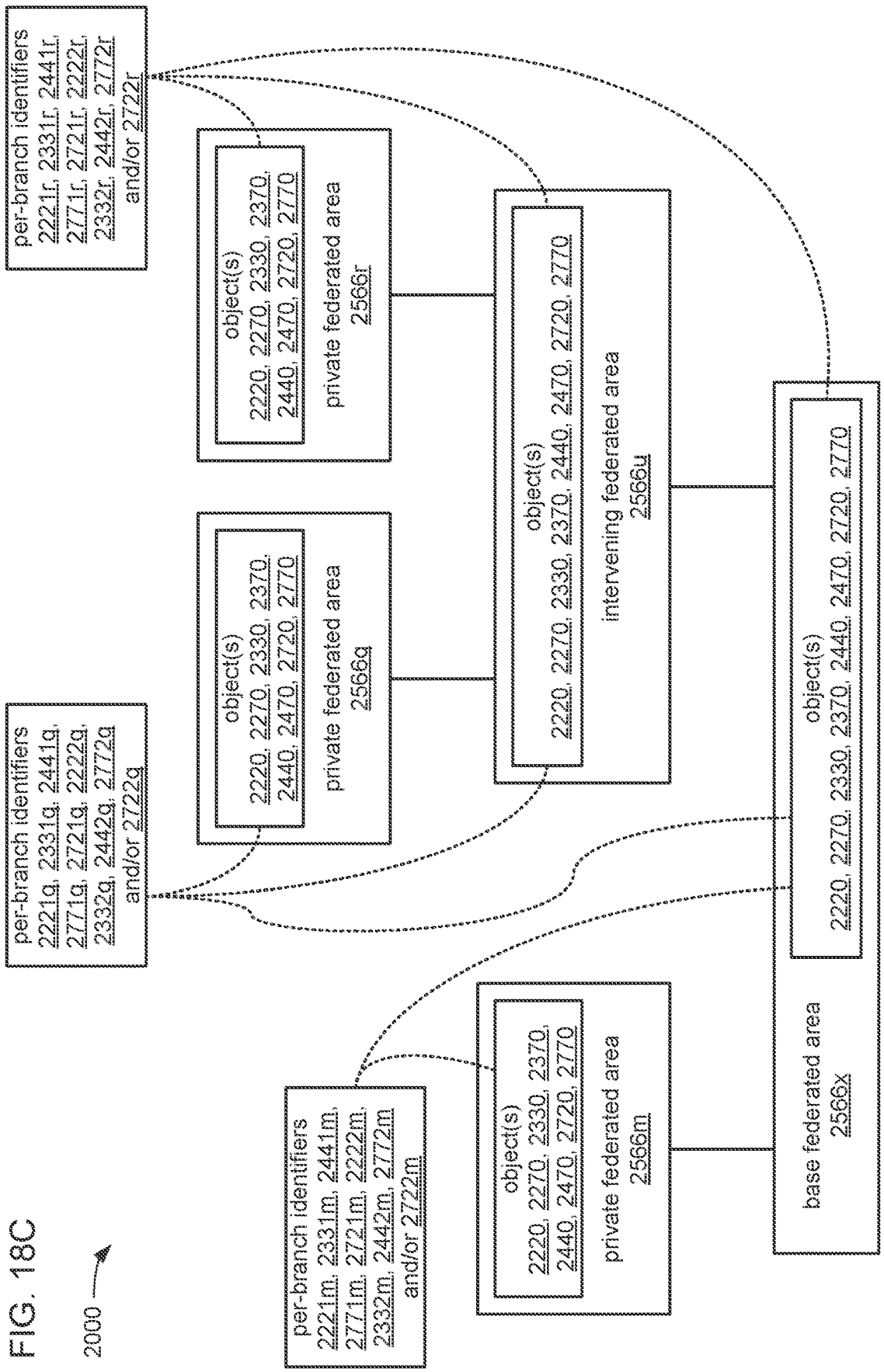
Figure 18D:
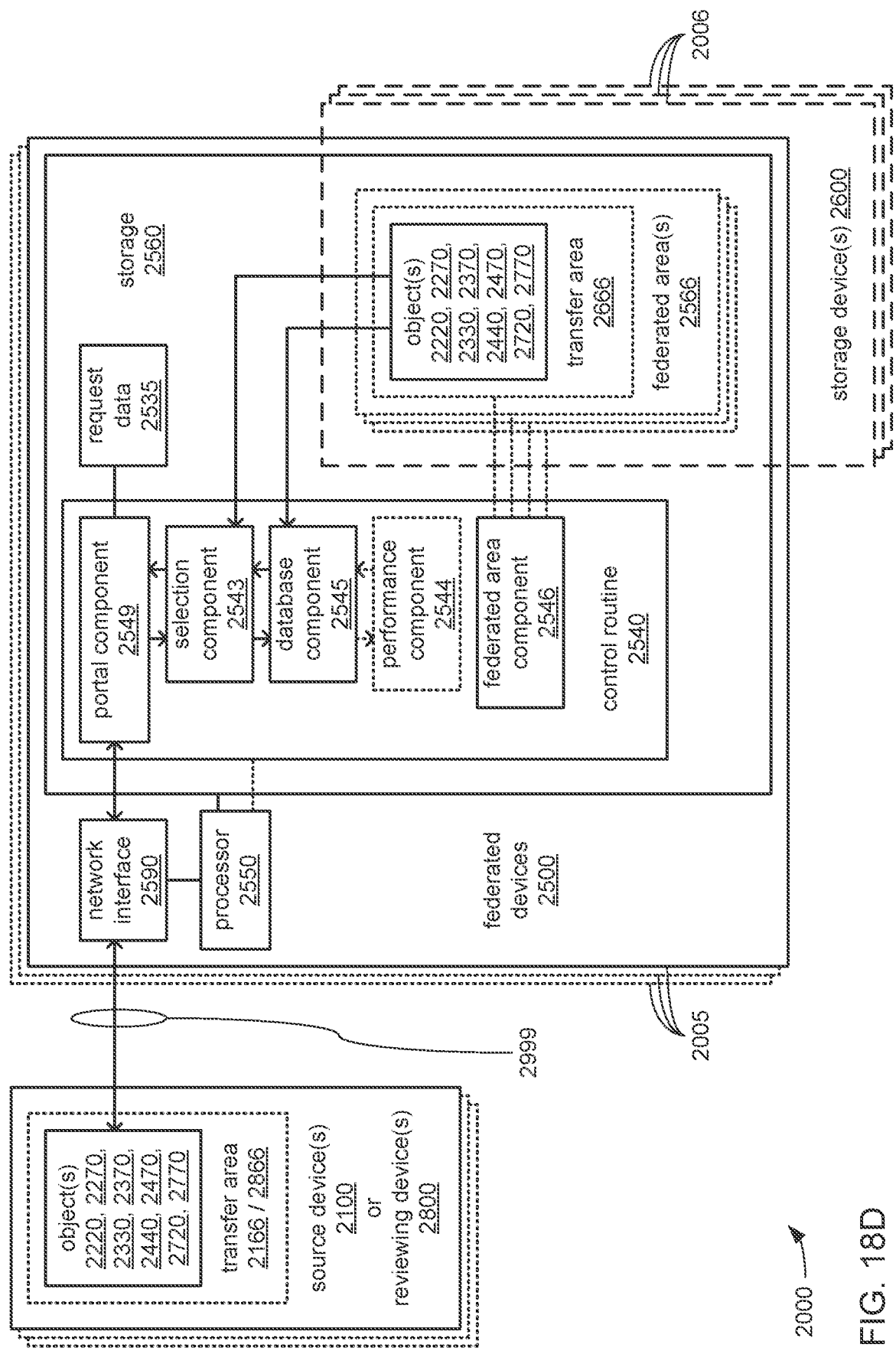
Figure 18E:
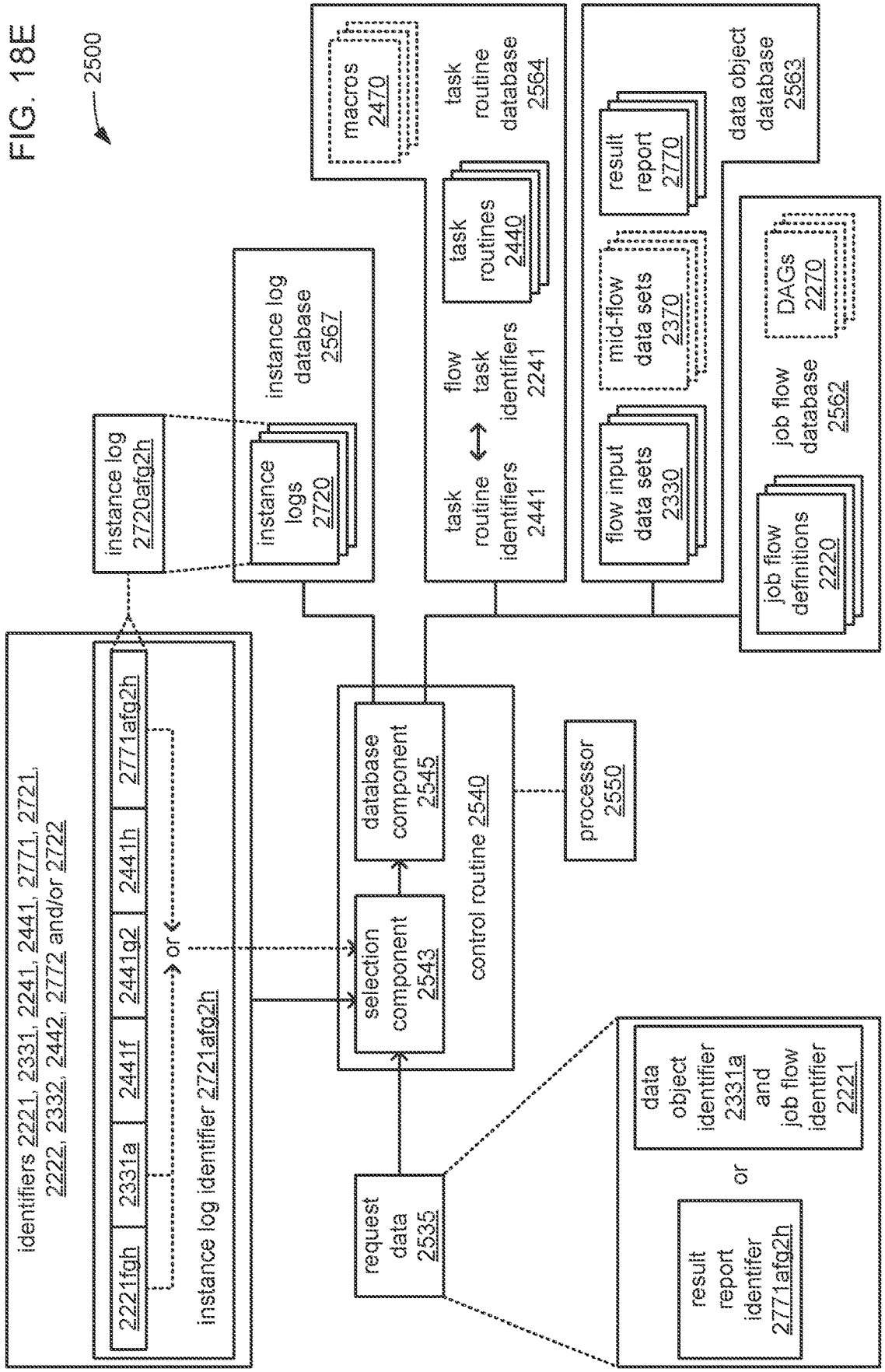
Figure 18F:
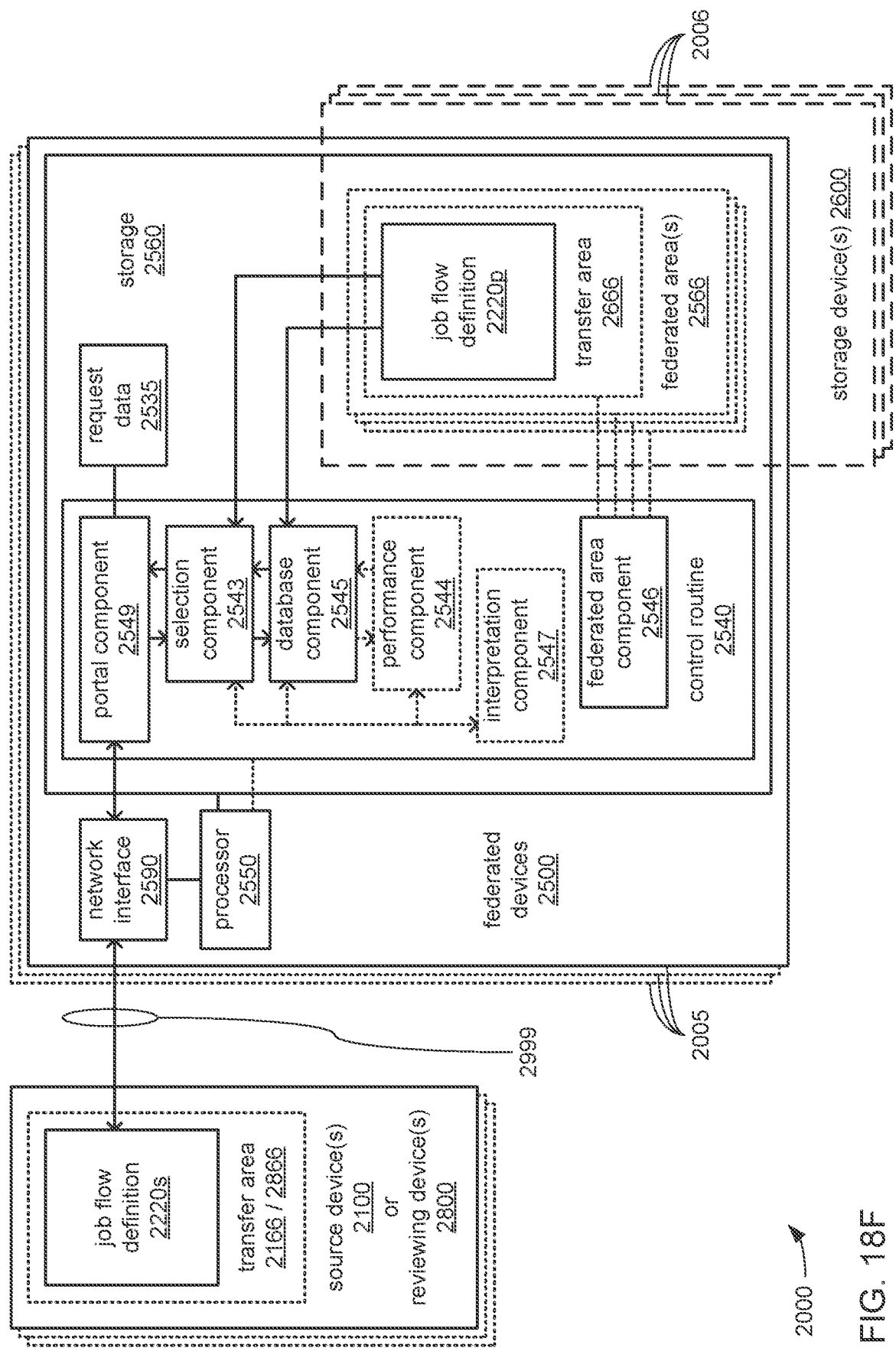

FIGS. 18A, 18B, 18C, 18D, 18E and 18F, together, illustrate aspects of organizing objects within federated areas to better enable the retrieval of objects for use. FIG. 18A depicts aspects of organizing objects into databases within federated areas 2566. FIG. 18B depicts aspects of a single global index that covers all federated areas 2566 within the example hierarchical tree earlier introduced in FIGS. 15B-C, and FIG. 18C depicts aspects of multiple side-by-side indexes for each private federated area 2566 within the same example hierarchical tree. FIG. 18D illustrates aspects of selective retrieval of objects from one or more federated areas 2566 in response to requests received from one or more of the reviewing devices 2800, and FIG. 18E illustrates aspects of the use of identifiers assigned to objects to locate objects within one or more federated areas 2566 and/or to identify object associations. FIG. 18F illustrates aspects of the retrieval of a job flow definition in which a translation is performed between programming languages.

Turning to FIG. 18A, as depicted, the control routine 2540 may include a database component 2545 to cause the processor(s) 2550 of the one or more federated devices 2500 to organize various ones of the objects 2220, 2270, 2330, 2370, 2440, 2470, 2720 and 2770 into one or more databases 2562, 2563, 2564 and/or 2567 (or one or more of another type of data structure) for more efficient storage and retrieval thereof within the one or more federated areas 2566. In some embodiments in which there are multiple unrelated federated areas 2566, the processor(s) 2566 may be caused to instantiate a separate instance of each of the databases 2562, 2563, 2564 and/or 2567 within each of those unrelated federated areas 2566. In other embodiments in which there are multiple federated areas 2566 that are related to each other as by being included in either a single linear hierarchy (e.g., the example linear hierarchy introduced in FIG. 15A) or a single hierarchical tree (e.g., the example hierarchical tree introduced in FIGS. 15B-C), the processor(s) 2566 may be caused to instantiate a single instance of each of the databases 2562, 2563, 2564 and/or 2567 that may cover all of those multiple related federated areas 2566. However, in still other embodiments in which there are multiple federated areas 2566 that are related to each other as by being included in a single hierarchical tree, the processor(s) 2566 may be caused to instantiate multiple instances of each of the databases 2562, 2563, 2564 and/or 2567, where each of those multiple instances covers a different subset of those multiple related federated areas 2566 that exists within a different one of the branches of the hierarchical tree. Still other embodiments are possible in which each instance of each of the databases 2562, 2563, 2564 and/or 2567 may cover one or multiple related and/or unrelated federated areas 2566.

Within each instance of the job flow database 2562, the job flow definitions 2220 may be indexed or made otherwise addressable by their corresponding job flow identifiers 2221. In some embodiments, DAGs 2270 may be stored within each instance of the job flow database(s) 2562 alongside the job flow definitions 2220. As has been discussed, new job flow definitions 2220 may be at least partially based on DAGs 2270.

Within each instance of the data object database 2563, the data sets 2330 and/or 2370 may be accessible via their corresponding data object identifiers 2331, and/or each of the result reports 2770 may be accessible via their corresponding result report identifiers 2771.

Within each instance of the task routine database 2564, the task routines 2440 may be indexed or made otherwise addressable both by their corresponding task routine identifiers 2441, and by the flow task identifiers 2241 that each may also be assigned to indicate the particular task that each is able to perform. As has been discussed, there may be tasks that multiple task routines 2440 are able to perform such that there may be sets of multiple task routines 2440 that all share the same flow task identifier 2241. In some embodiments, a search of an instance of the task routine database 2564 using a flow task identifier 2241 to find a task routine 2440 that is able to perform the corresponding task may beget an indication from that instance of the task routine database 2564 of there being more than one of such task routines 2440, such as a list of the task routine identifiers 2441 of such task routines 2440. Such an indication may also include an indication of which of the multiple task routines 2440 so identified is the most recent version thereof. Such an indication may be provided by an ordering of the task routine identifiers 2441 of the multiple task routines 2440 that places the task routine identifier 2441 of the most recent version of the task routines 2440 at a particular position within the list. In this way, indications of whether one or multiple task routines 2440 exists that are able to perform a task, as well as which one of multiple task routines 2440 is the newest version, may be quickly provided from an instance of the task routine database 2564 in a manner that obviates the need to access and/or analyze any of the task routines 2440 therefrom.

In some embodiments, macros 2470 may be stored within each instance of the task routine database(s) 2564 alongside the task routines 2440 from which each macro 2470 may be derived. As will be explained in greater detail, it may be deemed desirable to enable each macro 2470 to be searchable based on either the task routine identifier 2441 of the specific task routine 2440 from which it was generated, or the flow task identifier 2241 of the task that the task routine 2440 performs.

Within each instance of the instance log database 2567, the instance logs 2720 may be indexed or made otherwise addressable by their corresponding instance log identifiers 2721. As has been discussed, each performance of a job flow may cause the generation of a separate corresponding instance log 2720 during that performance that provides a log of events occurring during the performance, including and not limited to, each performance of a task. In such embodiments, each instance log 2720 may be implemented as a separate data structure and/or file to provide indications of events occurring during the performance to which it corresponds. However, other embodiments are possible in which each of the instance logs 2720 is implemented as an entry of a larger log data structure and/or larger log data file, such as an instance of the instance log database 2567. In some embodiments, the manner in which the instance log identifiers 2721 of the instance logs 2720 are stored within an instance of the instance log database 2567 (or other data structure) may be structured to allow each of the instance log identifiers 2721 to be searched for at least portions of particular identifiers for other objects that were concatenated to form one or more of the instance log identifiers 2721. As will shortly be explained in greater detail, enabling such searches to be performed of the instance log identifiers 2721 may advantageously allow an instance log 2720 for a particular performance of a particular job flow to be identified in a manner that obviates the need to access and/or analyze any of the instance logs 2720 within an instance log database 2567.

As depicted, in embodiments in which there are multiple related federated areas, and a single instance of each of the databases 2562, 2563, 2564 and/or 2567 has been instantiated to cover those multiple federated areas, each of the object identifiers 2221, 2331, 2441, 2721 and/or 2771 may be accompanied by a corresponding object location identifier 2222, 2332, 2442, 2722 and/or 2772, respectively, that serves to identify which federated area 2566 of the multiple related federated areas 2566 that the corresponding object may be stored within. Thus, and more precisely, each job flow identifier 2221 may be accompanied by a job flow location identifier 2222 that serves to identify which of multiple related federated areas 2566 the corresponding job flow definition 2220 or DAG 2270 is stored within. Similarly, each data object identifier 2331 may be accompanied by a data object location identifier 2332 that serves to identify which of multiple related federated areas 2566 the corresponding data set 2330 or 2370 is stored within. Similarly, each result report identifier 2771 may be accompanied by a result report location identifier 2772 that serves to identify which of multiple related federated areas 2566 the corresponding result report 2770 is stored within. Similarly, each task routine identifier 2441 may be accompanied by a task routine location identifier 2442 that serves to identify which of multiple related federated areas 2566 the corresponding task routine 2440 or macro 2470 is stored within. Similarly, each instance log identifier 2721 may be accompanied by an instance log location identifier 2722 that serves to identify which of multiple related federated areas 2566 the corresponding instance log 2720 is stored within.

FIG. 18B depicts the resulting hierarchy-wide coverage of the resulting single set of object identifiers 2221, 2331, 2441, 2771 and/or 2721, and object location identifiers 2222, 2332, 2442, 2772 and/or 2722, respectively, in embodiments in which a single instance of each of the databases 2562, 2563, 2564 and/or 2567 covers all of the multiple federated areas 2566 within a single set of related federated areas within a single hierarchical structure, such as the depicted example hierarchical tree introduced in FIGS. 15B-C. Thus, the single depicted set of object identifiers and object location identifiers may be used in retrieving any of the corresponding types of objects that may be stored within any of the federated areas 2566m, 2566q, 2566r, 2566u and 2566x of the depicted example hierarchical tree.

In contrast, FIG. 18C depicts the resulting per-branch coverage of the resulting multiple sets of object identifiers 2221m, 2331m, 2441m, 2771m and/or 2721m; 2221q, 2331q, 2441q, 2771q and/or 2721q; and/or 2221r, 2331r, 2441r, 2771r and/or 2721r; and object location identifiers 2222m, 2332m, 2442m, 2772m and/or 2722m; 2222q, 2332q, 2442q, 2772q and/or 2722q; and/or 2222r, 2332r, 2442r, 2772r and/or 2722r; respectively, in embodiments in which a separate instance of each of the databases 2562, 2563, 2564 and/or 2567 covers a different subset of the multiple federated areas 2566 within a different branch of a single set of related federated areas within a single hierarchical tree. Thus, one of the depicted sets of object identifiers and object location identifiers may be used in retrieving any of the corresponding types of objects that may be stored within either of the federated areas 2566m or 2566x; while another of the depicted sets of object identifiers and object location identifiers may be used in retrieving any of the corresponding types of objects that may be stored within any of the federated areas 2566q, 2566u or 2566x; and still another of the depicted sets of object identifiers and object location identifiers may be used in retrieving any of the corresponding types of objects that may be stored within any of the federated areas 2566r, 2566u or 2566x.

Turning to FIG. 18D, and as previously discussed, the one or more federated devices 2500 may receive a request from one of the source devices 2100 or one of the reviewing devices 2800 to retrieve one or more objects associated with a job flow from within the one or more federated areas 2566 and provide it to the requesting device 2100 or 2800. Alternatively, the request may be to use one or more objects associated with a job flow, and retrieved from the one or more federated areas 2566, to perform an analysis and provide the results thereof. Or, an another alterative, the request may be to use one or more objects associated with a job flow, and retrieved from the one or more federated areas 2566, to repeat a past performance of that job flow and provide the results thereof and/or the results of a comparison of past and new results thereof. In some embodiments, the processor(s) 2550 of the one or more federated devices 2500 may be caused by the portal component 2549 to queue such requests as request data 2535 to enable out-of-order handling of requests, and/or other approaches to increase the efficiency with which such requests are responded to. As previously discussed, the processor(s) 2550 may also be caused by the portal component to determine whether each of the received requests originated from an authorized person, an authorized device and/or an authorized entity, and/or to determine whether the type of request is authorized for originating person, device and/or entity.

As depicted, the control routine 2540 may also include a selection component 2543 to employ one or more identifiers provided in a request and/or one or more rules to locate, select and retrieve objects associated with a job flow from the one or more federated areas 2566. In executing the selection component 2543 and the database component 2545 to provide requested objects, the processor(s) 2550 may be caused to use one or more identifiers of objects that may be provided in a granted request to directly retrieve those one or more objects from one or more federated areas 2566. By way of example, a request may be received for the retrieval and transmission to the requesting device 2100 or 2800 of a particular data set 2330, and the request may include the data object identifier 2331 of the particular data set 2330. In response to the request, the processor(s) 2550 may be caused by the database component 2545 to employ the provided data object identifier 2331 (and maybe to do so along with one or more correlated data object location identifiers 2332, as previously discussed) to search for the particular data set 2330 within the one or more federated areas 2566, retrieve it, and transmit it to the requesting device 2800. In so doing, the processor(s) 2550 may be caused to correlate the received data object identifier 2331 to a corresponding data logic location identifier 2332, and to then retrieve the particular data object 2330 from the federated area 2566 pointed to by that data logic location identifier 2332.

However, other requests may be for the retrieval of objects from one or more federated areas 2566 where the identifiers of the requested objects may not be provided within the requests. Instead, such requests may employ other identifiers that provide an indirect reference to the requested objects.

In one example use of an indirect reference to objects, a request may be received for the retrieval and transmission to the requesting device 2100 or 2800 of a task routine that performs a particular task, and the request may include the flow task identifier 2241 of the particular task instead of any task routine identifier 2441 that directly identifies any particular task routine 2440. The processor(s) 2550 may be caused by the selection component 2543 and database component 2545 to employ the flow task identifier 2241 provided in the request to search within one or more federated areas 2566 for such task routines 2440. As has been previously discussed, the search may entail correlating the flow task identifiers 2241 to one or more task routine identifiers 2441 of the corresponding one or more task routines 2440 that may perform the task identified by the flow task identifier 2241. In embodiments in which the task routines 2440 have been organized into a task routine database 2564 within each federated area 2566 as depicted as an example in FIG. 18A (or other searchable data structure), the search may entail searches within such a database or other data structure. The result of such a search may be an indication from such a database or other data structure within the one or more federated areas 2566 that there is more than one task routine 2440 that is able to perform the task identified by the flow task identifier 2241 provided in the request. As previously discussed, such an indication may be in the form of a list of the task routine identifiers 2441 for the task routines 2440 that are able to perform the specified task. Additionally, and as also previously discussed, such a list may be ordered to provide an indication of which of those task routines 2440 stored within a federated area 2566 is the newest. Again, it may be deemed desirable to favor the use of the newest version of a task routine 2440 that performs a particular task where there is more than one task routine 2440 stored within one or more federated areas 2566 that is able to do so. Therefore, in response to the request, the processor(s) 2550 may be caused to select the newest task routine 2440 indicated among all of the one or more of such lists retrieved within each of one or more federated areas 2566 to perform the task specified in the request by the flow task identifier 2241, and to transmit that newest version to the requesting device. Through such automatic selection and retrieval of the newest versions of task routines 2440, individuals and/or entities that may be developing new analyses may be encouraged to use the newest versions.

In another example use of an indirect reference to objects, a request may be received by the one or more federated devices 2500 to repeat a previous performance of a specified job flow with one or more specified data objects as inputs (e.g., one or more of the data sets 2330), or to provide the requesting device with the objects needed to repeat the previous performance of the job flow, itself. Thus, the request may include the job flow identifier 2221 of the job flow definition 2220 for the job flow, and may include one or more data object identifiers 2331 of the one or more data sets 2330 to be employed as inputs to the previous performance of that job flow sought to be repeated, but may not include identifiers for any other object associated with that previous performance.

The processor(s) 2550 may be caused by the selection component 2543 to employ the job flow identifier 2221 and the one or more data objects identifiers 2331 provided in the request to search the one or more federated areas 2566 for all instance logs 2720 that provide an indication of a past performance of the specified job flow with the specified one or more input data objects. In embodiments in which the instance logs 2720 have been organized into an instance log database 2567 as depicted as an example in FIG. 18A (or other searchable data structure), the search may be within such a database or other data structure, and may be limited to the instance log identifiers 2721. More specifically, in embodiments in which the instance log identifiers 2721 were each generated by concatenating the identifiers of objects associated with a corresponding past performance, the instance log identifiers 2721, themselves, may be analyzed to determine whether the identifiers provided in the request for particular objects are included within any of the instance log identifiers 2721. Thus, the processor(s) 2550 may be caused to search each instance log identifier 2721 to determine whether there are any instance log identifiers 2721 that include the job flow identifier 2221 and all of the data object identifiers 2331 provided in the request. If such an instance log identifier 2721 is found, then it is an indication that the instance log 2720 that was assigned that instance log identifier 2721 is associated with a past performance of that job flow associated with the one or more data sets 2330 specified in the request.

It should be noted, however, that a situation may arise in which more than one of such instance log identifiers 2721 may be found, indicating that there has been more than one past performance of the job flow with the one or more data sets. In response to such a situation, the processor(s) 2550 may be caused by the selection component 2543 to transmit an indication of the multiple previous performances to the requesting device 2100 or 2800 along with a request for a selection to be made from among those previous performances. The processor(s) 2550 may then await a response from the requesting device 2100 or 2800 that provides an indication of a selection from among the multiple past performances. As an alternative to such an exchange with the requesting device 2100 or 2800, or in response to a predetermined period of time having elapsed since requesting a selection without an indication of a selection having been received by the one or more federated devices 2500, the processor(s) 2550 may be caused by the selection component 2543 to, as a default, select the most recent one of the past performances.

After identifying a single past performance, or after the selection of one of multiple past performances, the processor(s) 2550 may then be caused by the selection component 2543 to retrieve the task routine identifiers 2441 specified within the corresponding instance log 2720 of the particular task routines 2440 used in the previous performance. The processor(s) 2550 may then be caused by the database component 2545 to employ those task routine identifiers 2441 to retrieve the particular task routines 2440 associated with the previous performance from one or more federated areas 2566. The processor(s) 2550 may also be caused by the selection component 2543 to retrieve the result report identifier 2771 specified within the instance log 2720 of the result report that was generated in the previous performance. The processor(s) 2550 may be further caused by the selection component 2543 to retrieve any data object identifiers 2331 that may be present within the instance log 2720 that specify one or more data sets 2370 that may have been generated as a mechanism to exchange data between task routines 2440 during the performance of a job flow.

If the request was for the provision of objects to the requesting device, then the processor(s) 2550 may be caused by the database component 2543 to retrieve, from the one or more federated areas, the job flow definition 2220 and the one or more data sets 2330 specified by the job flow identifier 2221 and the one or more data object identifiers 2331, respectively, in the request, and may be further caused by the portal component 2549 to transmit those objects to the requesting device 2100 or 2800. The processor 2550 may also be caused by the portal component 2549 to transmit the instance log 2720 generated in the past performance, and the result report 2770 specified by the result report identifier 2771 retrieved from the instance log 2720. If any data sets 2370 were indicated in the instance log 2720 as having been generated in the previous performance, then the processor(s) 2550 may be further caused by the portal component 2549 to transmit such data set(s) 2370 to the requesting device 2100 or 2800 after having been caused to retrieve such data set(s) 2370 from the one or more federated areas 2566 by the database component 2545. Thus, based on a request that provided only identifiers for a job flow definition 2220 and one or more data objects used as inputs to a past performance of the job flow, a full set of objects may be automatically selected and transmitted to the requesting device to enable an independent performance of the job flow as part of a review of that previous performance.

However, if the request was for a repeat of the previous performance of the job flow by the one or more federated devices 2500, then instead of (or in addition to) transmitting the objects needed to repeat the previous performance to the requesting device 2100 or 2800, the processor(s) 2550 may be caused by execution of a performance component 2544 of the control routine 2540 to use those objects to repeat the previous performance within a federated area 2566 in which at least one of the objects is stored and/or to which the user associated with the request and/or the requesting device 2100 or 2800 has been granted access. In some embodiments, the federated area 2566 in which the previous performance took place may be selected, by default, to be the federated area 2566 in which to repeat the performance. Indeed, repeating the performance within the same federated area 2566 may be deemed a requirement to truly reproduce the conditions under which the previous performance occurred. More specifically, the processor(s) 2550 may be caused to execute the task routines 2440 specified in the instance log 2720, in the order specified in the job flow definition 2220 specified in the request, and using the one or more data sets 2330 specified in the request as input data objects. In some embodiments, where multiple ones of the federated devices 2500 are operated together as the federated device grid 2005, the processor(s) 2550 of the multiple ones of the federated devices 2500 may be caused by the performance component 2544 to cooperate to divide the execution of one or more of the tasks thereamong. Such a division of one or more of the tasks may be deemed desirable where one or more of the data objects associated with the job flow is of relatively large size. Regardless of the quantity of the federated devices 2500 involved in repeating the previous performance of the job flow, upon completion of the repeat performance, the processor(s) 2550 may be further caused by the performance component 2544 to transmit the newly regenerated result report 2770 to the requesting device. Alternatively or additionally, the processor(s) 2550 may perform a comparison between the newly regenerated result report 2770 and the result report 2770 previously generated in the previous performance to determine if there are any differences, and may transmit an indication of the results of that comparison to the requesting device. Thus, based on a request that provided only identifiers for a job flow definition 2220 and one or more data objects used as inputs to the job flow, a previous performance of a job flow may be repeated and the results thereof transmitted to the requesting device as part of a review of the previous performance.

In still another example use of an indirect reference to objects, a request may be received by the one or more federated devices 2500 to perform a specified job flow with one or more specified data objects as inputs (e.g., one or more of the data sets 2330). Thus, the request may include the job flow identifier 2221 of the job flow definition 2220 for the job flow, and may include one or more data object identifiers 2331 of the one or more data sets 2330 to be employed as input data objects, but may not include any identifiers for any other objects needed for the performance.

The processor(s) 2550 may be caused by the selection component 2543 to employ the job flow identifier 2221 provided in the request to retrieve the job flow definition 2220 for the job flow to be performed. The processor(s) 2550 may then be caused to retrieve the flow task identifiers 2241 from the job flow definition 2220 that specify the tasks to be performed, and may employ the flow task identifiers 2241 to retrieve the newest version of task routine 2440 within one or more federated areas 2566 (e.g., within the task routine database 2564 within each of one or more federated areas 2566) for each task. The processor(s) 2550 may also be caused by the selection component 2543 to employ the job flow identifier 2221 and the one or more data objects identifiers 2331 to search the one or more federated areas 2566 for any instance logs 2720 that provide an indication of a past performance of the specified job flow with the specified one or more input data objects.

If no such instance log identifier 2721 is found, then it is an indication that there is no record within the one or more federated areas of any previous performance of the specified job flow with the one or more specified data sets 2330. In response, the processor(s) 2550 may be caused by execution of the performance component 2544 to execute the retrieved newest version of each of the task routines 2440 to perform the tasks of the job flow in the order specified in the job flow definition 2220 specified in the request, and using the one or more data sets 2330 specified in the request as input data objects. Again, in embodiments in which multiple ones of the federated devices 2500 are operated together as the federated device grid 2005, the processor(s) 2550 may be caused by the performance component 2544 to cooperate to divide the execution of one or more of the tasks thereamong. Upon completion of the performance of the job flow, the processor(s) 2550 may be further caused by the performance component 2544 to transmit the result report 2770 generated in the performance of the job flow to the requesting device. Thus, based on a request that provided only identifiers for a job flow definition 2220 and one or more data objects used as inputs to the job flow, a performance of a job flow is caused to occur using the newest available versions of task routines 2440 to perform each task.

However, if such an instance log identifier 2721 is found, then it is an indication that there was a previous performance of the job flow specified in the request where the one or more data sets 2330 specified in the request were used as input data objects. If a situation should occur where multiple ones of such instance log identifiers 2721 are found, then it is an indication that there have been multiple previous performances of the job flow, and the processor(s) 2550 may be caused by the selection component 2543 to select the most recent one of the multiple previous performances, by default. After the finding of a single previous performance, or after the selection of the most recent one of multiple previous performances, the processor(s) 2550 may then be caused by the selection component 2543 to retrieve the task routine identifiers 2441 specified within the corresponding instance log 2720 of the particular task routines 2440 used in the previous performance. The processor(s) 2550 may then employ those task routine identifiers 2441 to retrieve the particular task routines 2440 associated with the previous performance from one or more federated areas 2566. The processor 2550 may then compare each of the task routines 2440 specified in the instance log 2720 to the newest task routines 2440 retrieved for each task specified in the job flow definition 2220 to determine whether all of the task routines 2440 specified in the instance log 2720 are the newest versions thereof. If so, then the result report 2770 generated in the previous performance associated with the instance log 2720 was generated using the most recent versions of each of the task routines 2440 needed to perform the tasks of the job flow. The processor(s) 2550 may then entirely forego performing the job flow, may employ the result report identifier 2771 provided in the instance log 2720 to retrieve the result report 2770 generated in the earlier performance, and may transmit that result report 2770 to the requesting device. In this way, a form of caching is provided by which the previously generated result report 2770 is able to be recognized as reusable, and the use of processing resources of the one or more federated devices 2500 to repeat a previous performance of the job flow is avoided.

It should be noted, however, that a situation may arise in which one or more of the task routines 2440 specified in the instance log 2720 are the newest versions thereof, while one or more others of the task routines 2440 specified in the instance log 2720 are not. In response to such a situation, the processor(s) 2550 may be caused by the selection routine 2543 to check whether at least the task routine 2440 specified in the instance log 2720 as performing the first task in the order of tasks specified in the job flow definition 2220 is the newest version of task routine 2440 able to perform that task. If not, then the processor(s) 2550 may be caused by the performance component 2544 to employ all of the newest versions of the task routines 2440 to perform the entire job flow, just as the processor(s) 2550 would be caused to do so if there had been no previous performance of the job flow, at all. However, if the first task in the previous performance of the job flow was performed with the newest version of task routine 2440 able to perform that first task, then the processor(s) 2550 may iterate through each task in the order of tasks specified in job flow definition 2720 to determine which were performed with the newest version of task routine 2440. The processor(s) 2550 would start with the first task in the specified order of tasks, and stop wherever in the specified order of tasks the processor(s) 2550 determine that a task routine 2440 was used that is not the newest version thereof. In this way, the processor(s) 2550 may identify an initial portion of the order of tasks specified in the job flow definition 2220 that may not need to be performed again as they were already performed using the newest versions of their respective task routines 2440. As a result, only the remainder of the tasks that follow the initial portion in the order of tasks may need to be performed again, but using the newest versions of their respective task routines 2440 for all of those remaining tasks. In this way, a form of partial caching is provided by which an initial portion of a previous performance of a job flow is able to be reused such that not all of the job flow needs to be performed again to generate a result report 2770 to be transmitted to the requesting device.

FIG. 18E illustrates two examples of searching for objects using one or more identifiers that provide an indirect reference to those objects in greater detail. More specifically, FIG. 18E depicts two different searches for objects that each employ the example instance log identifier 2721*afg2h* associated with the 2720*afg2h* instance log of the example performance of the job flow 2200*fgh* of FIGS. 16A-D.

In one example search, and referring to both FIGS. 18D and 18E, a request may be received (and stored as part of the request data 2535) for the retrieval of objects associated with, and/or for a repetition of, the example performance 2700*afg2h* that resulted in the generation of the result report 2770*afg2h*. In so doing, the request may use the result report identifier 2771*afg2h* to refer to the result report 2770*afg2h*, while providing no other identifier for any other object associated with the performance 2700*afg2h*. In response, the processor(s) 2550 may be caused by the selection component 2543 to cooperate with the database component 2545 to search the instance log identifiers 2721 of the instance log database 2567 within one or more federated areas 2566 to locate the one of the multiple instance log identifiers 2721 that includes the result report identifier 2771*afg2h*. As depicted, the instance log identifier 2721*afg2h* is the one of the multiple instance log identifiers 2721 that contains the result report identifier 2771*afg2h*. With the instance log identifier 2721*afg2h* having been found, the processor(s) 2550 may then be caused by the selection component 2543 to retrieve, from the instance log 2720*afg2h*, the identifiers of the various objects requested to be transmitted to the requesting device and/or needed to repeat the example performance 2700*afg2h*.

In another example search, a request may be received for a repetition of a previous performance of a specific job flow with a specific data object used as input. In so doing, the request may refer to the example job flow 2200*fgh* of FIGS. 16A-D by using the job flow identifier 2221*fgh* of the job flow definition 2220*fgh* that defines the example job flow 2200*fgh*, and may refer to the data set 2330*a* by using the data object identifier 2331*a*. In response, the processor(s) 2550 may be caused by the selection component 2543 to cooperate with the database component 2545 to search the instance log identifiers 2721 of the instance log database 2567 within one or more federated areas 2566 to locate any of the multiple instance log identifiers 2721 that includes the both the job flow identifier 2221*fgh* and the data object identifier 2331*a*. As depicted, the instance log identifier 2721*afg2h* is the one of the multiple instance log identifiers 2721 that contains both of these identifiers 2221*fgh* and 2331*a*. With the instance log identifier 2721*afg2h* having been found, the processor(s) 2550 may then be caused by the selection component 2543 to retrieve, from the instance log 2720*afg2h*, the identifiers of the various objects needed to repeat the example performance 2700*afg2h*. The processor(s) 2550 may then be caused by execution of the performance component 2544 to perform the example job flow 2200*fgh* with the data set 2330*a* as the input data object.

As an alternative to the one or more federated devices 2500 transmitting objects to another device 2100 or 2800 in response to requests, and as previously discussed, the one or more federated devices 2500 may, instead, transmit objects to another device 2100 or 2800 as a result of an ongoing synchronization relationship instantiated between a transfer area 2666 within a federated area 2566 and another transfer area 2166 or 2866 within a storage 2160 or 2860 of the other device 2100 or 2800, respectively. Again, the instantiation of the synchronization relationship may be in response to a request received by the one or more federated devices 2500. And again, in some embodiments, such a synchronization relationship may be requested and instantiated to support a collaboration among developers who have access to and are familiar with the use of the one or more federated areas 2566 of the one or more federated devices 2500, and developers who do not have access to and/or are not familiar with the use of those one or more federated areas 2566.

Turning to FIG. 18F, regardless of the exact manner in which the one or more federated devices 2500 are caused to transmit an object to another device 2100 or 2800, it may be that the other device 2100 or 2800 requires a portion of the transmitted object to be written in a secondary programming language that is not utilized by the processor(s) 2550 of the one or more federated devices 2500 in the performance of job flows. In some embodiments, it may be that this requirement is to be applied solely to job flow definitions 2220 that are to be transmitted by the one or more federated devices 2500 back to the other device 2100 or 2800, as it may be that other objects may not be transmitted back to the other device 2100 or 2800. Thus, in such embodiments, the depicted job flow definition 2220*p*, which includes input and/or output interface definitions written in the primary programming language, is to be translated into the depicted other form 2220*s*, which includes corresponding input and/or output interface definitions written in the secondary programming language.

In some of such embodiments, the processor(s) 2550 of the one or more federated devices 2500 may be caused to perform a reverse version of the translation process described in connection with FIG. 17B by which the job flow definition 2220*p* stored within a federated area may have been generated from an earlier received version thereof in which the input and/or output interface definitions were written in a secondary language. More specifically, the processor(s) 2550 may be caused to translate the input and/or output interface definitions within the depicted job flow definition 2220*p* into an intermediate representation, just as might normally be done to enable a comparison to input and/or output interface implementations by one or more task routines 2440. Subsequently, the processor(s) 2550 may be caused to translate the input and/or output definitions from the intermediate representation and into the secondary programming language within the depicted job flow definition 2220*s* that is transmitted to the other device 2100 or 2800.

Alternatively, in other embodiments in which the transmission of objects back to the other device 2100 or 2800 is limited to job flow definitions 2220, and at least the input and/or output interface definitions thereof are required to be written in the secondary programming language, the processor(s) 2550 may be caused by the interpretation component 2547 to perform a direct translation from the at least the input and/or output definitions written in the primary programming language within the depicted job flow definition 2220*p*, and into at least the input and/or output definitions written in the secondary programming language within the depicted job flow definition 2220*s* that is transmitted to the other device 2100 or 2800. Such a direct translation may be deemed desirable where a fuller translation capability is needed as a result of the depicted job flow definition 2220*p* also including GUI instructions that need to be translated from the primary programming language into the secondary programming language to generate corresponding GUI instructions within the depicted job flow definition 2220*s*.

As previously discussed, such a synchronized relationship in which there is a need for translations between programming languages may be instantiated in support of a collaboration among developers to develop an analysis or other routine that includes developers with access to and an understanding of the use of the one or more federated areas 2566, and other developers who do not have access to and/or an understanding of the use of the one or more federated areas 2566. Again, such other developers may, instead, rely upon an implementation of a source code management system within the other device 2100 or 2800.

Again, in such a situation, the synchronization relationship may entail maintaining synchronization of contents between a transfer area 2666 instantiated within a federated area 2566 maintained by the one or more federated devices 2500 and a transfer area 2166 or 2866 maintained within the storage 2160 or 2860 of the other device 2100 or 2800, respectively. Again, the transfer area 2166 or 2866 may also be the portion of the storage 2160 or 2860 of the device 2100 or 2800 within which a source code management system maintains a copy of all of the executable instructions. Correspondingly, the transfer area 2666 instantiated within a federated area 2566 may also be the designated location in which portions of the executable instructions of the analysis or other routine are to be stored as objects. With these transfer areas and their synchronization relationship having been instantiated, it may be that the processor(s) 2550 of the one or more federated devices 2500 are caused to cooperate with the processor(s) 2150 of the device 2100 in which the transfer area 2166 is instantiated or the processor(s) of the device 2800 in which the transfer area 2866 is instantiated to use instances in which changes to portions of executable instructions have been "committed" or at least "checked in" as a trigger to cause the transfer of the affected object(s) therebetween.

Figure 19A:
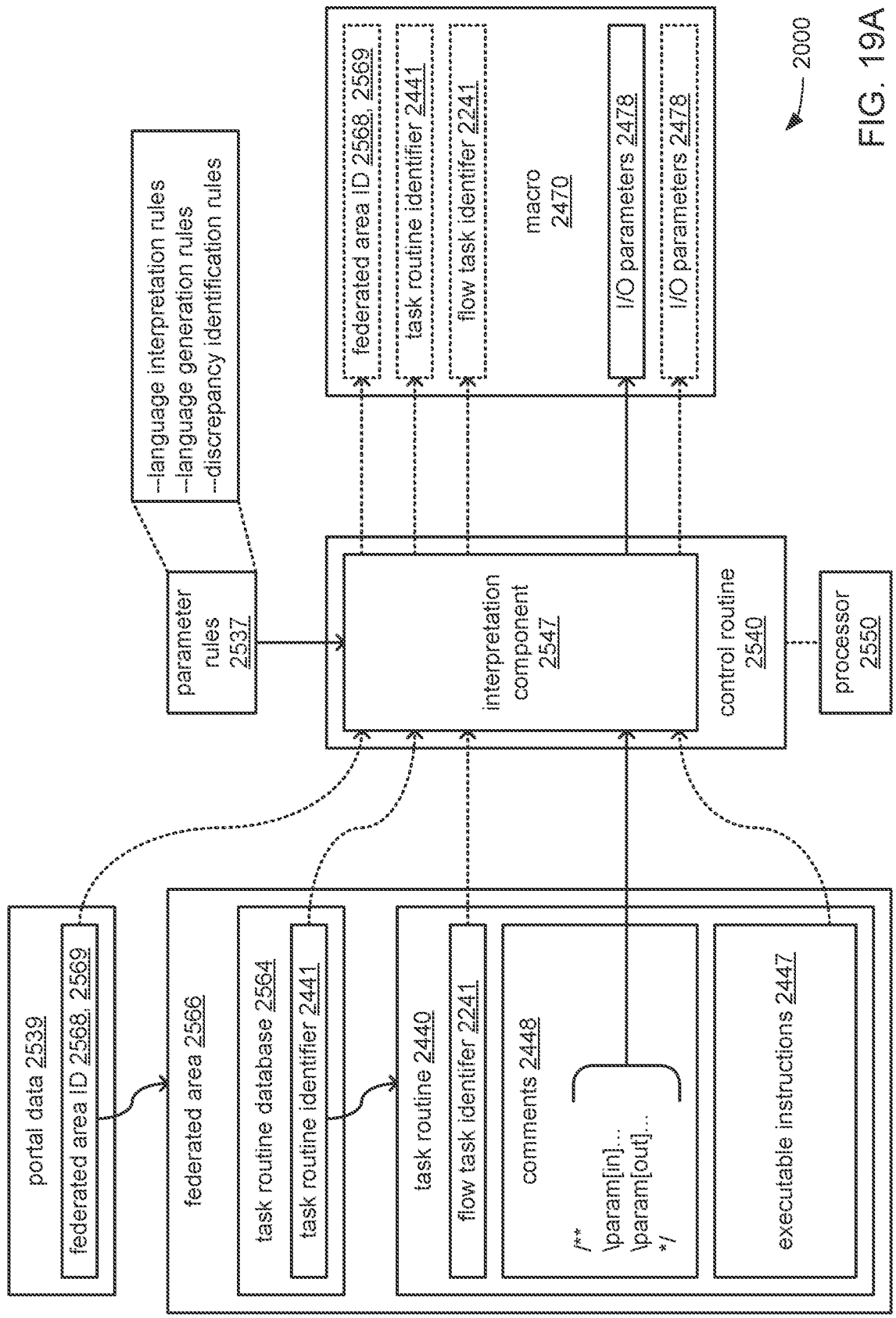
Figure 19C:
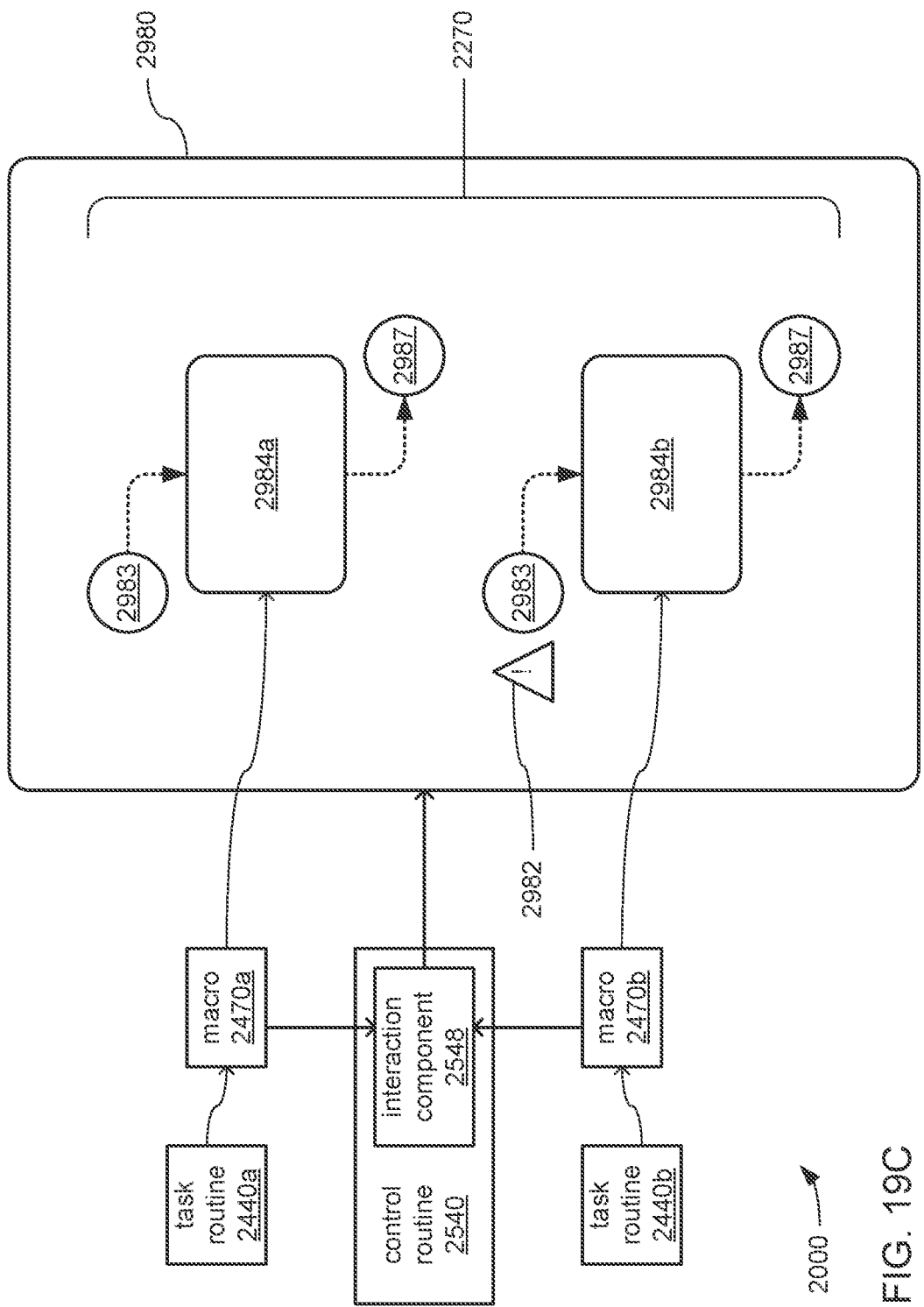
Figure 19D:
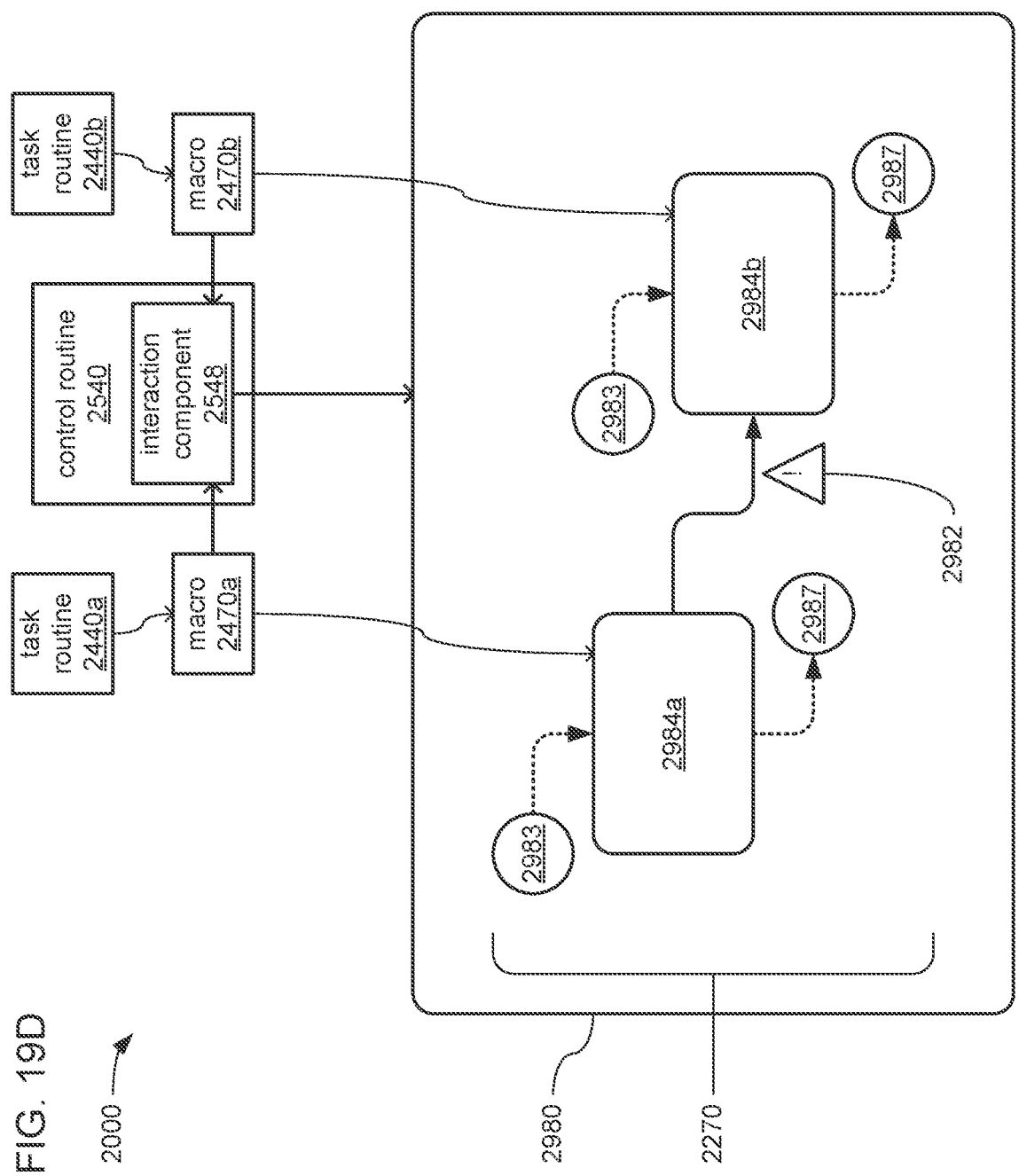
Figure 19E:
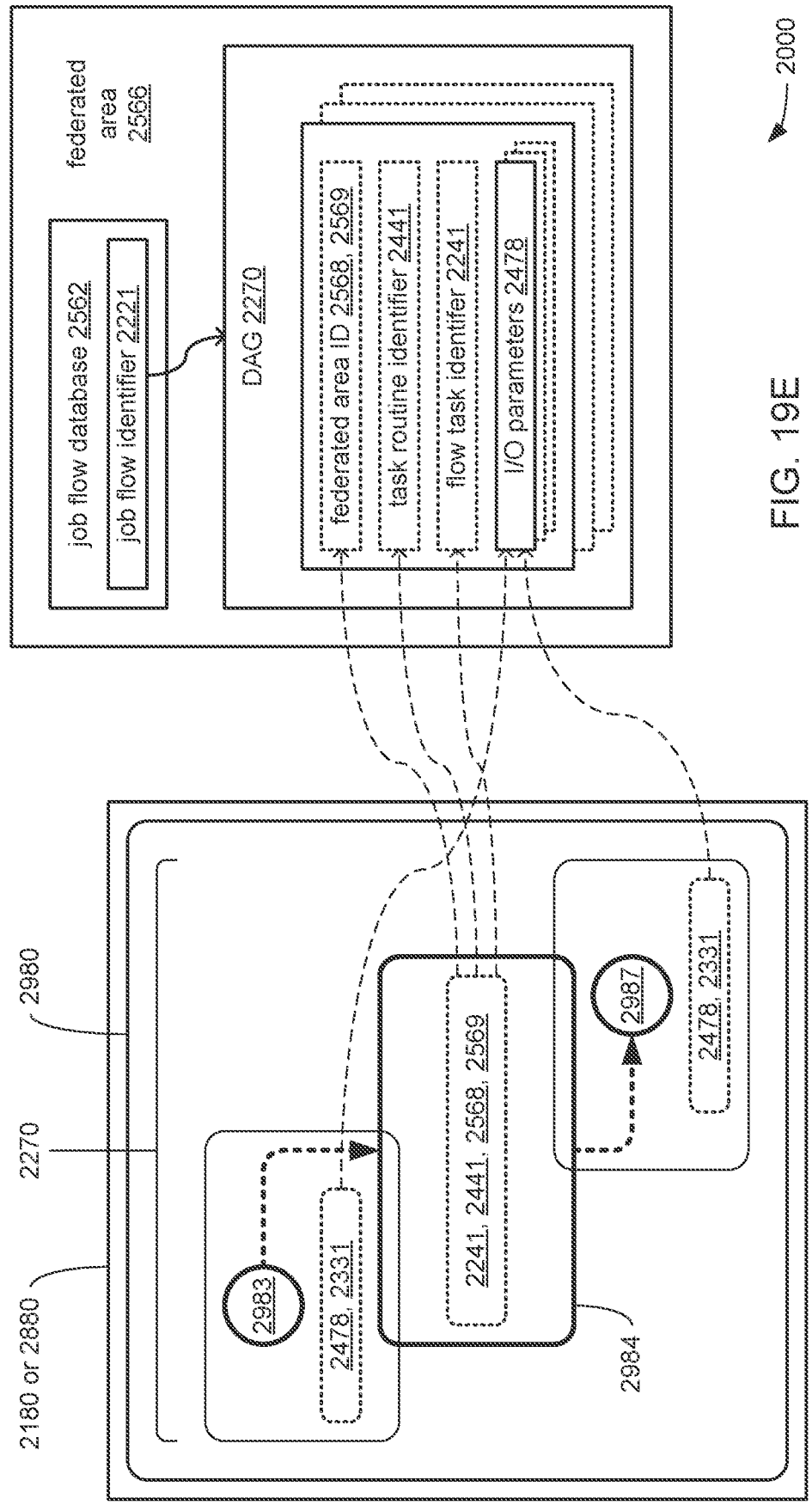

FIGS. 19A, 19B, 19C, 19D and 19E, together, illustrate various aspects of the generation of a DAG 2270 and the provision of a visualization 2980 of a DAG 2270 in greater detail. FIG. 19A illustrates aspects of collecting information concerning inputs and/or outputs of at least one task routine 2440 in preparation for generating a DAG 2270. FIG. 19B illustrates aspects of generating a DAG 2270 based on collected information concerning inputs and/or outputs of at least one task routine 2440. FIGS. 19C and 19D, taken together, illustrate aspects of generating a visualization 2980 of a DAG 2270 to visually indicate a connection or a lack of connection between a pair of task routines. FIG. 19E illustrates aspects of the generation and storage of a new DAG 2270 from a visualization 2980 of an edited DAG 2270.

FIG. 19A illustrates aspects of the generation of a macro 2470 for each task routine 2440 that may be included in a DAG 2270 as an intermediate step to generating the DAG 2270. Such an intermediate step may be performed where the objects that serve as the sources of the information to be depicted in a DAG 2270 are located remotely from where a visualization 2980 of the DAG 2270 is to be displayed, such as where those objects are stored within federated area(s) 2566 maintained by one or more federated devices 2500, but the DAG 2270 is to be displayed by a source device 2100 or a reviewing device 2800. In such situations, the one or more macros 2470 that are so generated may then be transmitted to the device that is to display the visualization 2980 to enable the DAG 2270 to be generated thereat from the one or more macros 2470. However, it should be noted that, where the DAG 2270 is to be generated and/or a visualization 2980 of it is to be displayed locally (e.g., by a computing device with more direct access to the objects that serve as the sources of the information to be depicted), then the DAG 2270 may be generated more directly, and while foregoing the generation of macro(s) 2470. Also, as an alternative to the generation and transmission of macros 2470 to a remote device that is to display a DAG 2270 generated therefrom, the DAG 2270, itself, may be generated locally (e.g., at one or more of the federated devices 2500) and then an image of the DAG 2270 may be transmitted to the device that is to display a visualization 2980 of the DAG 2270.

As depicted, an example task routine 2440 from which at least a portion of a DAG 2270 may be generated may include executable instructions 2447 written in any of a variety of programming languages and comments 2448 written in a syntax for comments that may be based on the programming language in which the executable instructions 2447 are written. It should be noted that, for the sake of understandability in presentation, what is depicted is a deliberately simplified example of a task routine 2440 in which there is a single block of comments 2448 that precedes a single block of executable instructions 2447. As also depicted, and in keeping with the earlier discussed approaches to enabling the automated selection of task routines 2440 to perform specific tasks, the depicted example task routine 2440 may include the flow task identifier 2241 that identifies the particular task that is performed by the task routine 2440.

As also depicted, and in keeping with the earlier discussed approaches to organizing task routines 2440 for later retrieval and use, the depicted example task routine 2440 may be stored within a federated area 2566 in which a task routine database 2564 may also be stored that may employ an indexing scheme by which the task routine 2440 is able to be retrieved by the task routine identifier 2441 assigned to it. As has was also previously discussed, the task routine database 2564 may correlate flow task identifiers 2241 of tasks to be performed with task routine identifiers 2441 of the task routine(s) 2440 that perform each of those tasks. However, as previously noted, other mechanisms than a database may be employed to enable the retrieval of task routines 2440 for use in the performances of their respective tasks during the performance of a job flow. As has also been discussed, the federated area 2566 in which the depicted example task routine 2440 is stored may be one of a set of multiple related federated areas 2566, such as a linear hierarchy or a hierarchical tree. Thus, as depicted, the portal data 2539 (or other data structure) may store various parameters associated with each of the multiple federated areas 2566 within such a set of federated areas 2566, including aspects of relationships thereamong, and separate federated area identifiers 2568 and/or 2569 for each.

In executing the interpretation component 2547, the processor(s) 2550 of the one or more federated devices 2500 may be caused to parse the comments 2448 (whether divided into multiple blocks throughout the task routine 2440, or not) to identify, retrieve and interpret at least portions of the comments 2448 that specify aspects of inputs and/or outputs of the task routine 2440. Such aspects that may be so specified may include, and are not limited to, data types of data objects received as inputs and/or generated as outputs, and/or indexing schemes that may be employed in accessing data within data objects. Some of such comments 2448 may identify particular data objects used as inputs and/or generated as outputs, and this may be done to provide default selections of data objects. Alternatively, others of such comments 2448 may avoid doing so as part of an approach to allowing particular data object(s) to be specified by a job flow definition, or in any of a variety of other ways, during the performance of a job flow in which the task routine may be executed. In parsing the comments 2448, the processor(s) 2550 may be caused to retrieve various rules for interpreting the contents of the task routine 2440 from a stored set of parameter rules 2537, including language interpretation rules for at least the particular programming language in which the task routine 2440 was written. The processor(s) 2550 may be caused to use such rules to distinguish the comments 2448 from at least the executable instructions 2447, and may use such rules to interpret them.

In further executing the interpretation component 2547, the processor(s) 2550 of the one or more federated devices 2500 may be caused to generate a macro 2470 corresponding to the task routine 2440 that includes one or more input/output (I/O) parameters 2478 that indicate the details concerning inputs and/or outputs that are retrieved from the executable instructions 2447 and/or the comments 2448 of the task routine 2440. Additionally, other pieces of information may also be included in the macro 2470, such as the flow task identifier 2241 indicating the task performed when the task routine 2440 is executed, and/or the federated area identifiers 2568 and/or 2569 of the federated area 2566 in which the depicted example task routine 2440 is stored.

In some embodiments, the processor(s) 2550 of the one or more federated devices 2500 may additionally compare aspects of inputs and/or outputs indicated in the comments 2448 to how those aspects are actually implemented in the executable instructions 2447 to determine whether they match. Where discrepancies are detected, side by side sets of I/O parameters 2478 may be stored within the depicted example macro 2470, with one based on the comments 2448 and the other based on the executable instructions 2447, as a way of indicating a discrepancy therebetween. This may be deemed desirable to allow the details of such a discrepancy to be displayed as part of the DAG 2270 that is later generated from the macro 2470.

Turning to FIG. 19B, as depicted, an example DAG 2270 may be generated and then visually presented in an example visualization 2980 in which the example task routine 2440 of FIG. 19A is represented with a combination of graph objects, including a task graph object 2984 accompanied by an input data graph object 2983 and an output data graph object 2987. It should be noted that, for the sake of understandability in presentation, what is depicted is a deliberately simplified example of a DAG 2270 in which there is a single task routine 2440 depicted that has a single input and a single output. However, it is envisioned that other embodiments of the DAG 2270 may be generated that may include representations of a great many task routines 2440 of which many would may include multiple inputs and/or multiple outputs.

As depicted in the example visualization 2980, the graph objects 2983, 2984 and 2987 that form such a representation of the task routine 2440 of FIG. 19A may each be selected to visually conform, to at least some degree, to version 2.0 of the BPMN specification for visual representations of objects. More specifically, a rounded rectangle may be selected to be the task graph object 2984, and circles connected to the task graph object 2984 by arrows may be selected to be the data graph objects 2983 and 2987. In generating the task graph object 2984, some form of identifier of the task routine 2440 may be placed within the rounded rectangle shape thereof. In some embodiments, such an identifier may be the task routine identifier 2441 assigned to the task routine 2440 and/or the flow task identifier 2241 that identifies the task performed by the task routine 2440, each of which may be included within and retrieved from the macro 2470. However, as previously discussed, at least the task routine identifier 2441 may be a hash value of numerous bytes in size generated by taking a hash of at least a portion of the task routine 2440 such that the task routine identifier 2441 may be cumbersome for personnel to read, recognize and use as a mechanism to uniquely identify the task routine 2440. Therefore, the task routine 2440 may be assigned a less cumbersome textual name that may be placed within the rounded rectangle shape of the task graph object 2984. It may be that such an assigned textual name may be based on a name given to the file in which the task routine 2440 is stored in embodiments in which objects are stored within the federated area(s) 2566 as files with textual file names. Alternatively or additionally, it may be that such an assigned textual name may be specified in the comments 2448 of the task routine 2440.

Additionally, in embodiments in which the task routine 2440 is stored within a federated area 2566 that belongs to a set of related federated areas 2566, some form of identifier of the specific federated area 2566 in which the task routine 2440 is stored may be placed within the rounded rectangle shape of the task graph object 2984. In some embodiments, such an identifier may be the human-readable federated area identifier 2568. As previously discussed, it may be that the human-readable federated area identifier 2568 is a URL that may include a textual name given to the federated area 2566, and may additionally indicate a path among multiple federated areas 2566 by which the federated area 2566 that stores the task routine 2440 is connected to a base federated area 2566 (unless the federated area 2566 in which the task routine 2440 is stored is the base federated area). Further, in embodiments in which the human-readable federated area identifier 2568 is a URL and in which the task routine 2440 is assigned a textual name based on a file name, the human-readable federated area identifier 2568 may be combined with such a name into a single string of text within the rounded rectangle that both identifies the task routine 2440 and specifies its location among the set of related federated areas 2566 in relation to the base federated area thereof.

In generating the input data graph object 2983, some form of identifier of the input data object represented thereby may be placed within or adjacent to the input data graph object 2983. Similarly, in generating the output data graph object 2987, some form of identifier of the output data object represented thereby may be placed within or adjacent to the output data graph object 2987. As previously discussed, the comments 2448 within a task routine 2440 may provide a more or less specific indication of a data object serving as an input or an output, and this may depend on whether it is intended that a data object is to be specified when the task routine 2440 is executed as part of a performance of a job flow, or the identity of the data object is already known such that it is able to be specifically identified in the comments 2448.

Focusing, for sake of ease of discussion, on the input data graph object 2983, if the identity of the specific data object for this input (e.g., the depicted example data set 2330) is already known at the time the task routine 2440 is written, then some form of identifier of that specific data object may be specified in the comments 2448 and/or in the executable instructions 2447. In some embodiments, such an identifier may be the data object identifier 2331 assigned to the depicted example data set 2330. However, as previously discussed, as with the task routine identifier 2441 of the task routine 2440, the data object identifier 2331 may also be a hash value of numerous bytes in size such that the data object identifier 2331 may also be cumbersome for personnel to read, recognize and use. Therefore, as with the task routine 2440, the depicted data set 2330 may be assigned a less cumbersome textual name that may be incorporated into its data set metadata 2338, and this textual name may be placed within or adjacent to the circular input data graph object 2983. As with such a textual name that may be assigned to the task routine 2440, such a textual name assigned to the data set 2330 may be based on a name given to the file in which the data set 2330 is stored in embodiments in which objects are stored within the federated area(s) 2566 as files with textual file names.

However, and still focusing on the input data graph object 2983, if the identity of the specific data object for this input is not already known at the time the task routine 2440 is written, then the name of a variable or some other form of placeholder may be specified in the comments 2448 and/or in the executable instructions 2447. In such embodiments, it may be the name or other identifier of that variable or other type of placeholder that may be placed within or adjacent to the circular input data graph object 2983. It should be noted that such approaches to providing a visual indication of the identity of the input data object associated with the depicted input data graph object 2983 may also be applied to providing a visual indication of the identity of the output data object (not shown) associated with the depicted output data graph object 2987.

FIGS. 19C and 19D, taken together, depict an embodiment of an approach to conveying either the presence of a dependency or the lack of a dependency between two task routines in visualizations 2980 of contrasting examples of DAGs 2270. Each of the example visualizations 2980 of FIGS. 19C and 19D includes representations of two task routines 2440a and 2440b, where the task routine 2440a is represented by a combination of a task graph object 2984a and corresponding data graph objects 2983 and 2987, and where the task routine 2440b is represented by a combination of a task graph object 2984b and other corresponding data graph objects 2983 and 2987. However, in the visualization 2980 of FIG. 19C, a vertical arrangement of the representations of the task routines 2440a and 2440b is used to provide a visual indication of no dependency therebetween, such that there is no data object output by one of the task routines 2440a and 2440b that is needed as an input to the other. In contrast, in the visualization 2980 of FIG. 19D, a horizontal arrangement of the representations of the task routines 2440a and 2440b provides the suggestion of a left-to-right path of dependency from the task routine 2440a to the task routine 2440b. Reinforcing this indication of such a dependency is an additional arrow pointing from the representation of the task routine 2440a to the representation of the task routine 2440b. It should be noted that, although such a use of an arrow is depicted as providing an indication of such a dependency (regardless of whether horizontal arrangement is also used), any of a variety of other forms of indication of such a dependency may be used in other embodiments. By way of example, color coding, graphical symbols and/or other form of visual connector indicative of the dependency may be used to.

In situations, in which a visualization 2980 is to be generated of a DAG 2270 that includes multiple task routines 2440, the details of the inputs and outputs of each of the task routines may be analyzed to identify any instances that may be present of a particular data object having been specified as both an output of one task routine 2440 and an input of another task routine 2440. Such a situation, if found, may be deemed to indicate a dependency in which the one task routine 2440 provides the particular data object that is needed as an input to the other 2440, such as what is depicted in FIG. 19D between the output of task routine 2440a and the input of task routine 2440b. Again, as a result of such a dependency, execution of the task routine 2440a may be required to occur ahead of the execution of the task routine 2440b so as to ensure that the output of the task routine 2440a is able to be provided to the task routine 2440b for use during its execution.

FIG. 19E depicts aspects of the generation and storage, within a federated area 2566, of a new DAG 2270 from a visualization 2980 of an earlier DAG 2270 that may have been edited. More specifically, in some embodiments a UI may be provided to allow editing of aspects of one or more task routines 2440 of an existing DAG 2270 by graphically editing corresponding aspects of graph objects 2983, 2984 and/or 2987 of one or more corresponding representations of task routines 2440. Thus, where a visualization 2980 is initially generated of a DAG 2270, provision may be made for such editing to allow details of a new DAG 2270 to be developed. Further, upon completion of such editing, the new DAG 2270 thusly developed may then be stored within a federated area 2566, and may subsequently be used as at least a basis for a new job flow definition 2220 that defines a new job flow.

Such editing may entail changing the visual indication(s) of one or more I/O parameters 2478 that may be visually indicated within or adjacent to an input data graph object 2983 or an output data graph object 2987 to thereby change the one or more I/O parameters 2478 that correspond to those visual indication(s). More specifically, where a name or other identifier of a data object 2330 or 2370 that is generated as an output of a task routine 2440 is visually presented adjacent to the corresponding output data graph object 2987, an edit made in which that name or other identifier is changed in the visualization 2980 may trigger a corresponding change in what data object 2330 or 2370 is generated as an output. Correspondingly, where a name or other identifier of a data object 2330 or 2370 that is used as an input to a task routine 2440 is visually presented adjacent to the corresponding input data graph object 2983, an edit made in which that name or other identifier is changed in the visualization 2980 may trigger a corresponding change in what data object 2330 or 2370 is used as an input. As a result of such editing capabilities being provided, dependencies between task routines may be created, changed and/or entirely removed. In at least this way, the order of performance of tasks, and/or which tasks are able to be performed in parallel, may be changed as part of creating a new DAG 2270 that may be employed as at least part of a new job flow definition 2220.

As previously discussed, a DAG 2270 may be stored in a federated area as a script generated in a process description language such as BPMN. In some embodiments, at least a subset of the job flow definitions 2220 maintained within one or more federated areas 2566 by the one or more federated devices 2500 may also be stored, at least partially, as scripts in such a process description language as BPMN. Thus, there may be few, if any, differences in the contents of DAGs 2270 vs. job flow definitions 2220 such that a DAG 2270 may be usable as a job flow definition 2220 with little or no modification. It is for this reason that DAGs 2270 may be stored alongside job flow definitions 2220 in the earlier described job flow database 2562.

Figure 20C:
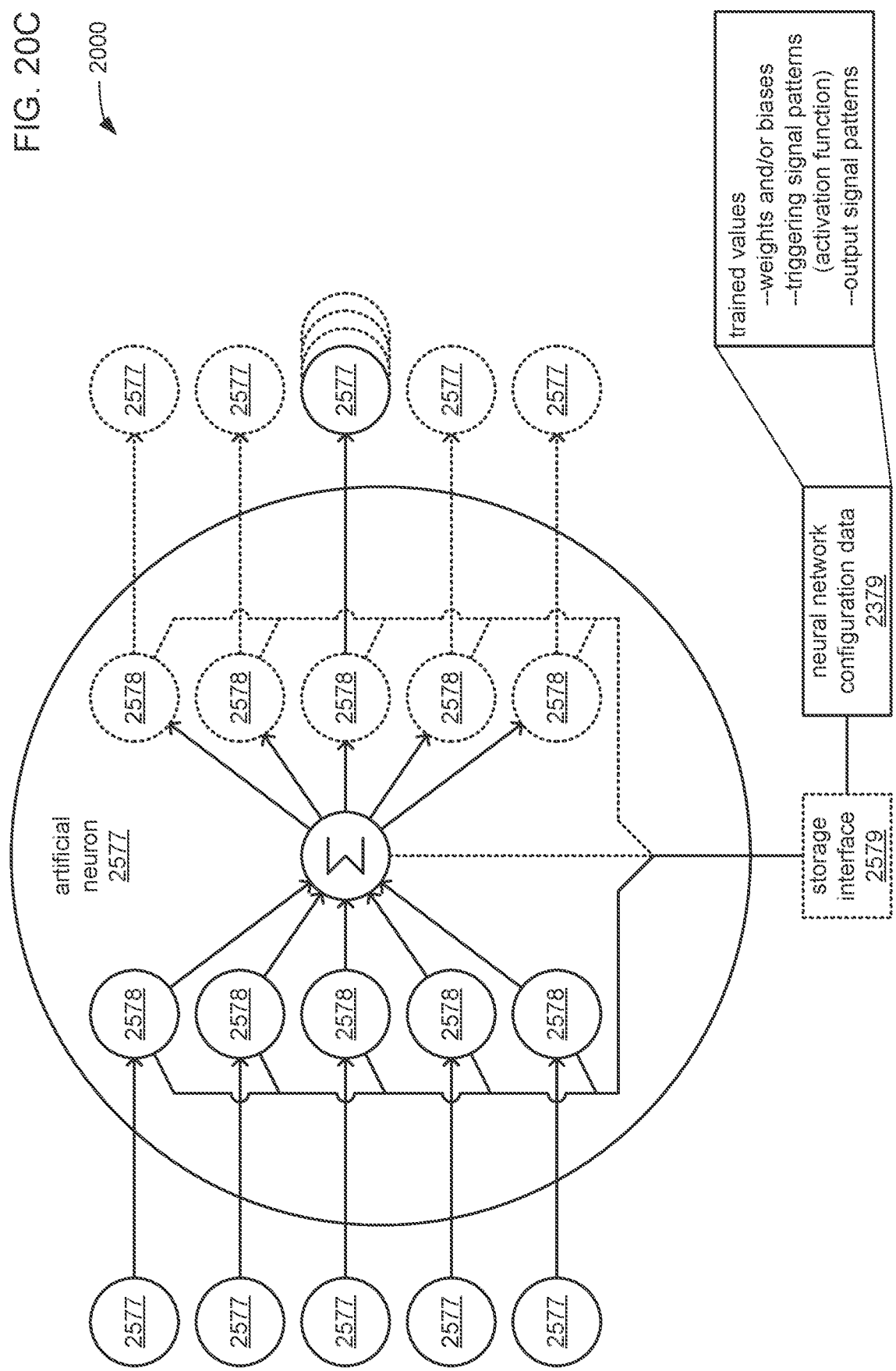
Figure 20E:
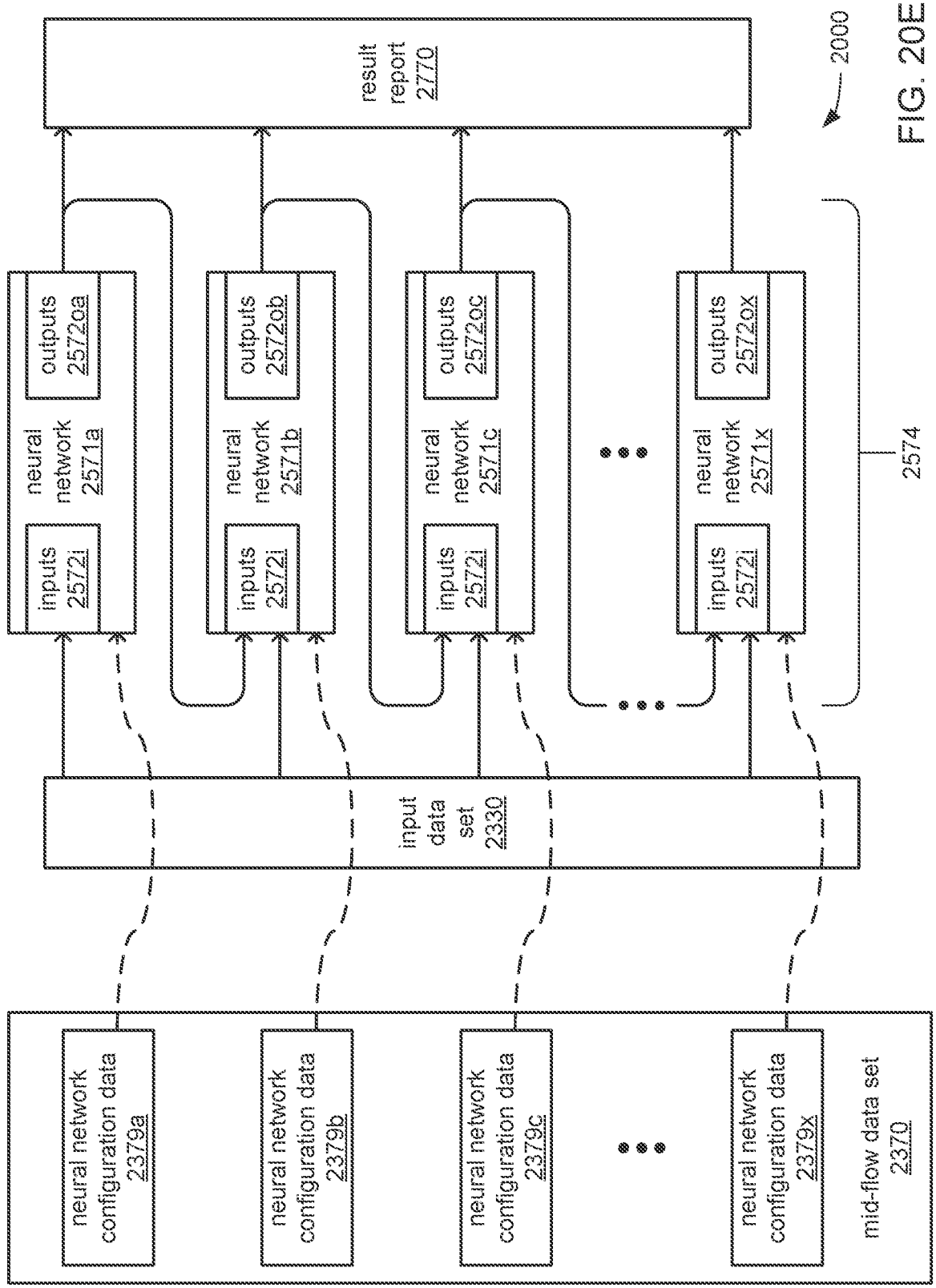
Figure 20F:
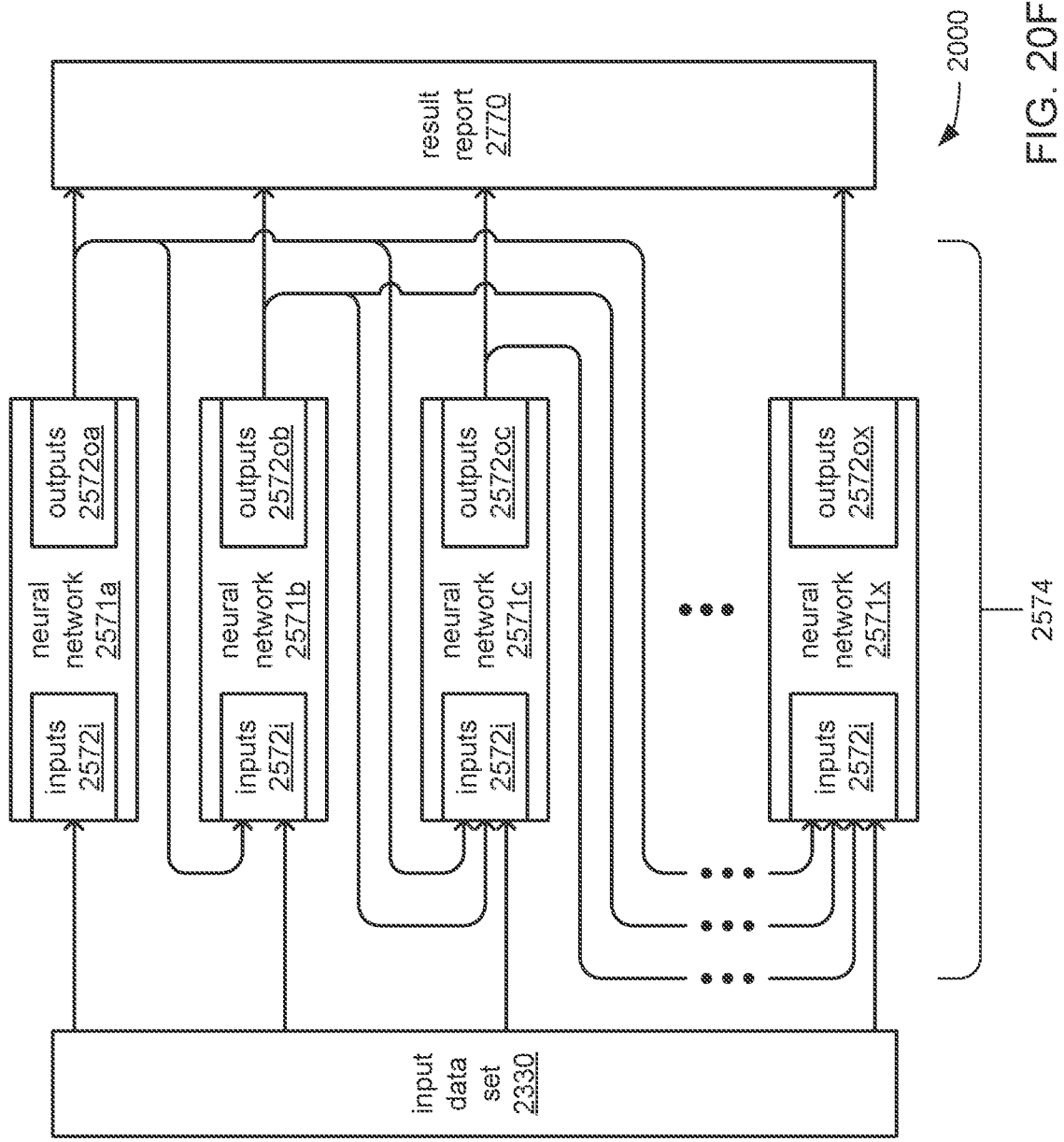

FIGS. 20A, 20B, 20C, 20D, 20E and 20F, together, illustrate aspects of the manner in which a non-neuromorphic implementation of an analytical function may be replaced by a neuromorphic implementation. More specifically, FIGS. 20A, 20B and 20C illustrate the manner in which an existing job flow that employs non-neuromorphic processing to perform an analytical function may be used to train one or more neural networks employed as part of the neuromorphic processing of a new job flow to perform the same analytical function much more quickly. FIG. 20A provides an overall depiction of the manner in which such a change from non-neuromorphic to neuromorphic processing may be implemented, FIG. 20B depicts aspects of an example of a single neural network that may be employed in making such a change, and FIG. 20C depicts aspects of an example artificial neuron of such a neural network. In contrast to the use of a single neural network to perform an analytical function, each FIGS. 20D, 20E and 20F depicts aspects of a different example of the use of an ensemble of neural networks to perform an analytical function.

It should be noted that each of these examples, as well as other examples presented throughout this present application concerning aspects of replacing a non-neuromorphic implementation of an analytical function with a neuromorphic implementation, have been deliberately simplified for purposes of illustration, and should not be taken as limiting what is described and claimed herein to such relatively simple embodiments.

FIG. 20A depicts a performance of a job flow 2200*x* by one or more federated devices 2500 to perform an analytical function that employs one or more data sets 2330 as data input and provides one or more result reports 2770 as data output. The job flow 2200*x*, as defined by a corresponding job flow definition 2220*x*, does not employ a neural network such that performances of the job flow 2200*x* do not entail neuromorphic processing. Instead, the job flow 2200*x* may employ just instruction-based processing in which the processor(s) 2550 of the one or more federated devices 2500 execute a stored set of executable instructions that specify, step-by-step, the manner in which the analytical function is to be performed. As will be familiar to those skilled in the art, and as has been described in great detail throughout this present application, such execution of instructions may involve just sequential instruction execution by a single core of a single processor, or may involve at least one or more instances of parallel instruction execution by multiple cores of one or more processors.

However, FIG. 20A also depicts a selection between one of two different implementations of another job flow 2200*v*, also performed by one or more of the federated devices 2500, to perform the same analytical function as the job flow 2200*x*. In contrast to the job flow 2200*x*, the job flow 2200*v* is defined by a corresponding job flow definition 2220*v* to employ one or more neural networks 2571 such that performances of the job flow 2200*v* do entail neuromorphic processing. Thus, a performance of the job flow 2200*v* entails the instantiation of each neural network 2571 of the one or more neural networks 2571 based on a corresponding instance of neural network configuration data 2371 that defines it, including its behavior. Among the two depicted implementations of the job flow 2200*v*, one implementation employs one or more task routines 2440*v* to implement each of the one or more neural networks 2571 in a software simulation thereof, and the other implementation employs one or more neuromorphic devices 2570 to implement the one or more neural networks 2571 using hardware components.

In either implementation of the job flow 2200*v*, and as has been previously discussed, the corresponding one or more instances of the neural network configuration data 2371 may be incorporated into and/or otherwise stored in a federated area 2566 as a single mid-flow data set 2370. As previously discussed, where there are multiple neural networks 2571 that are used together (e.g., in an ensemble of neural networks such as a neural network chain) such that there are, correspondingly, multiple instances of the neural network configuration data 2371, it may be deemed desirable to store the multiple instances of the neural network configuration data 2371 together as a single data objects 2330, 2370 or 2770, as depicted with a single mid-flow data set 2370 in FIG. 20A. However, and as also previously discussed, it may be that each instance of multiple instances of the neural network configuration data 2371 may be stored as a separate data object 2330, 2370 or 2770. Regardless of the quantity of data objects 2330, 2370 or 2700 used, as previously discussed, such treatment of the one or more instances of the neural network configuration data 2371 as a mid-flow data set 2370 (or as a part of a mid-flow data set 2370) enables the preservation thereof within a federated area 2566 such that it is able to be reliably retrieved alongside the job flow definition 2220*v*, the task routine(s) 2440*v* and data set(s) 2330 to be used as input.

In some embodiments in which the one or more neural networks 2571 are implemented using software simulation, such an implementation may entail the parallel execution of multiple copies of one or more of the task routines 2440*v* by one or more cores of each of one or more of the processors 2550 across one or more of the federated devices 2500. This may be the case especially where at least one of the one or more neural networks 2571 incorporates a large quantity of artificial neurons and/or multiple interconnected layers of artificial neurons, and where the one or more processors 2550 that are so employed are central processing units (CPUs) that each incorporate a relatively small quantity of processing cores (e.g., less than a hundred processing cores per CPU). Alternatively, in other embodiments in which the one or more neural networks 2571 are implemented using software simulation, such an implementation may entail such parallel execution by a larger quantity of processing cores of just one or a relatively small quantity of the processors 2550 within a single federated device 2500, especially where each processor 2500 is a graphics processing unit (GPU) that each incorporates a relatively large quantity of processing cores (e.g., thousands of processing cores per GPU).

However, in still other embodiments in which the one or more neural networks 2571 are implemented using the one or more of the neuromorphic devices 2570, such an implementation may entail the configuration of multiple hardware-implemented artificial neurons within each of the one or more neuromorphic devices 2570 to cooperate to form and behave as a neural network 2571 of the one or more neural networks 2571. While the use of software simulation may beget a neuromorphic implementation of the analytical function that is able to be performed much faster than a non-neuromorphic implementation (e.g., one or more orders of magnitude faster than a non-neuromorphic implementation), the use of hardware-based artificial neurons in implementing the one or more neural networks 2571 may beget a neuromorphic implementation that performs the analytical function even more quickly (e.g., multiple orders of magnitude faster than a non-neuromorphic implementation).

Referring to both FIGS. 20A and 20B, each of the one or more processors 2550, regardless of whether it is a CPU or a GPU, is an example of an instruction-based processing resource, i.e., a processor that executes a series of instructions to perform a function that those instructions explicitly describe the steps for performing. As will be familiar to those skilled in the art, although such processors are able to execute instructions to provide a simulation of one or more artificial neurons, this approach scales poorly as the quantity of artificial neurons within a neural network increases. Separate parameters must be maintained for each artificial neuron that define what is usually unique behavior for each artificial neuron in terms of when and how to respond to signals received by each artificial neuron. Also, the usually high quantity and complexity of connections among the artificial neurons in a neural network usually means that the firing of one neuron sends signals out to multiple other neurons, and each of those neurons is usually also receiving signals sent to each of them by still other neurons. Stated more simply, as the quantity of artificial neurons within a neural network increases, the complexity of simulating their collective behavior as a neural network becomes exponentially more difficult. It is often not long before the processors employed to execute the instructions to provide the simulation of the artificial neurons in a neural network become saturated with context switching and repetitive storage accesses to store and retrieve parameter values and indications of the current states of individual artificial neurons. Thus, although such instruction-based processing resources as CPUs and GPUs (as well as other varieties of processing devices that execute instructions) are able to be used in this manner, doing so can easily become at least impractical.

Each of the one or more neuromorphic devices 2570 is an example of a neuromorphic processing resource, i.e., a processing device that provides a hardware-based implementation of each artificial neuron, including hardware-based local storage of the parameters that define the behavior of the artificial neuron so implemented. In contrast to instruction-based processing resources (e.g., CPU and/or GPU forms of each of the one or more processors 2550), while instruction-based processing resources can be used to execute instructions to perform a function either with neuromorphic processing (i.e., using a software-based implementation of a neural network) or without neuromorphic processing (i.e., executing instructions that explicitly define steps of a function), neuromorphic processing resources such as the one or more neuromorphic devices 2570 are usually not capable of executing instructions.

FIG. 20B depicts aspects of an example implementation of a single neural network 2571. As again depicted, the neural network 2571 may be implemented either as a software simulation through the execution of one or more of the task routines 2440ν or using hardware-based artificial neurons 2577 of the one or more neuromorphic devices 2570. As additionally depicted in FIG. 20B, where one or more neuromorphic devices 2570 are used to implement the neural network 2571, at least one of the one or more neuromorphic devices 2570 may incorporate a storage interface 2579 by which the neural network configuration data 2371 for the single neural network 2571 may be provided. Where more than one of the neuromorphic devices 2570 are used, a single one of the neuromorphic devices 2570 may relay some or all of the neural network configuration data 2371 to the others, or each of the neuromorphic devices 2570 may be directly provided with at least a portion of the neural network configuration data 2371.

Regardless of whether the neural network 2571 is implemented with the one or more neuromorphic devices 2570 or a software-based simulation, as depicted, the neural network 2571 may be defined to be a multi-layer feedforward form of artificial neural network (ANN). In being defined as a multi-layer ANN, the neural network 2571 may be defined as having multiple inputs 2572i and multiple outputs 2572o between which numerous ones of the artificial neurons 2577 may be organized into three or more layers that include an input layer 2573i, an output layer 2573o, and at least one hidden layer 2573h between the input layer 2573i and the output layer 2573o. In being defined as a feedforward ANN, the artificial neurons 2577 may be interconnected with a set of connections 2575 that are defined to convey information solely between adjacent layers 2573, in a direction that extends generally from the input layer 2573i and toward the output layer 2573o, without any connections between artificial neurons 2577 that are within the same layer 2573, and without any connections that convey information in the reverse direction extending generally from the outputs 2572o and the output layer 2573o, and back toward the input layer 2573i and the inputs 2572i. More simply, all connections among the artificial neurons 2577 are defined as conveying information in the "forward" direction from the inputs 2572i and the input layer 2573i, and toward the output layer 2573o and the outputs 2572o, without any "crosstalk" flow of information within any of the layers 2573, and without any "feedback" flow of information. Such a configuration of layers 2573 of artificial neurons 2577 and of connections 2575 between the layers 2573 is based on observations of the manner in which real neurons appear to interact within the brains of human beings and various animals, and have been used with some degree of success in mimicking the function of parts of the human brain, including the human visual system (HVS) where ANNs have been used to implement visual recognition systems. However, despite this specific depiction of a single one of the neural network 2571 as a multi-layer feedforward form of ANN, other embodiments are possible in which the neural network 2571 may be defined as having a different structure in which the artificial neurons 2577 may be organized differently and/or in which the connections 2575 may be defined to extend among the artificial neurons 2577 in a different configuration. Alternatively or additionally, where multiple neural networks 2571 are used (e.g., in an ensemble of neural networks), different ones of those multiple neural networks 2571 may be of different types such that at least neural network 2571 may be a feedforward ANN, while at least one other may be a recurrent neural network (RNN) having feedback connections between layers of neurons.

The neural network configuration data 2371 may include various hyperparameters that define various structural features of the neural network 2571. By way of example, the hyperparameters in an instance of the neural network configuration data 2371 may define the neural network 2571 as a multi-layer feedforward form of ANN, may specify the total quantity of artificial neurons 2577 included therein, may specify the quantity of layers 2573, may specify which artificial neurons 2577 are connected, and/or the direction in which information is conveyed through those connections 2575.

FIG. 20C depicts aspects of an example internal architecture for the artificial neurons 2577. Again, each neural network 2571 may be implemented either as a software simulation through the execution of one or more of the task routines 2440ν or using hardware-based artificial neurons 2577 of the one or more neuromorphic devices 2570. Therefore, accordingly, each of the artificial neurons 2577 may be implemented as a software-based simulation or using hardware components.

As depicted, each of the artificial neurons 2577 may incorporate multiple memristors 2578 (or software-based equivalent simulations thereof) with each memristor 2578 receiving an input from outside the artificial neuron 2577. Where the depicted artificial neuron 2577 is incorporated into the output layer 2573o or into a hidden layer 2573h, each of these inputs may be received from another artificial neuron 2577 of another layer 2573. However, where the depicted artificial neuron 2577 is incorporated into the input layer 2573i, each of these inputs may be one of the external inputs 2572i to the neural network 2571. It should be noted that, where the depicted artificial neuron 2577 is incorporated into the input layer 2573$i$, the depicted artificial neuron 2577 may alternatively receive just one of the external inputs 2572$i$ to the neural network 2571. The neural network configuration data 2371 may define weights and/or biases for each memristor 2578 to control such factors as what type and/or magnitude of input each memristor 2578 responds to and/or the sensitivity of each memristor 2578 to the input it receives. Alternatively or additionally, the neural network configuration data 2371 may define input patterns that may serve to trigger the depicted artificial neuron 2577 (or in other words, cause "activation" or "firing" of the depicted artificial neuron 2577), and/or the manner in which a cumulative quantity, magnitude and/or frequency of input received by each memristor 2578 may serve to trigger the depicted artificial neuron 2577. Regardless of what weights, biases, patterns and/or other input response parameters may be defined for each memristor 2578 within the neural network configuration data 2371, each memristor 2578 may function at least partially as a memory storage device into which such parameters may be directly stored. Where each memristor 2578 is implemented as a software-based simulation, such local storage of such parameters may also be simulated.

As will be familiar to those skilled in the art, the internal architecture of artificial neurons is a subject of ongoing research and development, and so other internal architectures of artificial neurons are possible. Thus, as additionally depicted in FIG. 24C, the depicted artificial neuron 2577 may employ any of a variety of forms of internal logic to combine, sum or otherwise aggregate the inputs received from other artificial neurons 2577 or as external input(s) 2572$i$ to the neural network 2571 as part of the type of activation function that is selected in determining what triggers the artificial neuron 2577 to fire. As depicted in this example internal architecture, the depicted artificial neuron 2577 may incorporate a relatively simple summation node to perform such a combining or other aggregation as part of its activation function.

As also additionally depicted in FIG. 20C, the depicted artificial neuron 2577 may incorporate still one or more additional memristors 2578 (or software-based equivalent simulations thereof), with each such additional memristor 2578 providing an output from within the artificial neuron 2577 upon triggering of the artificial neuron. Where the depicted artificial neuron 2577 is incorporated into the input layer 2573$i$ or into a hidden layer 2573$h$, each of these outputs may be to another artificial neuron 2577 of another layer 2573. However, where the depicted artificial neuron 2577 is incorporated into the output layer 2573$o$, each of these outputs may be one of the external outputs 2572$o$ from the neural network 2571. It should be noted that, where the depicted artificial neuron 2577 is incorporated into the output layer 2573$i$, the depicted artificial neuron 2577 may alternatively provide just one of the external outputs 2572$o$ of the neural network 2571. The neural network configuration data 2371 may define such factors as what type, magnitude, frequency and/or duration of output each such additional memristor 2578 may provide when the depicted artificial neuron 2577 is triggered. Again, each such additional memristor 2578 may function at least partially as a memory storage device into which such parameters may be directly stored.

It should again be noted that this depiction of an internal architecture for the artificial neurons 2577 is but one example of such an architecture, and that other internal architectures are possible in other embodiments. Additionally, the various variations of this depicted architecture that have been discussed herein are but a few examples of such variations, and other internal architectures are possible in other embodiments. By way of example, other internal architectures are possible that incorporate more or fewer memristors; incorporate alternative components to memristors; incorporate any of a variety of aggregating, combining and/or summation components; and/or incorporate any of a variety of differing quantities of inputs and outputs.

Each of FIGS. 20D-F depicts a different example of an ensemble 2574 of neural networks 2571 that may be used to perform an analytical function, instead of a single neural network 2571, such as the example single neural network 2571 depicted in FIG. 20B. Again, and as previously discussed, where a neural network ensemble 2574 is used, it may be deemed desirable to store the separate instances of the neural network configuration data 2371 for each of the neural networks 2571 within that ensemble within a single data object, such as a single mid-flow data set 2370, to prevent various situations of from arising, such as the neural network configuration data 2371 for one or more the neural networks 2571 being errantly deleted, or from becoming separated in storage from the neural network configuration data 2371 for one or more others of the neural network 2571. Alternatively or additionally, such storage of the separate instances of the neural network configuration data 2571 for each of the neural networks 2571 of an ensemble 2574 within a single data object, may serve to prevent a situation from arising where mismatched versions of each of the instances of neural network configuration data 2571 are errantly used together to instantiate the neural networks 2571 within that ensemble 2574.

It should be noted that, despite the depiction of a quantity of four neural networks 2571$a$ through 2571$x$ in each of FIGS. 20D-F, other embodiments of each of these example neural network ensembles 2574 are possible in which there are lesser or greater quantities of multiple neural networks 2571. Thus, in each of these depicted ensembles 2574, there may be as few as two neural networks 2571 (e.g., a neural network 2571$a$ and a neural network 2571$x$), or dozens, or still larger quantities of neural network 2571.

FIG. 20D depicts an ensemble 2574 of multiple neural networks 2571$a$ through 2571$x$ in which all of the inputs 2571$ia$ through 2571$ix$ are provided with the same (e.g., a set of values from the same flow input data set 2330, as depicted), and all of the outputs 2572$oa$ through 2572$ox$, respectively, are provided to some form of aggregation component serving as an output stage (such as a summation component (as depicted), a selection component, etc.) that then provides the ultimate output of the ensemble 2574 (which may be stored as a result report 2770, as depicted). As will be familiar to those skilled in the art, such an ensemble 2574 may be instantiated and used to perform multiple different analytical functions or to perform multiple neuromorphic implementations of the same analytical function where success in efforts to generate a single neuromorphic form of analytical function to arrive at a result has been elusive. It may be that the outputs of each of the neural networks 2571$a$-$x$ are compared to identify some degree of consensus as part of implementing a "voting" algorithm by which the output of a single one of the neural networks 2571$a$-$x$ is selected to be output as the result report 2770, or by which the outputs of a subset of the neural networks 2571$a$-$x$ are determined to demonstrate enough of a consensus that they are selected to be combined in some way to derive an output that becomes the result report 2770.

As depicted, and as has been discussed, a single mid-flow data set 2370 may include the neural network configuration data 2379a through 2379x that may each correspond to one of the neural networks 2571a through 2571x of the depicted ensemble 2574. Alternatively or additionally, for such a neural network ensemble 2574 that includes some form of aggregation component, the same mid-flow data set 2370 may also include one or more parameters (not specifically shown) that specify one or more aspects of that aggregation component. Also alternatively or additionally, it may be that the same mid-flow data set 2370 includes an indication of the manner in which the neural networks 2571a-x and/or the aggregation component are to be interconnected.

FIG. 20E depicts another example ensemble 2574 of multiple neural networks 2571a through 2571x that is of a type sometimes referred to as a "single-link chain" of neural networks. In such an ensemble 2574, the multiple neural networks 2571a-x are ordered into a chain in which a subset of the inputs 2572i of each neural network 2571 (except for the neural network 2571a at the head of the chain) are provided with the outputs 2572o of the immediately preceding neural network 2571 as an input. It is this relaying of the outputs 2572o of just the single immediately preceding neural network 2571 to a subset of the inputs 2572i of the next neural network 2571 in the chain that is described by the term "single". Additionally, the remainder of the inputs 2572i of all of the neural networks 2571a-x may be provided with the same external inputs (e.g., a set of values from the same flow input data set 2330, as depicted), and the outputs 2572oa-ox of each of the neural networks 2571a-x, respectively, may form part of the output of this single-link chain ensemble 2574 (which may be stored as a result report 2770, as depicted).

Again, as depicted, a single mid-flow data set 2370 may include the neural network configuration data 2379a through 2379x that may each correspond to one of the neural networks 2571a through 2571x of the depicted single-link chain ensemble 2574. Alternatively or additionally, it may be that the same mid-flow data set 2370 includes an indication of the manner in which the neural networks 2571a-x and/or the aggregation component are to be interconnected to form the depicted single-link chain ensemble 2574.

FIG. 20F depicts another example chain-type ensemble 2574 of multiple neural networks 2571a through 2571x that is of a type sometimes referred to as a "multi-link chain" of neural networks. Like the example single-link chain ensemble 2574 of FIG. 20E, the multiple neural networks 2571a-x of the depicted multi-link chain ensemble 2574 are ordered into a chain. However, in the depicted multi-link chain ensemble 2574, a subset of the inputs 2572i of each neural network 2571 (except for the neural network 2571a at the head of the chain) are provided with the outputs 2572o of all of the preceding neural network 2571 as an input. It is this relaying of the outputs 2572o of all of the preceding neural networks 2571 to a subset of the inputs 2572i of the next neural network 2571 in the chain that is described by the term "multi". Additionally, the remainder of the inputs 2572i of all of the neural networks 2571a-x may be provided with the same external inputs (e.g., a set of values from the same flow input data set 2330, as depicted), and the outputs 2572oa-ox of each of the neural networks 2571a-x, respectively, may form part of the output of this single-link chain ensemble 2574 (which may be stored as a result report 2770, as depicted).

It should be noted that, unlike the FIGS. 20D-E, for sake of simplicity and clarity of depiction, the storage of the neural network configuration data 2379a through 2379x within a single mid-flow data set 2370 is not specifically shown. Also, despite not being specifically shown, it should be noted that such a mid-flow data set 2370 may also include an indication of the manner in which the neural networks 2571a-x and/or the aggregation component are to be interconnected to form the depicted multi-link chain ensemble 2574.

Figure 21A:
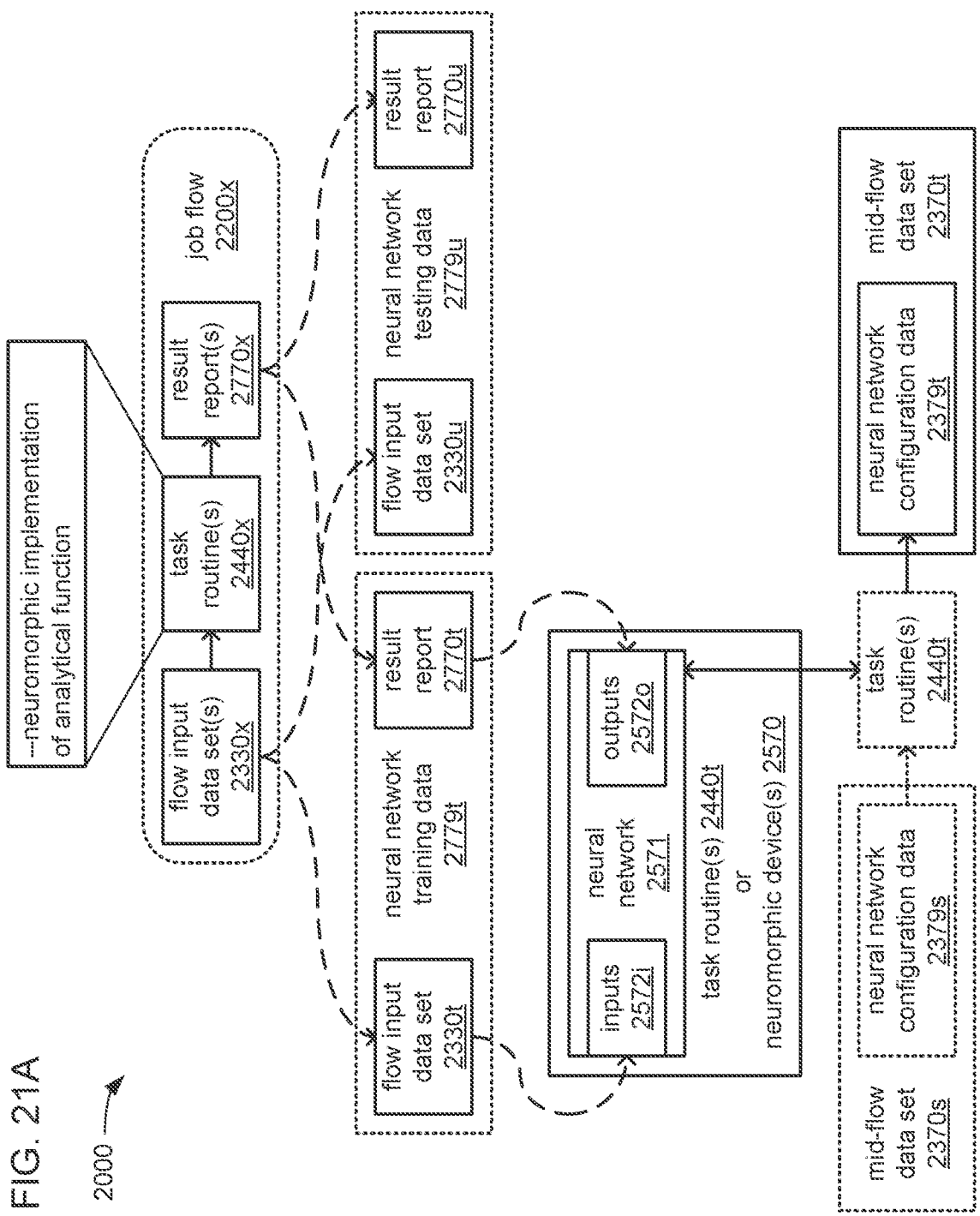
Figure 21C:
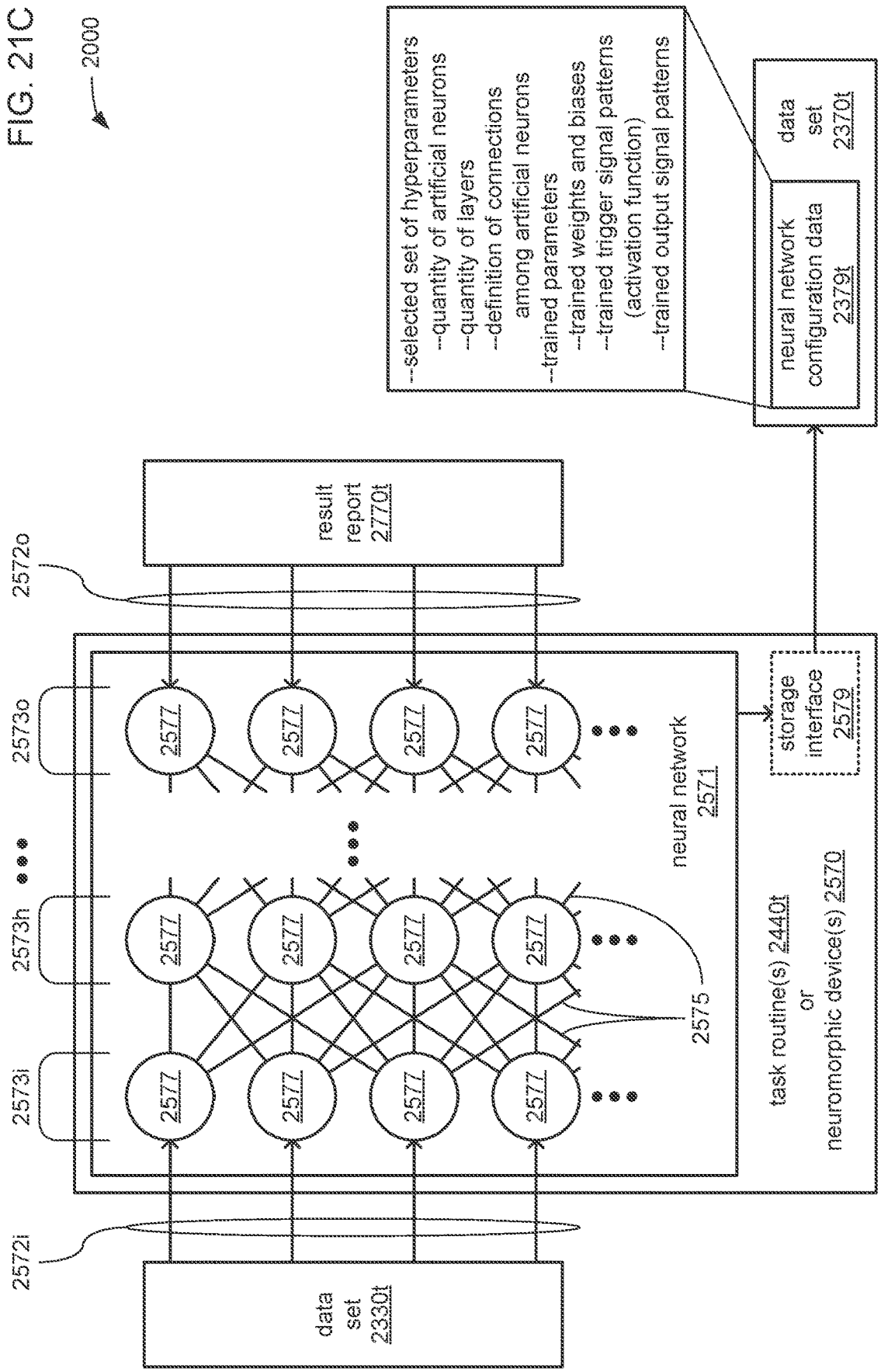

FIGS. 21A, 21B and 21C, together, illustrate aspects of training a neural network to perform an analytical function as part of transitioning the implementation of the analytical function from a non-neuromorphic processing implementation to a neuromorphic processing implementation. More specifically, FIGS. 21A, 21B and 21C illustrate the manner in which data sets associated with performances of an existing non-neuromorphic implementation of the analytical function may be used to provide training data to train such a neural network. FIG. 21A provides an overall depiction of the manner in which training data may be provided, FIG. 21B depicts aspects of preparing the neural network for training, and FIG. 21C depicts aspects of the performance of such training. For sake of simplicity of reference and understanding, the same example job flows and components thereof that were introduced in FIGS. 20A-C are used again in this example of training a neural network to perform an analytical function.

FIG. 21A depicts the provision of training data for use in training a single neural network 2571 implemented either by one or more of the neuromorphic devices 2570, or by one or more of the task routines 2440t, to perform the analytical function already being performed in a non-neuromorphic manner in performances of the job flow 2200x. More specifically, the neural network 2571 is trained using training data made up of matched sets of inputs (e.g., the depicted data set(s) 2330t) and outputs (e.g., the depicted corresponding result report(s) 2770t) of the analytical function to enable the neural network 2571 to learn the analytical function through inference in a manner often referred to as "supervised learning." Stated differently, the neural network 2571 is presented with many example sets of input data and corresponding example sets output data generated by an existing implementation of the analytical function that is known to function correctly (e.g., the job flow 2200x) to enable the neural network 2571 to learn to perform the analytical function from those example sets.

Such training of a neural network from such training data is often referred to as creating the "decision space" that defines what response the neural network is to provide to each possible input. However, as those skilled in the art will readily recognize, a neural network that is trained in such a manner usually performs the function it was trained to perform with some degree of inaccuracy. At least in theory, a neural network could be trained to perform a function perfectly if it is trained with training data that includes every possible combination of inputs and outputs, thereby completely filling the decision space. However, the quantity of every possible combination of inputs and outputs may simply be so large that it is simply not be possible or practical to perform such comprehensive training. Thus, the use of a neural network to perform a particular function usually requires an acceptance that training cannot include every possible combination of inputs and outputs such that not every point within the decision space is filled, and thus, there will be some degree of inaccuracy in the performance of the particular function, at least where an input is encountered for which no corresponding output was provided in the training data.

Since training to a degree that begets a perfectly performing neuromorphic implementation of a function may not be possible or practical, efforts are often made to minimize the degree of inaccuracy. One approach to minimizing inaccuracy may be to use training data that includes a large enough quantity of matched sets of inputs and outputs that are sufficiently varied as achieve coverage of the decision space that is thorough and dense enough to at least minimize occurrences of relatively large regions within the decision space that are not covered by any matched set of inputs and outputs in the training data. Though not specifically depicted in FIG. 21A, an approach to obtaining such large and thorough amount of training data may be randomly generating the flow input data set 2330$t$ to include a relatively large number of widely varied sets of input values, and then providing each set of input values of the input data set 2330$t$ as an input to a performance of the job flow 2200$x$ to generate a corresponding set of output values in as part of a result report 2770$t$ that corresponds to the input data set 2330$t$. Together, the input data set 2330$t$ and corresponding result report 2770$t$ would become the neural network training data 2779$t$. However, it should be noted that, depending on the nature of the function being performed, there may be one or more sets or ranges of sets of input values that may be theoretically possible, but which are not expected to ever actually be encountered during actual use of the analytical function. Thus, there may be one or more regions in the decision space that need not be covered by the neural network training data 2779$t$ as doing so may be deemed to be pointless.

As an approach to minimizing inaccuracy while also avoiding generating the neural network training data 2779$t$ to cover situations that are never expected to be encountered during actual use, the neural network training data 2779$t$ may be generated from sets of input values actually encountered during past actual use of the non-neuromorphic implementation of the analytical function, along with corresponding sets of output values that are generated by that non-neuromorphic implementation from those sets of input values. More specifically, and as depicted in FIG. 21A, a subset of the sets of input values of one or more of the data sets 2330$x$ and the corresponding subset of the sets of output values of the corresponding one or more result reports 2770$x$ may be used to form the data set 2330$t$ and corresponding result report 2770$t$, respectively, of neural network training data 2779$t$.

Regardless of the exact manner in which the data set 2330$t$ and the result report 2770$t$ are generated to form the neural network training data 2779$t$ for the training of the neural network 2571, the training of the neural network 2571 may entail the performance of another job flow in which the neural network 2571 is instantiated and placed into a training mode, followed by the use of corresponding sets of input and output values of the data set 2330$t$ and of the result report 2770$t$, respectively, to train the neural network 2571. FIG. 21B depicts aspects of such preparations for training the neural network 2571. Specifically, the neural network 2571 may be instantiated with an initial form of neural network configuration data 2371$i$ that may include at least one set of hyperparameters that define structural aspects of the neural network 2571, as well as various initial parameter values that at least place the neural network 2571 in a known initial state in preparation for training. Such a known initial state may include initial parameters for storage and use by each memristor 2578 within each artificial neuron 2577 that is to be included in the neural network 2571.

FIG. 21C depicts aspects of the training of the neural network 2571 following such preparations. More specifically, the data set 2330$t$ is presented, one set of input values at a time, to the inputs 2572$i$ while corresponding ones of the sets of output values of the result report 2770$t$ are presented, one set of output values at a time, to the outputs 2572$o$. As previously discussed, the neural network 2571 may be defined as a multi-layer feedforward ANN in which information flows generally in a single direction therethrough from the inputs 2572$i$ and the input layer 2573$i$ toward the output layer 2573$o$ and the outputs 2572$o$ during use of the neural network 2571. However, during training of the neural network 2571, as depicted, the outputs 2572$o$ serve as additional inputs and information associated with the result report 2770$t$ also flows in the reverse direction from the outputs 2572$o$ and the output layer 2573$o$ toward the input layer 2573$i$ in a part of the neural network training often referred to as "backpropagation."

Following such training of the neural network 2571, a trained form of the neural network configuration data 2371$t$ may be retrieved from the neural network 2571 and stored in a federated area 2566 as (or as part of) the mid-flow data set 2370$t$. The neural network configuration data 2371$t$ defines the neural network 2571 as trained. In addition to a set of hyperparameters that define structural aspects of the neural network 2571 as trained, the neural network configuration data 2371$t$ may include various trained parameters such as weighting and/or bias values, and/or indications of type, magnitude, duration and/or frequency of signals that trigger the activation or firing each artificial neuron 2577 of the neural network 2571, as trained. As also previously discussed, such storage of the neural network configuration data 2371$t$ within a federated area 2566 as (or as part of) the mid-flow data set 2370$t$ may serve to ensure it remains available for subsequent use in performing the analytical function using neuromorphic processing.

Figure 22A:
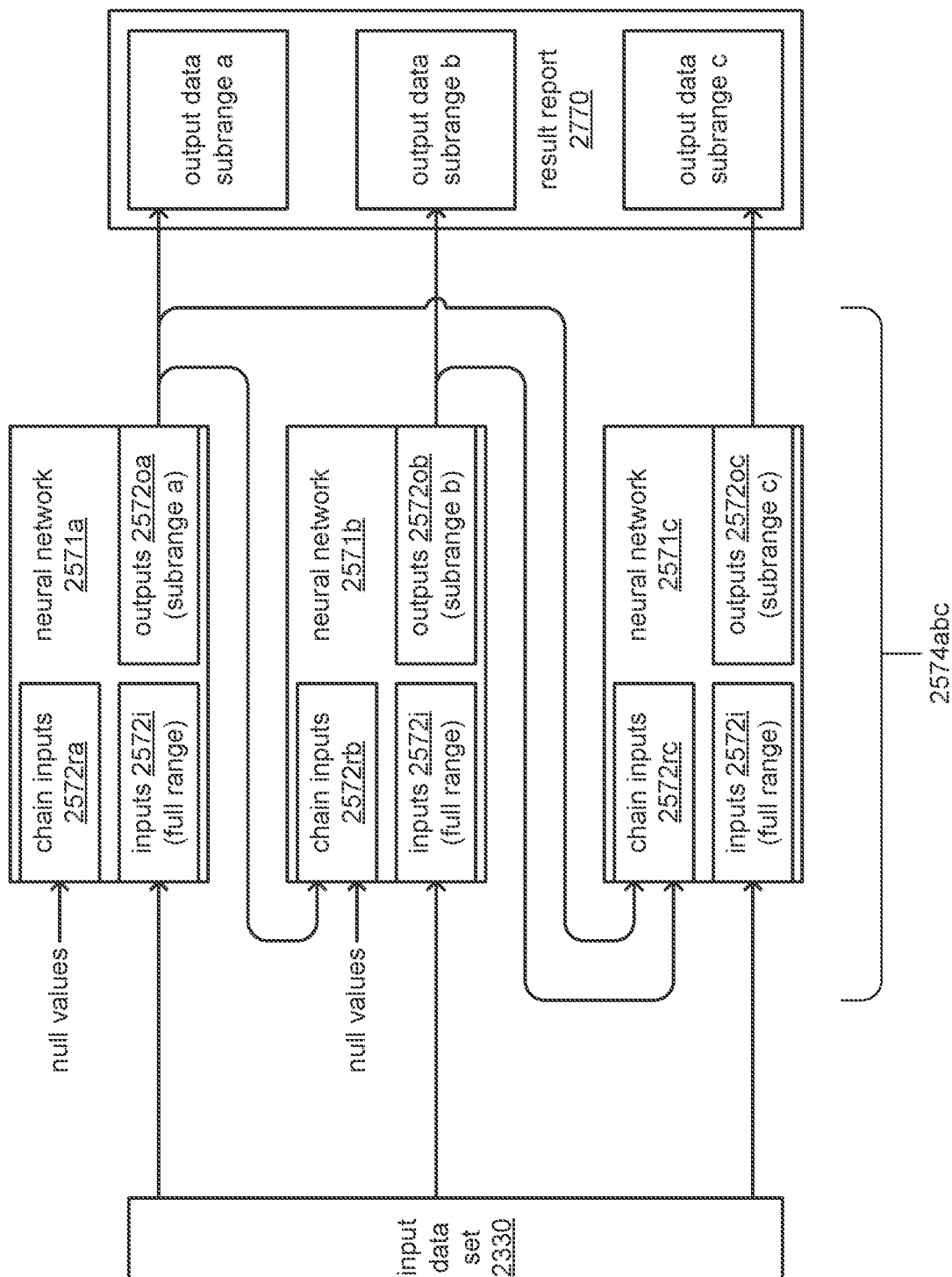
FIGS. 22A, 22B, 22C, 22D, 22E and 22F, together, illustrate an example of training a chain of neural networks to perform an analytical function as part of a transition to neuromorphic processing.
Figure 22B:
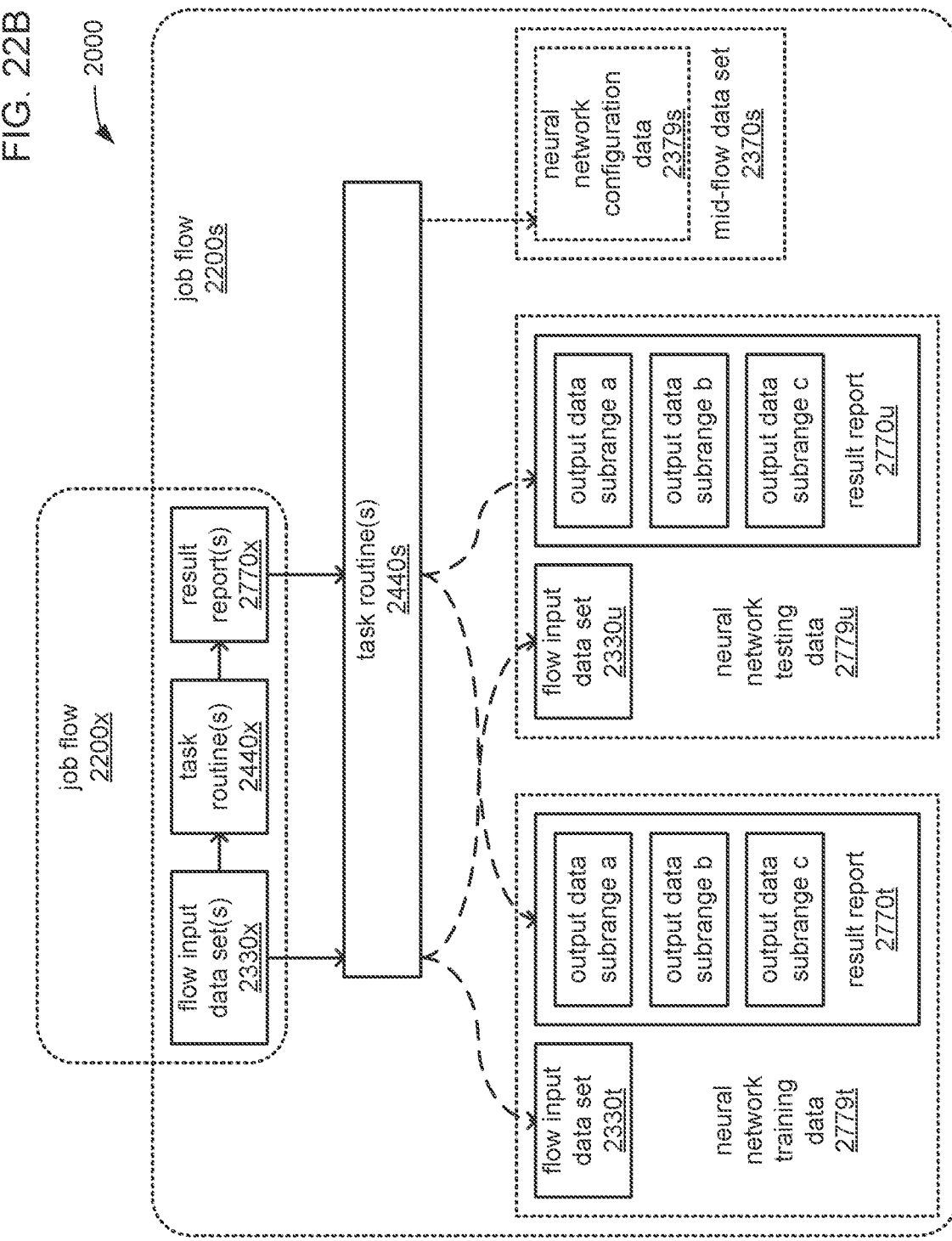
Figure 22C:
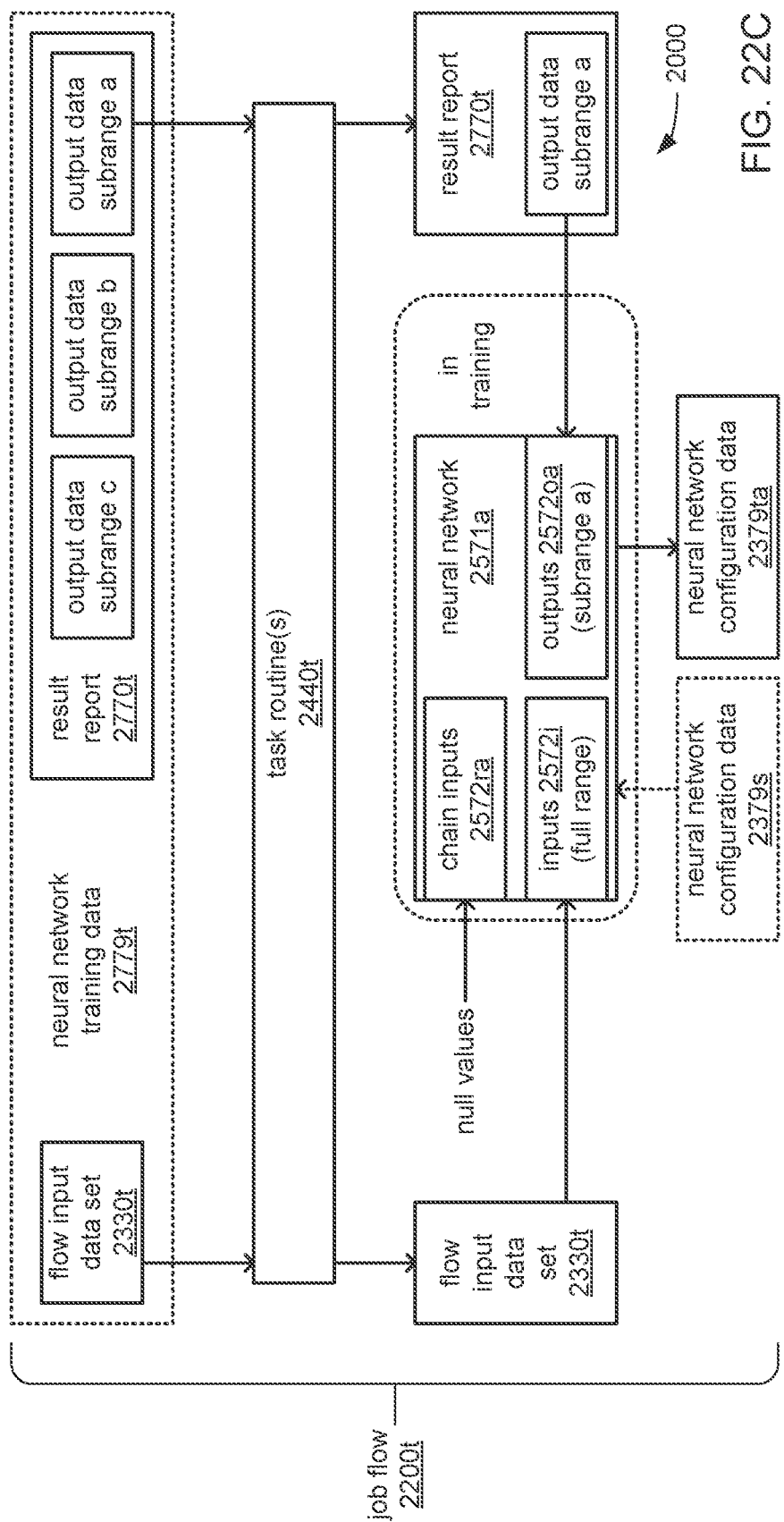
Figure 22D:
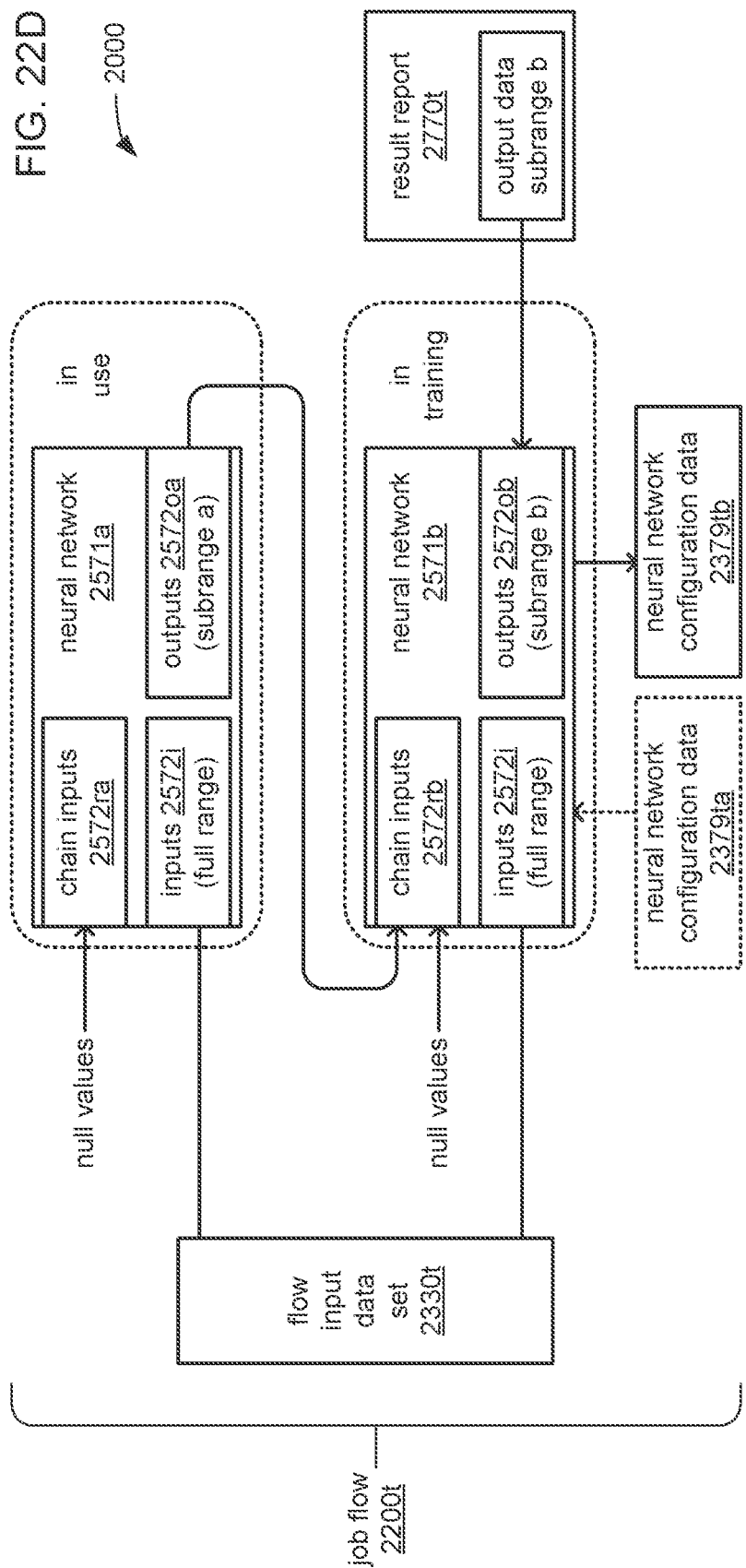
Figure 22E:
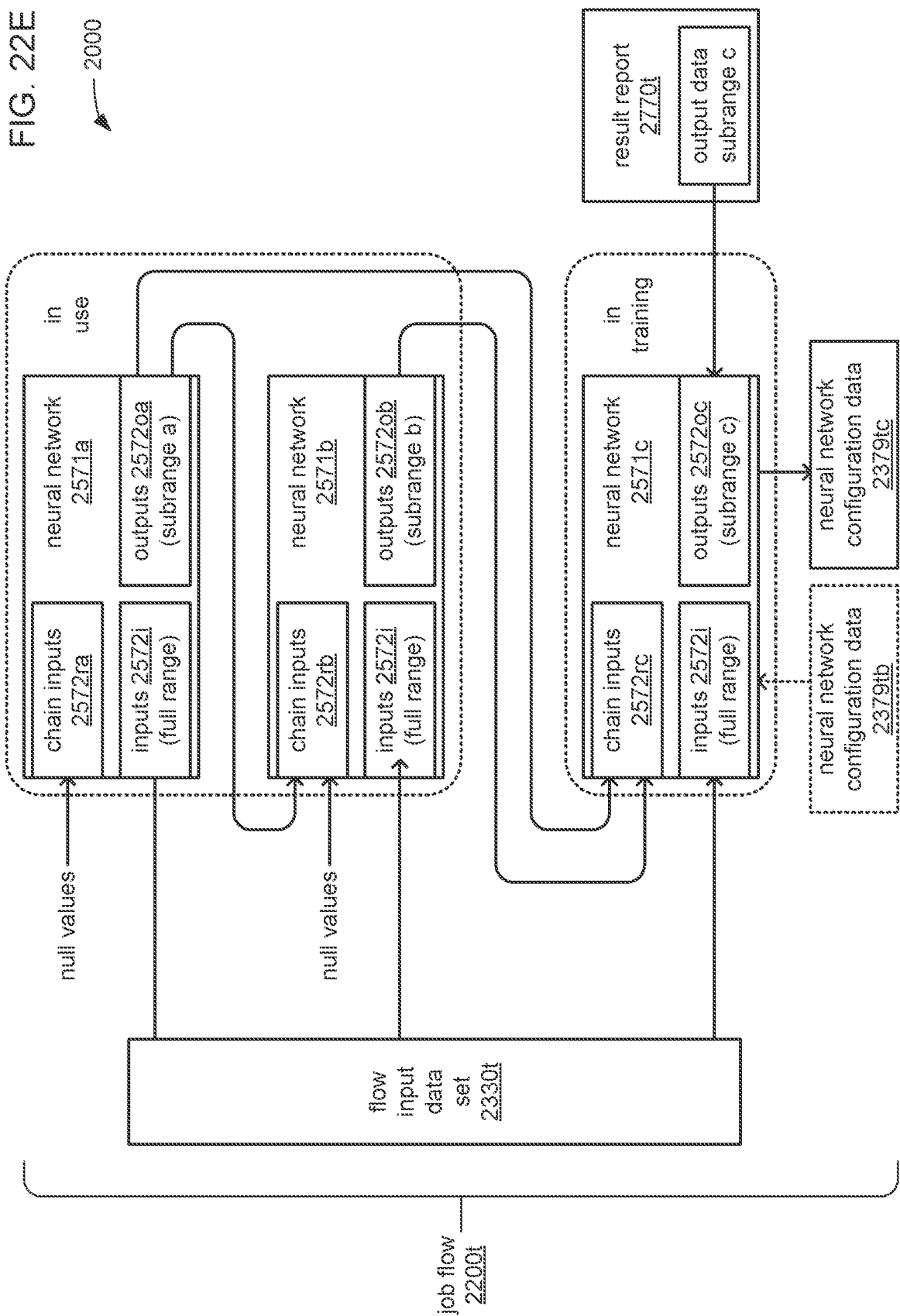
Figure 22F:
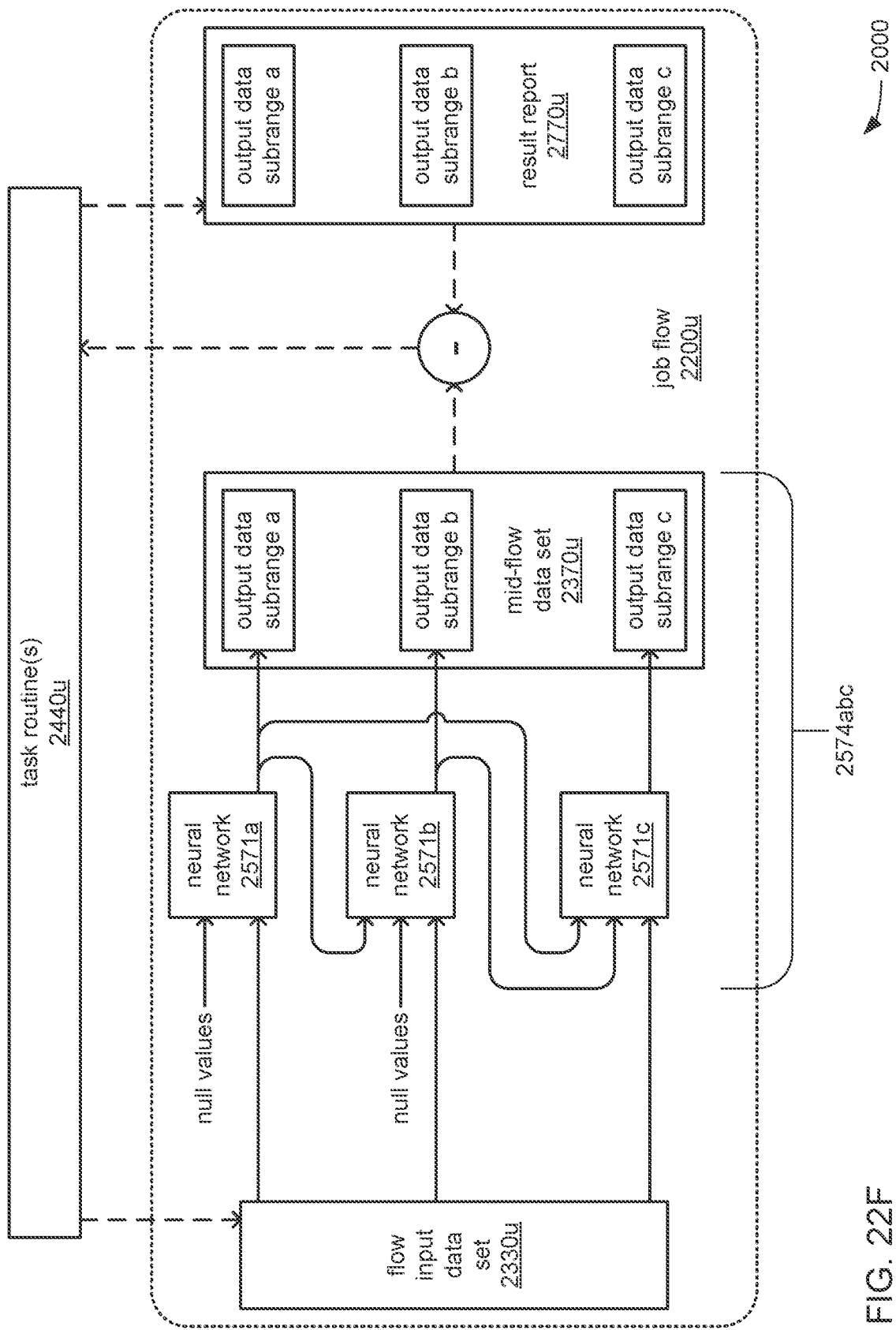

FIGS. 22A, 22B, 22C, 22D, 22E and 22F, together, illustrate aspects of training, testing and usage of a multi-link chain of neural network to generate time series predictions. FIG. 22A depicts aspects of a deliberately simple example of such a neural network chain. FIG. 22B depicts aspects of generating training and testing data from data objects associated with past time series predictions made using a non-neuromorphic job flow. FIGS. 22C-E, together, depict aspects of sequentially training the neural networks of the neural network chain for use in generating time series predictions. FIG. 22F depicts aspects of testing the neural network chain following the training.

FIG. 22A depicts an example ensemble of neural networks in the form of a multi-link neural network chain 2574$abc$ formed from three neural networks 2571$a$ through 2571$c$, and which is to be used in making time series predictions. As depicted, the neural networks 2571$a$-$c$ are ordered with the neural network 2571$a$ at the head of the chain 2574$abc$ (i.e., as the first neural network), with the neural network 2571$b$ as the next neural network, and with the neural network 2571$c$ at the tail of the chain 2574$abc$ (i.e., at the last neural network).

As will shortly be explained, the neural networks 2571$a$-$c$ may be trained sequentially as part of a form of transferred learning in which instances of neural network configuration data that includes trained parameters is transferred from one of these neural networks to another. To enable such transferred learning, each of the neural networks 2571$a$-$c$ may be required to have identical quantities of inputs and outputs, as well as having identical quantities of artificial neurons, layers of neural, connections between layers and/or other aspects as may be defined by hyperparameters that must be identical across all of the neural network 2571$a$-$c$. Thus, as depicted, and as will shortly be described in greater detail, subsets of the inputs of all of these neural networks, except the last neural network in the chain (i.e., the neural network 2571c) may be provided with null value inputs during training, testing and use.

Although, at least theoretically, a single larger neural network could be used to make a time series prediction, it may be that the range of time to be covered by the time series prediction may be sufficiently long that the size of the resulting decision space that corresponds to the necessary quantities of both inputs and outputs becomes prohibitively large. Also, the resulting quantity of artificial neurons and/or the quantity of layers of artificial neurons required to sufficiently cover such a large decision space while generating time series predictions with sufficient accuracy may require a prohibitively long amount of time for training. Replacing such a single larger neural network with a chain of smaller neural networks (e.g., the depicted example neural network chain 2574abc) may avoid the creation of such a prohibitively large neural network and/or may reduce the overall amount of time required for neural network training.

As part of replacing a single larger neural network with a chain of multiple smaller neural networks, the single large decision space that would have been associated with that single larger neural network must be replaced with a set of smaller decision spaces (each of which is associated with one of the multiple smaller neural networks) that still covers enough of a subset of that single large decision space as to enable time series predictions to be made with the desired degree of accuracy. Thus, as part of replacing that single larger neural network with a chain of multiple smaller neural networks, determinations may need to be made as to how many smaller decision spaces and what size each of those smaller decisions spaces needs to be. As will be familiar to those skilled in the art, this may correlate to making determinations of how many smaller neural networks are to be used and what subranges of the overall full range of time should be covered by each of those smaller neural networks. Stated more simply, as part of replacing that single larger neural network with a chain of smaller neural networks, determinations must be made as how to divide the overall full range of time to be covered by a time prediction into multiple subranges.

In some embodiments, the quantity of subranges into which the overall full range of time is divided and/or the amounts of time included in each subrange may be derived through a trial and error process. By way of example, it may be that the full range of time to be covered by a time prediction to be made by the neural network chain 2574abc is 24 months with each output 2572o that is be generated corresponding to one of those 24 months. It may be that a trial and error process is then begun in which a minimum quantity of neural networks is deemed desirable, and so such a minimal quantity may be determined based on the maximum quantity of artificial neurons and/or layers thereof that are able to be supported within a single neural network, and the result of such constraints may be the depicted set of three neural networks 2571a-c as at least the initial quantity of neural networks to be tried. Also, at least as an initial division of the full range of time into subranges, the full range of time may be divided into three subranges that each cover an equal amount of time such that each of the three neural networks 2571a-c is to be associated with a period of time of eight months, and each is to have eight outputs of the overall quantity of 24 outputs to cover the overall full range of time of 24 months. With such an initial configuration of the neural network chain 2574abc arrived at, training and testing may then be used to determine whether that initial configuration is able to achieve the desired degree of accuracy in generating time series predictions, or whether testing will reveal that one or more other configurations must be tried. Such other configurations may differ from this initial configuration by changing the quantity of neural networks and/or by changing the amounts of time covered by each of the subranges of time into which the overall full range of time is divided. For example, other configurations of three neural networks (e.g., the depicted neural networks 2571a-c) may be tried in which the subranges are defined to have various different combinations of unequal quantities of months.

An aspect of generating time series predictions that has been observed is that a portion of a prediction associated with a temporally earlier time within a time tends to have some degree of influence over what is predicted in another portion of the prediction associated with a temporally later time. Stated differently, for many subjects for which time series predictions may be made, earlier events that are predicted in a time series often have a cause-and-effect influence on later events that are predicted in the same time series. It is this aspect of generating time series predictions that lends validity to replacing a single larger neural network that covers the full range of time of a time series prediction with multiple neural networks organized into a chain in which each successive neural network receives the outputs of the preceding neural networks within the chain. Thus, it should be noted that, in ordering the neural networks 2571a-c within the neural network chain 2574abc, the neural network 2571a at the head of the chain is associated with the subrange of time that is temporally earliest within the overall range of time for a time series prediction. Therefore, in continuing with the aforedescribed example of the neural network chain 2571a-c being employed to make a time series prediction that covers an overall range of time of 24 months, the subrange of time to be covered by the outputs 2572oa of the neural network 2571a would be the subrange covering the earliest months. In turn, the outputs 2572ob of the neural network 2571b (which follows the neural network 2571a in the ordering of neural networks within the chain 2574abc) would cover the subrange of time that includes the months following those earliest months. And in turn, the outputs 2572oc of the neural network 2571c (which is the last neural network at the tail of the chain) would cover the subrange of time that includes the latest months.

Therefore, and as depicted, each of the neural networks 2571a-c incorporates an identical quantity of inputs 2572i to enable each of the neural networks 2571a-c to receive the same sets of values from the depicted input data set 2330. Also, the outputs 2572oa through 2572oc of the neural networks 2571a through 2571c, respectively, provides a portion of the outputs that cover its corresponding subrange of time within the overall full range of time to be covered by the time series prediction to be made by the neural network chain 2574abc and stored as the depicted result report 2770. Further, each of the neural networks 2571a through 2571c incorporates chain inputs 2572ra through 2572rc by which all of these neural networks, except for the neural network 2571a at the head of the chain 2574abc, receive the outputs of the preceding neural network(s) in the chain 2574abc. More specifically, the outputs 2572oa of the neural network 2571a are relayed to the chain inputs 2572rb of the neural network 2571b. Also, the outputs 2572oa and 2572ob of the neural networks 2571a and 2571b, respectively, are both relayed to the chain inputs 2572rc of the neural network 2571c. In this way the portion of the time series prediction output by the neural network 2571a for the earliest subrange of time (i.e., subrange a) is provided to both of the neural networks 2571b and 2571c for use in generating their respective portions of the time series prediction. Also in this way, the portion of the time series prediction output by the neural network 2571b for the subrange of time following subrange a (i.e., subrange b) is provided to the neural network 2571c for use in generating its portion of the time series prediction for the last subrange of time (i.e., subrange c).

Again, the quantities of inputs of each of the neural networks 2571a-c may be required to be identical. Therefore, and as depicted, the chain inputs 2572ra of the neural network 2571a may all be provided with null input values, since the neural network 2571a at the head of the chain 2574abc has no outputs relayed to it for use as inputs from any other neural network. Also, although a subset of chain inputs 2572rb of the neural network 2571b may have the outputs 2572oa of the neural network 2571a relayed to them, others of the chain inputs 2572rb may receive no outputs from any other neural network. Therefore, as depicted, a subset of the chain inputs 2572rb of the neural network 2571b may also be provided with null input values.

Turning to FIG. 22B, the generation of the neural network training data 2779t and the neural network testing data 2779u may be very much like what was described above in reference to FIG. 21A for a single neural network 2571. A matched pair of a flow input data set 2330x and a corresponding result report 2770x may be created through performances of a non-neuromorphic job flow 2200x by which time series predictions are made based on the flow input data set 2330x and stored as the result report 2770x. Subsequently, in a performance of a job flow 2200s, the neural network training data 2779t and the neural network testing data 2779u may then be generated from the matched pair of the flow input data set 2330x and the result report 2770x. However, unlike what was described in connection with FIG. 21A, the sets of values within the result reports 2770t and 2770u of the neural network training data 2779t and the neural network testing data 2779u, respectively, may be subdivided into data values corresponding to the subranges of time into which an overall full range of time for time series predictions has been subdivided. More specifically, and as depicted, the data values within each of the result reports 2770t and 2770u may be subdivided into output data subranges a through c that correspond to the subranges a through c of time that are to be covered by the portions of a time prediction to be generated by each of the neural networks 2571a through 2571c, respectively.

Turning to FIG. 22C, the training of the neural networks 2571a-c of the neural network chain 2574abc may begin with the training of the neural network 2571a as part of a performance of a training job flow 2440t. In a manner similar to what was described in reference to FIGS. 21B-C for the training of a single neural network 2571, backpropagation may be used in training the neural network 2571a, with the neural network 2571a being provided with at least hyperparameter settings via a neural network configuration data 2379s to provide a specification of a quantity of artificial neurons, a quantity of layers of artificial neurons, etc. The neural network configuration data 2379s may also include initial parameters for weights, biases, etc. to provide a known starting point for the training of the neural network 2571a.

As has been discussed, in performing such training of the neural network 2571a, in view of it being the neural network at the head of the neural network chain 2574abc, the chain inputs 2572ra may be provided with null data values. Also, while the inputs 2572i of the neural network 2571a are provided with full sets of data values of the flow input data set 2330t, the outputs 2572oa may be provided with just the data values within the result report 2770t that are associated with the subrange a of time to be covered by the neural network 2571a.

Following the training of neural network 2571a, a neural network configuration data 2379ta may be retrieved from the neural network 2571a. In addition to specifying the same hyperparameters originally specified by the neural network configuration data 2379s, the neural network configuration data 2379ta may also include indications of the weights, biases and/or other trained parameters that represent what the neural network 2571a has learned about generating the portion of a time series prediction that includes the earliest subrange out of the full range of time thereof.

Turning to FIG. 22D, as with the training of the neural network 2571a, the training of the neural network 2571b may entail the use of backpropagation by the training job flow 2440t. As part of using transferred learning in which the neural network 2571b is to be given at least some of the benefit of what the neural network 2571a learned during its training, the neural network 2571b may be provided with the neural network configuration data 2379ta. In this way, the neural network 2571b is provided with the hyperparameters and the trained parameters of the neural network 2571a as its starting point, thereby reducing the amount of time required to train the neural network 2571b to participate in the generation of time series predictions with the desired degree of accuracy. As a result, and as previously discussed, the fact that such hyperparameters as a quantity of artificial neurons, a quantity of layers of artificial neurons, etc. are shared in this way among the neural networks 2571a-c of the neural network chain 2574abc, each of the neural networks 2571a through 2571c may be required to incorporate the same quantities of inputs and outputs, even though only the neural network at the tail of such a chain may actually have all of its inputs utilized such that none are provided with null data values.

As a result of the fact that the neural network 2571b is to receive the outputs 2572oa of the neural network 2571a, the training of the neural network 2571b must entail the receipt of those same outputs 2572oa as inputs in addition to receiving the full sets of data values of the flow input data 2330t at the inputs 2572i of the neural network 2571b. Therefore, during the training of the neural network 2571b, the neural network 2571a must be operated as if it were in actual use so as to be caused to generate portions of time series predictions that cover the subrange a, and to provide such portions of time series predictions at its outputs 2572oa for being relayed to a subset of the chain inputs 2572rb of the neural network 2571b. However, as a result of not being the last neural network at the tail of the neural network chain 2574abc, the others of the chain inputs 2572rb may be provided with null data values.

Following the training of neural network 2571b, a neural network configuration data 2379tb may be retrieved from the neural network 2571b. In addition to specifying the same hyperparameters originally specified for both the neural networks 2571a and 2571b by the neural network configuration data 2379s and 2379ta, the neural network configuration data 2379tb may also include indications of the weights, biases and/or other trained parameters that represent what the neural network 2571b has learned about generating the portion of a time series prediction that includes the subrange b out of the full range of time thereof.

Turning to FIG. 22E, as with the training of the neural networks 2571a and 2571b, the training of the neural network 2571c may entail the use of backpropagation by the training job flow 2440t. Continuing with the use of transferred learning in which the neural network 2571c is to be given at least some of the benefit of what the neural networks 2571a and 2571b learned during their trainings, the neural network 2571c may be provided with the neural network configuration data 2379tb. In this way, the neural network 2571b is provided with the hyperparameters and the trained parameters of the neural network 2571b as its starting point, thereby reducing the amount of time required to train the neural network 2571c to participate in the generation of time series predictions with the desired degree of accuracy. Again, as a result, each of the neural networks 2571a through 2571c may be required to incorporate the same quantities of inputs and outputs, even though only the neural network at the tail of such a chain (i.e., the neural network 2571c) may actually have all of its inputs utilized such that none are provided with null data values.

As a result of the fact that the neural network 2571c is to receive the outputs 2572oa of the neural network 2571a and the outputs 2572ob of the neural network 2571b, the training of the neural network 2571c must entail the receipt of those same outputs 2572oa and 2572ob as inputs in addition to receiving the full sets of data values of the flow input data 2330t at the inputs 2572i of the neural network 2571c. Therefore, during the training of the neural network 2571c, both of the neural networks 2571a and 2571b must be operated as if they were both in actual use so as to be caused to generate portions of time series predictions that cover the subranges a and b, and to provide such portions of time series predictions at their outputs 2572oa and 2572ob, respectively, for being relayed to the chain inputs 2572rc of the neural network 2571c. In so doing, to enable the neural network 2571b to generate such subrange b portions of time series predictions, the subrange a portions of time series predictions generated by the neural network 2571a must be provided to a subset of the chain inputs 2572rb of the neural network 2571b, just as would normally be done during actual use.

Following the training of neural network 2571c, a neural network configuration data 2379tc may be retrieved from the neural network 2571c, and all three of the neural network configuration data 2379ta, 2379tb and 2379tc may be stored within a single mid-flow data object 2370t. In addition to specifying the same hyperparameters originally specified for all three of the neural networks 2571a, 2571b and 2571c by the neural network configuration data 2379s, 2379ta and 2379tb, the neural network configuration data 2379tc may also include indications of the weights, biases and/or other trained parameters that represent what the neural network 2571c has learned about generating the portion of a time series prediction that includes the subrange c out of the full range of time thereof.

Turning to FIG. 22F, following the sequential training of the neural networks 2571a-c, as described above, the now trained neural network chain 2574abc may be tested in performance(s) of a testing job flow 2440u. In so doing, full sets of values of the flow input data set 2330u from the neural network testing data 2779u may be provided to all three of the neural networks 2571a-c, and for each such set of values, each of the neural networks 2571a-c may generate output data for a corresponding one of the subranges a-c. As depicted, those outputs may be stored as a mid-flow data set 2370u, and then compared to the corresponding values within the result report 2770u for each of the subranges a-c, with any differences that are found being analyzed to determine whether the neural network chain 2574abc generates time series predictions with a desired accuracy such that it may be made available for use.

Figure 23A:
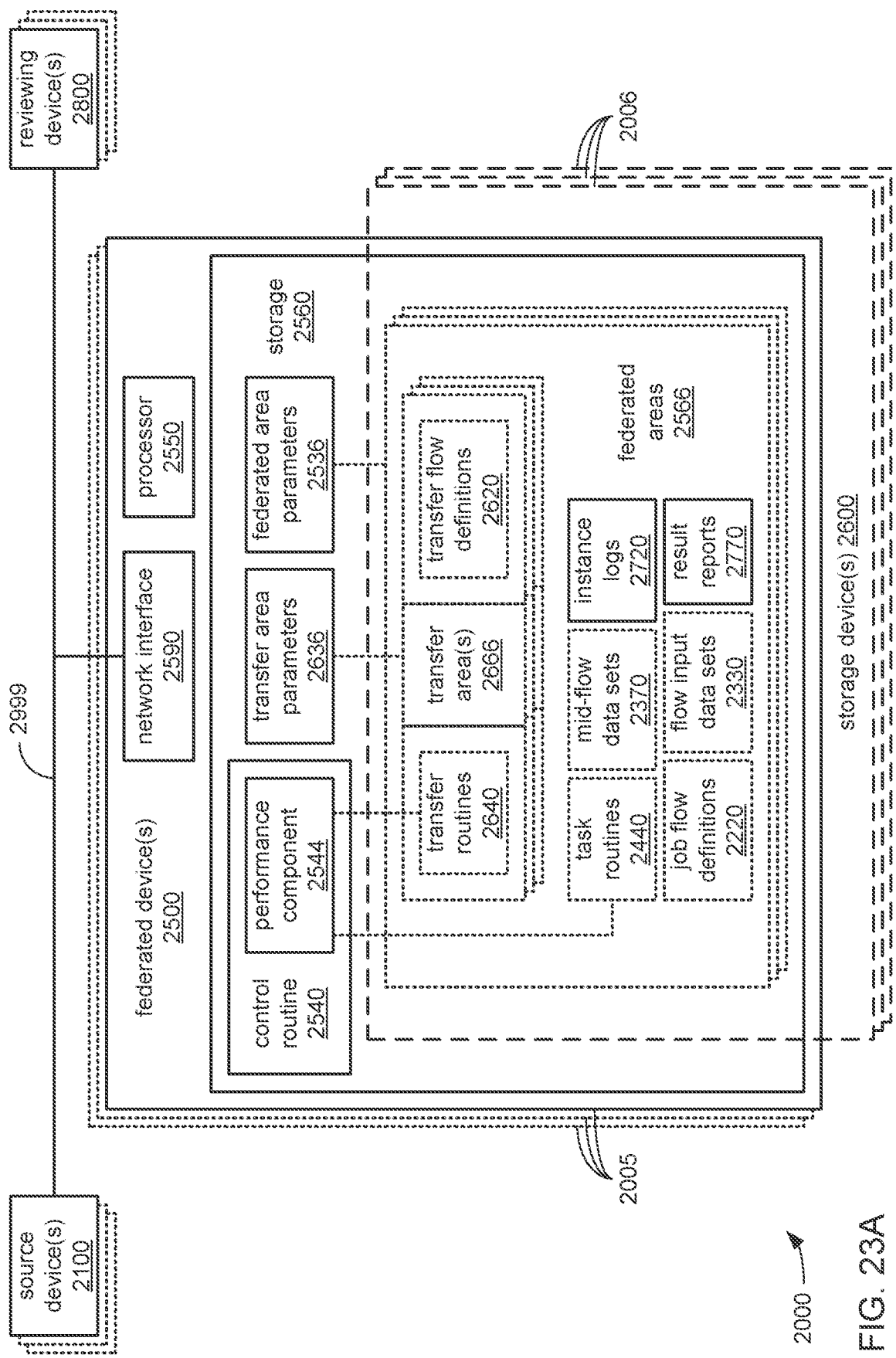
FIGS. 23A, 23B and 23C, together, illustrate an example formation of a transfer area.
Figure 23B:
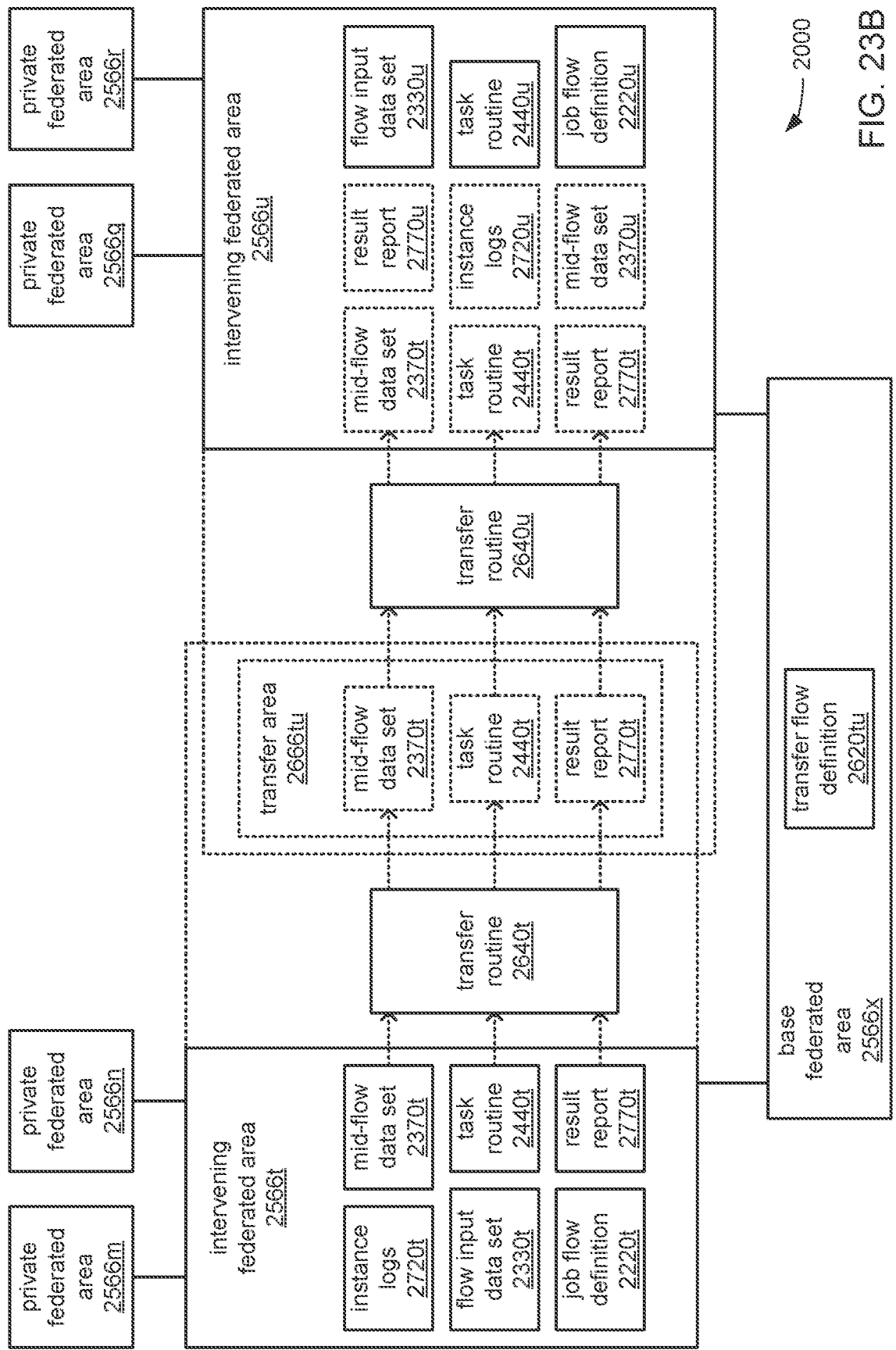
Figure 23C:
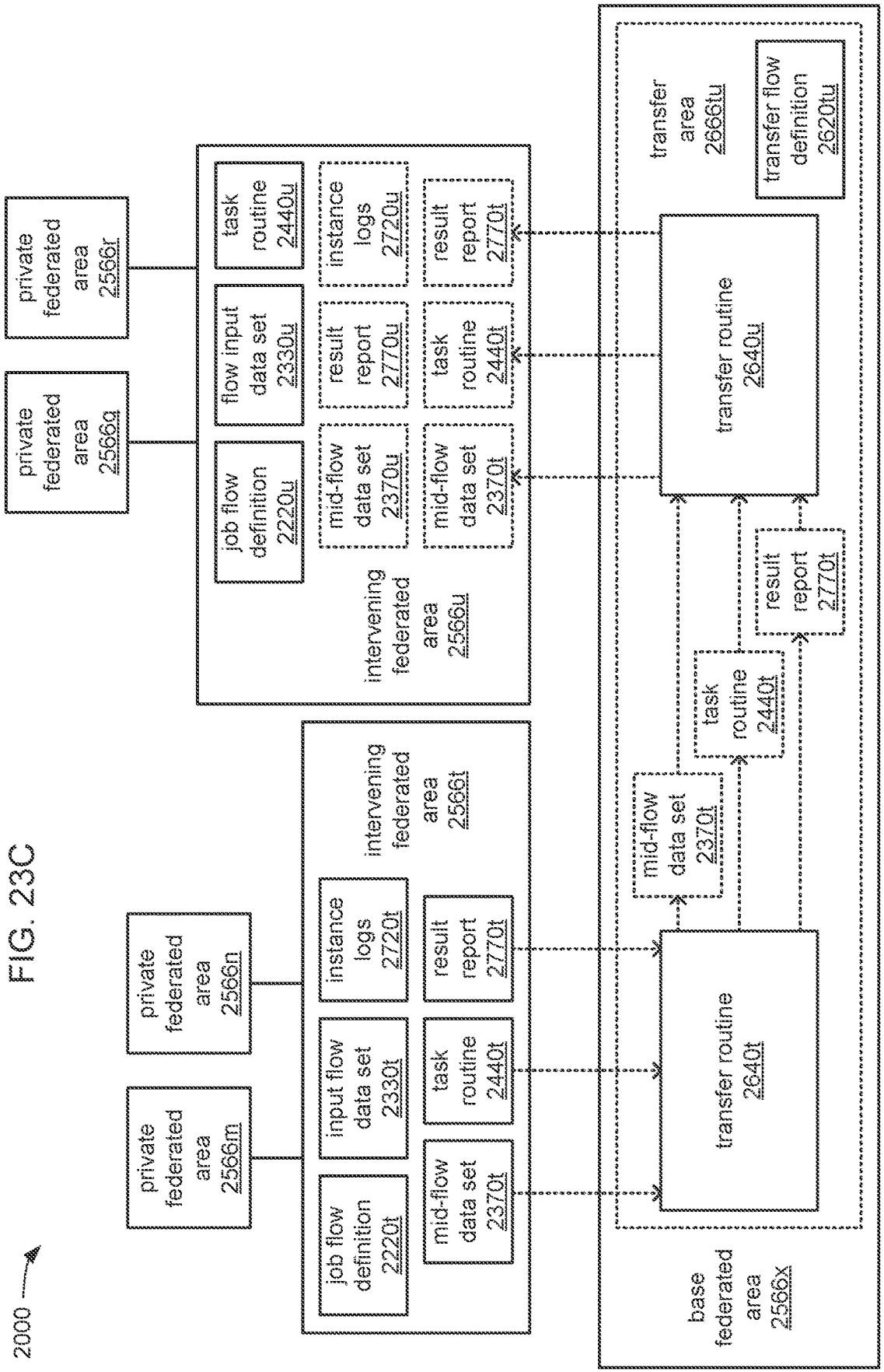

FIGS. 23A, 23B and 23C, together, illustrate aspects of an automated transfer relationship that may be put in place between two or more federated areas 2566 in which one or more objects may be automatically copied from one federated area to another through a transfer area 2666 in response to a specified condition being met. FIG. 23A depicts aspects of the configuration of transfer areas 2666 and corresponding automated transfers of copies of objects, FIG. 23B depicts an example of generating a transfer area 2666 as overlapping portions of two federated areas 2566 involved in such transfers, and FIG. 23C depicts an example of generating a transfer area 2666 within a base federated area from which each of the two federated areas 2566 involved in such transfers branch.

Unlike the earlier described inheritance, priority and dependency relationships that each extend among two or more federated areas 2566 along a pathway within a single hierarchy of levels of access restriction of federated areas, either within a linear hierarchy (as introduced in FIG. 15A) or within a branch of a hierarchical tree (as introduced in FIG. 15B), the automated transfer relationship in which copies of one or more objects are automatically transferred from one federated area 2566 to another may be put in place among two or more federated areas 2566 that are within different branches of a hierarchical tree. Therefore, unlike the earlier described inheritance, priority and dependency relationships that must follow such hierarchical pathways, the automated transfer relationship is not restricted to following such pathways. This enables one or more automated transfer relationships to be put in place within a hierarchical tree on a temporary basis for only so long as they are needed. Stated differently, while the inheritance, priority and dependency relationships are tied to the structure of a hierarchy formed among multiple federated areas such that making changes to such relationships may necessarily be coordinated changes in pathways within hierarchical structures, the automated transfer relationships can be put in place, modified and/or removed without regard to such pathways.

There may be any of a variety of scenarios that serve as the basis for putting in place such a automated transfer relationship. By way of example users and/or groups of users associated with private and/or intervening federated areas 2566 within different branches of a hierarchical tree may choose to collaborate on the development of one or more objects as part of a larger project or other undertaking where, otherwise, these users and/or groups of users would normally have little or no need to share objects thereamong beyond the reusing of objects that may be stored within the single base federated area 2566 from which each of their private and/or intervening federated areas 2566 branch. As such a collaboration may be temporary in nature such that it may cease when the goal of the collaboration is achieved, the automated transfer relationship that is created among such users may be caused to exist only for the duration of that collaboration.

Turning to FIG. 23A, as depicted there may be one or multiple transfer areas 2666 created among multiple federated areas 2566 to implement one or more automated transfer relationships thereamong. More specifically, within a single hierarchical tree of federated areas 2566, there may be multiple transfer areas 2666 that each serve to transfer copies of objects from one federated area to another. As will be discussed in greater detail, a single transfer relationship may involve the use of a single transfer area 2666 to support the automated transfer of copies of objects from one federated area to another. However, it may also be that a single transfer relationship may extend among a chain of more than two federated areas, and therefore, may include multiple transfer areas 2666 to support automated transfers of copies of objects from one federated area to another, and then to another, and so on, along such a chain.

Many of the characteristics of a transfer relationship may be defined by a corresponding transfer flow definition 2620 that may function in many ways that are similar to the earlier discussed job flow definitions 2220. More specifically, as with the performance of a job flow 2200 of a job flow definition 2220 through execution of one or more selected task routines 2440 by one or more processors 2550 under the control of the performance component 2544, a transfer relationship may be similarly defined by a transfer flow definition 2620 to include the execution of one or more transfer routines 2640 by the one or more processors 2550 under the control of the performance component 2544. Each transfer flow definition 2620 may identify the specific two or more federated areas 2566 among which the corresponding automated transfer relationship is to be put in place, and may specify the order and/or direction(s) of the automated transfers among those specified federated areas 2566. Each transfer flow definition 2620 may also identify each of the transfer routines 2640 that may be stored and executed within each of the specified federated areas 2566 to repeatedly check for when a specified condition to trigger a transfer has been met, and to then perform at least part of an automated transfer from one of the specified federated areas 2566 to another through a specified transfer area 2666. Such a condition may be specified within the transfer flow definition 2620 or may be specified within the transfer routine 2640 that is executed to repeatedly check for whether that condition has been met.

Indications of what transfer relationships are in place may be maintained by the one or more federated devices 2500 as part of transfer area parameters 2636. The processor(s) 2550 of the one or more federated devices 2500 may update the transfer area parameters 2636 as each transfer relationship is put in place and/or is removed.

Turning to FIG. 23B, as depicted, a relatively simple transfer relationship between two intervening federated areas 2566t and 2566u within a hierarchical tree of federated areas may be put in place with a corresponding single transfer area 2666tu being formed where portions of the two federated areas 2566t and 2566u overlap. More precisely, in setting up the depicted transfer relationship between the federated areas 2566t and 2566u, the processor(s) 2550 of the one or more federated devices 2500 may be caused (e.g., by the federated area component 2546) to manipulate the locations of one or both of the federated areas 2566t and 2566u to form a storage area at which portions of both federated areas 2566t and 2566u overlap, which may then be defined as the transfer area 2666tu.

Also as part of putting in place the depicted transfer relationship, a transfer routine 2640t may be stored within the intervening federated area 2566t, and a transfer routine 2640u may be stored within the intervening federated area 2566u. Further, the transfer flow definition 2620tu may be stored within the base federated area 2566x at which it may be made accessible from both of the federated areas 2566t and 2566u through use of inheritance relationships. Alternatively, the transfer flow definition 2620tu may be stored within a portion of the storage area at which portions of the federated areas 2566t and 2566u overlap, either alongside or within the transfer area 2666tu.

As has been discussed, processor(s) 2550 of the one or more federated devices 2500 may be caused by the performance component 2544 to execute one or more task routines 2440 within each federated area 2566 in response to requests to perform the tasks defined in various job flows 2200 by corresponding job flow definitions 2220. As a job flow 2200 is so performed within a federated area 2566, a transfer routine 2640 of an automated transfer relationship that includes that federated area 2566 may also be executed to determine if the performance of that job flow 2200 has caused a specified condition to be met that triggers the transfer of a copy of one or more objects from that federated area 2566 to another federated area 2566 through a corresponding transfer area 2666. More specifically, and by way of the example presented in FIG. 21B, at a time when the depicted task routine 2440t is executed within the intervening federated area 2566t as part of performing a job flow defined by the depicted job flow definition 2220t, the transfer routine 2640t may also be executed to determine whether the results of the execution of the task routine 2440t has caused a specified condition to be met.

The specified condition may include any of a variety of required events, outcomes of comparisons of values, quantities of iterations of a performance, etc. By way of example, a specified condition may simply be that a particular data set has been generated by a performance of a job flow 2200, and the processor(s) 2550 may be caused by the transfer routine 2640 to simply repeatedly check whether the performance of the job flow 2200 has caused the generation of the specified data set. Alternatively, a specified condition may include a requirement that one or more data values within such a generated data set must fall within one or more specified ranges of data values, and the processor(s) 2550 may be caused by the transfer routine 2640 to check for both the generation of a specified data set and for whether the one or more specified data values thereof do fall within the specified one or more ranges of data values. Regardless of what the specified condition may be, upon a determination that the specified condition has been met, the processor(s) 2550 may be caused by execution of the transfer routine 2640 to transfer a copy of each of one or more objects from one federated area 2566 to a transfer area 2666 as part of transferring the one or more copies to another federated area 2566. More specifically, and continuing with the example presented in FIG. 21B, upon determining that a specified condition has been met, execution of the transfer routine 2640t within the intervening federated area 2566t may cause the processor(s) 2550 to perform a transfer of copies of a data set 2370t, the task routine 2440t and/or a corresponding result report 2770t to the transfer area 2666tu.

Another transfer routine 2640 associated with the same automated transfer relationship may be executed within the other federated area 2566 to monitor the transfer area 2666 for the occurrence of the transfer of the one or more copies of objects thereto. In response to determining that the one or more copies of objects have been so transferred into the transfer area 2666, the processor(s) 2550 may be caused by further execution of the other transfer routine 2640 to transfer the one or more copies of objects from the transfer area 2666 and into the other federated area 2566. In so doing, the one or more copies of objects become available within the other federated area 2566 for use in a performance of another job flow 2200 specified by another job flow definition 2220. More specifically, and continuing with the example presented in FIG. 21B, upon determining that copies of the data set 2370*t*, the task routine 2440*t* and/or the result report 2770*t* have been transferred into the transfer area 2666*tu*, execution of the transfer routine 2640*u* within the intervening federated area 2566*u* may cause the processor(s) 2550 to perform a transfer of those copies from the transfer area 2666*tu*, and into the intervening federated area 2566*u*. As depicted, with those copies so transferred into the intervening federated area 2566*u*, those copies may be employed in a performance of a different job flow defined by the depicted job flow definition 2220*u*, and which may entail the execution of the depicted task routine 2440*u*.

Turning to FIG. 23C, as an alternative to the example of FIG. 21B, a relatively simple transfer relationship between two intervening federated areas 2566*t* and 2566*u* within the same hierarchical tree of federated areas may be put in place with a corresponding single transfer area 2666*tu* being formed within the base transfer area 2566*x* from which both of the federated areas 2566*t* and 2566*u* branch. More precisely, in setting up the depicted transfer relationship between the federated areas 2566*t* and 2566*u*, the processor(s) 2550 of the one or more federated devices 2500 may be caused (e.g., by the federated area component 2546) to instantiate the transfer area 2666*tu* within the base federated area 2566*x*. It should be noted that this example of a transfer relationship between the intervening federated areas 2566*t* and 2566*u* may rely on each of the intervening federated areas 2566*t* and 2566*u* having at least an inheritance relationship with the base federated area 2566*x*

Also as part of putting in place the depicted transfer relationship, the transfer routines 2640*t* and 2640*u* may be stored within the intervening federated areas 2566*t* and 2566*u*, respectively, or may both be stored within the transfer area 2666*tu* instantiated within the based federated area 2566*x*, as depicted. Further, the transfer flow definition 2620*tu* may be stored within the base federated area 2566*x* at which it may be made accessible from both of the federated areas 2566*t* and 2566*u*, as depicted, either alongside or within the transfer area 2666*tu*.

Again, processor(s) 2550 of the one or more federated devices 2500 may be caused by the performance component 2544 to execute one or more task routines 2440*t* within the federated area 2566*t* in response to requests to perform the tasks defined in a job flow 2200 by the job flow definition 2220*t*. As that job flow 2200 is so performed, the transfer routine 2640*t* may also be executed to determine if the performance of that job flow 2200 has caused a specified condition to be met that triggers the transfer of a copy of one or more objects from the intervening federated area 2566*t* to the intervening federated area 2566*u* through the transfer area 2666*tu*.

Again, regardless of what the specified condition may be, upon determining that the specified condition has been met, execution of the transfer routine 2640*t* within the intervening federated area 2566*t* or within the base federated area 2566*x* (as depicted) may cause the processor(s) 2550 to perform a transfer of copies of the data set 2370*t*, the task routine 2440*t* and/or the result report 2770*t* to the transfer area 2666*tu*.

Again, the transfer routine 2640*u* may be executed within the intervening federated area 2566*u* or within the base federated area 2566*x* (as depicted) to monitor the transfer area 2666*tu* for the occurrence of the transfer of copies of the data set 2370*t*, the task routine 2440*t* and/or the result report 2770*t* thereto, such that those copies become available within the transfer area 2666*tu*. In response to determining that those copies have been so transferred into the transfer area 2666*tu*, the processor(s) 2550 may be caused by further execution of the other transfer routine 2640*u* to transfer those copies from the transfer area 2666*tu* and into the intervening federated area 2566*u*. In so doing, the copies of the data set 2370*t*, the task routine 2440*t* and/or the result report 2770*t* become available within the intervening federated area 2566*u* for use in a performance of another job flow 2200 specified by the job flow definition 2220*u*, and which may entail the execution of the depicted task routine 2440*u*.

FIGS. 24A, 24B, 24C, 24D and 24E, together, illustrate in greater detail the manner in which another example automatic transfer relationship may be configured by another example transfer flow definition 2620*tuv*. FIGS. 24A-E, together, also illustrate in greater detail the manner in which example transfers of example data sets 2370*t* and 2370*u* may be performed as per the example transfer flow definition 2620*tuv*. For sake of ease of discussion and understanding, the same hierarchical tree introduced in FIGS. 23B and 23C is again used in this example of FIGS. 24A-E, though with the addition of a third intervening federated area 2566*v* and a second transfer area 2666*uv*. Again, this example automatic transfer relationship and associated conditions are deliberately simplified for purposes of illustration, and should not be taken as limiting what is described and claimed herein to such relatively simple embodiments.

In this depicted example, an automatic transfer relationship is defined in the transfer flow definition 2620*tuv* among the intervening federated areas 2566*t*, 2566*u* and 2566*v* in which a copy of the data set 2370*t* is to be transferred from the intervening federated area 2566*t* and into the intervening federated area 2566*u* through the transfer area 2666*tu* based on at least a first condition. Also, in this automatic transfer relationship, a copy of the data set 2370*u* is to be transferred from the intervening federated area 2566*u* and into either the intervening federated area 2566*t* through the transfer area 2666*tu*, or into the intervening federated area 2566*v* through a transfer area 2666*uv*, based on at least a second condition. As with the example automatic transfer relationship of FIGS. 22A-C, the transfer areas 2666*tu* and 2666*uv* have each been instantiated in a manner similar to what was earlier depicted and discussed in reference to FIG. 21B, in which the intervening federated areas 2566*t*, 2566*u* and 2566*v* have been manipulated to create storage spaces at which there is overlap. Again, however, each of the transfer areas 2666*tu* and/or 2666*uv* may be instantiated within any of a variety of other forms of storage space, including within the storage space of the base federated area 2566*x* from which each of the intervening federated areas 2566*t*, 2566*u* and 2566*v* may branch, and/or with which each may have at least an inheritance relationship.

It may be that this example automatic transfer relationship between the intervening federated areas 2566*t*, 2566*u* and 2566*v* was created to enable users with access to each of these federated areas to collaborate in the development of a neural network defined by weights and biases applied to a set of emulated neurons interconnected as nodes in a network. Users with access to the intervening federated area 2566*t* may do the work of creating at least an initial version of the neural network through a training process performed within the intervening federated area 2566*t*. Users with access to the intervening federated area 2566*u* may subsequently test one or more characteristics of at least the initial version of the neural network within the intervening federated area 2566*u*. Then, users with access to the intervening federated area 2566*v* may subsequently employ at least a refined version of the neural network in experimental use scenarios within the intervening federated area 2566*v* to determine readiness for wider release to other users within the base federated area 2566x. As will be explained in greater detail, the performances of each of these different phases in the development of the neural network may be controlled and enabled by the transfer of the data sets 2370t and 2370u among the intervening federated areas 2566t, 2566u and 2566v.

Figure 24A:
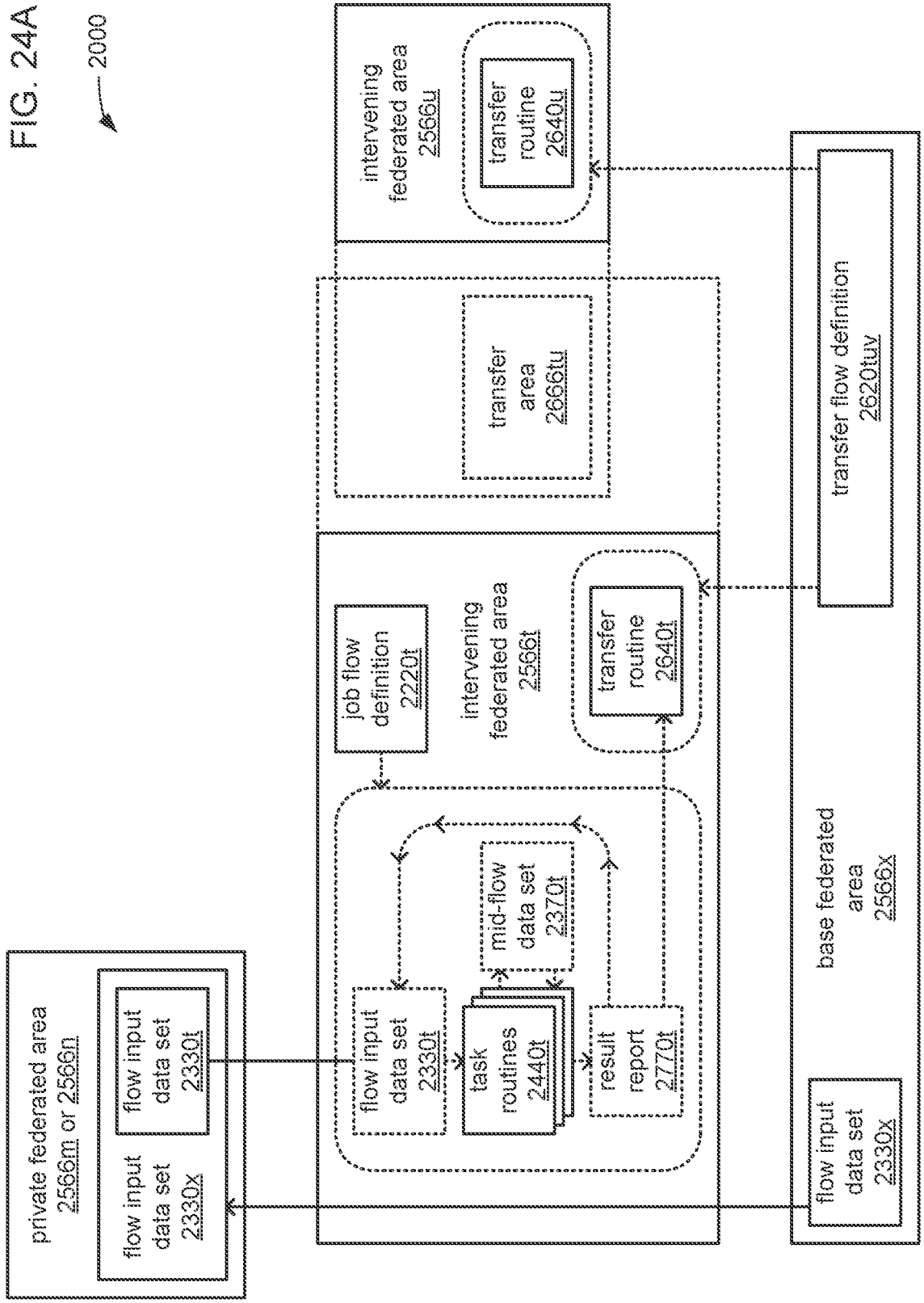
FIGS. 24A, 24B, 24C, 24D and 24E, together, illustrate examples of automated transfers of data sets defining a neural network.

Turning more specifically to FIG. 24A, a user with access to the private federated area 2566m or 2566n may generate a training data set 2330t from a larger data set 2330x that may be stored within the base federated area 2566x. The data set 2330x may include indications of a great many instances of inputs to a system that begat desired outputs in embodiments in which the neural network is being developed to exhibit the behavior of that system. In creating the training data set 2330t for such training purposes, this user may employ any of a variety of statistical processes to derive the data set 2330t to have characteristics that are at least partially representative of characteristics of the larger data set 2330x to make the data set 2330t appropriate for use in training a set of emulated neurons interconnected as nodes of a network to function cooperatively in a manner that defines a neural network that is effective at performing one or more selected functions. As will be familiar to those skilled in the art, this may entail random sampling of the larger data set 2330x to generate the training data set 2330t, and/or selectively emphasizing and/or de-emphasizing the degree to which the training data set 2330t exhibits one or more characteristics exhibited by the larger data set 2330x.

As will be familiar to those skilled in the art of developing neural networks, with the training data set 2330t so generated, the training data set 2330t (or at least differing portions thereof) may be employed through one or more training operations to derive at least an initial version of a neural network. As depicted, in this example, this may entail repeated performances of a job flow defined by the job flow definition 2220t during which each iteration of training may be performed. More specifically, one or more instances of task routine(s) 2440t may be repeatedly executed to repeatedly emulate individual and/or interconnected sets of neurons, and with at least portions of the training data set 2330t used in each iteration, to generate iterations of the result report 2770t. Each iteration of the result report 2770t generated by each such performance may provide indications of how successful the developing neural network is becoming at performing the one or more selected functions. Alternatively or additionally, each iteration of the result report 2770t may be employed alongside the training data set 2330t as an input to each subsequent performance as part of further developing the neural network. With each such performance, a definition of the developing neural network may be stored as a set of weights and biases indicated within the data set 2370t such that the data set 2370t is caused to define the neural network that is so created.

As a result of execution of the transfer routine 2640t, the processor(s) 2550 may also be caused to analyze each resulting iteration of the result report 2770t to determine whether or not a condition has been met that may trigger the transfer of a copy of the data set 2370t to the intervening federated area 2566u via the transfer area 2666tu. In this example, the condition may include a requirement that at least a specified degree of accuracy or other similar measure of performance of the developing neural network is achieved based on the analysis of each successive iteration of the result report 2770t.

Figure 24B:
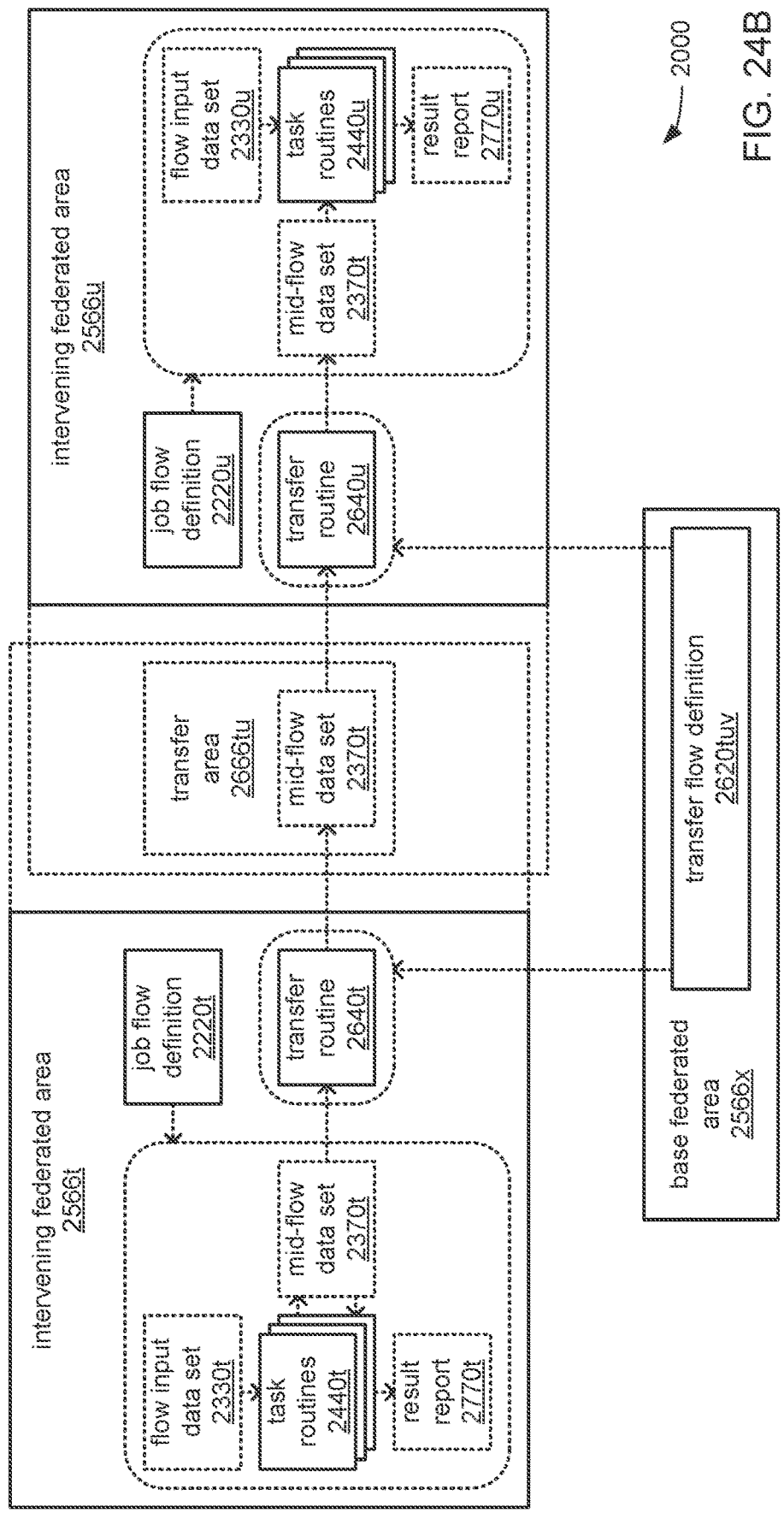

FIG. 24B more specifically depicts such a transfer of a copy of the data set 2370t from the intervening federated area 2566t to the transfer area 2666tu by the transfer routine 2640t, and then the transfer of that copy from the transfer area 2666tu to the intervening federated area 2566u by transfer routine 2640u. As with the example of FIGS. 22A-C, the processor(s) 2550 may be caused by execution of the transfer routine 2640u to repeatedly check the transfer area 2666tu to determine whether a copy of the data set 2370t has been transferred thereto (e.g., stored therein) as a result of execution of the transfer routine 2640t. Upon determining that such a copy has been so transferred into the transfer area 2666tu, the processor(s) 2550 of the one or more federated devices 2500 may be caused by the transfer routine 2640u to transfer that copy therefrom and into the intervening federated area 2566u.

Figure 24C:
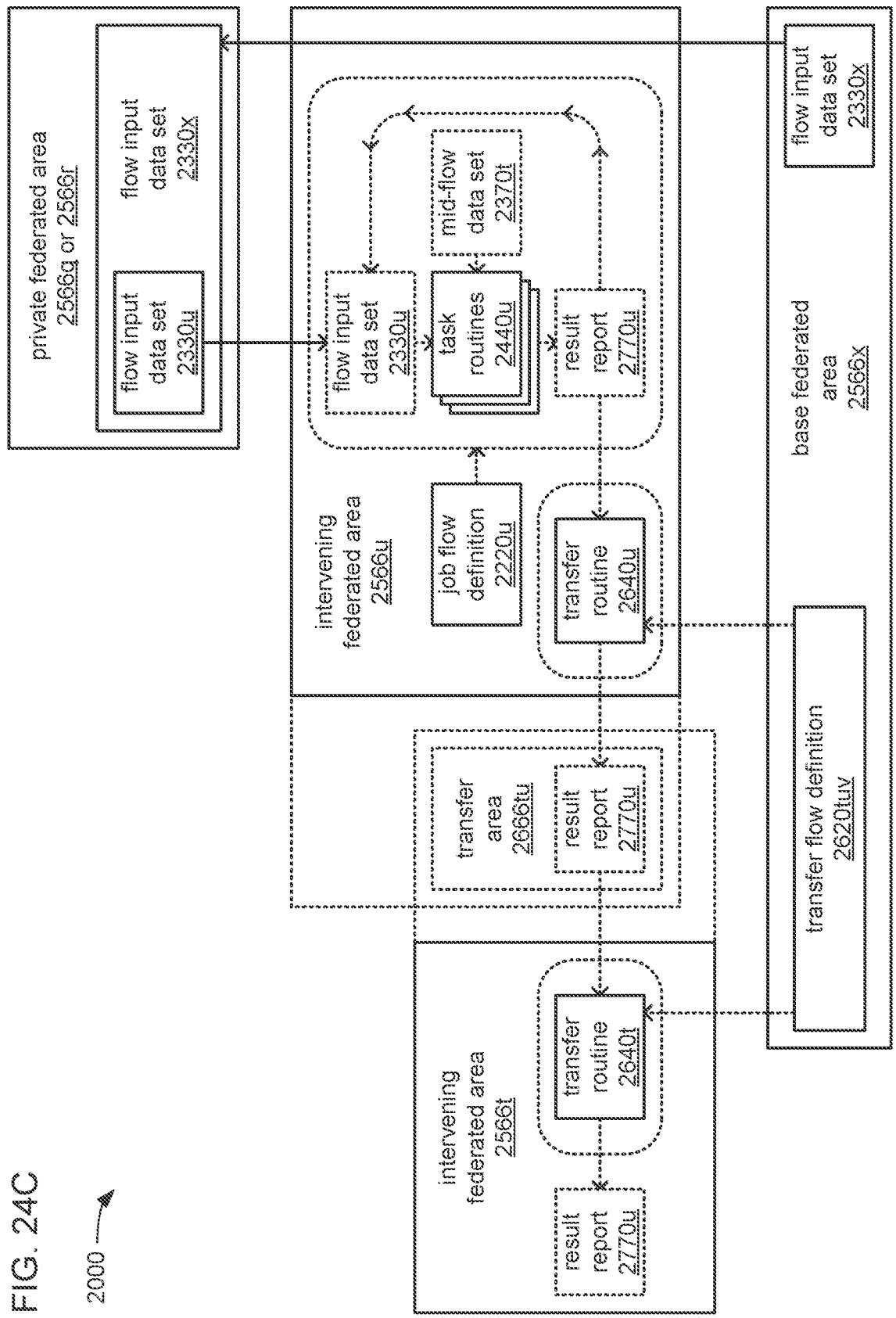

Turning more specifically to FIG. 24C in addition to FIG. 24B, as depicted, with the copy of the data set 2370t transferred into the intervening federated area 2566u, the data set 2370t may be utilized in one or more performances of a job flow defined by the job flow definition 2220u to test the neural network defined by the weights and biases for individual neurons and/or for point-to-point connections between neurons indicated within the data set 2370t. More specifically, a user granted access to the private federated area 2566q or 2566r may generate a testing data set 2330u from the larger data set 2330x for use in the repeated testing of the neural network, where at least a portion of the testing data set 2330u is used as an input to the execution of one or more task routines 2440u during each such performance. Again, in so creating the testing data set 2330u, this user may employ any of a variety of statistical processes to cause the testing data set 2330u to have characteristics that are at least partially representative of characteristics of the larger data set 2330x, and/or to selectively emphasize and/or de-emphasize one or more characteristics thereof. The weights and biases for neurons and/or point-to-point connections between neurons may enable the recreation of the neural network developed within the intervening federated area 2566t for each such performance within the intervening federated area 2566u. The task routines 2440u may employ the data set 2370t as an input, during their execution by the processor(s) 2550, to generate the emulations of individual and/or connected sets of neurons within the neural network. With each such performance, the results of the tests performed may be indicated in corresponding iterations of the result report 2770u.

In some embodiments, the processor(s) 2550 may be caused by further execution of the transfer routine 2640u to analyze each iteration of the result report 2770u to determine whether or not a condition has been met that may trigger the transfer of a copy of at least one iteration of the result report 2770u back to the intervening federated area 2566t via the transfer area 2666tu. In this example, the condition may include a requirement that at least one iteration of the result report 2770u provide an indication of the neural network defined by the data set 2370t failing to reach a specific target level of accuracy or other measure of performance based on the testing performed within the intervening federated area 2566u. FIG. 23C more specifically depicts such transfer of a copy of at least one iteration of the result report 2770u from the intervening federated area 2566u to the transfer area 2666tu by the transfer routine 2640u, and then the transfer of that copy from the transfer area 2666tu to the intervening federated area 2566t by transfer routine 2640t. In such embodiments, the processor(s) 2550 may be caused by further execution of the transfer routine 2640t to repeatedly check the transfer area 2666tu to determine whether a copy of at least one iteration of the result report 2770u has been transferred thereto (e.g., stored therein) as a result of execution of the transfer routine 2640u. Upon determining that such a copy has been so transferred into the transfer area 2666tu, the processor(s) 2550 of the one or more federated devices 2500 may be caused by the transfer routine 2640t to transfer that copy therefrom and into the intervening federated area 2566t. In this way, indications of one or more characteristics of the failure of the previously generated neural network is automatically communicated to the users granted access to the intervening federated area 2566t as an aid to generating an improved version of the neural network.

Figure 24D:
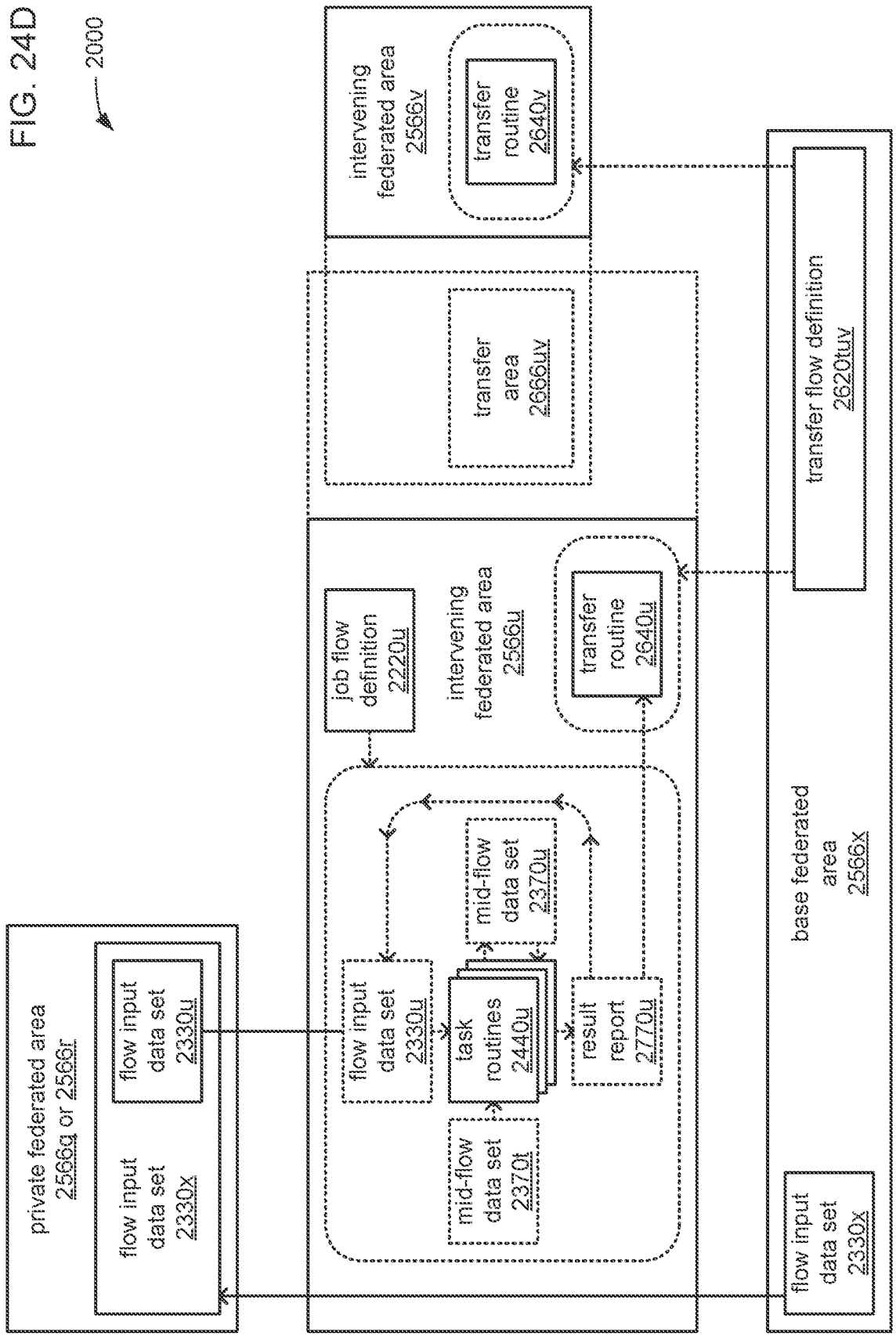

Turning to FIG. 24D, in some embodiments, the results of the testing performed with the testing data set 2330u may additionally be used to generate a refined version of the neural network that may be defined by values for weights and biases indicated within a data set 2370u that may be generated and/or augmented with each iteration of such testing. More specifically, indications of degree of failure indicated within iterations of the result report 2770u may be employed as corrective feedback input used to derive refinements to the weights and/or biases of the neural network. Thus, the data set 2370t may serve to provide a starting point for weights and biases defining the neural network generated within the intervening federated area 2566t, and a definition of a refined version of that neural network may be derived with the definition thereof stored as refined weights and biases stored within the data set 2370u. In such embodiments, the processor(s) 2550 may also be caused by further execution of the transfer routine 2640u to analyze each resulting iteration of the result report 2770u to determine whether or not a condition has been met that may trigger the transfer of a copy of the data set 2370u to the intervening federated area 2566v via the transfer area 2666uv. Similar to the automated transfer of a copy of the data set 2370t, the condition for such an automated transfer of a copy of the data set 2370u may include a requirement that at least a specified degree of accuracy or other similar measure of performance of the refined neural network is achieved based on the analysis of each successive iteration of the result report 2770u.

Figure 24E:
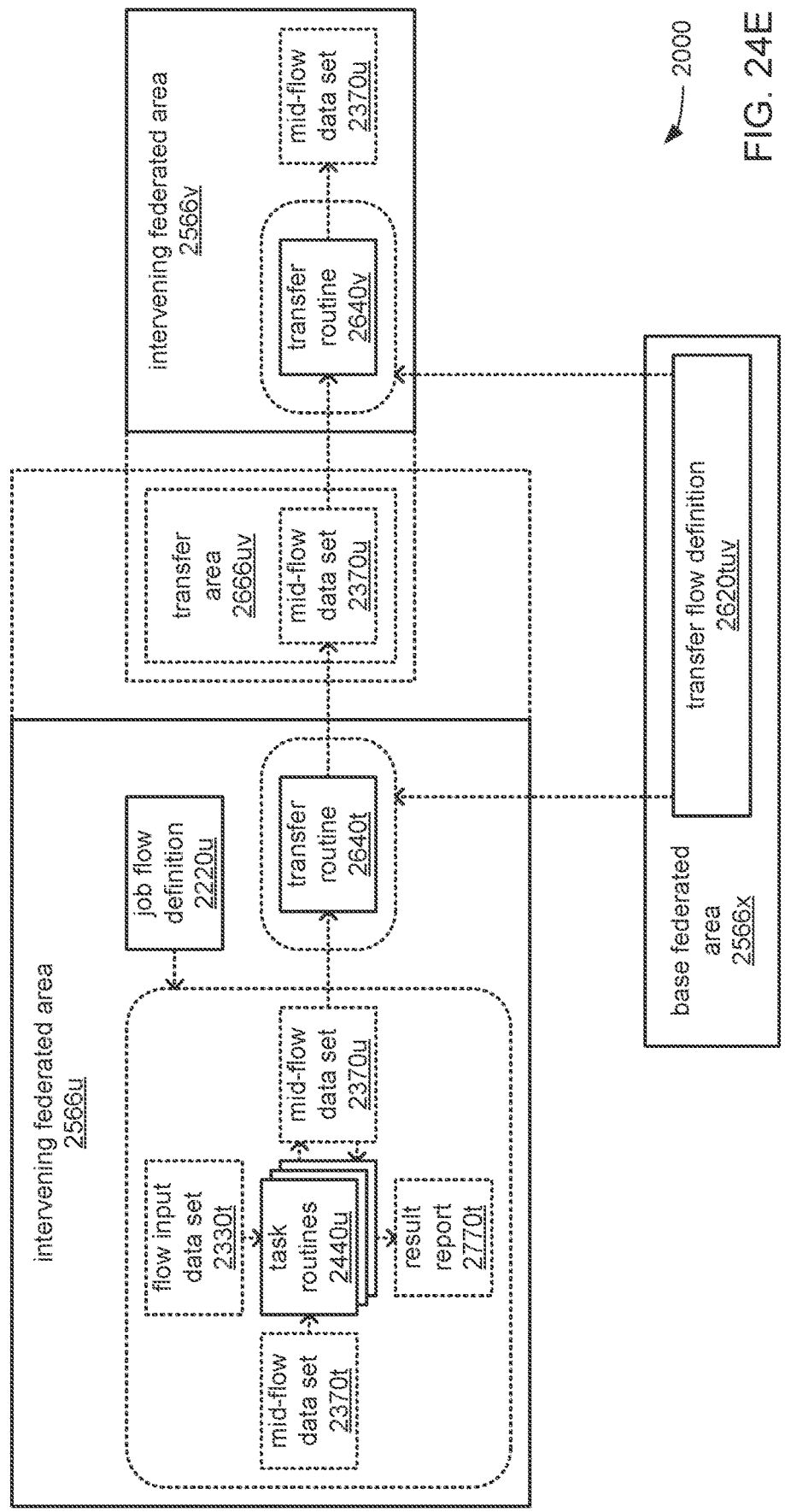

FIG. 24E more specifically depicts such a transfer of a copy of the data set 2370u from the intervening federated area 2566u to the transfer area 2666uv by the transfer routine 2640u, and then the transfer of that copy from the transfer area 2666uv to the intervening federated area 2566v by transfer routine 2640v. As with the transfer routine 2640u in the transfer of a copy of the data set 2370t out of the transfer area 2666tu, the processor(s) 2550 may be caused by execution of the transfer routine 2640v to repeatedly check the transfer area 2666uv to determine whether a copy of the data set 2370u has been transferred thereto (e.g., stored therein) as a result of execution of the transfer routine 2640u. Upon determining that such a copy has been so transferred into the transfer area 2666uv, the processor(s) 2550 of the one or more federated devices 2500 may be caused by the transfer routine 2640v to transfer that copy therefrom and into the intervening federated area 2566v.

With the copy of the data set 2370u transferred into the intervening federated area 2566v, the data set 2370u may be utilized in experimental use cases as part of further testing of the now refined neural network to determine readiness for release to a larger number of users. It may be that, following success in such an experimental use testing regime, the data set 2370u may be transferred to the base federated area 2566x where it may become more generally accessible.

It should be noted that, as an alternative to the generation of the data set 2370u including weights and biases for a refined version of the neural network, the testing performed within the intervening federated area 2566u may not, in alternate embodiments, be used to test the functionality of the neural network defined by the weights and biases included within the data set 2370t without generating such refinements. Instead, the transfer routine 2640u may analyze each iteration of the result report 2770u generated during each iteration of such testing to determine whether or not a condition has been met for the transfer of a copy of the data set 2370t to the intervening federated area 2566v for experimental use testing.

Figure 25A:
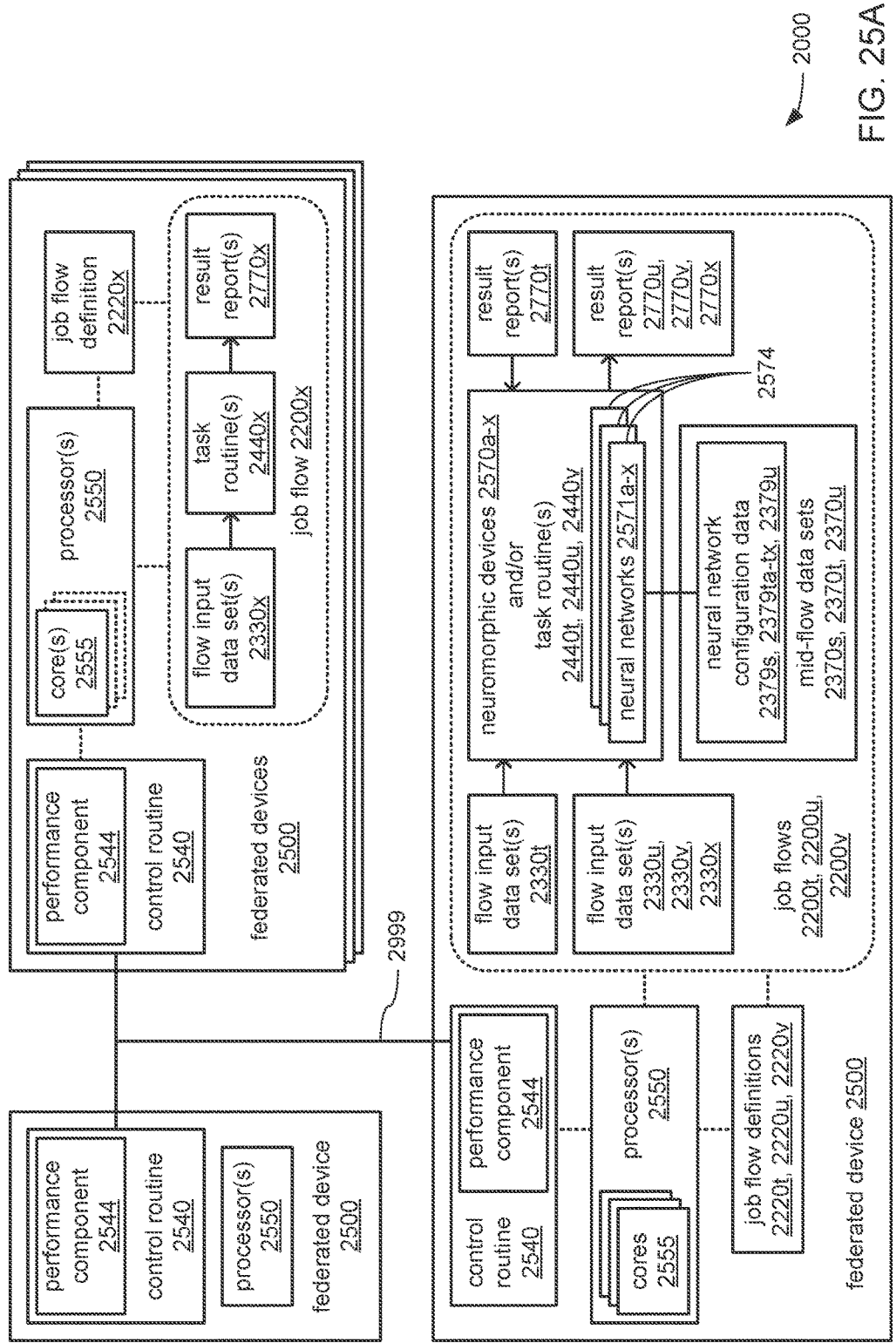
FIGS. 25A and 25B each illustrate an example of transitioning from use of a non-neuromorphic implementation of an analytical function to a neuromorphic implementation.
Figure 25B:
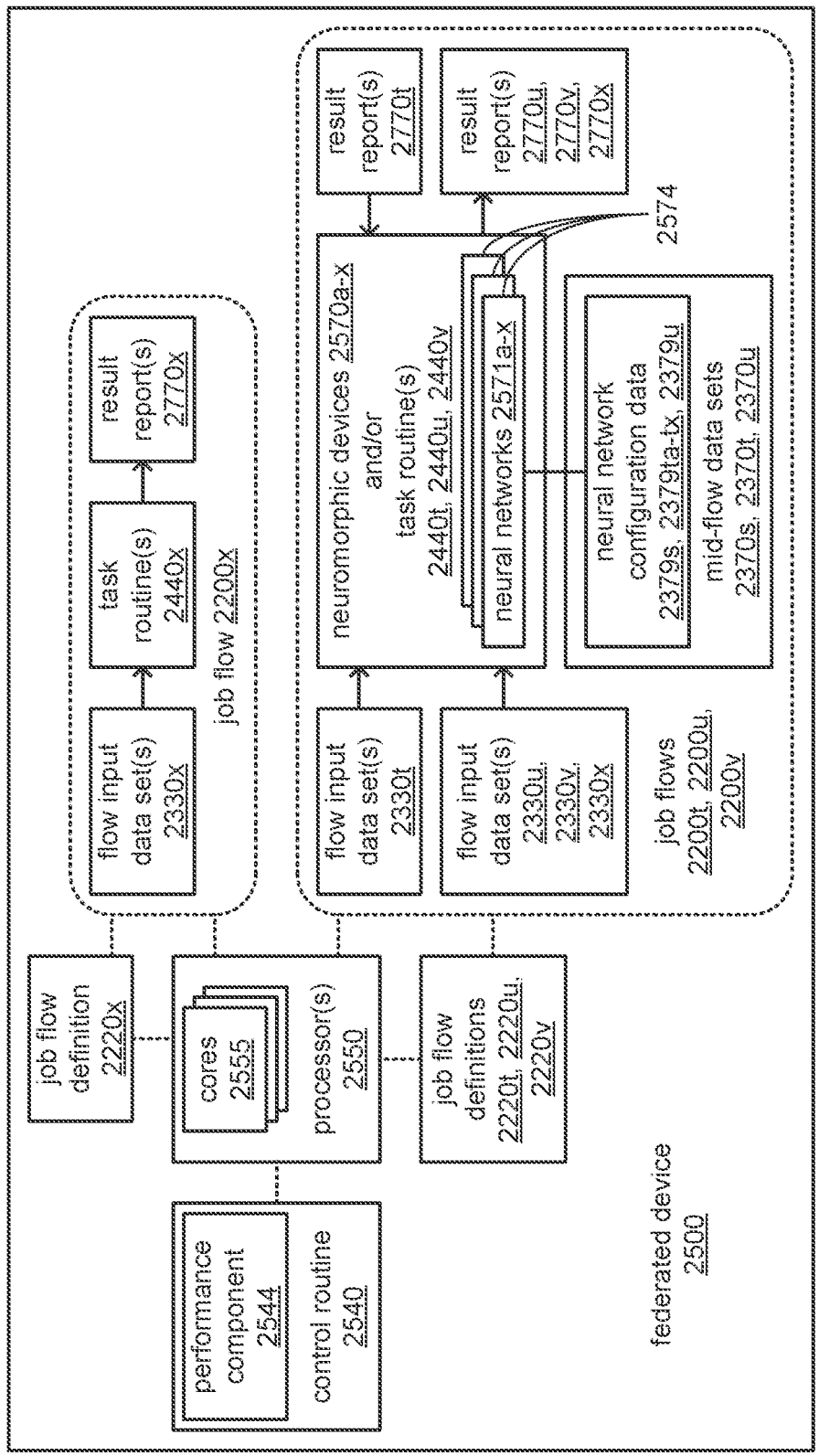

FIGS. 25A and 25B, together, illustrate aspects of performing a staged transition from the use of non-neuromorphic processing to neuromorphic processing in performing an analytical function. More specifically, FIGS. 25A and 25B illustrate the manner in which different stages of testing may be used to effect the replacement of a non-neuromorphic implementation of an analytical function with a neuromorphic implementation based on degrees of inaccuracy in the performance by the neuromorphic implementation. FIG. 25A provides an overall depiction of such a staged transition in an example where performances are carried out by one or more federated devices 2500 in a grid 2005 of federated devices, and FIG. 25B provides an overall depiction of such a staged transition in an example where performances are carried out entirely within a single federated device 2500. For sake of simplicity of reference and understanding, some of the same example job flows and components thereof that were introduced in FIGS. 20A-F, and that were used in FIGS. 21A-C, are used again in these examples.

As depicted in FIG. 25A, one or more federated devices 2500 of a grid 2005 of federated devices may be employed in performing the non-neuromorphic implementation of the analytical function provided by the job flow 2200x. Such performances may entail the execution of the task routine(s) 2440x of the job flow 2200x by various differing quantities and/or configurations of one or more processing cores 2555 of one or more processors 2550 across one or more federated devices 2500. By way of example, multiple instances of one or more task routine(s) 2440x may be executed by thousands of processing course 2555 of a single GPU form of processor 2500 within a single federated device 2500. As will be familiar to those skilled in the art, a subset of common processing operations may be quite amenable to being performed in a highly parallelized manner across the thousands of relatively simple processing cores 2555 that are currently commonly available in GPUs offered by a wide variety of vendors. By way of another example, multiple instances of one or more task routine(s) 2440x may be executed by one or more of the processing course 2555 within each of multiple ones of a CPU form of processor 2500 available within multiple federated devices 2500. As will be familiar to those skilled in the art, many processing operations are amenable to being performed at least partially in parallel across multiple relatively complex processing cores 2555 that are currently commonly available in CPUs offered by a wide variety of vendors.

Figure 26A:
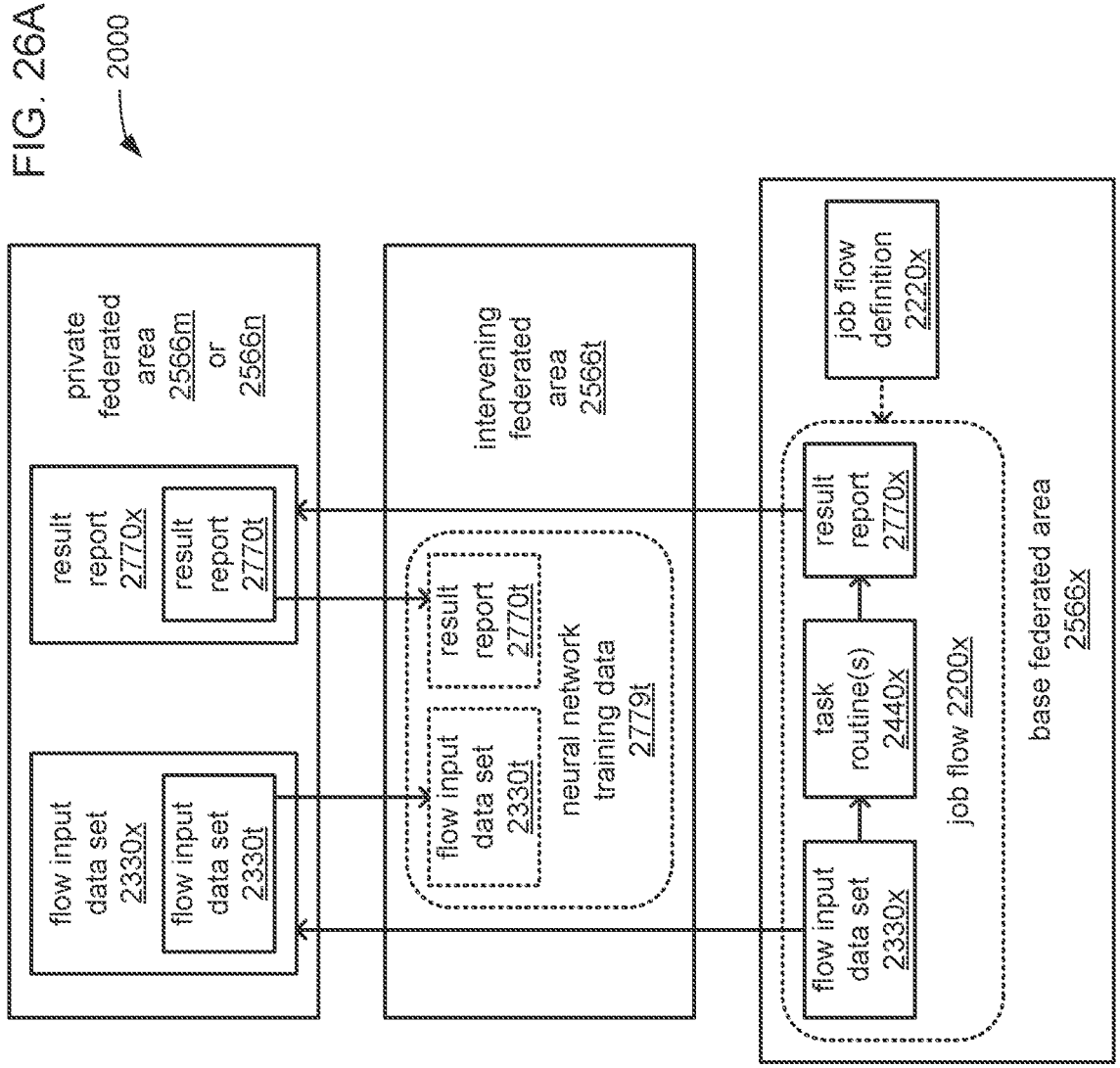
FIGS. 26A, 26B, 26C, 26D, 26E, 26F and 26G, together, illustrate examples of automated transfers of objects associated with training and testing of a chain of neural networks.

As will also be familiar to those skilled in the art, an increasing variety of more recently available GPUs are being provided with processing cores that are increasingly optimized for use in supporting the provision of software-based simulations of neural networks. Indeed, such recent improvements to GPU processing cores now routinely enable a software-based simulation of a neural network using a GPU to perform a particular function multiple orders of magnitude faster than is achievable using multiple CPUs to support an implementation of the same particular function in which no neural network is used. However, despite such improvements in GPUs, neuromorphic devices that incorporate hardware components to provide hardware-based implementations of artificial neurons have become more commonplace and have proven capable of supporting neural networks that are able to achieve still greater performance. Thus, as depicted in FIG. 26A, it is entirely possible that a single federated device 2500 (of the same grid 2005 of federated devices) that incorporates one or more GPU forms of processor 2550 and/or one or more neuromorphic devices 2570 to provide a neuromorphic implementation of a particular function that achieves significantly greater performance than multiple other federated devices 2500 employing multiple CPU and/or GPU forms of processor 2500 per federated device 2500 that provide either a neuromorphic or non-neuromorphic implementation of that same particular function.

However, despite such opportunities for performance improvements leading to higher throughput in the performance of a particular function, as previously discussed, a tradeoff of incurring some degree of inaccuracy in the performance of that particular function accompanies such performance gains. As also previously discussed, various measures may be taken to reduce the degree of inaccuracy. To minimize such inaccuracies while effecting a transition from a non-neuromorphic implementation of a particular function to a neuromorphic implementation, the transition may be automated in a manner that includes multiple steps that each require a proven degree of accuracy for the transition to be allowed to progress. Thus, as depicted, and as will be explained in still greater detail, the depicted single federated device 2500 with which the neuromorphic implementation of the analytical function is to be implemented may be configured to perform each of multiple different job flows at different stages of the transition. Also, through at least a majority of these stages, there may be at least partially parallel performances of the non-neuromorphic and neuromorphic implementations of the analytical function, with just the neuromorphic implementation being performed at a final stage.

More specifically, and as depicted, a training job flow 2200t used in training multiple neural networks 2571a-x of an ensemble 2574 may be performed by a federated device 2500 at least partially in parallel with the ongoing performance of the non-neuromorphic implementation by the other multiple depicted federated devices 2500. In embodiments in which the ensemble 2574 is to generate time series predictions in which the neural networks 2571a-x are ordered and interconnected to form a multi-link chain of neural networks, such training may proceed as described above in reference to FIGS. 22A-F, where the neural networks 2571a-x are trained sequentially. An advantage of such at least partially parallel performance may be that, as more of such non-neuromorphic performances occur, more of a flow input data set 2330x and corresponding result report 2770x are created, thereby providing more matched sets of input values and corresponding output values that may be used to create more of the flow input data set 2330t and corresponding result report 2770t of a neural network training data 2779t with which to perform such training. Such training may continue in at least partially in parallel with the non-neuromorphic performances of the analytical function until one or more conditions have been reached for such training to cease. In various embodiments, such conditions may include one or more of a predetermined quantity of matched sets of input values and output values having been used in training, and/or the results of a recurring regression analysis on the matched sets of input values and output values so used in training having brought about a predetermined degree of density and/or thoroughness of coverage of the decision space.

Regardless of the exact conditions that serve as a trigger for the conclusion of performances of the training job flow 2200t to train the neural networks 2571a-x of the ensemble 2574, such conditions may also serve as the trigger for the commencement of a first stage of testing (via performances of a testing job flow 2200u) of the ensemble 2574 in which the neural networks 2571a-x may be operated together to perform the analytical function at least partially in parallel with the continuing performances of the non-neuromorphic implementation of the analytical function provided by the job flow 2200x. More specifically, with each performance of the job flow 2200x by the depicted multiple federated devices 2500 with sets of input values of the flow input data set 2330x, more of the corresponding result report 2770x is generated, and a corresponding performance of the testing job flow 2200u may be performed with at least a subset of the flow input data set 2330x and corresponding result report 2770x employed as part of a neural network testing data set 2779u (i.e., as a flow input data set 2330u and corresponding result report 2770u). As part of each such performance of the job flow 2200u, the output values generated from the flow input data set 2330u may be compared to the corresponding output values of the result report 2770u to test the accuracy of the neural networks 2571a-x being operated together as the ensemble 2574.

If such testing reveals that the ensemble 2574 is achieving a degree of accuracy that is less than a predetermined minimum threshold of accuracy for testing to continue, then further performances of the job flow 2200u to test the ensemble 2574 may cease, and performances of the job flow 2200t to train a new ensemble 2574 of neural networks 2571a-x may occur. Further, such retraining may be performed using a different selection of hyperparameters than were used in the previous performances of the job flow 2200t to train new neural networks 2571a-x for the new ensemble 2574. As those skilled in the art will readily recognize, different structural configurations of each of the neural network 2571a-x that include differing quantities of artificial neurons and/or different quantities of layers of artificial neurons may perform a particular function with differing degrees of accuracy. Thus, a change in the hyperparameters during a retraining to provide new neural networks 2571a-x may beget improved accuracy.

However, if the testing by performances of the job flow 2200u reveals that the ensemble 2574 is achieving a degree of accuracy that is greater than the predetermined minimal threshold for testing to continue, but is less than a predetermined higher threshold of accuracy for usage to begin, then further performances of the job flow 2200u may occur in which there is further training of the neural networks 2571a-x while maintaining their current hyperparameters, as an approach to refining the neural networks 2571a-x, rather than to restart the training from the beginning with new neural networks 2571a-x that have different hyperparameters. Once such further training has been completed, further performances of the job flow 2200u may occur in which the earlier testing of the ensemble 2574 is resumed to again assess the degree of accuracy.

If the testing or resumed testing by performances of the job flow 2200u reveals that the ensemble 2574 is achieving a degree of accuracy that is greater than the predetermined higher threshold of accuracy for usage to begin, then conditions of the at least partially parallel performances of non-neuromorphic and neuromorphic implementations of the analytical function may change such that the neuromorphic implementation begins to replace the non-neuromorphic implementation, and the non-neuromorphic implementation is relegated to being used to spot check the output of the neuromorphic implementation. More specifically, and presuming that the neuromorphic implementation is able to achieve higher throughput than the non-neuromorphic implementation, a usage job flow 2200$v$ may begin to be performed with all sets of input values of the data sets 2330$x$ used by the ensemble 2574 to generate all corresponding sets of output values of the results reports 2770$x$. And, at least partially in parallel with the performances of the job flow 2200$v$, the job flow 2200$x$ based on the presumably slower performing non-neuromorphic implementation may be performed with a subset of the sets of those input values of the data sets 2330$x$, and the outputs of these performances of the job flow 2200$x$ may be compared to corresponding outputs values of the result report 2770$x$ generated by the job flow 2200$v$ as part of a final stage of testing of the ensemble 2574.

If such further testing reveals that the degree of accuracy of the ensemble 2574 continues to be greater than the higher threshold of accuracy for a predetermined amount of such further testing, then the further performances of the job flow 2200$x$ as part of such further testing may cease. In some embodiments, such a cessation of performances of the job flow 2200$x$ may be caused to occur in a gradual manner in which the performances of the job flow 2200$x$ become less frequent as the degree of accuracy continues to be greater than the higher threshold such that the allocation of processing resources of the grid 2005 of federated devices 2500 is gradually reduced over that time. In some of such embodiments, such a gradual transition may be implemented by prioritizing the assignment of processing resources between the non-neuromorphic and neuromorphic implementations.

By way of example, initially, the non-neuromorphic implementation may be provisioned with whatever processing resources to a degree intended to ensure that there are sufficient processing resources to perform the non-neuromorphic implementation in a manner that meets or exceeds a predetermined throughput level or other measurement of performance Whatever remains in the way of processing resources, if sufficient to fully implement the neural networks 2571$a$-$x$ of the ensemble 2574 for the neuromorphic implementation, may then be allocated to the neuromorphic implementation. However, as the transition is made to using the neuromorphic implementation (e.g., as a result of the degree accuracy exceeding the higher threshold of accuracy), the neuromorphic implementation may then be given priority in the allocation of processing resources over the non-neuromorphic implementation. It should be noted that, where neuromorphic processing resources (e.g., the one or more neuromorphic devices 2570) are available alongside instruction-based processing resources (e.g., the one or more processors 2550), the neuromorphic implementation may prove to have an advantage in being allocated processing resources. This may arise from the fact that a neural network can be implemented using either instruction-based or neuromorphic processing resources, while the execution of a series of instructions to perform a function in a non-neuromorphic manner (i.e., in a manner not using a neural network), must be performed using instruction-based processing resources.

FIG. 25B depicts aspects of a similar multiple-stage transition, but conducted entirely within a single federated device 2500. More specifically, in some embodiments, it may be that the one or more processors 2500 (whether of CPU or GPU form) are employed in performances of the non-neuromorphic implementation that is transitioned from, while the one or more neuromorphic devices 2570 are employed in performances of the neuromorphic implementation that is transitioned to. Alternatively, in other embodiments it may be that the neuromorphic implementation is performed employing numerous processing cores 2555 of a GPU form of at least one processor 2550. It should be noted that, beyond such differences between FIGS. 25A and 25B in the quantities of federated devices 2500 and/or the components thereof that are involved in these performances, what is otherwise depicted in FIGS. 25A and 25B is substantially similar.

FIGS. 26A, 26B, 26C, 26D, 26E, 26F and 26G, together, illustrate in greater detail another example of automated exchanges of objects associated with the training and testing of the ensemble 2574 of the neural networks 2571$a$-$x$ of FIGS. 25A-B among different federated areas as various stages of the training and testing thereof are begun and/or are completed. For sake of ease of discussion and understanding, the same hierarchical tree introduced in FIGS. 24A-E is used again in FIGS. 26A-G. Similar to what was depicted in FIGS. 24A-E, an automatic transfer relationship may be defined in the transfer flow definition 2620$tuv$ among the intervening federated areas 2566$t$, 2566$u$ and 2566$v$ in which copies of various objects may be transferred depending on various conditions. Again, this example automatic transfer relationship and associated conditions are deliberately simplified for purposes of illustration, and should not be taken as limiting what is described and claimed herein to such relatively simple embodiments.

It may be that this example of an automatic transfer relationship among the intervening federated areas 2566$t$, 2566$u$ and 2566$v$ was created as part of implementing aspects of the provision of training data described in reference to FIG. 22B, as well as aspects of the staged transition from the use of a non-neuromorphic implementation of an analytical function to a neuromorphic implementation described in reference to FIGS. 25A-B. Through this example automatic transfer relationship, users having access to different ones of these intervening federated areas may be able to collaborate as such a staged development of an ensemble 2574 of neural networks 2571$a$-$x$ automatically proceeds. More specifically, users with access to the intervening federated area 2566$t$ may oversee the training and/or retraining of the neural networks 2571$a$-$x$ performed at least partly within the intervening federated area 2566$t$. Also, users with access to the intervening federated area 2566$u$ may subsequently oversee the testing of the resulting ensemble 2574 of the neural network 2571$a$-$x$ performed at least partly within the intervening federated area 2566$u$. Further, users with access to the intervening federated area 2566$v$ may subsequently oversee the usage of the ensemble 2574 of the neural networks 2571$a$-$x$ performed at least partly within the intervening federated area 2566$v$.

Turning to FIG. 26A, a user with access to the private federated area 2566$m$ or 2566$n$ may generate the flow input data set 2330$t$ and the corresponding result report 2770$t$ of the neural network training data 2779$t$ from the flow input data set 2330$x$ and the result report 2770$x$, respectively, that may be stored within the base federated area 2566$x$ as a result of earlier performances of the non-neuromorphic implementation of the analytical function of the job flow 2200$x$. Again, any of a variety of approaches may be used in selecting which sets of input values and corresponding output values from the flow input data set 2330x and the result report 2770x, respectively, are to be included in the neural network training data 2779t, including random sampling in which there may be some degree of emphasizing and/or de-emphasizing of various characteristics.

Alternatively, either in lieu of, or in addition to, such use of the flow input data set 2330x and the corresponding result report 2770x, at least a subset of the sets of input values within the flow input data set 2330t may be randomly generated. Following such random generation of sets of input data, the job flow 2200x may then be performed at least partly within the intervening federated area 2566t to use the non-neuromorphic implementation of the analytical function thereof to generate corresponding sets of output values of the result report 2770t.

Figure 26B:
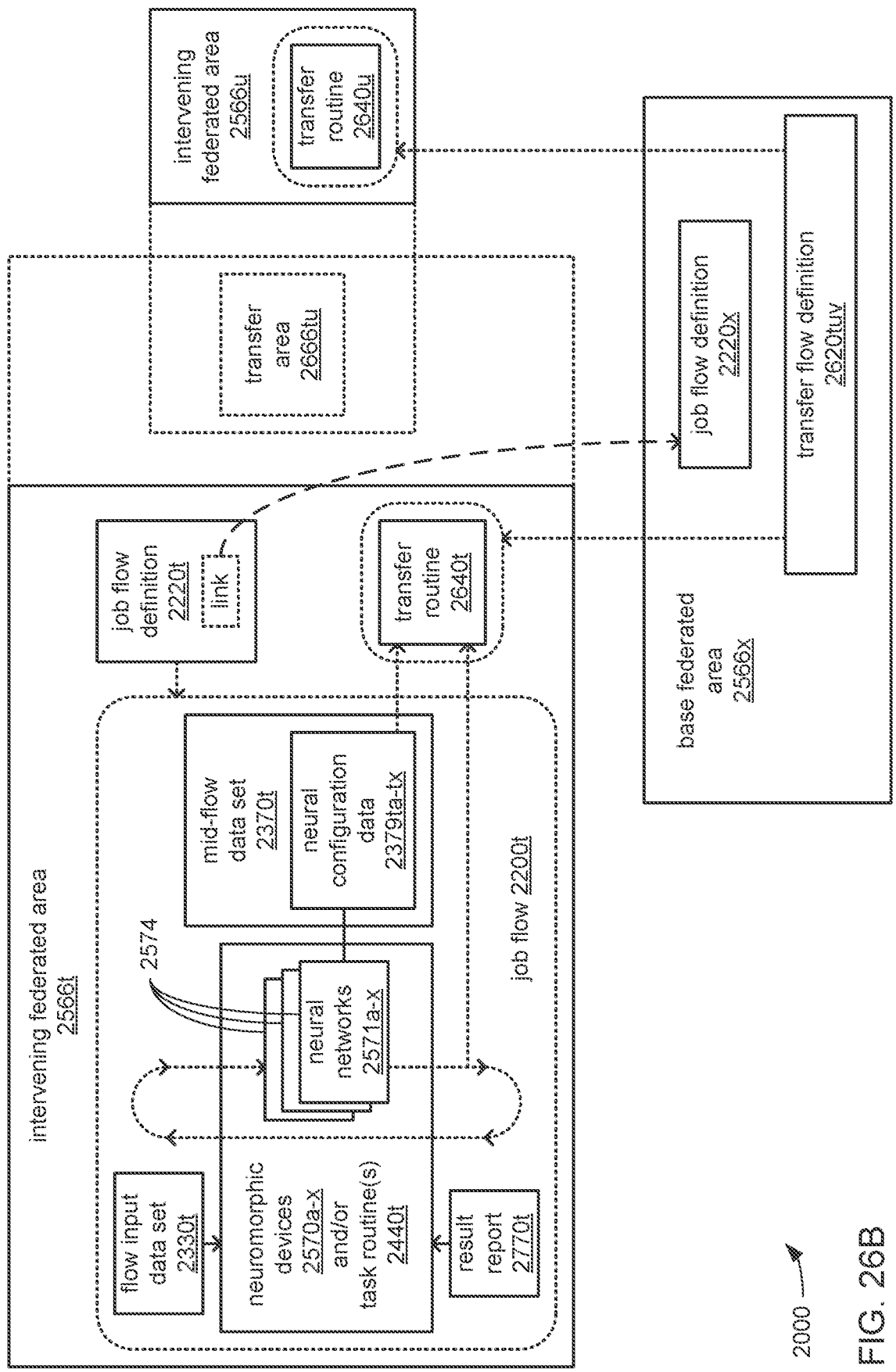

Turning to FIG. 26B, with the flow input data set 2330t and corresponding result report 2770t of the neural network training data 2779t generated (regardless of the exact manner in which they are generated) and stored within the intervening federated area 2566t, the training job flow 2200t may be performed to train the neural networks 2571a-x using the neural network training data 2779t. Again, in embodiments in which the ensemble 2574 is to generate time series predictions in which the neural networks 2571a-x are ordered and interconnected to form a multi-link chain of neural networks, such training may proceed as described above in reference to FIGS. 22A-F, where the neural networks 2571a-x are trained sequentially.

As the job flow 2200t is performed to effect such training, execution of the transfer routine 2640t at least partially in parallel with the task routines 2440(t) of the job flow 2200t may cause a processor 2550 to perform a recurring analysis of one or more aspects of the training of the neural network 2571a-x to determine whether a condition has been met to cease the training and to begin the testing of the resulting ensemble 2574. Again, such a condition may include a determination that a predetermined threshold quantity of matched sets of input values and output values has been used in training each of the neural networks 2571a-x, or that the matched sets of input values and output values are sufficiently varied as to ensure that the resulting decision space of each of the neural networks 2571a-x is sufficiently defined.

As also depicted in FIG. 26B, and as previously discussed in reference to FIG. 16G, the job flow definition 2220t may include the job flow identifier or other form of reference to the job flow 2200x and/or the job flow definition 2220x that serves as an indication of the ensemble 2574 of the neural networks 2571a-x having been derived, to at least some degree, from the job flow 2200x and/or performance(s) thereof. Again, this may serve as an aid to ensuring accountability for various aspects of the development of the ensemble 2574 at a later time when the ensemble 2574 might be evaluated.

Figure 26C:
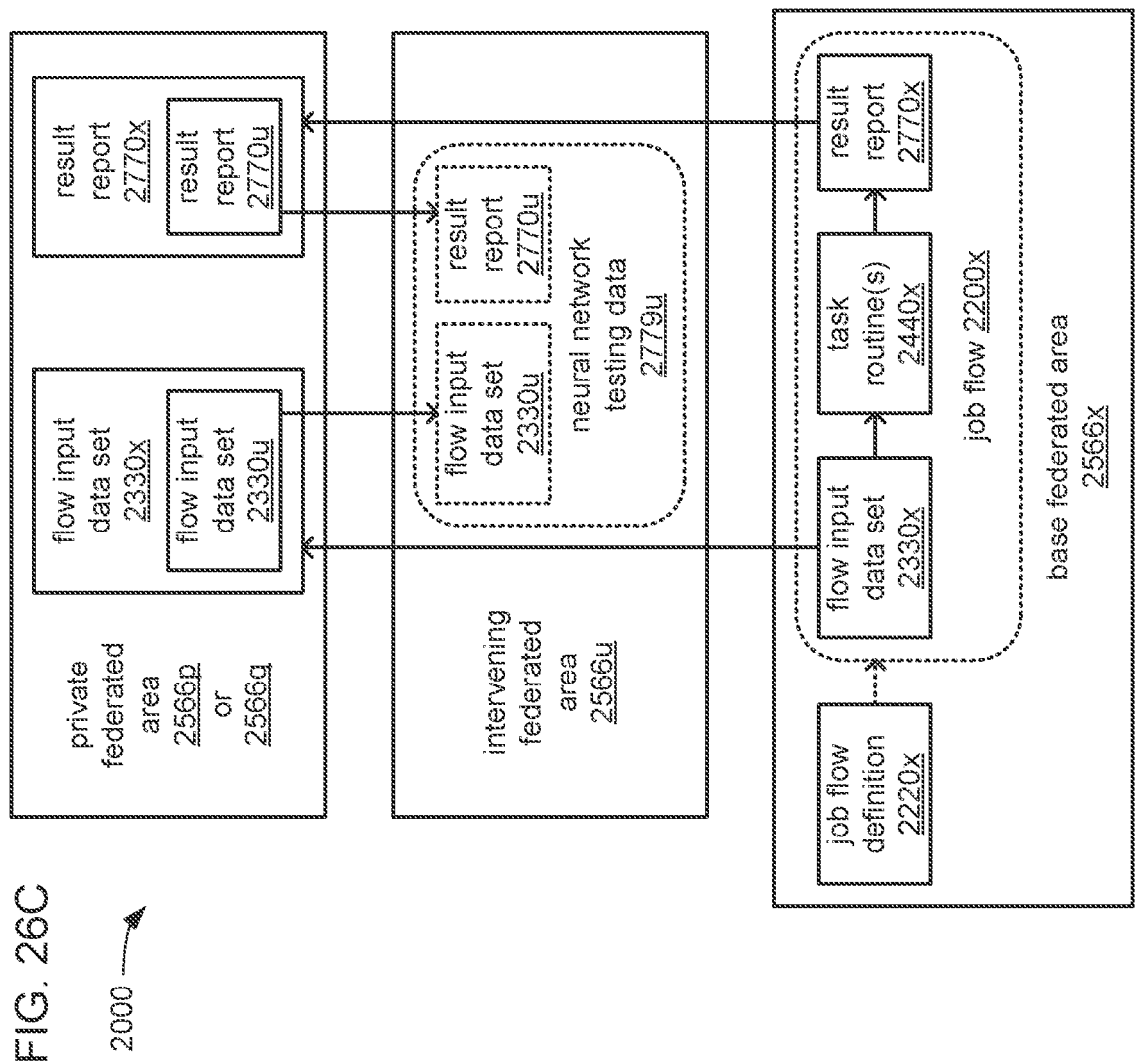

Turning to FIG. 26C, in preparation for the testing of ensemble 2574 of the neural networks 2571a-x, a user with access to the private federated area 2566p or 2566q may generate the flow input data set 2330u and the corresponding result report 2770u of the neural network testing data 2779u for use in performing such testing from the flow input data set 2330x and the result report 2770x, respectively, generated during earlier performances of the job flow 2200x.

Figure 26D:
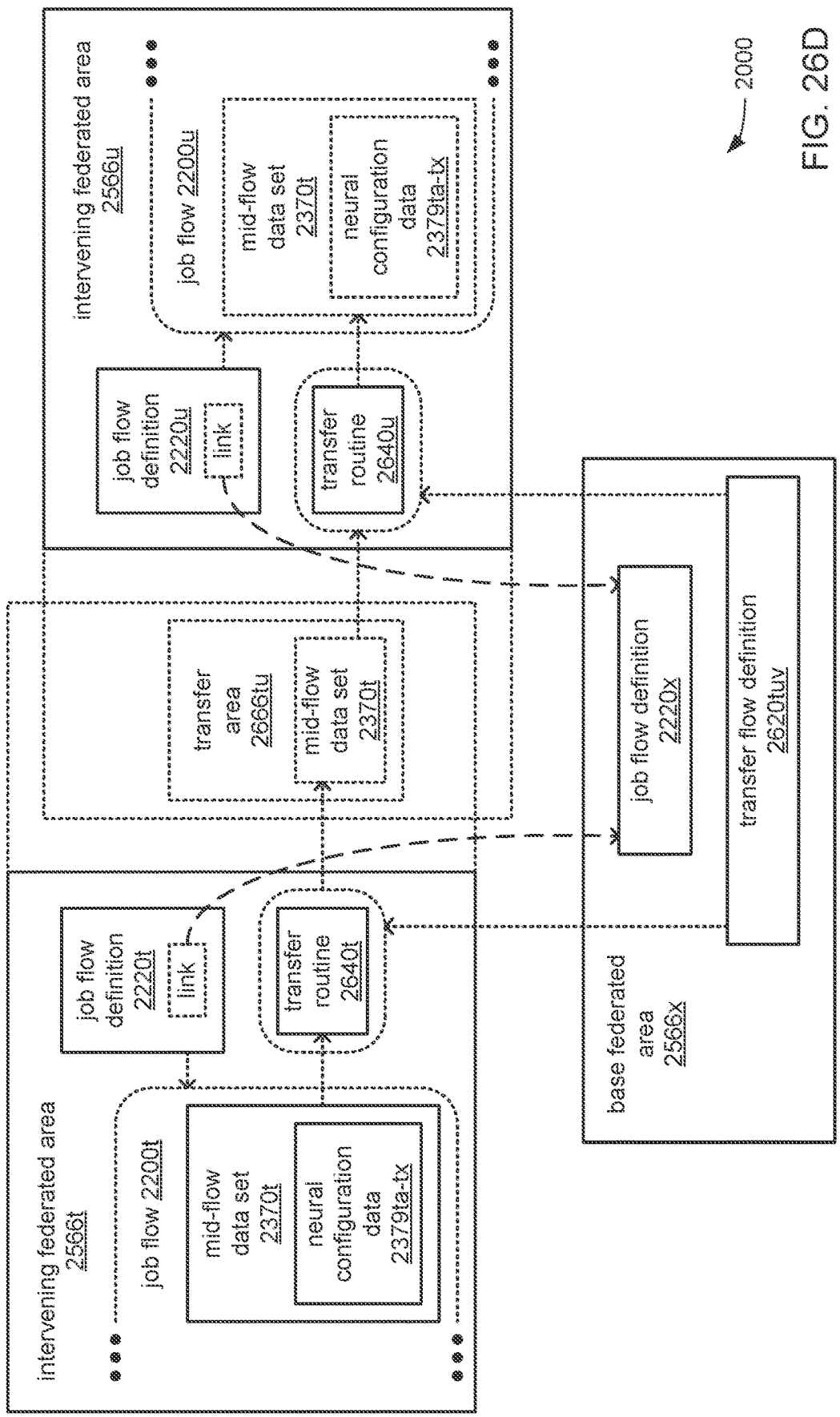

Turning to FIG. 26D, in response to a determination being made, as a result of execution of the transfer routine 2640t, that a condition has been met for the cessation of training and the commencement of testing, a transfer of the neural network configuration data 2371ta through 2371tx may be performed between the intervening federated areas 2566t and 2566u through the transfer area 2666tu. As previously discussed, as a measure to keep the set of neural network configuration data 2371ta through 2371tx together, these instances of neural network configuration data may be stored together within a single mid-flow data set 2370t that becomes the data object that is transferred through the transfer area 2666tu, as depicted.

Figure 26E:
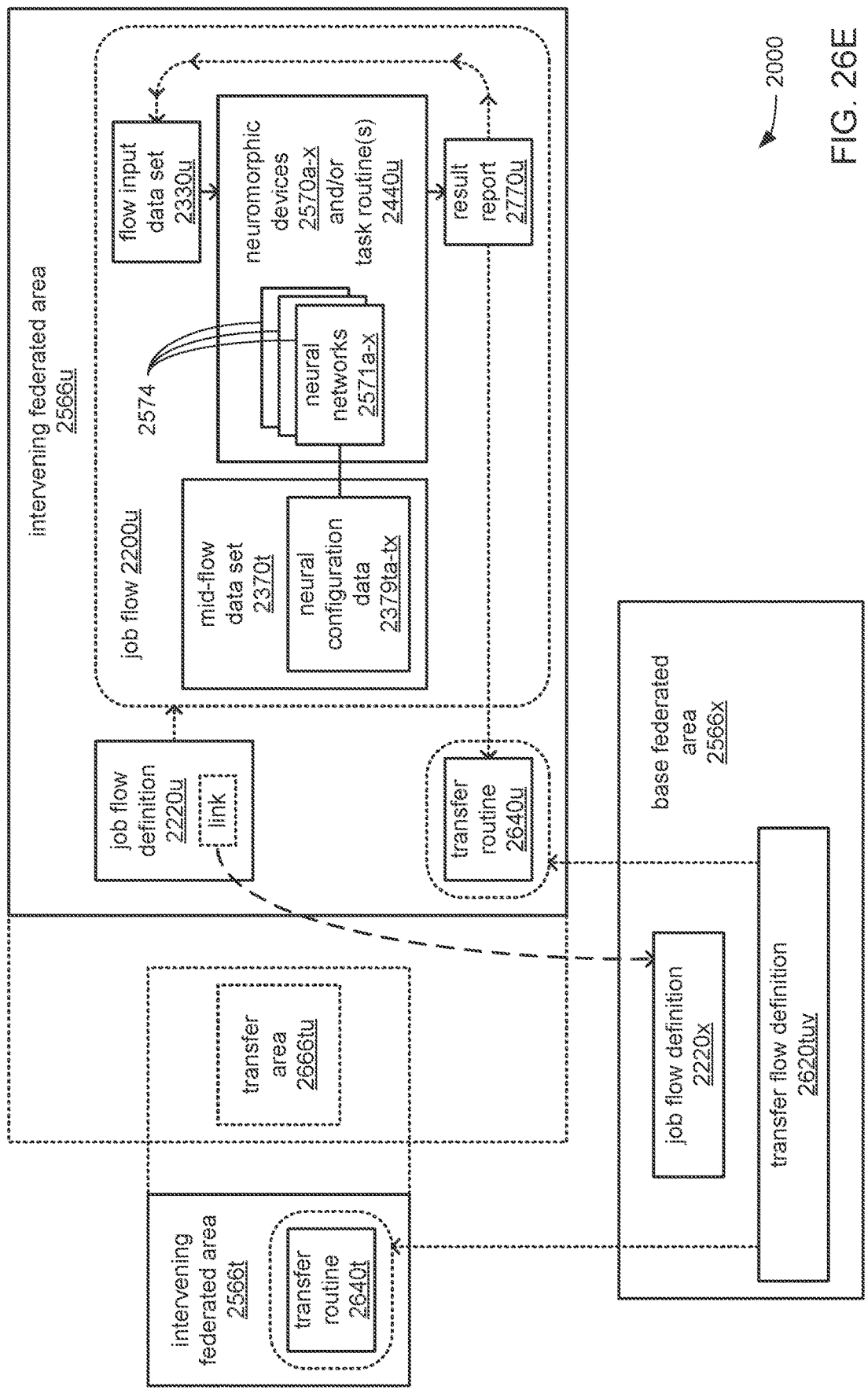

Turning to FIG. 26E, with the neural network testing data 2779u having already been generated (or continuing to be generated on an ongoing basis as the job flow 2200x continues to be performed), the testing job flow 2200u may be performed to test the ensemble 2574 of the neural networks 2571a-x. As the testing job flow 2200u is performed to effect such testing, execution of the transfer routine 2640u at least partially in parallel with the task routine(s) 2440u of the job flow 2200u may cause a processor 2550 to perform a recurring analysis of one or more aspects of the testing of the ensemble 2574 of the neural networks 2571a-x to determine whether a condition has been met to cease the testing and to either perform retraining to generate a new ensemble 2574 of the neural networks 2571a-x, or to begin usage of the current ensemble 2574. Again, such a condition may the degree of accuracy of the ensemble 2574 in performing the analytical function (e.g., generating time series predictions) as determined through analyses of output values of both of the job flows 2200u and 2200x.

As also depicted in FIG. 26E, and as previously discussed in reference to FIG. 16G, the testing job flow definition 2220u may include the job flow identifier or other form of reference to the job flow 2200x and/or the job flow definition 2220x that serves as an indication of the job flow 2200x and/or performance(s) thereof having been used to generate the neural network testing data 2779u used to test the ensemble 2574. Again, this may serve as an aid to ensuring accountability for various aspects of the testing of the ensemble 2574.

Figure 26F:
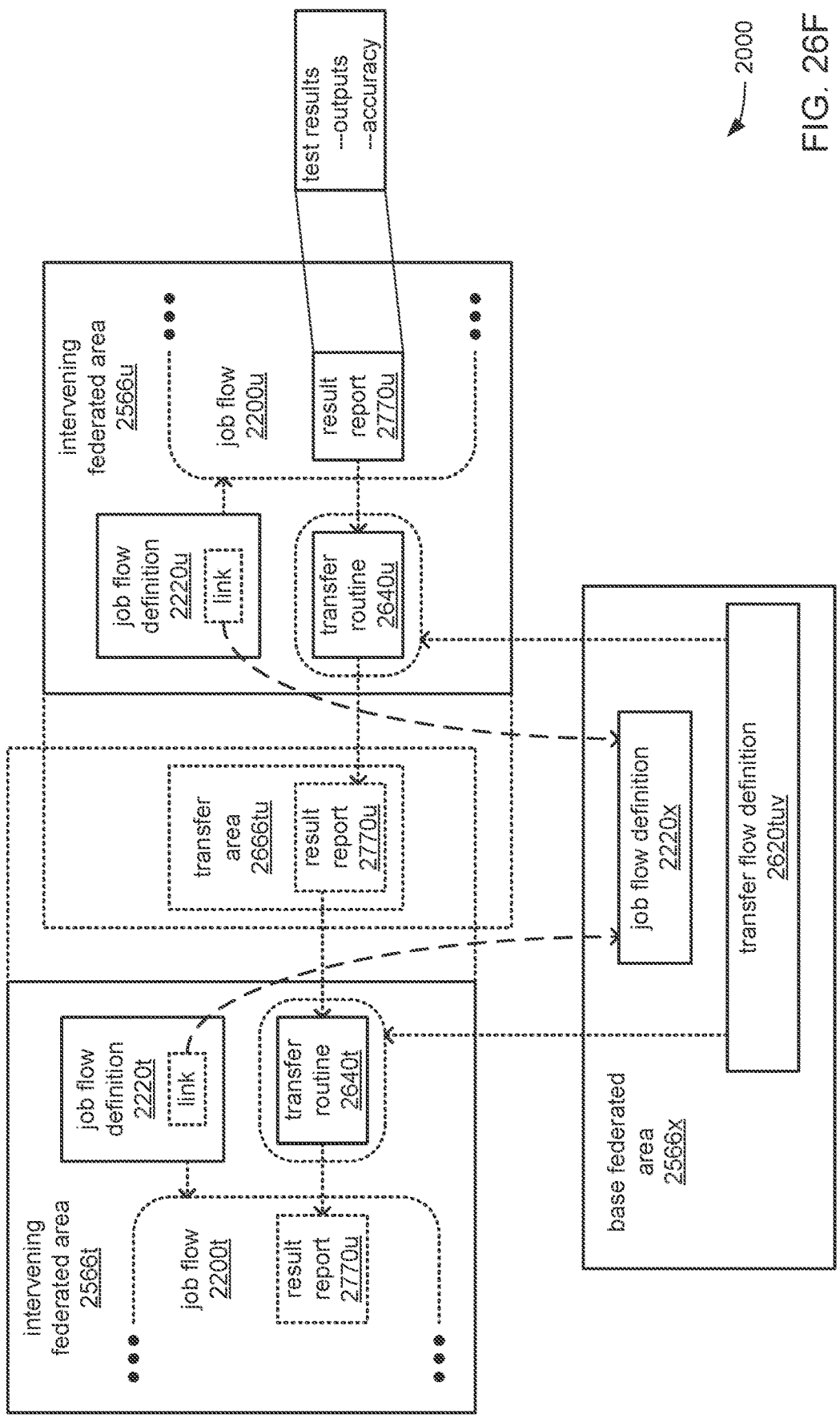

Turning to FIG. 26F, in response to a determination being made, as a result of execution of the transfer routine 2640u, that a condition has been met for the cessation of testing and the commencement of retraining to generate a new set of the neural networks 2571a-x of a new ensemble 2574, a transfer of the result report 2770u, and/or another data object indicative of the degree of accuracy of the current ensemble 2574 (and/or indicative of instances where the current ensemble 2574 has provided inaccurate output) may be performed between the intervening federated areas 2566u and 2566t back through the transfer area 2666tu. As previously discussed, such retraining may entail the use of different hyperparameters in generating a new set of the neural networks 2571a-x in an effort to cause the new ensemble 2574 to be more accurate.

Figure 26G:
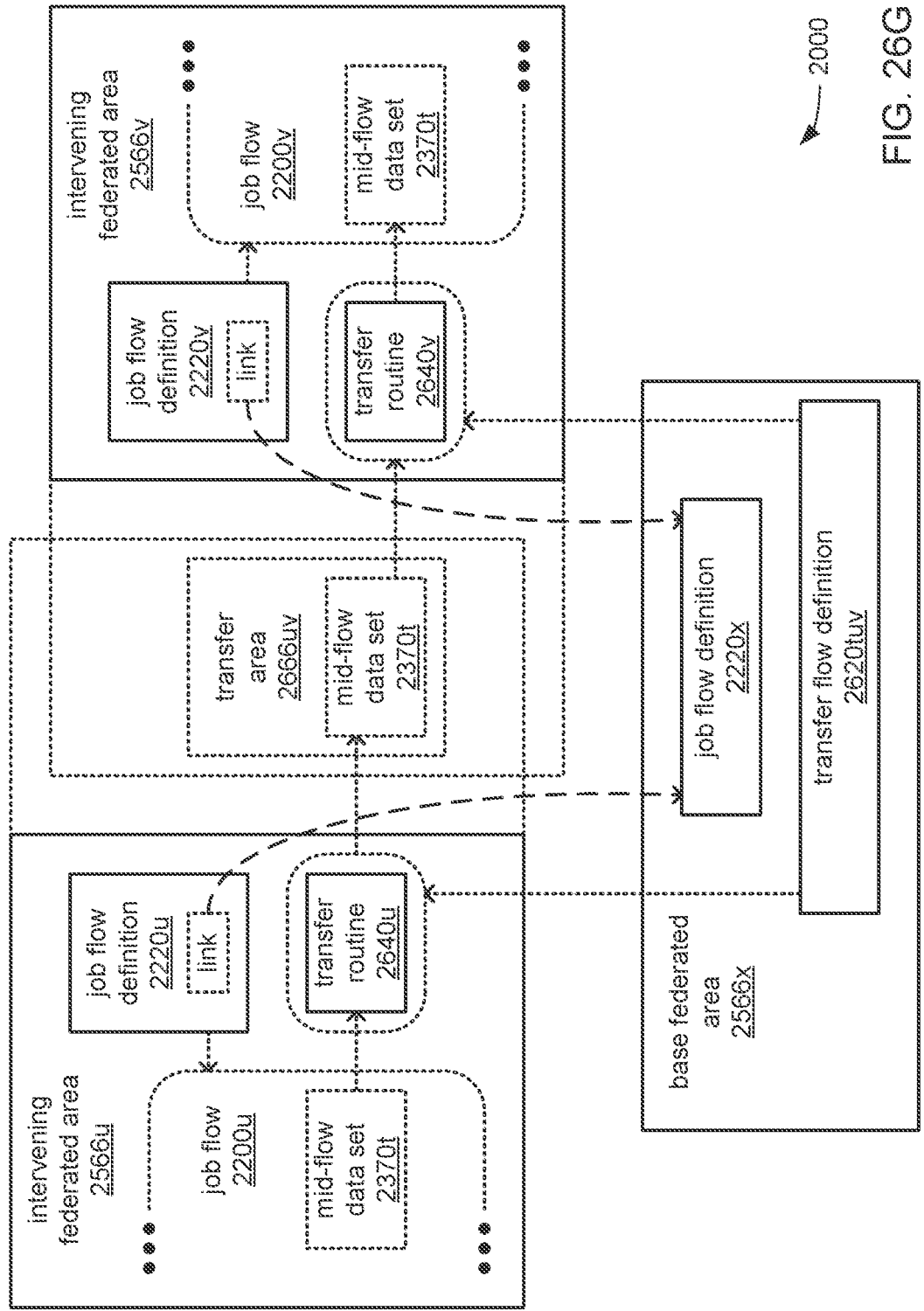

Alternatively, and turning to FIG. 26G, in response to a determination being made, as a result of execution of the transfer routine 2640u, that a condition has been met for the cessation of testing and the commencement of usage of the current ensemble 2574, a transfer of the data set 2370t that conveys the neural network configuration data 2379ta-tx may be performed between the intervening federated areas 2566u and 2566v through the transfer area 2666uv. As previously discussed, such usage of the ensemble 2574 may, at least initially, entail performances of the job flow 2200v to use the ensemble 2574 at least partially in parallel with performances of the job flow 2200x to perform some degree of ongoing checks of the accuracy of the ensemble 2574 in performing the analytical function.

Figure 27A:
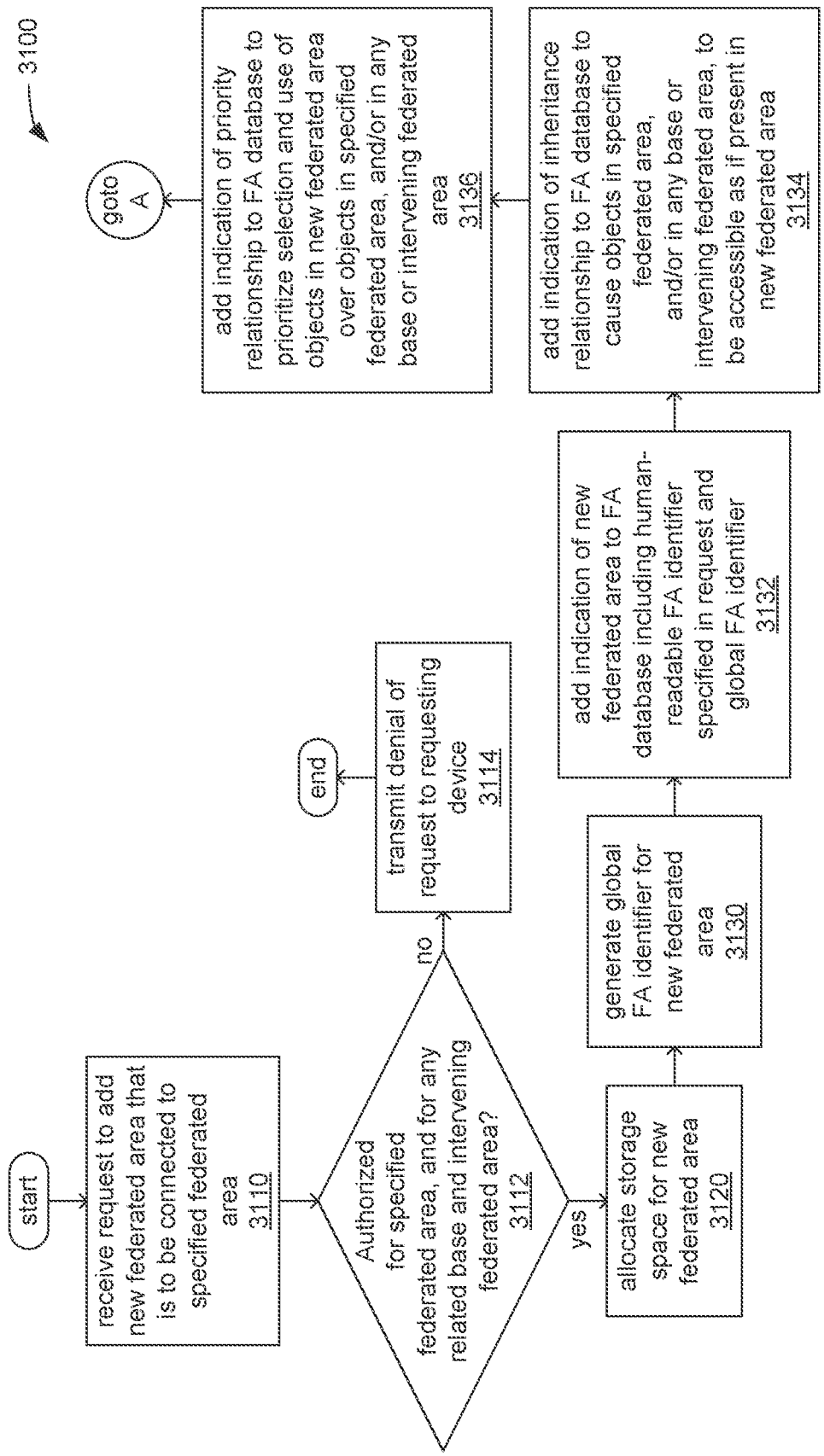
Figure 28B:
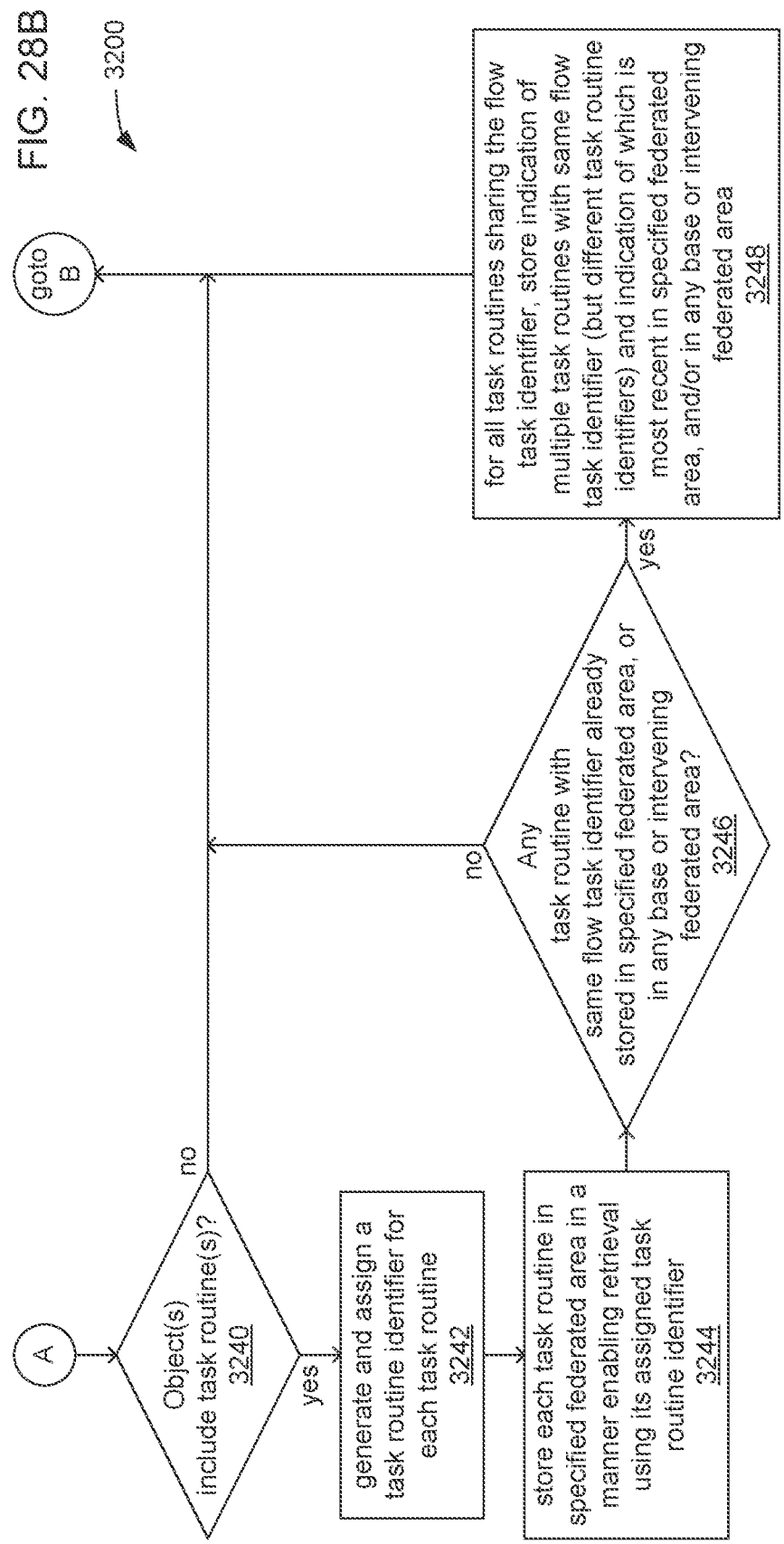
Figure 28C:
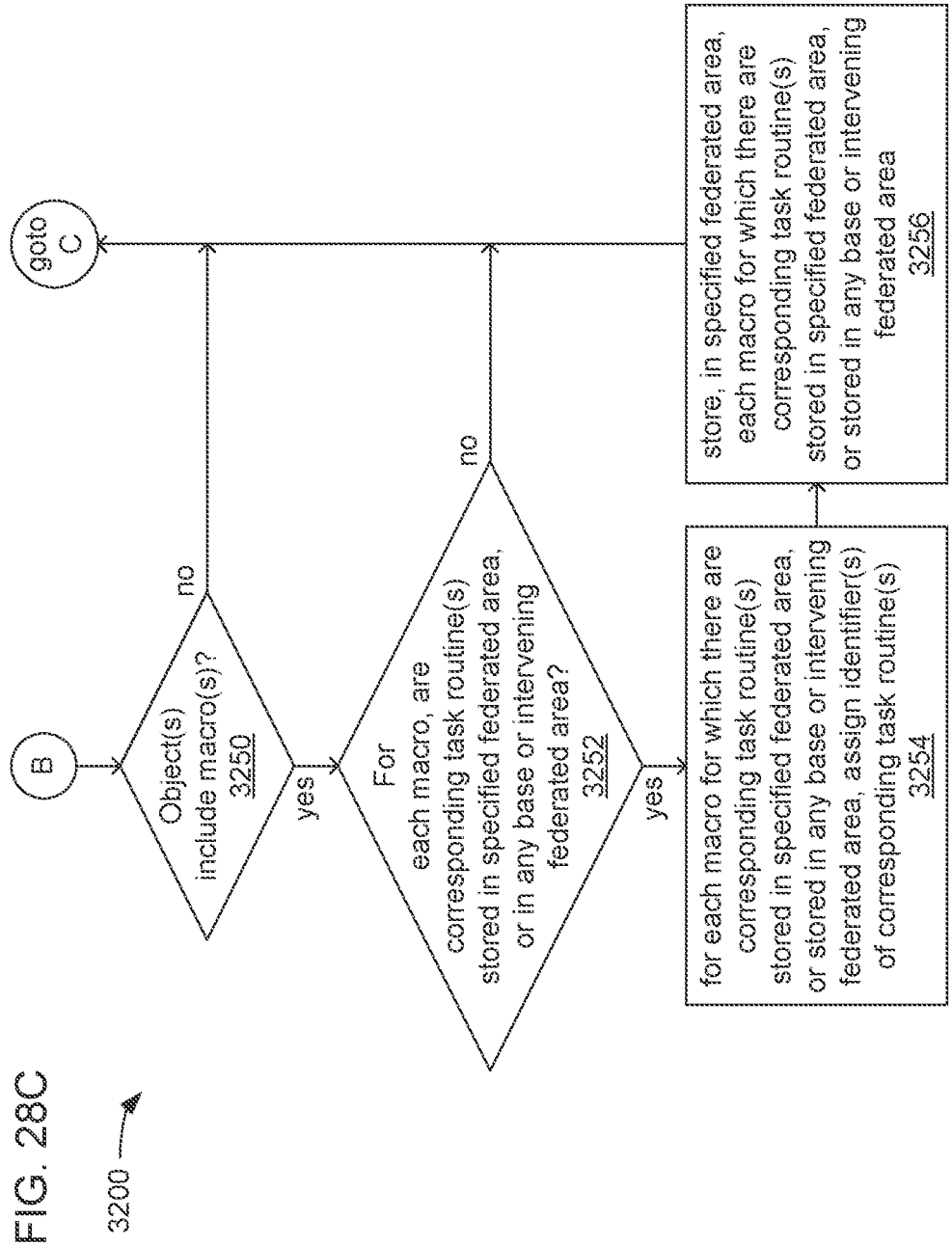
Figure 28D:
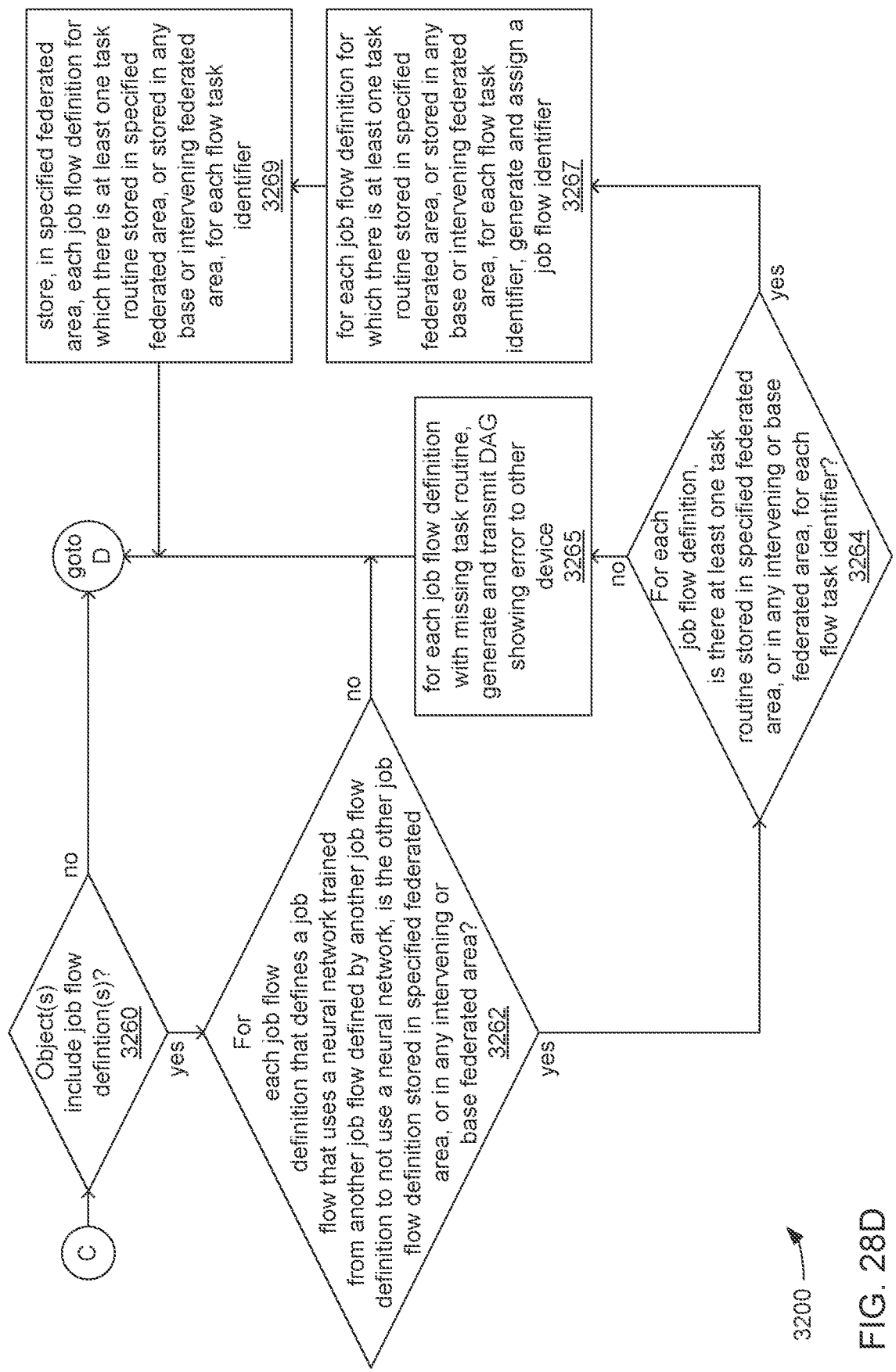
Figure 28E:
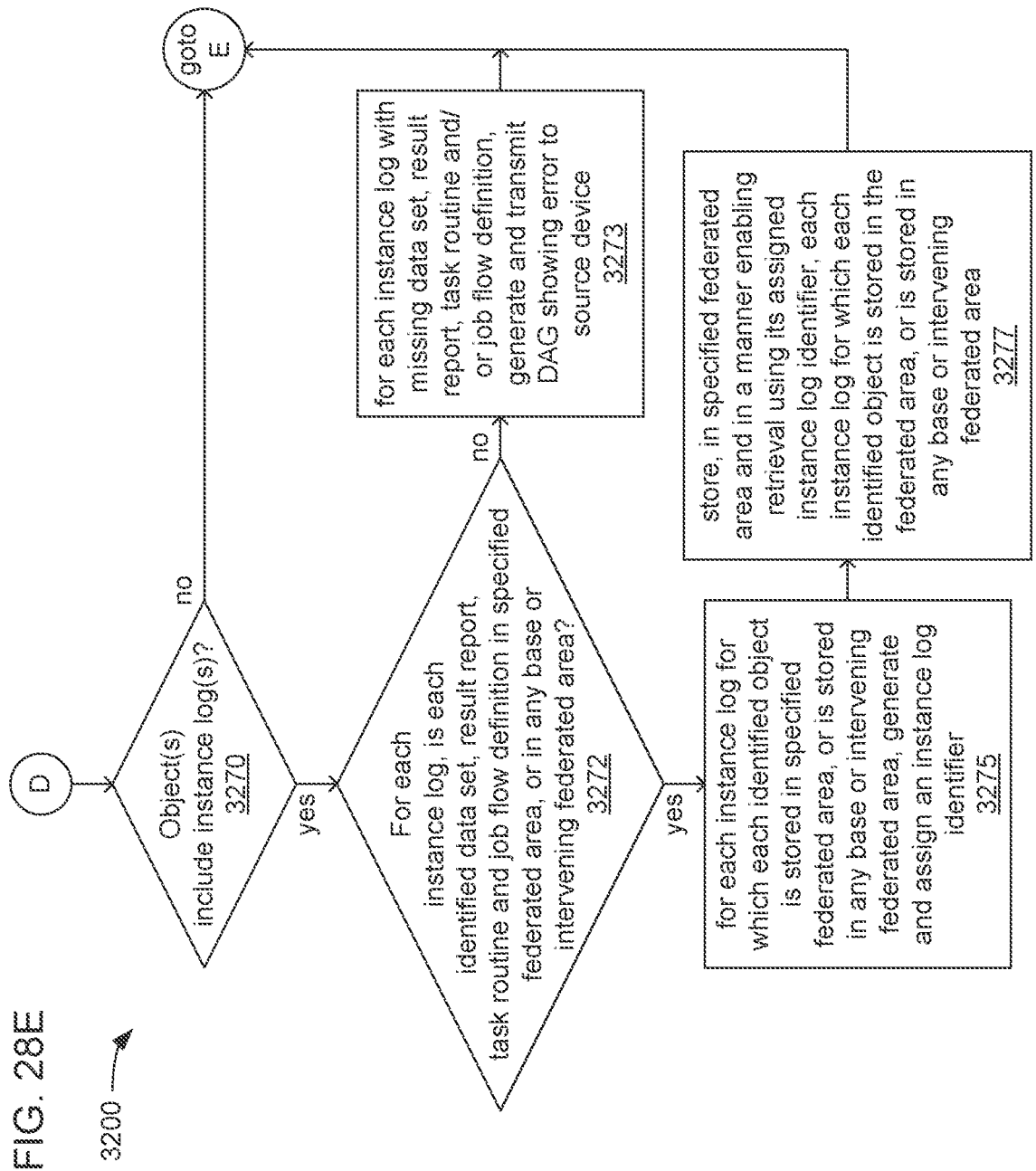

FIGS. 27A and 27B, together, illustrate an example embodiment of a logic flow 3100. The logic flow 3100 may be representative of some or all of the operations executed by one or more embodiments described herein. More specifically, the logic flow 3100 may illustrate operations performed by the processor(s) 2550 in executing the control routine 2540, and/or performed by other component(s) of at least one of the federated devices 2500.

At 3110, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to add a new federated area to be connected to a specified existing federated area. As has been discussed, such a portal may employ any of a variety of protocols and/or handshake mechanisms to enable the receipt of requests for various forms of access to the federated area by other devices, as well as to exchange objects with other devices, via the network.

At 3112, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area (as well as for any related base federated area and/or any related intervening federated area), and/or has been granted a level of access that includes the authorization to make such requests. Again, the processor may require the receipt of one or more security credentials from devices and/or users from which such requests are received. If, at 3112, the processor determines that the request is not from an authorized device and/or is not from a person and/or entity authorized as a user with sufficient access to make such a request, then the processor may transmit an indication of denial of the request to the device from which the request is received via the network at 3114.

However, if at 3112, the processor determines that the request is authorized, then at 3120, the processor may allocate storage space within the one or more federated devices, and/or within one or more storage devices under the control of the one or more federated devices, for the requested new federated area that is connected to (e.g., branches from) the specified existing federated area.

At 3130, the processor may generate a new global federated area identifier (GUID) that is to be used to uniquely identify the new federated area (e.g., a new global federated area identifier 2569). At 3132, the processor may add an indication of the creation of the requested new federate area, as well as the manner in which the requested new federated area is connected to the specified existing federated area to a federated area database that may store indications of the existence of each federated area, which users and/or devices are granted access to each, and/or how each federated area may be connected or otherwise related to one or more others (e.g., within the portal data 2539 and/or the federated area parameters 2536). In so doing, the new federated area, the specified existing federated area and/or other federated areas may be identified and referred to within such databases by their global federated area identifiers and/or human-readable federated area identifiers (e.g., the human-readable federated area identifiers 2568), with the global federated area identifiers serving to resolve any conflict that may arise among the human-readable federated area identifiers).

At 3134, the processor may add an indication to such a database of an inheritance relationship among the new federated area, the specified existing federated area, any base federated area to which the specified existing federated area is related, and any intervening federated area present between the specified existing federated area and the base federated area. As has been discussed, with such an inheritance relationship in place, any object stored within any base federated area to which the specified existing federated area may be related, within the specified existing federated, and/or within any intervening federated area that may be present between the specified existing federated area and such a base federated area may become accessible from within the new federated area as if stored within the new federated area.

At 3136, the processor may add an indication to such a database of a priority relationship among the new federated area, the specified existing federated area, any base federated area to which the specified existing federated area is related, and any intervening federated area present between the specified existing federated area and the base federated area. As has been discussed, with such a priority relationship in place, the use of objects stored within the new federated area is given priority over the use of similar objects (e.g., other task routines 2440 that perform the same task) that may be stored within any base federated area to which the specified existing federated area may be related, within the specified existing federated, and/or within any intervening federated area that may be present between the specified existing federated area and such a base federated area.

At 3140, the processor may check whether there is at least one other existing federated area that is connected to the requested new federated area within a set of related federated areas such that it is to have at least an inheritance relationship with the requested new federated area such that it is to inherit objects from the requested new federated area. As has been discussed, this may occur where the requested new federated area is requested to be instantiated at a position within a linear hierarchy or within a branch of a hierarchical tree such that it is interposed between two existing federated areas.

If, at 3140, there is such another federated area, then at 3142, the processor may add an indication to such a database of an inheritance relationship among the other existing federated area, the requested new federated area, the specified existing federated area, any base federated area to which the specified existing federated area and the other federated area are related, and any intervening federated area present between the specified existing federated area and the base federated area. In this way, any object stored within any base federated area, within the specified existing federated, within any intervening federated area that may be present between the specified existing federated area and such a base federated area, or within the requested new federated area may become accessible from within the other existing federated area as if stored within the other existing federated area.

At 3144, the processor may add an indication to such a database of a priority relationship among the other existing federated area, the requested new federated area, the specified existing federated area, any base federated area to which the specified existing federated area is related, and any intervening federated area present between the specified existing federated area and the base federated area. In this way, the use of objects stored within the other existing federated area is given priority over the use of similar objects (e.g., other task routines 2440 that perform the same task) that may be stored within the requested new federated area, any base federated area to which the specified existing federated area may be related, within the specified existing federated, and/or within any intervening federated area that may be present between the specified existing federated area and such a base federated area.

FIGS. 28A, 28B, 28C, 28D, 28E and 28F, together, illustrate an example embodiment of a logic flow 3200. The logic flow 3200 may be representative of some or all of the operations executed by one or more embodiments described herein. More specifically, the logic flow 3200 may illustrate operations performed by the processor(s) 2550 in executing the control routine 2540, and/or performed by other component(s) of at least one of the federated devices 2500.

At 3210, a processor of a federated device of a distributed processing system (e.g., at least one processor 2550 of one of the federated devices 2500 of the distributed processing system 2000) may receive a request from another device, via a network (e.g., one of the source devices 2100, or one of the reviewing devices 2800, via the network 2999) and through a portal provided by the processor for access to other devices via the network, to store one or more objects (e.g., one or more of the objects 2220, 2270, 2330, 2370, 2440, 2470, 2720 and/or 2770) within a specified federated area (e.g., one of the federated areas 2566). As has been discussed, such a portal may employ any of a variety of protocols and/or handshake mechanisms to enable the receipt of requests for various forms of access to a federated area by other devices, as well as to exchange objects with other devices, via the network.

At 3212, in embodiments in which the federated device(s) that provide federated area(s) also control access thereto, the processor may perform a check of whether the request is from an authorized device and/or from an authorized person or entity (e.g., scholastic, governmental or business entity) operating the other device that is an authorized user of the specified federated area, and/or has been granted a level of access that includes the authorization to make such requests. As has been discussed, the processor may require the receipt of one or more security credentials from devices from which requests are received. If, at 3212, the processor determines that the request is not from a device and/or user authorized to make such a request, then the processor may transmit an indication of denial of the request to the device via the network at 3214.

However, if at 3212, the processor determines that the request to store one or more objects within the specified federated area is authorized, then at 3220, the processor may check whether the one or more objects includes one or more data sets (e.g., one or more of the flow input data sets 2330 and/or one or more mid-flow data sets 2370). If so, then the processor may generate and assign a data object identifier for each data set that is to be stored (e.g., one or more of the data object identifiers 3331) at 3222. At 3224, the processor may store each of the one or more data sets within the specified federated area.

At 3230, the processor may check whether the one or more objects includes one or more result reports (e.g., one or more of the result reports 2770). If so, then the processor may generate and assign a result report identifier for each result report that is to be stored (e.g., one or more of the result report identifiers 2771) at 3232. At 3234, the processor may store each of the one or more result reports within the specified federated area.

At 3240, the processor may check whether the one or more objects includes one or more task routines (e.g., one or more of the task routines 2440). If so, then the processor may generate and assign a task routine identifier for each task routine that is to be stored (e.g., one or more of the task routine identifiers 2441) at 3242. At 3244, the processor may store each of the one or more task routines within the specified federated area. At 3246, the processor may additionally check whether any of the task routines stored at 3244 have the same flow task identifier as another task routine that was already stored within the specified federated area (or within any base federated area to which the specified federated area is related and/or within any intervening federated area interposed therebetween), such that there is more than one task routine executable to perform the same task. If so, then at 3248 for each newly stored task routine that shares a flow task identifier with at least one other task routine already stored in the specified federated area (or within such a base or intervening federated area), the processor may store an indication of there being multiple task routines with the same flow task identifier, along with an indication of which is the most recent of the task routines for that flow task identifier.

As has been discussed, in embodiments in which task routines are stored in a manner organized into a database or other data structure (e.g., the task routine database 2564 within one or more related federated areas) by which flow task identifiers may be employed as a mechanism to locate task routines, the storage of an indication of there being more than one task routine sharing the same flow task identifier may entail associating more than one task routine with the same flow task identifier so that a subsequent search for task routines using that flow task identifier will beget a result indicating that there is more than one. As has also been discussed, the manner in which one of multiple task routines sharing the same flow task identifier may be indicated as being the most current version may entail ordering the manner in which those task routines are listed within the database (or other data structure) to cause the most current one to be listed at a particular position within that order (e.g., listed first).

At 3250, the processor may check whether the one or more objects includes one or more macros (e.g., one or more of the macros 2470). If so, then at 3252, the processor may additionally check, for each macro, whether there is a corresponding task routine (or corresponding multiple versions of a task routine in embodiments in which a single macro may be based on multiple versions) stored within the specified federated area (or within any base federated area to which the specified federated area is related and/or within any intervening federated area interposed therebetween). If, at 3252, there are any macros requested to be stored for which there is a corresponding task routine (or corresponding multiple versions of a task routine) stored in the specified federated area (or within such a base or intervening federated area), then for each such macro, the processor may assign the job flow identifier (e.g., one or more of the job flow identifiers 2221) of the corresponding task routine (or may assign job flow identifiers of each of the versions of a task routine) at 3254. At 3256, the processor may store each of such macros.

At 3260, the processor may check whether the one or more objects includes one or more job flow definitions (e.g., one or more of the job flow definitions 2220). If so, then at 3262, the processor may additionally check, for each job flow definition, whether that job flow definition defines a job flow that uses a neural network and was trained and/or tested using objects associated with another job flow (and/or performances thereof) that is defined to by its job flow definition to not use a neural network. As previously discussed, the preservation of such links between a neuromorphic job flow and an earlier non-neuromorphic job flow from which the neuromorphic job flow may be in some way derived may be of importance to ensuring accountability during a later evaluation of the neuromorphic job flow. For this reason, it may be deemed important to ensure that objects associated with the other non-neuromorphic job flow have already been stored in federated area(s) where they can be preserved for subsequent retrieval during such an evaluation of the neuromorphic job flow.

Presuming that there are no neuromorphic job flows requested to be stored that were derived from another non-neuromorphic job flow that is not already so stored, then at 3264, the processor may additionally check, for each job flow definition, whether there is at least one task routine stored within the specified federated area (or within any base federated area to which the specified federated area is related and/or within any intervening federated area interposed therebetween) for each task specified by a flow task identifier within the job flow definition. If, at 3264, there are any job flow definitions requested to be stored for which there is at least one task routine stored in the specified federated area (or within such a base or intervening federated area) for each task, then for each of those job flow definitions where there is at least one stored task routine for each task, the processor may generate and assign a job flow identifier (e.g., one or more of the job flow identifiers 2221) at 3267, and at 3269, may then store each of the one or more job flow definitions for which there was at least one task routine for each task. Otherwise, at 3265, for each job flow for which there is no task routine stored for one or more tasks, the processor may generate a DAG (e.g., one of the DAGs 2270) that provides a visual indication of the lack of task routines for each such task, and may transmit the DAG to the other device.

At 3270, the processor may check whether the one or more objects includes one or more instance logs (e.g., one or more of the instance logs 2720). If so, then at 3272, the processor may additionally check, for each instance log, whether each object identified in the instance log by its identifier is stored within the specified federated area (or within any base federated area to which the specified federated area is related and/or within any intervening federated area interposed therebetween). If, at 3272, there are any instance logs requested to be stored for which each specified object is stored within the specified federated area (or within such a base or intervening federated area), then for each instance log where each object specified therein is so stored, the processor may generate and assign an instance log identifier (e.g., one or more of the instance log identifiers 2721) at 3275, and at 3277, may then store each of the one or more instance logs for which each specified object is so stored. Otherwise, at 3273, for each instance log for which there is an identified object that is not stored, the processor may generate a DAG that provides a visual indication of each such missing object, and may transmit the DAG to the other device.

At 3280, the processor may check whether the one or more objects includes one or DAGs. If so, then at 3282, the processor may additionally check, for each DAG, whether there is a corresponding task routine (or corresponding multiple versions of a task routine) for each task graph object (e.g., one of the task graph objects 2984) and whether there is a corresponding data object for each data graph object (e.g., each data graph object 2983 or 2987) stored within the specified federated area (or within any base federated area to which the specified federated area is related and/or within any intervening federated area interposed therebetween). If, at 3282, there are any of such DAGs to be stored in the specified federated area (or within such a base or intervening federated area) for which all of such task routines and data objects are so stored, then for each of such DAG, the processor may generate and assign a job flow identifier at 3285 in recognition of the possibility that such a DAG may be used as a new job flow definition, and at 3286, may then store each of such DAGs. Otherwise, at 3265, for each job flow for which there is no task routine stored for one or more tasks, the processor may generate a DAG (e.g., one of the DAGs 2270) that provides a visual indication of the lack of task routines for each such task, and may transmit the DAG to the other device. Otherwise, at 3283, for each DAG for which there is a task routine and/or a data object that is not stored, the processor may generate another DAG that provides a visual indication of each such missing object, and may transmit the other DAG to the other device.

FIGS. 29A, 29B and 29C, together, illustrate an example embodiment of a logic flow 3300. The logic flow 3300 may be representative of some or all of the operations executed by one or more embodiments described herein. More specifically, the logic flow 3300 may illustrate operations performed by the processor(s) 2550 in executing the control routine 2540, and/or performed by other component(s) of at least one of the federated devices 2500.

At 3310, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to store a task routine (e.g., one of the task routines 2440) within a particular federated area specified in the request (e.g., one of the federated areas 2566). Again, such a portal may be generated by the processor to employ any of a variety of protocols and/or handshake mechanisms to enable the receipt of requests for various forms of access to the federated area by other devices, as well as to exchange objects with other devices, via the network. Alternatively, at 3310, the processor may receive the task routine, via the network, and in a transfer associated with a synchronization relationship between a transfer area instantiated within the particular federated area and another transfer area instantiated within the other device, where the task routine is intended to be stored within the transfer area within the particular federated area.

At 3312, in embodiments in which the federated device(s) that provide federated area(s) also control access thereto, the processor may perform a check of whether the request or synchronization relationship transfer is from an authorized device and/or from an authorized person or entity (e.g., scholastic, governmental or business entity) operating the device that is an authorized user of the specified federated area. As has been discussed, the processor may require the receipt of one or more security credentials from devices from which requests are received and/or with which transfers of objects associated with synchronization relationships are performed. If, at 3312, the processor determines that there is no such authorization, then the processor may transmit an indication of denial of the storage of the task routine to the other device via the network at 3314.

However, if at 3312, the processor determines that there is such authorization, then at 3320, the processor may check whether the task routine has the same flow task identifier as any of the task routines already stored within the particular federated area (or within any base federated area to which the specified federated area is related and/or within any intervening federated area interposed therebetween), such that there is already stored one or more other task routines executable to perform the same task. If not at 3320, then the processor may generate and assign a task routine identifier for the task routine (e.g., one of the task routine identifiers 2441) at 3322. At 3324, the processor may store the task routine within the particular federated area in a manner that enables later retrieval of the task routine by either its identifier or by the flow task identifier of the task that it performs.

However, if at 3320, there is at least one other task routine with the same flow task identifier already stored within the particular federated area (or within such a base or intervening federated area), then at 3330, the processor may translate the portions of executable instructions within each of these task routines that implement the input and/or output interfaces to generate intermediate representation(s) of the input and/or output interfaces for each of these task routines. As has been discussed, it may be that different ones of these task routines are written in different programming languages, which may make direct comparisons of implementations of input and/or output interfaces relatively difficult, and it may be that the intermediate representations generated for each include executable instructions generated in an intermediate programming language to better facilitate such direct comparisons. Alternatively or additionally, the intermediate representations may include a data structure of various values for various parameters of input and/or output interfaces that better enable such direct comparisons. At 3332, the processor may perform such comparisons using the intermediate representations.

Based on the results of those comparisons, the processor may check at 3340: 1) whether the input interfaces (e.g., data interfaces 2443 that receive data from data objects, and/or task interfaces 2444 that receive parameters from another task routine) are implemented in the task routine in a manner that is identical to those of the one or more other task routines with the same flow task identifier that are already so stored, and 2) whether the output interfaces (e.g., data interfaces 2443 that output a data object, and/or task interfaces 2444 that output parameters to another task routine) are implemented in the task routine in a manner that is either identical to or a superset of those of the one or more task routines with the same flow task identifier that are already stored within the federated area (or within such a base or intervening federated area). If at 3340, the input interfaces are identical, and each of the output interfaces of the task routine is identical to or a superset of the corresponding output interface within the one or more other task routine(s) already stored within the federated area (or within such a base or intervening federated area), then the processor may generate and assign a task routine identifier for the task routine at 3350. At 3352, the processor may store the task routine within the specified federated area in a manner that enables later retrieval of the task routine by either its identifier or by the flow task identifier of the task that it performs. At 3354, the processor may also store an indication of there being multiple task routines with the same flow task identifier, along with an indication of which is the most recent of the task routines for that flow task identifier.

However, if at 3340, the input interfaces are not identical, or the output interface(s) of the task routine are neither identical nor a superset, then at 3342, the processor may generate a DAG (e.g., one of the DAGs 2270) that provides a visual indication of the mismatch, and may transmit the DAG to the other device. If, at 3344, the task routine was received in a transfer from the other device as a result of a synchronization relationship, then the processor may proceed with the assignment of a task routine identifier at 3350, followed by storage of the task routine, etc. As has been discussed, proceeding with the storage of the task routine in spite of such a mismatch in implementations of input and/or output interfaces may be deemed desirable as it results in the synchronization relationship between the two transfer areas being maintained such that the contents of the two transfer areas are caused to be synchronized with each other. It may be deemed sufficient that the DAG providing a visualization of the details of the mismatch is generated and provided to the other device as a mechanism to notify the developer(s) who created the task routine so that they are able to correct it.

Figure 30A:
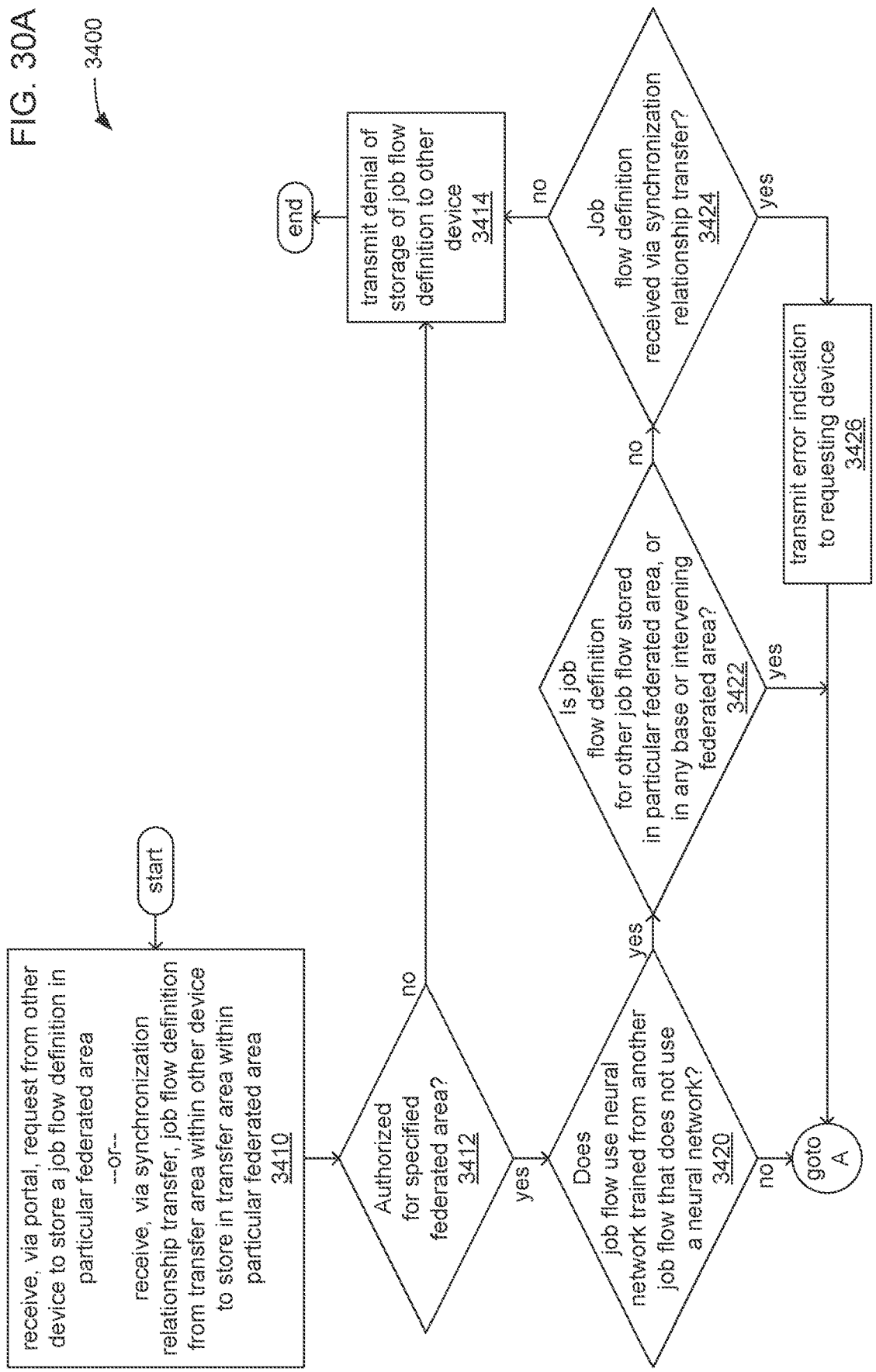
Figure 30B:
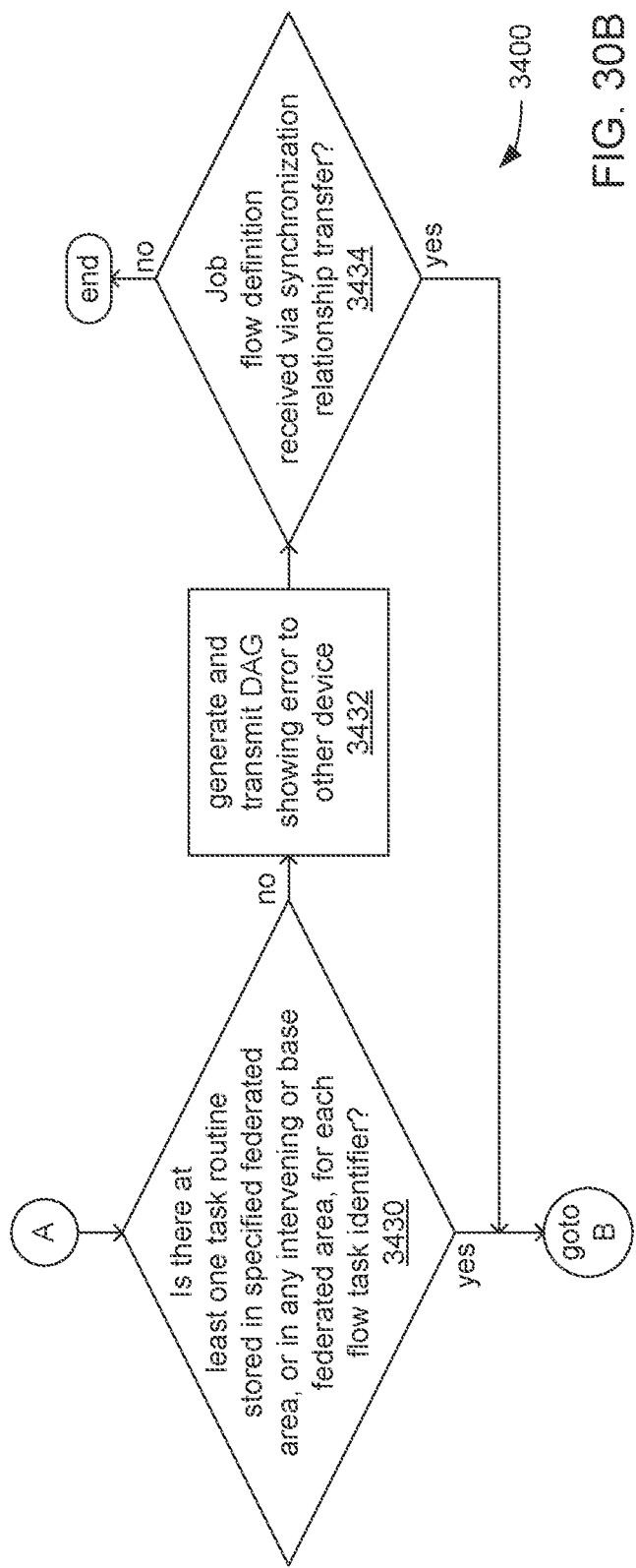
Figure 30C:
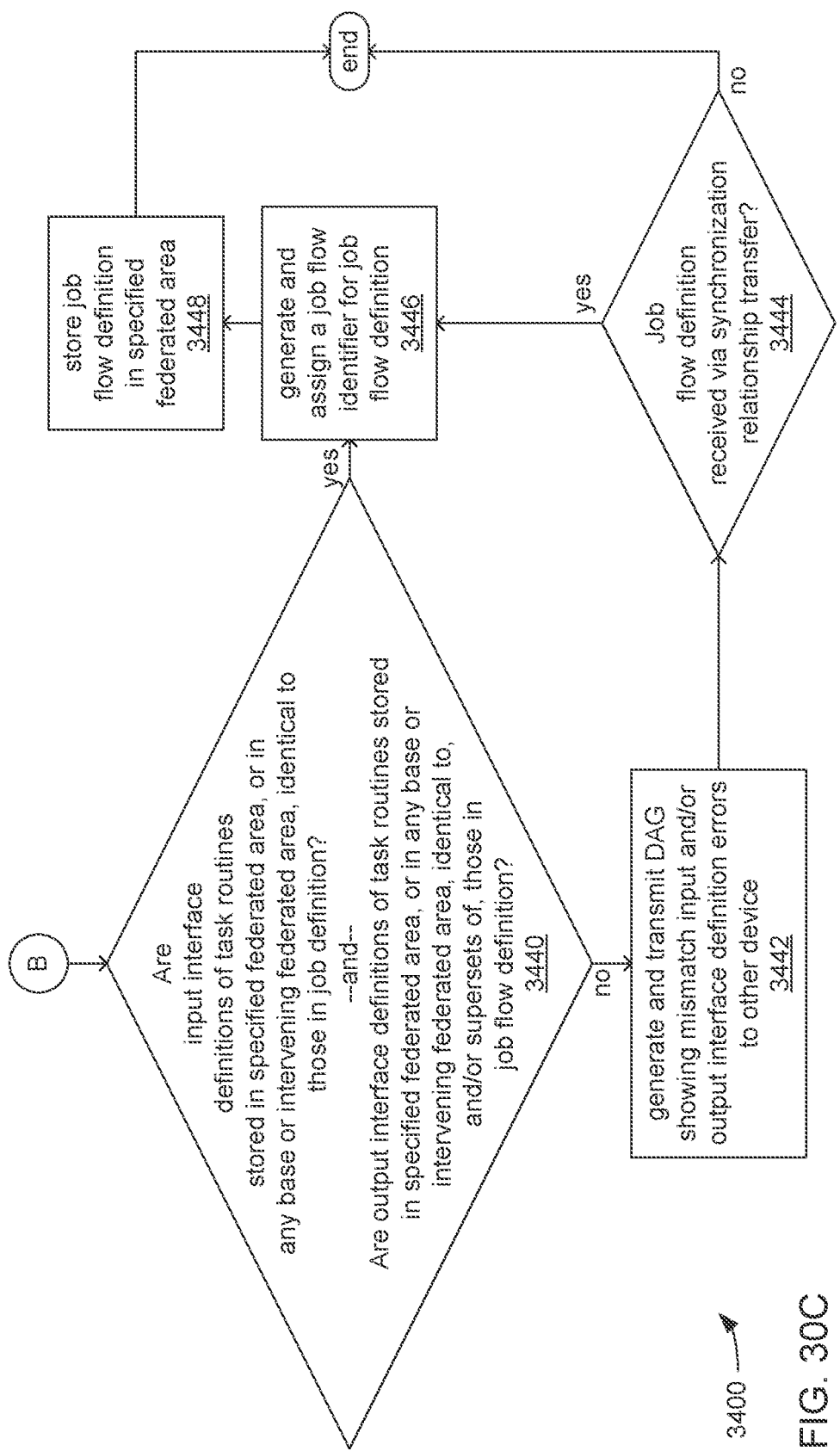
Figure 31A:
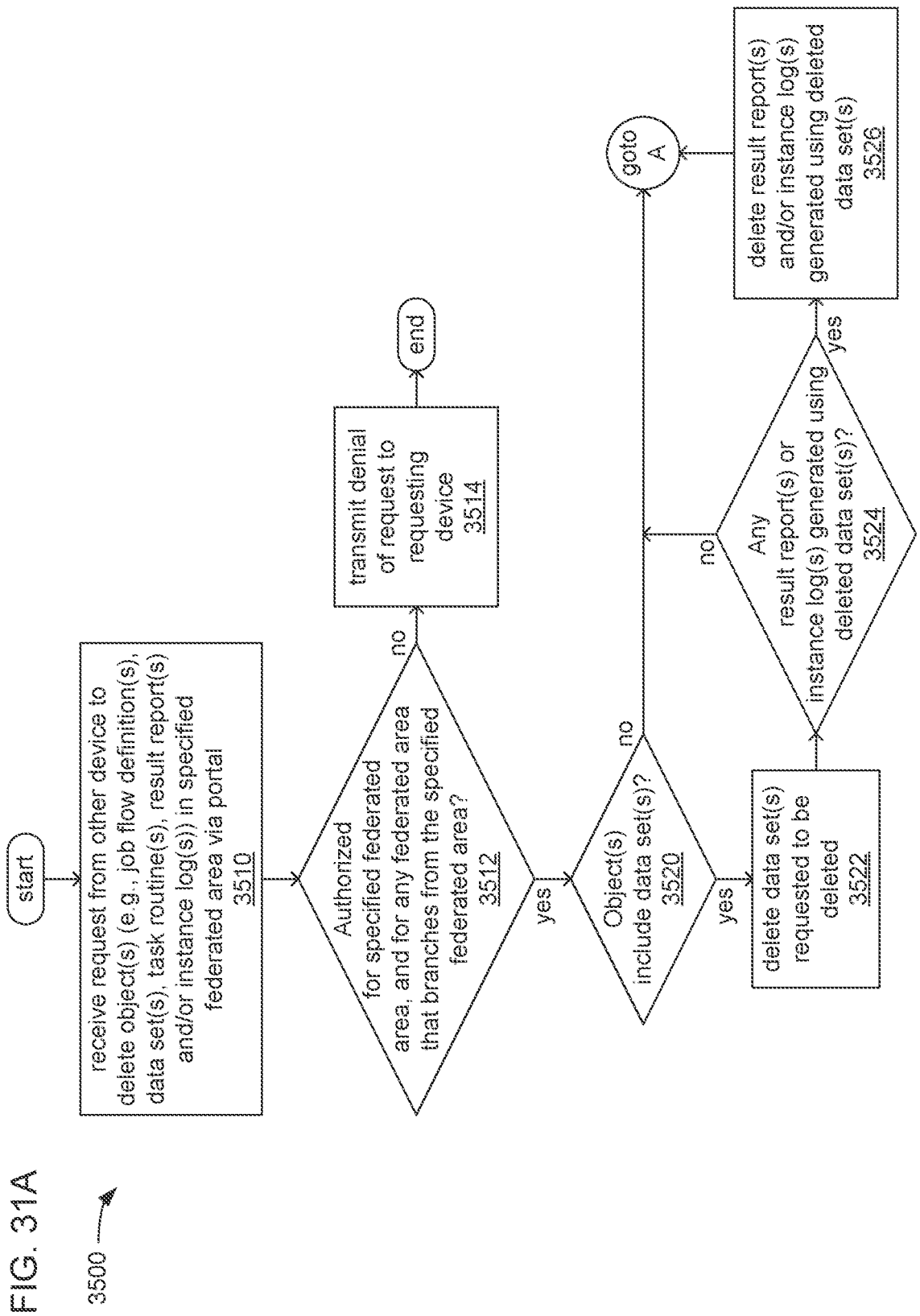
FIGS. 31A, 31B, 31C and 31D, together, illustrate an example embodiment of a logic flow of a federated device deleting objects stored within a federated area.
Figure 31B:
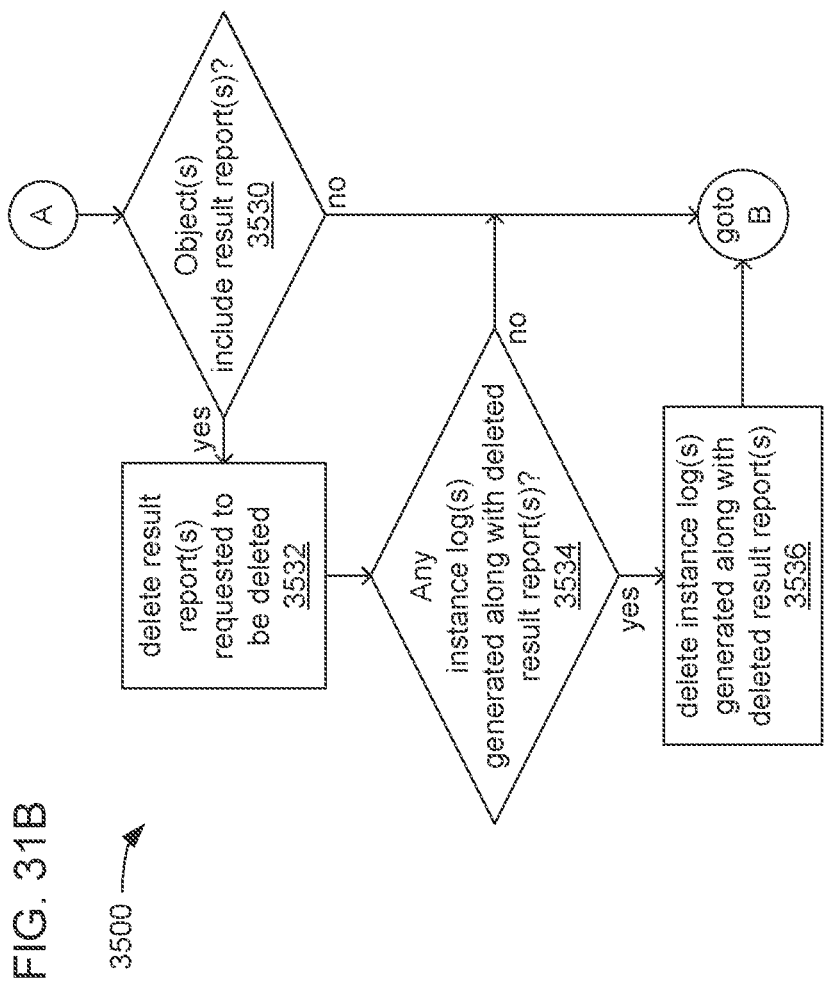
Figure 31C:
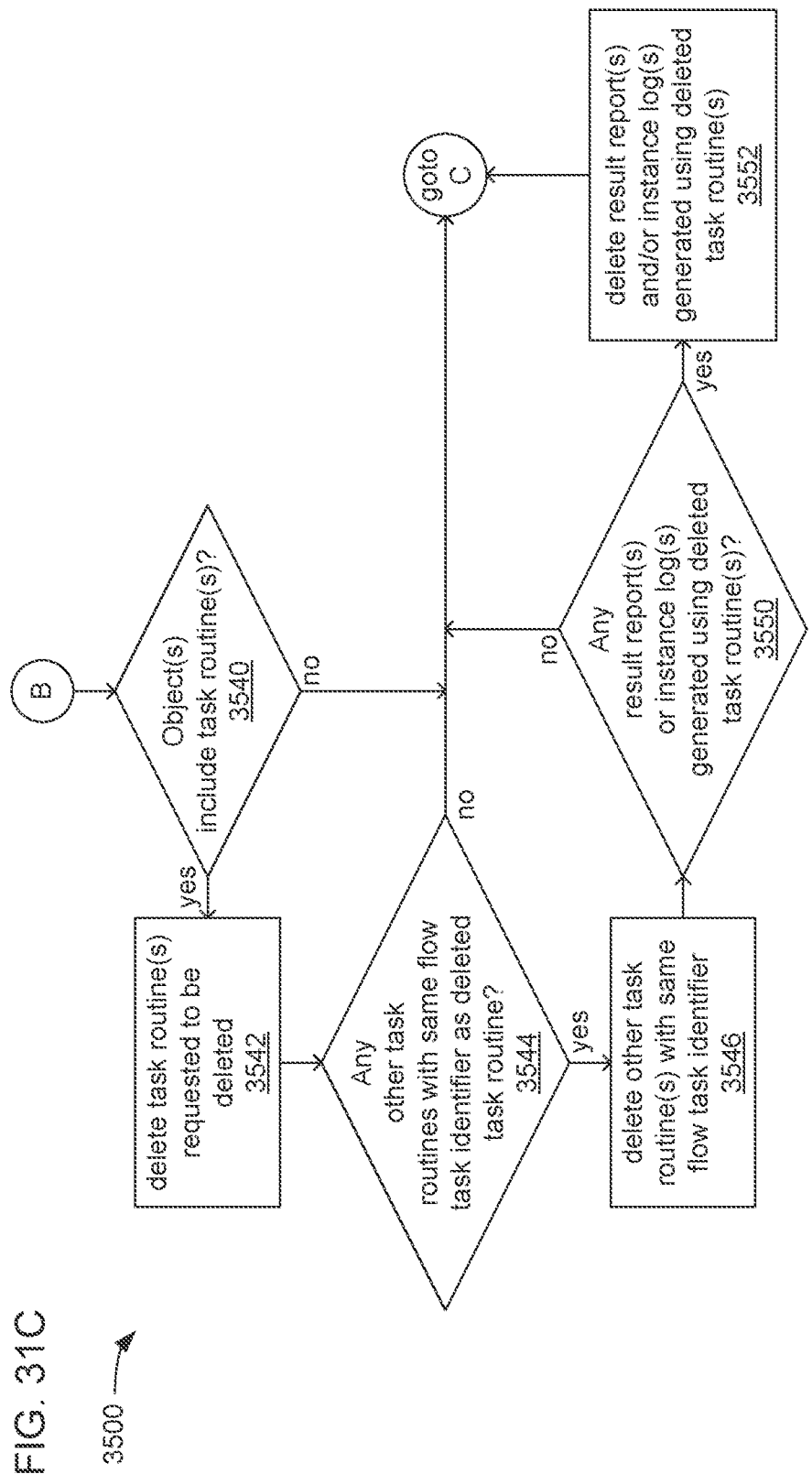
Figure 31D:
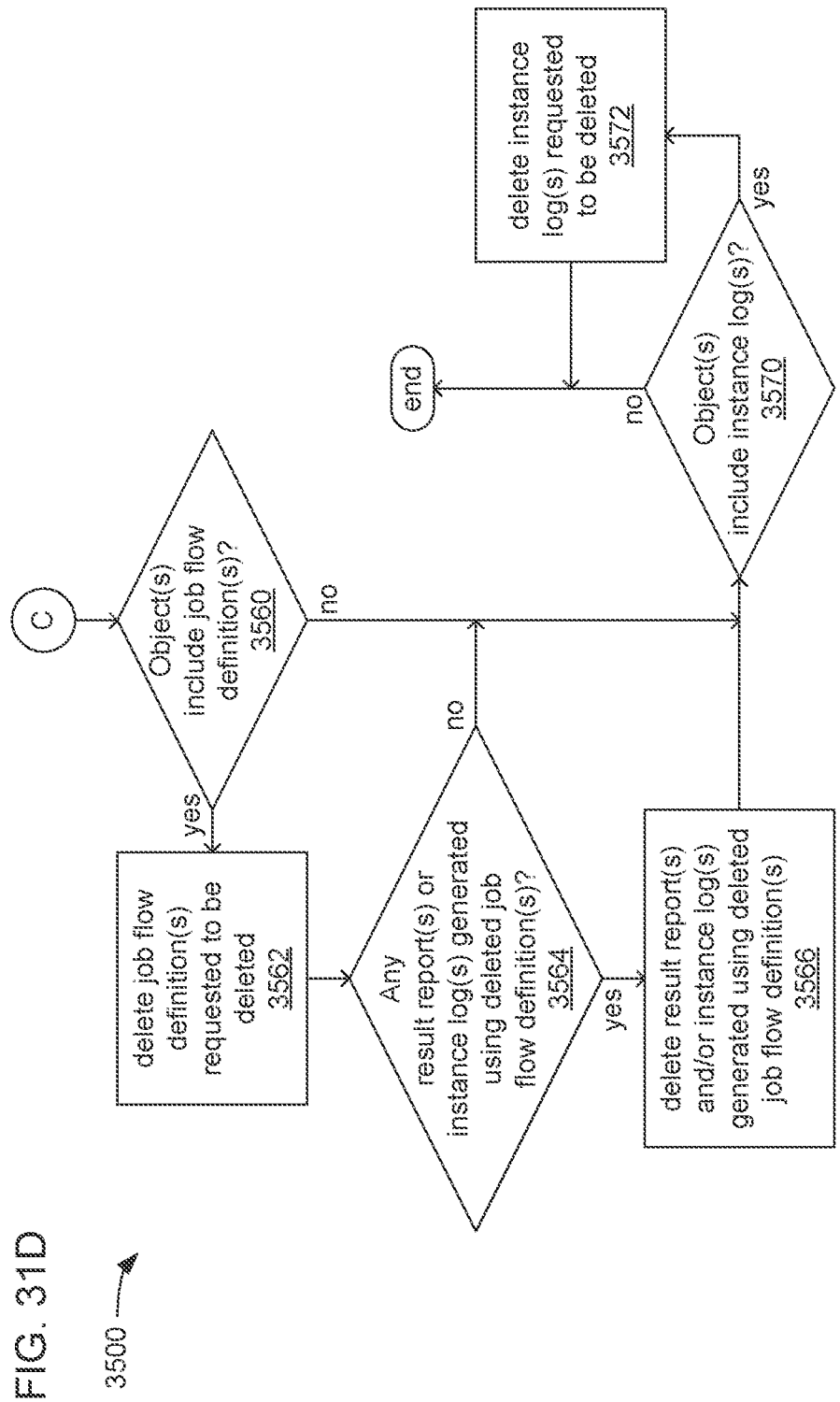

FIGS. 30A, 30B and 30C, together, illustrate an example embodiment of a logic flow 3400. The logic flow 3400 may be representative of some or all of the operations executed by one or more embodiments described herein. More specifically, the logic flow 3400 may illustrate operations performed by the processor(s) 2550 in executing the control routine 2540, and/or performed by other component(s) of at least one of the federated devices 2500.

At 3410, a processor of a federated device of a distributed processing system (e.g., at least one processor 2550 of one of the federated devices 2500 of the distributed processing system 2000) may receive a request from another device, via a network (e.g., one of the source devices 2100, or one of the reviewing devices 2800, via the network 2999) and through a portal provided by the processor for access to other devices via the network, to store a job flow definition (e.g., one of the job flow definitions 2220) within a particular federated area specified within the request (e.g., one of the federated areas 2566). Alternatively, at 3410, the processor may receive the job flow definition, via the network, and in a transfer associated with a synchronization relationship between a transfer area instantiated within the particular federated area and another transfer area instantiated within the other device, where the job flow definition is intended to be stored within the transfer area within the particular federated area.

At 3412, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, and/or has been granted a level of access that includes the authorization to make such requests. As has been discussed, the processor may require the receipt of one or more security credentials from devices from which requests are received. If, at 3412, the processor determines that the request is not from a device and/or user authorized to make such a request, then the processor may transmit an indication of denial of the storage of the job flow definition to the device via the network at 3414.

However, if at 3412, the processor determines that the request to store a job flow definition within the specified federated area is authorized, then at 3420, the processor may check whether the job flow of the job flow definition uses a neural network that was trained based on another job flow that does not use a neural network. If, at 3420, the processor determines that the job flow of the job flow definition does not use a neural network, or if at 3422, the processor determines that the other job flow definition is stored in the particular federated area (or within any base federated area to which the particular federated area is related and/or within any intervening federated area interposed therebetween), then at 3430, the processor may check whether there is at least one task routine stored within the federated area (or within any such base or such intervening federated area) for each task specified by a flow task identifier within the job flow definition.

However, if at 3420, the processor determines that the job flow of the job flow definition does use a neural network, and if at 3422, the other job flow definition is not so stored, then at 3424, the processor may check whether the job flow definition was received in a transfer from the other device as a result of a synchronization relationship. If not then, the processor may transmit an indication of denial of the storage of the job flow definition to the other device via the network at 3414. Otherwise, the processor may transmit an indication of an error arising from the other job flow definition not being so stored at 3426, before proceeding to the check made at 3430.

If, at 3430, there is at one task routine stored in the particular federated area (or within any base federated area to which the particular federated area is related and/or within any intervening federated area interposed therebetween) for each of the tasks specified by the job flow, then the processor may proceed to another check made at 3440. However, if at 3430, there are no task routines stored within the federated area (or within such a base or intervening federated area) for one or more of the tasks specified by the job flow, then at 3432, the processor may generate a DAG that provides a visual depiction of the lack of task routines for one or more tasks, and may transmit it to the other device. Then, if at 3434, the job flow definition was received in a transfer from the other device as a result of a synchronization relationship, the processor may proceed to the check made at 3440.

At 3440, the processor may check: 1) whether the input interfaces (e.g., data interfaces 2443 that receive data from data objects, and/or task interfaces 2444 that receive parameters from another task routine) that are implemented in the task routines stored in the federated area (or within such a base or intervening federated area) are identical to those specified in the job flow definition at 3440, and 2) whether the output interfaces (e.g., data interfaces 2443 that output a data object, and/or task interfaces 2444 that output parameters to another task routine) that are implemented in the task routines that are already stored within the federated area (or within such a base or intervening federated area) are identical to or are supersets of those specified in the job flow definition.

If at 3440, the input interfaces are identical, and if all of the output interfaces of all of the task routines already so stored are either identical to and/or are supersets of corresponding output interfaces specified in the job flow definitions, then the processor may generate and assign a job flow identifier for the job flow definition at 3446, and at 3448, may store the job flow definition within the particular federated area in a manner that enables later retrieval of the job flow by its identifier.

However, if at 3340, the input interfaces are not identical, or if an output interface of one or more of the task routines already so stored is neither identical nor a superset of a corresponding output interface specified in the job flow definition, then at 3442, the processor may generate a DAG that provides a visual indication of the mismatch, and may transmit it to the other device via the network. If, at 3444, the job flow definition was received in a transfer from the other device as a result of a synchronization relationship, the processor may proceed to the generation and transmission of a DAG at 3446.

FIGS. 31A, 31B, 31C and 31D, together, illustrate an example embodiment of a logic flow 3500. The logic flow 3500 may be representative of some or all of the operations executed by one or more embodiments described herein. More specifically, the logic flow 3500 may illustrate operations performed by the processor(s) 2550 in executing the control routine 2540, and/or performed by other component(s) of at least one of the federated devices 2500.

At 3510, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor, to delete one or more objects (e.g., one or more of the objects 2220, 2330, 2370, 2440, 2720 and/or 2770) within a particular federated area specified in the request (e.g., one of the federated areas 2566).

At 3512, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, as well as any federated area that may branch from the specified federated area, and/or has been granted a level of access that includes the authorization to make such requests. As has been discussed, the processor may require the receipt of one or more security credentials from devices from which requests are received. If, at 3512, the processor determines that the request is not from a device and/or user authorized to make such a request, then the processor may transmit an indication of denial of the request to the device via the network at 3514.

However, if at 3512, the processor determines that the request to delete one or more objects within the specified federated area is authorized, then at 3520, the processor may check whether the one or more objects includes one or more data sets (e.g., one or more of the data sets 2330 or 2370). If so, then the processor may delete the one or more data sets from the specified federated area at 3522. At 3524, the processor may additionally check whether there are any result reports or instance logs stored in the specified federated area (or within any federated area that branches from the specified federated area) that were generated in a past performance of a job flow in which any of the one or more deleted data sets were used. If so, then at 3526, the processor may delete such result report(s) and/or instance log(s) from the specified federated area and/or from one or more other federated areas that branch from the specified federated area.

As previously discussed, it may be deemed desirable for reasons of maintaining repeatability to avoid a situation in which there is an instance log that specifies one or more objects, such as data sets, as being associated with a performance of a job flow where the one or more objects are not present within any accessible federated area such that the performance of the job flow cannot be repeated. It is for this reason that the deletion of a data set from the specified federated area is only to be performed if a check can be made within federated areas that branch from the specified federated area for such objects as instance logs and/or result reports that have such a dependency on the data set to be deleted. And, it is for this reason that a request for such a deletion may not be deemed to be authorized unless received from a device and/or user that has authorization to access all of the federated areas that branch from the specified federated area.

At 3530, the processor may check whether the one or more objects includes one or more result reports (e.g., one or more of the result reports 2770). If so, then the processor may delete the one or more result reports from the specified federated area at 3532. At 3534, the processor may additionally check whether there are any instance logs stored in the specified federated area (or within any federated area that branches from the specified federated area) that were generated in a past performance of a job flow in which any of the one or more deleted result reports were generated. If so, then at 3536, the processor may delete such instance log(s) from the federated area and/or from the one or more other federated areas that branch from the specified federated area.

At 3540, the processor may check whether the one or more objects includes one or more task routines (e.g., one or more of the task routines 2440). If so, then the processor may delete the one or more task routines from the specified federated area at 3542. At 3544, the processor may additionally check whether there are any other task routines stored in the specified federated area (or within a federated area that branches from the specified federated area) that share the same flow task identifier(s) as any of the deleted task routines. If so, then at 3546, the processor may delete such task routine(s) from the specified federated area and/or from the one or more other federated areas that branch from the specified federated area. At 3550, the processor may additionally check whether there are any result reports or instance logs stored in the specified federated area (or within a federated area that branches from the specified federated area) that were generated in a past performance of a job flow in which any of the one or more deleted task routines were used. If so, then at 3552, the processor may delete such result report(s) and/or instance log(s) from the specified federated area and/or from the one or more other federated areas that branch from the specified federated area.

At 3560, the processor may check whether the one or more objects includes one or more job flow definitions (e.g., one or more of the job flow definitions 2220). If so, then at 3562, the processor may delete the one or more job flow definitions within the specified federated area. At 3564, the processor may additionally check whether there are any result reports or instance logs stored in the specified federated area (or within a federated area that branches from the specified federated area) that were generated in a past performance of a job flow defined by any of the one or more deleted job flow definitions. If so, then at 3566, the processor may delete such result report(s) and/or instance log(s) from the federated area and/or from the one or more other federated areas that branch from the specified federated area.

At 3570, the processor may check whether the one or more objects includes one or more instance logs (e.g., one or more of the instance logs 2720). If so, then at 3572, the processor may delete the one or more instance logs from the specified federated area.

Figure 32A:
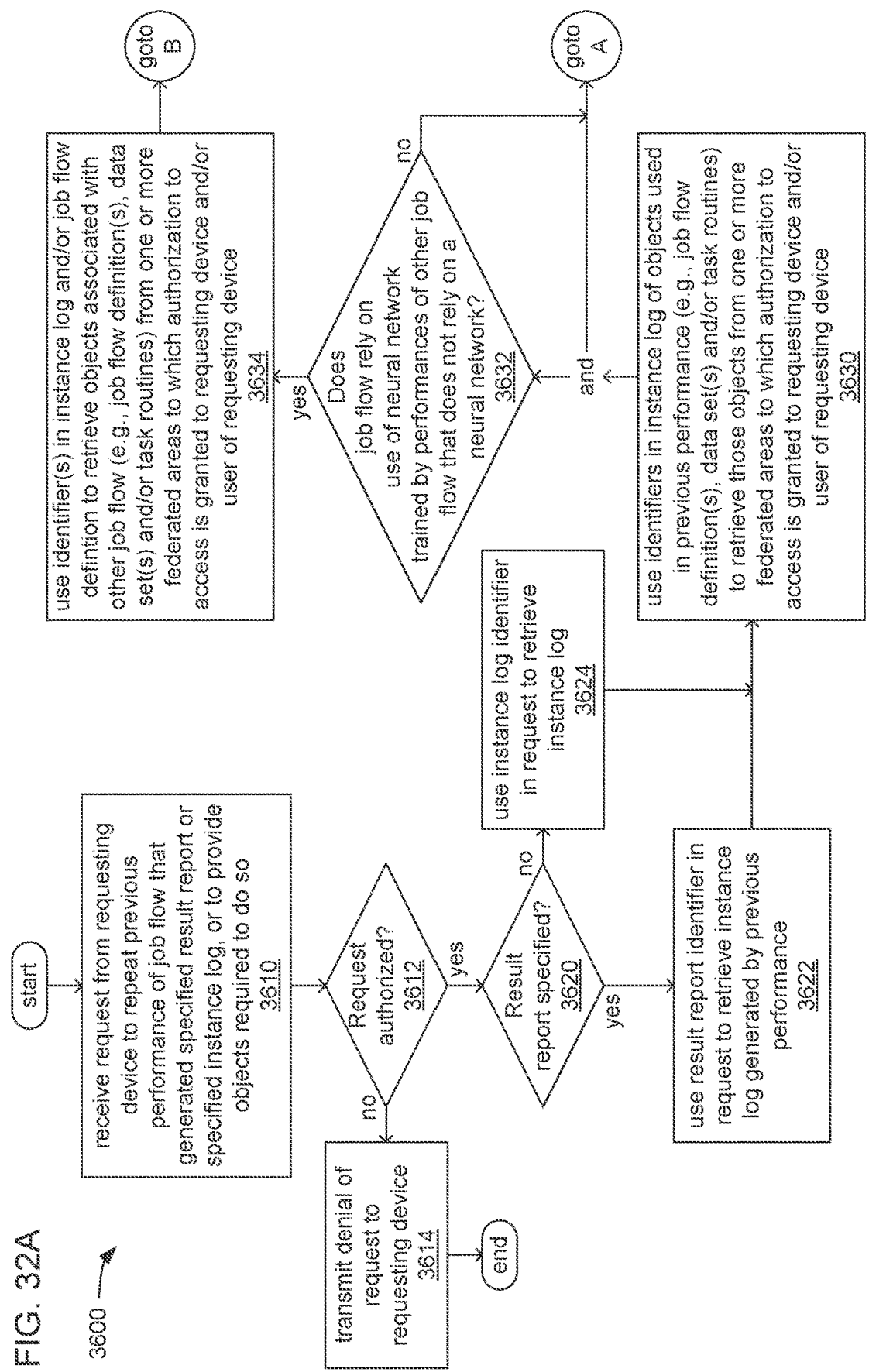
FIGS. 32A and 32B, together, illustrate an example embodiment of a logic flow of a federated device either repeating an earlier performance of a job flow that generated specified result report or instance log, or transmitting objects to enable a requesting device to do so.
Figure 32B:
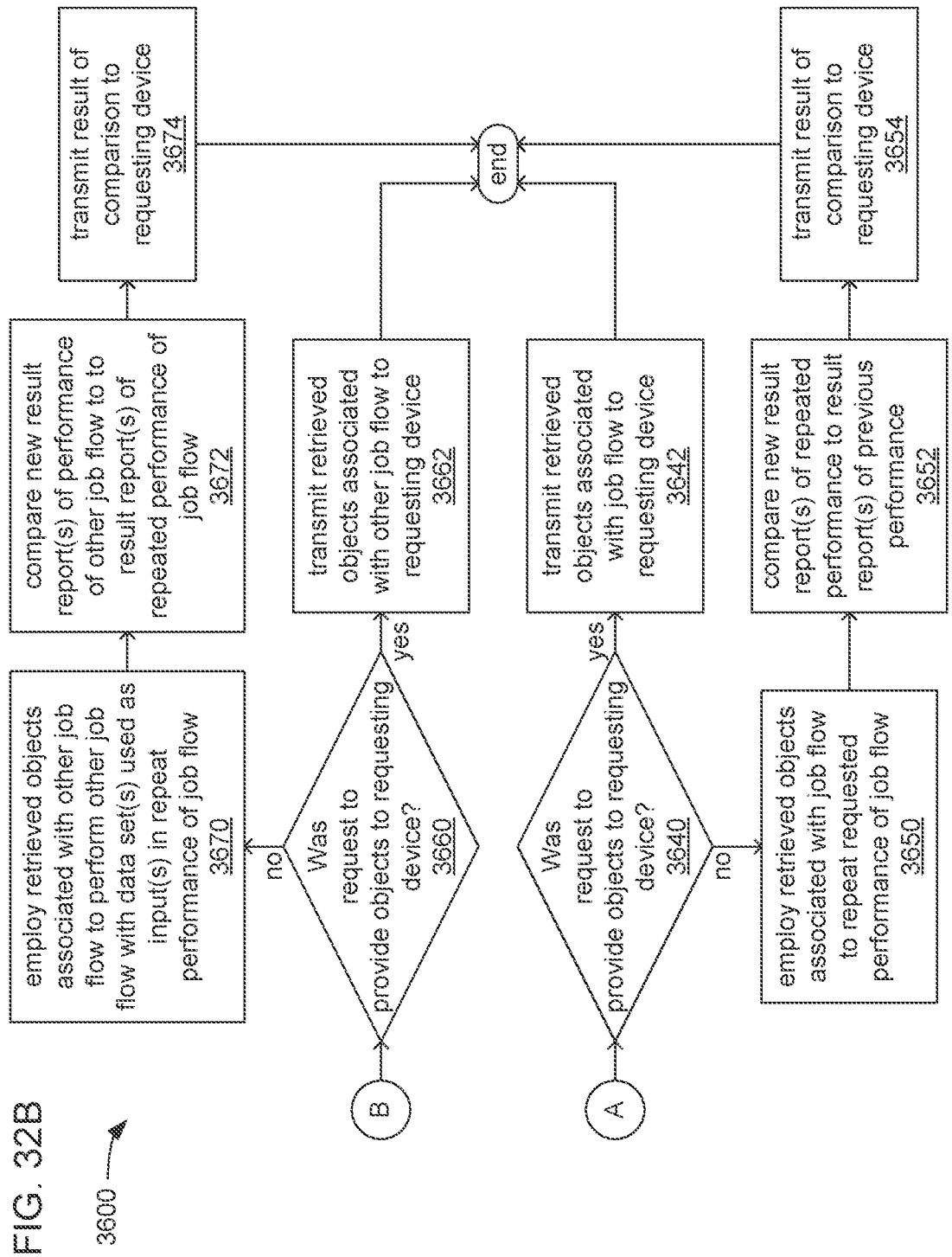

FIGS. 32A and 32B, together, illustrate an example embodiment of a logic flow 3600. The logic flow 3600 may be representative of some or all of the operations executed by one or more embodiments described herein. More specifically, the logic flow 3600 may illustrate operations performed by the processor(s) 2550 in executing the control routine 2540, and/or performed by other component(s) of at least one of the federated devices 2500.

At 3610, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to repeat a previous performance of a job flow that generated either a result report or an instance log (e.g., one of the result reports 2770 or one of the instance logs 2720) specified in the request (e.g., with a result report identifier 2771 or an instance log identifier 2721), or to provide the requesting device with the objects (e.g., one or more of the objects 2220, 2330, 2370, 2440, 2720 and/or 2770) needed to enable the requesting device to do so. As previously discussed, persons and/or entities involved in peer reviewing and/or other forms of review of analyses may operate a device to make a request for one or more federated devices to repeat a performance of a job flow to verify an earlier performance, or may make a request for the objects needed to allow the persons and/or entities to independently repeat the performance.

At 3612, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3612, the processor determines that the request is not from a device and/or user authorized to make such a request, then the processor may transmit an indication of denial of the request to the requesting device via the network at 3614.

However, if at 3612, the processor determines that the request is authorized, then at 3620, if the a result report was specified for the previous performance in the request, instead of the instance log, then at 3622, the processor may the use the result report identifier provided in the request for the result report to retrieve the instance log for the previous performance. Alternatively, if the instance log was specified for the previous performance in the request, then at 3624, the processor may use the instance log identifier provided in the request to retrieve the instance log for the previous performance.

At 3630, regardless of the exact manner in which the instance log is retrieved, the processor may use the identifiers specified in the instance log for the objects associated with the previous performance to retrieve each of those objects. It should be noted that, as has been previously discussed, searches for objects to fulfill such a request received from a particular requesting device may be limited to the one or more federated areas to which that particular requesting device and/or a user operating the requesting device has been granted access (e.g., a particular private or intervening federated area, as well as any base federated area and/or any other intervening federated area interposed therebetween). Therefore, the retrieval of objects used in the previous performance, and therefore, needed again to independently regenerate the result report, may necessarily be limited to such authorized federated area(s).

At 3632, the processor may check whether the job flow relies on the use of a neural network that was trained using one or more performances of another job flow that does not relay on the use of a neural network. If so, then at 3634, the processor may use an identifier in either of the job flow definition or instance log retrieved for the previous performance that provides a link to the job flow definition or instance log of the other job flow to retrieve objects associated with the other job flow and/or one or more performances of the other job flow.

Regardless of whether the job flow of the previous performance referred to in the request relies on the use of a neural network, if, at 3640, the request was to provide the objects needed to enable an independent repeat of the previous performance of the job flow referred to in the request, then at 3642, the processor may transmit the retrieved objects associated with that previous performance to the requesting device to so enable such an independent repeat performance. As previously discussed, the regenerated result report may be compared at the requesting device to the result report that was previously generated during the previous performance to verify one or more aspects of the previous performance. However, if at 3640, the request received was not to so provide the retrieved objects, but instead, was for one or more federated devices to repeat the previous performance of the job flow, then at 3650, the processor may employ the objects retrieved at 3630 to repeat the previous performance, and thereby regenerate the result report. As previously discussed, in some embodiments, including embodiments in which one or more of the data sets associated with the previous performance is relatively large in size, the processor of the federated device may cooperate with the processors of multiple other federated devices (e.g., operate as the federated device grid 1005) to portions of the repeat performance among multiple federate devices to be carried out at least partially in parallel. At 3652, the processor may compare the regenerated result report to the result report previously generated in the previous performance of the job flow. The processor may then transmit the results of that comparison to the requesting device at 3654.

However, if, at 3632, the job flow of the previous performance referred to in the request does rely on the use of a neural network, then, in addition to retrieving objects associated with the other job flow at 3634, the processor may check at 3660 whether the request was to provide the objects needed to enable an independent repeat of the previous performance. If so, then at 3662, the processor may transmit the retrieved objects associated with that other job flow to the requesting device to enable aspects of the other job flow and/or one or more performances thereof to also be evaluated. However, if at 3660, the request received was not to so provide the retrieved objects, but instead, was for one or more federated devices to repeat the previous performance of the job flow, then at 3670, the processor may employ the objects retrieved at 3634 to perform the other job flow, and do so with the data set(s) associated with the previous performance of the job flow referred to in the request. At 3672, the processor may compare the result report(s) generated by the performance of the other job flow to the corresponding result reports regenerated from the repetition at 3650 of the previous performance of the job flow referred to in the request. The processor may then transmit the results of that comparison to the requesting device at 3674.

Figure 33A:
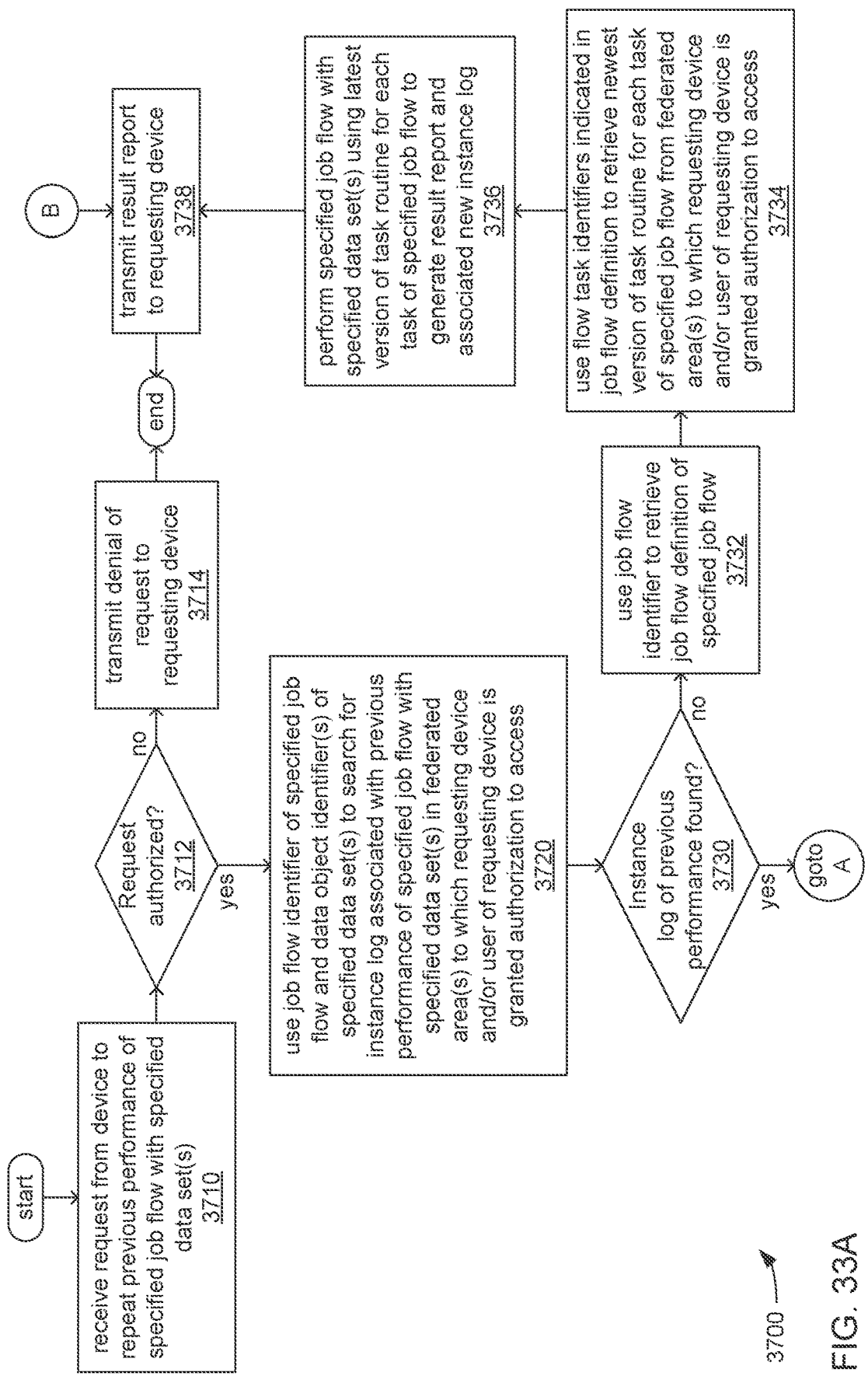
Figure 34B:
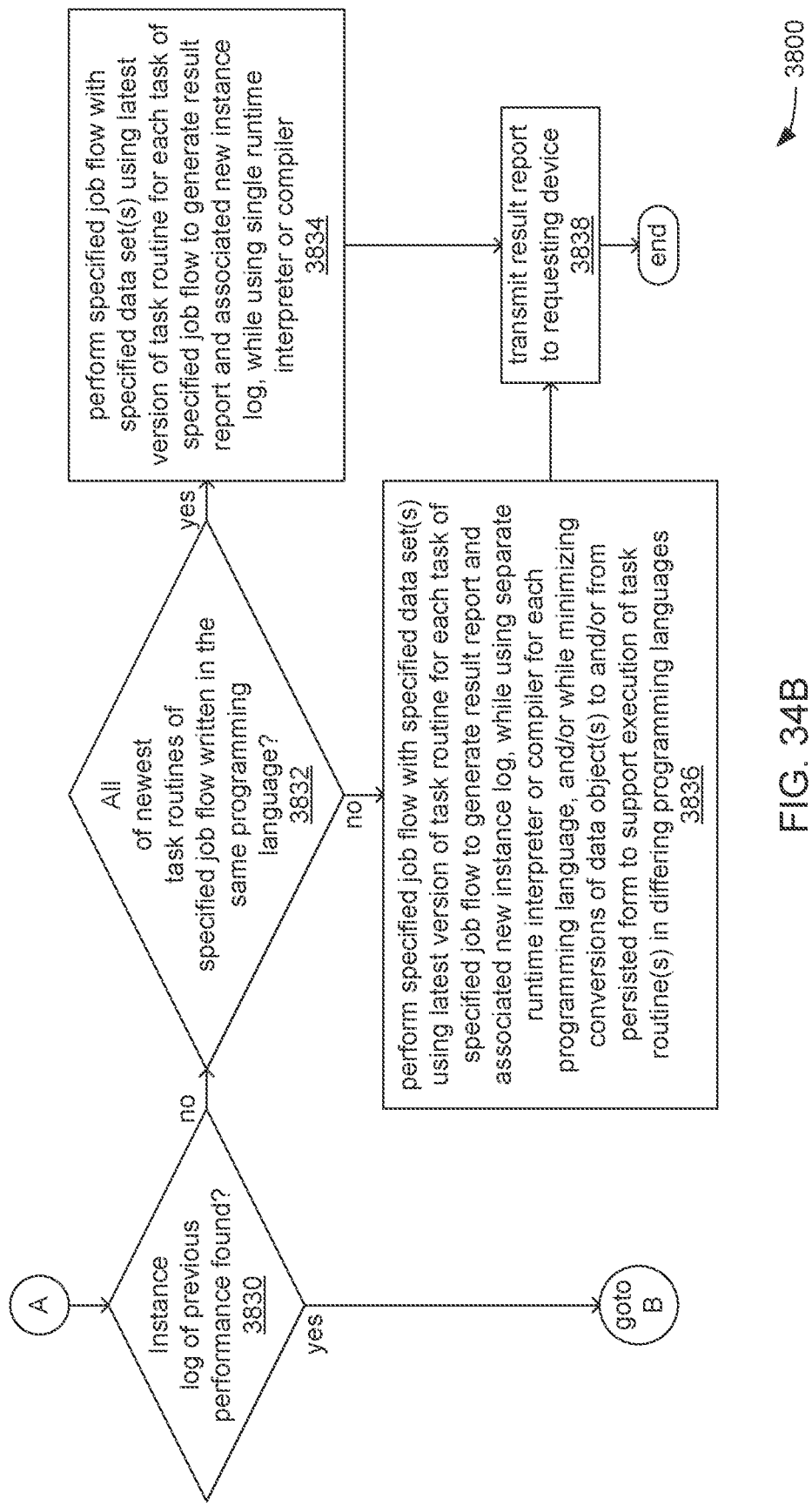
Figure 34C:
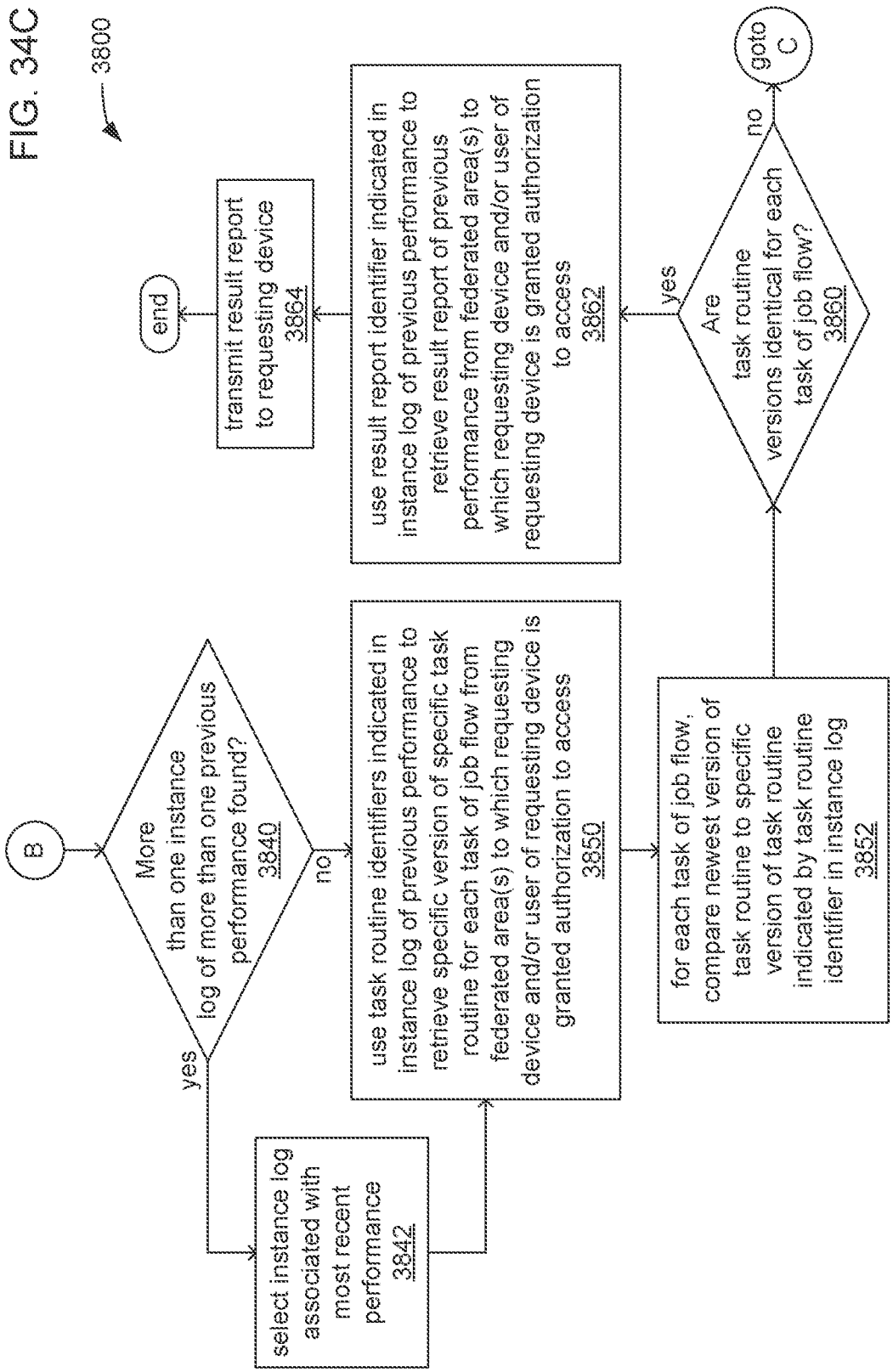
Figure 34D:
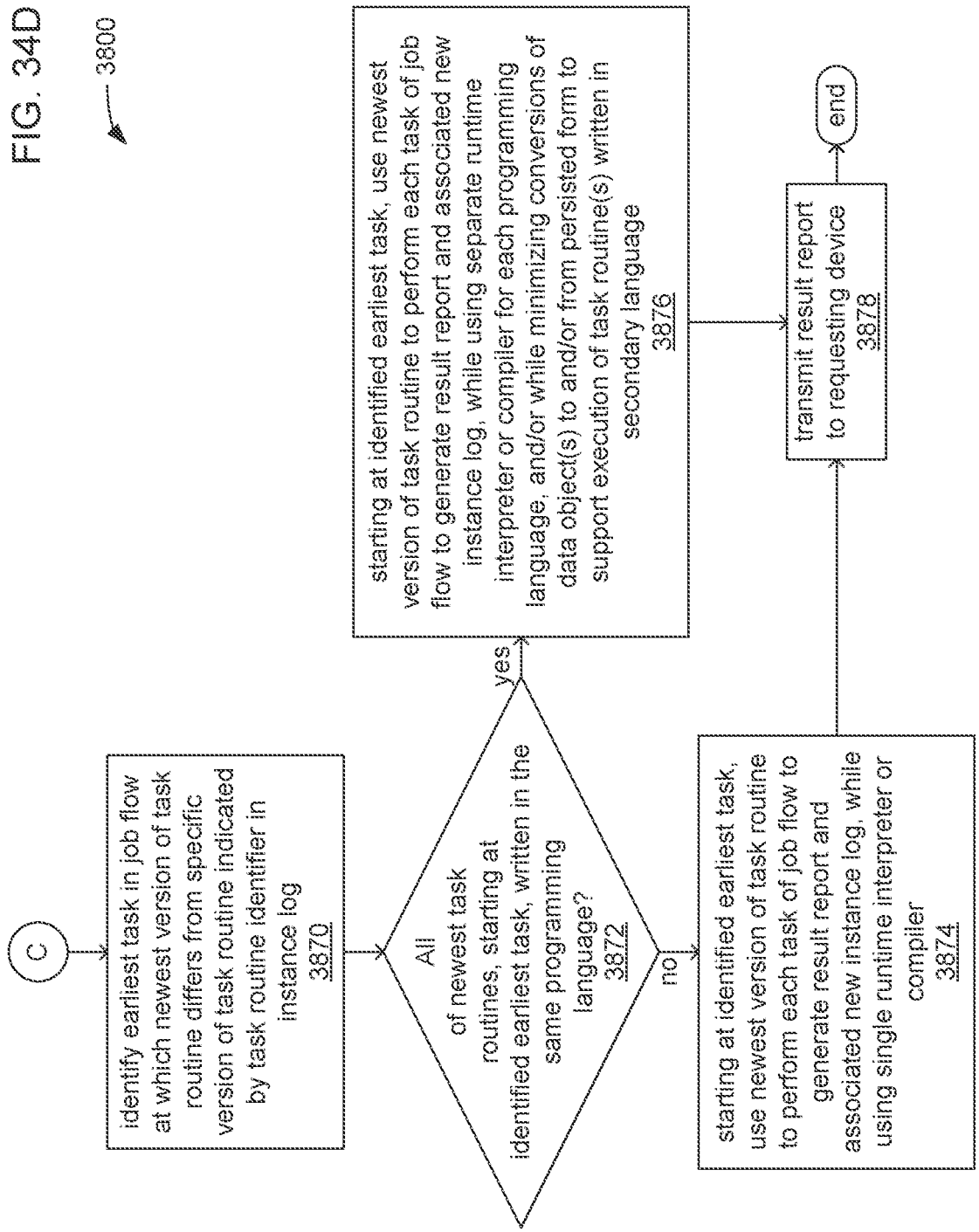

FIGS. 33A and 33B, together, illustrate an example embodiment of a logic flow 3700. The logic flow 3700 may be representative of some or all of the operations executed by one or more embodiments described herein. More specifically, the logic flow 3700 may illustrate operations performed by the processor(s) 2550 in executing the control routine 2540, and/or performed by other component(s) of at least one of the federated devices 2500.

At 3710, a processor of a federated device of a distributed processing system (e.g., at least one processor 2550 of one of the federated devices 2500 of the distributed processing system 2000) may receive a request from a requesting device, via a network (e.g., one of the reviewing devices 2800 via the network 2999) and through a portal provided by the processor, to repeat a previous performance a job flow with one or more data sets (e.g. one or more of the flow input data sets 2330) specified in the request by a job flow identifier and one or more data object identifiers (e.g., one of the job flow identifiers 2221, and one or more of the data object identifiers 2331). As previously discussed, persons and/or entities involved either in consuming results of analyses or in reviewing past performances of analyses may operate a device to make a request for one or more federated devices to repeat a performance of a job flow.

At 3712, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3712, the processor determines that the request is not from a device and/or user authorized to make such a request, then the processor may transmit an indication of denial of the request to the device via the network at 3714.

However, if at 3712, the processor determines that the request for a repeat of a performance of the specified job flow with the specified one or more data sets is authorized, then at 3720, the processor may the use the combination of the job flow identifier and the one or more data object identifiers to search within one or more federated areas to which the requesting device and/or a user of the requesting device has been granted access for an instance log associated with a previous performance of the job flow with the one or more data sets.

It should be noted that, as has been previously discussed, searches for objects to fulfill such a request received from a requesting device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to repeat a previous performance of a job flow may necessarily be limited to such authorized federated area(s).

If, at 3730, the processor determines, as a result of the search at 3720, that there is no such instance log, then at 3732, the processor may retrieve the job flow definition specified by the job flow identifier provided in the request (e.g., one of the job flow definitions 2220) from the one or more federated areas for which authorization to access has been granted to the requesting device and/or the user of the requesting device. At 3734, the processor may then retrieve the most recent version of task routine for each task specified in the job flow definition by a flow task identifier (e.g., one or more of the task routines 2440, each specified by a flow task identifiers 2241) from the one or more federated areas to which access has been granted. At 3736, the processor may retrieve each of the one or more data sets specified by the one or more data object identifiers from the one or more federated areas to which access has been granted, and may then use the retrieved job flow definition, the retrieved newest versions of task routines, and the retrieved one or more data sets to perform the job flow as requested. At 3738, the processor may transmit the results of the performance to the requesting device. As an alternative to (or in addition to) performing the job flow with the most recent versions of the task routines, the processor may transmit an indication to the requesting device that no record has been found of a previous performance in the one or more federated areas to which access has been granted.

However, if at 3730, the processor successfully locates (during the search at 3720) such an instance log, then the processor may additionally determine at 3740 whether there is more than one such instance log, each of which is associated with a different performance of the job flow with the one or more data sets specified in the request. If, at 3740, only one such instance log was located during the search at 3720, then at 3750, the processor may then retrieve the versions specified in the instance log of each of the task routines specified in the job flow definition for each task by a flow task identifier from the one or more federated areas to which access has been granted. At 3752, the processor may retrieve each of the one or more data sets specified by the one or more data object identifiers from the one or more federated areas to which access has been granted, and may then use the retrieved job flow definition, the retrieved specified versions of task routines, and the retrieved one or more data sets to perform the job flow as requested. At 3754, the processor may additionally retrieve the result report generated in the previous performance of the job flow from the one or more federated areas to which access has been granted, and may compare the retrieved result report to the new result report generated in the new performance of the job flow at 3756. At 3758, the processor may transmit the results of the comparison of result reports to the requesting device, and may transmit the new result report, itself, to the requesting device at 3758.

However, if at 3740, there is more than one such instance log located found during the search at 3720, then the processor may transmit an indication of the available selection of the multiple previous performances that correspond to the multiple located instance logs to the requesting device at 3742 with a request that one of the multiple previous performances be selected as the one from which the instance log will be used. The processor may then await receipt of an indication of a selection of one of the multiple previous performances at 3744 before proceeding to retrieve specific versions of task routines at 3750.

FIGS. 34A, 34B, 34C and 34D, together, illustrate an example embodiment of a logic flow 3800. The logic flow 3800 may be representative of some or all of the operations executed by one or more embodiments described herein. More specifically, the logic flow 3800 may illustrate operations performed by the processor(s) 2550 in executing the control routine 2540, and/or performed by other component(s) of at least one of the federated devices 2500.

At 3810, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to perform a job flow with one or more data sets (e.g. one or more of the flow input data sets 2330) specified in the request by a job flow identifier and one or more data object identifiers (e.g., one of the job flow identifiers 2221, and one or more of the data object identifiers 2331).

At 3812, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3812, the processor determines that the request is not from a device and/or user authorized to make such a request, then the processor may transmit an indication of denial of the request to the device via the network at 3814.

However, if at 3812, the processor determines that the request for a performance of the specified job flow with the specified one or more data sets is authorized, then at 3820, the processor may the use the job flow identifier provided in the request to retrieve the corresponding job flow definition (e.g., one of the job flow definitions 2220) from within one or more federated areas to which the requesting device and/or a user of the requesting device has been granted access. At 3822, the processor may then retrieve the most recent version of task routine for each task specified in the job flow definition by a flow task identifier (e.g., one or more of the task routines 1440, each specified by a flow task identifiers 1241) that is stored within the one or more federated areas to which the requesting device and/or a user of the requesting device has been granted access.

It should be noted that, as has been previously discussed, searches for objects to fulfill such a request received from a particular device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to perform a specified job flow may necessarily be limited to such authorized federated area(s).

At 3824, the processor may use the combination of the job flow identifier and the one or more data object identifiers to search for an instance log associated with a previous performance of the job flow with the one or more data sets within the one or more federated areas to which the requesting device and/or a user of the requesting device has been granted access. If, at 3830, the processor determines (during the search at 3824) that there is no such instance log, then at 3832, the processor may then check whether all of the retrieved newest versions of task routines are written in the same programming language. As has been discussed, there may be an expectation that, normally, task routines are all written in a single primary programming language that is normally supported for executing the executable instructions within task routines (e.g., the executable instructions 2447). However, as has also been discussed, it may be that there is a mixture of two or more programming languages (e.g., the primary programming language along with one or more secondary programming languages) among a set of task routines to be executed in performing the tasks of a job flow.

If, at 3832, all of the retrieved most recent versions of task routines are written in the same programming language (e.g., the primary programming language), then at 3834, the processor may retrieve each of the one or more data sets specified by the one or more data object identifiers from the one or more federated areas to which the requesting device and/or a user of the requesting device has been granted access, and may then use the retrieved job flow definition, the retrieved newest versions of task routines, and the retrieved one or more data sets to perform the job flow as requested. In so doing, the processor may be caused to use the same runtime interpreter or compiler to execute the executable instructions within all of the retrieved most recent versions of task routines. At 3838, the processor may then transmit the results of the performance to the requesting device. However, if at 3832, there is a mixture of programming languages is used among the retrieved most recent versions of task routines, then at 3836, the processor may retrieve each of the one or more data sets specified by the one or more data object identifiers from the one or more federated areas to which the requesting device and/or a user of the requesting device has been granted access, and may then use the retrieved job flow definition, the retrieved newest versions of task routines, and the retrieved one or more data sets to perform the job flow, but may do so using a combination of multiple different runtime interpreters and/or compilers to execute the executable instructions within each of those task routines. At 3838, the processor may then transmit the results of the performance to the requesting device.

However, if at 3830, the processor successfully locates such an instance log (during the search at 3824), then the processor may additionally determine at 3840 whether there is more than one such instance log, each of which is associated with a different performance of the job flow with the one or more data sets specified in the request. If only one such instance log is located at 3840, then at 3850, the processor may then retrieve the versions specified in the instance log of each of the task routines for each task specified in the job flow definition by a flow task identifier from the one or more federated areas to which the requesting device and/or a user of the requesting device has been granted access. However, if at 3840, there is more than one such instance log located, then the processor may analyze the multiple instance logs to identify and select the instance log from among the multiple instance logs that is associated with the most recent performance of the job flow at 3842, before proceeding to retrieve specified versions task routines for each task of the job flow at 3850.

At 3852, for each task specified in the job flow definition, the processor may compare the retrieved version of the task routine identified in the instance log to the newest version stored within the one or more federated areas to which the requesting device and/or a user of the requesting device has been granted access to determine whether each of the retrieved task routines is the newest version. At 3860, if each of the retrieved task routines is the newest version thereof, then there is no need to perform the job flow anew, as the most recent previous performance (or the only previous performance) already used the newest version of each task routine such that the result report generated is already the most up to date form of the result report, possible. Thus, at 3862, the processor may retrieve the result report of that previous performance using the result report identifier specified by the instance log from the one or more federated areas to which the requesting device and/or a user of the requesting device has been granted access, and may then transmit the result report to the requesting device at 3734.

However, if at 3860, one or more of the task routines specified in the instance log and retrieved from the one or more federated areas to which the requesting device and/or a user of the requesting device has been granted access is not the newest version thereof, then at 3870, the processor may parse the job flow set forth in the job flow definition to identify the earliest task within the job flow at which the version of the task routine so retrieved is not the newest version. At 3872, the processor may then check whether all of the newest versions of task routines, starting with the task routine for the identified earliest task, proceeding through the task routines for each of the later tasks in the job flow, are written in the same programming language.

If, at 3872, all such retrieved newest task routines are written in the same programming language, then at 3874, starting at the identified earliest task, the processor may use the newest version of task routine for that task and for each later task in the job flow to perform that task and each of the later tasks, thereby taking advantage of the one or more earlier tasks of job flow at which the newest version of task routine was used in the most recent previous performance (or the only previous performance). In so doing, the processor may be caused to use the same runtime interpreter or compiler to execute the executable instructions within all of such retrieved most recent versions of task routines. The processor may then transmit the result report generated in such a partial performance of the job flow to the requesting device at 3878. However, if at 3872, there is a mixture of programming languages is used among these particular most recent versions of task routines, then at 3876, the processor may use the newest version of task routine for that earliest identified task and for each later task in the job flow to perform that task and each of the later tasks, but may do so using a combination of multiple different runtime interpreters and/or compilers to execute the executable instructions within each of those task routines. The processor may then transmit the result report generated in such a partial performance of the job flow to the requesting device at 3878.

Figure 35B:
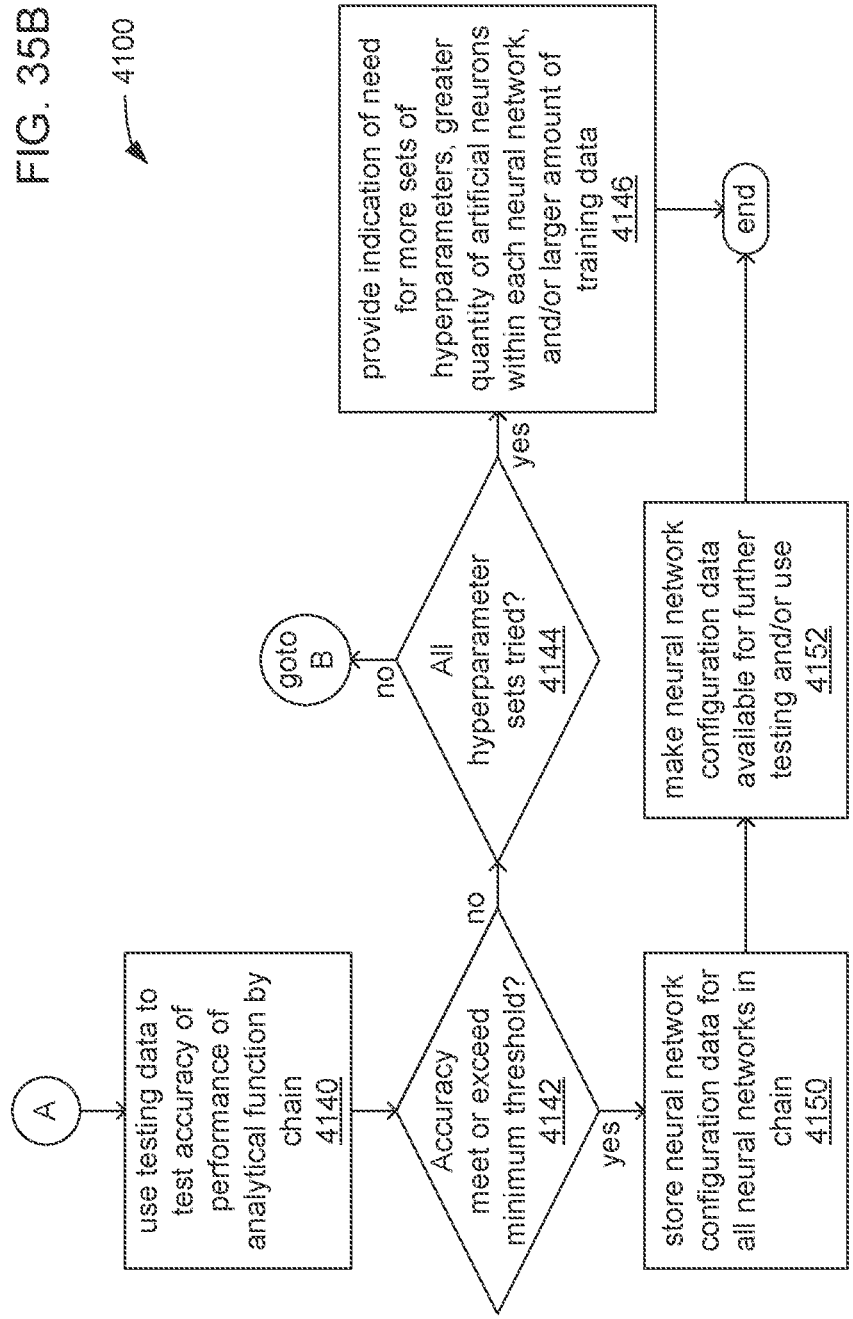

FIGS. 35A and 35B, together, illustrate an example embodiment of a logic flow 4100. The logic flow 4100 may be representative of some or all of the operations executed by one or more embodiments described herein. More specifically, the logic flow 4100 may illustrate operations performed by the processor(s) 2550 in executing the control routine 2540, and/or performed by other component(s) of at least one of the federated devices 2500.

At 4110, a processor of a federated device of a distributed processing system (e.g., at least one processor 2550 of one of the federated devices 2500 of the distributed processing system 2000) may check whether training data and testing data (e.g., the neural network training data 2779$t$ and the neural network testing data 2779$u$) is available to train and test, respectively, an ensemble of neural networks organized and interconnected to form a chain thereof (e.g., the multi-link chain 2574*abc* of neural networks 2571*a-c* of FIGS. 22A-F) to perform an analytical function (e.g., generating time series predictions) is available. As has been discussed, the paired sets of input values and output values of such training data and testing data, if available, may be drawn from flow input data sets and corresponding result reports from past performances of a non-neuromorphic implementation of an analytical function (e.g., the flow input data set 2330$x$ and corresponding result report 2770$x$). If, at 4110, such training data and testing data is available, then at 4120, the processor may retrieve it.

However, if at 4110, such training data is not available, then at 4112, the processor may retrieve and execute one or more routines needed to implement a pseudo random generator to generate sets of input values for inclusion in the training data and testing data (e.g., to become the flow input data sets 2330$t$ and 2330$u$). At 4114, the processor may also retrieve one or more routines needed to perform the existing non-neuromorphic implementation of the analytical function (e.g., the one or more task routines 2440x of the job flow 2200x) with the randomly generated sets of input values as input to generate corresponding sets of output values for inclusion in the training data and testing data (e.g., to become the result reports 2770t and 2770u).

Regardless of whether the training data is retrieved or must be generated, at 4130, the processor may then select a set of hyperparameters that define structural features of the neural networks from among multiple sets of hyperparameters in preparation for the training of the neural networks. As has been discussed, the neural networks within the chain may be trained sequentially in a manner that employs transferred learning such that each neural network in the chain (except for the neural network at the head of the chain) is trained using the weights, biases and/or other trained parameters representing what was learned by the preceding neural network in the chain as a starting point (e.g., by providing each neural network, except the one at the head of the chain, with a copy of the neural network configuration data 2379 that includes the trained parameters of the preceding neural network in the chain). As a result, it may be that all of the neural networks of chain of neural networks are required to have the same hyperparameters (e.g., quantity of artificial neurons, quantity of layers of artificial neurons, etc.). At 4132, the processor may use the selected set of hyperparameters and the training data to sequentially train each neural network within the chain to cause the chain to mimic the performance of the analytical function. At 4140, the processor may use the testing data (e.g., the neural network testing data 2779u) to test the degree of accuracy with which the neural network chain performs the analytical function.

If, at 4142, the degree of accuracy does not at least meet a predetermined minimum threshold of accuracy, then at 4144, the processor may check whether there any other sets of hyperparameters for structural features of the neural networks within the chain that have not yet been tried. If so, then the processor may select another set of hyperparameters at 4130 in preparation for a performance of retraining to generate a new chain of neural networks. As has been discussed, the use of different sets of hyperparameters in defining structural features of the neural networks can have an effect on the degree of accuracy of the chain in performing a particular function. However, if at 4144, there are no more sets of hyperparameters that have not yet been tried, then the processor may provide an indication at 4146 of a need for more sets of hyperparameters to try, a need for a larger quantity of artificial neurons to be made available for implementing each of the neural networks, and/or a need to use a larger amount of training data.

However, if at 4142, the degree of accuracy of the neural network chain does at least meet the predetermined minimum threshold of accuracy, then the processor may store the instances of the neural network configuration data created for each of the neural networks as a result of the training (e.g., multiple instances of the neural network configuration data 2379t as the data set 2370t) to enable that trained neural network configuration data to be made available at later time at 4152 for further testing and/or use of the neural network.

Figure 36A:
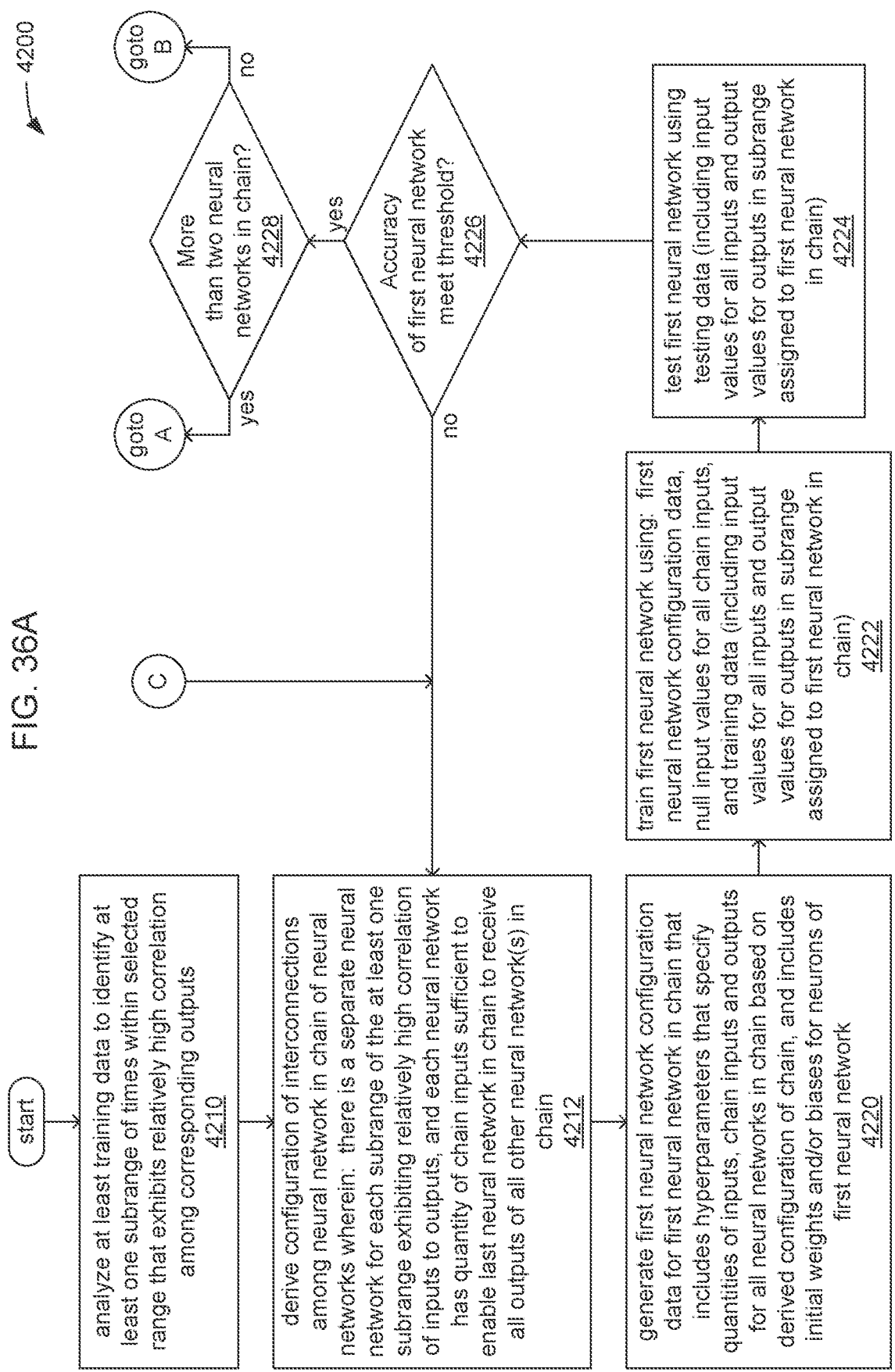
FIGS. 36A, 36B and 36C, together, illustrate another example embodiment of a logic flow of training neural networks of a chain of neural networks.
Figure 36B:
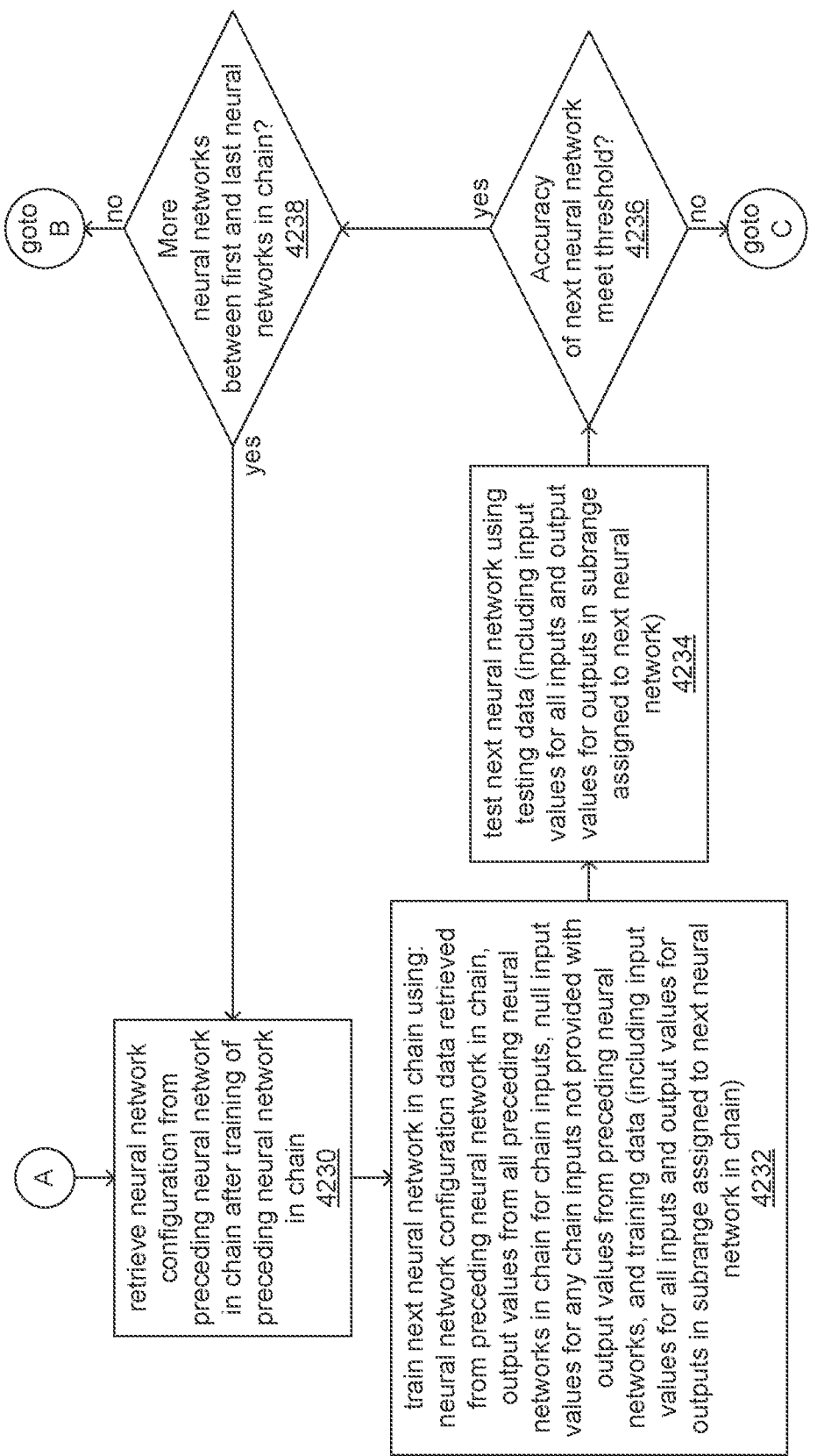
Figure 36C:
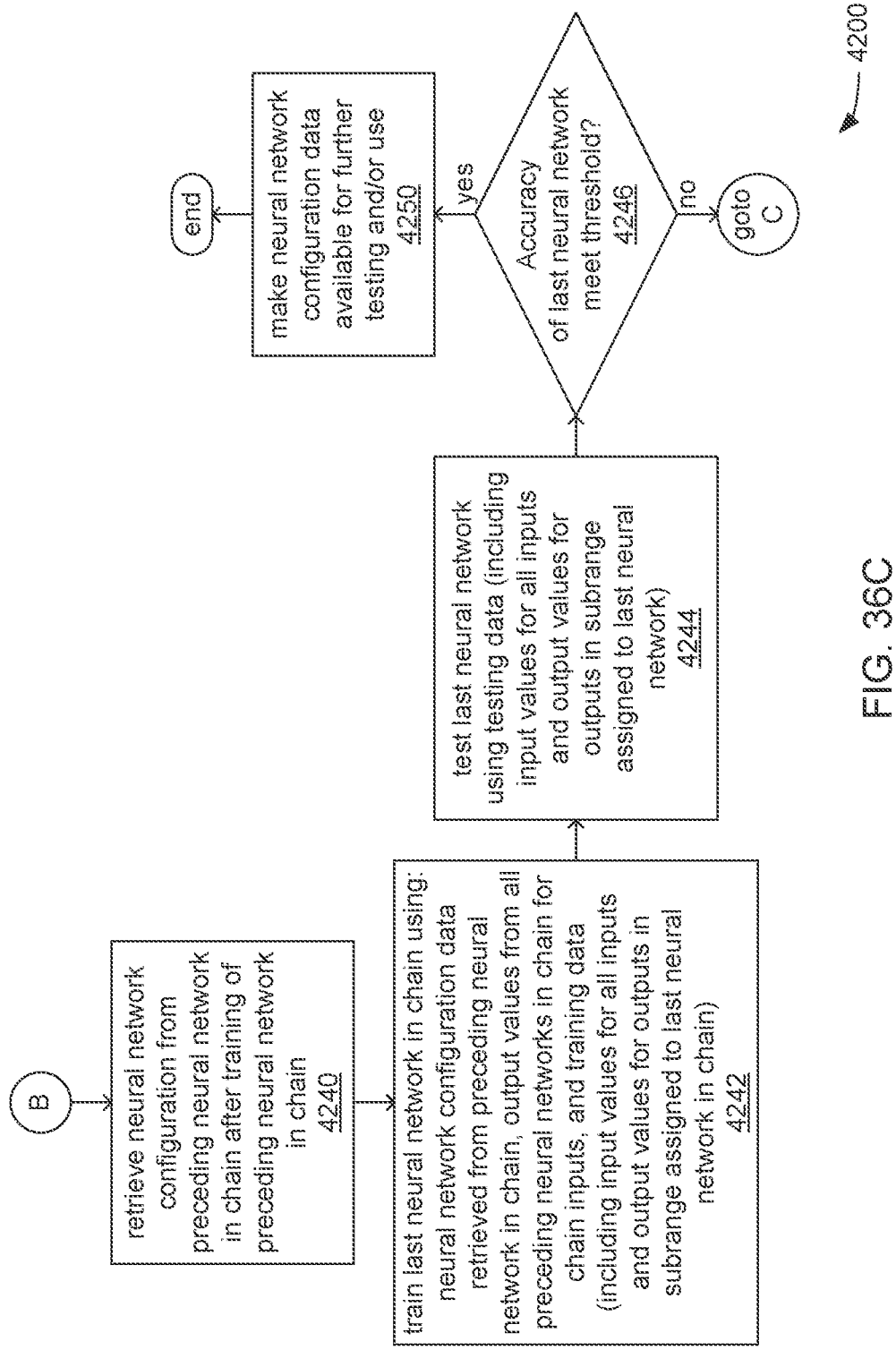

FIGS. 36A, 36B and 36C, together, illustrate an example embodiment of a logic flow 4200. The logic flow 4200 may be representative of some or all of the operations executed by one or more embodiments described herein. More specifically, the logic flow 4200 may illustrate operations performed by the processor(s) 2550 in executing the control routine 2540, and/or performed by other component(s) of at least one of the federated devices 2500.

At 4210, a processor of a federated device of a distributed processing system (e.g., at least one processor 2550 of one of the federated devices 2500 of the distributed processing system 2000) may analyze at least a portion of training data (e.g., a portion of the neural network training data 2379t) to identify, out of the overall full range of time to be covered by a time series prediction, at least one subrange of time in which there is a relatively high correlation among the outputs that correspond to the subrange of time. As has been discussed, various approaches may be employed in determining how the range of time to be covered by a time series prediction is to be broken up into multiple subranges of time (e.g., how many subranges and/or the length of time that each subrange is to cover), including the use of trial and error. However, in some embodiments, one or more forms of analysis (e.g., one or more forms of regression analysis) may be performed on the inputs and outputs of past performances of generating time series predictions via non-neuromorphic processing to attempt to identify correlations among at least a subset of the outputs that may suggest at least one subrange into which the range of time of a time series prediction may be divided. In this way, at least a trial and error process for arriving at a set of subranges may be given some degree of guidance.

At 4212, the processor may, based on the analysis performed at 4210, derive the interconnections among the neural networks of a multi-link chain of neural networks to be used to generate time series predictions using neuromorphic processing to mimic the generation of time series predictions by the existing non-neuromorphic process (e.g., the multi-link chain 2574abc of neural networks 2571a-c discussed in reference to FIGS. 22A-F). As previously described, the neural networks within such a multi-link chain of neural networks are arranged into an order that with at least a first neural network at the head of the chain, a last neural network at the tail of the chain, and what may be one or more neural networks therebetween. Within that ordering, each neural network (except the one at the head of the chain) receives the outputs of all of the preceding neural networks as additional inputs. Also, in dividing the overall full range of time to be covered by a time series prediction into multiple subranges of time, and in assigning each subrange to one of the neural networks, the ordering of subranges may be such that the neural network at the head of the chain is assigned the temporally earliest subrange such that the neural network at the head of the chain is to generate the portion of the time series prediction that falls within the temporally earliest portion of the range of time thereof. Correspondingly, the neural network at the tail of the chain is assigned the temporally latest subrange such that the neural network at the tail of the chain is to generate the portion of the time series prediction that falls within the temporally latest portion of the range of time thereof. Also correspondingly, each of the remaining neural networks that are between the ones at the head and the tail thereof are assigned the remaining subranges of time such that there is an ordering of subranges among the neural networks in the chain that progresses contiguously from earliest at the head of the chain to latest at the tail of the chain.

At 4220, the processor may generate a first neural network configuration data that specifies at least hyperparameters for the first neural network at the head of the chain based, at least in part, on the quantity and ordering of subranges and neural networks within the chain derived at 4212. As previously discussed, to enable transferred learning in training the neural networks of the chain, the various hyperparameters (e.g., the quantity of artificial neurons, the quantity of layers of artificial neurons, etc.) across all of the neural networks of the chain may be required to be identical. Also, the fact that the chain is a multi-link chain may require that the quantity of inputs for all of neural networks be sufficiently large as to enable the last neural network at the tail of the chain to receive all of the outputs of all of the other neural networks within the chain as part of its inputs for generating its portion of a time series prediction that covers the subrange assigned to it. The first neural network configuration data may include an initial set of weights, biases and/or other parameters that may be selected to provide a known starting point for the training of the first neural network at the head of the chain.

At 4222, the processor may train the first neural network at the head of the chain using the first neural network configuration data generated at 4220, the training data, and null input values for all of the inputs that would be used by subsequent ones of the neural networks to receive the outputs of preceding ones of the neural networks. As previously discussed, such training may entail the use of backpropagation in which sets of input values are provided to inputs of the first neural network while corresponding sets of output values that are associated with the subrange of time assigned to the first neural network are provided to the outputs of the first neural network.

At 4224, following the training of the first neural network at 4222, and before any of the other neural networks of the chain are trained, the processor may then use testing data (which may have been generated along with the training data, as has been previously discussed) to test the accuracy of just the first neural network at the head of the chain in generating just its assigned portion of a time series prediction (i.e., the temporally earliest portion thereof). Although testing of entire chains of neural networks after the training of all of the neural networks therein has been previously discussed, it may be deemed desirable to perform at least some degree of testing of one or more individual ones of the neural networks within the chain as the training is performed. Doing so may enable the training of all of the neural networks of a particular chain to be avoided if it is determined, before the completion of training of all of the neural networks, that at least one of the neural networks that has already been trained exhibits undesirably poor accuracy in generating its associated portion of time series predictions such that the resulting chain of neural networks is unlikely to generate time series predictions with sufficient accuracy. At 4226, if the accuracy of the first neural network does not meet a predetermined threshold of accuracy for the first neural network, then another configuration of interconnections among the neural networks may be determined at 4212 as part of generating a new chain of neural networks to begin training.

However, if at 4226, the first neural network does meet the predetermined threshold of accuracy for the first neural network, and if at 4228, there are just two neural networks in the chain (i.e., just the first and last neural networks), then at 4240, the processor may retrieve the now-trained first neural network configuration data from the training of the first neural network for use as the starting point in training the last neural network at the tail of the chain at 4242 as part of transferring what has been learned by the first neural network to the last neural network to reduce the amount of time required to train the last neural network. Also in so doing, the processor may additionally use sets of input data values of the training data at its inputs, corresponding sets of output data values that are associated with the subrange of time assigned to the last neural network in performing backpropagation at its outputs, and output values generated by all of other neural networks within the chain as further inputs as all of the other neural networks are operated to generate those outputs from the same sets of input values of the training data. At 4244, following the training of the last neural network at 4242, the processor may then use testing data to test the accuracy of the last neural network at the tail of the chain in generating its assigned portion of a time series prediction (i.e., the temporally latest portion thereof). At 4246, if the accuracy of the last neural network does not meet a predetermined threshold of accuracy for the last neural network, then another configuration of interconnections among the neural networks may be determined at 4212 as part of generating a new chain of neural networks to begin training. However, if at 4246, the accuracy of the last neural network does meet the predetermined threshold of accuracy for the last neural network, then at 4250, the processor may make the instances of neural network configuration data for the multiple neural networks of the chain available for further testing and/or for use. As has been discussed this may entail storing and/or transmitting the multiple instances of neural network configuration data as a single data object (e.g., the mid-flow data set 2370t or 2370u).

However, if at 4226, the first neural network does meet the predetermined threshold of accuracy for the first neural network, and if at 4228, there are more than two neural networks in the chain such that there are one or more neural networks between the first and last neural networks in the chain, then at 4230, the processor may retrieve the now-trained first neural network configuration data from the training of the first neural network for use as the starting point in training the next neural network after the first neural network at 4232 as part of transferring what has been learned by the preceding neural network to that next neural network to reduce the amount of time required to train that next neural network. Also in so doing, the processor may additionally use sets of input data values of the training data at its inputs, corresponding sets of output data values that are associated with the subrange of time assigned to that neural network in performing backpropagation at its outputs, output values generated by all of the preceding neural networks within the chain (including the first neural network at the head of the chain) as further inputs as those preceding neural networks are operated to generate those outputs from the same sets of input values of the training data, and null input values for all of the remaining unused inputs that would otherwise be used by subsequent ones of the neural networks to receive the outputs of preceding ones of the neural networks. At 4234, following the training of that neural network at 4232, the processor may then use testing data to test the accuracy of that neural network in generating its assigned portion of a time series prediction. At 4236, if the accuracy of that neural network does not meet a predetermined threshold of accuracy for it, then another configuration of interconnections among the neural networks may be determined at 4212 as part of generating a new chain of neural networks to begin training. However, if at 4236, the accuracy of the last neural network does meet the predetermined threshold of accuracy for the last neural network, then at 4238, the processor may check whether there is a next neural network in the chain to be trained before the last neural network at the tail of the chain. If there is another such neural network to be trained that is next in the chain, then the processor may proceed with the training of that next neural network starting at 4230. However, if there are no other neural networks that remain to be trained ahead of the last neural network at the tail of the chain, then the processor may proceed with the training of the last neural network starting at 4240.

FIG. 37 illustrates an example embodiment of a logic flow 4300. The logic flow 4300 may be representative of some or all of the operations executed by one or more embodiments described herein. More specifically, the logic flow 4300 may illustrate operations performed by the processor(s) 2550 in executing the control routine 2540, and/or performed by other component(s) of at least one of the federated devices 2500.

At 4310, a processor of a federated device of a distributed processing system (e.g., at least one processor 2550 of one of the federated devices 2500 of the distributed processing system 2000) may retrieve one or more existing routines for a non-neuromorphic implementation of an analytical function (e.g., the one or more task routines 2440x for the non-neuromorphic job flow 2200x to generate time series predictions). At 4312, the processor may also retrieve neural network configuration data that defines multiple neural networks that have been trained to be operated as a chain type of ensemble (e.g., the multi-link chain 2574abc type of ensemble made up of the neural networks 2571a-c of FIGS. 22A-F) perform the same analytical function (e.g., the mid-flow data set 2370t including multiple instances of neural network configuration data 2379t). At 4314, the processor may further retrieve a flow input data set for use as input to performances of the analytical function (e.g., one of the flow input data sets 2330u, 2330v or 2330x).

At 4320, the processor, possibly in cooperation with one or more other processors among multiple federated devices of the distributed processing system, executes the one or more routines of the non-neuromorphic implementation of the analytical function, and operates the chain of neural networks trained to provide the neuromorphic implementation, to cause both the non-neuromorphic and neuromorphic implementations to be performed at least partially in parallel with the earlier retrieved flow input data set. At 4330, the processor may compare the sets of output values generated by each of the implementations of the analytical function from the same corresponding input values of the retrieved flow input data set to test the degree of accuracy of the neural network in performing the analytical function.

If, at 4340, the degree of accuracy of the chain of neural networks does not at least meet a predetermined minimum threshold of accuracy, then at 4342, the processor may provide an indication of the insufficient degree of accuracy of the chain of neural networks in performing the analytical function. However, if at 4340, the degree of accuracy of the chain of neural networks does at least meet the predetermined minimum threshold of accuracy, then at 4350, the processor may check whether the degree of accuracy at least meets a midway threshold of accuracy.

If, at 4350, the degree of accuracy does not at least meet the predetermined higher threshold of accuracy, then the processor may retrieve still more input data at 4314 in preparation for performing still more testing. However, if at 4350, the degree of accuracy of the neural network does at least meet the predetermined higher threshold of accuracy, then at 4352, the processor may make the instances of the neural network configuration data that defines each of the neural networks within the chain available (e.g., all within a single mid-flow data set 2370) for further use without parallel use of the non-neuromorphic implementation.

Figure 38A:
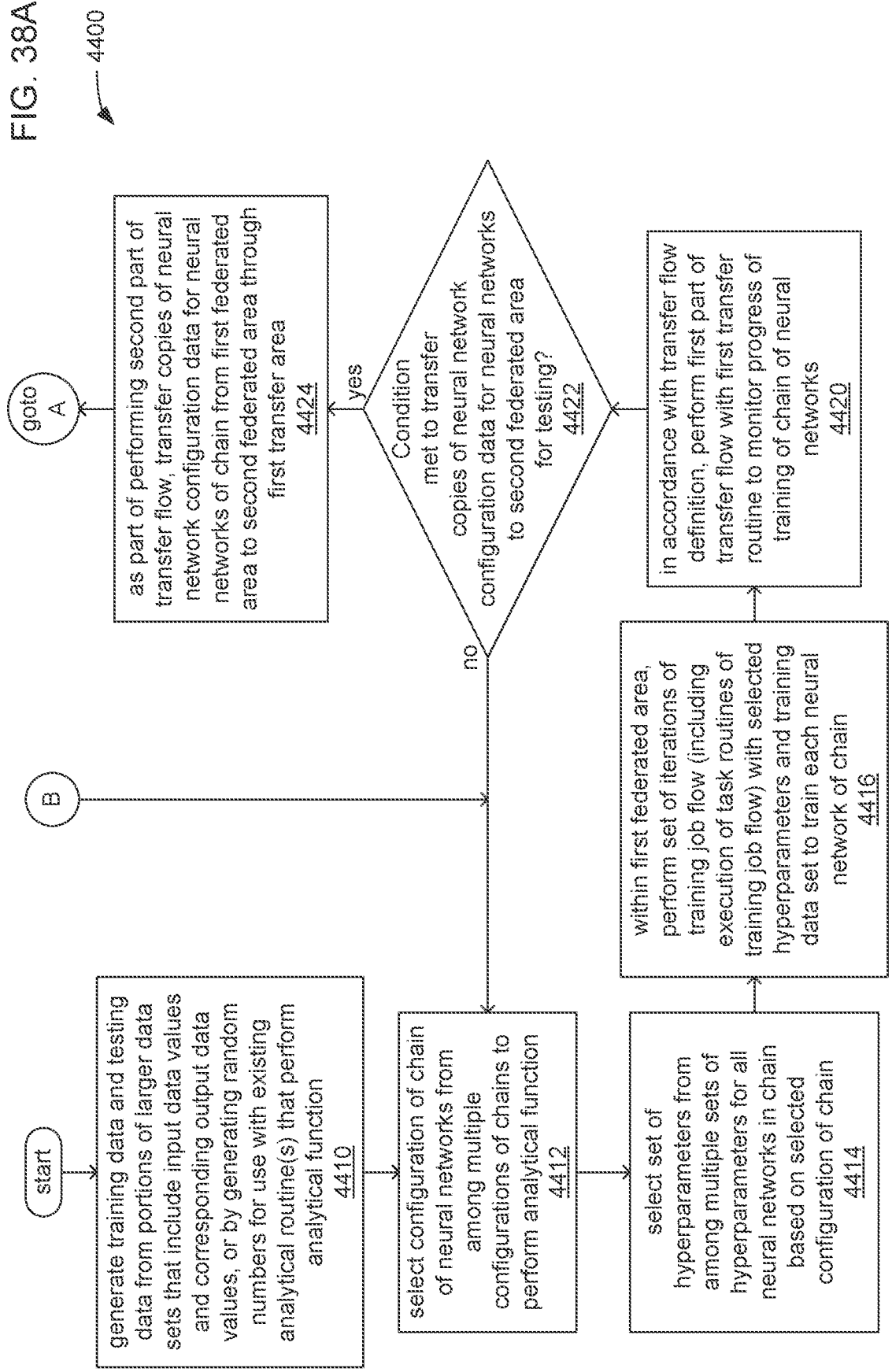
FIGS. 38A, 38B and 38C, together, illustrate another example embodiment of a logic flow of another automated transfer of object(s) associated with a chain of neural networks among federated areas.
Figure 38B:
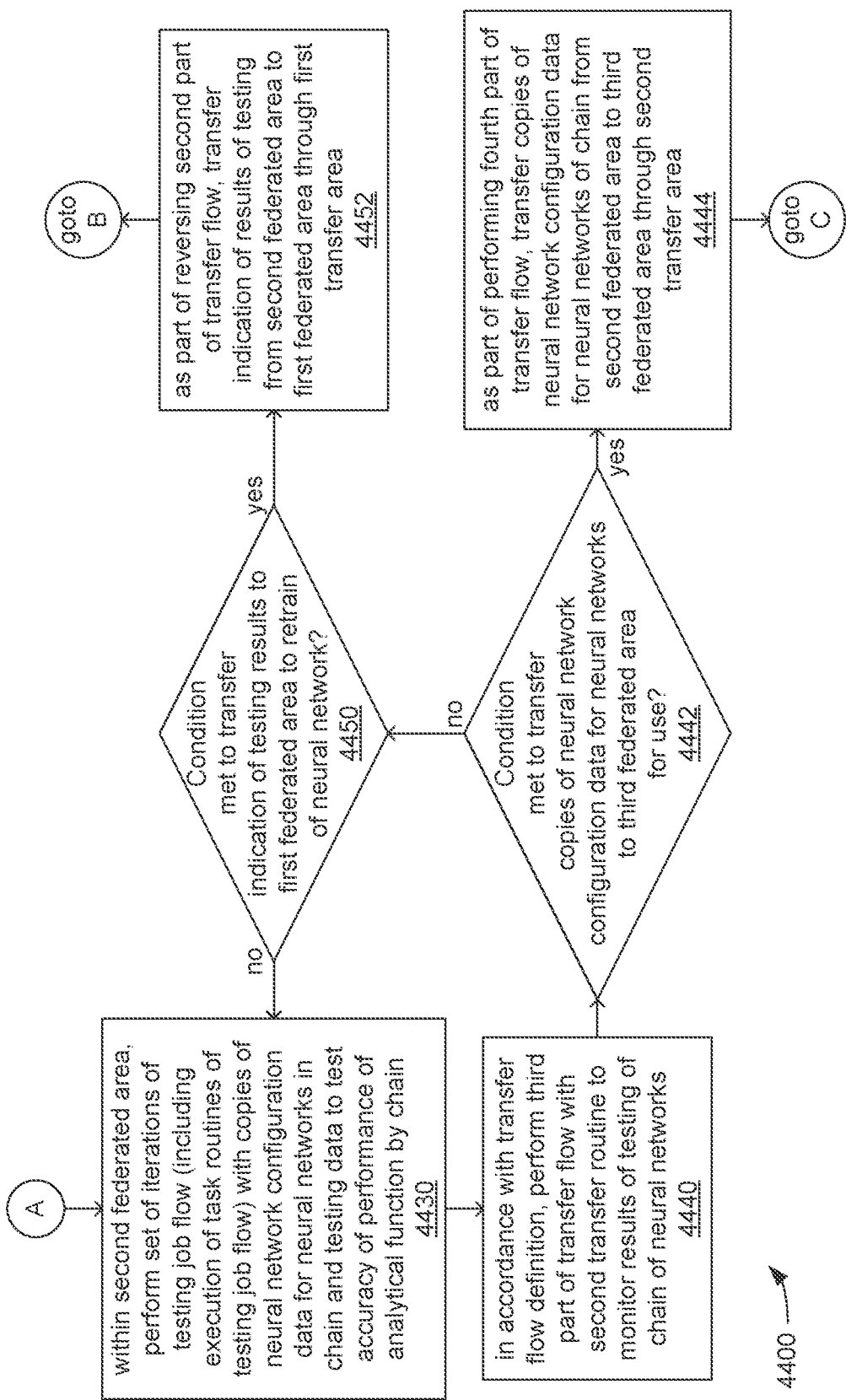
Figure 38C:
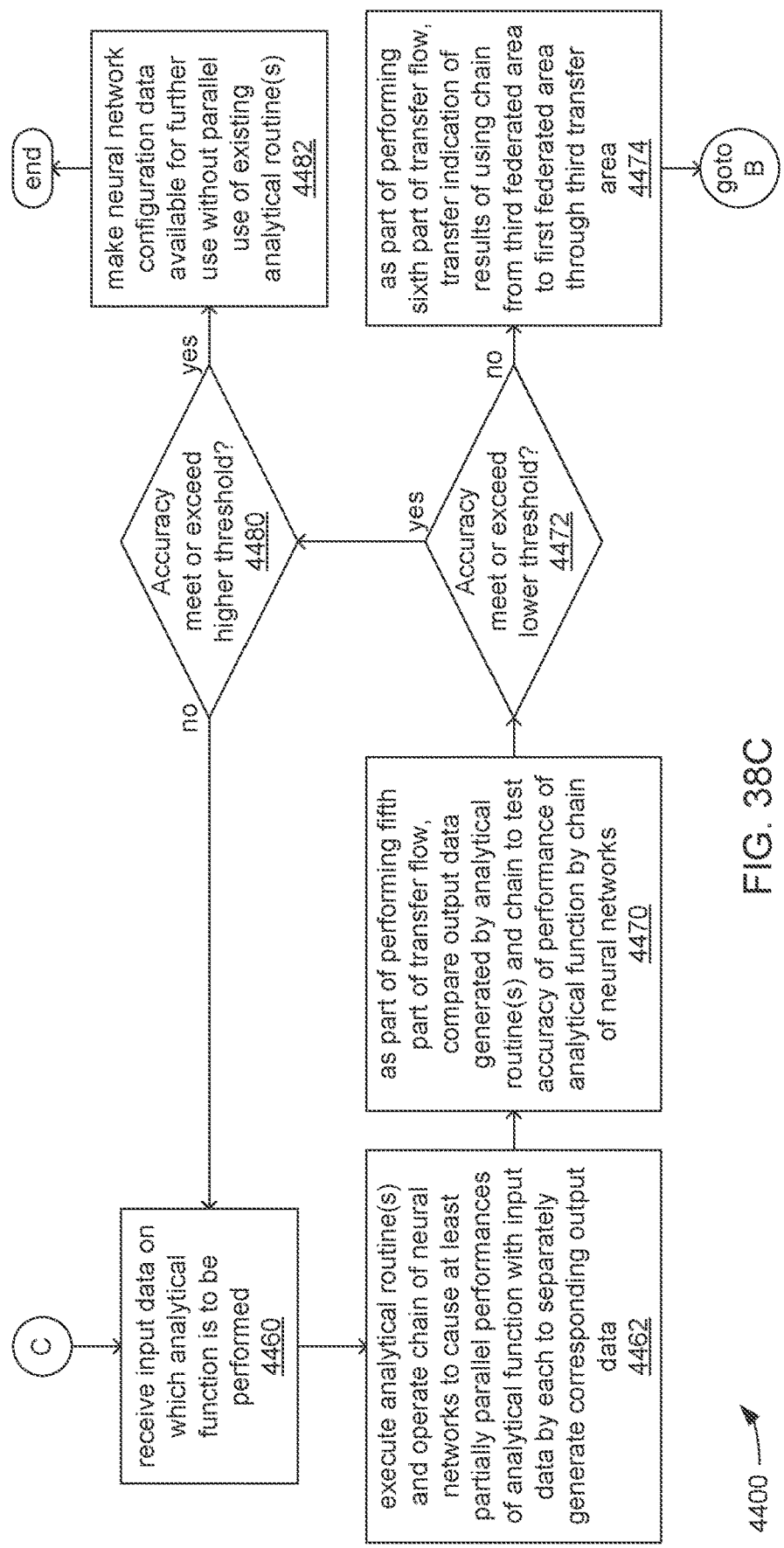

FIGS. 38A, 38B and 38C, together, illustrate an example embodiment of a logic flow 4400. The logic flow 4400 may be representative of some or all of the operations executed by one or more embodiments described herein. More specifically, the logic flow 4400 may illustrate operations performed by the processor(s) 2550 in executing the control routine 2540, and/or performed by other component(s) of at least one of the federated devices 2500.

At 4410, a processor of a federated device of a distributed processing system (e.g., at least one processor 2550 of one of the federated devices 2500 of the distributed processing system 2000) may generate training data and testing data (e.g., the neural network training data 2779t and the neural network testing data 2779u), either from a larger flow input data set and corresponding larger result report associated with previous performances of a non-neuromorphic implementation of an analytical function (e.g., a combination of the flow input data set 2330x and the result report 2770x from past performances of the non-neuromorphic job flow 2200x to generate time series predictions), or from a randomly generated flow input data set and a corresponding result report generated from the randomly generated data set via performances the non-neuromorphic implementation of the analytical function.

At 4412, the processor may select a configuration of the chain of neural networks (e.g., the multi-link chain 2574abc type of ensemble made up of the neural networks 2571a-c of FIGS. 22A-F) from among a set of multiple configurations of chains to use in implementing a neuromorphic form of the analytical function. As has been discussed, within a multi-link chain of neural networks employed to generate time series predictions, the full range of time covered by a time series prediction may be subdivided into multiple subranges of time, with each such subrange being assigned to one of the multiple neural networks to be covered by the portion of the time series prediction that it outputs. Further, in various embodiments, all of the subranges may cover equal length portions of the period of time of the time series prediction, or there may be differences in length among the portions of the length of time of the time series prediction. As a result, different configurations of the neural network chain may entail the use of an equal quantity of outputs from each of the neural networks, or may entail the use of differing quantities of outputs from each of the neural networks.

At 4414, the processor may then select a set of hyperparameters that define structural features of each of the neural networks of the chain of neural networks from among multiple sets of hyperparameters in preparation for the training each of the neural networks. As has been discussed, depending on the quantity of neural networks to be included and/or on the quantity of outputs to be used among all of the neural networks in a multi-link chain that precede the neural network at the tail of the chain, the quantity of inputs for all of the neural networks may be required to be selected to be large enough to ensure that the neural network at the tail of the multi-link chain is able to receive all of the outputs of all of the preceding neural networks as part of its inputs.

At 4416, the processor may perform, at least partly in a first federated area, one or more of iterations of a training job flow (e.g., the training job flow 2200t, which includes the execution of one or more training task routines 2440t) with the selected set of hyperparameters and the training data to train the each of the neural networks. As previously discussed, for a set of neural networks used in a multi-link chain to be used to generate time series predictions, training the neural networks individually, starting with the neural network at the head of the chain, and using transferred learning to give each succeeding neural network the weights, biases and/or other trained parameters of its preceding neural network as a starting point may result in a reduced overall training time for the chain.

At 4420, the processor may perform a first part of a transfer flow defined by a transfer flow definition (e.g., the transfer flow definition 2620*tuv*) by executing a first transfer routine (e.g., the transfer routine 2640*t*) that causes the processor to monitor the progress of the training of the neural networks of the chain. In executing the first transfer routine, the processor may check at 4322 whether a condition has been met to trigger the automated transfer of a copy of the instances of neural network configuration data for all of the neural networks (e.g., copies of the multiple instances of neural network configuration data 2379*t* from an ensemble 2574 of neural networks 2571 as a single mid-flow data set 2370*t*) from the first federated area and into a second federated area for testing. If, at 4422, the processor determines that the condition has not been met, then the processor may perform another one or more iterations of the training job flow at 4414.

However, if at 4422, the processor determines that the condition has been met, then the processor may perform a second part of the transfer flow defined by the transfer flow definition by performing the transfer of the instances of neural network configuration data from the first federated to the second federated area through the first transfer area, at 4424. In so doing, the processor may be caused to cooperate with another processor of a different federated device of the distributed processing system.

At 4430, the processor may perform, at least partly in the second federated area, one or more of iterations of a testing job flow (e.g., the testing job flow 2200*u*, which includes the execution of one or more training task routines 2440*u*) with the transferred copy of the instances of neural network configuration data and the testing data to test the chain of neural networks.

At 4440, a third part of the transfer flow defined by the transfer flow definition may be performed by executing a second transfer routine (e.g., the transfer routine 2640*u*) that causes monitoring of the progress of the testing of the chain of neural networks. In executing the second transfer routine, a check may be made at 4442 of whether a condition has been met to trigger the automated transfer of a copy of the multiple instances of neural network configuration data from the second federated area and into a third federated area to enable at least experimental use of the chain of neural networks. If, at 4442, the condition is determined to have not been met, then a check may be made at 4450 of whether a condition has been met to trigger the automated transfer of an indication of the results of the testing back to first federated area to enable and/or trigger retraining to generate a new chain of neural networks. If, at 4450, the condition is determined to have not been met, then another one or more iterations of the testing job flow may be performed at 4430. However, if at 4450, the condition is determined to have been met, then the second part of the transfer flow is reversed at 4452 with a transfer of an indication of the results of the testing back to the first federated area through first transfer area, followed by the selection of another configuration for a chain of neural networks at 4412 and/or of another set of hyperparameters at 4414 in preparation for a retraining to train a new chain of neural networks.

However, if at 4442, the condition is determined to have been met, then a fourth part of the transfer flow defined by the transfer flow definition may be performed by performing the transfer of the multiple instances of neural network configuration data from the second federated to the third federated area through the second transfer area, at 4444. In so doing, there may be cooperation with still another processor of still another federated device of the distributed processing system.

At 4460, input data on which the analytical function is to be performed is received (e.g., the flow input data set 2330*v*). At 4462, at least partly within the third federated area, one or more routines of the non-neuromorphic implementation of the analytical function are executed, and the chain of neural networks trained to provide the neuromorphic implementation is operated, thereby causing both non-neuromorphic and neuromorphic implementations of the analytical function to be performed at least partially in parallel with the received flow input data set.

At 4470, a fifth part of the transfer flow defined by the transfer flow definition may be performed by executing a third transfer routine (e.g., the transfer routine 2640*v*) that causes comparisons to be made between the sets of output values generated by each of the implementations of the analytical function from the same corresponding input values of the received flow input data set to test the degree of accuracy of the chain of neural networks in performing the analytical function.

If, at 4472, the degree of accuracy does not at least meet a predetermined lower threshold of accuracy, then at 4474, a sixth part of the transfer flow may be performed with the transfer of an indication of the results of using the neural network being transferred from the third federated area to the first federated area through a third transfer area, followed by retraining to generate a new chain of neural networks, starting at 4412. However, if at 4472, the degree of accuracy of the chain of neural networks does at least meet the predetermined lower threshold of accuracy, then at 4480, a check may be made of whether the degree of accuracy at meets a higher threshold of accuracy.

If, at 4480, the degree of accuracy does not at least meet the predetermined higher threshold of accuracy, then more input data may be received at 4460 in preparation for further use of the chain of neural networks. However, if at 4380, the degree of accuracy of the chain of neural networks does at least meet the predetermined higher threshold of accuracy, then at 4482, the multiple instances of neural network configuration data that defines the set of neural networks within the chain of neural networks may be made available for further use without parallel use of the non-neuromorphic implementation.

In various embodiments, each of the processors 2150, 2550 and 2850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 2550 of each of the one or more federated devices 1500 may be selected to efficiently perform the analysis of multiple instances of job flows at least partially in parallel. By way of example, the processor 2550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2140, 2540 and 2840, including the components of which each is composed, may be selected to be operative on whatever type of processor or processors that are selected to implement applicable ones of the processors 2150, 2550 and/or 2850 within each one of the devices 2100, 2500 and/or 2800, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2550 and/or 2850. Where one or more device drivers are included, those device drivers may provide support for any of a variety of other components, whether hardware or software components, of the devices 2100, 2500 and/or 2800.

In various embodiments, each of the storages 2160, 2560 and 2860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2560 in embodiments in which the one or more of the federated devices 2500 provide federated spaces 2566, or the storage devices 2600 in embodiments in which the one or more storage devices 2600 provide federated spaces 2566, may be implemented with a redundant array of independent discs (RAID) of a RAID level selected to provide fault tolerance to objects stored within the federated spaces 2566.

In various embodiments, each of the input devices 2110 and 2810 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the displays 2180 and 2880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 2180 and/or 2880 may each be a touchscreen display such that the input devices 2110 and/or 2810, respectively, may be incorporated therein as touch-sensitive components thereof.

In various embodiments, each of the network interfaces 2190, 2590 and 2890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 2190, 2590 and/or 2890 may be implemented with multiple copper-based or fiber-optic based network interface ports to provide redundant and/or parallel pathways in exchanging one or more of the data sets 2330 and/or 2370.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AliJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the data sets 2330 and/or 2370 are not dependent on, nor constrained by, existing API architectures and/or supporting communications protocols. More broadly, there is nothing in the manner in which the data sets 2330 and/or 2370 may be organized in storage, transmission and/or distribution via the network 2999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
    train a first neural network of a chain of neural networks to generate a first portion of multiple portions of time series data that corresponds to a temporally earliest subrange of time of multiple subranges of time within a full range of time that is covered by the time series data, wherein:
        the chain comprises a set of neural networks ordered to start with the first neural network at a head of the chain and to end with a last neural network at a tail of the chain;
        each neural network of the chain comprises external inputs, additional inputs and outputs;
        each neural network of the chain generates a portion of the multiple portions of the time series data at the outputs of the neural network from input data values provided at the external inputs of the neural network;
        each portion of the multiple portions of the time series data corresponds to a subrange of the multiple subranges; and
        the set of neural networks is interconnected within the chain such that each neural network, except the first neural network at the head of the chain, receives, at the additional inputs of the neural network, a portion of the multiple portions of the time series data that is generated at the outputs of a preceding neural network in the ordering of neural networks within the chain;
    retrieve, from the first neural network, a first neural network configuration data comprising hyperparameters and first trained parameters learned by the first neural network from the training of the first neural network;
    train, using at least the first neural network configuration data, a next neural network in the ordering of neural networks within the chain to generate a next portion of the multiple portions that corresponds to a next subrange of time of the multiple subranges of time that temporally follows the earliest subrange;
    retrieve, from the next neural network, a next neural network configuration data comprising the hyperparameters and next trained parameters learned by the next neural network from the training of the next neural network; and
    use at least the first neural network configuration data and the next neural network configuration data to instantiate the chain.

2. The apparatus of claim 1, wherein:
    each neural network of the chain has the same quantities of external inputs, additional inputs and outputs;
    during the training of each neural network of the chain, each additional input of the neural network that is not used to receive a portion of time series data from an output of a preceding neural network in the ordering of neural networks within the chain is provided with a null input;
    following instantiation of the chain, the processor is caused to operate the chain to generate the time series data from the set of input data values; and
    during operation of the chain, each additional input of each neural network of the chain that is not used to receive a portion of a time series data from an output of a preceding neural network in the ordering of neural networks within the chain is provided with a null input.

3. The apparatus of claim 1, wherein the processor is caused to sequentially train each neural network in the chain via backpropagation following the ordering of the chain from the first neural network to the last neural network, wherein:
    each neural network is trained using a training data set comprising sets of input values and corresponding sets of output values;
    each set of output values is generated as time series data from the corresponding set of input values through use of non-neuromorphic processing;
    the sets of input values of the training data are provided to the external inputs of each neural network, and separate portions of the corresponding sets of output values are provided to the outputs of each neural network;
    each of the separate portions of the corresponding sets of output values that are provided to the outputs of each neural network corresponds to the portion of the time series data that is to be generated by the neural network; and
    during the training of each neural network in the chain other than the first neural network at the head of the chain, the preceding neural network is operated to generate, from each set of input values of the training data, a corresponding portion of time series data that is provided at the additional inputs of the neural network.

4. The apparatus of claim 3, wherein the processor is caused to perform operations comprising:
    analyze the neural network training data to identify a portion of the output data values across the sets of output values of the neural network training data that shows a relatively high degree of correlation; and
    derive a manner of dividing the time series data into the multiple portions of the time series data that are each output by one of the of the neural networks in the chain based, at least in part, on the identified portion of the output data values that shows the relatively high degree of correlation.

5. The apparatus of claim 1, wherein:
    the multiple portions of time series data are implemented using the hyperparameters, and are based on a division of the full range of time into the multiple subranges of time that was derived prior to the training of the first neural network; and the processor is caused, following the training of the first neural network and before the use of the first neural network configuration data to train the next neural network, to perform operations comprising:

test the first neural network using a testing data set comprising sets of input values and corresponding sets of output values;

analyze results of the testing of the first neural network to determine whether a degree of accuracy of the first neural network in generating the first portion of time series data meets a first threshold degree of accuracy; and in response to determination that the degree of accuracy of the first neural network does not meet the first threshold degree of accuracy, perform operations comprising:

derive a different division of the full range of time into the multiple subranges of time;

alter the hyperparameters to implement the multiple portions of time series data based on the different division of the full range of time; and repeat the training and testing of the first neural network following the alteration of the hyperparameters.

6. The apparatus of claim 5, wherein, in response to a determination that the degree of accuracy of the first neural network does meet the first threshold degree of accuracy, the processor is caused to perform operations comprising:

use the first neural network configuration data to train the next neural network;

test the next neural network using the test data set;

analyze the results of the testing of the next neural network to determine whether a degree of accuracy of the next neural network in generating the next portion of time series data meets a second threshold degree of accuracy; and in response to a determination that the degree of accuracy of the next neural network does not meet the second threshold degree of accuracy, perform operations comprising:

derive the different division of the full range of time into the multiple subranges of time;

alter the hyperparameters to implement the multiple portions of time series data based on the different division of the full range of time; and repeat the training and testing of at least the first neural network following the alteration of the hyperparameters.

7. The apparatus of claim 1, wherein:

the hyperparameters specify at least a quantity of artificial neurons within each neural network of the chain and a quantity of layers of artificial neurons within each neural network of the chain;

the quantity of layers includes an input layer of artificial neurons connected to the external inputs and the additional inputs; and the quantity of layers includes an output layer of artificial neurons connected to the outputs.

8. The apparatus of claim 7, wherein the chain comprises a type of chain selected from a group consisting of:

a single-link chain, wherein:

each neural network in the chain, except the first neural network at the head of the chain, receives the portion of the multiple portions of time series data that is generated at the outputs of the immediately preceding neural network in the ordering of neural networks within the chain; and the quantity of additional inputs enables each neural network, except the first neural network at the head of the chain, to receive all of the outputs of the immediately preceding neural network at its additional inputs; and a multi-link chain, wherein:

each neural network in the chain, except the first neural network at the head of the chain, receives all of the multiple portions of time series data that are generated at the outputs of all of the preceding neural networks in the ordering of neural networks within the chain; and the quantity of additional inputs enables the last neural network to receive all of the outputs of all of the other neural networks in the chain.

9. The apparatus of claim 1, wherein:

the trained parameters of the first neural network configuration data comprise weights and biases that represent what was learned by the first neural network during training; and the processor is caused to train the set of neural networks sequentially in an order that follows the ordering of neural networks in the chain from the first neural network at the head of the chain to the last neural network at the tail of the chain.

10. The apparatus of claim 1, comprising a plurality of neuromorphic devices communicatively coupled to the processor, wherein the processor is caused to perform operations comprising:

derive the portion of the multiple portions of time series data that is output by each neural network from the input data values during operation of the chain to generate time series data based on at least one of:

a quantity of artificial neurons within each neuromorphic device of the plurality of neuromorphic devices;

a maximum quantity of layers that each neuromorphic device of the plurality of neuromorphic devices is able to support;

a maximum quantity of inputs that each neuromorphic device of the plurality of neuromorphic devices is able to support; or a maximum quantity of outputs that each neuromorphic device of the plurality of neuromorphic devices is able to support;

provide the first neural network configuration data to at least a first neuromorphic device of the plurality of neuromorphic devices to instantiate the first neural network;

provide the next neural network configuration data to at least a second neuromorphic device of the plurality of neuromorphic devices to instantiate the second neural network; and provide a last neural network configuration data to at least a third neuromorphic device of the plurality of neuromorphic devices to instantiate the last neural network.

11. A computer-program product tangibly embodied in a non-transitory machine-readable storage medium, the computer-program product including instructions operable to cause a processor to perform operations comprising:

train a first neural network of a chain of neural networks to generate a first portion of multiple portions of time series data that corresponds to a temporally earliest subrange of time of multiple subranges of time within a full range of time that is covered by the time series data, wherein:

the chain comprises a set of neural networks ordered to start with the first neural network at a head of the chain and to end with a last neural network at a tail of the chain;

each neural network of the chain comprises external inputs, additional inputs and outputs;

each neural network of the chain generates a portion of the multiple portions of the time series data at the outputs of the neural network from input data values provided at the external inputs of the neural network;

each portion of the multiple portions of the time series data corresponds to a subrange of the multiple subranges; and the set of neural networks is interconnected within the chain such that each neural network, except the first neural network at the head of the chain, receives, at the additional inputs of the neural network, a portion of the multiple portions of the time series data that is generated at the outputs of a preceding neural network in the ordering of neural networks within the chain;

retrieve, from the first neural network, a first neural network configuration data comprising hyperparameters and first trained parameters learned by the first neural network from the training of the first neural network;

train, using at least the first neural network configuration data, a next neural network in the ordering of neural networks within the chain to generate a next portion of the multiple portions that corresponds to a next subrange of time of the multiple subranges of time that temporally follows the earliest subrange;

retrieve, from the next neural network, a next neural network configuration data comprising the hyperparameters and next trained parameters learned by the next neural network from the training of the next neural network; and use at least the first neural network configuration data and the next neural network configuration data to instantiate the chain.

12. The computer-program product of claim 11, wherein:
each neural network of the chain has the same quantities of external inputs, additional inputs and outputs;
during the training of each neural network of the chain, each additional input of the neural network that is not used to receive a portion of time series data from an output of a preceding neural network in the ordering of neural networks within the chain is provided with a null input;
following instantiation of the chain, the processor is caused to operate the chain to generate the time series data from the set of input data values; and
during operation of the chain, each additional input of each neural network of the chain that is not used to receive a portion of a time series data from an output of a preceding neural network in the ordering of neural networks within the chain is provided with a null input.

13. The computer-program product of claim 11, wherein the processor is caused to sequentially train each neural network in the chain via backpropagation following the ordering of the chain from the first neural network to the last neural network, wherein:

each neural network is trained using a training data set comprising sets of input values and corresponding sets of output values;

each set of output values is generated as time series data from the corresponding set of input values through use of non-neuromorphic processing;

the sets of input values of the training data are provided to the external inputs of each neural network, and separate portions of the corresponding sets of output values are provided to the outputs of each neural network;

each of the separate portions of the corresponding sets of output values that are provided to the outputs of each neural network corresponds to the portion of the time series data that is to be generated by the neural network; and during the training of each neural network in the chain other than the first neural network at the head of the chain, the preceding neural network is operated to generate, from each set of input values of the training data, a corresponding portion of time series data that is provided at the additional inputs of the neural network.

14. The computer-program product of claim 13, wherein the processor is caused to perform operations comprising:
analyze the neural network training data to identify a portion of the output data values across the sets of output values of the neural network training data that shows a relatively high degree of correlation; and
derive a manner of dividing the time series data into the multiple portions of the time series data that are each output by one of the of the neural networks in the chain based, at least in part, on the identified portion of the output data values that shows the relatively high degree of correlation.

15. The computer-program product of claim 11, wherein:
the multiple portions of time series data are implemented using the hyperparameters, and are based on a division of the full range of time into the multiple subranges of time that was derived prior to the training of the first neural network; and
the processor is caused, following the training of the first neural network and before the use of the first neural network configuration data to train the next neural network, to perform operations comprising:
test the first neural network using a testing data set comprising sets of input values and corresponding sets of output values;
analyze results of the testing of the first neural network to determine whether a degree of accuracy of the first neural network in generating the first portion of time series data meets a first threshold degree of accuracy; and
in response to determination that the degree of accuracy of the first neural network does not meet the first threshold degree of accuracy, perform operations comprising:
derive a different division of the full range of time into the multiple subranges of time;
alter the hyperparameters to implement the multiple portions of time series data based on the different division of the full range of time; and
repeat the training and testing of the first neural network following the alteration of the hyperparameters.

16. The computer-program product of claim 15, wherein, in response to a determination that the degree of accuracy of the first neural network does meet the first threshold degree of accuracy, the processor is caused to perform operations comprising:
  use the first neural network configuration data to train the next neural network;
  test the next neural network using the test data set;
  analyze the results of the testing of the next neural network to determine whether a degree of accuracy of the next neural network in generating the next portion of time series data meets a second threshold degree of accuracy; and
  in response to a determination that the degree of accuracy of the next neural network does not meet the second threshold degree of accuracy, perform operations comprising:
    derive the different division of the full range of time into the multiple subranges of time;
    alter the hyperparameters to implement the multiple portions of time series data based on the different division of the full range of time; and
    repeat the training and testing of at least the first neural network following the alteration of the hyperparameters.

17. The computer-program product of claim 11, wherein:
  the hyperparameters specify at least a quantity of artificial neurons within each neural network of the chain and a quantity of layers of artificial neurons within each neural network of the chain;
  the quantity of layers includes an input layer of artificial neurons connected to the external inputs and the additional inputs; and
  the quantity of layers includes an output layer of artificial neurons connected to the outputs.

18. The computer-program product of claim 17, wherein the chain comprises a type of chain selected from a group consisting of:
  a single-link chain, wherein:
    each neural network in the chain, except the first neural network at the head of the chain, receives the portion of the multiple portions of time series data that is generated at the outputs of the immediately preceding neural network in the ordering of neural networks within the chain; and
    the quantity of additional inputs enables each neural network, except the first neural network at the head of the chain, to receive all of the outputs of the immediately preceding neural network at its additional inputs; and
  a multi-link chain, wherein:
    each neural network in the chain, except the first neural network at the head of the chain, receives all of the multiple portions of time series data that are generated at the outputs of all of the preceding neural networks in the ordering of neural networks within the chain; and
    the quantity of additional inputs enables the last neural network to receive all of the outputs of all of the other neural networks in the chain.

19. The computer-program product of claim 11, wherein:
  the trained parameters of the first neural network configuration data comprise weights and biases that represent what was learned by the first neural network during training; and
  the processor is caused to train the set of neural networks sequentially in an order that follows the ordering of neural networks in the chain from the first neural network at the head of the chain to the last neural network at the tail of the chain.

20. The computer-program product of claim 11, wherein the processor is caused to perform operations comprising:
  derive the portion of the multiple portions of time series data that is output by each neural network from the input data values during operation of the chain to generate time series data based on at least one of:
    a quantity of artificial neurons within each neuromorphic device of a plurality of neuromorphic devices communicatively coupled to the processor;
    a maximum quantity of layers that each neuromorphic device of the plurality of neuromorphic devices is able to support;
    a maximum quantity of inputs that each neuromorphic device of the plurality of neuromorphic devices is able to support; or
    a maximum quantity of outputs that each neuromorphic device of the plurality of neuromorphic devices is able to support;
  provide the first neural network configuration data to at least a first neuromorphic device of the plurality of neuromorphic devices to instantiate the first neural network;
  provide the next neural network configuration data to at least a second neuromorphic device of the plurality of neuromorphic devices to instantiate the second neural network; and
  provide a last neural network configuration data to at least a third neuromorphic device of the plurality of neuromorphic devices to instantiate the last neural network.

21. A computer-implemented method comprising:
  training, by a processor, a first neural network of a chain of neural networks to generate a first portion of multiple portions of time series data that corresponds to a temporally earliest subrange of time of multiple subranges of time within a full range of time that is covered by the time series data, wherein:
    the chain comprises a set of neural networks ordered to start with the first neural network at a head of the chain and to end with a last neural network at a tail of the chain;
    each neural network of the chain comprises external inputs, additional inputs and outputs;
    each neural network of the chain generates a portion of the multiple portions of the time series data at the outputs of the neural network from input data values provided at the external inputs of the neural network;
    each portion of the multiple portions of the time series data corresponds to a subrange of the multiple subranges; and
    the set of neural networks is interconnected within the chain such that each neural network, except the first neural network at the head of the chain, receives, at the additional inputs of the neural network, a portion of the multiple portions of the time series data that is generated at the outputs of a preceding neural network in the ordering of neural networks within the chain;
  retrieving, from the first neural network, a first neural network configuration data comprising hyperparameters and first trained parameters learned by the first neural network from the training of the first neural network;
  training, by the processor and using at least the first neural network configuration data, a next neural network in the ordering of neural networks within the chain to generate a next portion of the multiple portions that corresponds to a next subrange of time of the multiple subranges of time that temporally follows the earliest subrange;

retrieving, from the next neural network, a next neural network configuration data comprising the hyperparameters and next trained parameters learned by the next neural network from the training of the next neural network; and using, by the processor, at least the first neural network configuration data and the next neural network configuration data to instantiate the chain.

22. The computer-implemented method of claim 21, wherein:

each neural network of the chain has the same quantities of external inputs, additional inputs and outputs;

during the training of each neural network of the chain, each additional input of the neural network that is not used to receive a portion of time series data from an output of a preceding neural network in the ordering of neural networks within the chain is provided with a null input;

the method comprises, following instantiation of the chain, operating the chain to generate the time series data from the set of input data values; and during operation of the chain, each additional input of each neural network of the chain that is not used to receive a portion of a time series data from an output of a preceding neural network in the ordering of neural networks within the chain is provided with a null input.

23. The computer-implemented method of claim 21, comprising sequentially training, by the processor, each neural network in the chain via backpropagation following the ordering of the chain from the first neural network to the last neural network, wherein:

each neural network is trained using a training data set comprising sets of input values and corresponding sets of output values;

each set of output values is generated as time series data from the corresponding set of input values through use of non-neuromorphic processing;

the sets of input values of the training data are provided to the external inputs of each neural network, and separate portions of the corresponding sets of output values are provided to the outputs of each neural network;

each of the separate portions of the corresponding sets of output values that are provided to the outputs of each neural network corresponds to the portion of the time series data that is to be generated by the neural network; and during the training of each neural network in the chain other than the first neural network at the head of the chain, the preceding neural network is operated to generate, from each set of input values of the training data, a corresponding portion of time series data that is provided at the additional inputs of the neural network.

24. The computer-implemented method of claim 23, comprising:

analyzing, by the processor, the neural network training data to identify a portion of the output data values across the sets of output values of the neural network training data that shows a relatively high degree of correlation; and deriving, by the processor, a manner of dividing the time series data into the multiple portions of the time series data that are each output by one of the of the neural networks in the chain based, at least in part, on the identified portion of the output data values that shows the relatively high degree of correlation.

25. The computer-implemented method of claim 21, wherein:

the multiple portions of time series data are implemented using the hyperparameters, and are based on a division of the full range of time into the multiple subranges of time that was derived prior to the training of the first neural network; and the method comprises, following the training of the first neural network and before the use of the first neural network configuration data to train the next neural network, performing operations comprising:

testing, by the processor, the first neural network using a testing data set comprising sets of input values and corresponding sets of output values;

analyzing, by the processor, results of the testing of the first neural network to determine whether a degree of accuracy of the first neural network in generating the first portion of time series data meets a first threshold degree of accuracy; and in response to determination that the degree of accuracy of the first neural network does not meet the first threshold degree of accuracy, performing operations comprising:

deriving, by the processor, a different division of the full range of time into the multiple subranges of time;

altering, by the processor, the hyperparameters to implement the multiple portions of time series data based on the different division of the full range of time; and repeating, by the processor, the training and testing of the first neural network following the alteration of the hyperparameters.

26. The computer-implemented method of claim 25, comprising, in response to a determination that the degree of accuracy of the first neural network does meet the first threshold degree of accuracy, performing operations comprising:

using, by the processor, the first neural network configuration data to train the next neural network;

testing, by the processor, the next neural network using the test data set;

analyzing, by the processor, the results of the testing of the next neural network to determine whether a degree of accuracy of the next neural network in generating the next portion of time series data meets a second threshold degree of accuracy; and in response to a determination that the degree of accuracy of the next neural network does not meet the second threshold degree of accuracy, performing operations comprising:

deriving, by the processor, the different division of the full range of time into the multiple subranges of time;

altering, by the processor, the hyperparameters to implement the multiple portions of time series data based on the different division of the full range of time; and repeating, by the processor, the training and testing of at least the first neural network following the alteration of the hyperparameters.

27. The computer-implemented method of claim 21, wherein:

the hyperparameters specify at least a quantity of artificial neurons within each neural network of the chain and a quantity of layers of artificial neurons within each neural network of the chain;

the quantity of layers includes an input layer of artificial neurons connected to the external inputs and the additional inputs; and the quantity of layers includes an output layer of artificial neurons connected to the outputs.

28. The computer-implemented method of claim 27, wherein the chain comprises a type of chain selected from a group consisting of:

a single-link chain, wherein:

each neural network in the chain, except the first neural network at the head of the chain, receives the portion of the multiple portions of time series data that is generated at the outputs of the immediately preceding neural network in the ordering of neural networks within the chain; and the quantity of additional inputs enables each neural network, except the first neural network at the head of the chain, to receive all of the outputs of the immediately preceding neural network at its additional inputs; and a multi-link chain, wherein:

each neural network in the chain, except the first neural network at the head of the chain, receives all of the multiple portions of time series data that are generated at the outputs of all of the preceding neural networks in the ordering of neural networks within the chain; and the quantity of additional inputs enables the last neural network to receive all of the outputs of all of the other neural networks in the chain.

29. The computer-implemented method of claim 21, wherein:

the trained parameters of the first neural network configuration data comprise weights and biases that represent what was learned by the first neural network during training; and the method comprises training, by the processor, the set of neural networks sequentially in an order that follows the ordering of neural networks in the chain from the first neural network at the head of the chain to the last neural network at the tail of the chain.

30. The computer-implemented method of claim 21, comprising:

deriving, by the processor, the portion of the multiple portions of time series data that is output by each neural network from the input data values during operation of the chain to generate time series data based on at least one of:

a quantity of artificial neurons within each neuromorphic device of a plurality of neuromorphic devices communicatively coupled to the processor;

a maximum quantity of layers that each neuromorphic device of the plurality of neuromorphic devices is able to support;

a maximum quantity of inputs that each neuromorphic device of the plurality of neuromorphic devices is able to support; or a maximum quantity of outputs that each neuromorphic device of the plurality of neuromorphic devices is able to support;

providing the first neural network configuration data to at least a first neuromorphic device of the plurality of neuromorphic devices to instantiate the first neural network;

providing the next neural network configuration data to at least a second neuromorphic device of the plurality of neuromorphic devices to instantiate the second neural network; and providing a last neural network configuration data to at least a third neuromorphic device of the plurality of neuromorphic devices to instantiate the last neural network.

* * * * *